US012759596B2

(12) United States Patent
Takahama et al.

(10) Patent No.: US 12,759,596 B2
(45) Date of Patent: Oct. 13, 2026

(54) PACKAGE TRANSPORT DEVICE AND CONTROL METHOD

(71) Applicant: Panasonic Intellectual Property Corporation of America, Torrance, CA (US)

(72) Inventors: Takuya Takahama, Osaka (JP); Mitsuaki Oshima, Kyoto (JP); Hideki Aoyama, Osaka (JP); Yosuke Sumi, Gifu (JP); Fumio Muramatsu, Kyoto (JP); Kazuma Kitazawa, Osaka (JP); Ryosuke Amagai, Osaka (JP); Tsuyoshi Kajikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 669 days.

(21) Appl. No.: 18/201,372

(22) Filed: May 24, 2023

(65) Prior Publication Data

US 2024/0076039 A1 Mar. 7, 2024

Related U.S. Application Data

(63) Continuation of application No. PCT/JP2021/043990, filed on Nov. 30, 2021.

(30) Foreign Application Priority Data

Nov. 30, 2020 (JP) ................................ 2020-199035
Feb. 26, 2021 (JP) ................................ 2021-031259

(51) Int. Cl.
*B61B 3/02* (2006.01)
*B61B 3/00* (2006.01)
(Continued)

(52) U.S. Cl.
CPC .................. *B61B 3/02* (2013.01); *B61B 3/00* (2013.01); *B64U 50/19* (2023.01); *G05D 1/667* (2024.01);
(Continued)

(58) Field of Classification Search
CPC .. B61B 12/02; B61B 3/02; B61B 3/00; B61B 12/00; B61B 13/00; B61B 7/06;
(Continued)

(56) References Cited

U.S. PATENT DOCUMENTS

2022/0020621 A1 1/2022 Ogo et al.

FOREIGN PATENT DOCUMENTS

JP 2018-012477 1/2018
WO WO-2008031859 A1 * 3/2008 ............ F16M 13/02
(Continued)

OTHER PUBLICATIONS

International Search Report (ISR) from International Searching Authority (Japan Patent Office) in International Pat. Appl. No. PCT/JP2021/043990, dated Feb. 1, 2022, together with an English language translation.

*Primary Examiner* — S. Joseph Morano
*Assistant Examiner* — Heaven Buffington
(74) *Attorney, Agent, or Firm* — Greenblum & Bernstein, P.L.C.

(57) ABSTRACT

A package transport device includes: a main body (a vehicle main body, a first vehicle main body, and a second vehicle main body); a rail holder (connector) held by a rail located above the main body; a turntable that is provided between the main body and the rail holder and rotates the main body; a slider portion that extends with respect to the main body; and a package holder that holds a package attached to the slider portion.

13 Claims, 210 Drawing Sheets

(51) Int. Cl.
*B64U 50/19* (2023.01)
*G05D 1/667* (2024.01)
*G05D 1/678* (2024.01)
*B64U 30/21* (2023.01)
*B64U 101/64* (2023.01)

(52) U.S. Cl.
CPC ............. *G05D 1/678* (2024.01); *B64U 30/21* (2023.01); *B64U 2101/64* (2023.01)

(58) Field of Classification Search
CPC .......... B65G 1/0457; B65G 2201/0235; B64U 2101/64; B64U 2101/67; B64U 10/60; B64U 50/19; B64U 30/21; B64U 30/210169; B64U 2101/60; G05D 1/667; G05D 1/678; G05D 2105/285
USPC ...................................................... 104/89, 93
See application file for complete search history.

(56) References Cited

FOREIGN PATENT DOCUMENTS

| | | | |
|---|---|---|---|
| WO | 2020/090288 | 5/2020 | |
| WO | WO-2020090288 A1 * | 5/2020 | ....... H01L 21/67733 |

* cited by examiner

FIG. 118

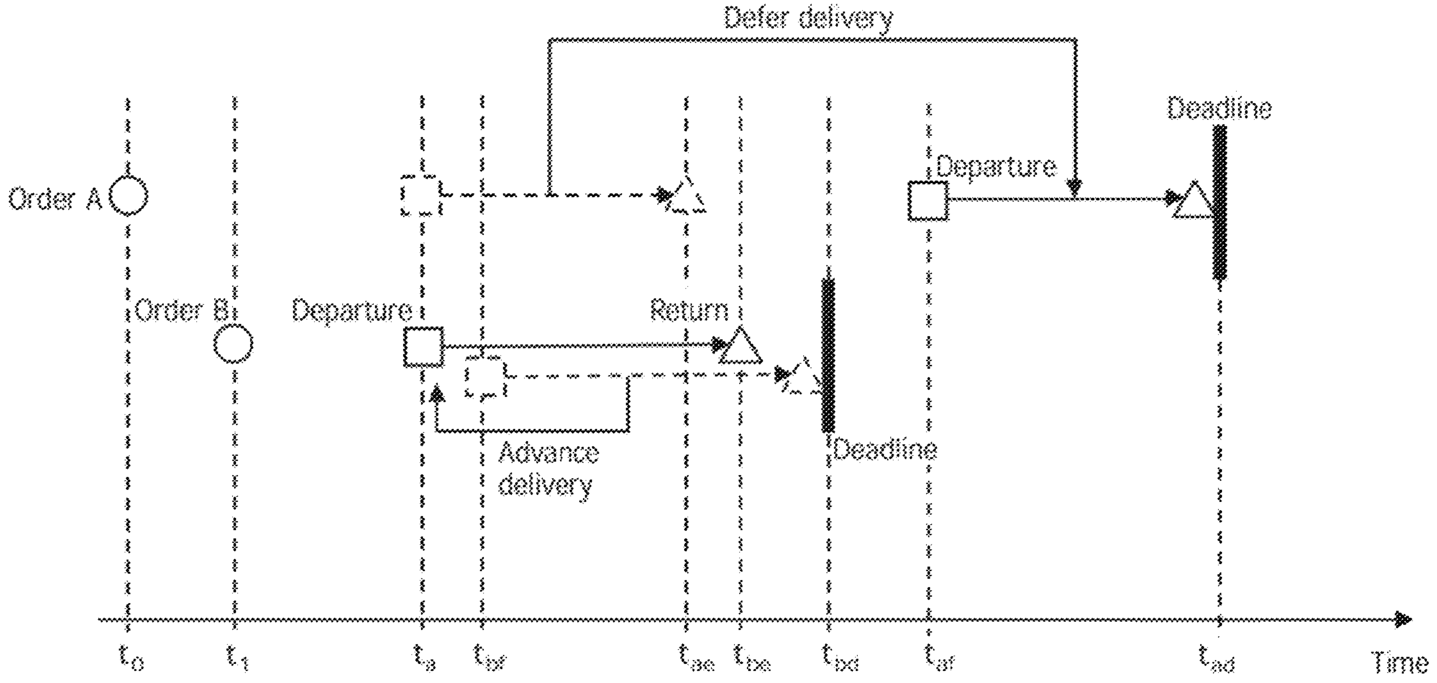

$t_0$ Order time of order A
$t_1$ Order time of order B
$t_a$ Change order of delivery of order A to order B
$t_{af}$ Final mandatory departure time for order A
$t_{bf}$ Final mandatory departure time for order B
$t_{ae}$ Scheduled return time for order A
$t_{be}$ Scheduled return time for order B
$t_{ad}$ Desired delivery time deadline for order A
$t_{bd}$ Desired delivery time deadline for order B

FIG. 124

| Desired delivery time | Time of day categories | | |
|---|---|---|---|
| | Peak hours (7:00-9:00, 11:00-14:00) | Average hours (9:00-11:00, 14:00-21:00) | Off-peak hours (21:00-7:00) |
| Expedited (e.g. within 15 minutes) | 500 | 400 | 250 |
| Within 2 hours | 300 | 250 | 200 |
| Designated time on same day | 200 | 160 | 120 |
| Designated time at later date | 180 | 140 | 100 |
| Same day | 100 | | |
| Not specified | 80 | | |

(Unit: Yen)

PACKAGE TRANSPORT DEVICE AND CONTROL METHOD

CROSS REFERENCE TO RELATED APPLICATIONS

This is a continuation application of PCT International Application No. PCT/JP2021/043990 filed on Nov. 30, 2021, designating the United States of America, which is based on and claims priority of Japanese Patent Application No. 2020-199035 filed on Nov. 30, 2020, and Japanese Patent Application No. 2021-031259 filed on Feb. 26, 2021. The entire disclosures of the above-identified applications, including the specifications, drawings, and claims are incorporated herein by reference in their entirety.

FIELD

The present disclosure relates to a package transport device and a control method.

BACKGROUND

Control methods have been proposed to enhance safety during flight of drones, which are unmanned aerial vehicles (see, for example, Patent Literature (PTL) 1).

PTL 1 discloses a technique for detecting abnormal drone flight by various means and recovering the abnormally flying drone using recovery means provided on power lines or utility poles.

CITATION LIST

Patent Literature

PTL 1: Japanese Unexamined Patent Application Publication No. 2018-12477

SUMMARY

Technical Problem

The system including the unmanned aerial vehicle disclosed in PTL 1 above can be improved upon.

Accordingly, the present disclosure provides a package transport device and a control method that improve upon the above related art.

Solution to Problem

A package transport device according to one aspect of the present disclosure includes: a main body; a rail holder held by a rail located above the main body; a turntable that is provided between the main body and the rail holder and rotates the main body; a first slider portion that extends with respect to the main body; and a package holder that holds a package attached to the first slider portion.

These general or specific aspects may be implemented as an unmanned aerial vehicle, a storage device, one or more thruster devices, a system, a control method, an integrated circuit, a computer program, or a computer-readable recording medium such as a CD-ROM, or any combination thereof.

Advantageous Effects

The unmanned package transport device and control method according to the present disclosure achieve further improvement.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 117 is a flowchart illustrating an example of operations performed when the delivery box instructs the user to empty the inside of the delivery box when ordering a product using the delivery system in Operation Example 8 according to Embodiment 11.

FIG. 118 illustrates an example of when the delivery system of Operation Example 9 according to Embodiment 11 swaps the order of delivery of order A and order B when order A and order B are received.

FIG. 119 is a flowchart of an example of operations performed when the delivery system of Operation Example 9 according to Embodiment 11 swaps the order of delivery of order A and order B when order A and order B are received.

FIG. 120 is a flowchart illustrating an example of operations performed when the unmanned aerial vehicle of the delivery system of Operation Example 10 according to Embodiment 11 delivers a package to a user within a predetermined transport temperature range.

FIG. 121 illustrates an example of the time to reach the permissible upper temperature limit based on the relationship between time and the atmospheric temperature, in the delivery system of Operation Example 11 according to Embodiment 11.

FIG. 122 is a flowchart illustrating another example of operations performed when the unmanned aerial vehicle of the delivery system of Operation Example 12 according to Embodiment 11 cannot deliver a package to a user within the predetermined transport temperature range.

FIG. 123 illustrates an example of the time to reach the minimum permissible value based on the relationship between time and the value of the package in the delivery system of Operation Example 13 according to Embodiment 11.

FIG. 124 illustrates an example of the dynamic setting of delivery fees when using the delivery system according to Embodiment 11.

FIG. 125 illustrates an example of a package transport device delivering a package according to Embodiment 12.

FIG. 126 illustrates an example of another package transport device delivering a package.

FIG. 127 illustrates an example of another package transport device delivering a package.

FIG. 128 illustrates an example of yet another package transport device delivering a package.

Figure 129:
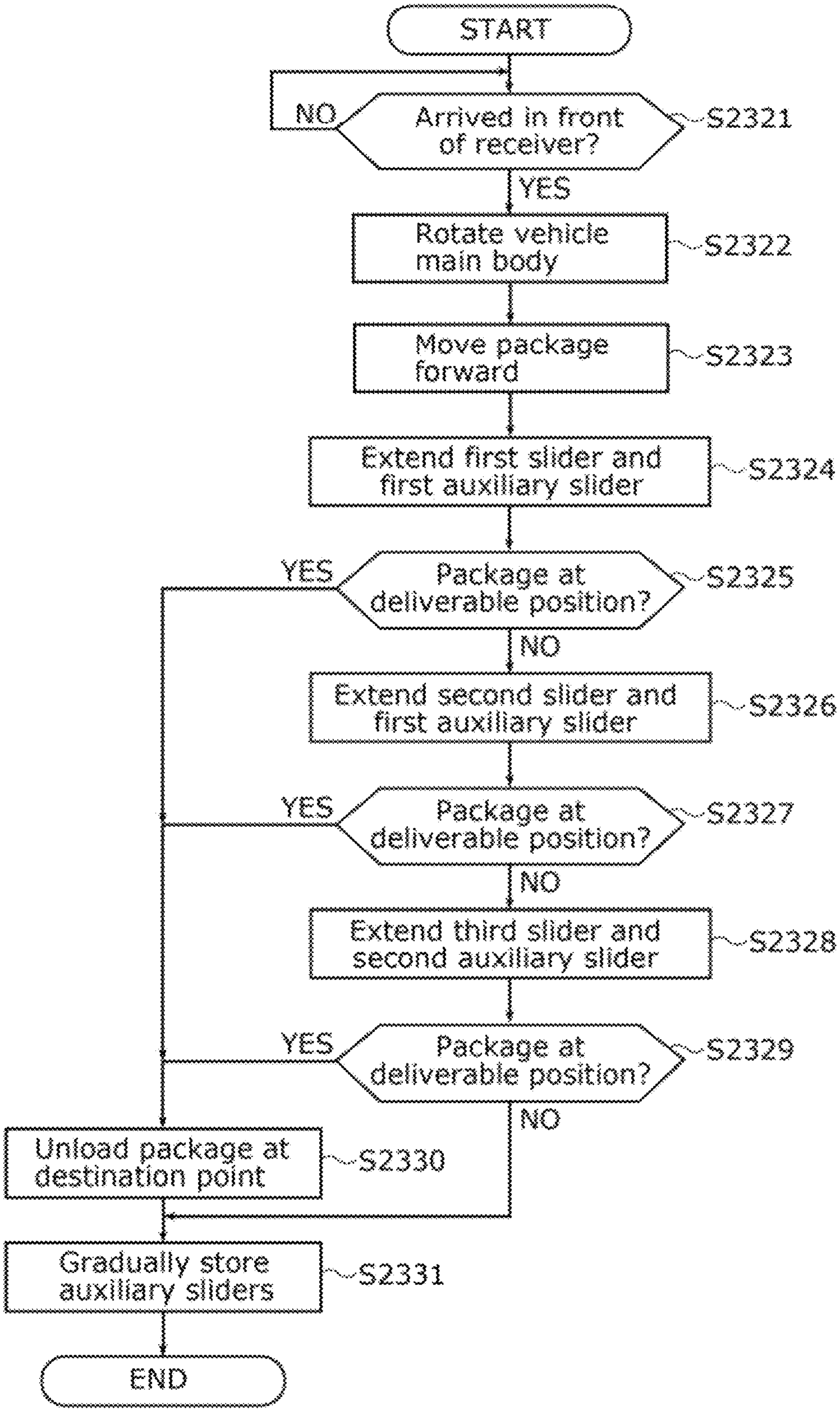

FIG. 129 is a flowchart illustrating an example of an operation of the package transport device according to Embodiment 12.

Figure 130:
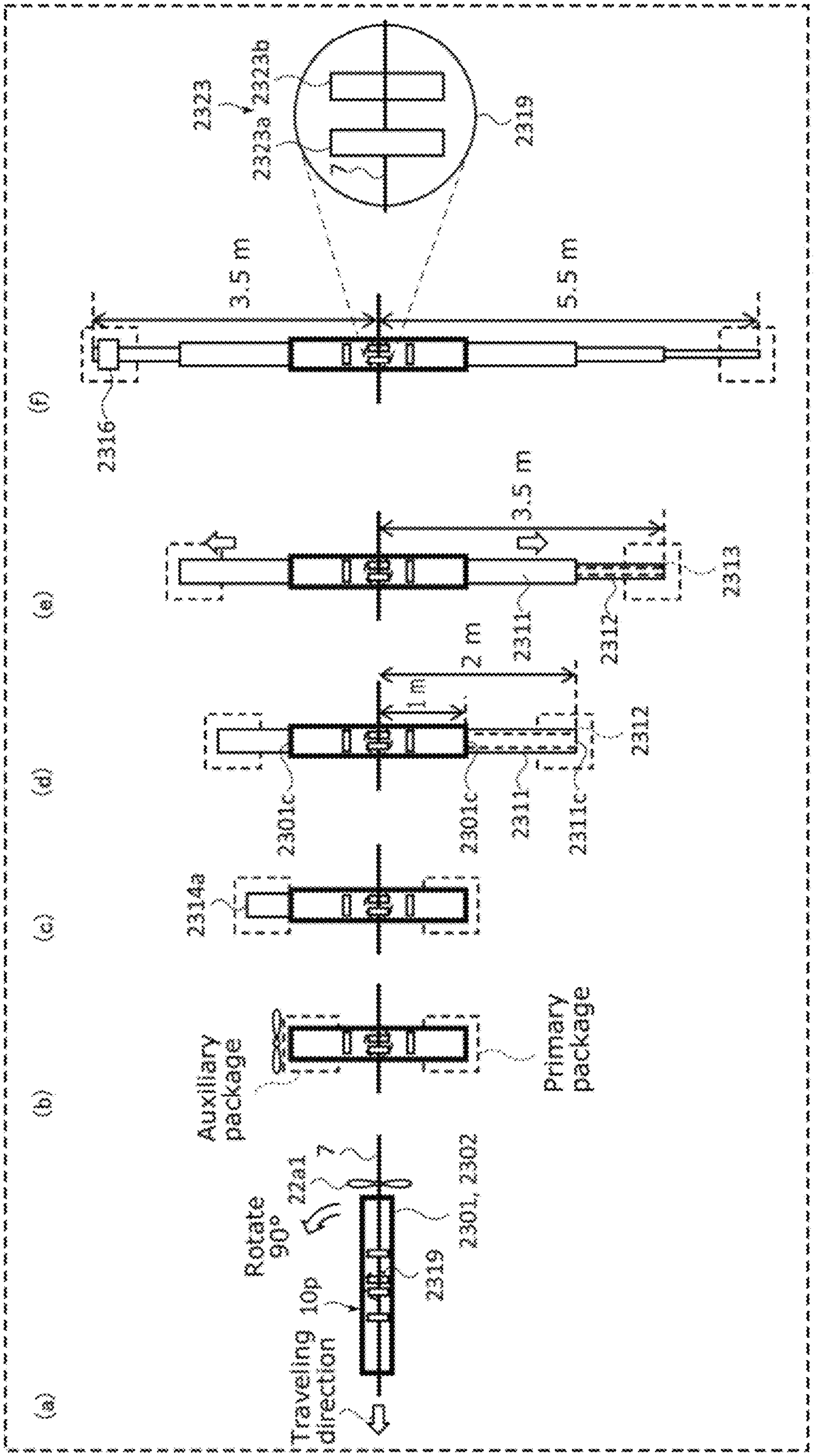

FIG. 130 illustrates an example of an operation of the package transport device according to Embodiment 12.

Figure 131:
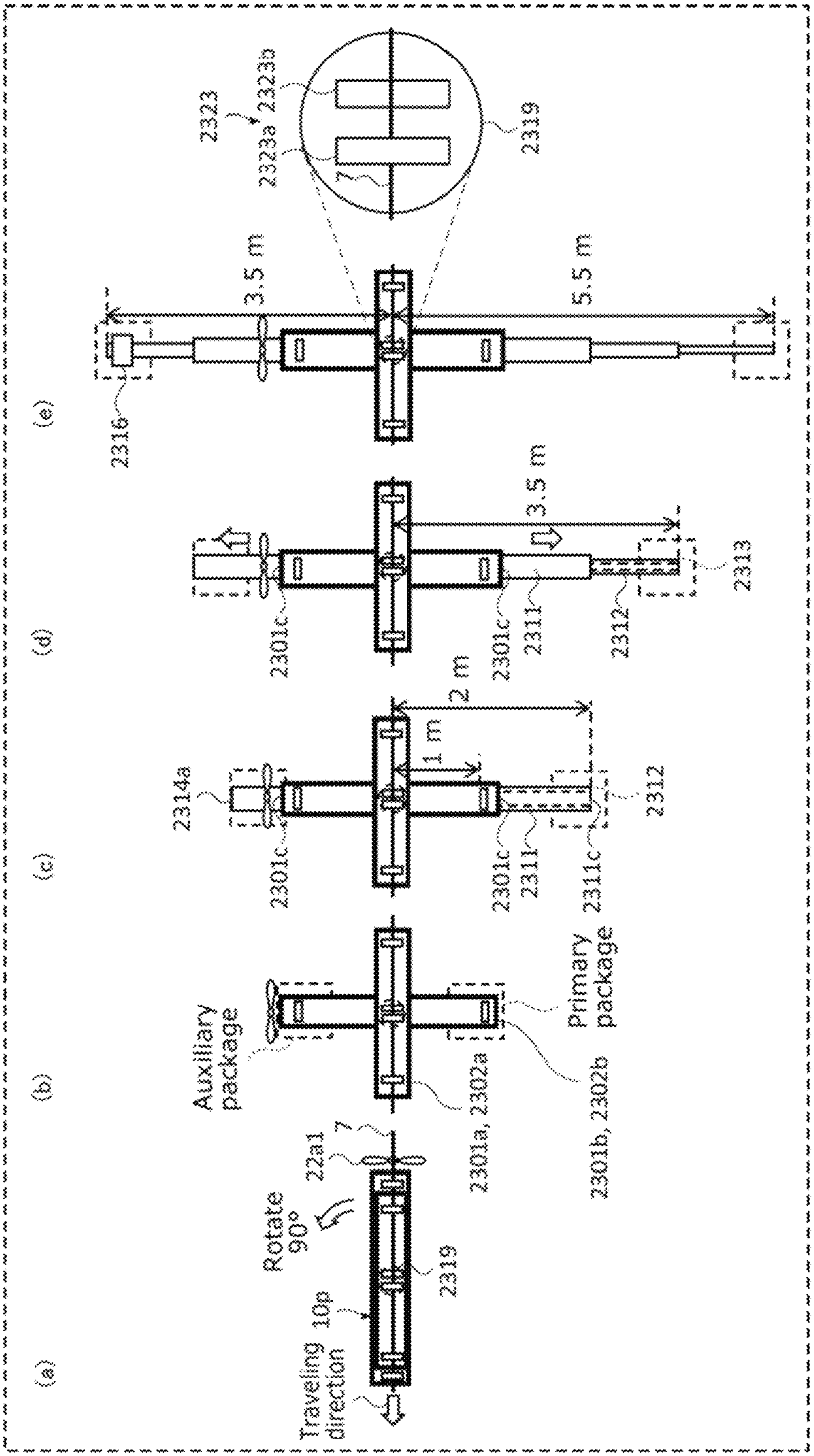

FIG. 131 illustrates an example of an operation of a package transport device according to Embodiment 13.

Figure 132A:
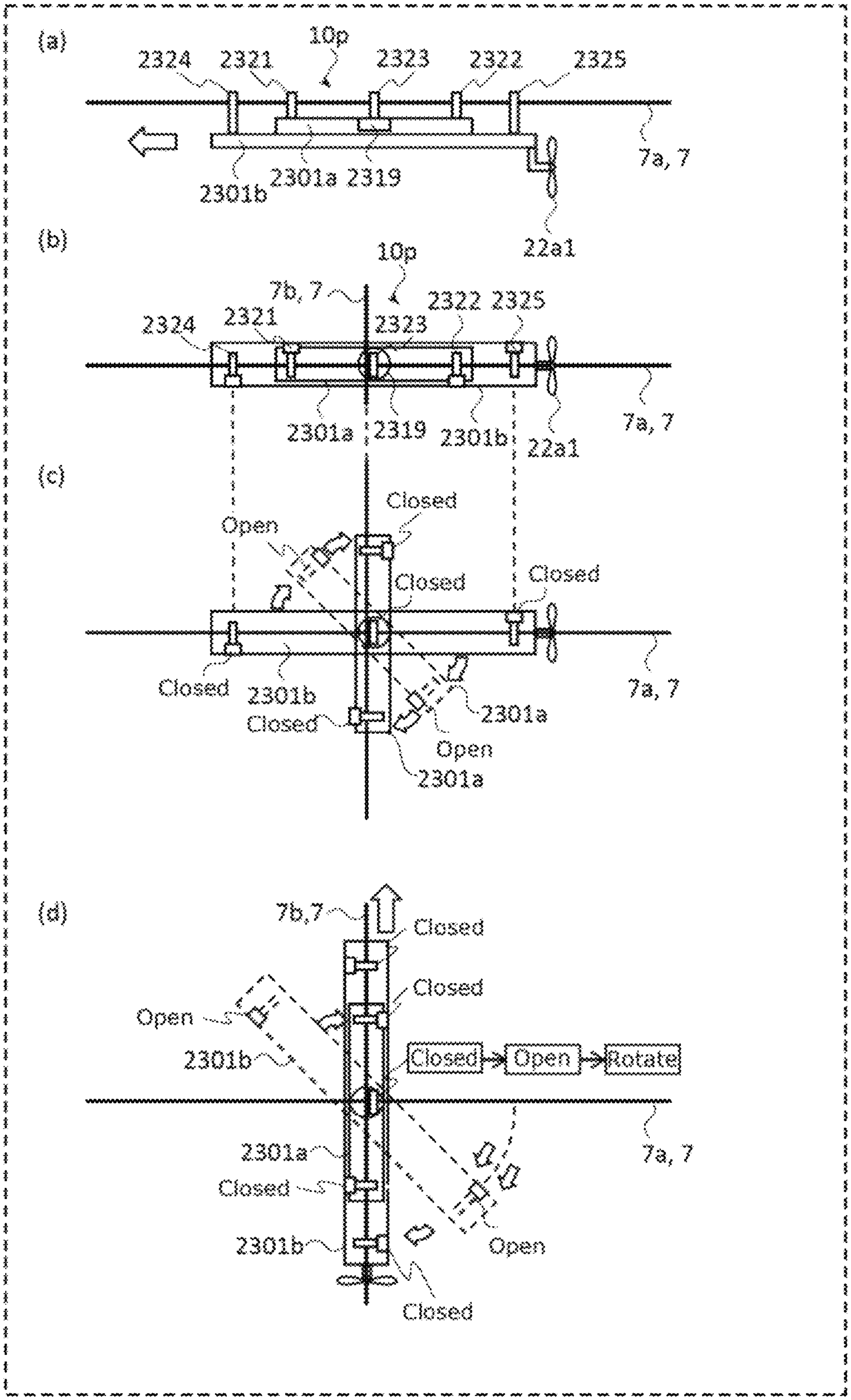

FIG. 132A illustrates an example of another operation of the package transport device according to Embodiment 13 when transferring connection from the first rail to the second rail.

FIG. 1328 illustrates an example of a connector according to Embodiment 13.

Figure 132B:
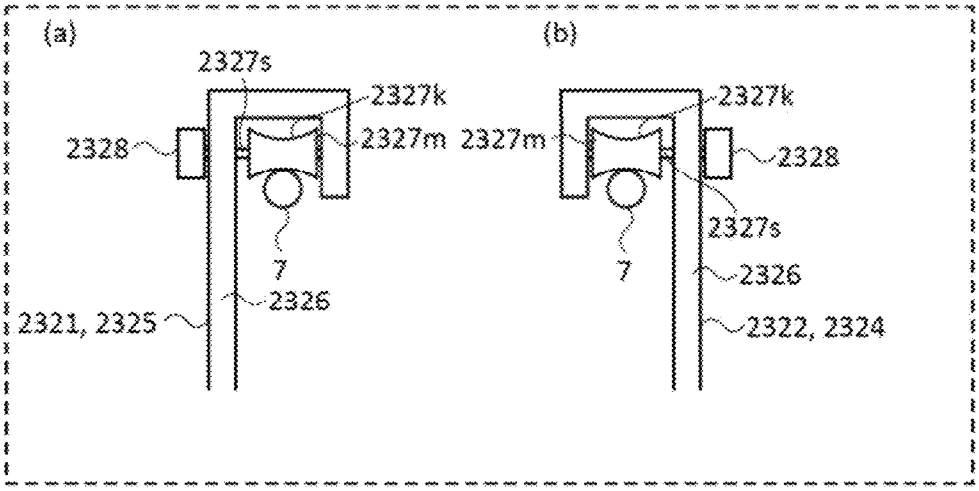
Figure 132C:
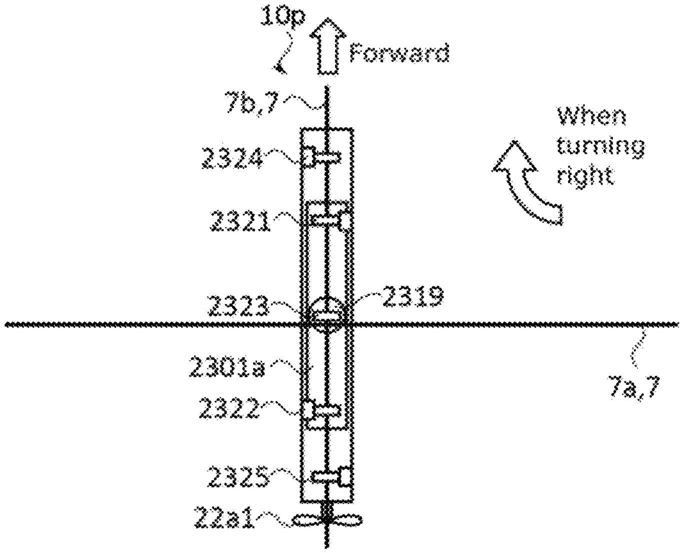

FIG. 132C illustrates an example of another operation of the package transport device according to Embodiment 13 when traveling after transferring connection from the first rail to the second rail.

Figure 133A:
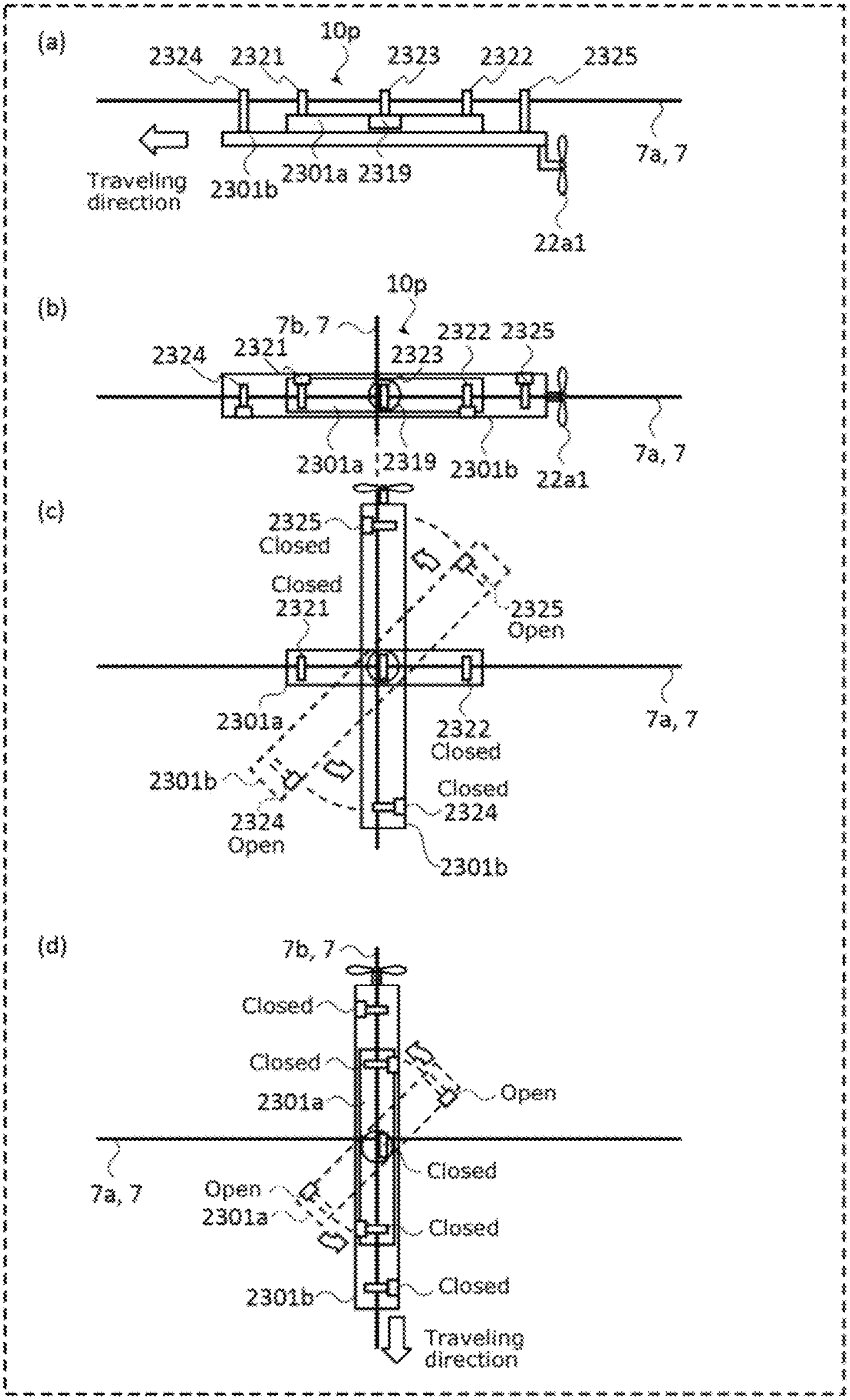
Figure 133B:
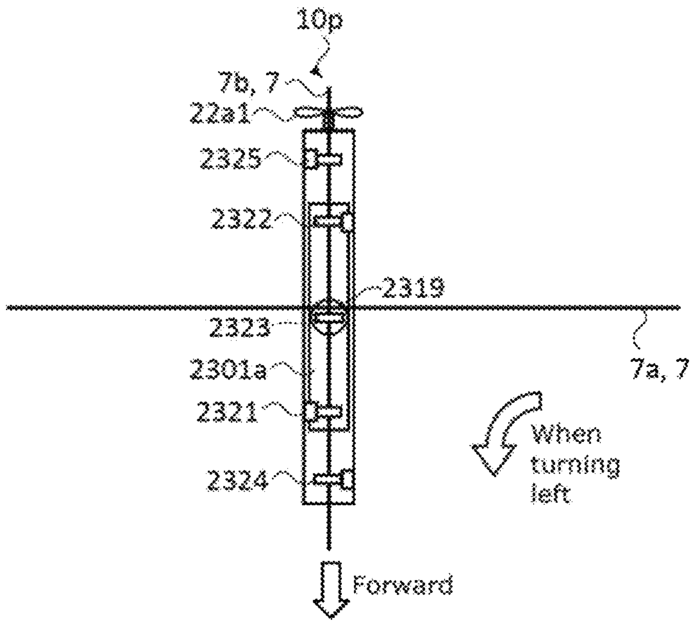

FIG. 133A illustrates an example of another operation of the package transport device according to Embodiment 13 when transferring connection from the first rail to the second rail.

FIG. 1338 illustrates an example of another operation of the package transport device according to Embodiment 13 when traveling after transferring connection from the first rail to the second rail.

Figure 134:
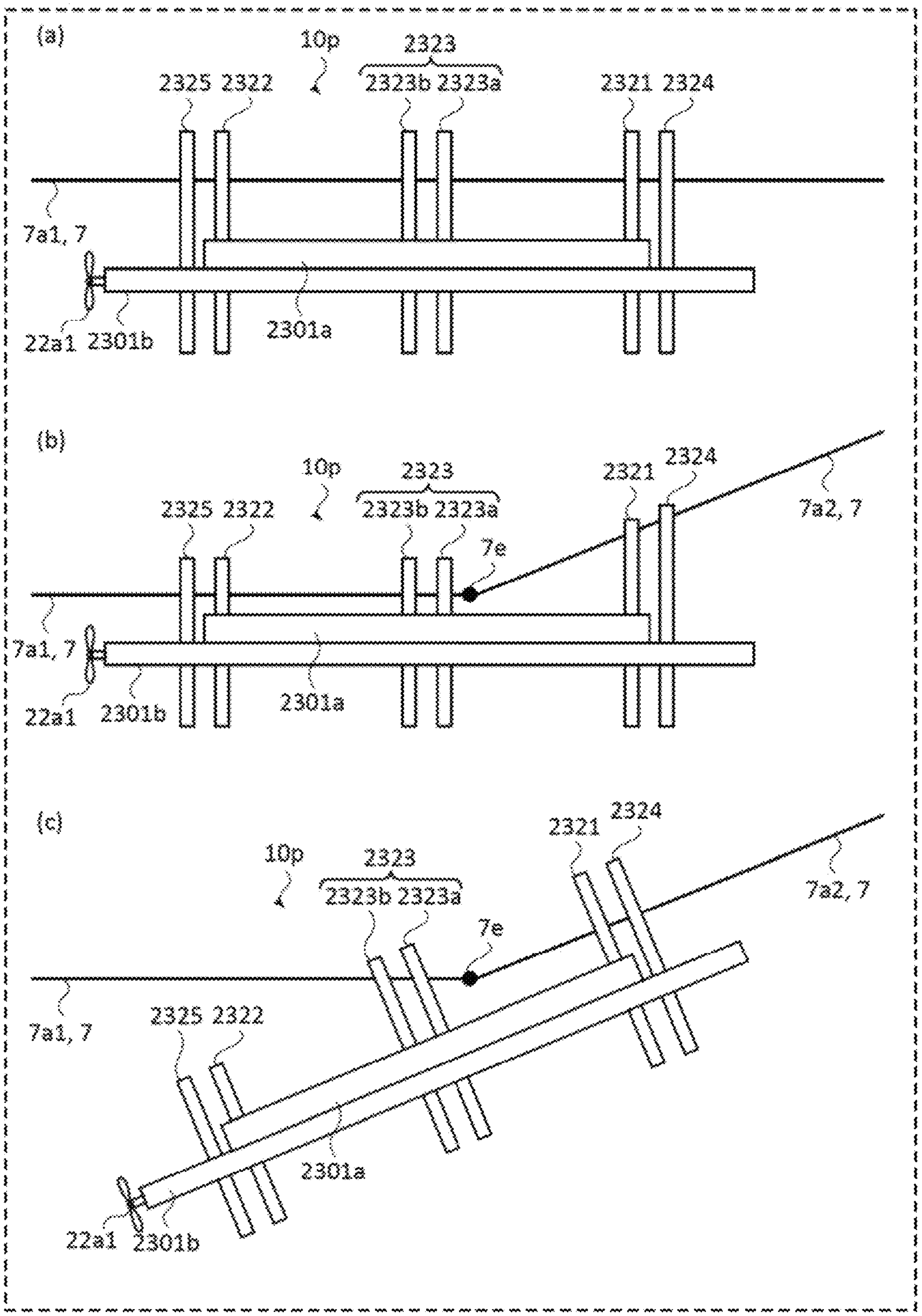

FIG. 134 illustrates an example of an operation of the package transport device according to Embodiment 13 when it is ascending on an inclined rail.

Figure 135A:
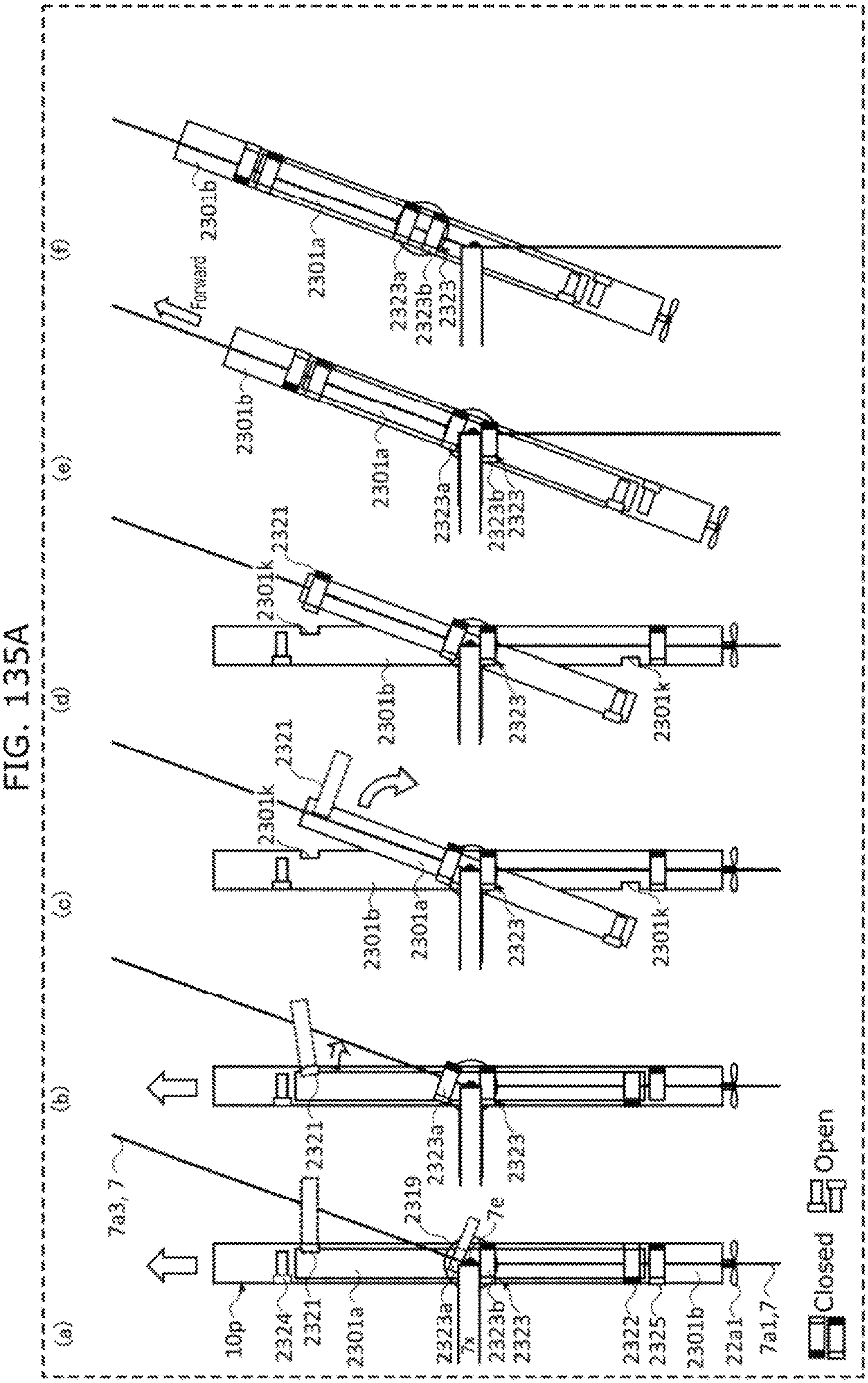

FIG. 135A illustrates an example of an operation of the package transport device according to Embodiment 13 when it is turning right on a rail that changes trajectory to the right.

Figure 135B:
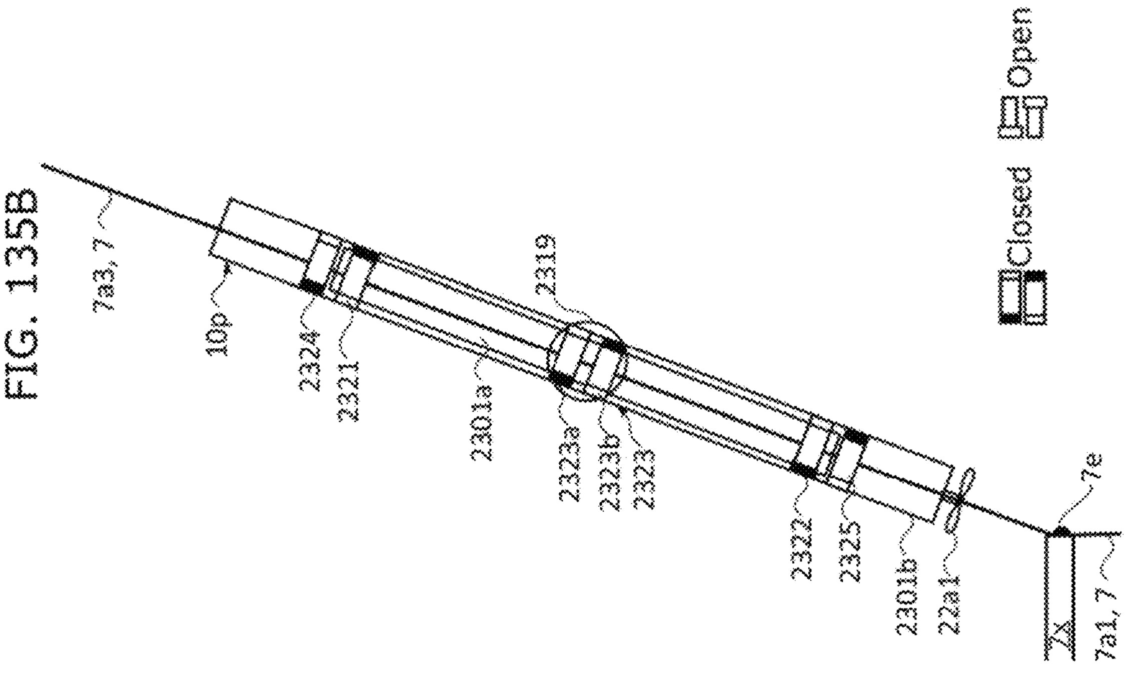

FIG. 135B illustrates an example of an operation of the package transport device according to Embodiment 13 after it has turned right and is traveling on a rail.

Figure 135C:
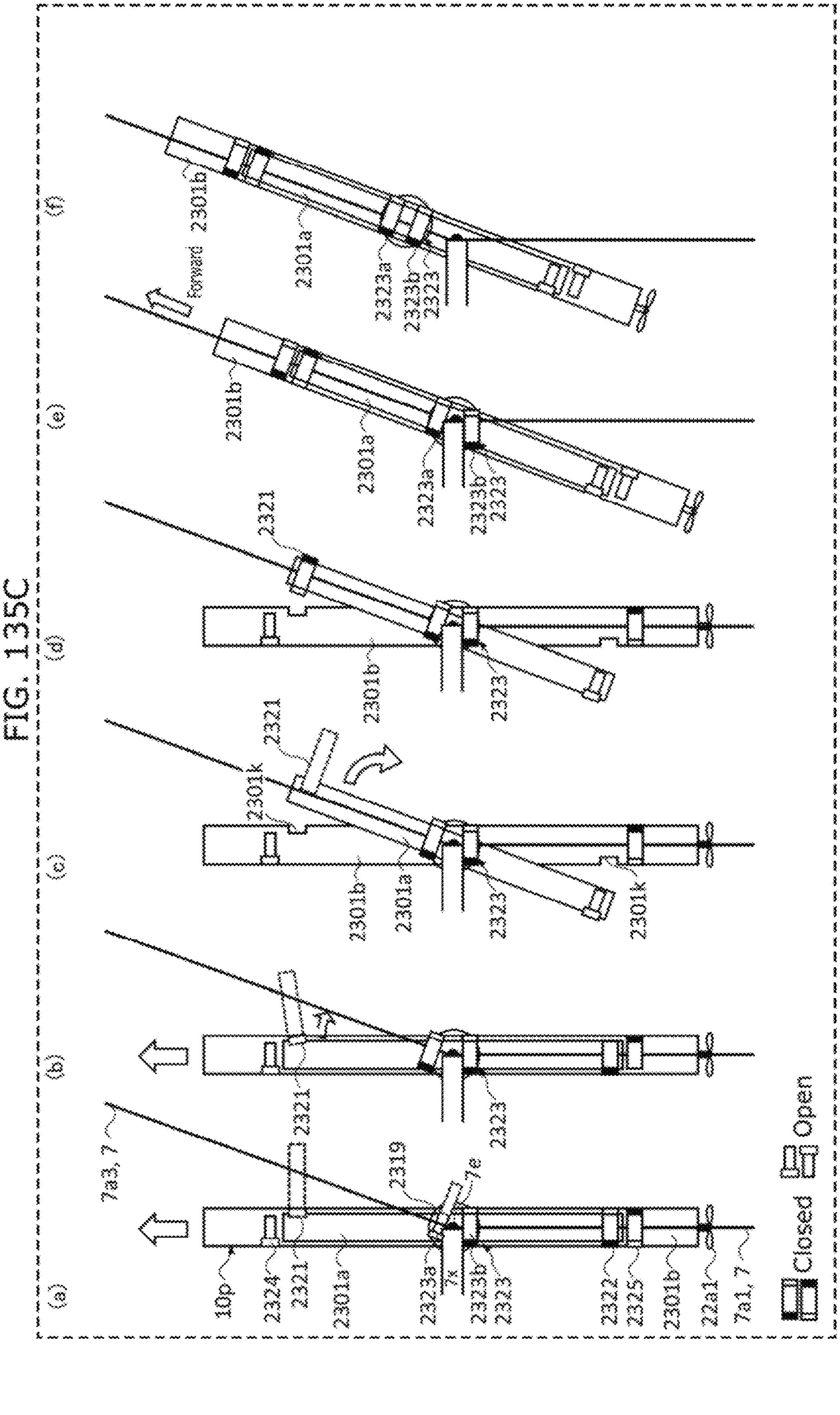

FIG. 135C illustrates an example of another operation of the package transport device according to Embodiment 13 when it is turning right on a rail that changes trajectory to the right.

Figure 135D:
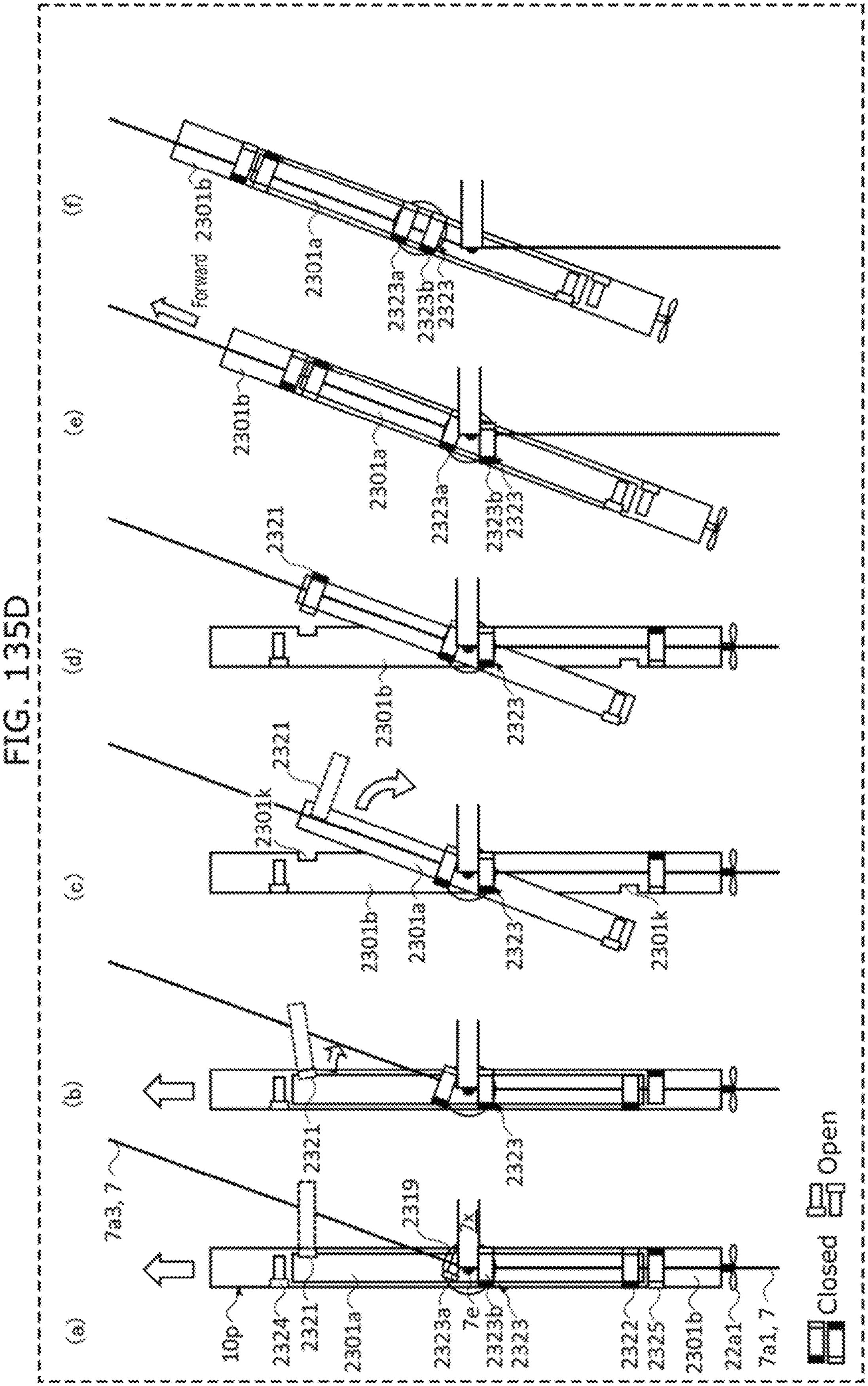

FIG. 135D illustrates an example of an operation of the package transport device when it is turning right on a rail that changes trajectory to the right, in a case in which a rail support portion is provided in a different location.

Figure 136:
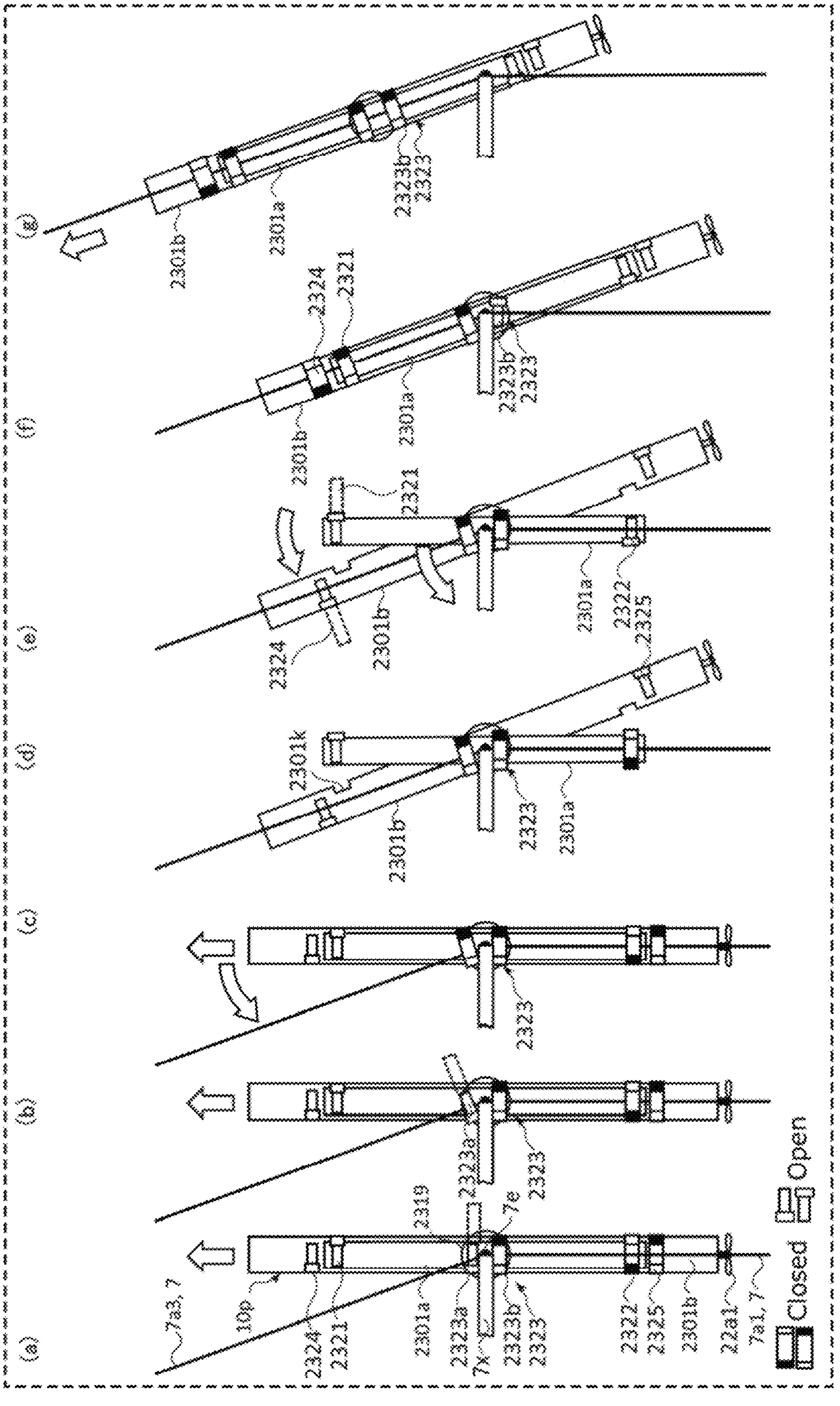

FIG. 136 illustrates an example of an operation of the package transport device according to Embodiment 13 when it is turning left on a rail that changes trajectory to the left.

Figure 137:
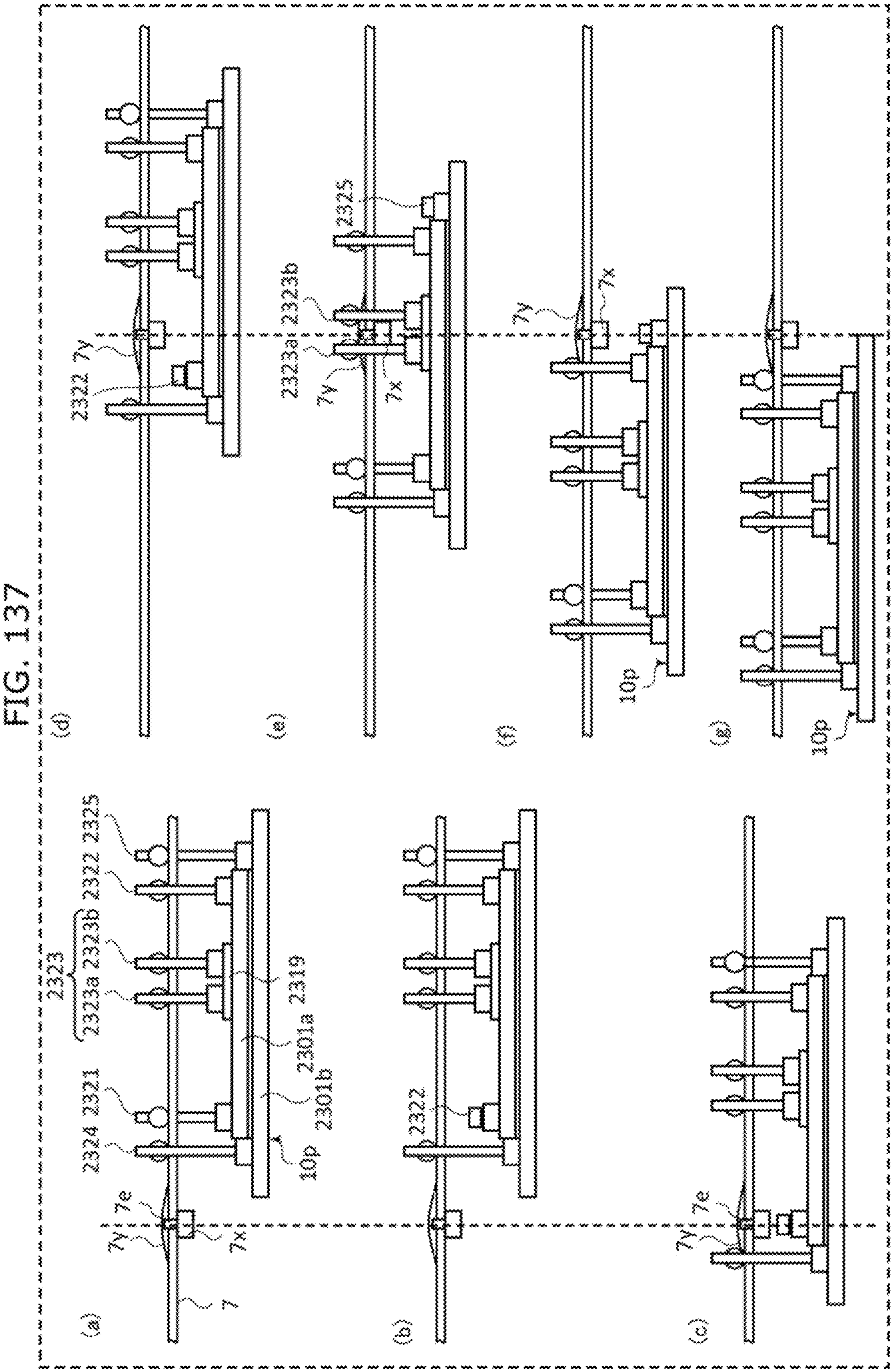

FIG. 137 illustrates an example of an operation of the package transport device traveling over a hump according to Embodiment 13.

Figure 138:
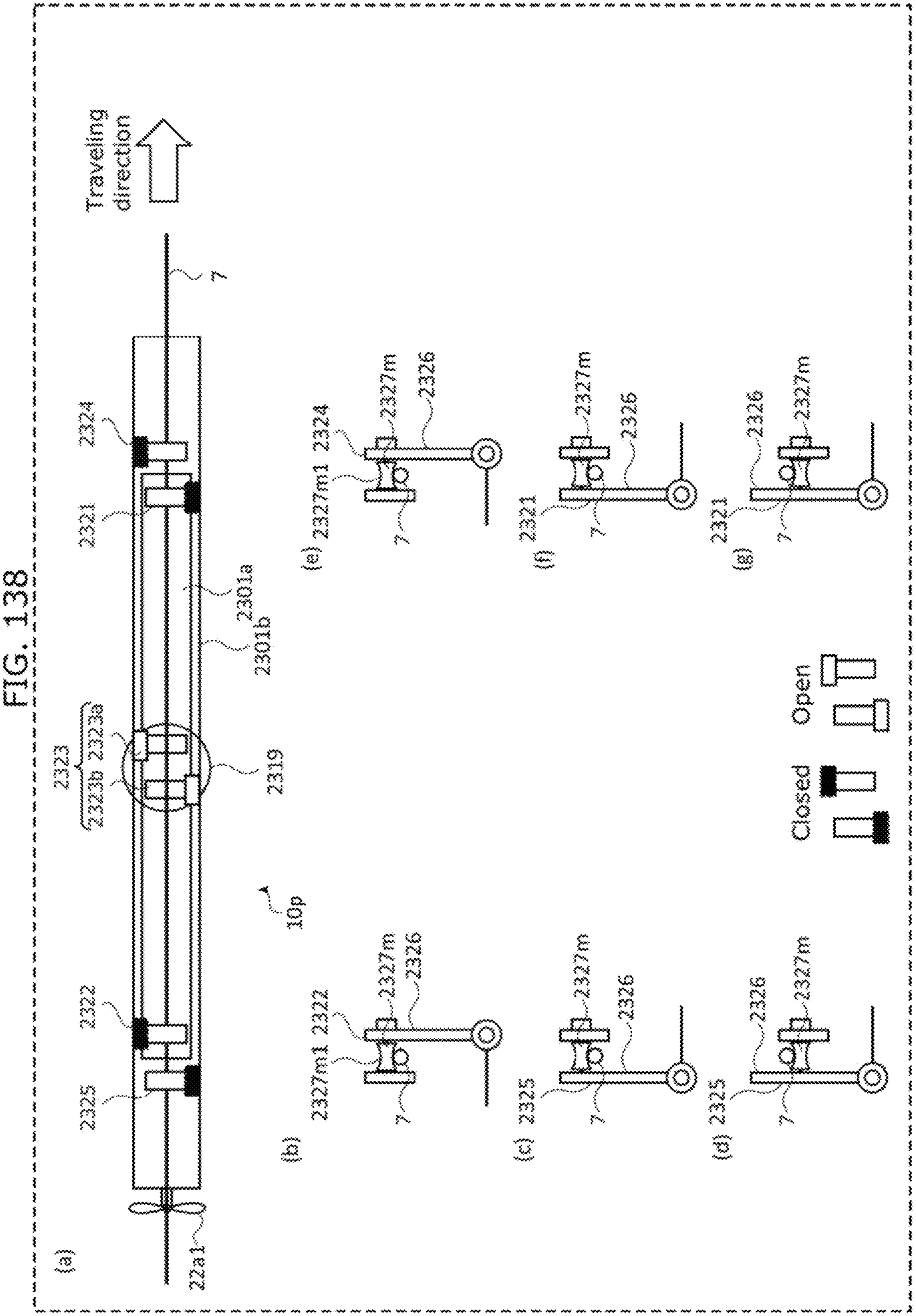

FIG. 138 illustrates an example of a package transport device according to Variation 1 of Embodiment 13.

Figure 139:
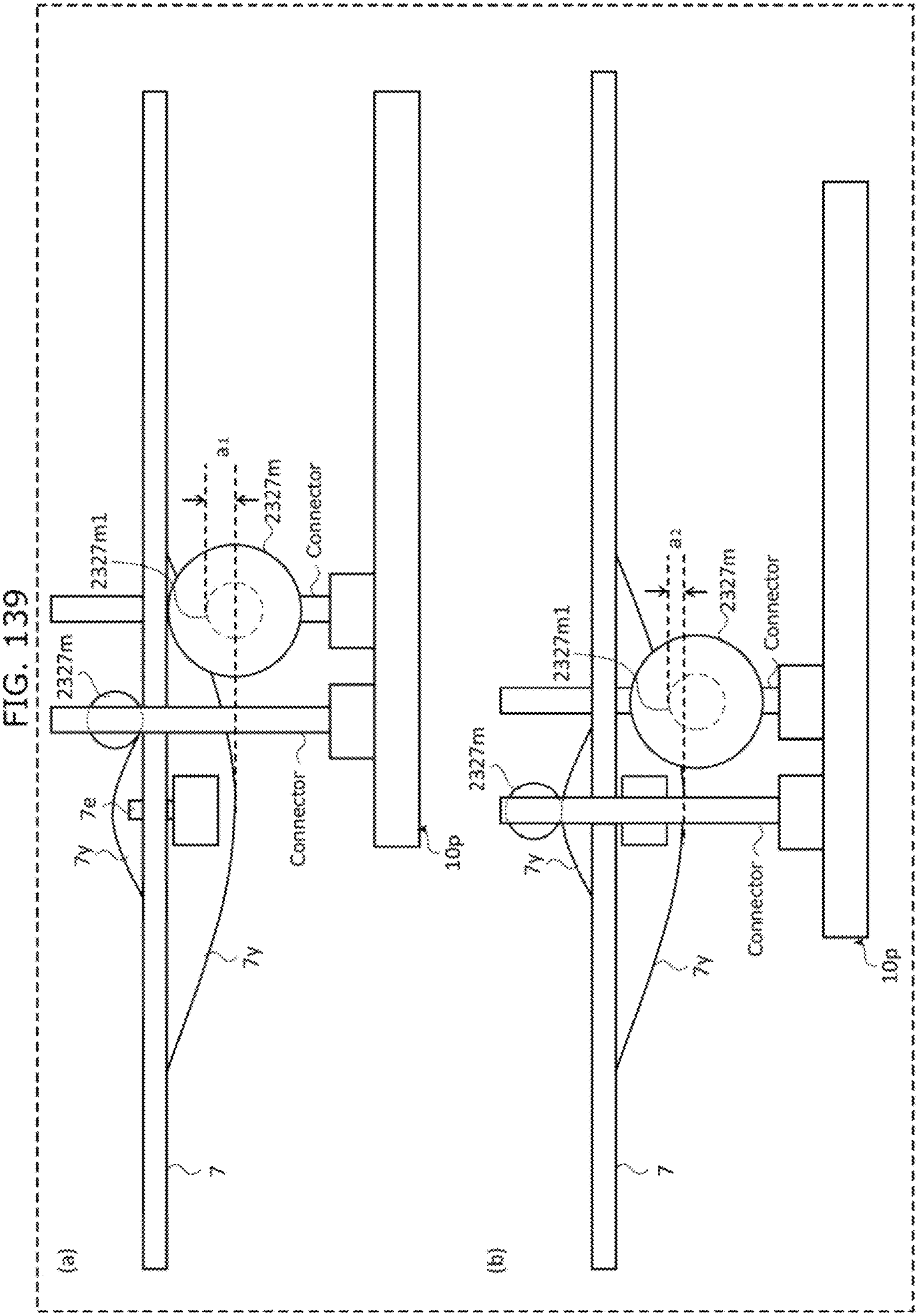

FIG. 139 illustrates an example of a package transport device according to Variation 1 of Embodiment 13 traveling over a hump.

Figure 140:
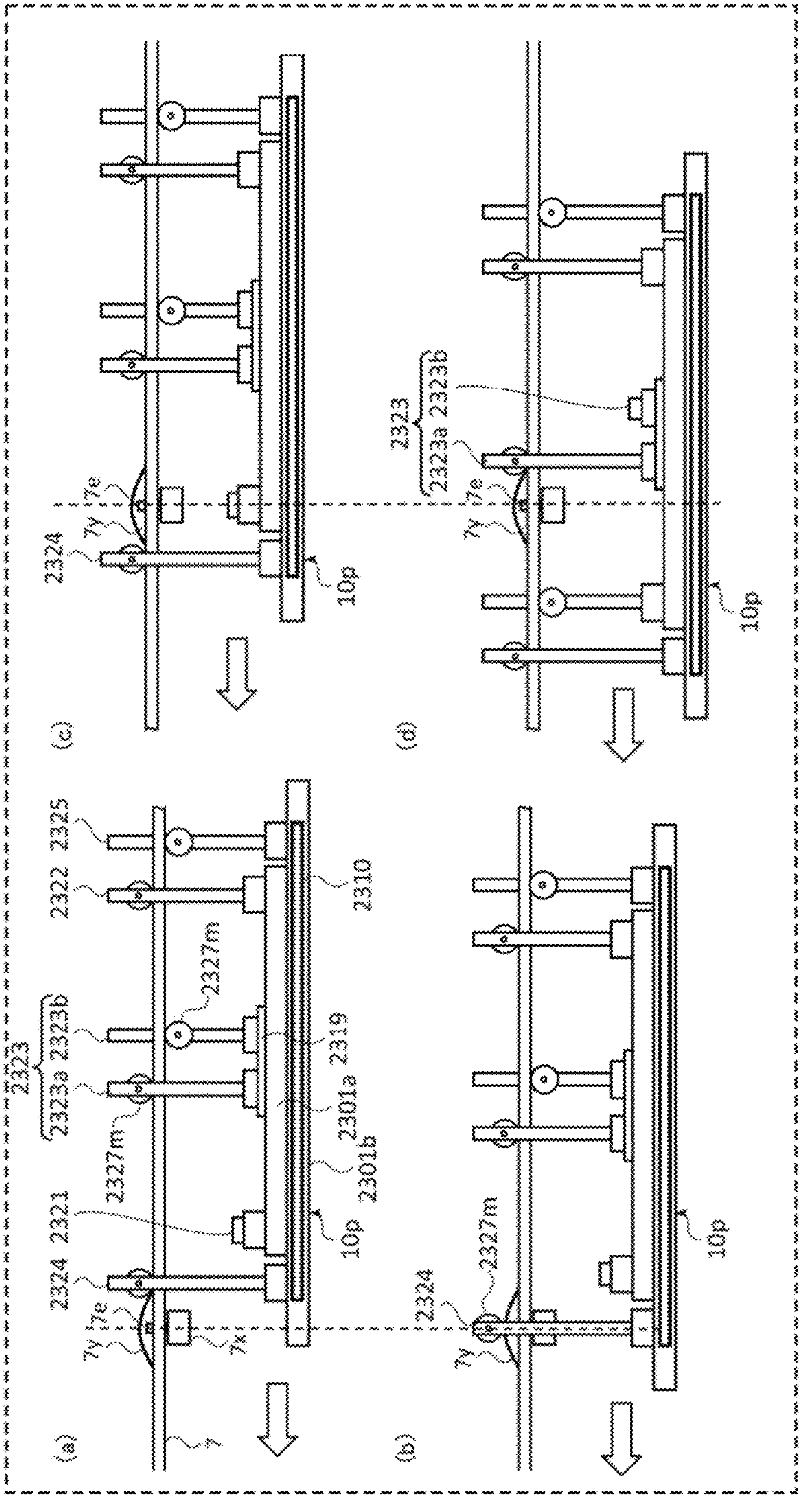

FIG. 140 illustrates an example of what happens to the connectors when the package transport device according to Variation 1 of Embodiment 13 travels over the hump.

Figure 141:
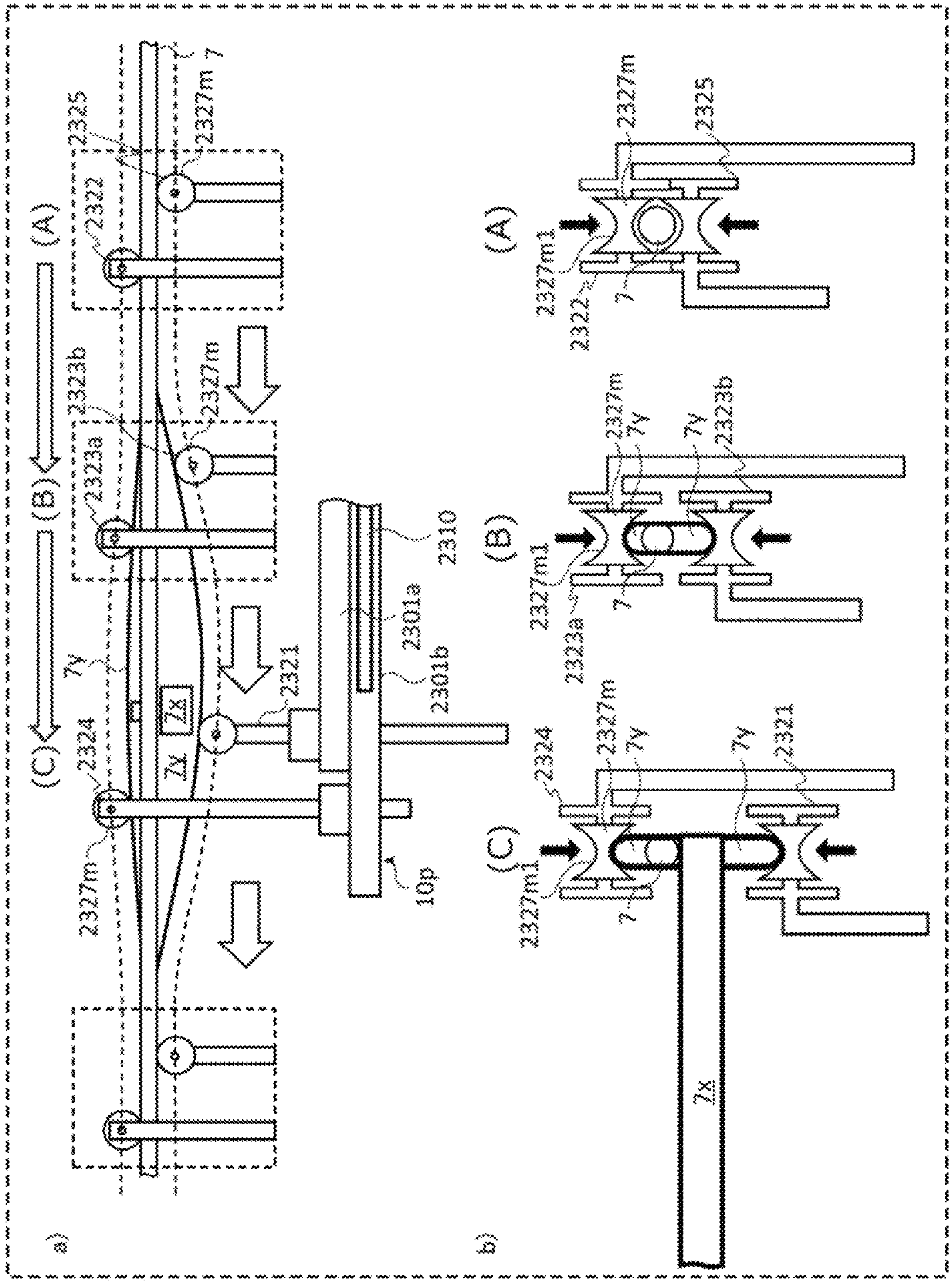

FIG. 141 illustrates an example of another package transport device according to Variation 2 of Embodiment 13.

Figure 142:
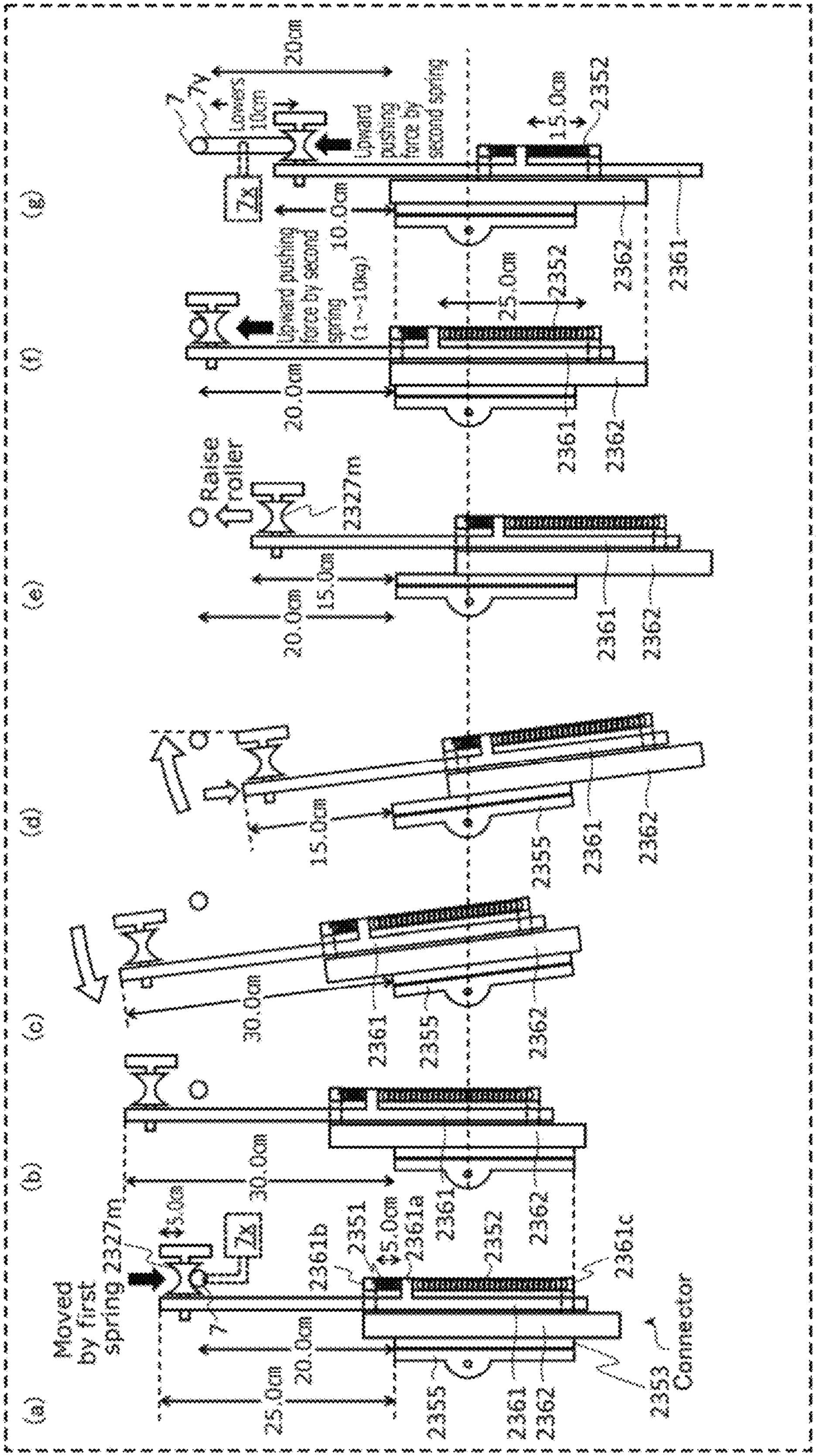

FIG. 142 illustrates an example of the positions of the connectors of the package transport device according to Variation 2 of Embodiment 13 being displaced.

Figure 143:
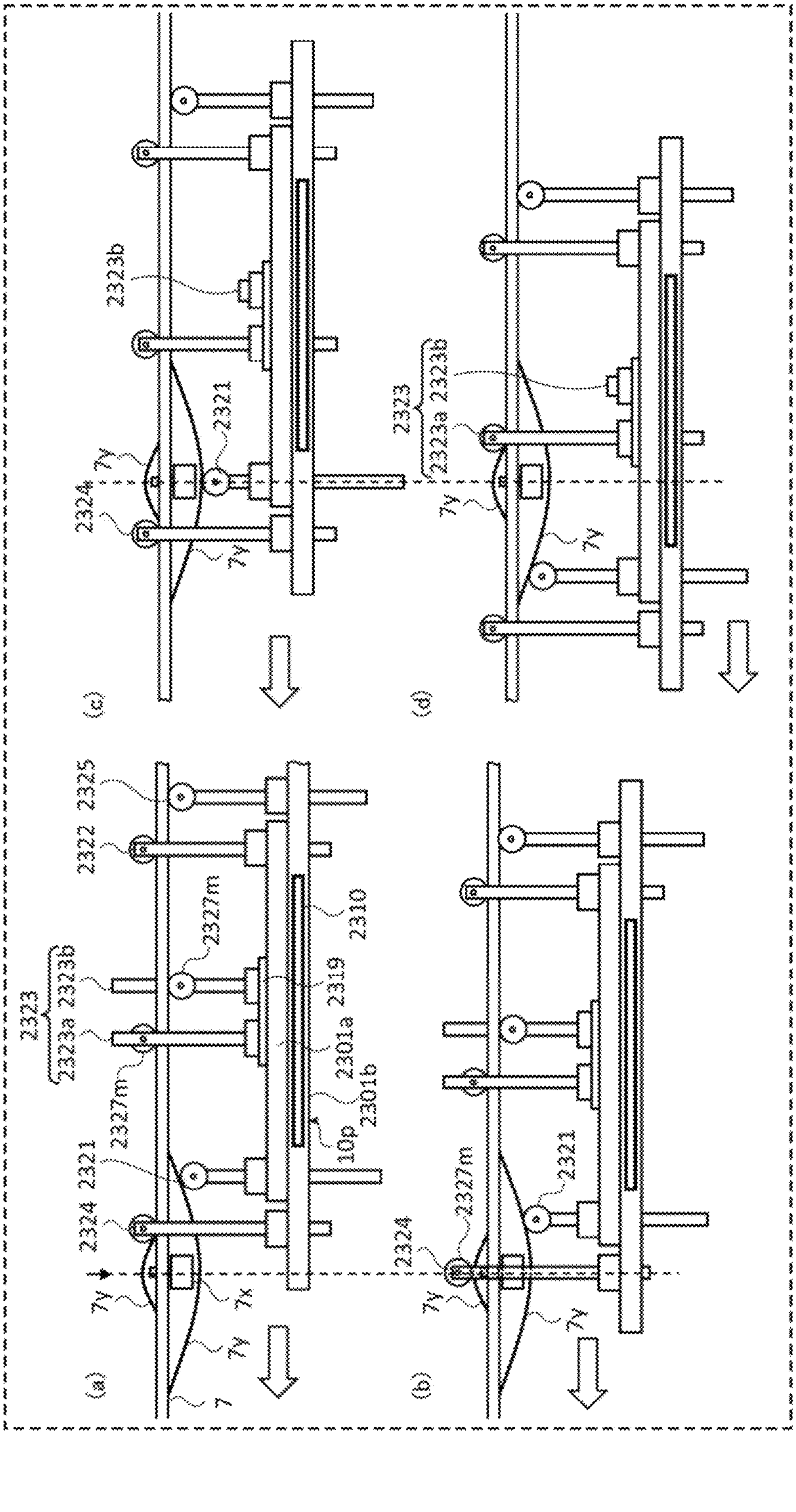

FIG. 143 illustrates an example of what happens to the connectors when a different package transport device according to Variation 2 of Embodiment 13 travels over a hump.

Figure 144:
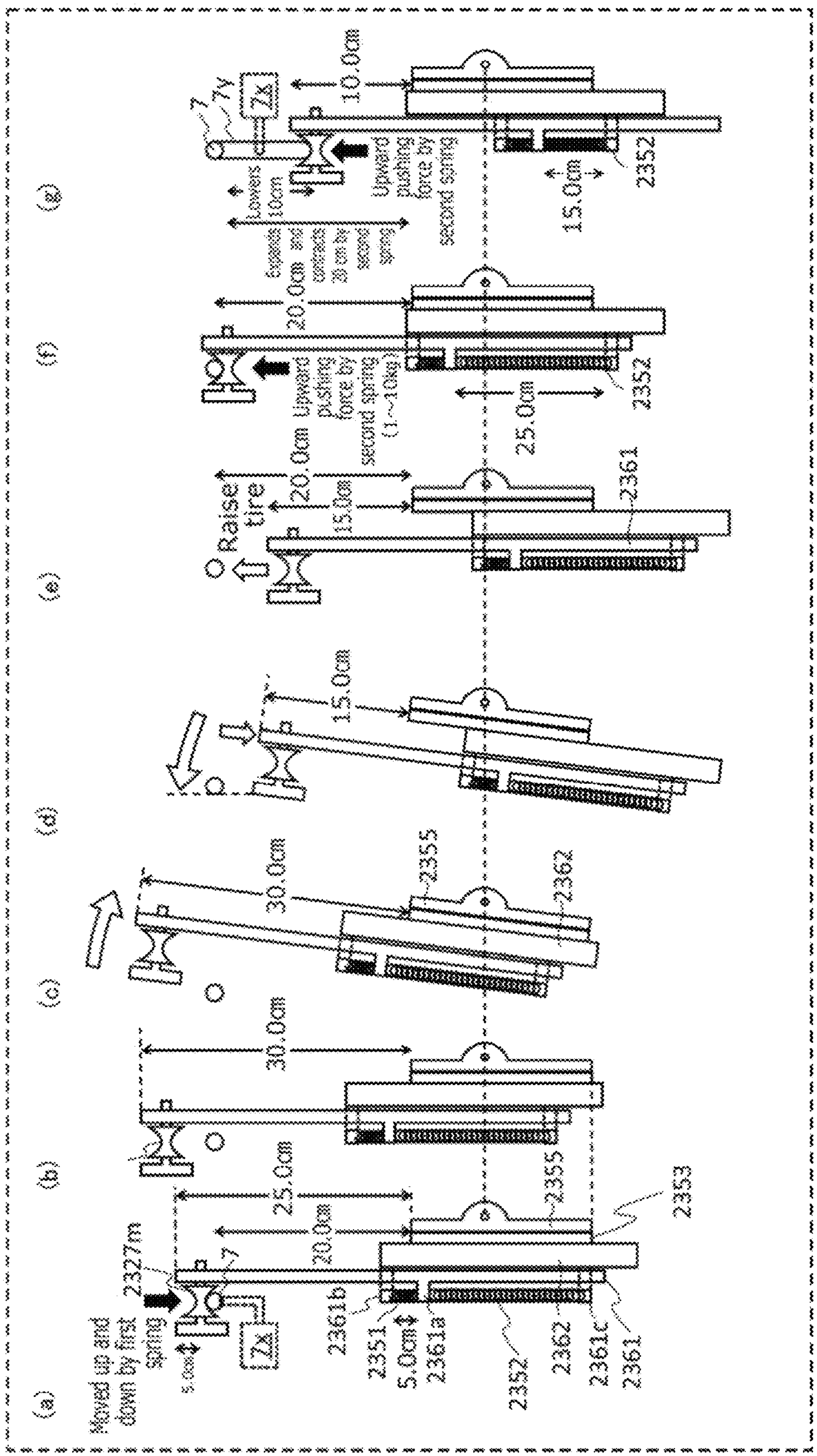

FIG. 144 illustrates another example of positions of the connectors of the package transport device according to Variation 2 of Embodiment 13 being displaced.

Figure 145:
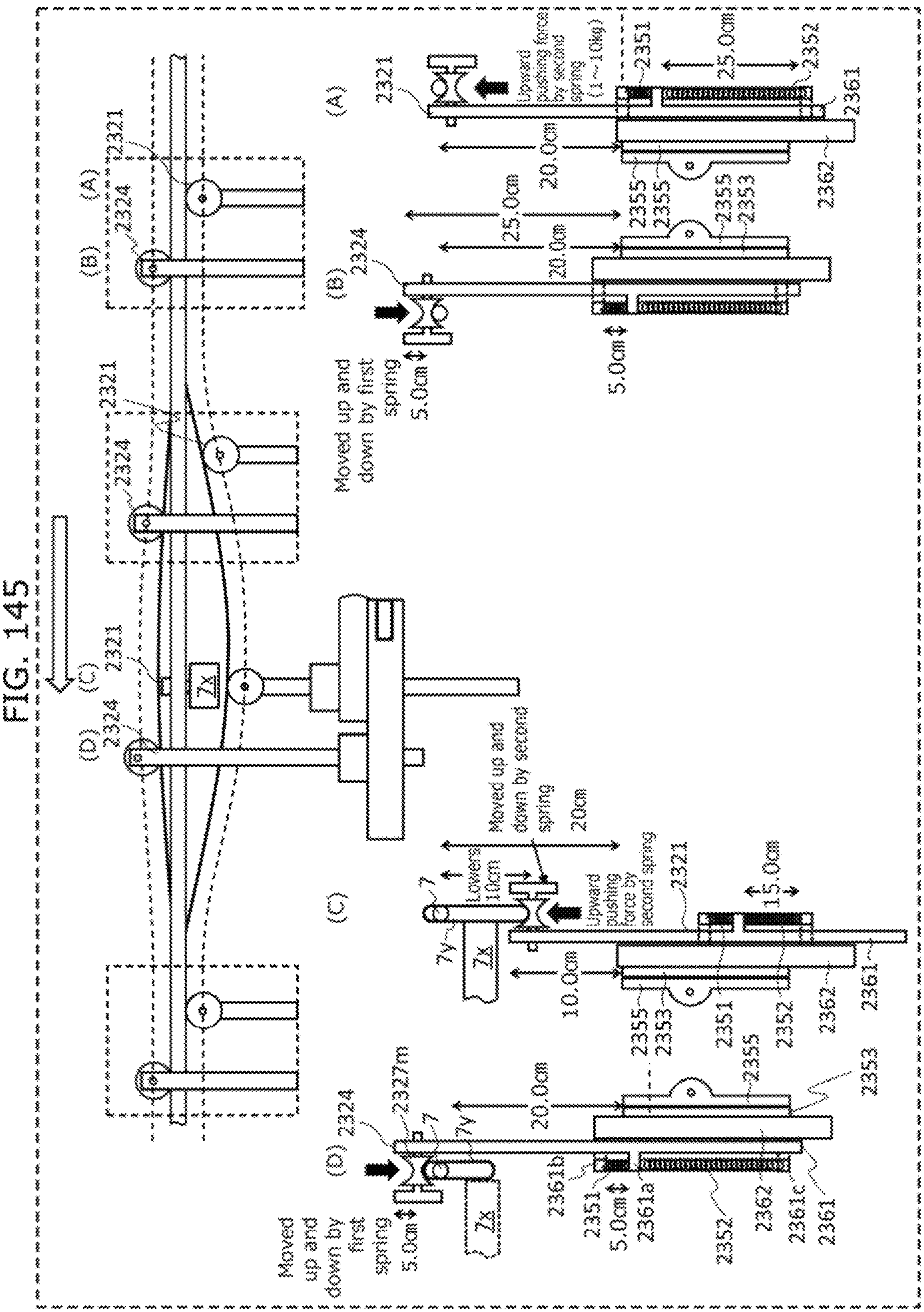

FIG. 145 illustrates a detailed example of what happens to the connectors when the package transport device according to Variation 2 of Embodiment 13 travels over the hump.

Figure 146:
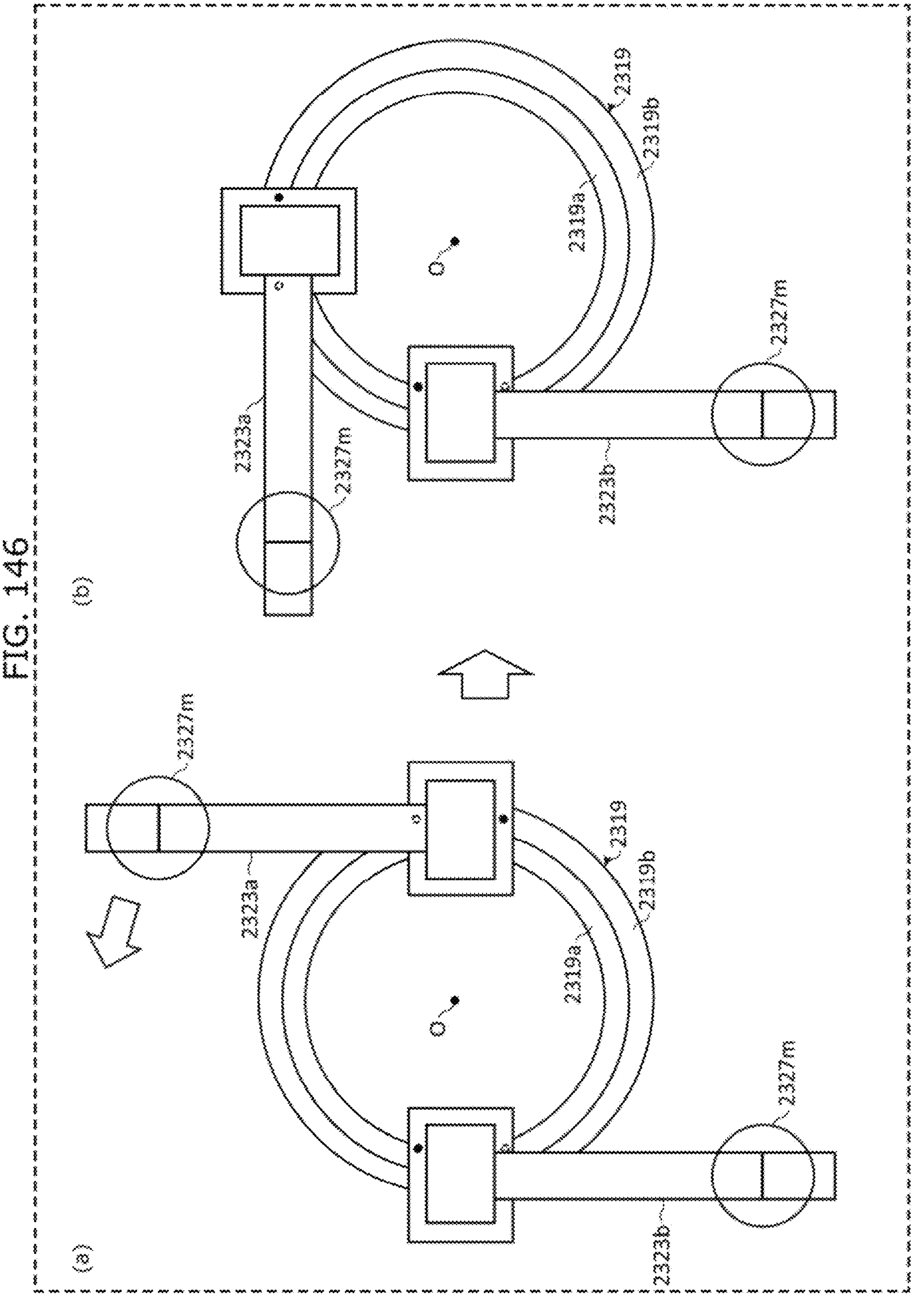

FIG. 146 illustrates an example of a turntable of a package transport device according to Variation 3 of Embodiment 13.

Figure 147:
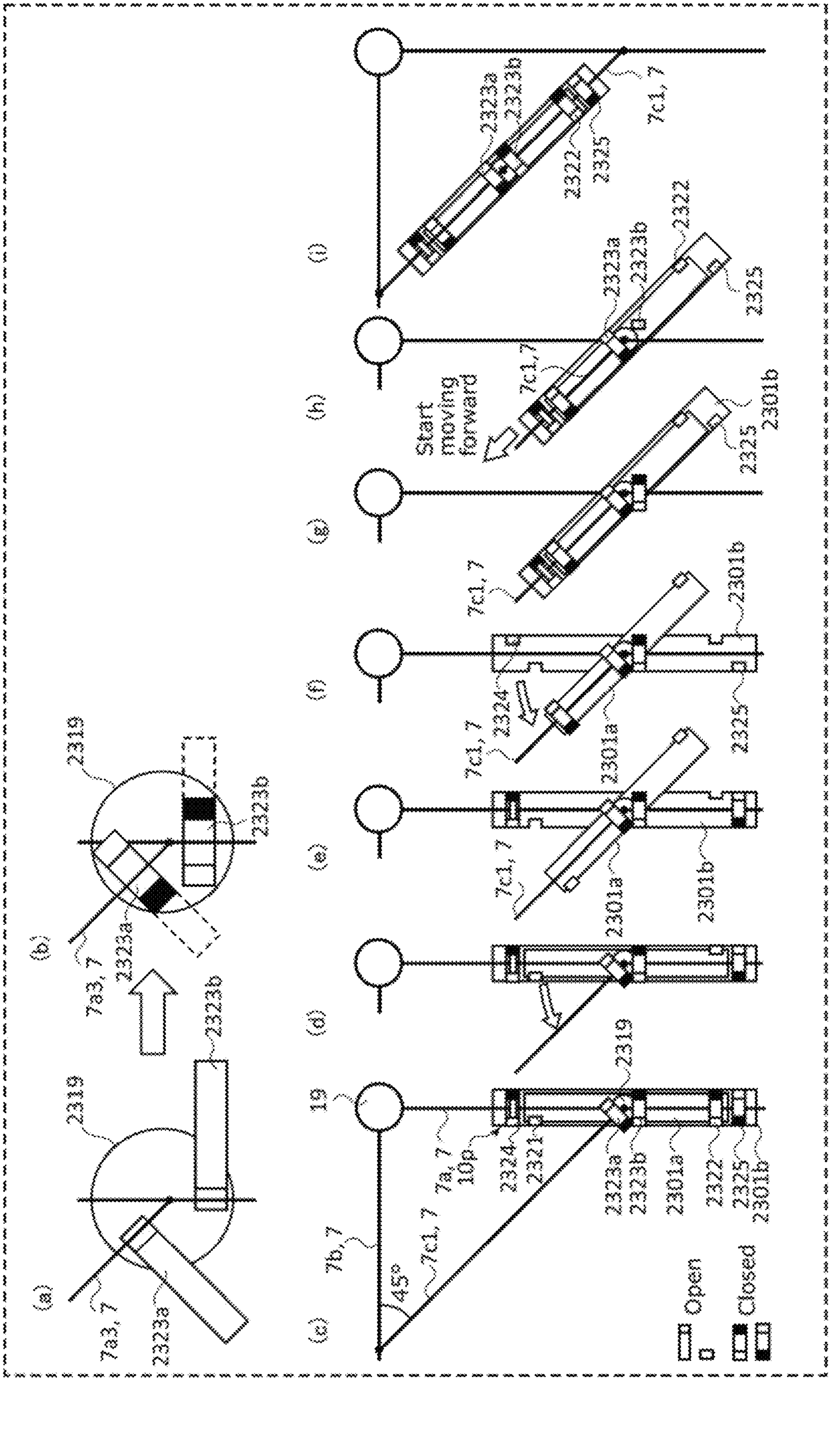

FIG. 147 illustrates an example of an operation carried out when the package transport device according to Variation 3 of Embodiment 13 turns left.

Figure 148:
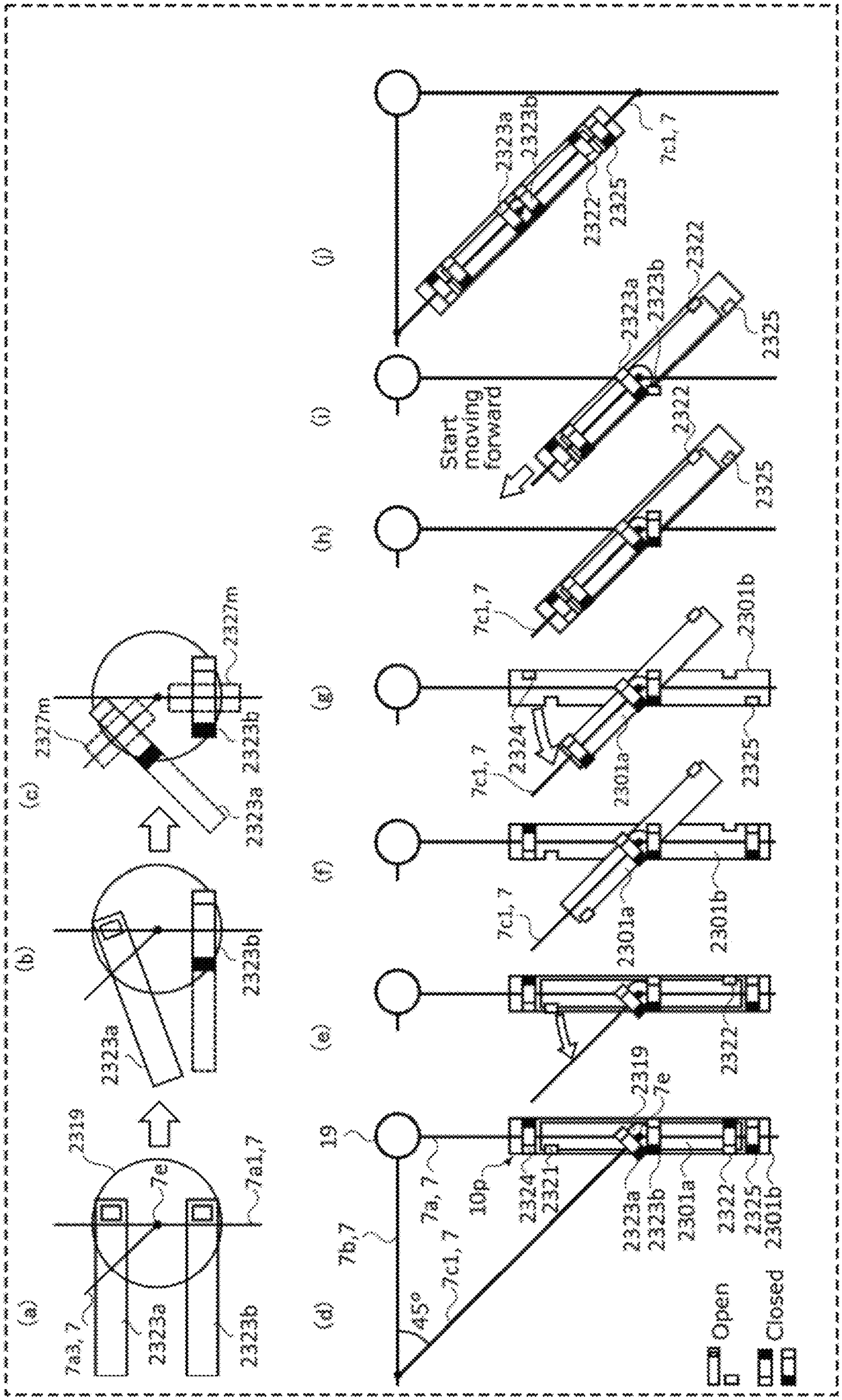

FIG. 148 illustrates another example of an operation carried out when the package transport device according to Variation 3 of Embodiment 13 turns left.

Figure 149:
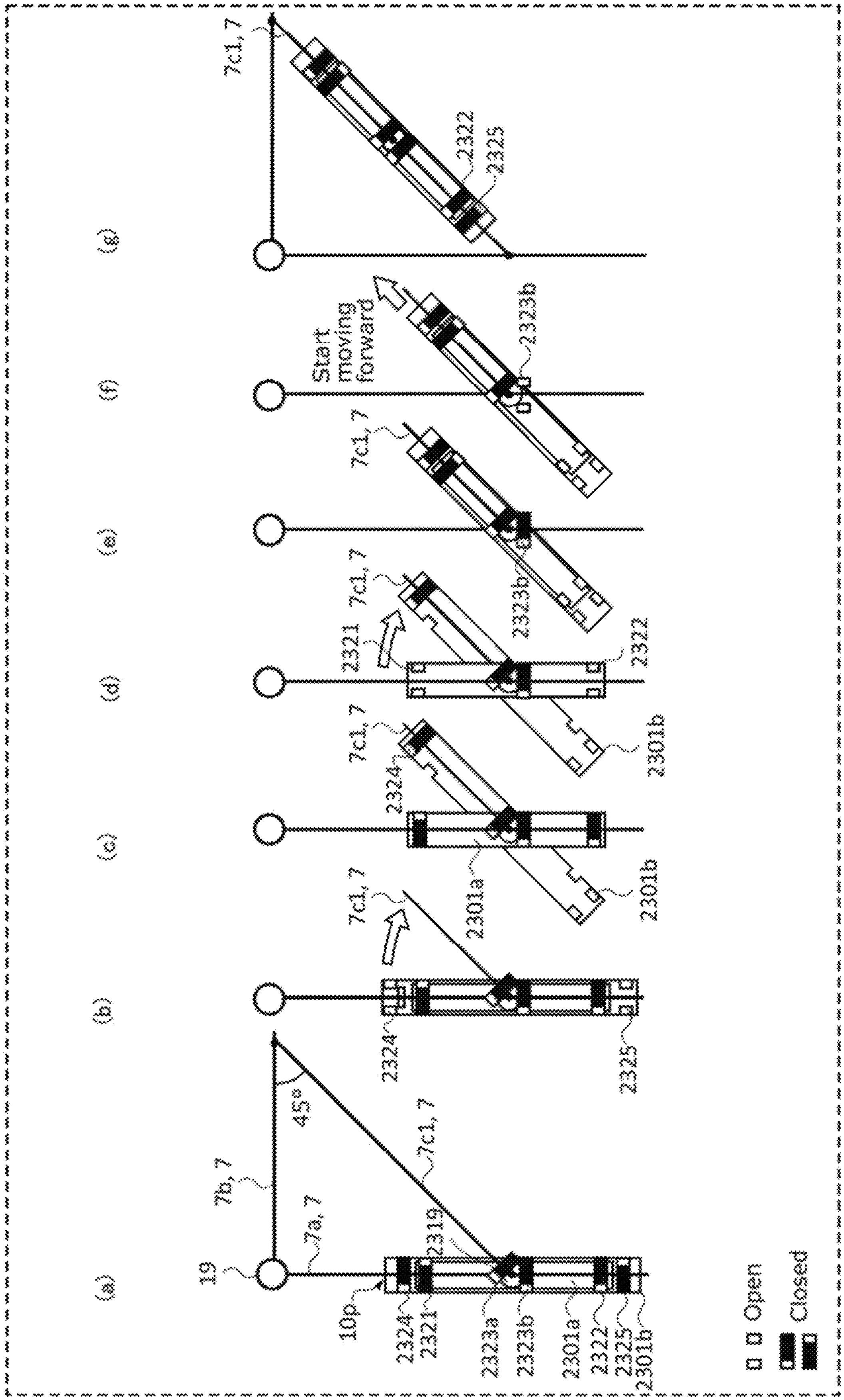

FIG. 149 illustrates an example of an operation carried out when the package transport device according to Variation 3 of Embodiment 13 turns right.

Figure 150:
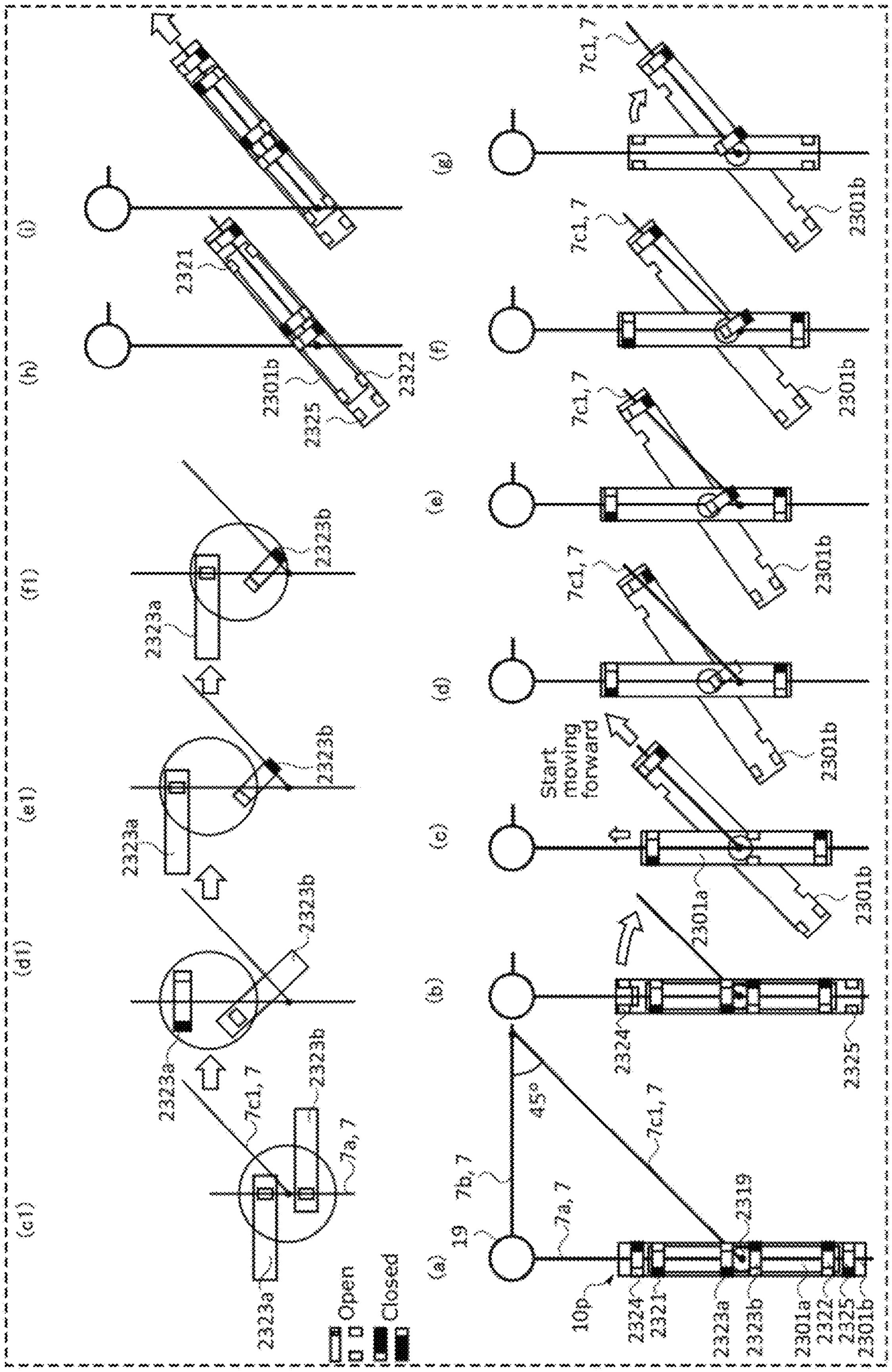

FIG. 150 illustrates an example of an operation carried out when another package transport device according to Variation 3 of Embodiment 13 turns right.

Figure 151:
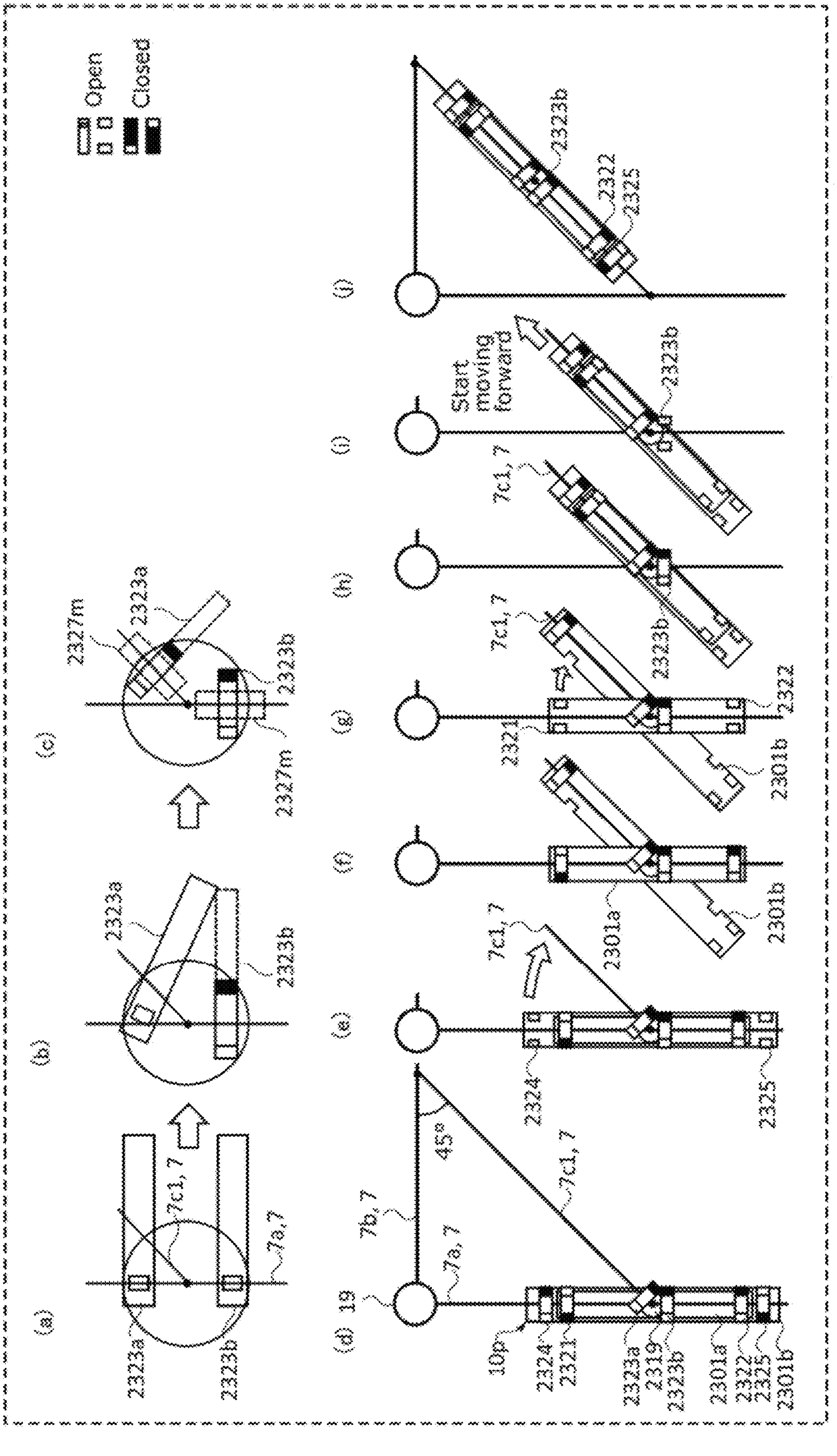

FIG. 151 illustrates an example of another operation carried out when the package transport device according to Variation 3 of Embodiment 13 turns right.

Figure 152A:
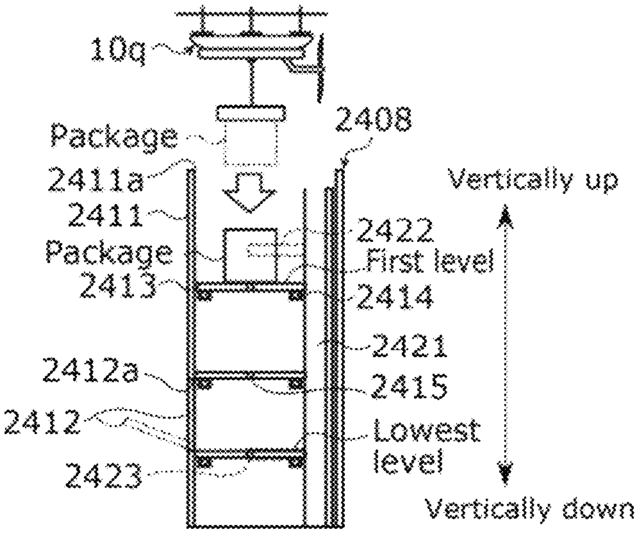

FIG. 152A illustrates an example of a package transport device and a delivery box according to Embodiment 14.

Figure 152B:
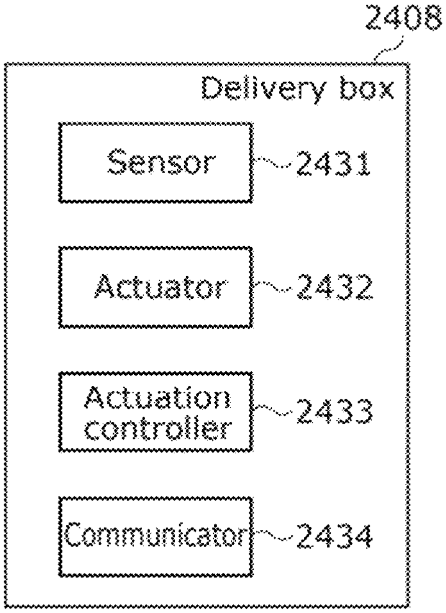

FIG. 152B is a block diagram illustrating an example of the delivery box according to Embodiment 14.

Figure 152C:
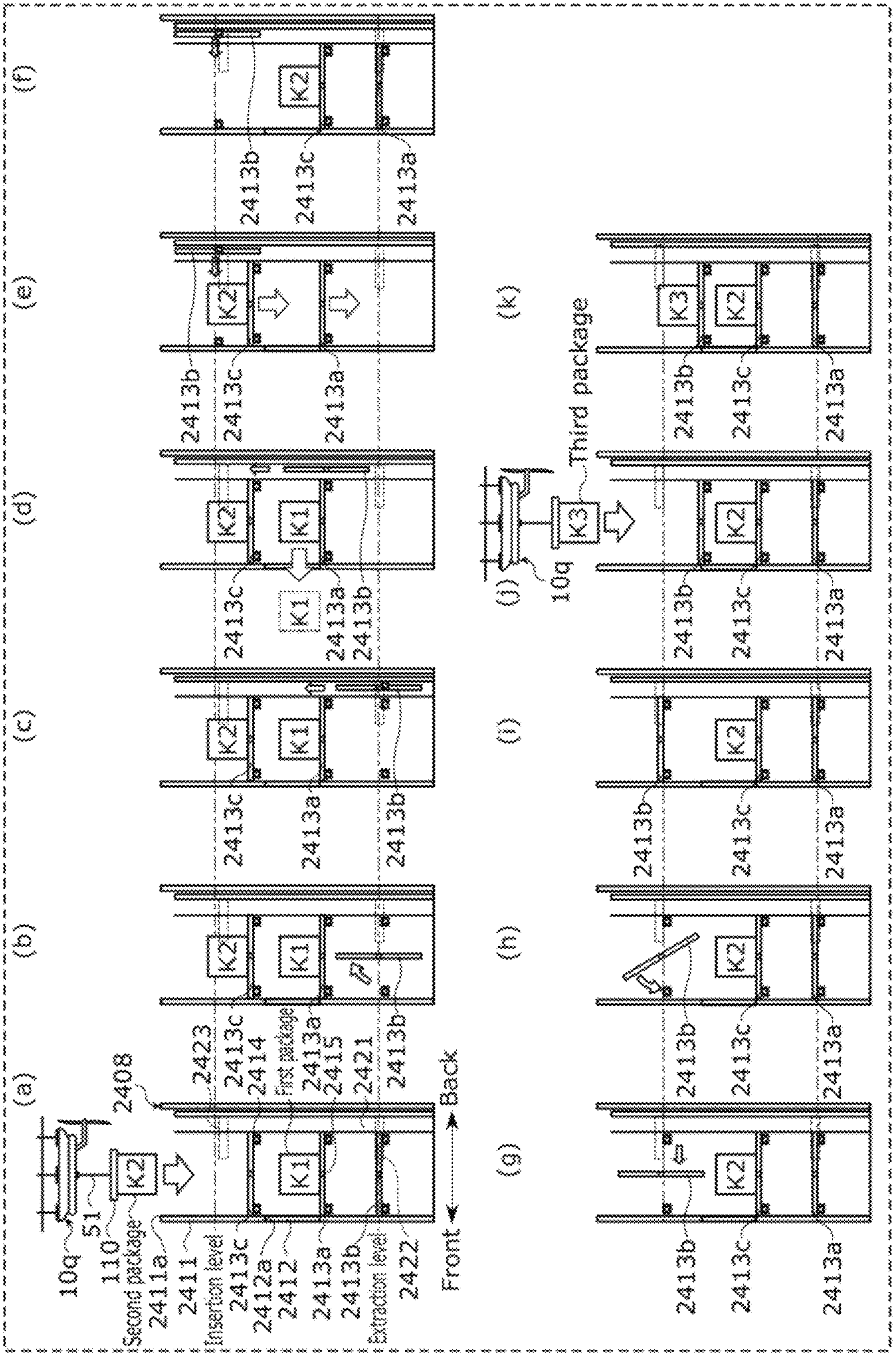

FIG. 152C illustrates an example of how the delivery box according to Operation Example 1 of Embodiment 14 moves when viewed from the side.

Figure 152D:
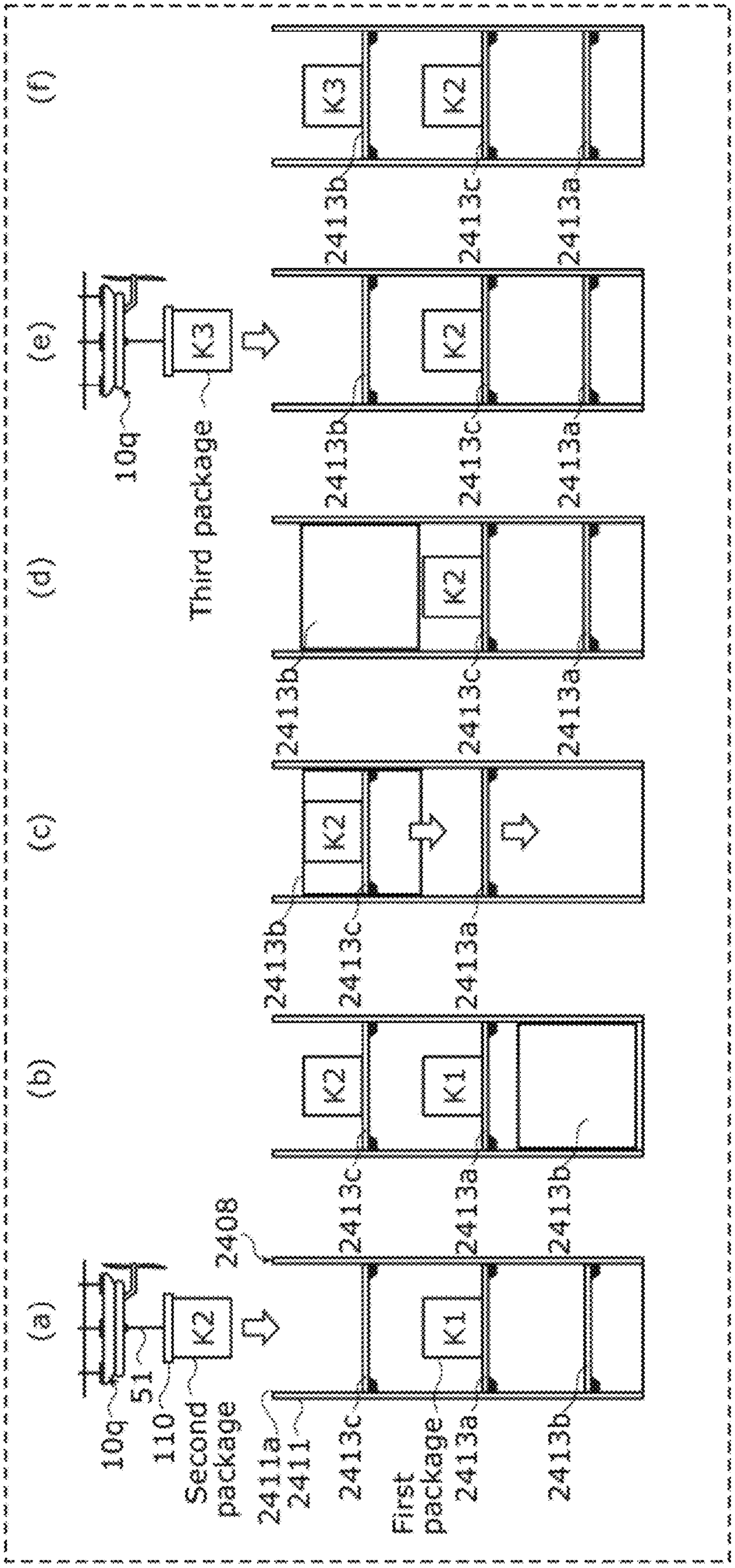

FIG. 152D illustrates an example of how the delivery box according to Operation Example 1 of Embodiment 14 moves when viewed from the front.

Figure 152E:
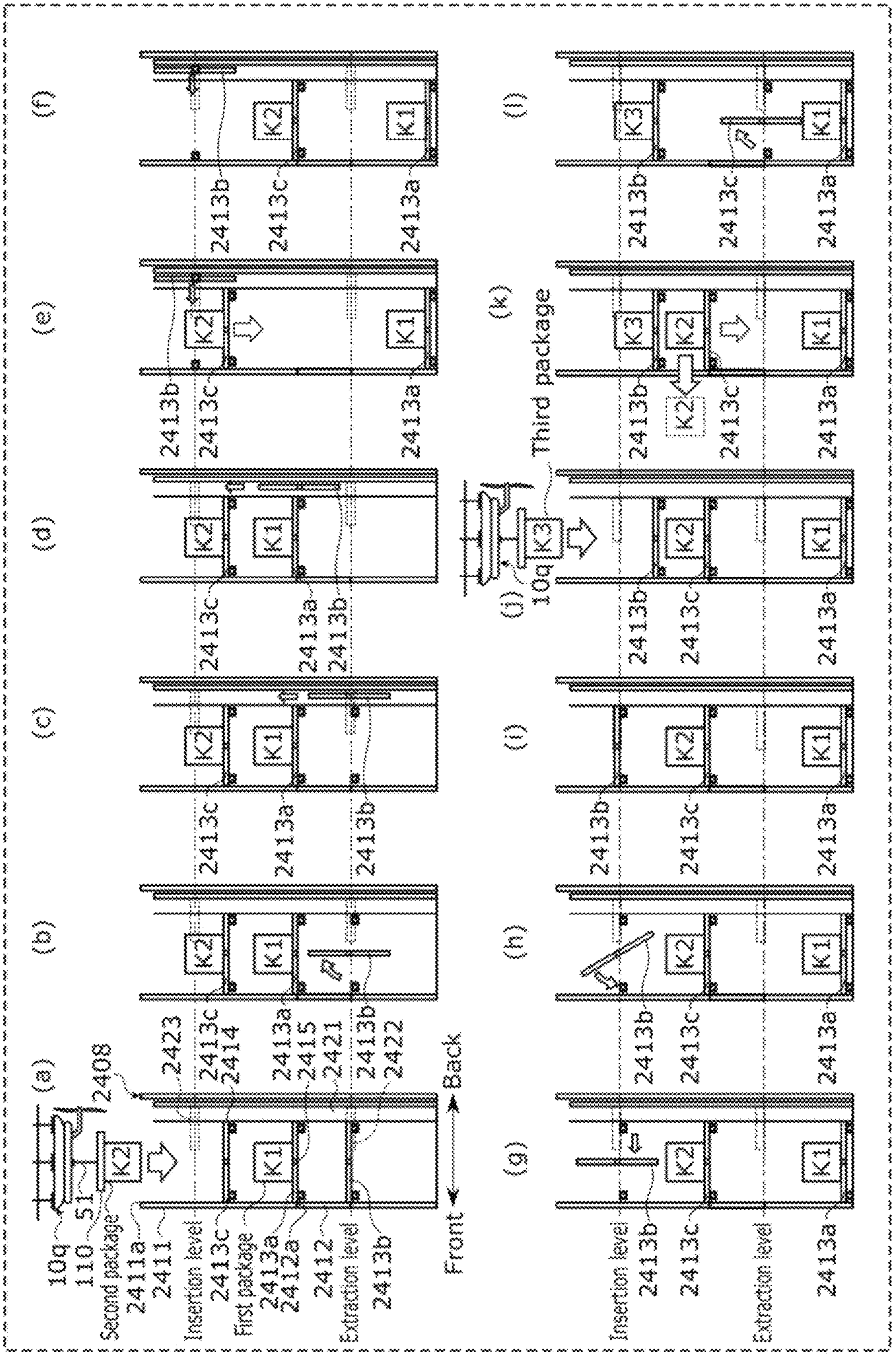

FIG. 152E illustrates an example of how the delivery box according to Operation Example 2 of Embodiment 14 moves when viewed from the side.

Figure 152F:
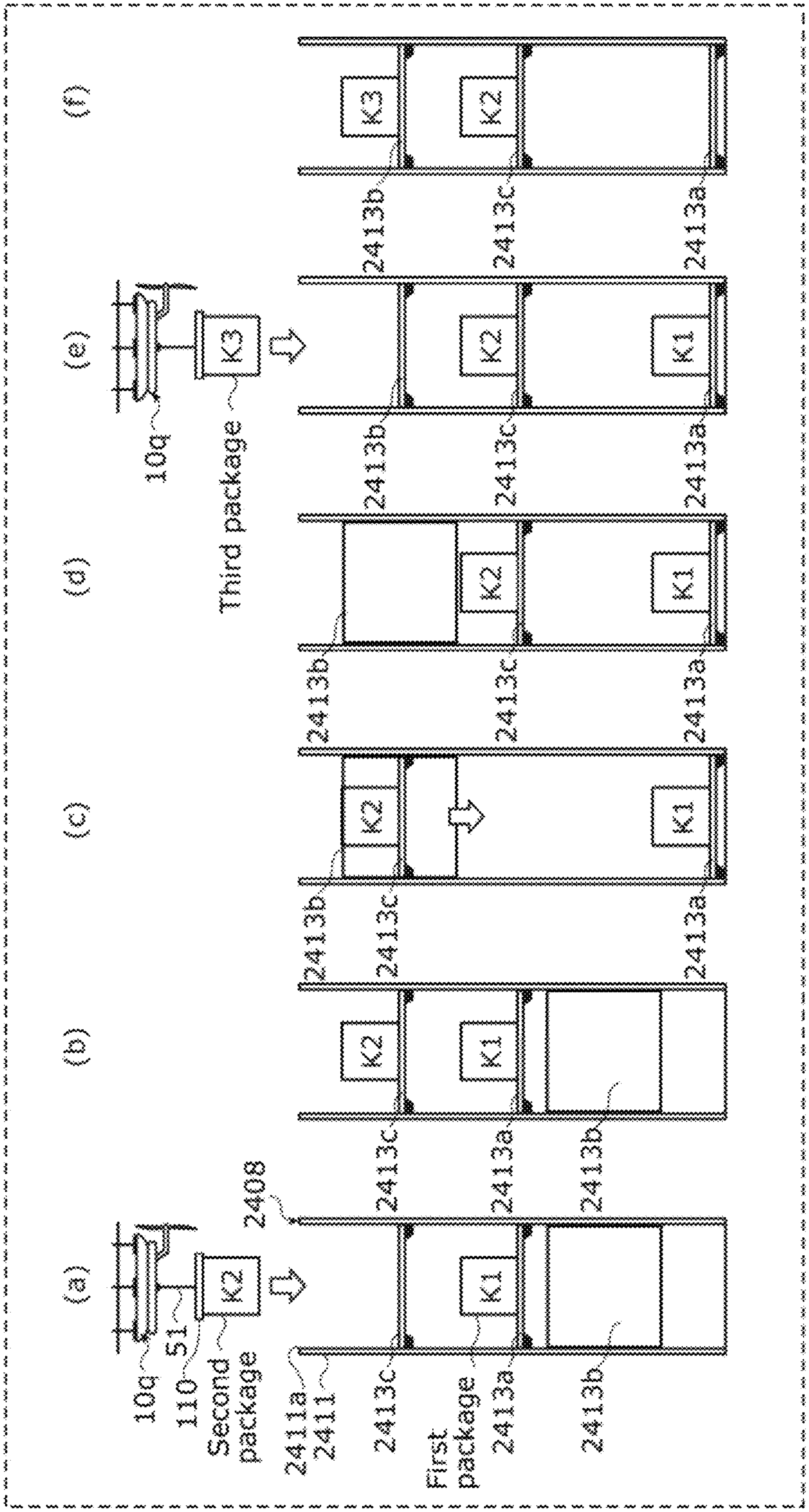

FIG. 152F illustrates an example of how the delivery box according to Operation Example 2 of Embodiment 14 moves when viewed from the front.

Figure 152G:
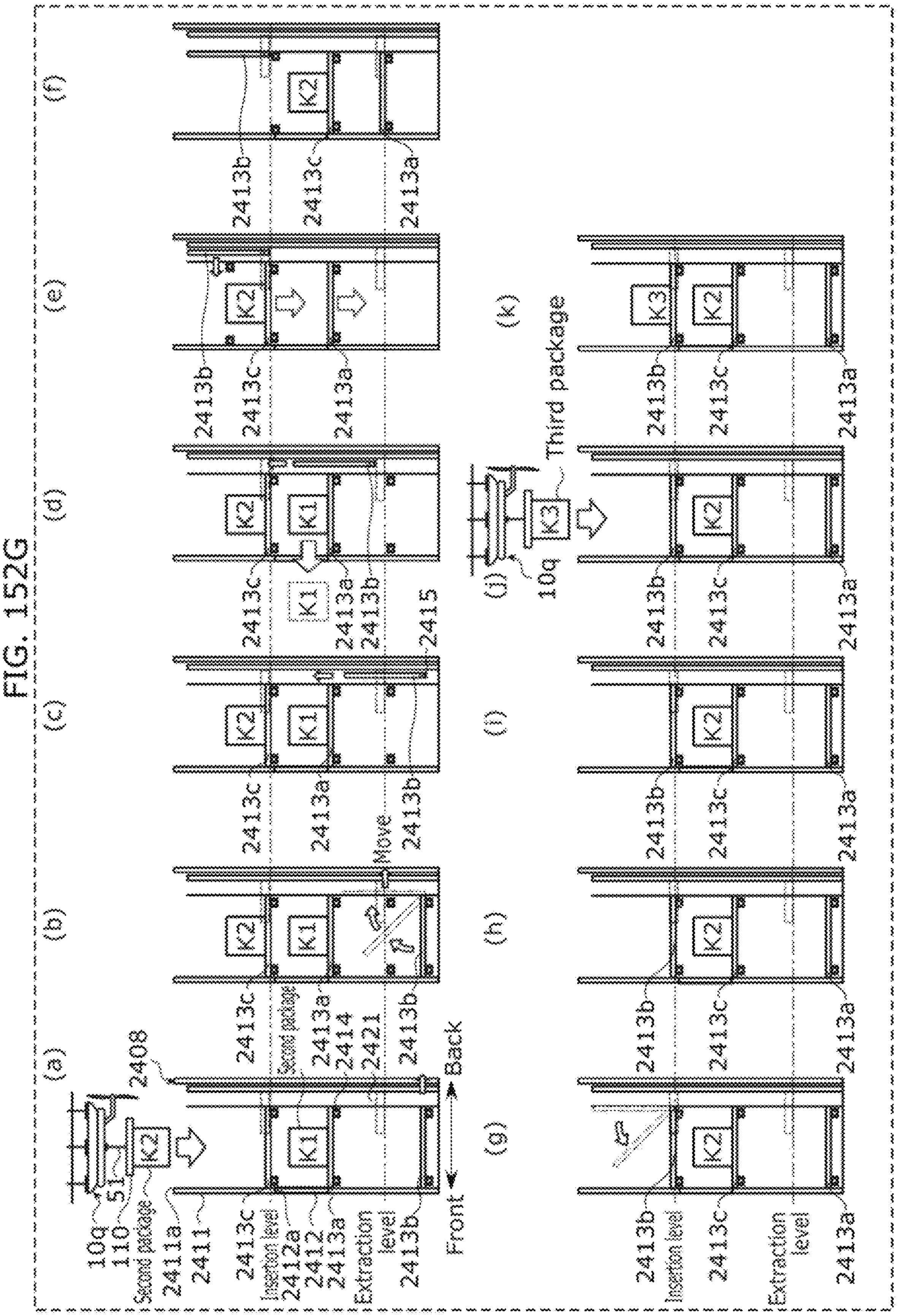

FIG. 152G illustrates an example of how the delivery box according to Operation Example 3 of Embodiment 14 moves when viewed from the side.

Figure 152H:
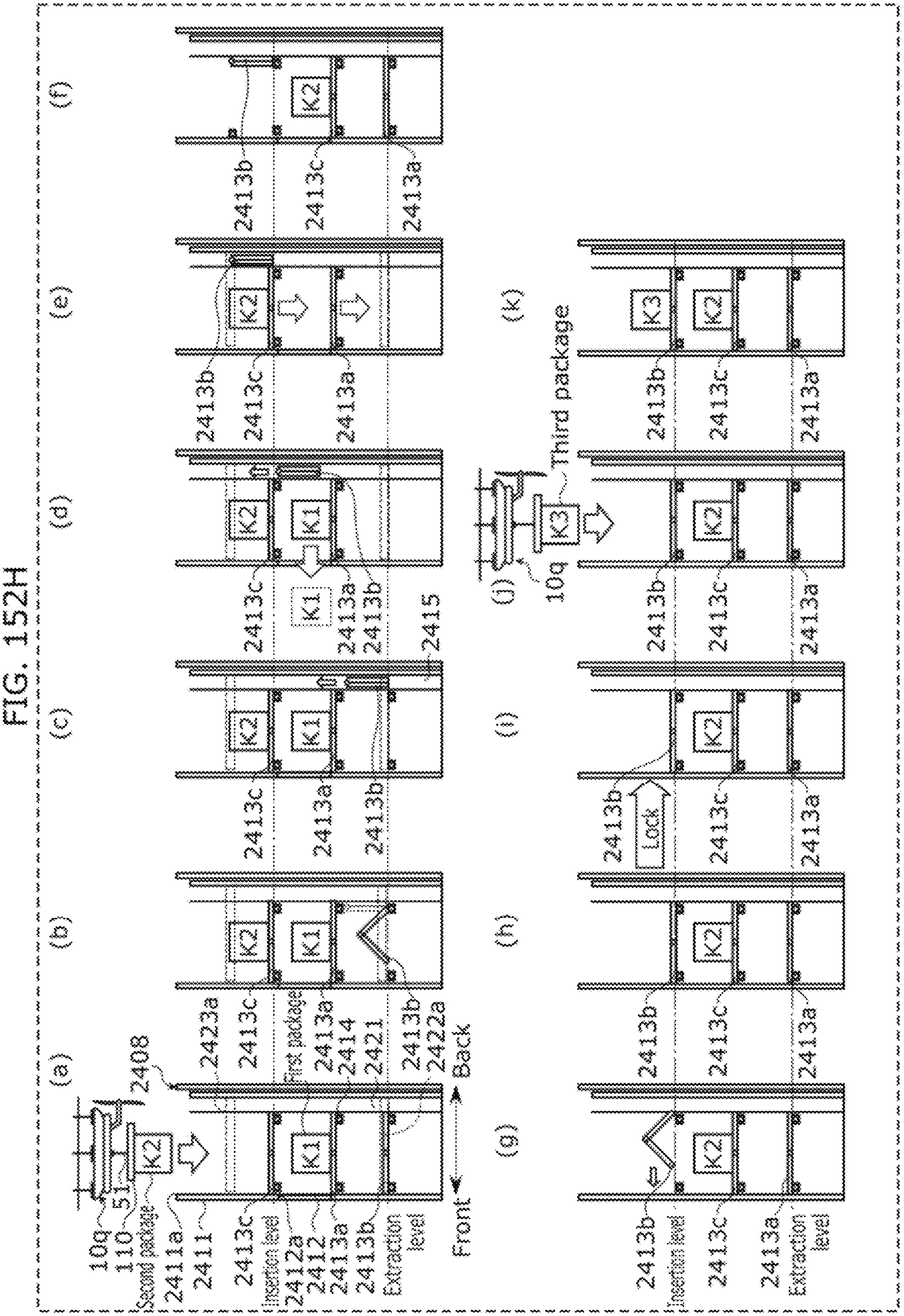

FIG. 152H illustrates an example of how the delivery box according to Operation Example 4 of Embodiment 14 moves when viewed from the side.

Figure 152I:
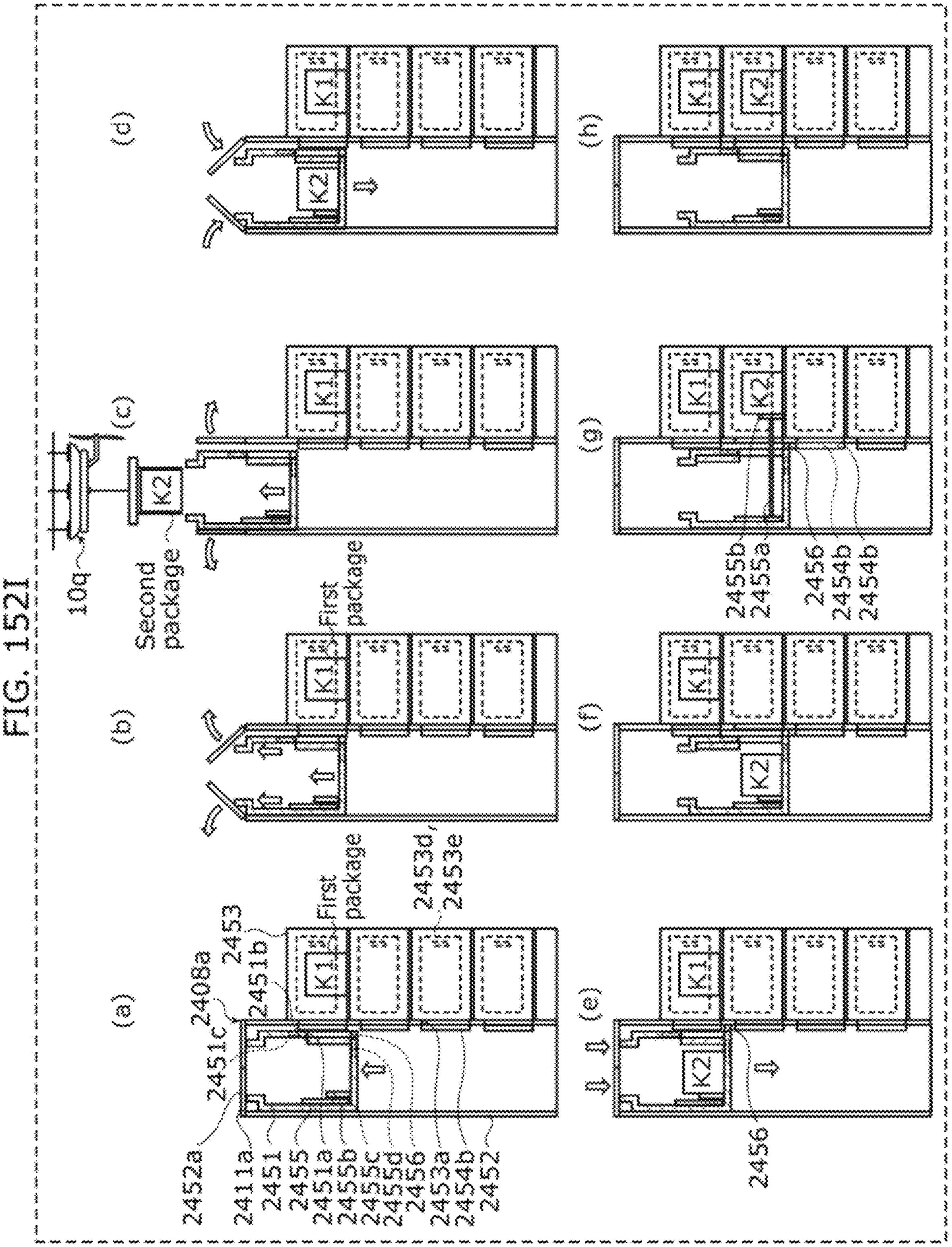

FIG. 152I illustrates an example of how a delivery box according to a variation of Embodiment 14 moves when viewed from the side.

Figure 153A:
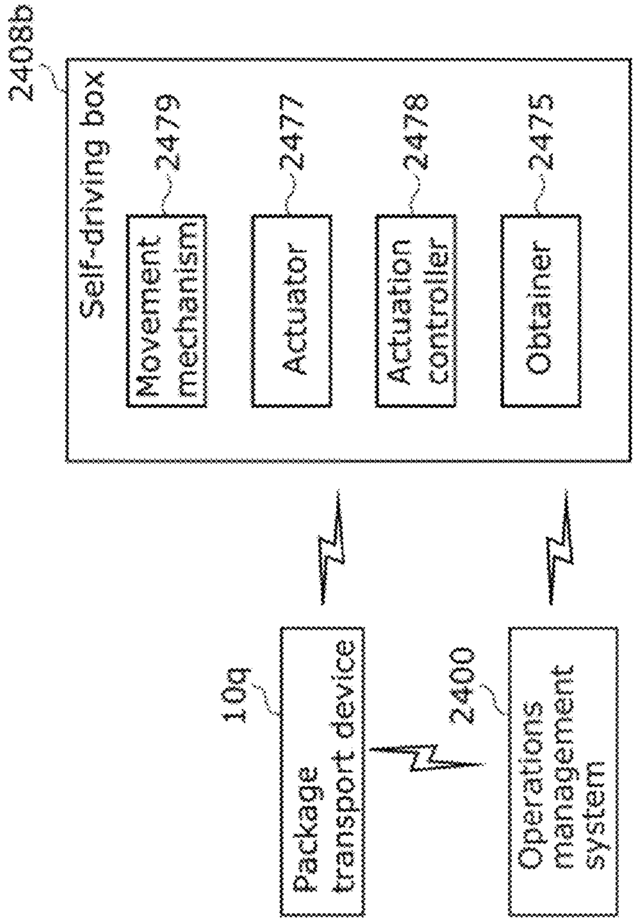

FIG. 153A is a block diagram illustrating a self-driving box and an operations management system according to Embodiment 15.

Figure 153B:
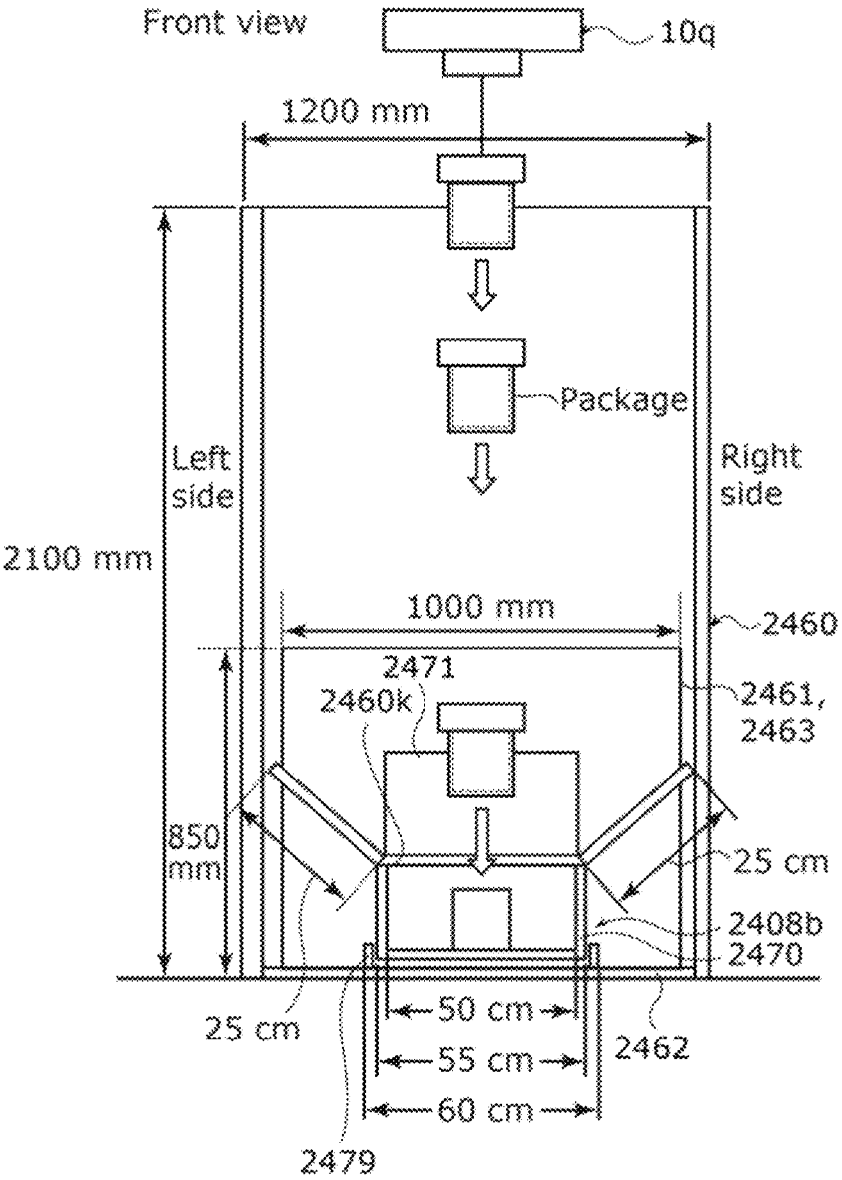

FIG. 153B is a front view illustrating an example of the self-driving box according to Embodiment 15 when viewed from the front.

Figure 153C:
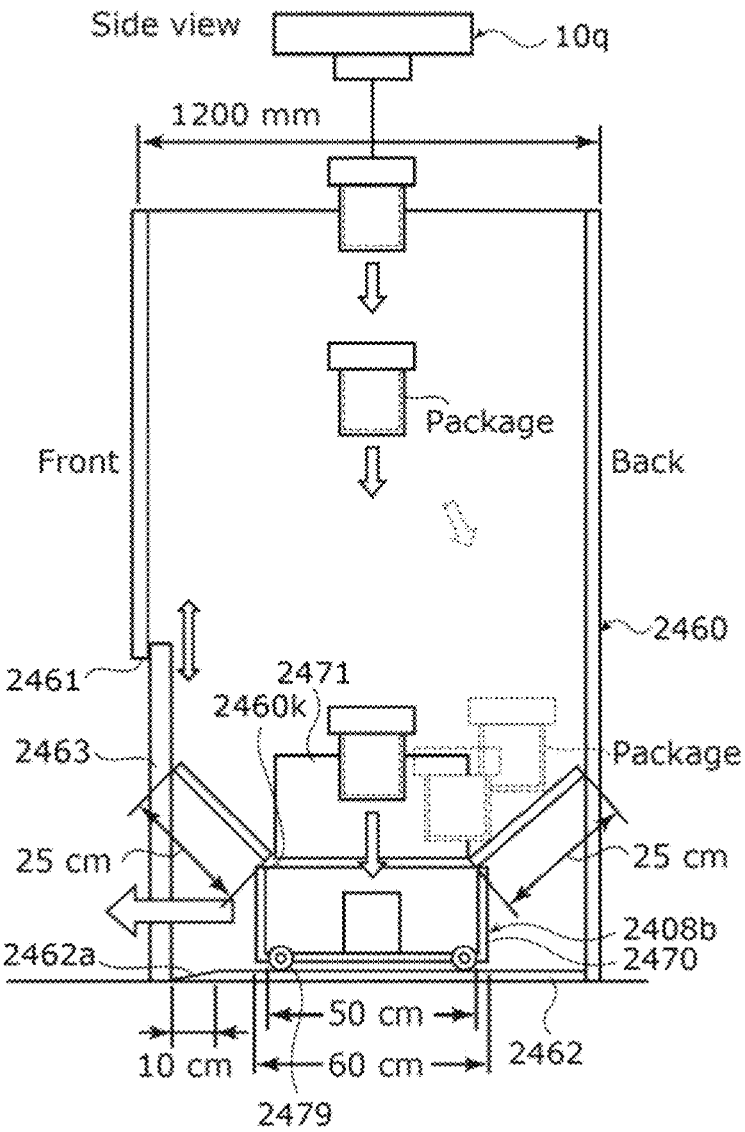

FIG. 153C is a side view illustrating an example of the self-driving box according to Embodiment 15 when viewed from the side.

Figure 154:
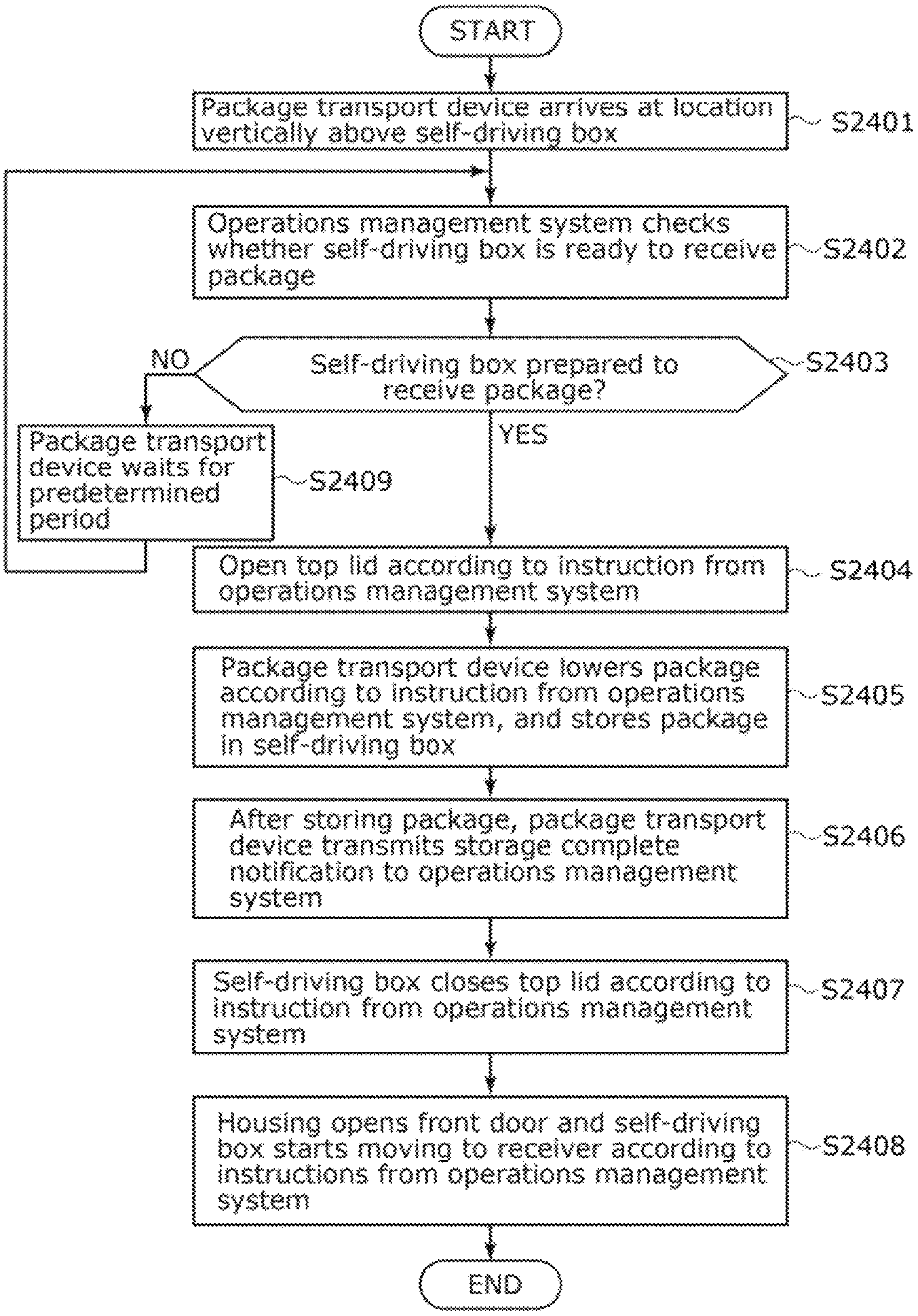

FIG. 154 is a flowchart illustrating an example of an operation of the self-driving box according to Embodiment 15.

Figure 155:
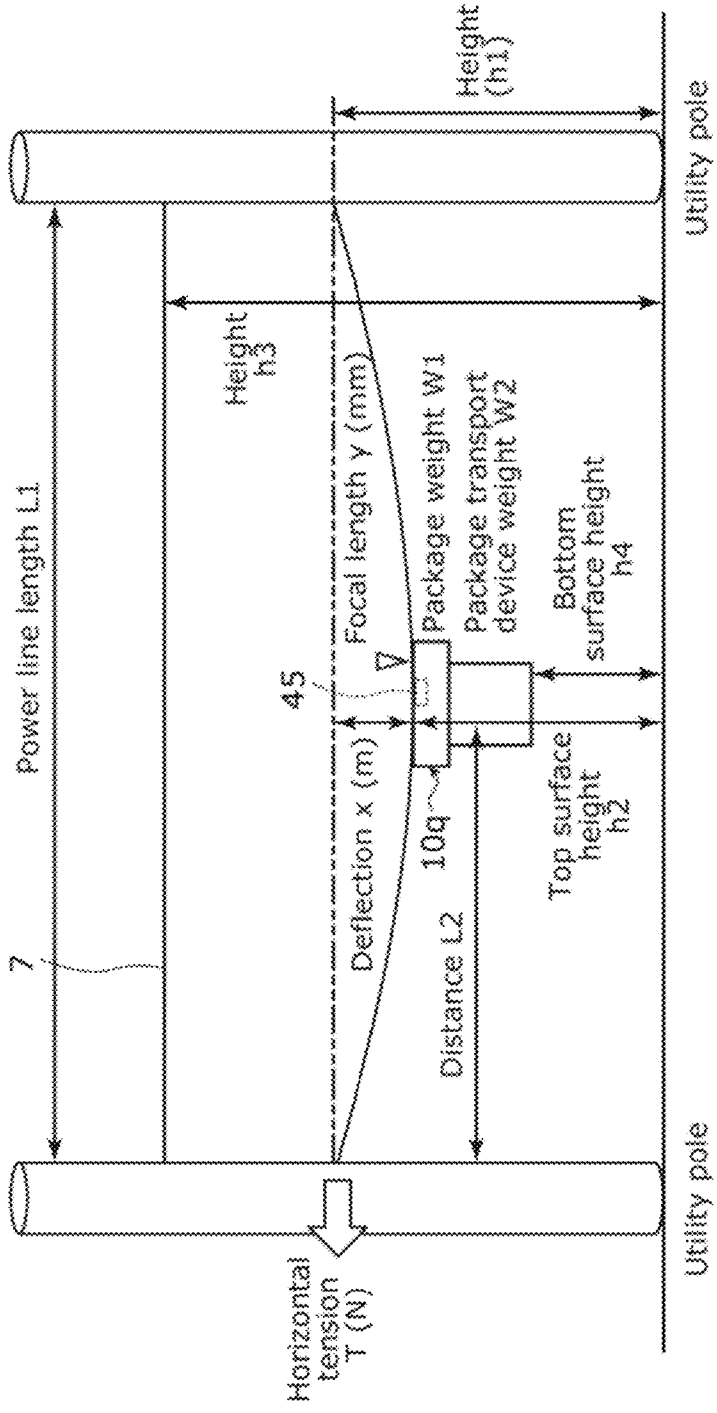

FIG. 155 illustrates an example of the relationship between a package transport device and a power line according to Embodiment 16.

Figure 156A:
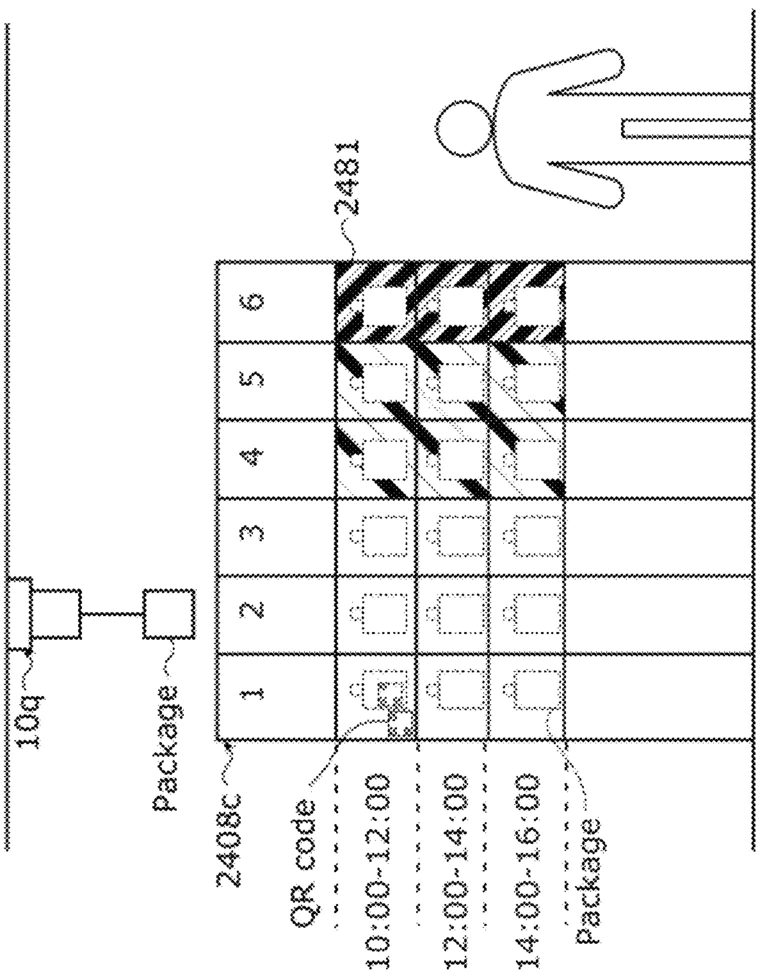

FIG. 156A is a front view of a shipment box according to Embodiment 17.

Figure 156B:
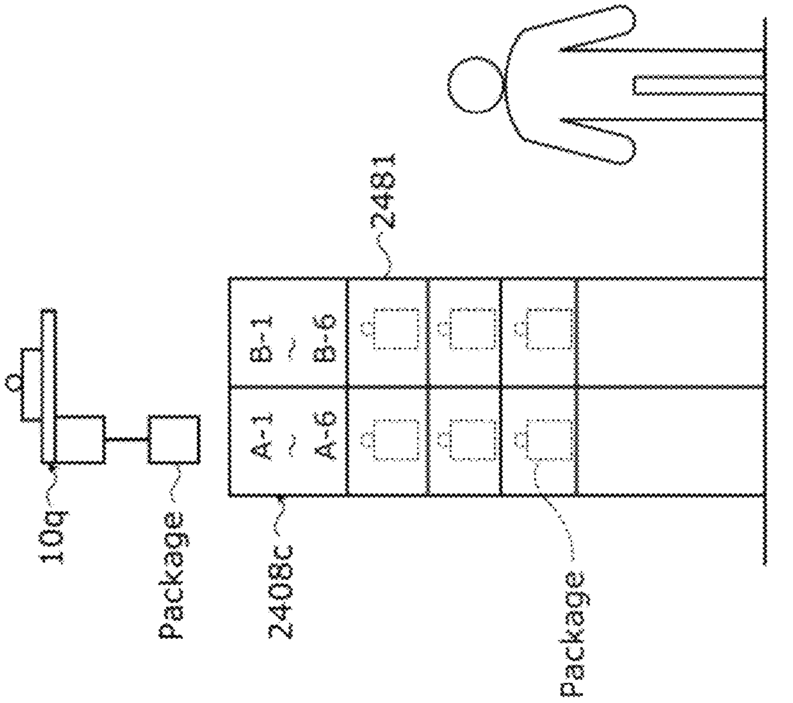

FIG. 156B is a side view of the shipment box according to Embodiment 17.

Figure 156C:
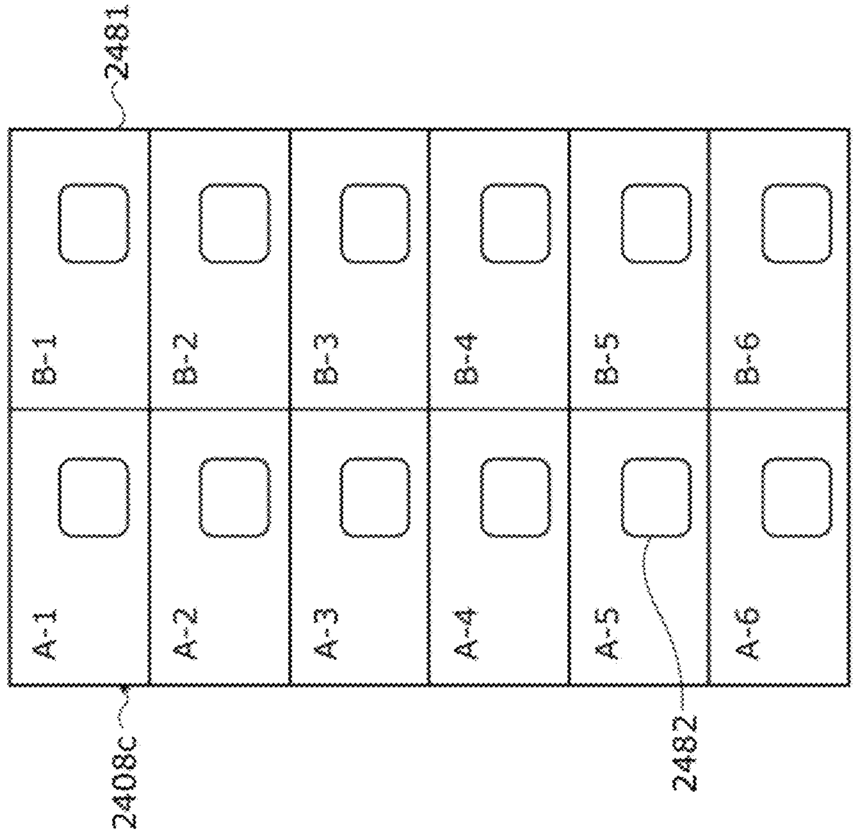

FIG. 156C is a top view of the shipment box according to Embodiment 17.

Figure 157:
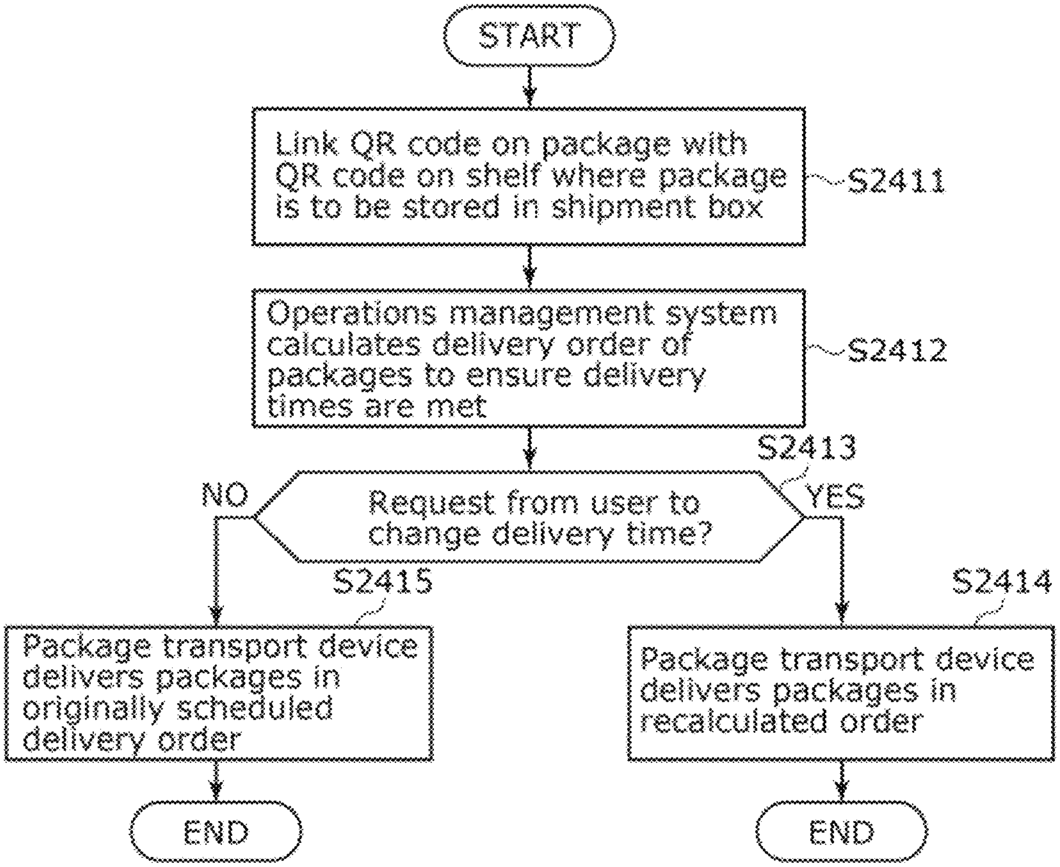

FIG. 157 is a flowchart illustrating an example of an operation of the shipment box according to Embodiment 17.

Figure 158:
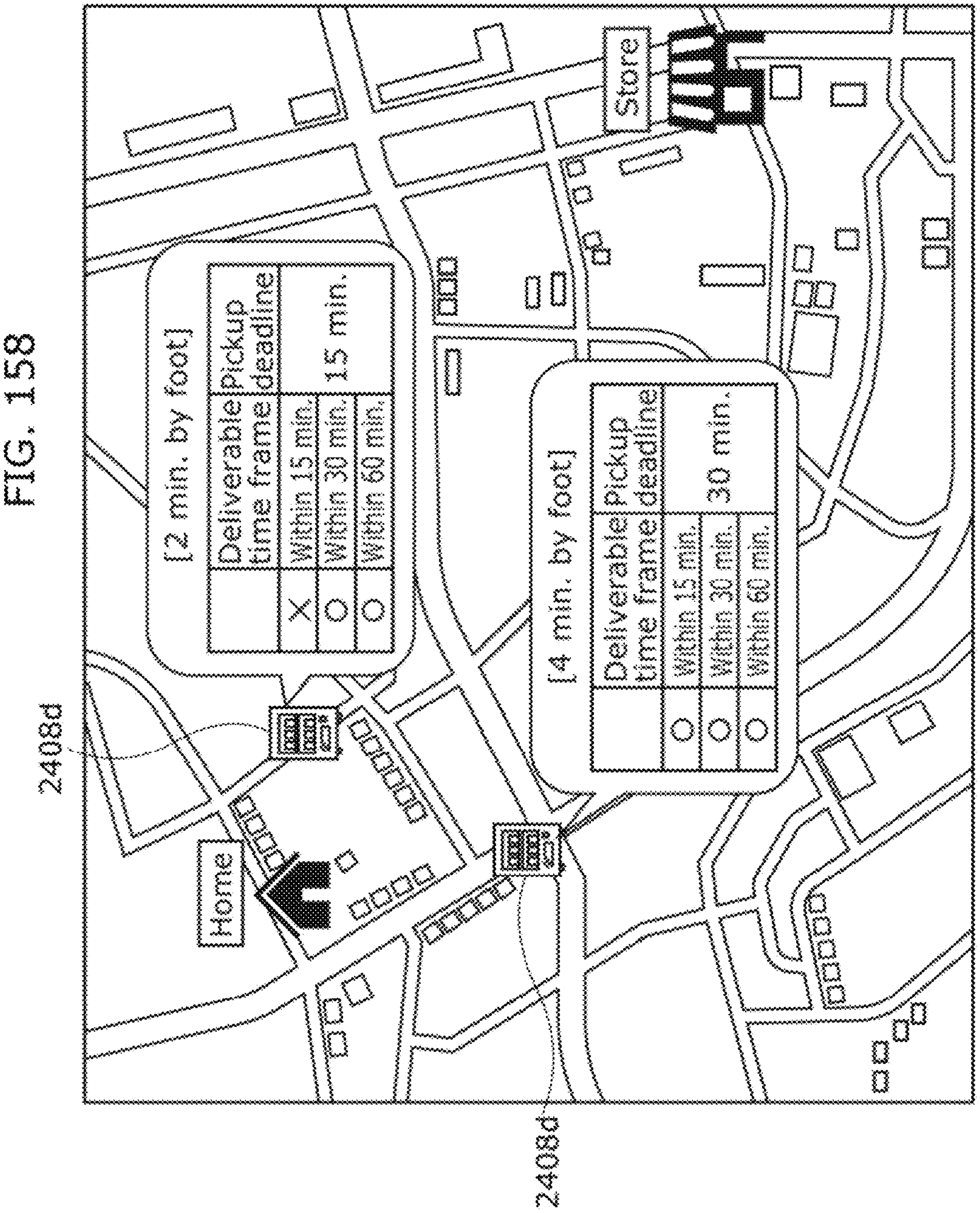

FIG. 158 illustrates a map according to Embodiment 18 that includes, for example, the user's home and vending machines in the vicinity of the user's home.

Figure 159A:
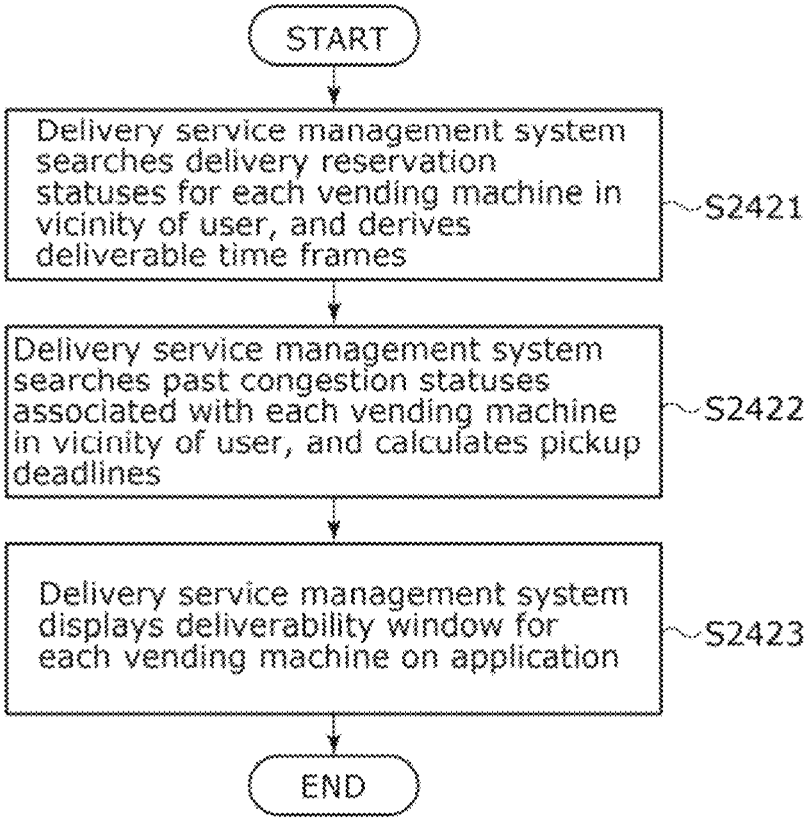

FIG. 159A is a flowchart illustrating an example of an operation of a delivery service management system according to Embodiment 18.

Figure 159B:
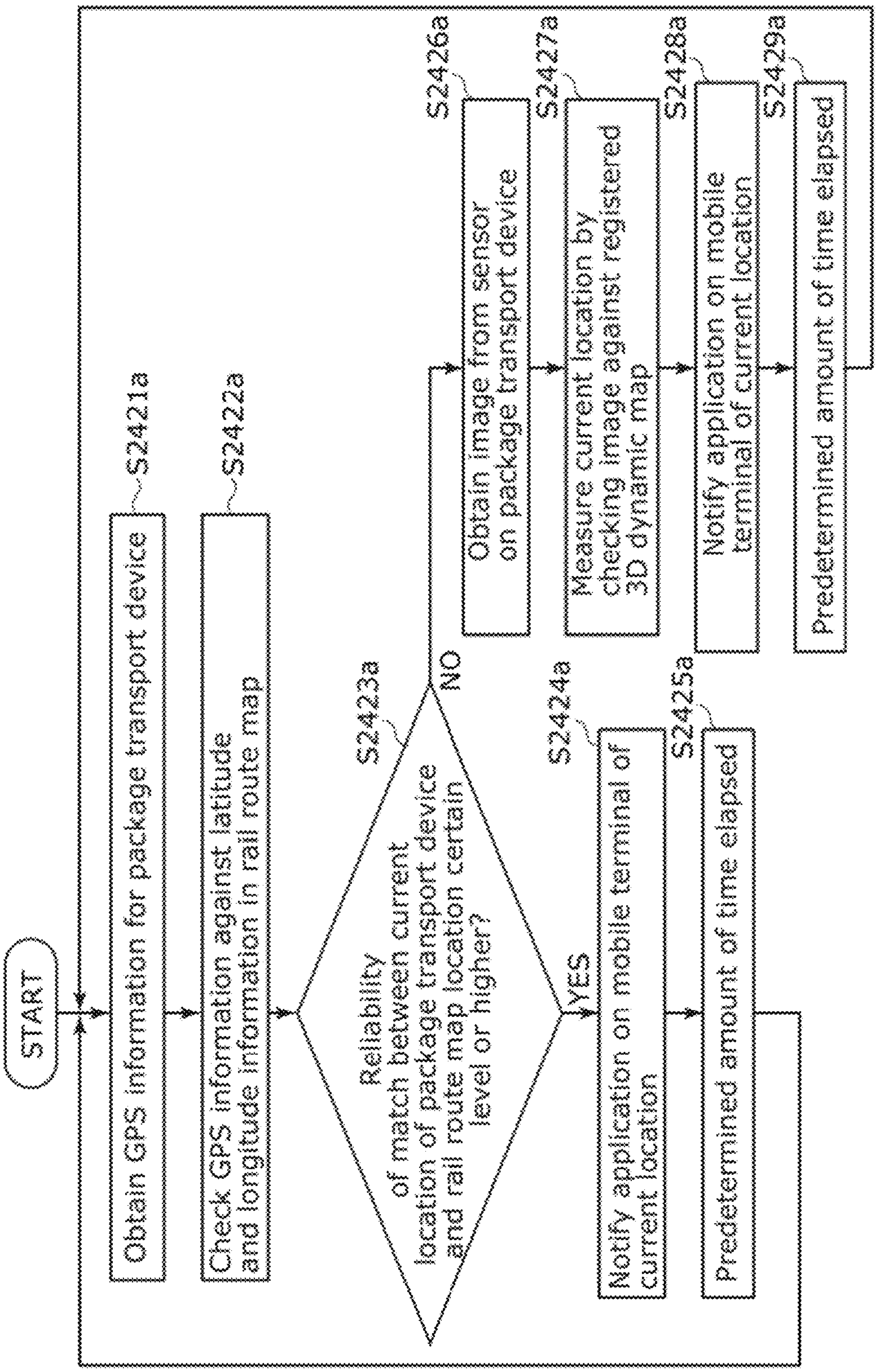

FIG. 159B is a flowchart illustrating an example of an operation of an operations management system according to Embodiment 18.

Figure 160A:
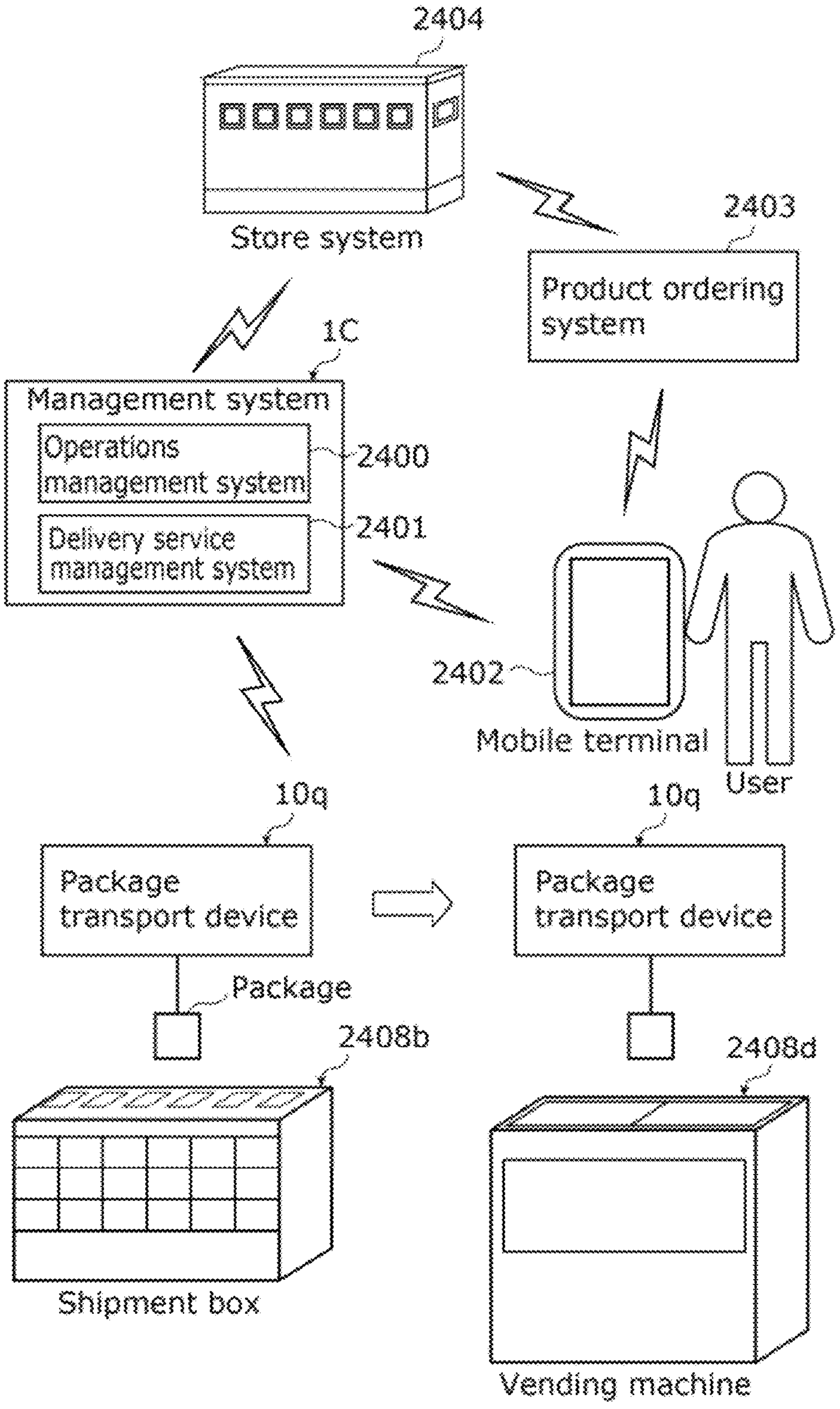

FIG. 160A is a block diagram illustrating an example of a management system, etc., according to Embodiment 19.

Figure 160B:
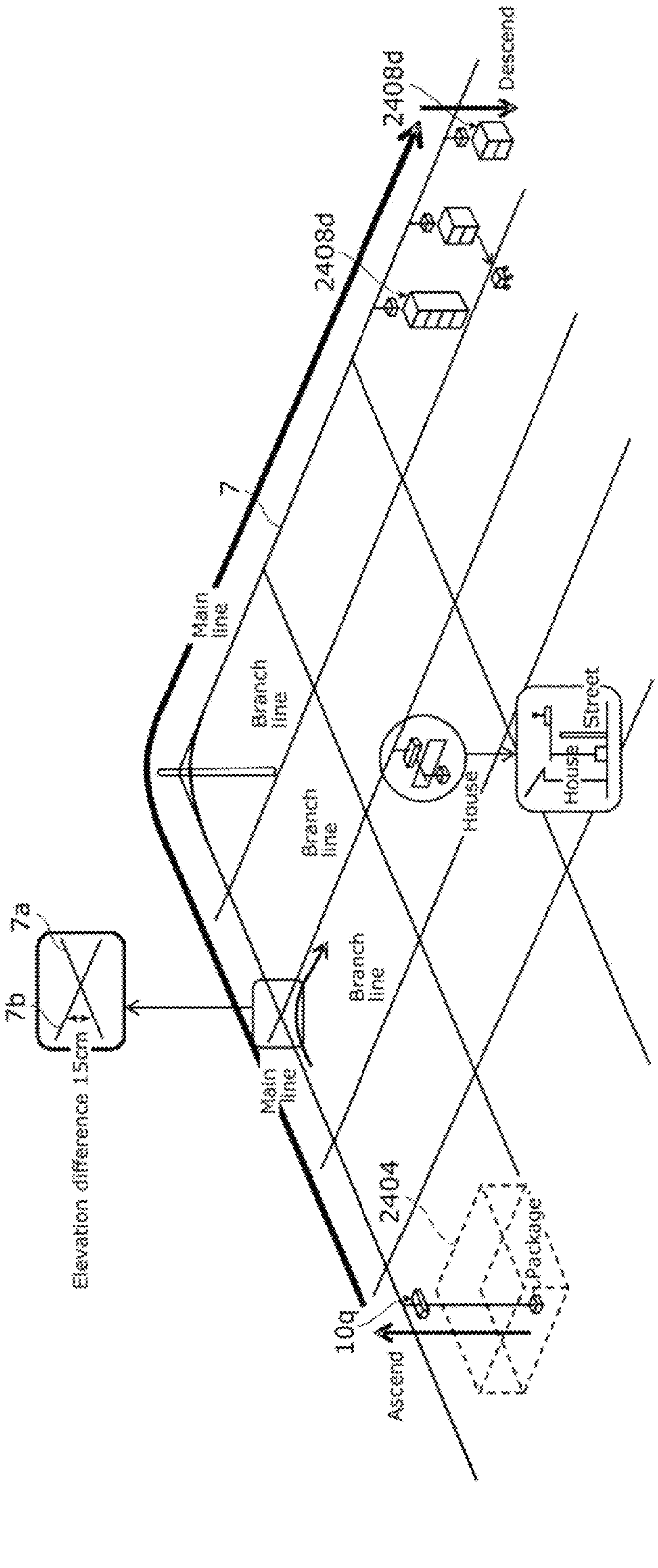

FIG. 160B is a schematic diagram illustrating rails from the sender to the receiver.

Figure 161:
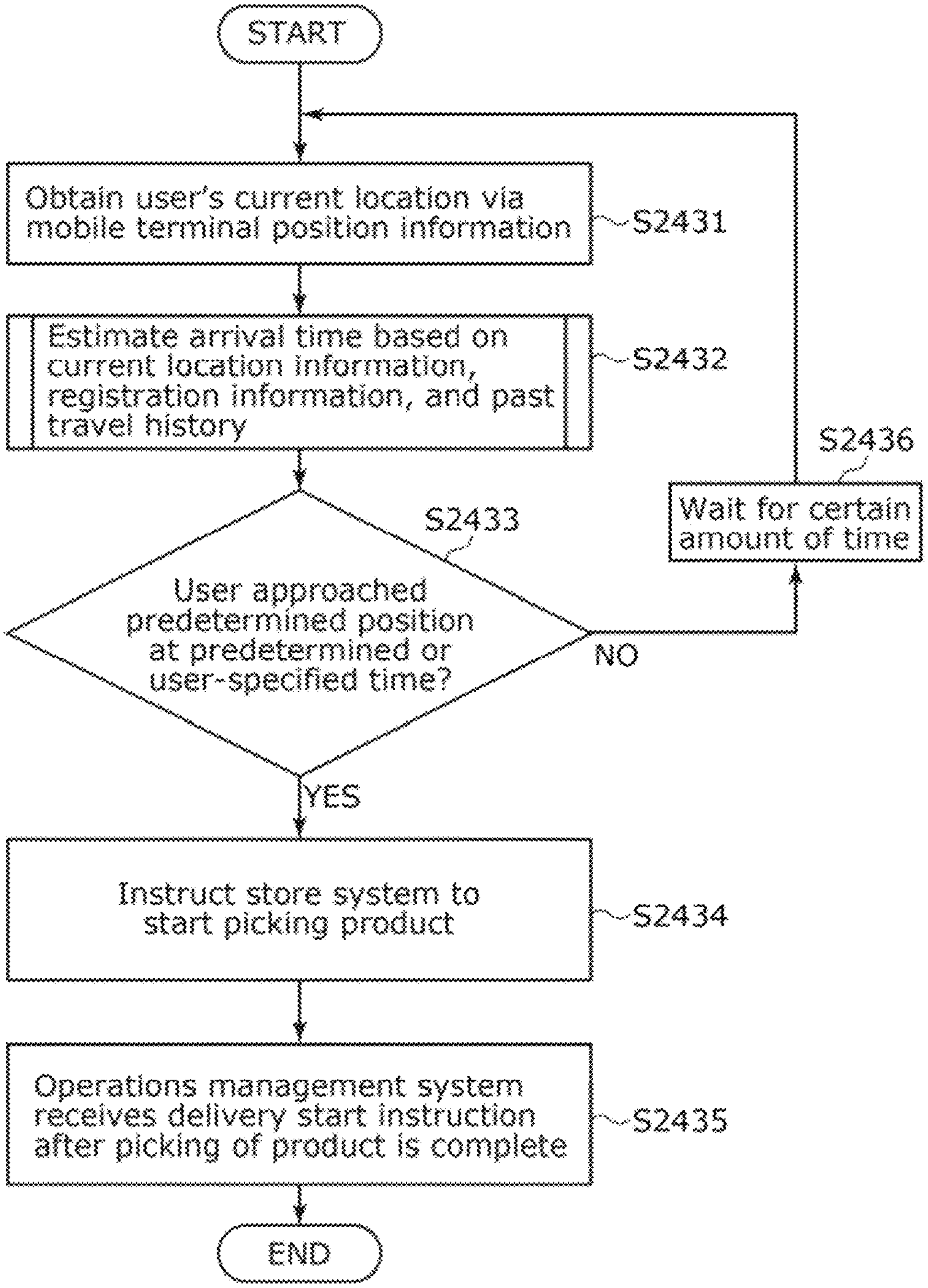

FIG. 161 is a flowchart illustrating an example of an operation of a delivery service management system according to Operation Example 1 of Embodiment 19.

Figure 162:
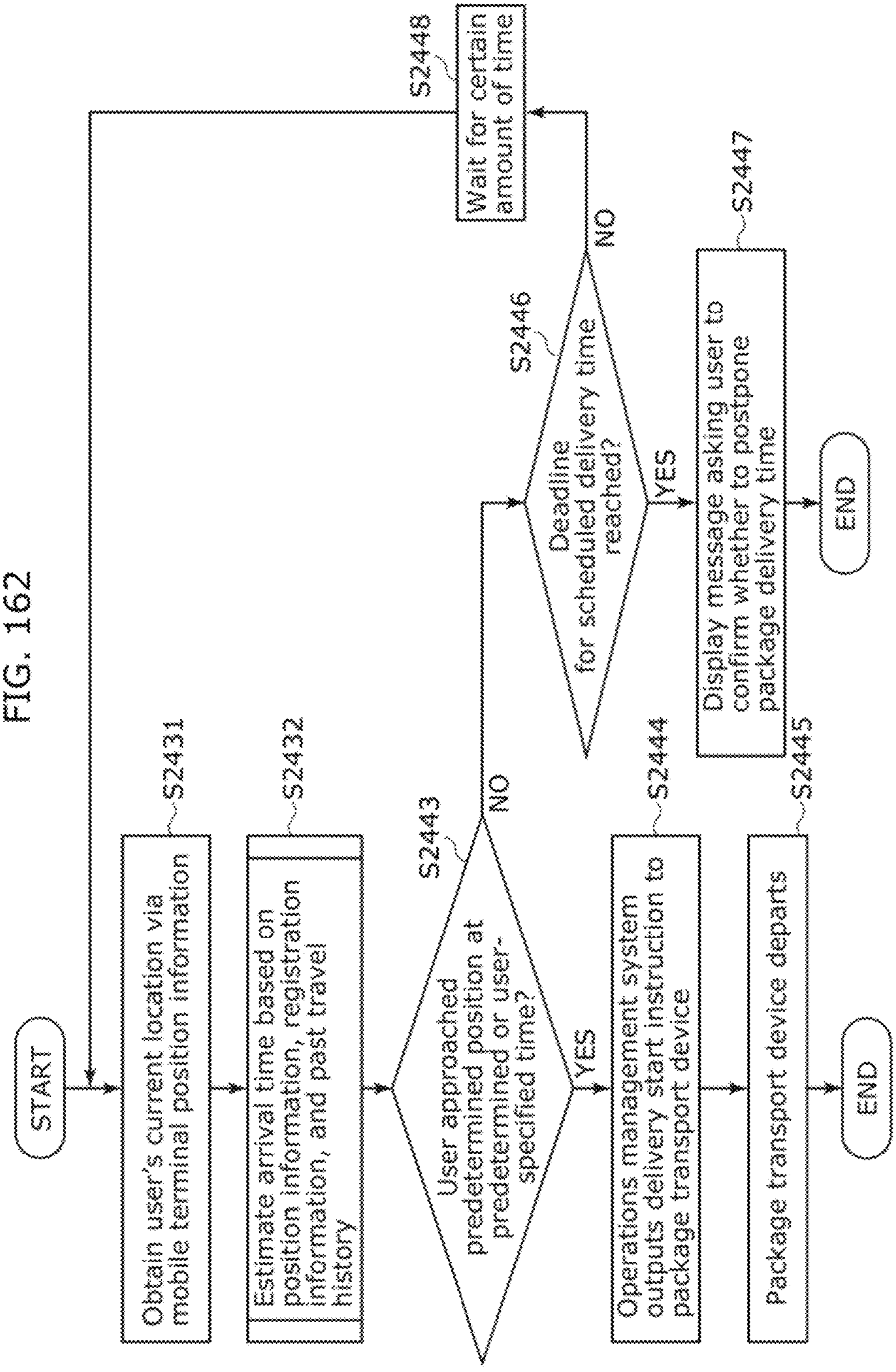

FIG. 162 is a flowchart illustrating an example of an operation of a management system according to Operation Example 2 of Embodiment 19.

Figure 163A:
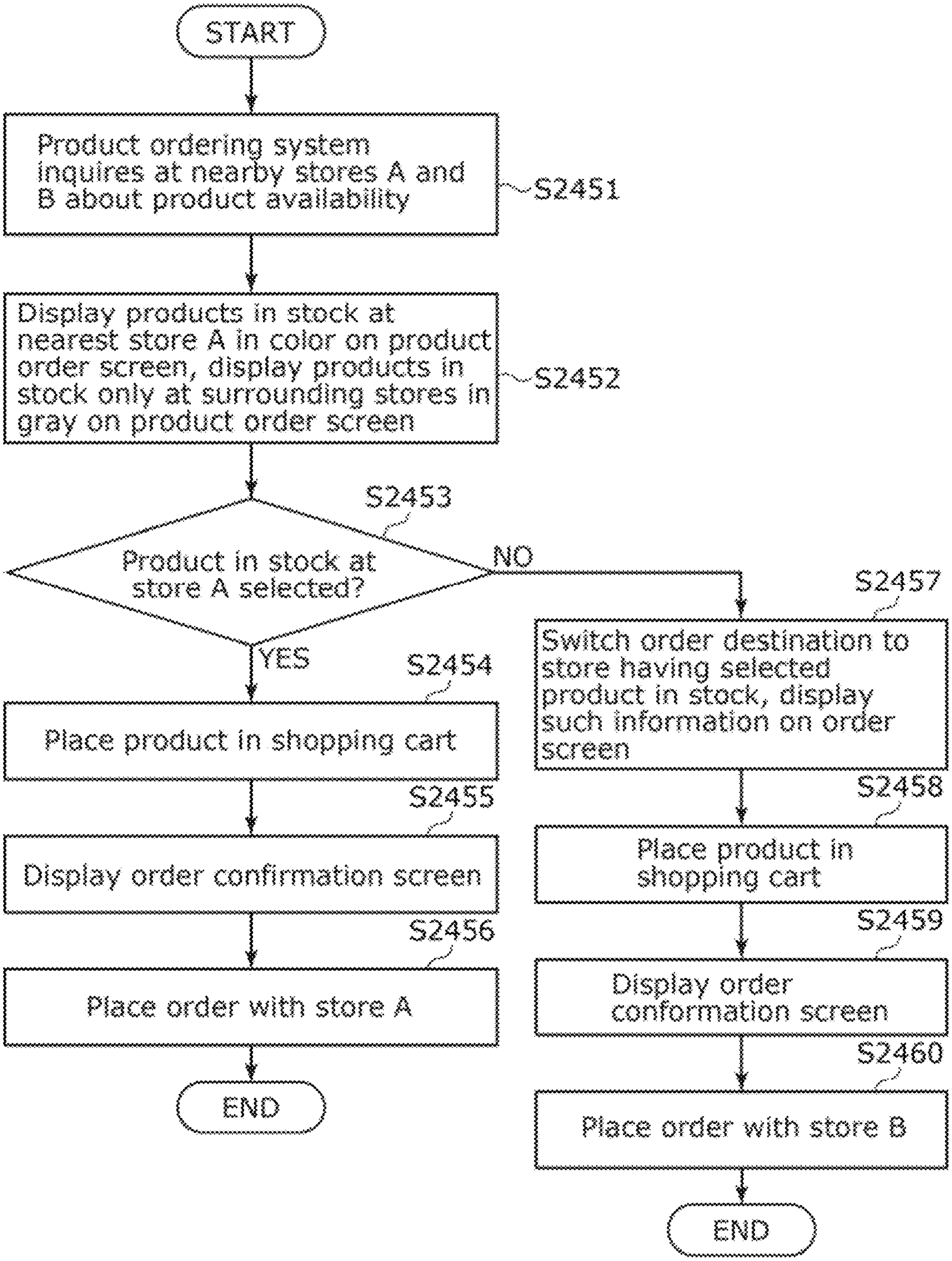

FIG. 163A is a flowchart illustrating an example of an operation of a product ordering system according to Operation Example 3 of Embodiment 19.

Figure 163B:
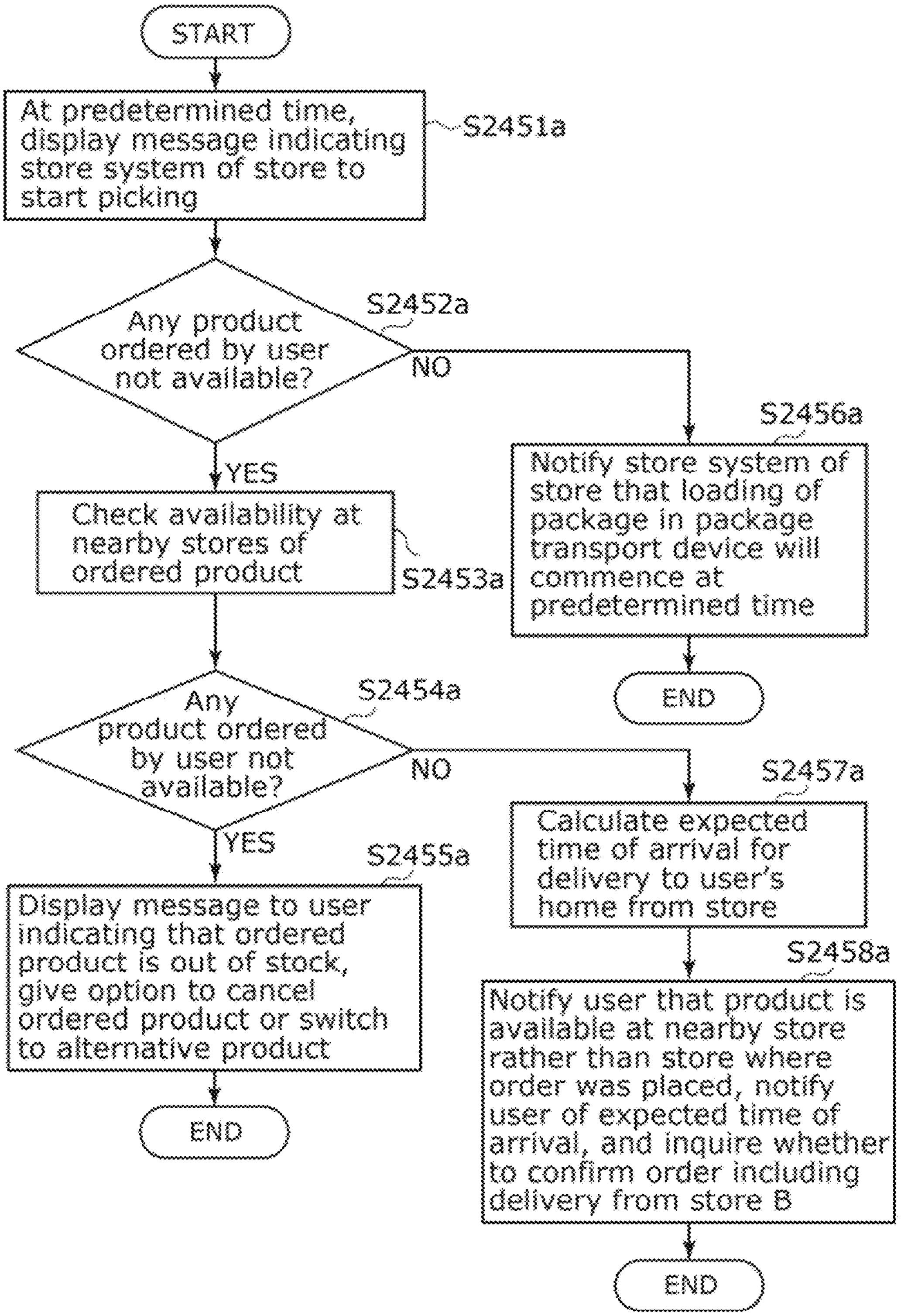

FIG. 163B is a flowchart illustrating an example of an operation of a product ordering system according to Operation Example 4 of Embodiment 19.

Figure 163C:
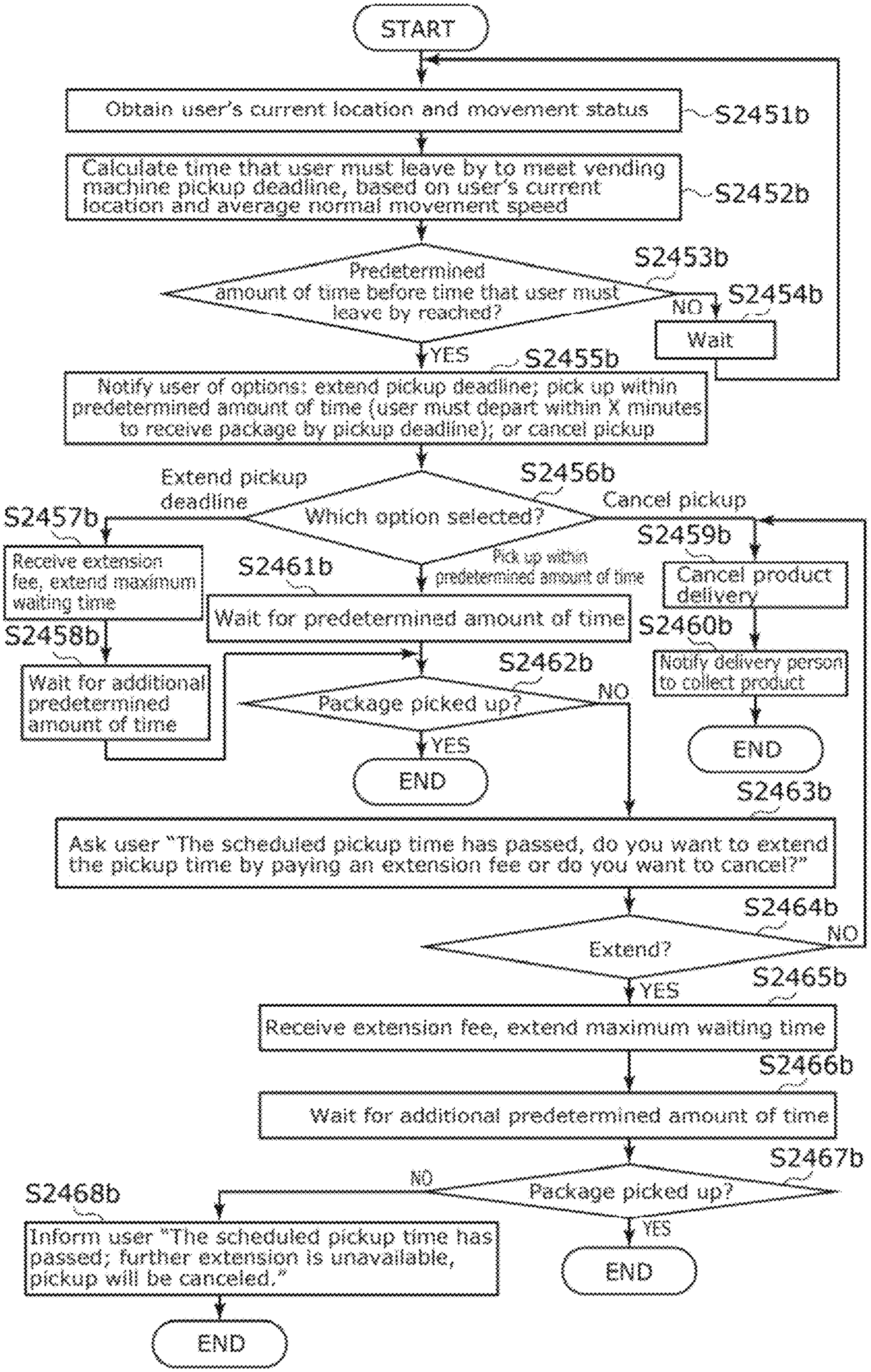

FIG. 163C is a flowchart illustrating an example of an operation of a product ordering system according to Operation Example 5 of Embodiment 19.

Figure 164:
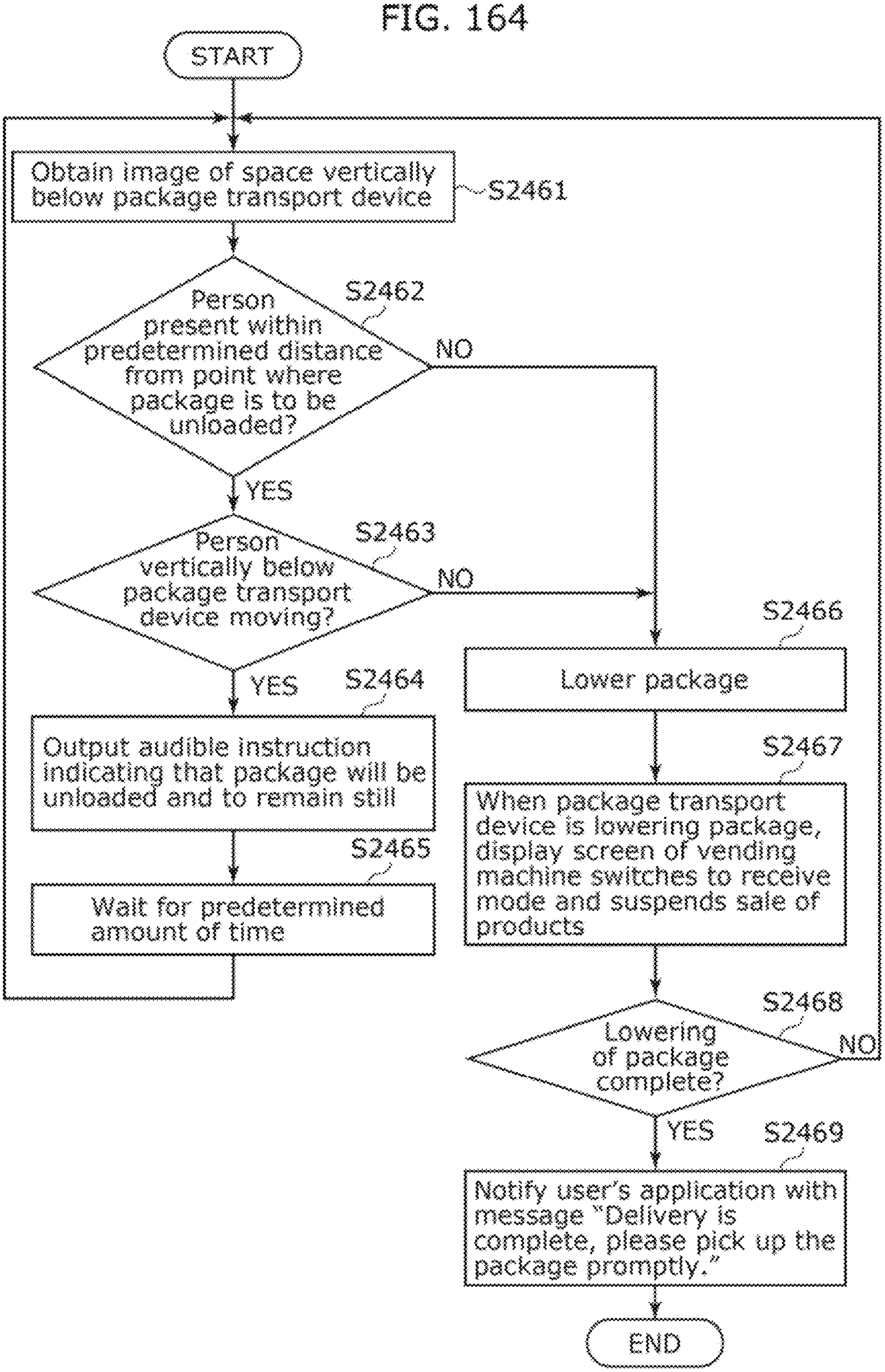

FIG. 164 is a flowchart illustrating an example of an operation of the package transport device according to Operation Example 6 of Embodiment 19.

Figure 165:
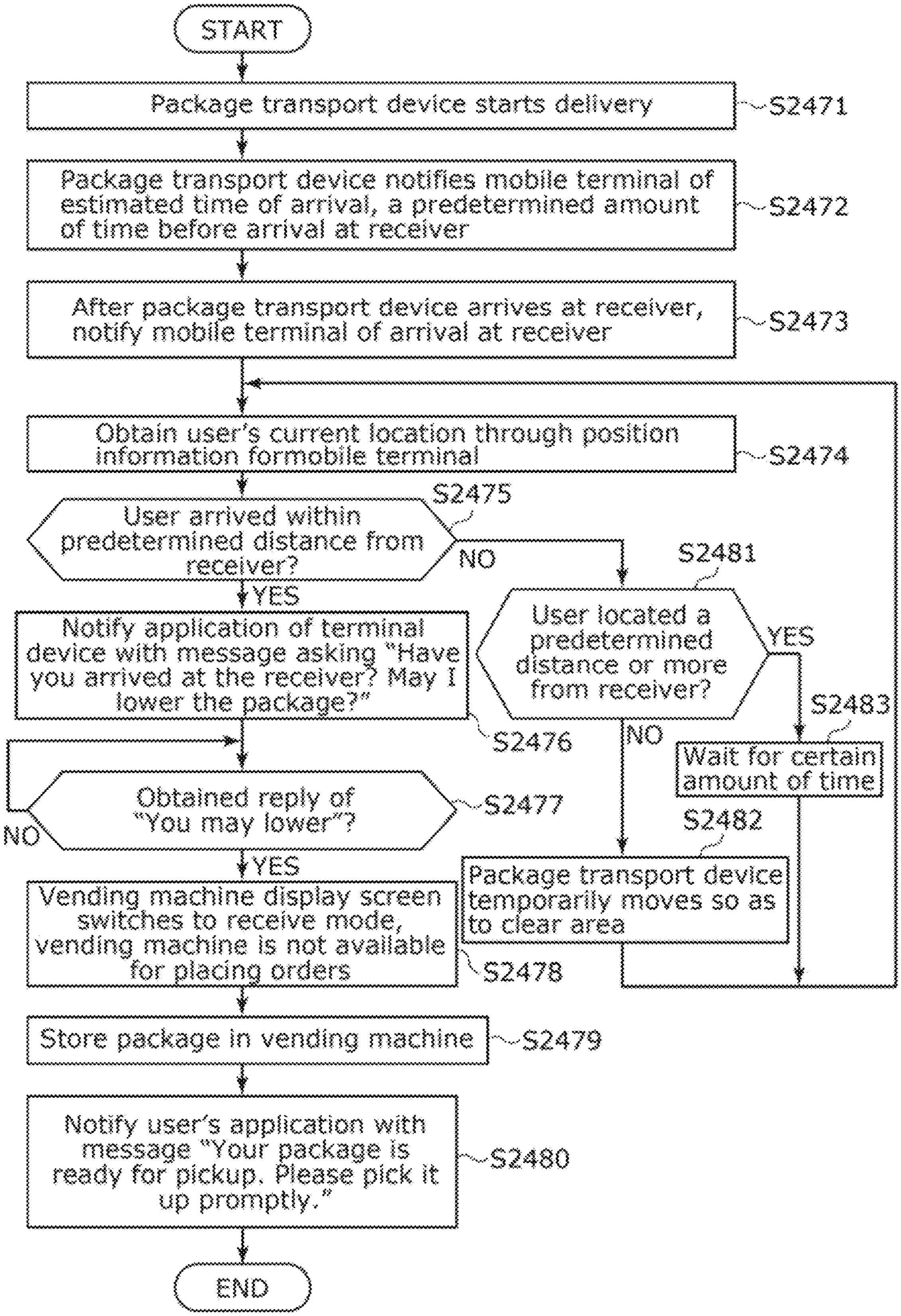

FIG. 165 is a flowchart illustrating an example of an operation of the package transport device according to Operation Example 7 of Embodiment 19.

Figure 166A:
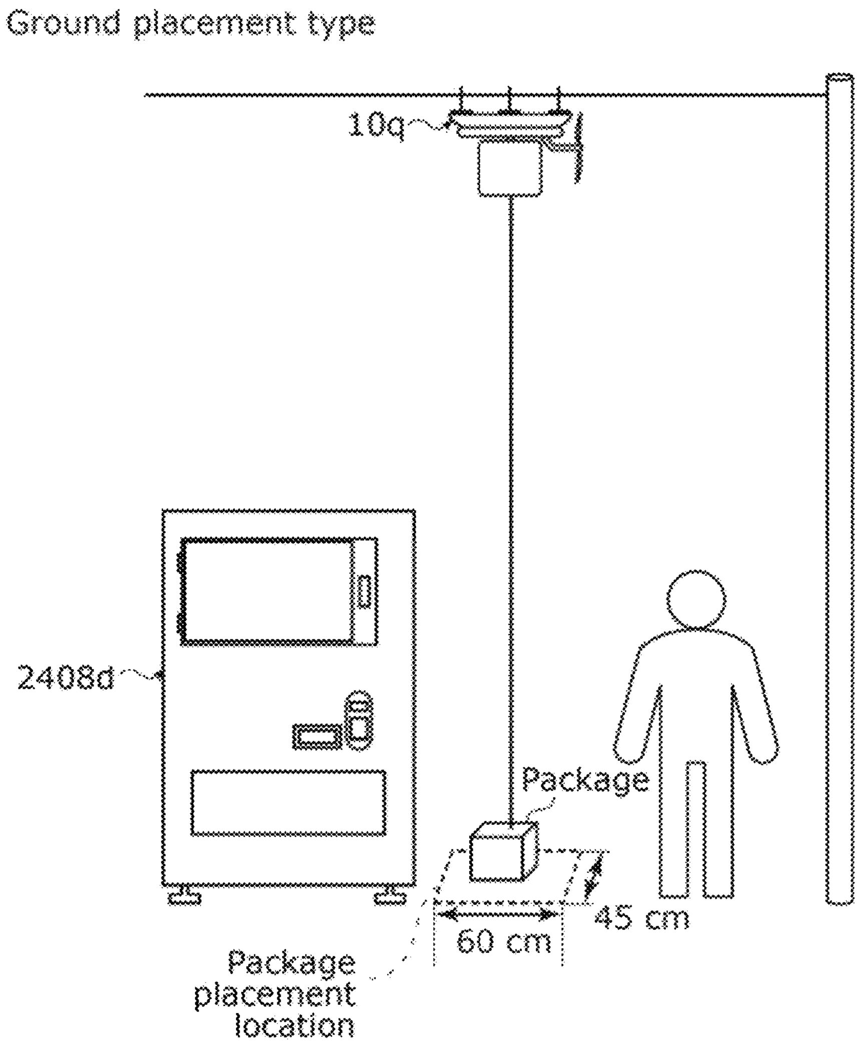

FIG. 166A illustrates an example of an operation of a ground placement type in which a person receives a package from the package transport device according to Operation Example 8 of Embodiment 19.

Figure 166B:
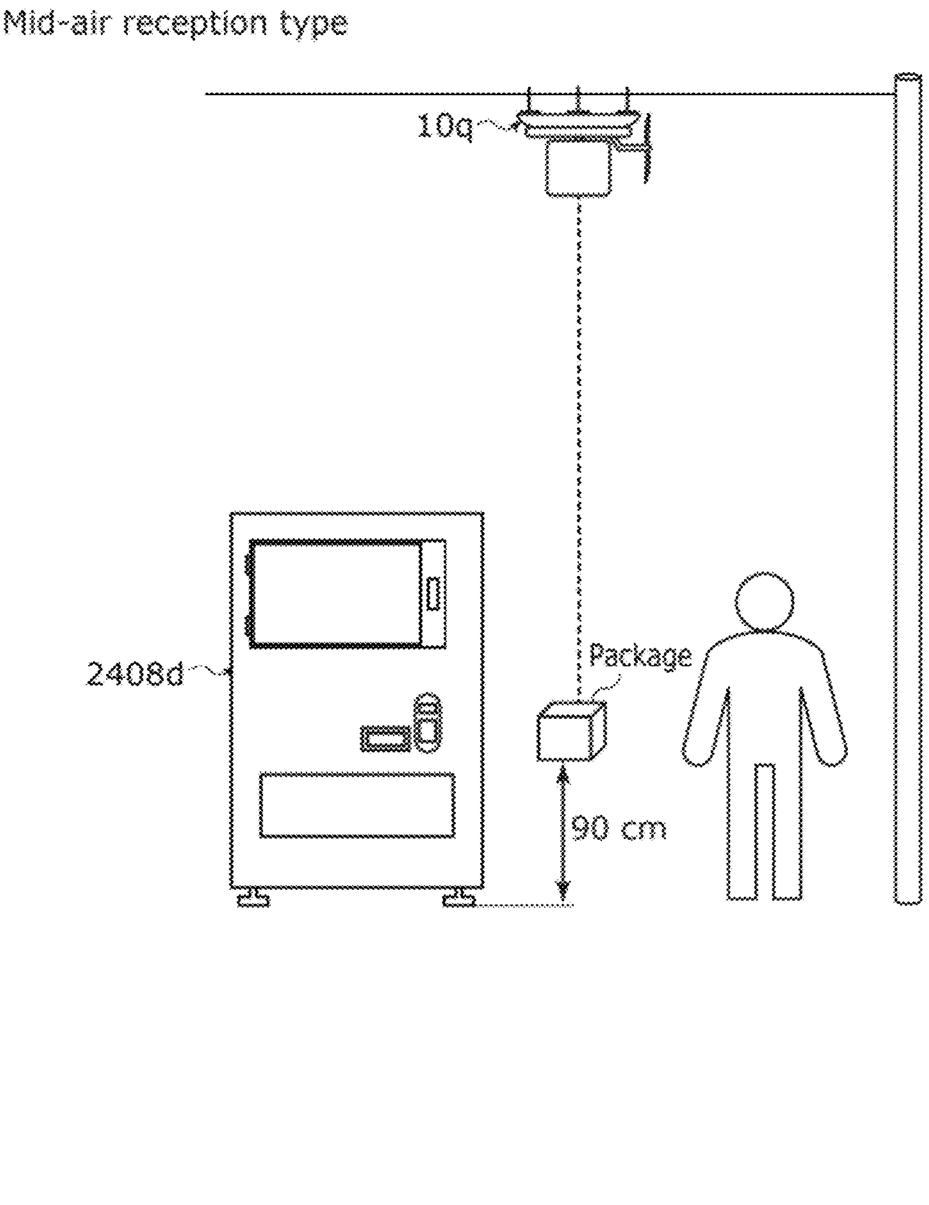

FIG. 166B illustrates an example of an operation of an aerial pickup type in which a person receives a package directly from the package transport device according to Operation Example 8 of Embodiment 19.

Figure 167:
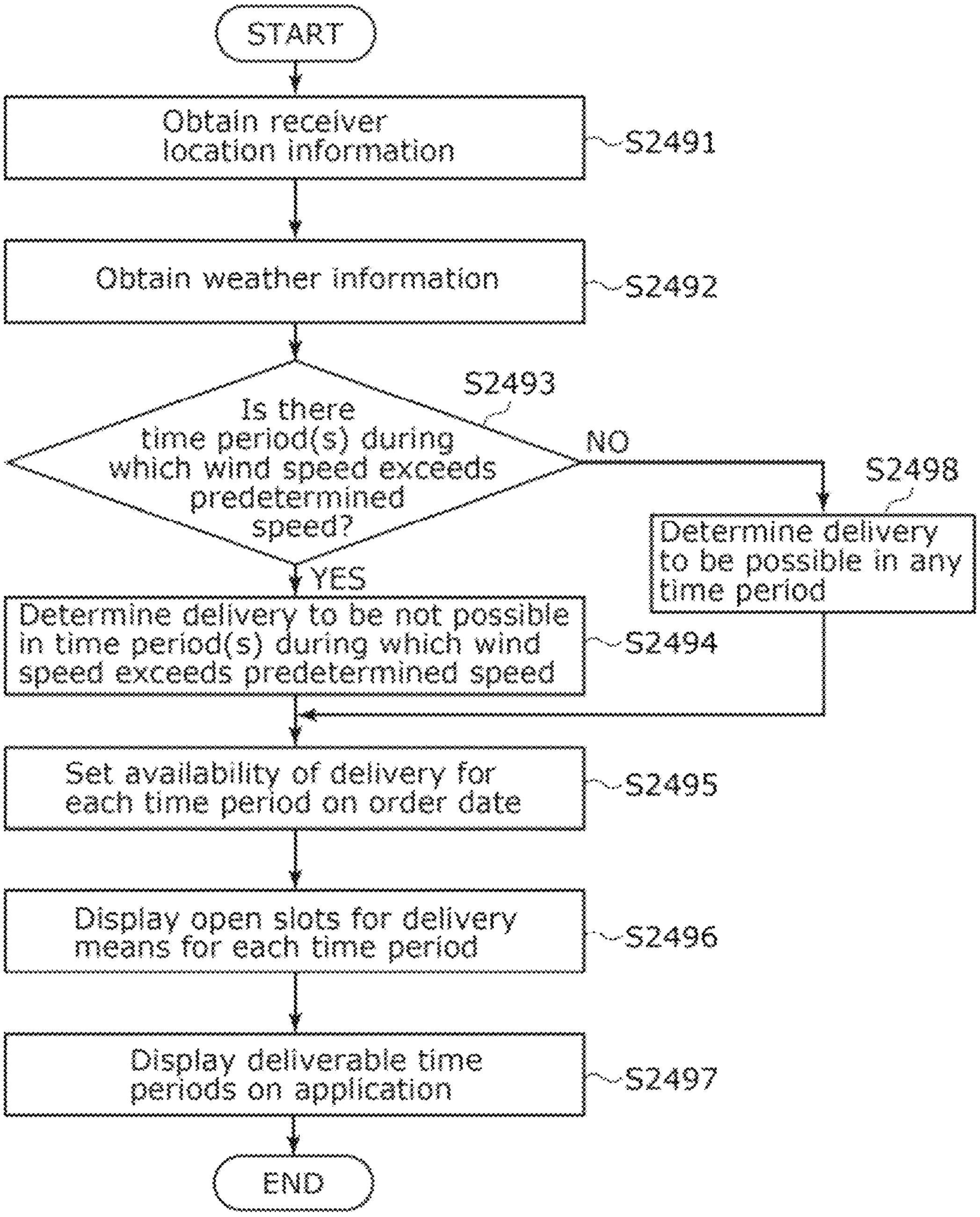

FIG. 167 is a flowchart illustrating an example of an operation of a product ordering system according to Operation Example 9 of Embodiment 19.

Figure 168:
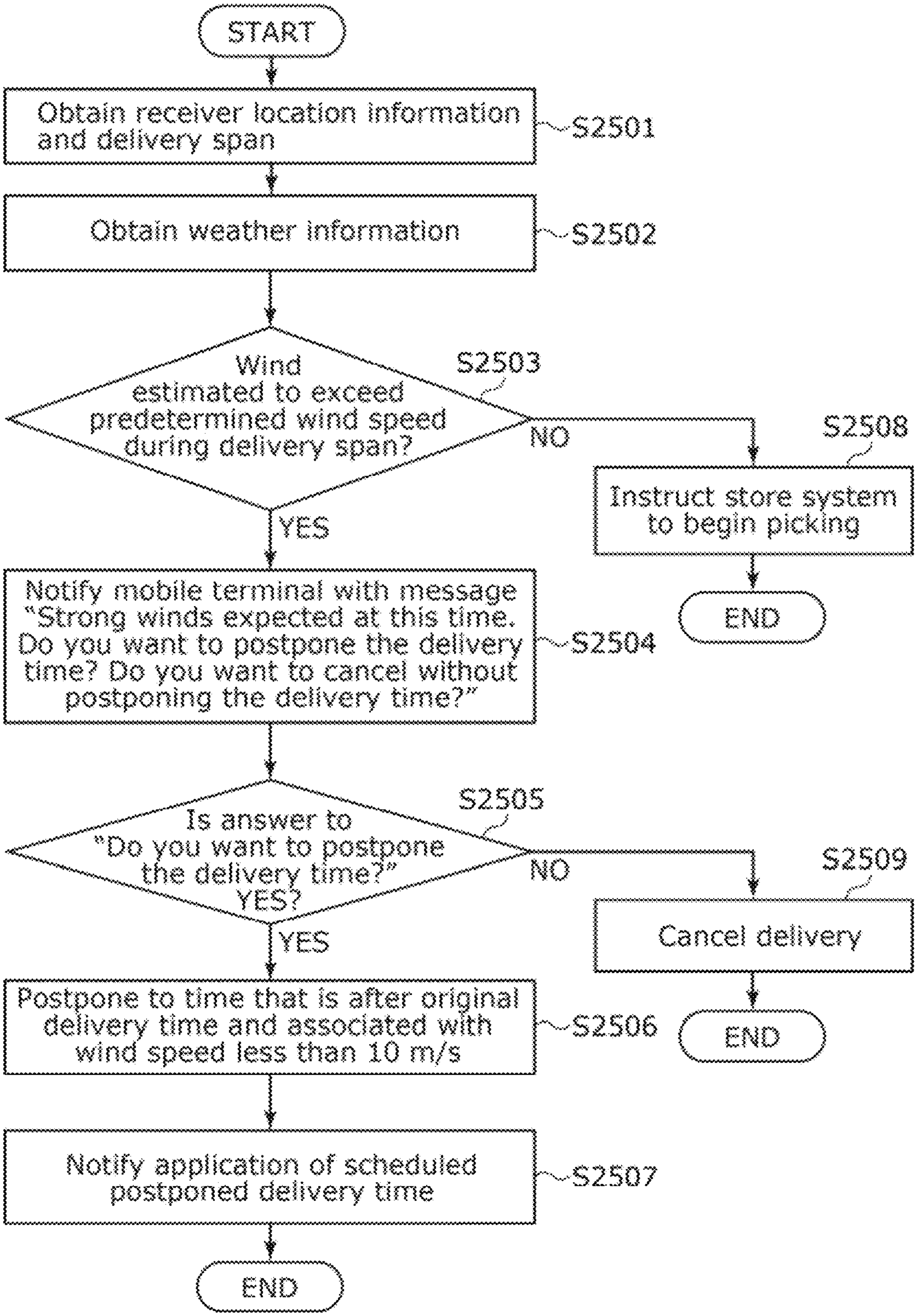

FIG. 168 is a flowchart illustrating an example of an operation of a delivery service management system according to Operation Example 10 of Embodiment 19.

Figure 169:
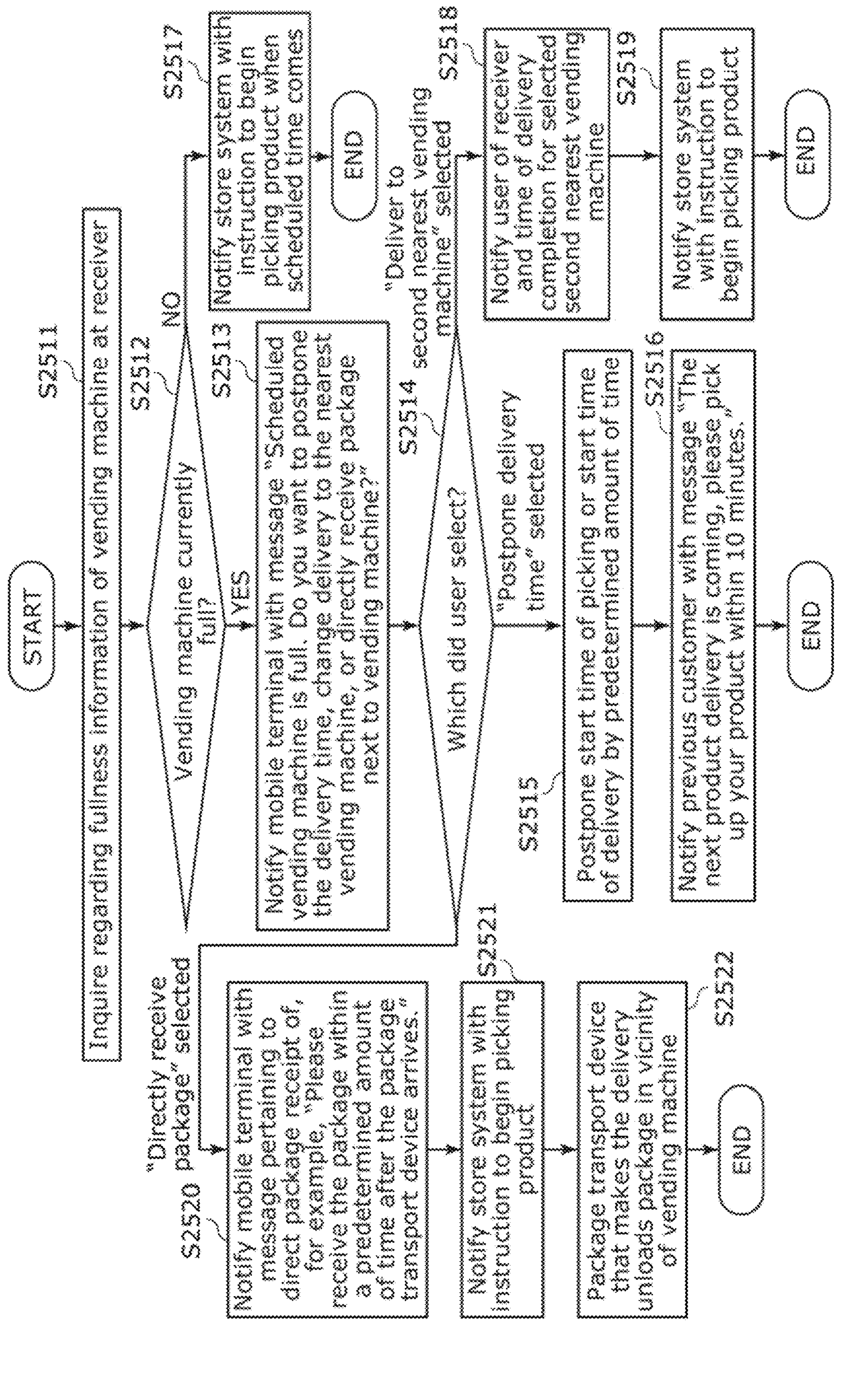

FIG. 169 is a flowchart illustrating an example of an operation of a delivery service management system according to Operation Example 11 of Embodiment 19.

Figure 170A:
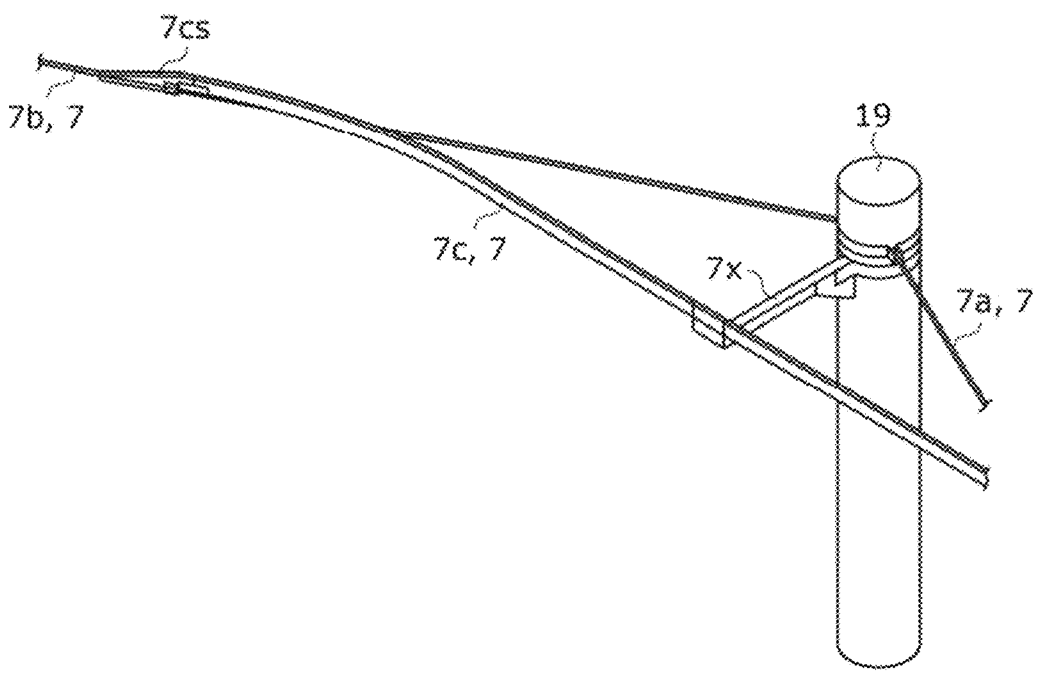

FIG. 170A is a perspective view illustrating an example of a rail according to Embodiment 20.

Figure 170B:
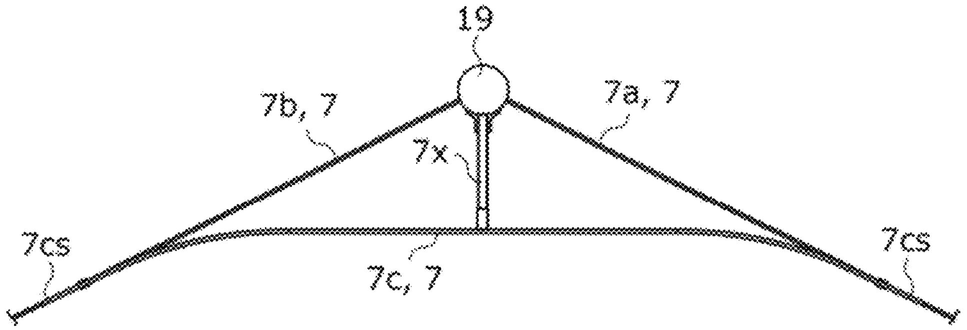

FIG. 170B is a top view illustrating an example of a rail according to Embodiment 20.

Figure 170C:
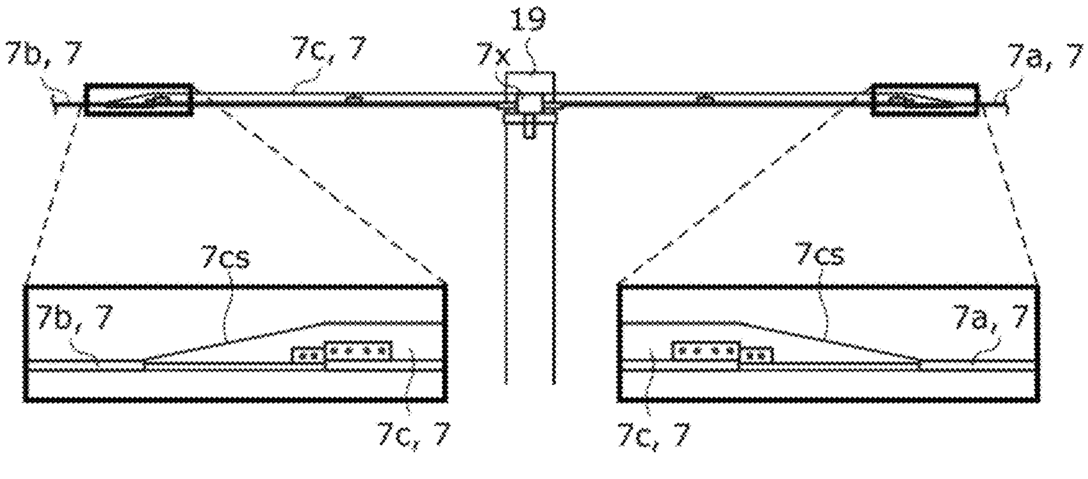

FIG. 170C is a side view illustrating an example of a rail according to Embodiment 20.

Figure 170D:
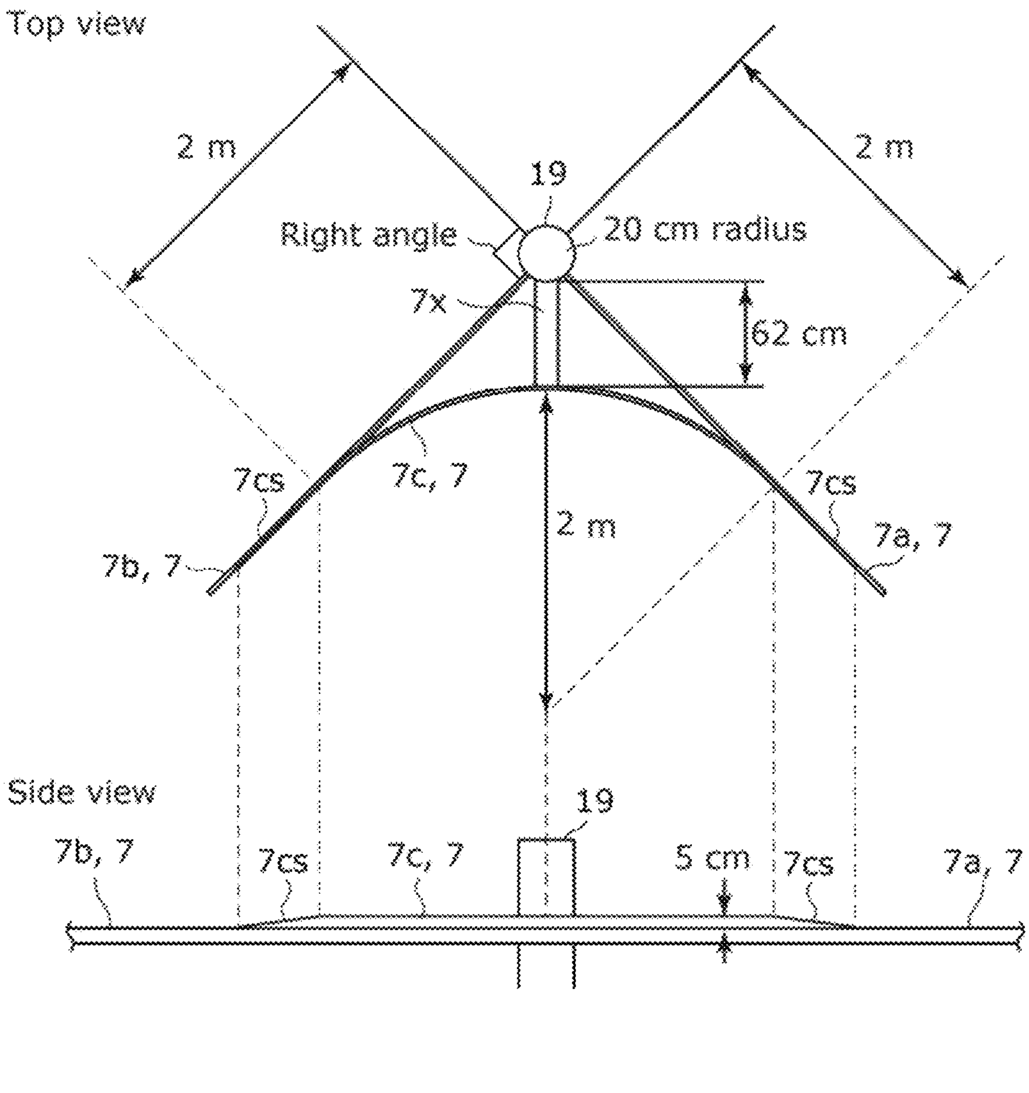

FIG. 170D is a top view and a side view illustrating an example of a rail according to Embodiment 20.

Figure 171:
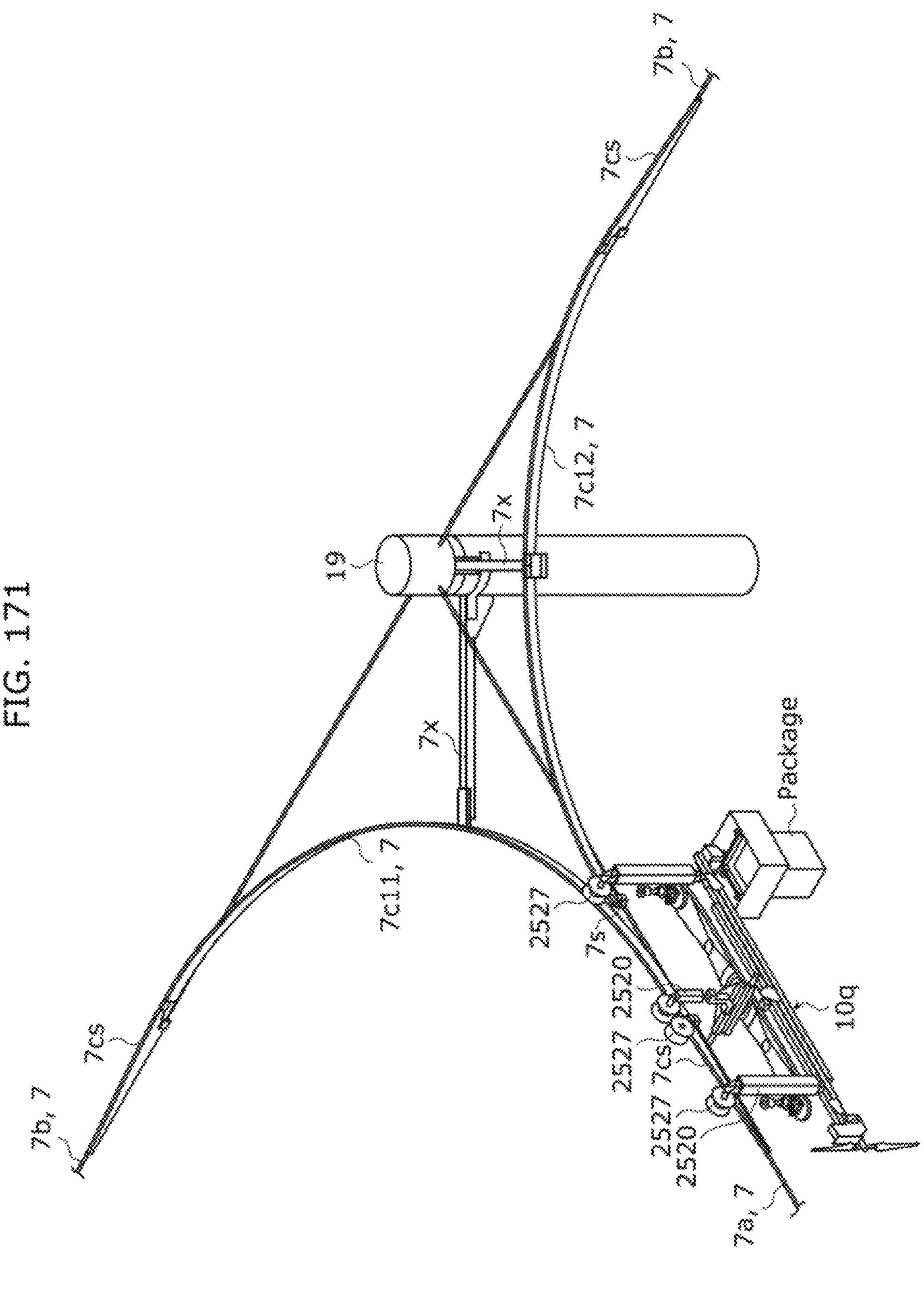

FIG. 171 is a perspective view illustrating an example of a rail and a package transport device according to Embodiment 20.

Figure 172A:
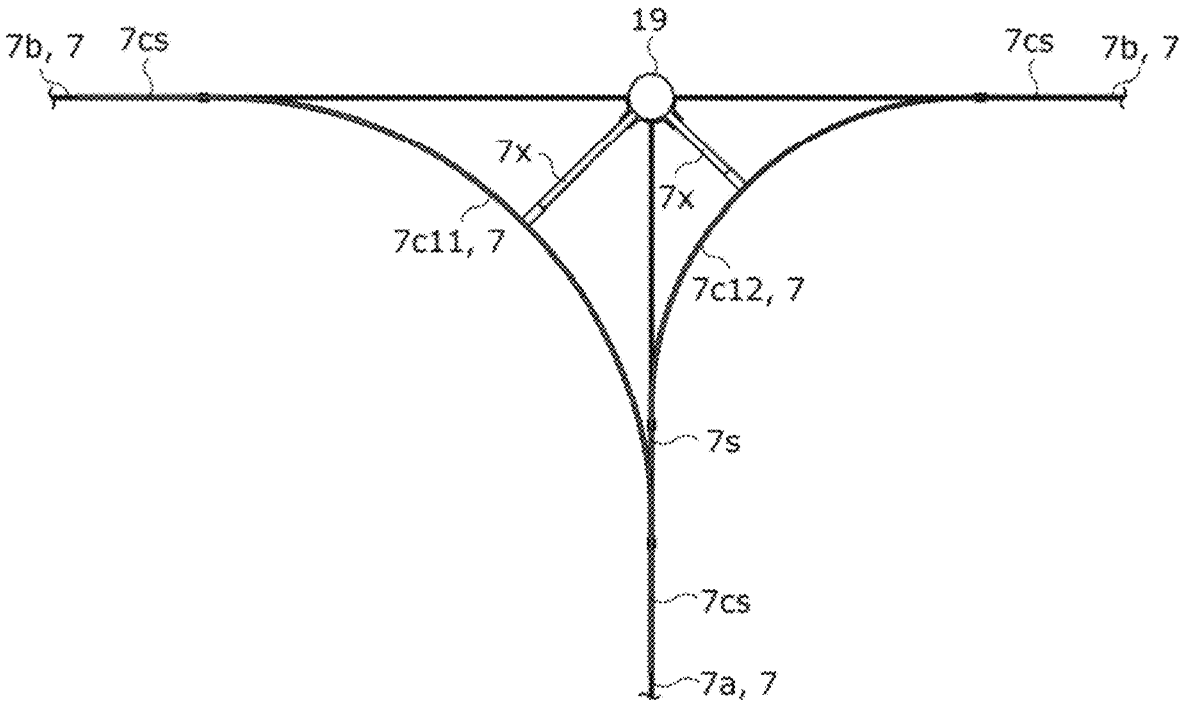

FIG. 172A is a top view illustrating an example of a rail according to Embodiment 20.

Figure 172B:
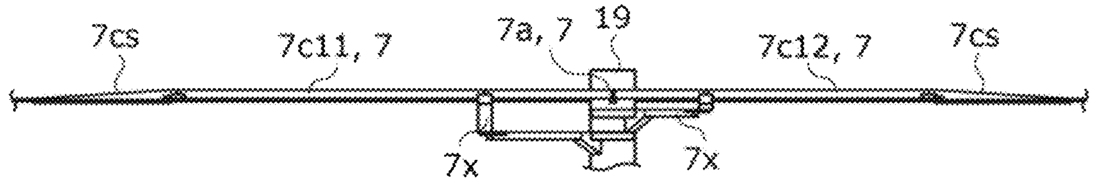

FIG. 172B is a side view illustrating an example of a rail according to Embodiment 20.

Figure 172C:
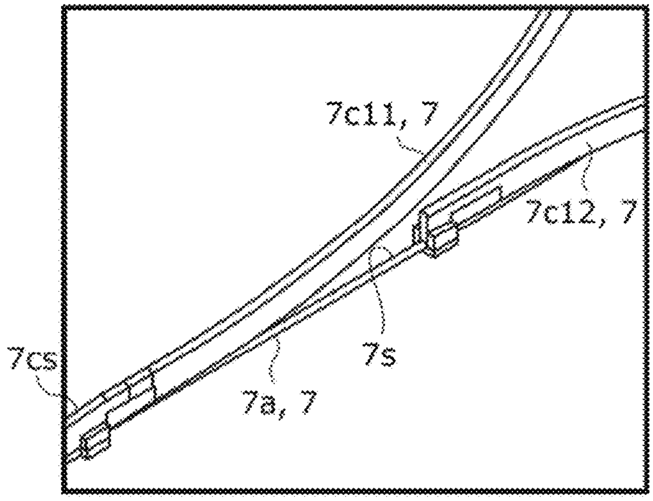

FIG. 172C is an enlarged partial perspective view illustrating an example of a rail according to Embodiment 20.

Figure 172D:
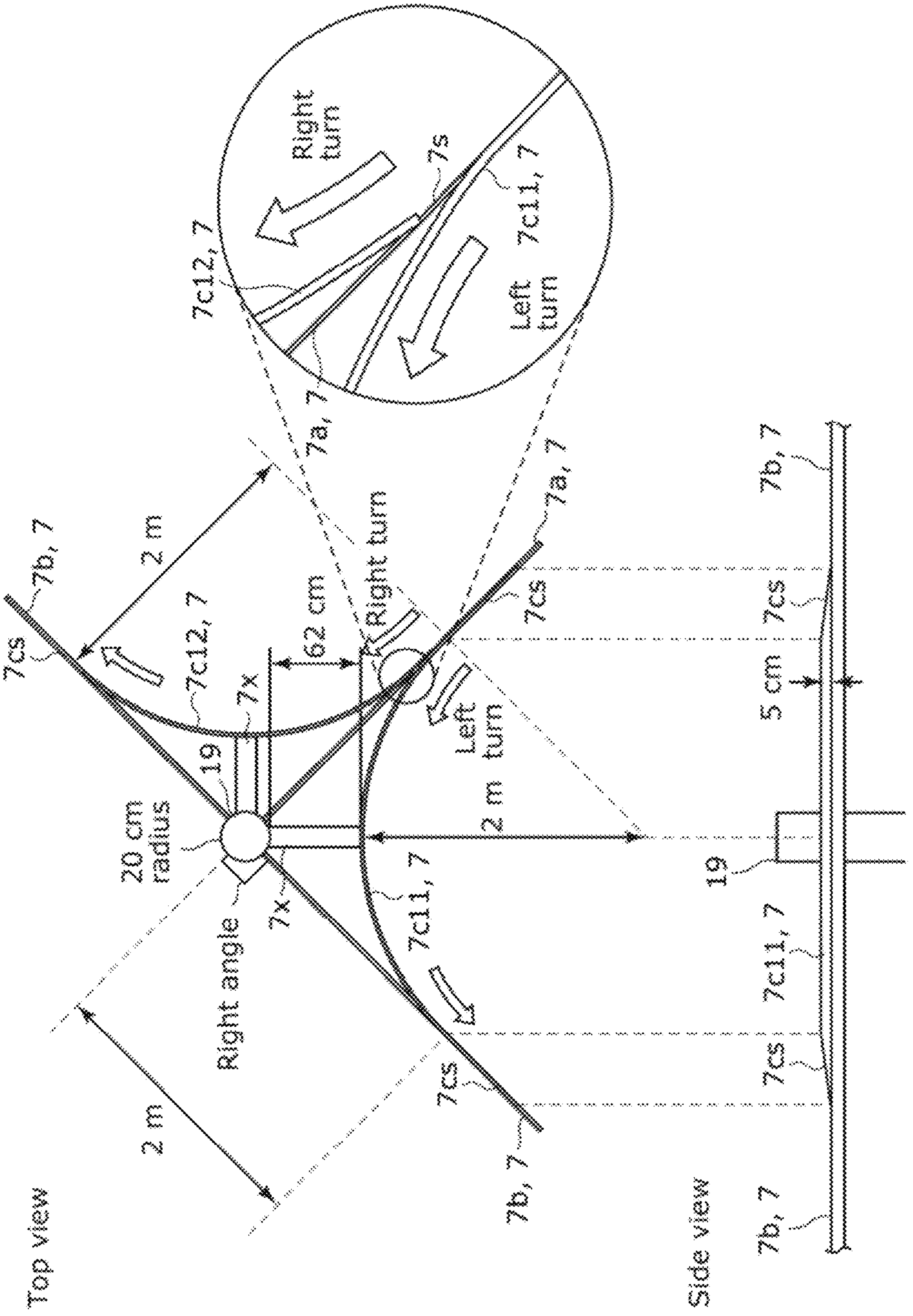

FIG. 172D includes a top view and a side view of a rail according to Embodiment 20, and an enlarged top view at the connection portion between third rails and a first rail.

Figure 173:
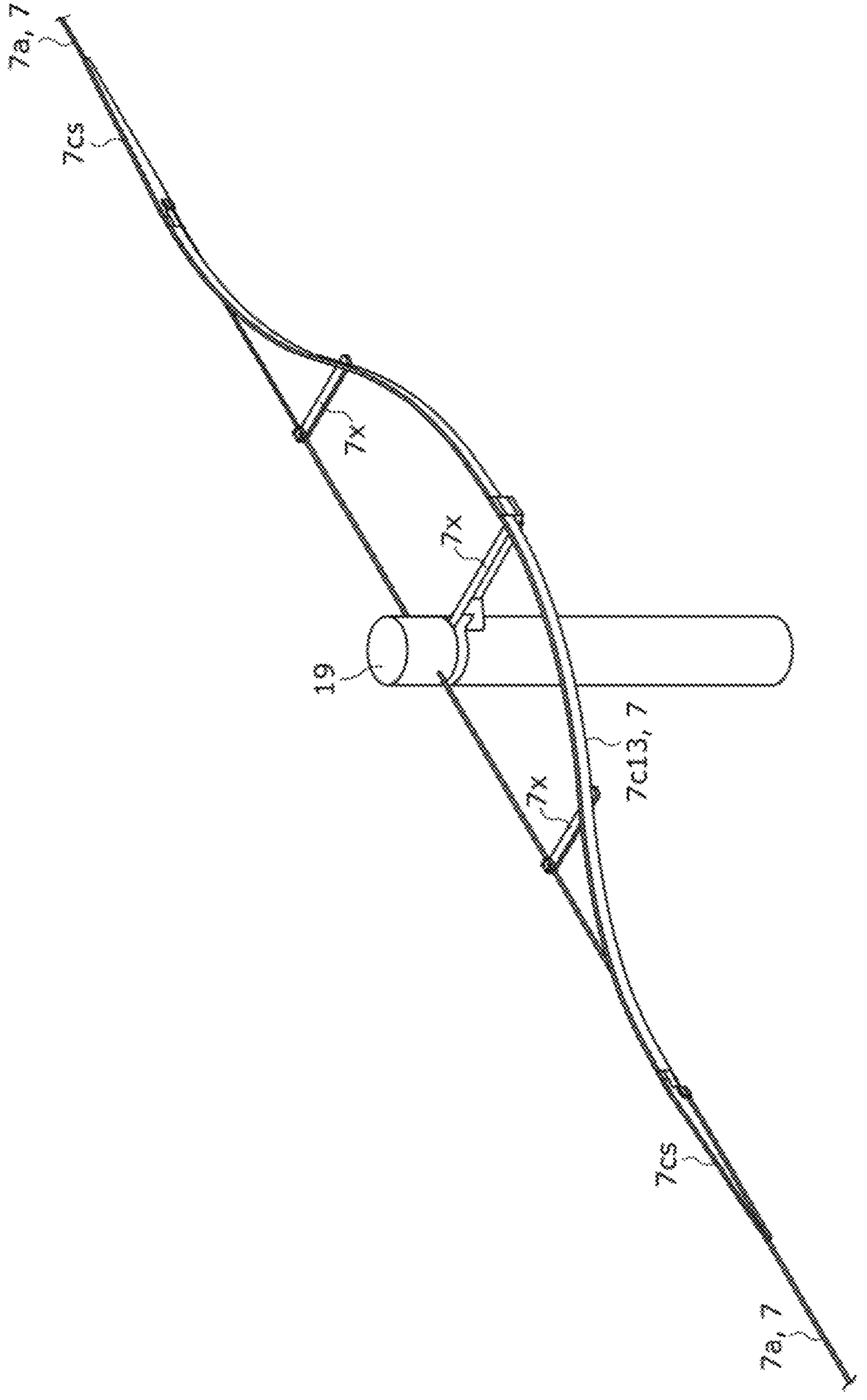

FIG. 173 is a perspective view illustrating an example of a rail according to Embodiment 20.

Figure 174A:
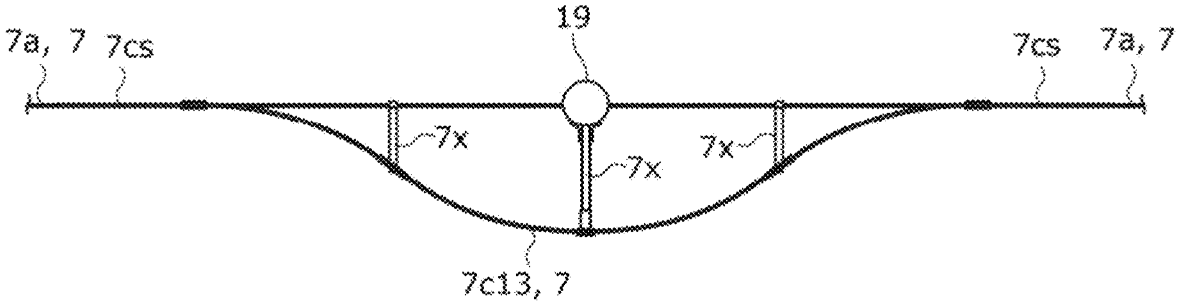

FIG. 174A is a top view illustrating an example of a rail according to Embodiment 20.

Figure 174B:
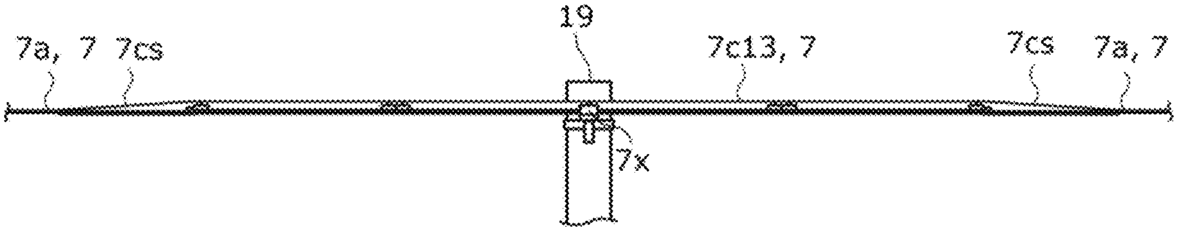

FIG. 174B is a side view illustrating an example of a rail according to Embodiment 20.

Figure 174C:
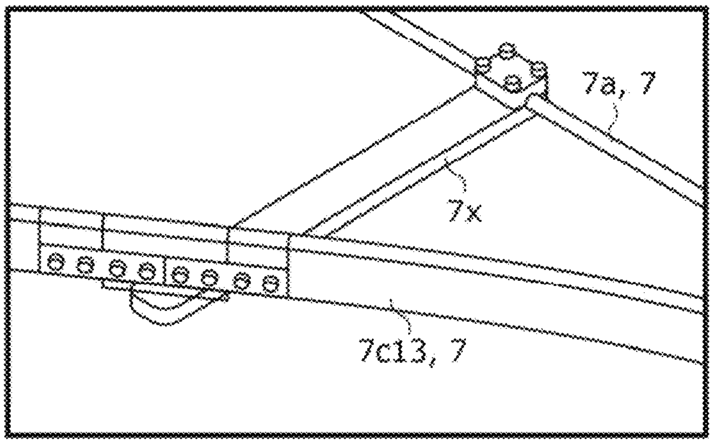

FIG. 174C is an enlarged partial perspective view illustrating an example of a rail according to Embodiment 20.

Figure 175:
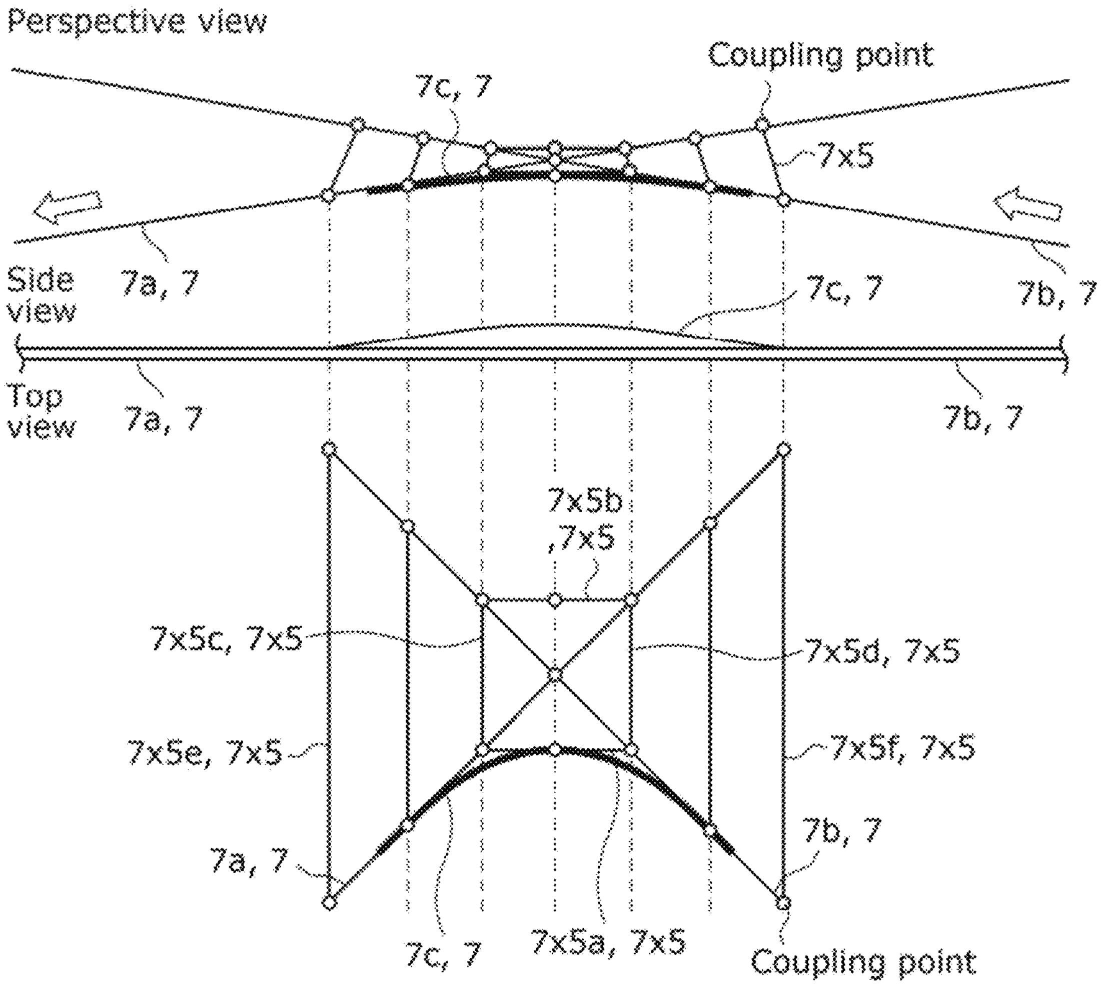

FIG. 175 is a perspective view, a side view, and a top view of a rail and rail support members according to a variation of Embodiment 20.

Figure 176:
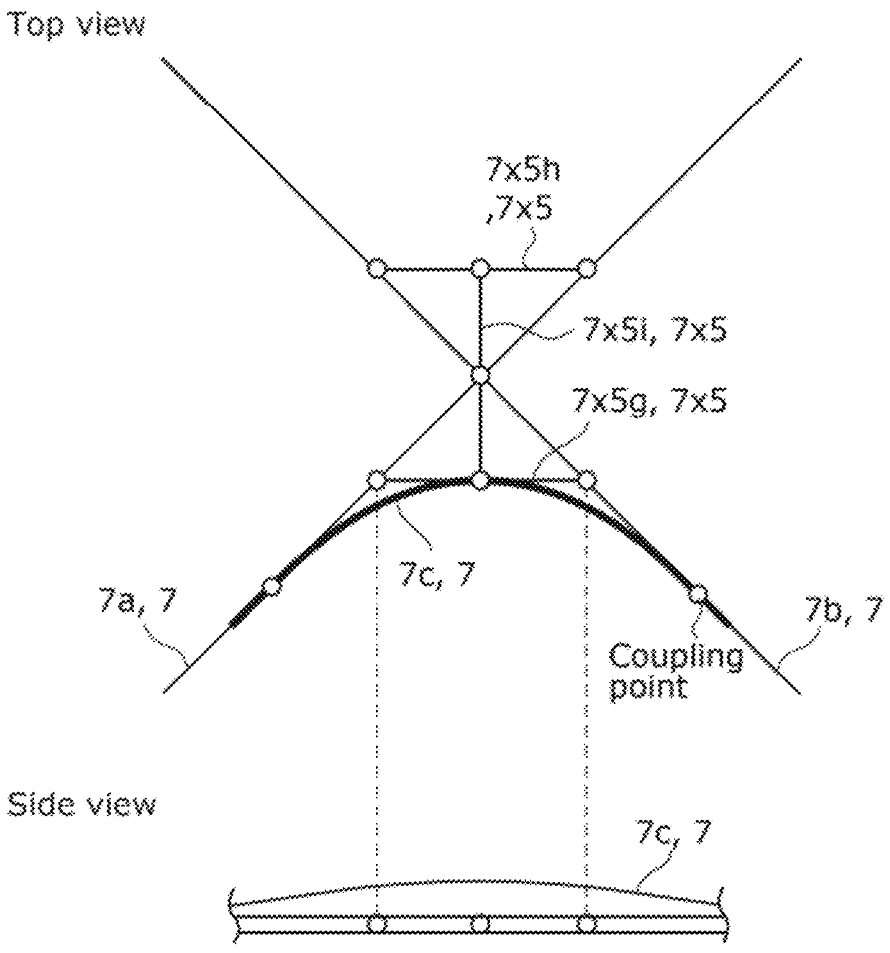
Figure 177:
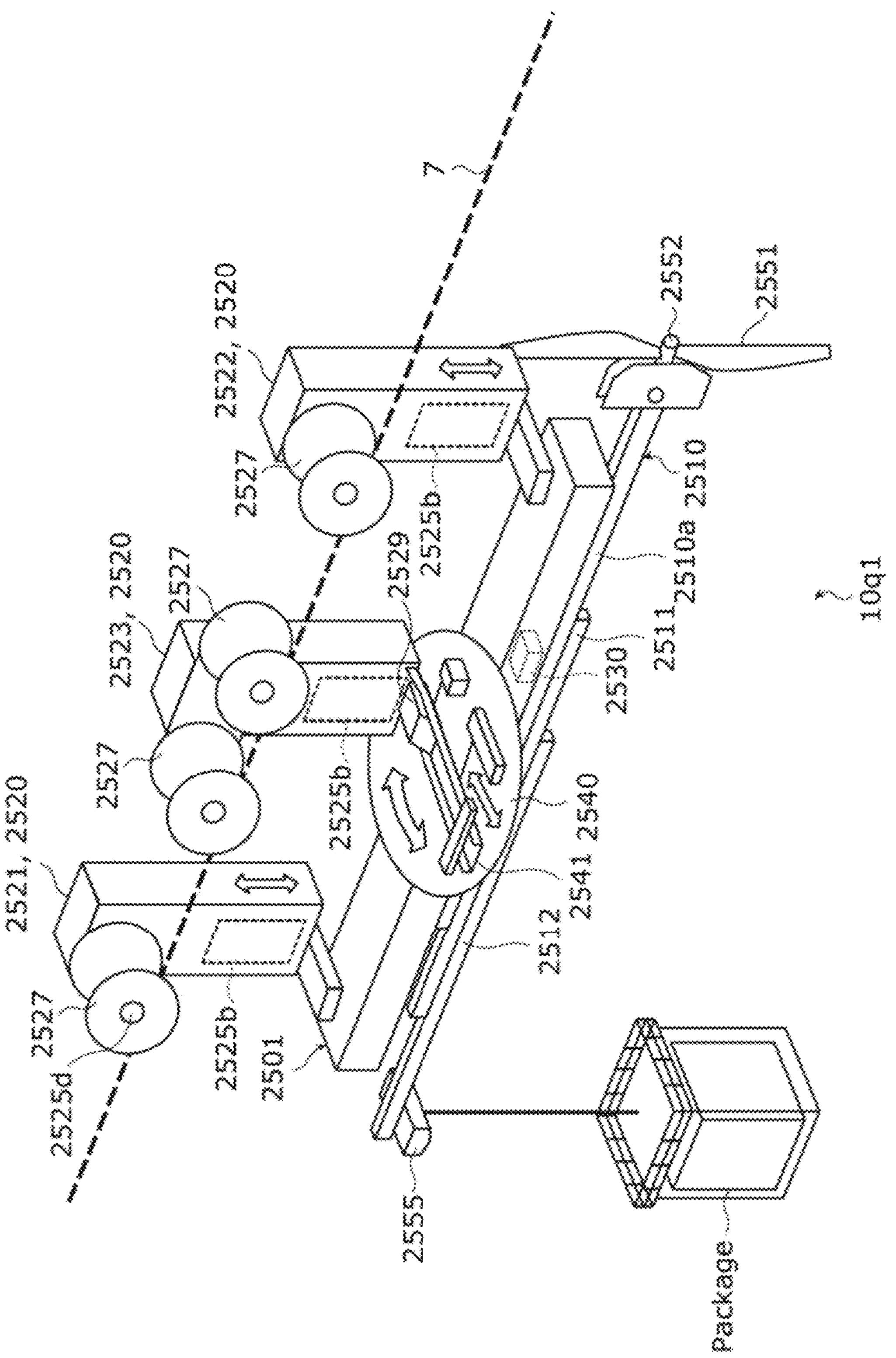

FIG. 176 is a top view and a side view of another example of a rail and rail support members according to a variation of Embodiment FIG. 177 is a perspective view illustrating an example of a package transport device according to Embodiment 21.

Figure 178A:
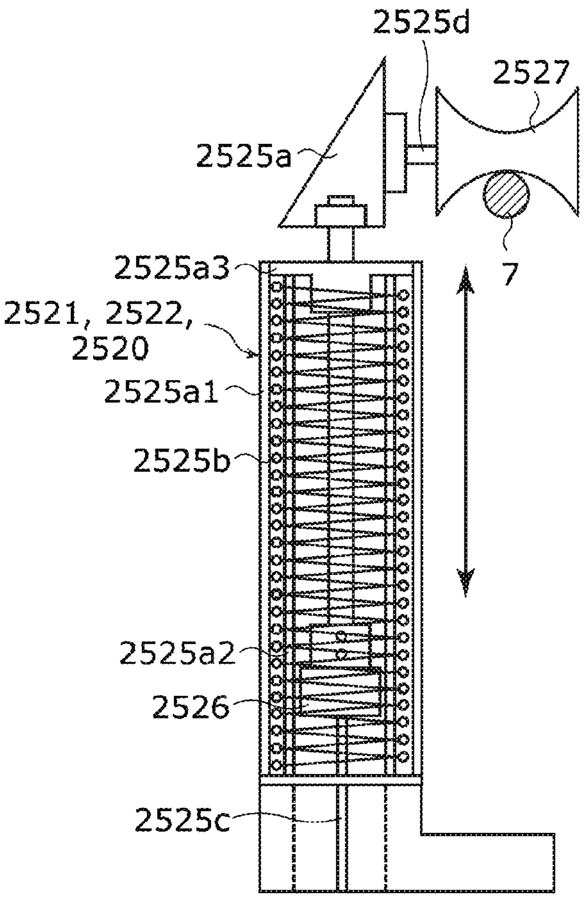

FIG. 178A illustrates the internal structure of a first connector and a second connector of the package transport device according to Embodiment 21.

Figure 178B:
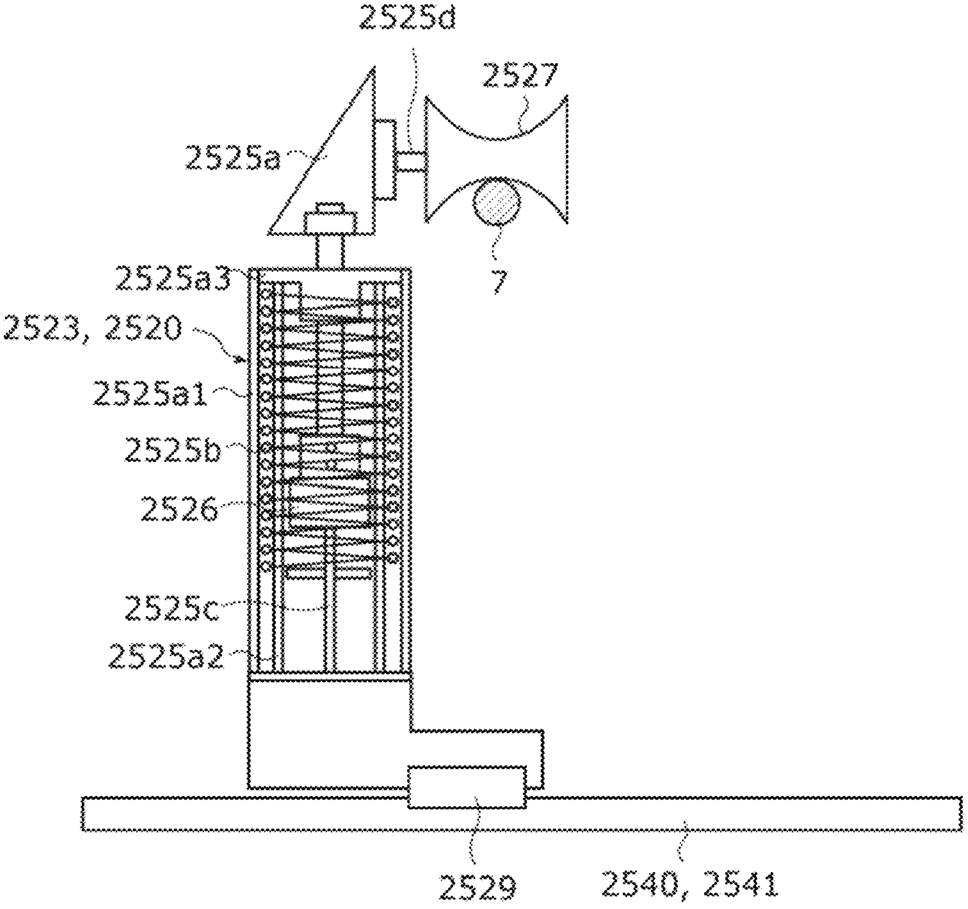

FIG. 178B illustrates the internal structure of a third connector of the package transport device according to Embodiment 21.

Figure 179A:
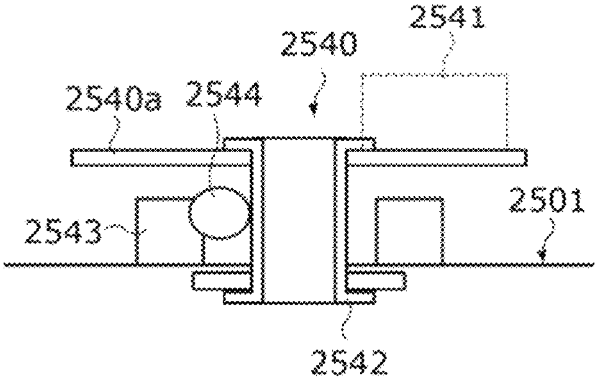

FIG. 179A illustrates an example of the internal structure of a turntable of the package transport device according to Embodiment 21.

Figure 179B:
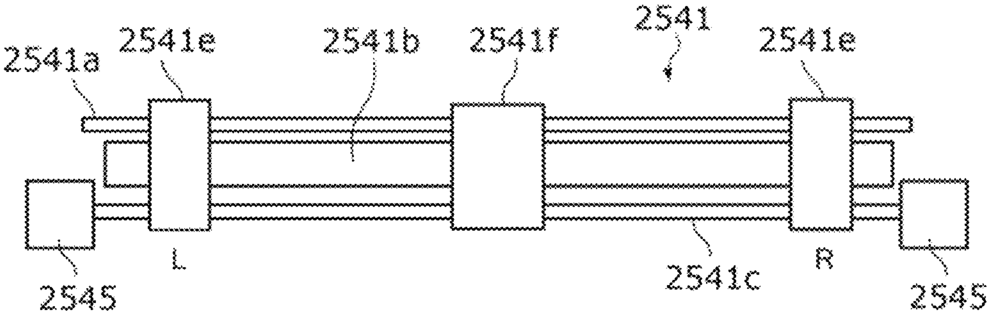

FIG. 179B is a side view illustrating an example of a slide rail of the package transport device according to Embodiment 21.

Figure 179C:
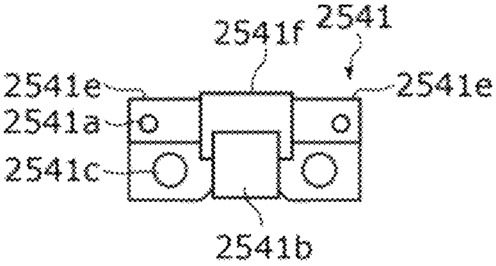

FIG. 179C is a front view illustrating an example of a slide rail of the package transport device according to Embodiment 21.

Figure 179D:
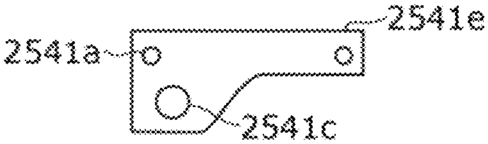

FIG. 179D is a front view illustrating an example of the left side components, a ball screw, and a guide of the slide rail of the package transport device according to Embodiment 21.

Figure 179E:
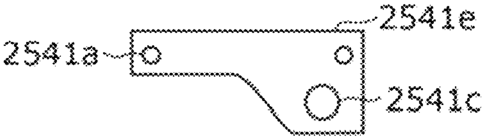

FIG. 179E is a front view illustrating an example of the right side components, a ball screw, and a guide of the slider of the package transport device according to Embodiment 21.

Figure 180:
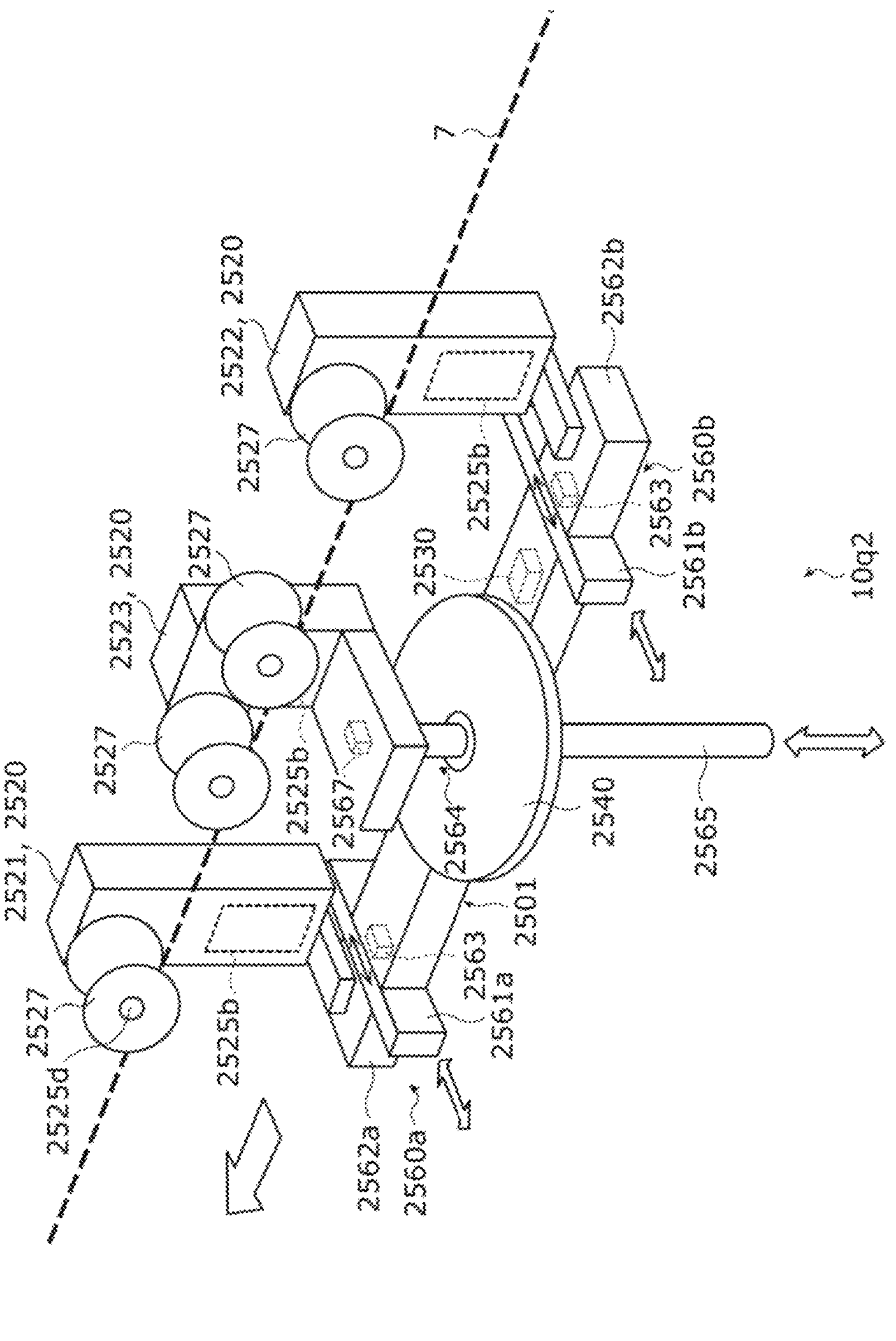

FIG. 180 is a perspective view illustrating an example of a package transport device according to a variation of Embodiment 21.

Figure 181A:
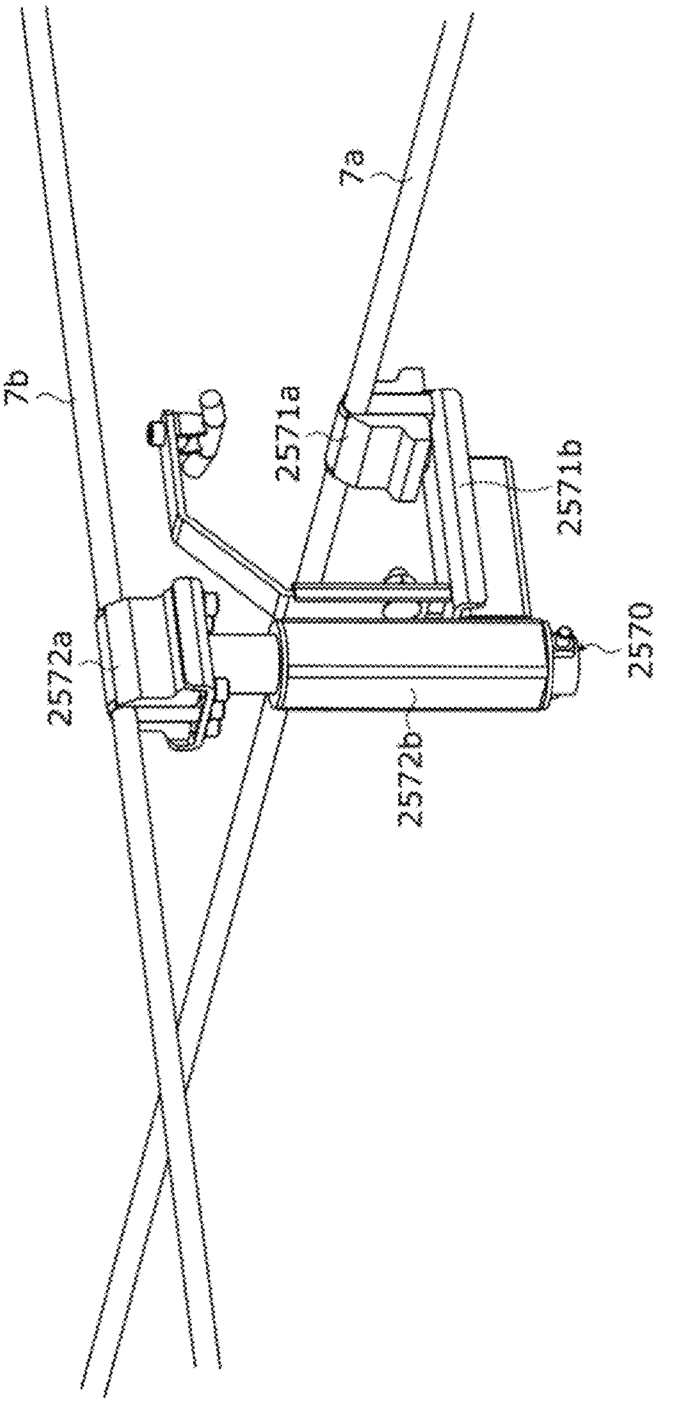

FIG. 181A is a perspective view illustrating an example of a rail and a rail coupling according to Embodiment 22.

Figure 181B:
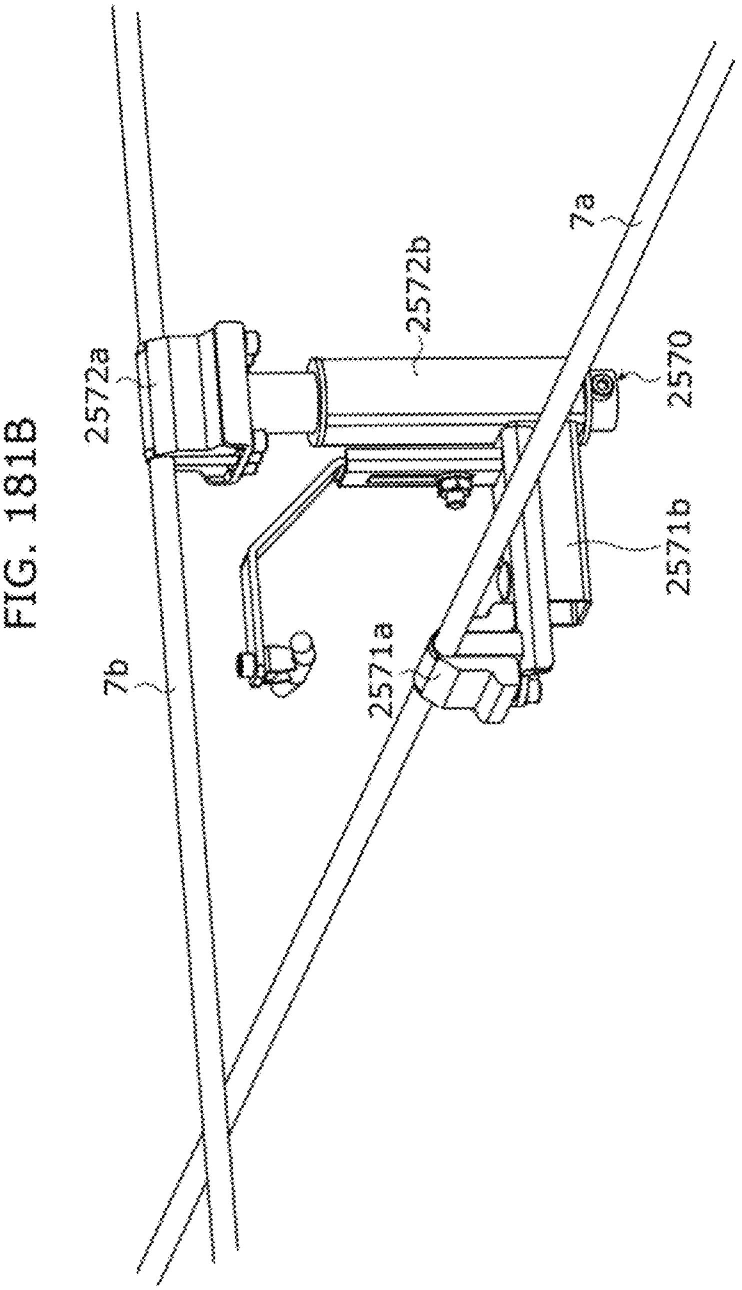

FIG. 181B is another perspective view illustrating an example of the rail and rail the coupling according to Embodiment 22.

Figure 182:
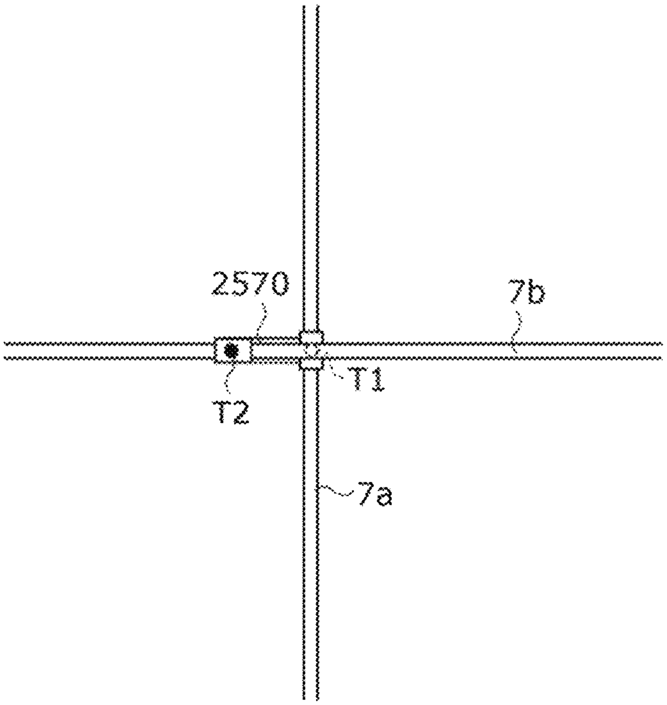

FIG. 182 is a perspective view illustrating a first coupling point of a first rail and a second coupling point of a second rail according to Embodiment 22.

Figure 183:
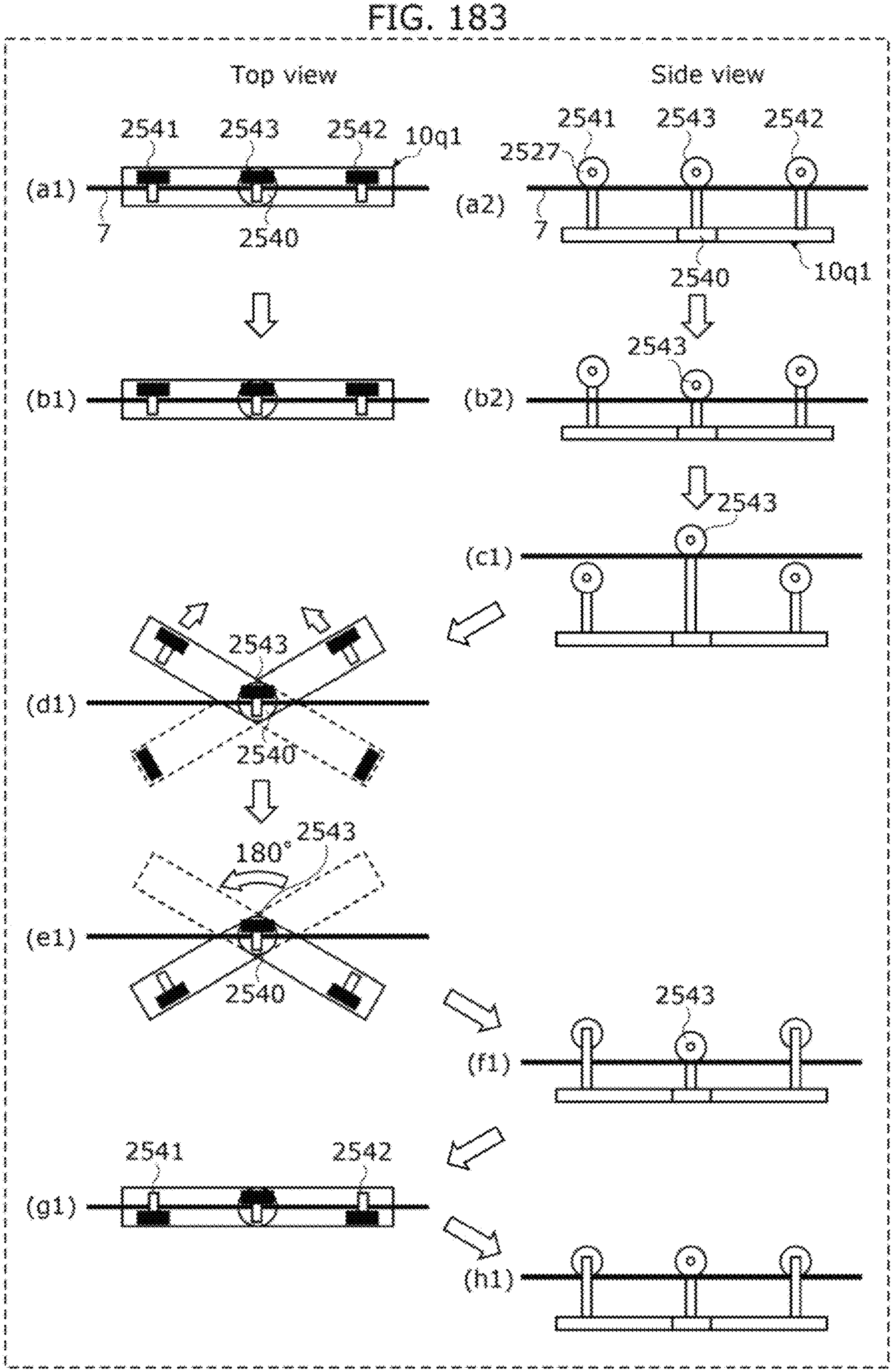

FIG. 183 is a top view and a side view illustrating an operation of a package transport device according to Embodiment 23.

Figure 184A:
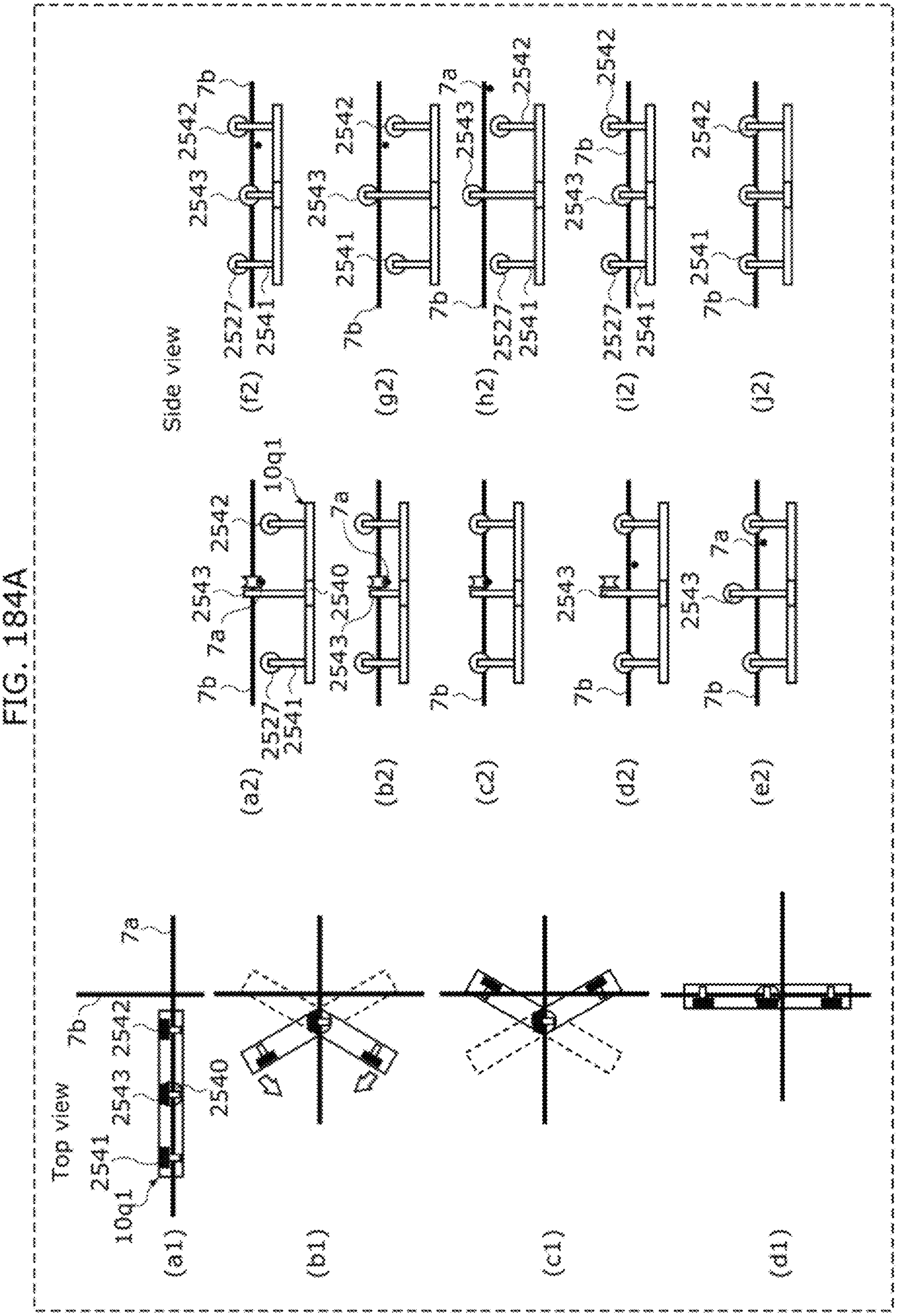

FIG. 184A is a top view and a side view illustrating an operation in which the package transport device according to Embodiment 23 turns left at the intersection of the first rail and the second rail.

Figure 184B:
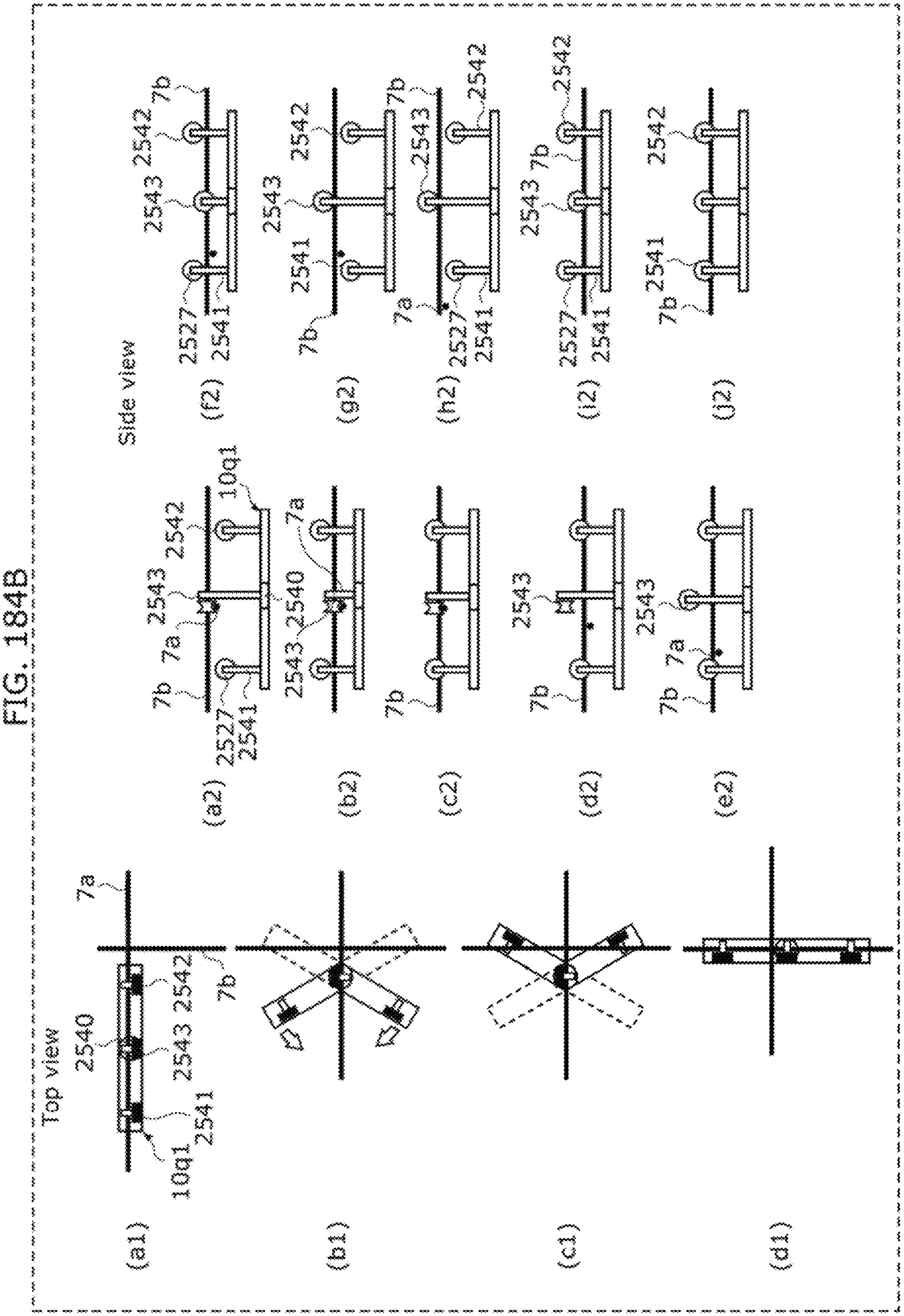

FIG. 184B is a top view and a side view illustrating an operation in which the package transport device according to Embodiment 23 turns right at the intersection of the first rail and the second rail.

Figure 185:
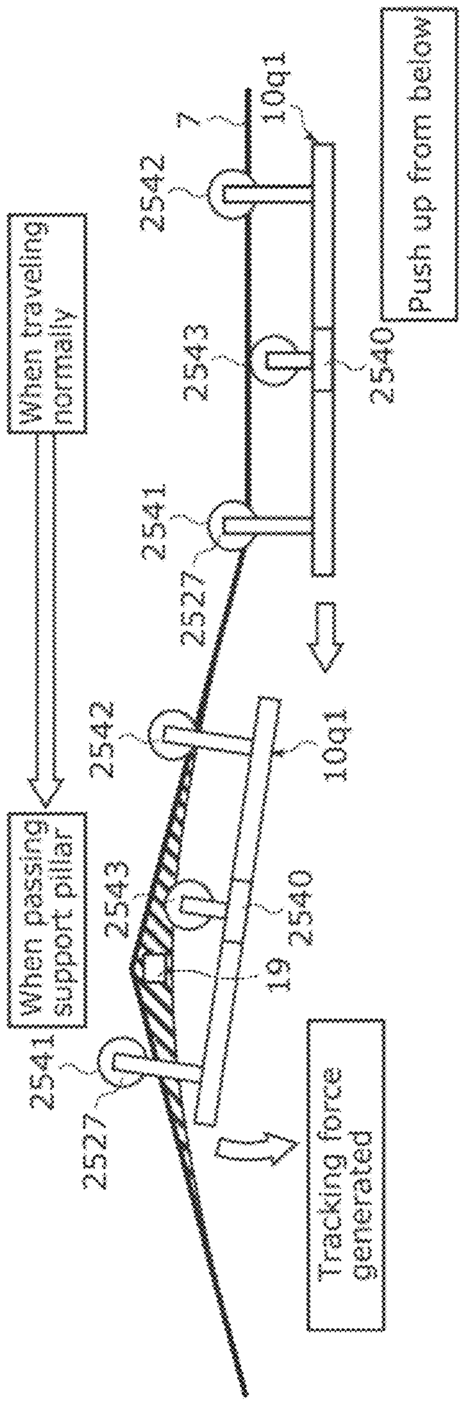

FIG. 185 is a side view illustrating an operation in which the package transport device according to Embodiment 23 passes a support pillar that supports a rail.

Figure 186:
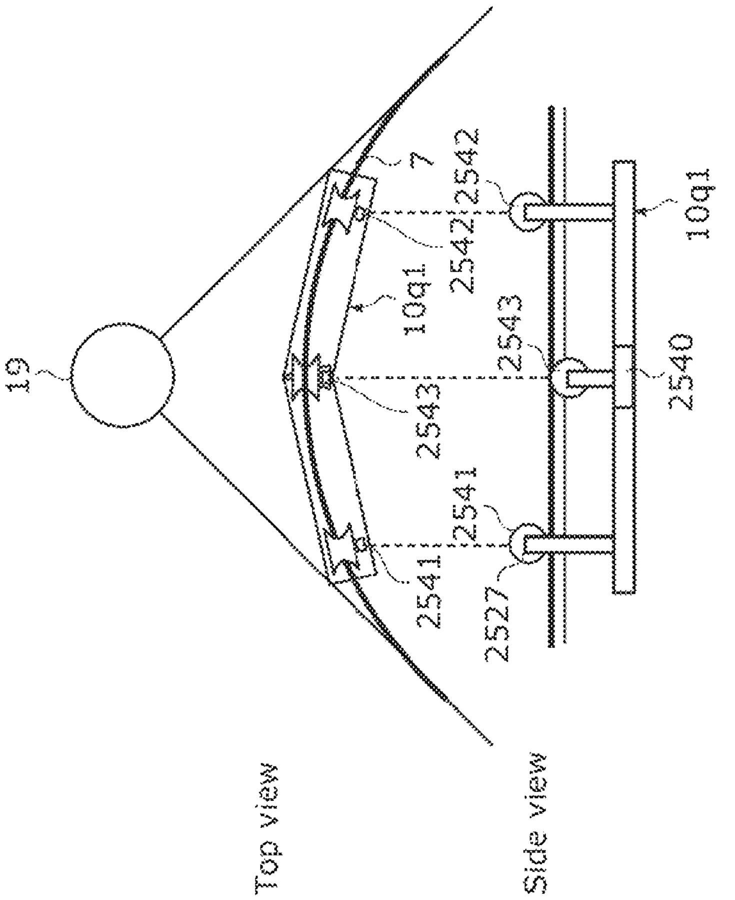

FIG. 186 is a top view and a side view illustrating an operation of the package transport device passing a curved rail according to Embodiment 23.

DESCRIPTION OF EMBODIMENTS

A package transport device according to one aspect of the present disclosure includes: a main body; a rail holder held by a rail located above the main body; a turntable that is provided between the main body and the rail holder and rotates the main body; a first slider portion that extends with respect to the main body; and a package holder that holds a package attached to the first slider portion.

With this, the first slider portion can carry the package holder holding the package to a position spaced away from the rail. Accordingly, a package can be delivered to the receiver without having to install separate rails at the receiver.

Moreover, since the first slider portion can carry a package, the package transport device can be kept away from people. People are therefore less likely to feel stress from the sound or presence of the package transport device. Accordingly, the package transport device is less likely to cause anxiety when carrying a package.

A control method according to another aspect of the present disclosure is a method of controlling a package transport device. The package transport device includes: a main body; a rail holder held by a rail located above the main body; a turntable that is provided between the main body and the rail holder and rotates the main body; a first slider portion that extends with respect to the main body; and a package holder that holds a package attached to the first slider portion. The method includes: rotating the main body by the turntable; and extending the first slider portion with respect to the main body after the turntable rotates the main body.

This control method achieves the same advantageous effects as described above.

In the control method according to another aspect of the present disclosure, the main body includes a frame that is rectangular in plan view, the first slider portion includes the package holder at one end of the first slider portion, and a counterweight of a predetermined weight at an other end of the first slider portion. In the rotating, the main body is rotated until a lengthwise direction of the frame approximately perpendicularly intersects an extending direction of the rail. In the extending, the first slider portion is extended from both ends of the frame in the lengthwise direction of the rectangular frame so as to maintain balance between a weight of the package and a weight of the counterweight.

This control method achieves the same advantageous effects as described above.

In the control method according to another aspect of the present disclosure, the rail holder includes: a first rail holder located on one side of the frame in the lengthwise direction of the frame; a second rail holder located on an other side of the frame in the lengthwise direction of the frame; and a third rail holder located in a central region of the frame between the one side and the other side in the lengthwise direction of the frame. The package transport device further includes: a second slider portion that is disposed between the first rail holder and the main body and extends with respect to the main body; and a third slider portion that is disposed between the second rail holder and the main body and extends with respect to the main body. The turntable is disposed between the third rail holder and the main body. In the rotating, the turntable is rotated after the second slider portion and the third slider portion are extended to separate the first rail holder and the second rail holder from the rail.

This control method achieves the same advantageous effects as described above. By adjusting the position of the counterweight with respect to the main body, it is possible to tilt the attitude of the package transport device and extend the slider portion toward the receiver located higher or lower than the rail. Accordingly, the package can be delivered even to a receiver at a different height than the rail.

In the package transport device according to another aspect of the present disclosure, the first slider portion extends with respect to the main body after the turntable rotates the main body.

With this, after rotating the first slider portion so as to face the receiver, the first slider portion can be extended with respect to the main body. This makes it possible to more precisely deliver the package to the receiver.

In the package transport device according to another aspect of the present disclosure, the main body includes a frame that is rectangular in plan view, and the turntable rotates the main body until a lengthwise direction of the frame approximately perpendicularly intersects an extending direction of the rail.

This makes it possible to change the attitude of the frame with respect to the turntable by rotating the turntable. It is therefore possible to adjust the direction of extension of the first slider portion with respect to the main body. This makes it possible to more precisely deliver the package to the receiver.

In the package transport device according to another aspect of the present disclosure, the first slider portion: includes the package holder at one end of the first slider portion, and a counterweight of a predetermined weight at an other end of the first slider portion; and extends so as to maintain balance between a weight of the package and a weight of the counterweight.

With this, when the first slider portion is carrying a package, the attitude of the package transport device can be adjusted via the counterweight and the package. Accordingly, the position of the counterweight relative to the main body can be adjusted so as to maintain the horizontal attitude of the main body, for example. This makes it possible to more precisely deliver the package to the receiver.

In the package transport device according to another aspect of the present disclosure, the counterweight is a battery.

This makes it possible to adjust the attitude of the package transport device using a device required by the package transport device. This eliminates the need for a separate counterweight.

In the package transport device according to another aspect of the present disclosure, the first slider portion: includes the package holder at one end of the first slider portion, and a rotary wing at an other end of the first slider portion; and extends so as to maintain balance between a weight of the package and a buoyancy of the rotary wing.

With this, even if the package is heavy, the package transport device can deliver the package to a predetermined position at a predetermined height because it is difficult for the package transport device to be in a tilted attitude with respect to the horizontal plane.

In the package transport device according to another aspect of the present disclosure, the rail holder includes: a first holder held by the rail from above the rail; and a second holder held by the rail so as to push up on the rail from below.

With this, the rail holder can be connected to the rail so as to clamp the rail from above and below. This inhibits the package transport device from disengaging from the rail, thus inhibiting the package transport device from falling, which ensures the safety of the package transport device.

In the package transport device according to another aspect of the present disclosure, the rail holder includes: a first rail holder located on one side of the frame in the lengthwise direction of the frame; a second rail holder located on an other side of the frame in the lengthwise direction of the frame; and a third rail holder located in a central region of the frame between the one side and the other side in the lengthwise direction of the frame.

This inhibits the package transport device from disengaging from the rail since the package transport device is supported by the rail by three rail holders. With this, the package transport device can be inhibited from falling, which ensures the safety of the package transport device.

In the package transport device according to another aspect of the present disclosure, the first rail holder includes a first rotating roller that contacts the rail and is actuated by an electric motor, the second rail holder includes a second rotating roller that contacts the rail and is actuated by an electric motor, the third rail holder includes a third rotating roller and a fourth rotating roller that contact the rail and are actuated by an electric motor.

This allows the package transport device to move along the rail because the rotating rollers contact the rail. Moreover, since four rotating rollers contact the rail, the package transport device can stably move along the rail.

The package transport device according to another aspect of the present disclosure further includes: a second slider portion that is disposed between the first rail holder and the main body and extends with respect to the main body; and a third slider portion that is disposed between the second rail holder and the main body and extends with respect to the main body. The turntable is disposed between the third rail holder and the main body. The turntable rotates the main body after the second slider portion and the third slider portion extend and the first rail holder and the second rail holder are separated from the rail.

With this, with two rails of different heights, the package transport device can transfer from one rail to the other by extending the slider portion. This allows the package transport device to turn right or left when traveling on the rail.

In the package transport device according to another aspect of the present disclosure, the third rail holder holds the rail so as to push up on the rail from below, and the first rail holder and the second rail holder are held by the rail, above the rail.

With this, the first rail holder, the second rail holder, and the third rail holder can sandwich the rail, allowing the package transport device to move stably along the rail.

The package transport device according to another aspect of the present disclosure further includes a motor that rotates the rail holder so as to release a hold of the rail holder by the rail so as to avoid contact between a rail support portion that supports the rail and the rail holder when the package transport device is traveling on the rail.

With this, when the package transport device is traveling on the rail, it can avoid the rail support portion so as to not contact the rail holder. This allows the package transport device to travel along the rail toward the receiver.

An unmanned aerial vehicle according to one aspect of the present disclosure includes: a main body having a first length in a first direction and a second length in a second direction orthogonal to the first direction, the first length being longer than the second length; a plurality of main rotary wings that rotate in a virtual plane parallel to the first direction and the second direction; a plurality of main motors that are provided on the main body and respectively rotate the plurality of main rotary wings; at least one connecting device that is provided on the main body and is hangable from at least one rail spaced apart from a ground surface; at least one auxiliary rotary wing that provides propulsion force for propelling the main body in the first direction; at least one auxiliary motor that is provided on the main body and rotates the at least one auxiliary rotary wing; and a control circuit that controls the plurality of main motors and the at least one auxiliary motor.

With this, the main body can be connected to and hanging from the rail via the connecting device, thus preventing the unmanned aerial vehicle from falling even if the main rotary wings do not rotate.

Moreover, by the rotating auxiliary rotary wing while the connecting device is connected to and hanging from the rail, the unmanned aerial vehicle can move along the rail, and thus can move to the destination point. In this case, instead of actuating the main motor, the auxiliary motor can be actuated to move the unmanned aerial vehicle, thus reducing power consumption in the unmanned aerial vehicle.

In the unmanned aerial vehicle according to another aspect of the present disclosure, the at least one connecting device includes a first connecting device, a second connecting device, and a third connecting device. The first connecting device is positioned offset in the first direction from a center of the main body. The second connecting device is positioned offset in a direction opposite the first direction from the center of the main body. The third connecting device is positioned between the first connecting device and the second connecting device, near the center of the main body.

This enables the unmanned aerial vehicle to more safely transfer from one rail on which it is traveling to another by using three connecting devices.

Using three connecting devices also enables the unmanned aerial vehicle to more stably connect to the rails. Therefore, with the unmanned aerial vehicle, safety can be ensured.

The unmanned aerial vehicle according to another aspect of the present disclosure further includes a turntable disposed between the third connecting device and the main body, and a ratchet including an engagement receiving portion that engages with an engagement portion of the turntable by being biased by the turntable.

With this configuration, the orientation of the unmanned aerial vehicle can be rotated by rotating the turntable. When rotated by a predetermined angle, the engagement portion of the turntable and the engagement receiving portion of the ratchet engage to control the rotation of the turntable. Since this allows the main body to be oriented as desired, the unmanned aerial vehicle can safely transfer from one rail on which it is traveling to another.

In the control method according to another aspect of the present disclosure, the unmanned aerial vehicle includes a turntable disposed between the third connecting device and the main body of the unmanned aerial vehicle, and an orientation of the unmanned aerial vehicle is changed by rotating the main body relative to the turntable.

Since this configuration allows the main body to be oriented as desired, the unmanned aerial vehicle can safely transfer from one rail on which it is traveling to another.

In the unmanned aerial vehicle according to another aspect of the present disclosure, a first surface area of a first minimum rectangle that circumscribes a first projected surface formed by projecting the unmanned aerial vehicle onto a first plane whose normal vector extends in the first direction is smaller than a second surface area of a second minimum rectangle that circumscribes a second projected surface formed by projecting the unmanned aerial vehicle onto a second plane whose normal vector extends in the second direction.

With this configuration, the main body is elongated in the lengthwise direction of the rail, so the unmanned aerial vehicle can stably travel along the rail.

In the unmanned aerial vehicle according to another aspect of the present disclosure, the plurality of main rotary wings include: a first main rotary wing; a second main rotary wing adjacent to the first main rotary wing in the second direction; a third main rotary wing adjacent to the first main rotary wing in the first direction; and a fourth main rotary wing adjacent to the second main rotary wing in the first direction and adjacent to the third main rotary wing in the second direction. A first distance between the first main rotary wing and the second main rotary wing is shorter than a second distance between the first main rotary wing and the third main rotary wing.

This configuration enables the first main rotary wing and the second main rotary wing to be arranged along the lengthwise direction of the rail and the third main rotary wing and the fourth main rotary wing to be arranged along the lengthwise direction of the rail. Accordingly, the attitude of the main body can be further stabilized when the unmanned aerial vehicle travels along the rail.

In the unmanned aerial vehicle according to another aspect of the present disclosure, a rotary shaft of the at least one auxiliary motor extends in the first direction.

This configuration enables the unmanned aerial vehicle to easily impart a propulsion force for causing the unmanned aerial vehicle to travel along the rail.

In the unmanned aerial vehicle according to another aspect of the present disclosure, the at least one auxiliary rotary wing is positioned lower than the virtual plane.

This configuration can keep the main rotary wing from making contact with the auxiliary rotary wing, and thus the safety of the unmanned aerial vehicle can be increased.

In the unmanned aerial vehicle according to another aspect of the present disclosure, a rotary shaft of the at least one auxiliary motor has an angle of inclination relative to the first direction that is variable in a plane whose normal vector extends in the second direction.

With this configuration, since the rotary shaft of the auxiliary motor is variable, the unmanned aerial vehicle can be rotated in the yaw direction (horizontal direction). This makes it possible to change the orientation of the unmanned aerial vehicle.

In the unmanned aerial vehicle according to another aspect of the present disclosure, each of the at least one connecting device includes: a fixed portion; a first arm including one end connected to the fixed portion and an other end that opens and closes relative to the fixed portion; a second arm including one end connected to the fixed portion and an other end that opens and closes relative to the fixed portion; a first actuator that opens and closes the first arm; and a second actuator that opens and closes the second arm. The control circuit controls the first actuator and the second actuator. The first arm is positioned in front of the second arm in the first direction.

With this, when the first arm of the unmanned aerial vehicle is connected to the first rail, the first arm can be disconnected from the first rail after the second arm is connected to a second rail, which is a different rail. This allows the unmanned aerial vehicle to switch connections (transfer) from the first rail to the second rail and continue moving.

In the unmanned aerial vehicle according to another aspect of the present disclosure, a first region enclosed by the first arm in a closed state and the fixed portion is separated from a second region enclosed by the second arm in a closed state and the fixed portion.

With this, a single connector can be used to simultaneously connect to two rails. This makes it possible to stabilize the attitude of the unmanned aerial vehicle.

In the unmanned aerial vehicle according to another aspect of the present disclosure, each of the at least one connecting device includes: an arm that is hangable from the at least one rail; and a roller that is provided on an inner peripheral surface of the arm and rotatably contacts the at least one rail.

Accordingly, when the connector of the unmanned aerial vehicle is connected to the rail, the roller contacts and rolls on the rail, allowing the unmanned aerial vehicle to move along the rail. In other words, the unmanned aerial vehicle is able to move along the rail using only its own propulsion in the traveling direction. Accordingly, since the unmanned aerial vehicle does not have to expend energy on lift force to lift itself, the unmanned aerial vehicle can save energy.

A system according to another aspect of the present disclosure includes: the unmanned aerial vehicle; a device including at least one first adapter connectable to at least one package to be delivered by the unmanned aerial vehicle and at least one second adapter attachable to and detachable from the unmanned aerial vehicle; and a wire that connects the unmanned aerial vehicle and the device. The unmanned aerial vehicle includes a reel to which one end of the wire is connected and a lift motor that reels out the wire.

With this, even if there is an obstacle in the vicinity of the predetermined position, the first device and the second device can be moved to avoid the obstacle. It is therefore possible to deliver the package to the predetermined position with certainty since the second device can be moved to a position vertically above the predetermined position.

In the system according to another aspect of the present disclosure, the device includes: a support member provided with the at least one first adapter; a plurality of motors disposed on a plurality of side surfaces of the support member; and a plurality of propellers actuated by the plurality of motors. An angle of each of rotary shafts of the plurality of motors relative to a virtual surface passing through a center of each of the plurality of propellers is at least −45 degrees and at most +45 degrees.

According to this, by controlling the angle of the rotary shafts of the plurality of motors relative to the virtual surface, when the package is to be placed at a predetermined position, the package can be positioned relative to the predetermined position.

In the system according to another aspect of the present disclosure, the plurality of side surfaces include a first side surface and a second side surface that oppose each other in the first direction in an attached state in which the device is attached to the unmanned aerial vehicle, and a third side surface and a fourth side surface that oppose each other in the second direction in the attached state. The plurality of motors include a first motor disposed on the first side surface, a second motor disposed on the second side surface, a third motor disposed on the third side surface, and a fourth motor disposed on the fourth side surface. The plurality of propellers include a first propeller rotated by the first motor, a second propeller rotated by the second motor, a third propeller rotated by the third motor, and a fourth propeller rotated by the fourth motor.

With this, the device can be made to travel in a desired direction by actuating the first motor, the second motor, the third motor, and the fourth motor. This allows the device to finely adjust its position relative to a predetermined position accurately.

A control method according to one aspect of the present disclosure is a control method of controlling an unmanned aerial vehicle, the unmanned aerial vehicle including: a main body having a first length in a first direction and a second length in a second direction orthogonal to the first direction, the first length being longer than the second length; a plurality of main rotary wings that rotate in a virtual plane parallel to the first direction and the second direction; a plurality of main motors that are provided on the main body and respectively rotate the plurality of main rotary wings; at least three connecting devices that are provided on the main body and are hangable from at least one rail spaced apart from a ground surface; at least one auxiliary rotary wing that provides propulsion force for propelling the main body in the first direction; at least one auxiliary motor that is provided on the main body and rotates the at least one auxiliary rotary wing; and a control circuit that controls the plurality of main motors and the at least one auxiliary motor. A first connecting device is positioned offset in the first direction from a center of the main body, a second connecting device is positioned offset in a direction opposite the first direction from the center of the main body, and a third connecting device is positioned between the first connecting device and the second connecting device, near the center of the main body. The control method includes: when the unmanned aerial vehicle switches connection from a first rail to a second rail at an intersection of the first rail and the second rail: determining whether the first connecting device has approached the second rail; when it is determined that the first connecting device has approached the second rail, detaching the first connecting device from the first rail and propelling the unmanned aerial vehicle in the first direction by rotating the at least one auxiliary rotary wing; determining whether the first connecting device has passed the second rail; and when it is determined that the first connecting device has passed the second rail, detaching the second connecting device from the first rail, rotating the unmanned aerial vehicle until the first direction of the unmanned aerial vehicle is parallel to a direction of extension of the second rail, and after rotation of the unmanned aerial vehicle, connecting the first connecting device and the second connecting device to the second rail.

This configuration allows the unmanned aerial vehicle to reliably switch connections (transfer) from the first rail to the second rail.

In the control method according to another aspect of the present disclosure, when it is determined that the first connecting device has passed the second rail, the first connecting device is connected to the first rail and whether a center of gravity of the unmanned aerial vehicle is balanced is determined; and when it is determined that the center of gravity of the unmanned aerial vehicle is balanced, the first connecting device and the second connecting device are detached from the first rail, the unmanned aerial vehicle is rotated until the first direction of the unmanned aerial vehicle is parallel to a direction of extension of the second rail, and after rotation of the unmanned aerial vehicle, the first connecting device and the second connecting device are connected to the second rail.

With this, even if the second rail is inclined with respect to the first rail, for example, the unmanned aerial vehicle can reliably switch connections (transfer) from the first rail to the second rail by changing the balance of the center of gravity of the unmanned aerial vehicle.

In the control method according to another aspect of the present disclosure, after the first connecting device and the second connecting device are connected to the second rail after rotation of the unmanned aerial vehicle, an attitude of the third connecting device is matched to an attitude of each of the first connecting device and the second connecting device by detaching the third connecting device from the first rail and rotating the turntable.

With this configuration, when the third connecting device is detached from the first rail, the attitude of the third connecting device can be matched to the respective attitudes of the first connecting device and the second connecting device. This enables the third connecting device to be connected to the second rail together with the first connecting device and the second connecting device.

In the control method according to another aspect of the present disclosure, the unmanned aerial vehicle includes a rotary wing for rotation that is disposed in a position corresponding to the at least one auxiliary rotary wing in the first direction, and an orientation of the unmanned aerial vehicle is changed using a propulsion force of the rotary wing for rotation.

With this configuration, the traveling direction of the unmanned aerial vehicle can be easily changed by rotating the rotary wing.

A lifting system according to another aspect of the present disclosure may include: an unmanned aerial vehicle; a first device attachable to and detachable from the unmanned aerial vehicle; a first wire that connects the first device and the unmanned aerial vehicle; a first reel capable of reeling in the first wire; a second device attachable to and detachable from a package and attachable to and detachable from the first device; a second wire that connects the first device and the second device; a second reel capable of reeling in the second wire; and a controller. When the unmanned aerial vehicle is in a position separated from the ground, the controller may: detach the first device and the second device from the unmanned aerial vehicle; cause the first reel to reel out the first wire; detach the second device from the first device; and cause the second reel to reel out the second wire.

With this, even when it is difficult to carry the package to a predetermined position, such as when there is an obstacle vertically above the predetermined position, it is possible to move the first device and the second device so as to avoid the obstacle. It is therefore possible to deliver the package to the predetermined position with certainty since the second device can be moved to a position vertically above the predetermined position.

In the lifting system according to another aspect of the present disclosure, the first device may include: a first support member attachable to and detachable from the unmanned aerial vehicle; a plurality of first motors disposed on a plurality of side portions of the first support member; and a plurality of first propellers actuated by the plurality of first motors. The second device may include: a second support member attachable to and detachable from the first device; a plurality of second motors disposed on a plurality of side portions of the second support member; and a plurality of second propellers actuated by the plurality of second motors.

With this, the position of the first device relative to the unmanned aerial vehicle can be adjusted, and the position of the second device relative to the first device can be adjusted. This makes it possible to move the first device and the second device so as to avoid an obstacle. As a result, the package can be reliably delivered to the predetermined position.

In the lifting system according to another aspect of the present disclosure, the controller may: actuate at least one of the plurality of first motors or the plurality of second motors after detaching the first device and the second device from the unmanned aerial vehicle, and actuate the plurality of first motors and the plurality of second motors after detaching the second device from the first device.

This makes it possible to move the first device and the second device as a single unit to a destination position for avoiding the obstacle. Therefore, the controller can inhibit an increase in the processing burden of actuating and controlling the plurality of first motors and the plurality of second motors.

In the lifting system according to another aspect of the present disclosure, after detaching the second device from the first device, the controller may control the plurality of first motors and control the plurality of second motors differently than the plurality of first motors to make a first hanging direction and a second hanging direction mutually different, the first hanging direction being a direction in which the first wire extends between the unmanned aerial vehicle and the first device, and the second hanging direction being a direction in which the second wire extends between the first device and the second device.

With this, even if there is an obstacle vertically above the predetermined position, the first device and the second device can be positioned so as to reliably bypass the obstacle. As a result, with this lifting system, the package can be reliably delivered to the predetermined position.

In the lifting system according to another aspect of the present disclosure, after detaching the second device from the first device, the controller may control the plurality of first motors and control the plurality of second motors differently than the plurality of first motors to reduce or eliminate an amount of overlap between the first device and the second device in terms of area size in a view perpendicular to a ground surface.

With this, the relative positions of the first device and the second device can be changed so that the first device is not disposed vertically above the second device. Accordingly, even if there is an obstacle vertically above the predetermined position, the first device and the second device can be positioned so as to reliably bypass the obstacle. As a result, the package can be reliably delivered to the predetermined position.

In the lifting system according to another aspect of the present disclosure, after detaching the package from the second device, the controller may: reel in the second wire using the second reel; attach the second device to the first device; reel in the first wire using the first reel; and attach the first device and the second device to the unmanned aerial vehicle.

With this, after delivering the package to the predetermined position, the second device can be attached to the first device while reeling in the second wire, and the first device and the second device can be attached to the unmanned aerial vehicle while reeling in the first wire. As a result, it is possible to prevent the first wire and the second wire from being damaged or entangled due to contact with an obstacle or the like. This makes it possible to inhibit a decrease in the operating efficiency of the lifting system.

In the lifting system according to another aspect of the present disclosure, the unmanned aerial vehicle may include an arm capable of engaging a rail, and when the unmanned aerial vehicle is in a position separated from the ground and the arm is engaged with the rail, the controller may detach the first device and the second device from the unmanned aerial vehicle.

This makes it possible to hold the unmanned aerial vehicle onto the rail via the arm. As a result, even if the first device and the second device are detached from the unmanned aerial vehicle, the first device and the second device can be held via the first wire and the second wire. This makes it possible to inhibit the first device and the second device from falling.

Since the unmanned aerial vehicle can be held onto the rail without flying, energy consumption by the unmanned aerial vehicle can be reduced.

In the lifting system according to another aspect of the present disclosure, the lifting system may include: a third device attachable between and detachable from between the first device and the second device; a third wire that connects the first device and the third device; a third reel capable of reeling in the third wire; a fourth wire that connects the third device and the second device; and a fourth reel capable of reeling in the fourth wire.

With this, after delivering the package to the predetermined position, the second device can be attached to the third device while reeling in the fourth wire, the second device and the third device can be attached to the first device while reeling in the third wire, and the second device, the third device, and the first device can be attached to the unmanned aerial vehicle while reeling in the first wire. As a result, it is possible to prevent the first wire, the third wire, and the fourth wire from being damaged or entangled due to contact with an obstacle or the like. This makes it possible to inhibit a decrease in the operating efficiency of the lifting system.

In the lifting system according to another aspect of the present disclosure, an angle of each of rotary shafts of the plurality of first motors relative to a virtual surface passing through a center of each of the plurality of first propellers is at least −45 degrees and at most +45 degrees.

According to this, by controlling the angle of the rotary shafts of the plurality of motors relative to the virtual surface, when the package is to be placed at a predetermined position, the package can be positioned relative to the predetermined position. It is possible to finely adjust the positions of the first device and the second device relative to the predetermined position by causing the first device and the second device to travel in the desired direction.

When the first device and the second device descend while the support member is hanging from the object via the wire, it is possible to finely adjust the positions of the first device and the second device so that the package aligns with the predetermined position when viewed from the vertical direction.

Accordingly, with the first device and the second device, the package can be placed in the predetermined position. In particular, when the first device and the second device are used outdoors, even if the first device and the second device are misaligned with the predetermined position due to wind or the like, the first device and the second device can move toward the predetermined position to compensate for the misalignment so that package can be placed at the predetermined position.

The lifting system according to another aspect of the present disclosure further includes one or more actuators that adjust the angle of each of the rotary shafts of the plurality of first motors relative to the virtual surface.

This makes it possible to adjust the attitudes of the plurality of first motors relative to the support member. Accordingly, this allows the first device and the second device to move horizontally and vertically. This allows for more accurate positioning of the package to align with the predetermined position.

In the lifting system according to another aspect of the present disclosure, the one or more actuators incline each of the rotary shafts so that the angle is 0 degrees in a first mode, and incline each of the rotary shafts so that the angle is an elevation angle in a second mode.

This makes it possible to individually control the attitude of each rotary shaft of one or more motors among the plurality of rotary shafts of the plurality of motors. Therefore, the positions of the first device and the second device can be fine-tuned more precisely because the attitude, traveling direction, etc., of the first device and the second device can be finely controlled to move the first device and the second device to a predetermined position.

In the lifting system according to another aspect of the present disclosure, the first wire is directly connected to at least one connection point of the first support member.

This makes it possible to hang the first support member via the first wire with only one connection point on the first support member. Accordingly, the configuration of the first wire can be simplified.

In the lifting system according to another aspect of the present disclosure, the first wire includes a first main wire and a plurality of first sub-wires. One ends of the plurality of first sub-wires are respectively directly connected to a plurality of connection points of the first support member, and other ends of the plurality of first sub-wires are connected to one end of the first main wire at a single common connection point. The first main wire hangs and supports the first support member from the unmanned aerial vehicle via the plurality of first sub-wires.

This makes it possible to connect the plurality of first sub-wires to the first support member in one-to-one correspondence via the plurality of connection points. Therefore, the attitude of the first support member while it is hanging by the first main wire and the first sub-wires can be stabilized.

In the lifting system according to another aspect of the present disclosure, the first support member includes a first frame that is polygonal, and the plurality of connection points are arranged at a plurality of portions of the first frame corresponding to a plurality of vertices.

With this, the attitude of the first support member while it is hanging by the first wire can be more reliably stabilized.

In the lifting system according to another aspect of the present disclosure, the first support member includes a first frame that is polygonal, and the at least one connection point is movable in a plane that is within the first frame and parallel to a virtual surface.

This makes it possible to change the position of the one connection point relative to the first support member. Accordingly, for example, even if the center of gravity of the first support member that is holding a package is displaced from the center, the position of the connection point can be changed so as to align the position of the connection point with the center of gravity. Therefore, the attitude of the first support member hanging from the first wire can be corrected to a desired attitude.

In the lifting system according to another aspect of the present disclosure, the plurality of side portions of the first support member includes a first side portion and a second side portion on opposite sides of at least one of the first support member or the package. The plurality of first motors include a first first motor provided on the first side portion and including a first rotary shaft, and a second first motor provided on the second side portion and including a second rotary shaft. The controller executes a third mode that rotates the first rotary shaft in a first direction of rotation and rotates the second rotary shaft in a second direction of rotation opposite the first direction of rotation, and a fourth mode that rotates the first rotary shaft and the second rotary shaft in the second direction of rotation.

With this, by making the direction of rotation of the first rotary shaft of the first motor and the direction of rotation of the second rotary shaft of the second motor opposite directions, the first device and the second device can produce a thrust that causes it to travel in a desired direction. This allows the first device and the second device to finely adjust its position relative to a predetermined position accurately.

In the lifting system according to another aspect of the present disclosure, the plurality of first motors further include a third first motor that is provided on the first side portion in a position adjacent to the first first motor in a virtual surface and includes a third rotary shaft, and a fourth first motor that is provided on the second side portion in a position adjacent to the second first motor in the virtual surface and includes a fourth rotary shaft. The controller rotates the third rotary shaft in the second direction of rotation and rotates the fourth rotary shaft in the first direction of rotation in the third mode, and rotates the third rotary shaft and the fourth rotary shaft in the first direction of rotation in the fourth mode.

With this, by making the direction of rotation of the third rotary shaft of the third motor and the direction of rotation of the fourth rotary shaft of the fourth motor opposite directions, the device can produce a thrust that causes it to travel in a desired direction. Since the directions of rotation of the first rotary shaft of the first motor and the second rotary shaft of the second motor can be controlled, the device can finely adjust its position relative to a predetermined position accurately.

In the lifting system according to another aspect of the present disclosure, the second device further includes a sensor that detects a position of a storage device for housing the package.

This enables the position of the device relative to the storage device to be accurately detected, allowing for more accurate and finer adjustment of the position of the device relative to the storage device.

An unmanned aerial vehicle according to another aspect of the present disclosure includes: a main body having a first length in a first direction and a second length in a second direction orthogonal to the first direction, the first length being longer than the second length; a plurality of main rotary wings that rotate in a virtual plane parallel to the first direction and the second direction; a plurality of main motors that are provided on the main body and respectively rotate the plurality of main rotary wings; at least one connecting device (connector) that is provided on the main body, extends from the main body in a third direction intersecting the virtual plane, and is hangable from at least one rail spaced apart from a ground surface; at least one auxiliary rotary wing that provides propulsion force for propelling the main body in the first direction; at least one auxiliary motor that is provided on the main body and rotates the at least one auxiliary rotary wing; and a control circuit that controls the plurality of main motors and the at least one auxiliary motor.

In the unmanned aerial vehicle according to another aspect of the present disclosure, the plurality of main rotary wings include a fifth main rotary wing that rotates in coaxial inversion relative to the first main rotary wing, a sixth main rotary wing that rotates in coaxial inversion relative to the second main rotary wing, a seventh main rotary wing that rotates in coaxial inversion relative to the third main rotary wing, and an eighth main rotary wing that rotates in coaxial inversion relative to the fourth main rotary wing.

In the unmanned aerial vehicle according to another aspect of the present disclosure, the at least one auxiliary rotary wing and the at least one auxiliary motor are arranged at one end of the main body in the first direction.

In the unmanned aerial vehicle according to another aspect of the present disclosure, each of the at least one auxiliary rotary wing includes a plurality of blades each having a variable pitch angle, and the control circuit controls the pitch angle.

In the unmanned aerial vehicle according to another aspect of the present disclosure, each of the at least one auxiliary rotary wing includes a plurality of blades, and a distance between a rotary shaft of the at least one auxiliary motor and the virtual plane is longer than a length of each of the plurality of blades.

In the unmanned aerial vehicle according to another aspect of the present disclosure, each of the at least one auxiliary rotary wing is attached to the main body so as to be slidable in the third direction.

In the unmanned aerial vehicle according to another aspect of the present disclosure, the plurality of main rotary wings include two blades, and the control circuit stops the two blades in a position parallel to the first direction when stopping the plurality of main motors and operating the at least one auxiliary motor.

In the unmanned aerial vehicle according to another aspect of the present disclosure, the at least one connecting device includes a first connecting device and a second connecting device adjacent to the first connecting device in the first direction.

In the unmanned aerial vehicle according to another aspect of the present disclosure, the at least one rail includes a first rail and a second rail that extend parallel to each other, and the at least one connecting device includes a first arm hangable from the first rail and a second arm hangable from the second rail.

In the unmanned aerial vehicle according to another aspect of the present disclosure, each of the at least one connecting device includes: a fixed portion; a first arm including one end connected to the fixed portion and another end that opens and closes with respect to the fixed portion; a second arm including one end connected to the fixed portion and another end that opens and closes with respect to the fixed portion; a first actuator that opens and closes the first arm; and a second actuator that opens and closes the second arm. The control circuit controls the first actuator and the second actuator. A first region enclosed by the first arm in the closed state and the fixed portion are separated from a second region enclosed by the second arm in the closed state and the fixed portion.

In the unmanned aerial vehicle according to another aspect of the present disclosure, the fixed portion includes a partition portion that extends in the third direction and separates a first region and a second region.

A system according to another aspect of the present disclosure includes an unmanned aerial vehicle and a device including at least one first adapter connectable to at least one package to be delivered by the unmanned aerial vehicle and at least one second adapter attachable to and detachable from the unmanned aerial vehicle.

The system according to another aspect of the present disclosure further includes a wire that connects the unmanned aerial vehicle and the device, and the unmanned aerial vehicle further includes a reel to which one end of the wire is connected and a lift motor that reels out the wire.

In the system according to another aspect of the present disclosure, the control circuit detaches, from the unmanned aerial vehicle, the device to which the at least one package is attached, and causes the lift motor to reel out the wire.

In the system according to another aspect of the present disclosure, the control circuit disconnects the at least one package from the device, and causes the lift motor to reel in the wire.

In the system according to another aspect of the present disclosure, the at least one package includes a plurality of packages, and the at least one first adapter includes a plurality of first adapters individually attachable to and detachable from the plurality of packages.

An unmanned aerial vehicle according to another aspect of the present disclosure includes: a main body; a first movable body movably connected to the main body on a first side of the main body; a second movable body movably connected to the main body on a second side of the main body, the second side being opposite to the first side; a plurality of first motors arranged on the first movable body; a plurality of second motors arranged on the second movable body; a plurality of first rotary wings respectively rotated by the plurality of first motors; a plurality of second rotary wings respectively rotated by the plurality of second motors; and at least one connecting device that extends upward from the main body and is hangable from at least one rail spaced apart from a ground surface.

The unmanned aerial vehicle according to another aspect of the present disclosure further includes: a first actuator capable of changing a first angle of the first movable body relative to the main body; a second actuator capable of changing a second angle of the second movable body relative to the main body; and a control circuit that controls the plurality of first motors, the plurality of second motors, the first actuator, and the second actuator.

In the unmanned aerial vehicle according to another aspect of the present disclosure, the control circuit switches between the following modes (a) through (c) via the first actuator and the second actuator: (a) a first mode that places first rotary shafts of the plurality of first motors and second rotary shafts of the plurality of second motors in a vertical orientation; (b) a second mode that places the first rotary shafts in a first horizontal direction orientation and places the second rotary shafts in the vertical orientation; and (c) a third mode places the first rotary shafts in the first horizontal direction orientation and places the second rotary shafts in a second horizontal direction orientation opposite the first horizontal direction orientation.

In the unmanned aerial vehicle according to another aspect of the present disclosure, the first horizontal direction and the second horizontal direction each point outward from the main body.

A control method according to one aspect of the present disclosure is a control method of an unmanned aerial vehicle. The unmanned aerial vehicle holds a transported item requiring cold or heat retention. The control method includes: a first obtainment step of obtaining a destination position of the unmanned aerial vehicle; a second obtainment step that obtains a current position of the unmanned aerial vehicle; and a third obtainment step of obtaining an expected time at which the transported item is expected to reach a permissible upper temperature limit. When a time at which the unmanned aerial vehicle will reach the destination position from the current position is later than the expected time, the unmanned aerial vehicle is caused to move to the departure position, and when a time at which the unmanned aerial vehicle will reach the destination position from the current position is at or earlier than the expected time, the unmanned aerial vehicle is caused to move to the destination position.

With this, the unmanned aerial vehicle can deliver the transported item to the destination position or cancel transportation of the transported item and return to the departure position according to the expected time. Accordingly, the quality of the transported item can be protected and the availability of the unmanned aerial vehicle can be inhibited from reducing.

A control method according to one aspect of the present disclosure is a control method of an unmanned aerial vehicle. The unmanned aerial vehicle holds a transported item requiring cold or heat retention. The control method includes: a fourth obtainment step of obtaining a departure position of the unmanned aerial vehicle; a fifth obtainment step of obtaining a destination position of the unmanned aerial vehicle; and a sixth obtainment step of obtaining a current position of the unmanned aerial vehicle; a seventh obtainment step of obtaining a permissible upper temperature limit of the transported item. When a distance from the current position to the destination position is greater than a predetermined value, the unmanned aerial vehicle is caused to move to the departure position, and when the distance from the current position to the destination position is less than or equal to the predetermined value, the unmanned aerial vehicle is caused to move to the destination position. The predetermined value is a value at which a temperature of the transported item will reach the permissible upper temperature limit when the unmanned aerial vehicle is caused to move at a predetermined speed.

With this, the unmanned aerial vehicle can deliver the transported item to the destination position or cancel transportation of the transported item and return to the departure position according to the current position. Accordingly, the quality of the transported item can be protected and the availability of the unmanned aerial vehicle can be inhibited from reducing.

In the control method according to another aspect of the present disclosure, the predetermined value is calculated as $V\times(t_Z-t_C)$, where V is the predetermined speed, $t_Z$ is a time at which the temperature of the transported item will reach the permissible upper temperature limit, and $t_C$ is a time at the current position.

This enables monitoring of the temperature of the transported item to ensure that the transported item is delivered to the user at the appropriate temperature. This inhibits the delivery of a transported item to the user that deviates from the permissible upper temperature limit.

A control method according to another aspect of the present disclosure is a control method of a delivery box, and includes a measurement step of measuring an amount of power held by the delivery box, and a transmission step of, when the amount of power is greater than a predetermined value, measuring a weight of a package inside the delivery box, which is a transported item stored in the delivery box, and transmitting information indicating the weight of the package to a server.

With this configuration, the weight of the inside of the delivery box can be measured to determine whether or not a package is stored inside the delivery box.

In the control method according to another aspect of the present disclosure, the delivery box includes a door, and the control method further includes a power generation step of generating power by the opening and closing of the door, and storing the power.

With this configuration, power can be automatically generated by the action of the opening and closing of the door of the delivery box, whereby the delivery box can save energy.

The control method according to another aspect of the present disclosure further includes a transmission step of transmitting information pertaining to the opening and closing of the door to the server when the amount of power is greater than a predetermined value.

With this configuration, information pertaining to the opening and closing of door can be transmitted using power stored by power generation. With this, the delivery box can save energy.

An information provision method according to another aspect of the present disclosure is a method in a management system used for a service that delivers a product to a vending machine using an unmanned transport vehicle, and includes: obtaining request information requesting display of a vending machine usable as a pickup location for the product; generating, based on a database that manages reservation statuses of vending machines, a list that is related to a plurality of vending machines included in a predetermined area and includes first information indicating whether each of the plurality of vending machines is usable or not in each of deliverable time periods; and displaying, on a display of an information terminal, the list in response to the request information.

In information provision method according to another aspect of the present disclosure, the list further includes second information indicating a deadline by which the user is to pick up the product, and the second information is generated with reference to a reservation status of the vending machine in the predetermined time period or a reservation status used when the vending machine was used as a product pickup point in the past, based on the database that manages the reservation statuses of the vending machines.

An information provision method according to another aspect of the present disclosure is a method in a management system used for a service that delivers a product to a vending machine using an unmanned transport vehicle, and includes: obtaining request information requesting display of a product list of products sold at a first store; obtaining first store information indicating a product sold at the first store and inventory of the product; obtaining second store information indicating a product sold at a second store located within a predetermined distance from the first store and inventory of the product; generating, based on the first store information and the second store information, the product list including a first product in stock at the first store and a second product in stock at the second store and not in stock at the first store; and displaying the product list on a display of the information terminal.

In the information provision method according to another aspect of the present disclosure, the first product and the second product are displayed in different aspects when displaying the product list on the display of the information terminal.

In the information provision method according to another aspect of the present disclosure, the first product is displayed in a first color and the second product is displayed in a second color when displaying the product list on the display of the information terminal.

In the information provision method according to another aspect of the present disclosure, the first product is displayed in color and the second product is displayed in gray when displaying the product list on the display of the information terminal.

A vending machine according to another aspect of the present disclosure is used in a service that delivers a product to a vending machine using an unmanned transport vehicle, and includes: an enclosure including a first space and a second space; a floor plate that is located within the enclosure and is for placing the product; a movement mechanism that is located within the enclosure and includes a motor and moves the floor plate along a loop route by actuation of the motor; and a controller that is located within the enclosure and controls the movement mechanism. The loop route includes a first route that is located within the first space and moves the floor plate on which the product is placed in a downward gravitational direction, and a second route that is located within the second space and moves the floor plate in an upward gravitational direction.

In the vending machine according to another aspect of the present disclosure, in a view from the upward gravitational direction, the second space is narrower than the first space.

In the vending machine according to another aspect of the present disclosure, the floor plate has a first form in the first space, and a second form different from the first form in the second space.

In the vending machine according to another aspect of the present disclosure, an upper surface of the floor plate is perpendicular to the gravitational direction in the first form and parallel to the gravitational direction in the second form.

In the vending machine according to another aspect of the present disclosure, the floor plate changes from the first form to the second form by rotating about a line including a center of gravity of the floor plate.

In the vending machine according to another aspect of the present disclosure, the floor plate is foldable, and changes from the first form to the second form by folding.

The vending machine according to another aspect of the present disclosure further includes a lock structure for fixing the floor plate in the first form.

In the vending machine according to another aspect of the present disclosure, the enclosure further includes a third space for storing the product when the user does not come to pick up the product, and after a predetermined amount of time, the controller controls the movement mechanism to move the floor plate that is located in the first space and on which the product is placed to the third space via a third route branched from the loop route.

In the vending machine according to another aspect of the present disclosure, the enclosure includes an openable and closable top lid located above in the gravitational direction, and when the top lid is open, the product is placed within the vending machine via a wire that extends downward from the unmanned transport vehicle located vertically above the vending machine.

In the vending machine according to another aspect of the present disclosure, the enclosure includes an openable and closable top lid located above in the gravitational direction, and when the top lid is open, the product is placed within the vending machine via a wire that extends downward from the unmanned transport vehicle located vertically above the vending machine.

A control method according to another aspect of the present disclosure is a control method in a management system used in a service that delivers a product sold at a store to a vending machine using an unmanned transport vehicle, and includes: obtaining information indicating product 1 ordered by the user from a information terminal possessed by the user, information indicating a receiver (delivery destination) of product 1, and information indicating delivery time 1 of product 1; obtaining, from a store terminal, a box ID for identifying a predetermined box in the store, the predetermined box being used for receipt of the ordered product 1 by the unmanned transport vehicle; managing the information indicating product 1, the information indicating the receiver of product 1, the information indicating delivery time 1 of product 1, and the box ID in association with each other; and transmitting the box ID and the information indicating the receiver of product 1 to the unmanned transport vehicle.

The control method according to another aspect of the present disclosure further includes, upon obtaining information indicating to change the delivery time of product 1 from delivery time 1 to delivery time 2 from the information terminal of the user, managing the information indicating product 1, the information indicating the receiver of product 1, information indicating delivery time 2 of product 1, and the box ID in association with each other.

A control method of an unmanned transport vehicle according to another aspect of the present disclosure is a method in a management system used in a service that delivers a product to a vending machine using an unmanned transport vehicle, and includes: obtaining position information indicating the current position of an information terminal possessed by a user, from the information terminal; obtaining scheduled time information indicating a scheduled time of pickup at the vending machine of a product ordered by the user from the information terminal of the user; determining whether it is possible for the user to pick up the product from the vending machine at the scheduled time based on the position information and the scheduled time information; and after determining that it is possible for the user to pick up the product from the vending machine at the scheduled time, controlling an actuator of the unmanned transport vehicle and causing the unmanned transport vehicle to collect the product at a store that sells the product.

In the control method of the unmanned transport vehicle according to another aspect of the present disclosure, determining that it is possible for the user to pick up the product from the vending machine at the scheduled time when the current position of the information terminal is located within a predetermined area including the vending machine.

An information provision method according to another aspect of the present disclosure is an information provision method in a management system used in a service that delivers a product to a vending machine using an unmanned transport vehicle, and includes: obtaining position information indicating the current position of an information terminal possessed by a user, from the information terminal; obtaining scheduled time information indicating a scheduled time of pickup at the vending machine of a product ordered by the user; determining whether it is possible for the user to pick up the product from the vending machine at the scheduled time based on the position information and the scheduled time information; and after determining that it is possible for the user to pick up the product from the vending machine at the scheduled time, transmitting, to a store that sells the product, information instructing to start preparation for the unmanned transport vehicle to collect the product.

In the information provision method of the unmanned transport vehicle according to another aspect of the present disclosure, determining that it is possible for the user to pick up the product from the vending machine at the scheduled time when the current position of the information terminal is located within a predetermined area including the vending machine.

A control method of an unmanned transport vehicle according to another aspect of the present disclosure is a method in a management system used in a service that delivers a product to a vending machine using an unmanned transport vehicle, and includes: obtaining position information indicating the current position of an information terminal possessed by a user, from the information terminal; obtaining scheduled time information indicating a scheduled time of pickup at the vending machine of a product ordered by the user from the information terminal of the user; determining whether it is possible for the user to pick up the product from the vending machine at the scheduled time based on the position information and the scheduled time information; and after determining that it is possible for the user to pick up the product from the vending machine at the scheduled time, controlling an actuator of the unmanned transport vehicle and moving the product from the unmanned transport vehicle to inside the vending machine.

In the control method of the unmanned transport vehicle according to another aspect of the present disclosure, determining that it is possible for the user to pick up the product from the vending machine at the scheduled time when the current position of the information terminal is located within a predetermined area including the vending machine.

An information provision method according to another aspect of the present disclosure is a method in a management system used for a service that delivers a product to a vending machine using an unmanned transport vehicle, and includes: obtaining request information requesting display of a vending machine usable as a pickup location for the product; obtaining weather information including an estimate of wind speed at a predetermined area; generating, based on the weather information and a database that manages the reservation statuses of vending machines, a list that is related to a plurality of vending machines included in the predetermined area and includes information indicating whether each of the plurality of vending machines is usable or not in each of deliverable time periods, wherein in the list, a predetermined vending machine is displayed as unusable in a predetermined time at which estimate of the wind speed in an area including the predetermined vending machine is greater than or equal to a predetermined wind speed; and displaying, on a display of an information terminal, the list in response to the request information.

A control method of an unmanned transport vehicle according to another aspect of the present disclosure is a method in a management system used in a service that delivers a product to a vending machine using an unmanned transport vehicle, and includes: obtaining scheduled time information indicating a scheduled time of pickup at the vending machine of a product ordered by a user from the information terminal of the user; obtaining weather information indicating an estimate of wind speed at an area including the vending machine; and when it is determined that the wind speed at the area including the vending machine is greater than or equal to a predetermined wind speed at the scheduled time based on the scheduled time information and the weather information, transmitting a message, to an information terminal possessed by the user, for confirming whether to change the delivery time or cancel the order.

A control method of an unmanned transport vehicle according to another aspect of the present disclosure is a method in a management system used in a service that delivers a product to a vending machine using an unmanned transport vehicle, and includes: obtaining fullness information of a first vending machine; and when it is determined that the first vending machine is currently full based on the fullness information, transmitting a notification to an information terminal possessed by the user prompting selection of a first option, a second option, or a third option. The first option is to pick up the product at a second vending machine different than the first vending machine, the second option is to change a pickup time of the product at the first vending machine, and the third option is to have the user directly receive the product.

The control method of the unmanned transport vehicle according to another aspect of the present disclosure further includes, in response to receipt of selection of the first option from the information terminal of the user, transmitting to the information terminal a scheduled time of delivery of the product to the second vending machine and transmitting to a store system an instruction to start picking the product.

The control method of the unmanned transport vehicle according to another aspect of the present disclosure further includes, in response to receipt of selection of the second option from the information terminal of the user, transmitting to the information terminal a changed pickup time.

The control method of the unmanned transport vehicle according to another aspect of the present disclosure further includes, in response to receipt of selection of the third option from the information terminal of the user, transmitting to the information terminal a message related to the user directly receiving the product and transmitting to a store system an instruction to start picking the product.

A control method of an unmanned transport vehicle according to another aspect of the present disclosure is a method in a management system used in a service that delivers a product to a vending machine using an unmanned transport vehicle, and includes: obtaining image data from a camera included in the unmanned transport vehicle at a predetermined area including the receiver; determining whether a person is in the predetermined area based on the image data; and when a person is determined to be in the predetermined area, outputting predetermined speech from a speaker included in the unmanned transport vehicle.

In the control method of the unmanned transport vehicle according to another aspect of the present disclosure, the predetermined speech indicates at least one of the following: the product will now be unloaded from the unmanned transport vehicle; to not come near; to move away; to not move; or to remain still.

An information provision method according to another aspect of the present disclosure is an information provision method in a management system used in a service that delivers a product to a vending machine using an unmanned transport vehicle, and includes: obtaining position information indicating the current position of an information terminal possessed by a user, from the information terminal; obtaining scheduled time information indicating a scheduled time of pickup at the vending machine of a product ordered by the user; calculating a time at which the user should start going to the vending machine in order to receive the product from the vending machine at the scheduled time based on the position information and the scheduled time information; and outputting, via the information terminal, at or before the time, a notification informing the user to start going to the vending machine.

A vending machine according to another aspect of the present disclosure is used in a service that delivers a product to a vending machine using an unmanned transport vehicle, and includes: a display; an enclosure including an openable and closable top lid on which the display is provided; and a controller that sets a display mode of the display. The display mode includes a first display mode and second display mode. The first display mode enables ordering, via the display, of the product to be delivered to the vending machine by the unmanned transport vehicle. The second mode disables ordering, via the display, of the product. The controller sets the display to the second display mode when the top lid is opened and the product is being lowered into the vending machine from the unmanned transport vehicle.

An information provision method according to another aspect of the present disclosure is an information provision method in a management system used in a service that delivers a product to a vending machine using an unmanned transport vehicle, and includes: obtaining, from an information terminal possessed by the user, information indicating a product ordered from the user and information indicating the vending machine that is the receiver of the product; transmitting, to the unmanned transport vehicle, an instruction to deliver the product to the vending machine; after receiving information from the unmanned transport vehicle or the vending machine indicating that delivery of the product to the vending machine is complete, transmitting, to the information terminal, that the delivery of the product is complete; and displaying, on the information terminal, that the delivery of the product is complete.

An unmanned transport vehicle according to another aspect of the present disclosure includes an enclosure. The enclosure includes, in a view from upward gravitational direction, a first side, a second side adjacent to the first side, a third side adjacent to the second side, and a fourth side adjacent to the third side and the first side. The enclosure includes a first top lid and a second top lid. The first top lid is connected at the first side and openable and closable. The second top lid is connected at the second side and openable and closable. When the first top lid and the second top lid are closed, the first top lid and the second top lid include an overlapping region.

In the unmanned transport vehicle according to another aspect of the present disclosure, the enclosure further includes a third top lid that is connected at the third side and is openable and closable. When the second top lid and the third top lid are closed, the second top lid and the third top lid include an overlapping region.

In the unmanned transport vehicle according to another aspect of the present disclosure, the enclosure further includes a fourth top lid that is connected at the fourth side and is openable and closable. When the first top lid, the third top lid, and the fourth top lid are closed, the first top lid and the fourth top lid include an overlapping region, and the third top lid and the fourth top lid include an overlapping region.

A control method according to another aspect of the present disclosure is a control method in a transport system including passing a product transported by a first unmanned transport vehicle traveling in the air to a second unmanned transport vehicle traveling on the ground, and includes: transmitting an arrival instruction to the first unmanned transport vehicle instructing the first unmanned transport vehicle to arrive at a first location at a first time; transmitting an arrival instruction to the second unmanned transport vehicle instructing the second unmanned transport vehicle to arrive at the first location at a second time before the first time; and passing the product transported by the first unmanned transport vehicle to the second unmanned transport vehicle at the first location.

A delivery box according to another aspect of the present disclosure is for passing a product transported by a first unmanned transport vehicle traveling in the air to a second unmanned transport vehicle traveling on the ground, and includes: an enclosure, a first entrance provided in an upper portion of the enclosure for inserting the product transported by the first unmanned transport vehicle; and a second entrance provided in a lower portion of the enclosure for the second unmanned transport vehicle to enter.

A method according to another aspect of the present disclosure is for inspecting a power line using an unmanned transport vehicle. The unmanned transport vehicle travels along a rail connected between utility poles. The power line is located above the rail. The method includes: calculating distance y from a camera to the power line, the camera for capturing an image of the power line and included in the unmanned transport vehicle, using height h1 from the ground surface to the rail, deflection x of the rail when the unmanned transport vehicle travels over the rail, and height h3 from the ground surface to the power line; and capturing an image of the power line with the camera using the distance y as the focal length of the camera.

An unmanned transport vehicle according to another aspect of the present disclosure includes: a vehicle main body; a first connector that is connectable to a rail and is coupled to the vehicle main body; a second connector that is connectable to the rail and is coupled to the vehicle main body at a position spaced apart from the first connector; and a third connector that is connectable to the rail and is disposed between the first connector and the second connector. The first connector includes a first roller that rotatably contacts the rail. The second connector includes a second roller that rotatably contacts the rail. The third connector includes a third roller that rotatably contacts the rail.

The unmanned transport vehicle according to another aspect of the present disclosure further includes a turntable that is rotatable with respect to the vehicle main body. The second connector is coupled to the turntable, extends toward the rail from the turntable, is movable in the vertical direction with respect to the upper surface of the vehicle main body, and rotates in accordance with the rotation of the turntable.

The unmanned transport vehicle according to another aspect of the present disclosure further includes: a slide rail provided on the turntable; a slider block provided on the third connector; and a motor that applies an actuating force that moves the slider block along the slide rail.

The unmanned transport vehicle according to another aspect of the present disclosure further includes: a sliding mechanism that includes a connector support portion that is provided on the vehicle main body and slides along a horizontal direction that is orthogonal to the lengthwise direction of the vehicle main body and a slide main body that slidably supports the connector support portion.

A right and left turning method for an unmanned transport vehicle according to another aspect of the present disclosure. The unmanned transport vehicle includes: a vehicle main body; a first connector that is connectable to a rail and is coupled to the vehicle main body; a second connector that is connectable to the rail and is coupled to the vehicle main body at a position spaced apart from the first connector; a third connector that is connectable to the rail and is disposed between the first connector and the second connector; and a turntable that is rotatable with respect to the vehicle main body. The third connector is coupled to the turntable. The method includes, when the unmanned transport vehicle turns right or left from a first rail to a second rail or from the second rail to the first rail, the first rail and the second rail included in the rail and intersecting or three-dimensionally intersecting: causing the vehicle main body to ascend and separating the first connector and the second connector from the first rail; causing the vehicle main body to descend and placing the first connector and the second connector lower than the first rail; rotating the turntable to rotate the vehicle main body to place the first connector and the second connector vertically below the second rail; causing the vehicle main body to ascend and placing the first connector and the second connector higher than the second rail to couple the first connector and the second connector to the second rail; causing the vehicle main body to ascend and separating the third connector from the first rail; rotating the turntable; and coupling the third connector to the second rail.

A delivery box according to another aspect of the present disclosure includes: a carriage configured to house a package; an elevator path in which the carriage is raised and lowered; a box configured to house the package; and an actuator that raises and lowers the carriage inside the elevator path. The elevator path includes a loading door that covers a loading opening formed vertically upward. When the carriage is raised by the actuator in the elevator path, the carriage pushes up the loading door to open the loading door.

A delivery box according to another aspect of the present disclosures includes: a carriage configured to house a package; an elevator path in which the carriage is raised and lowered; a box configured to house the package that is in communication with the inside of the elevator path via a loading opening; a loading door capable of opening and closing the loading opening; and an actuator that raises and lowers the carriage inside the elevator path. The carriage includes a pin and a pin actuator that projects the pin from the carriage. The inside of the box is in communication with the inside of the elevator path via the loading opening. When the carriage is lowered by the actuator in the elevator path, the pin opens the loading door by the pin actuator projecting the pin from the carriage.

A rail coupling according to another aspect of the present disclosure couples a first rail and a second rail, and includes: a first rail coupler that couples to the first rail; a first rail extension that is connected to the first rail coupler and extends in a horizontal direction orthogonal to the lengthwise direction of the first rail; a second rail coupler that couples to the second rail; and a second rail extension that is connected to the second rail coupler, extends in a horizontal direction orthogonal to the lengthwise direction of the second rail, and is connected to the first rail extension. When the unmanned transport vehicle makes a right turn at an intersection or three-dimensional intersection of the first rail and the second rail which intersect or three-dimensionally intersect, the rail coupling is arranged on the left side in the traveling direction of the unmanned transport vehicle, and when the unmanned transport vehicle makes a left turn, the rail coupling is arranged on the right side in the traveling direction of the unmanned transport vehicle.

An unmanned aerial vehicle according to another aspect of the present disclosure includes: a vehicle main body; a first connector that is connectable to a rail and is coupled to the vehicle main body; a second connector that is connectable to the rail and is coupled to the vehicle main body at a position spaced apart from the first connector; and a third connector that is connectable to the rail and is disposed between the first connector and the second connector. When the unmanned aerial vehicle makes a right turn, the first connector and the second connector are arranged on the right side of the rail in the traveling direction of the unmanned transport vehicle, and the rail coupling is on the opposite side of the rail, and when the unmanned aerial vehicle makes a left turn, the first connector and the second connector are arranged on the left side of the rail in the traveling direction of the unmanned transport vehicle, and the rail coupling is on the opposite side of the rail.

In the unmanned aerial vehicle according to another aspect of the present disclosure, when the unmanned aerial vehicle makes a right turn, the third connector is arranged on the right side of the rail in the traveling direction of the unmanned transport vehicle, and the rail coupling is on the opposite side of the rail. The rail includes a first rail and a second rail. When the unmanned transport vehicle transfers from the first rail to the second rail or from the second rail to the first rail, the third connector separates from the first rail or the second rail and couples to the second rail or the first rail by extending.

In the unmanned aerial vehicle according to another aspect of the present disclosure, when the unmanned aerial vehicle makes a left turn, the third connector is arranged on the left side of the rail in the traveling direction of the unmanned transport vehicle, and the rail coupling is on the opposite side of the rail. The rail includes a first rail and a second rail. When the unmanned transport vehicle transfers from the first rail to the second rail or from the second rail to the first rail, the third connector separates from the first rail or the second rail and couples to the second rail or the first rail by extending.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The embodiments described below illustrate general or specific examples. The numerical values, shapes, materials, elements, the arrangement and connectivity of the elements, steps, the order of the steps, and so on given in the following embodiments are examples and are not intended to limit the present disclosure. Among elements described in the following embodiments, those not described in any of the independent claims are presented as optional elements.

Hereinafter, embodiments are specifically described with reference to the drawings.

Embodiment 1

Configuration

Figure 1A:
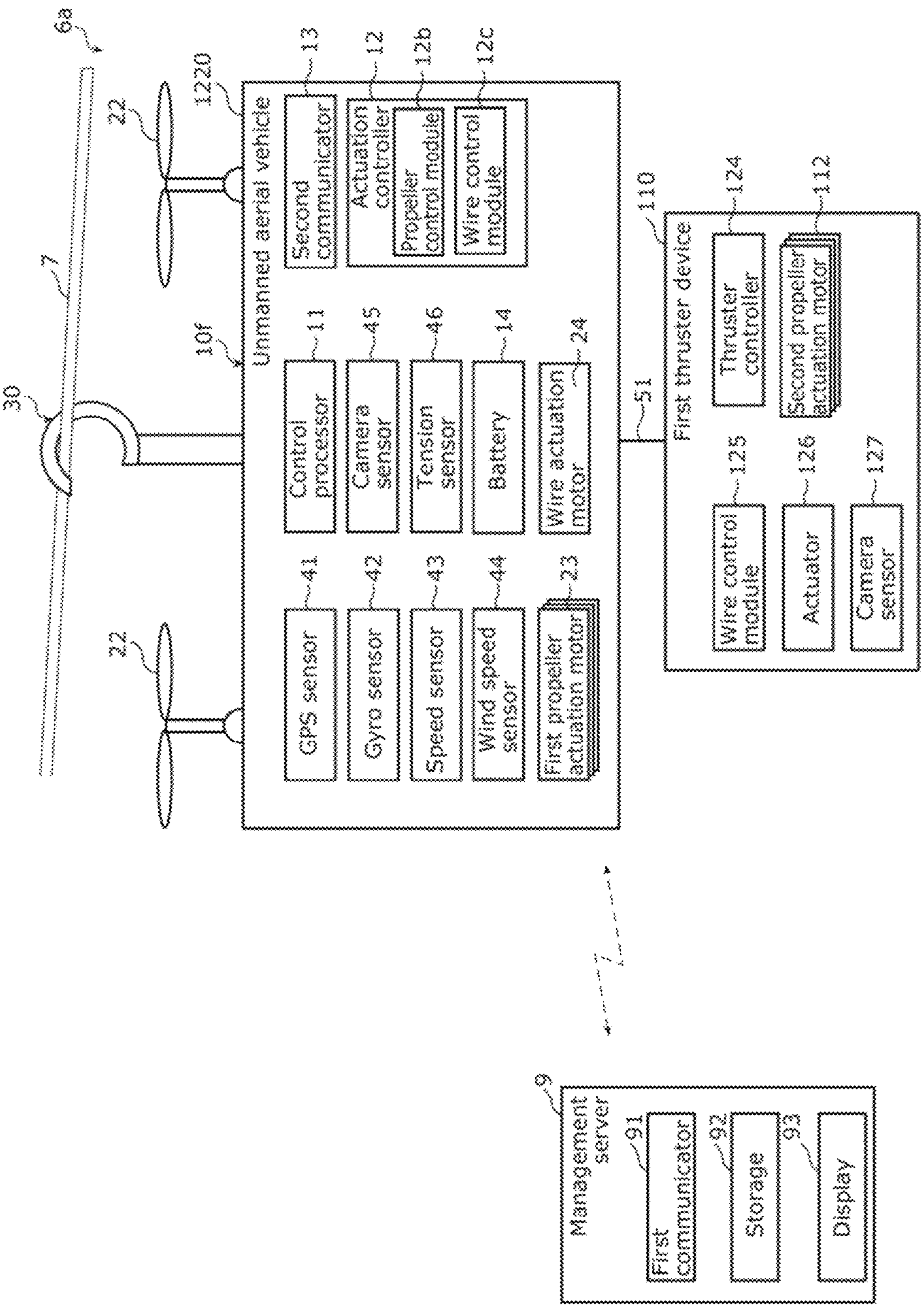
FIG. 1A is a block diagram illustrating an example of a management server according to Embodiment 1.
Figure 1B:
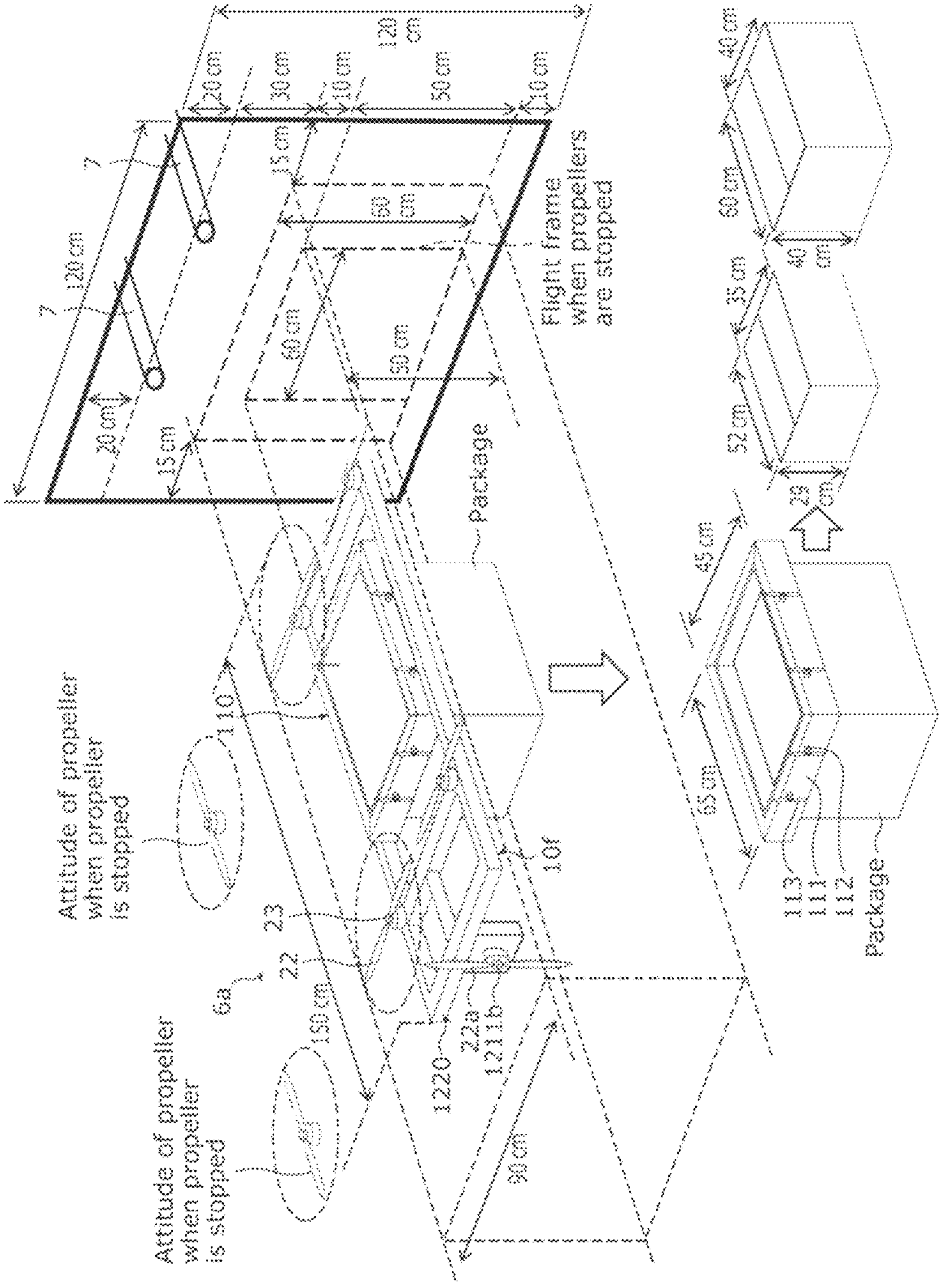
FIG. 1B is a perspective view illustrating an example of a lifting system and packages according to Embodiment 1.

FIG. 1A is a block diagram illustrating an example of management server 9 according to Embodiment 1. FIG. 1B is a perspective view illustrating an example of lifting system 6*a* and packages according to Embodiment 1.

As illustrated in FIG. 1A and FIG. 1B, the flying system is a system capable of delivering a package (an article) from a sender to a receiver using lifting system 6*a*. For example, lifting system 6*a* delivers a package to a receiver by unmanned aerial vehicle 10*f* carrying the package flying. The sender is the party that sends the package, and the receiver is the party that receives the package. In the present embodiment, the sender is a distribution center, such as a facility of a courier company or a convenience store that serves as a relay point, etc. In the present embodiment, the receiver is the party receiving the package, i.e., the destination, such as a home, a convenience store that serves as a relay point, or a delivery box provided at a home or a convenience store or the like. Although the relay point is exemplified as a convenience store or a facility established in conjunction with a convenience store, the relay point is not limited to this example. The size of unmanned aerial vehicle 10*f* may be changed depending on the size of the package to be delivered.

The flying system includes management server 9 and lifting system 6*a*.

<Management Server 9>

As illustrated in FIG. 1A, management server 9 is wirelessly communicably connected to lifting system 6*a*. Management server 9 sets a travel route for lifting system 6*a* based on position information of the receiver and position information of the sender. Management server 9 obtains position information of lifting system 6*a* and changes the travel route according to the status of the set travel route for lifting system 6*a*. Management server 9 sets the travel route for lifting system 6*a* according to other lifting systems 6*a* that are moving or scheduled to move. Management server 9 sends a departure instruction to lifting system 6*a* based on the set travel route. Management server 9 also manages the flying state of lifting system 6*a*. Management server 9 is implemented as a computer, a cloud server, or the like. The travel route is a flying route for lifting system 6*a* to travel through areas where rails 7 are present and areas where rails 7 are not present, and is shown in map data.

Rail 7 is, for example, located at a height of several meters to several tens of meters above the ground surface and is fixed in place by a support pillar implanted in the ground or a facility or the like. Rails 7 may be provided across the entire area above the ground or just around at least the receiver. Rails 7 are provided along the road, for example.

Rails 7 include a connection point. The connection point is a portion where one rail 7 connects to another rail 7. A sheet-, net-, or plate-shaped structure is arranged directly below the connection point.

Management server 9 includes first communicator 91, storage 92, and display 93.

First communicator 91 is a wireless module capable of wirelessly communicating with lifting system 6*a*. In first communicator 91, for example, the receiving unit of first communicator 91 receives position information from lifting system 6*a*, and the transmitting unit of first communicator 91 transmits a departure instruction and information indicating a travel route to lifting system 6*a*.

Storage 92 is a recording medium on which map information indicating a flying route for lifting system 6*a* to travel is stored. Storage 92 is, for example, a hard disk drive (HDD) or semiconductor memory.

Display 93 displays the current position of lifting system 6*a* and the travel route that lifting system 6*a* is scheduled to travel. Display 93 can also show the status of lifting system 6*a*. The status of lifting system 6*a* includes the altitude, the power, the travel speed, the angle of inclination relative to the horizontal plane, and the fault status.

<Lifting System 6*a*>

When lifting system 6*a* receives information indicating a travel route set by management server 9, lifting system 6*a* moves according to the travel route indicated in the information. Lifting system 6*a* moves from the sender to the receiver by flying or moving along rails 7, and then delivers the package to the receiver.

Lifting system 6*a* includes unmanned aerial vehicle 10*f* and first thruster device 110.

<Unmanned Aerial Vehicle 10*f*>

Unmanned aerial vehicle 10*f* is, for example, a flying body such as a drone. Unmanned aerial vehicle 10*f* not only flies in the air, but also moves along rails 7 provided above the ground. Unmanned aerial vehicle 10*f* flies along rails 7 with while first thruster device 110 is coupled via wire 51. In the present embodiment, the flying system may include rail 7 as a component.

More specifically, unmanned aerial vehicle 10*f* moves from a sender to a receiver along rails 7 while arm 30, which includes a ring, is connected to rails 7. More specifically, unmanned aerial vehicle 10*f* flies from a sender to a receiver while arm 30 is coupled to rails 7 (hereinafter also phrased as while "arm 30 is coupled to rails 7"). Here, moving along rails 7 does not necessarily mean that arm 30 of unmanned aerial vehicle 10*f* slides directly on rails 7. Unmanned aerial vehicle 10*f* may fly while rails 7 and arm 30 of unmanned aerial vehicle 10*f* are not in contact, since arm 30 and rails 7 may wear out if arm 30 slides directly over rails 7.

Although there is only one unmanned aerial vehicle 10*f* in the example in the present embodiment, a plurality of unmanned aerial vehicles 10*f*, for example, a first unmanned aerial vehicle and a second unmanned aerial vehicle, may be coupled and connected by wire 51 or the like and fly.

Unmanned aerial vehicle 10*f* includes vehicle main body 1220, a plurality of sensors, control processor 11, actuation controller 12, second communicator 13, and battery 14.

Vehicle main body 1220 is equipped with a plurality of propellers 22, a plurality of first propeller actuation motors 23, a plurality of sensors, control processor 11, actuation controller 12, second communicator 13, and battery 14.

Vehicle main body 1220 includes main body 21, arm 30, the plurality of propellers 22, and the plurality of first propeller actuation motors 23. Vehicle main body 1220 may be an example of an unmanned aerial vehicle.

Main body 21 is configured as a rectangular frame-shaped body. Main body 21 supports the plurality of first propeller actuation motors 23 at a predetermined attitude. Main body 21 may have an opening that allows first thruster device 110 to be arranged inside main body 21. Stated differently, when first thruster device 110 is mounted on vehicle main body 1220, main body 21 may be arranged to surround first thruster device 110 and support first thruster device 110 at a predetermined attitude.

Arm 30 is coupled to rail 7. Vehicle main body 1220 is provided with a plurality of arms 30, but vehicle main body 1220 may be provided with one arm 30.

The plurality of propellers 22 are provided on the upper surface of vehicle main body 1220. More specifically, the plurality of propellers 22 are provided on vehicle main body 1220 so that the planes of rotation thereof are approximately parallel to a plane orthogonal to the thickness direction of vehicle main body 1220. The plurality of propellers 22 correspond one-to-one with the plurality of first propeller actuation motors 23, and the rotational actuation of each first propeller actuation motor 23 causes the plurality of propellers 22 to rotate around the axis of rotation of the plurality of first propeller actuation motors 23 to provide thrust to unmanned aerial vehicle 10*f*. Each of propellers 22 is provided at a corner of vehicle main body 1220, and in the present embodiment, four propellers 22 are arranged on vehicle main body 1220. Note that the number of propellers 22 provided may be three or less, and may be five or more.

The plurality of first propeller actuation motors 23 are electric motors that respectively rotate the plurality of propellers 22. Each first propeller actuation motor 23 is a motor that is actuated and controlled by control processor 11. Each first propeller actuation motor 23 is fixed to a corner of main body 21 of vehicle main body 1220. In the present embodiment, four first propeller actuation motors 23 are arranged on vehicle main body 1220. First propeller actuation motor 23 does not need to be fixed to a corner of main body 21, and may be fixed at some other location. Note that the number of first propeller actuation motors 23 provided may be three or less, and may be five or more.

The plurality of sensors include, for example, global positioning system (GPS) sensor 41, gyro sensor 42, speed sensor 43, wind speed sensor 44, camera sensor 45, and tension sensor 46. Control processor 11 determines whether or not support member 111 of first thruster device 110 is provided with a package using a sensor mounted on first thruster device 110. Here, the sensor may be a proximity sensor that detects a package near support member 111 of first thruster device 110, may be a switch sensor that is pressed down when the package is provided on support member 111 of first thruster device 110, and may be a weight sensor that detects the weight of the lifting system 6*a* (or first thruster device 110).

GPS sensor 41 detects position information indicating geographic space, such as latitude and longitude, indicating the position of unmanned aerial vehicle 10*f*. GPS sensor 41 outputs position information indicating the current position of unmanned aerial vehicle 10*f* to control processor 11. GPS sensor 41 is one example of a sensor.

Gyro sensor 42 detects the angular speed and acceleration of vehicle main body 1220 of unmanned aerial vehicle 10*f* in flight. Gyro sensor 42 outputs angular speed information and acceleration information indicating the angular speed and the acceleration of vehicle main body 1220 of unmanned aerial vehicle 10*f* to control processor 11.

Speed sensor 43 is a sensor that detects the travel speed of unmanned aerial vehicle 10*f*, for example, the speed of unmanned aerial vehicle 10*f* in flight and in a hovering state. Speed sensor 43 outputs speed information which is information indicating the travel speed of unmanned aerial vehicle 10*f* to control processor 11.

Wind speed sensor 44 is a sensor that detects the wind speed around unmanned aerial vehicle 10*f*, for example, the wind speed around unmanned aerial vehicle 10*f* in a hovering state. When first thruster device 110 detaches from unmanned aerial vehicle 10*f* and descends, wind speed sensor 44 detects a wind speed around unmanned aerial vehicle 10*f*. Wind speed sensor 44 outputs wind speed information which is information indicating the wind speed around unmanned aerial vehicle 10*f* to control processor 11.

Camera sensor 45 is provided on vehicle main body 1220 and is an imaging device capable of capturing images of the package and the delivery box from above. Camera sensor 45 captures an image of the package and the delivery box and outputs image information, which is the captured image, to control processor 11. For example, the image information includes information indicating the relative position (distance) between the package and the delivery box, the distance from vehicle main body 1220 to the package, the distance from vehicle main body 1220 to the delivery box, and the height from the ground surface to the opening of the delivery box. Camera sensor 45 may be, for example, a time-of-flight (TOF) camera or a range finding sensor or the like.

Tension sensor 46 is a sensor that detects the tension of wire 51 that couples unmanned aerial vehicle 10*f* and first thruster device 110. Tension sensor 46 outputs, to control processor 11, tension information indicating the tension of wire 51 that couples unmanned aerial vehicle 10*f* and the first thruster device.

Control processor 11 controls the flying state of unmanned aerial vehicle 10*f* and controls the reeling in and out of wire 51. Flying states of unmanned aerial vehicle 10*f* include forward, backward, rotate right, rotate left, hovering, etc.

Control processor 11 controls, for example, the travel speed and acceleration of unmanned aerial vehicle 10*f* by obtaining position information, angular speed information, acceleration information, and speed information. More specifically, control processor 11 controls the inclination of vehicle main body 1220 of the aircraft relative to the horizontal direction and controls the rotation rates of propellers 22 of unmanned aerial vehicle 10*f* by controlling first propeller actuation motors 23, based on the position information, the angular speed information, the acceleration information, and the speed information.

Control processor 11 also detects the amount of movement of unmanned aerial vehicle 10*f* during while unmanned aerial vehicle 10*f* is hovering by obtaining wind speed information or the like. More specifically, since vehicle main body 1220 is moved by the wind, control processor 11 correct the misalignment of unmanned aerial vehicle 10*f* caused by the wind by controlling the tilt of vehicle main body 1220 relative to the horizontal direction and controlling the rotation rates of propellers 22 of unmanned aerial vehicle 10*f*. Note that control processor 11 may correct misalignment of unmanned aerial vehicle 10*f* caused by wind based on the position information, the angular speed information, and the speed information.

By obtaining the image information, control processor 11 corrects the position of lifting system 6*a* so as to position the package in the airspace above the destination point of the receiver.

Actuation controller 12 includes propeller control module 12*b* and wire control module 12*c*. As is the case in the present embodiment, actuation controller 12 may include wire control module 12*c*.

Propeller control module 12*b* controls the actuation of the plurality of first propeller actuation motors 23 based on instructions from control processor 11. In other words, when propeller control module 12*b* obtains an actuation instruction from control processor 11, propeller control module 12*b* controls, for example, the rotation rate and the direction of rotation (clockwise or counterclockwise) of the plurality of propellers 22. Propeller control module 12*b* controls the actuation and stopping of and the rotation rate and the direction of rotation of one or more of the propellers 22 corresponding to one or more of the plurality of first propeller actuation motors 23.

Wire control module 12*c* may control the reeling in and out of wire 51 based on instructions from control processor 11. That is, when wire control module 12*c* obtains a reel-out instruction for wire 51 from control processor 11, wire control module 12*c* may actuate wire actuation motor 24 so as to reel out wire 51 to separate first thruster device 110 from unmanned aerial vehicle 10*f*. When wire control module 12*c* obtains a reel-in instruction for wire 51 from control processor 11, wire control module 12*c* may actuate wire actuation motor 24 so as to reel in wire 51 to retrieve first thruster device 110.

Unmanned aerial vehicle 10*f* may include wire actuation motor 24. Stated differently, main body 21 of vehicle main body 1220 may be equipped with wire actuation motor 24. Wire actuation motor 24 may be an electric motor that rotates a reel that reels wire 51 in and out. Each wire actuation motor 24 may be actuated and controlled by wire control module 12*c* via control processor 11.

Second communicator 13 is a wireless module capable of wirelessly communicating with management server 9. When second communicator 13 receives, for example, a departure instruction and information indicating a travel route from management server 9, the receiving unit outputs the received departure instruction to control processor 11, and transmits position information and the like detected by GPS sensor 41 to management server 9.

Battery 14 is a battery that provides electric power to first propeller actuation motors 23 and the like for unmanned aerial vehicle 10*f* to fly, and is realized as a lithium battery or the like. Battery 14 supplies power to, for example, control processor 11 and the plurality of first propeller actuation motors 23.

Vehicle main body 1220 is elongated in the lengthwise direction of rails 7. Propeller actuation motor 1211*b* is fixed to the side surface of vehicle main body 1220. Propeller actuation motor 1211*b* is fixed to the support portion such that the axis of rotation thereof is approximately parallel to the horizontal direction. The plane of rotation of the propeller of propeller actuation motor 1211*b* disposed on the side surface of vehicle main body 1220 (hereinafter referred to as side propeller 22*a*) is approximately parallel to a vertical plane.

Propeller actuation motor 1211*b* is configured to move in a vertical direction relative to vehicle main body 1220. Propeller actuation motor 1211*b* is controlled by the actuator of actuation controller 12 by control processor 11. Propeller actuation motor 1211*b* provides thrust to unmanned aerial vehicle 10*f* in a horizontal direction, that is, in a direction orthogonal to the plane of rotation of side propeller 22*a*. This causes unmanned aerial vehicle 10*f* to move in the lengthwise direction of rails 7.

Side propeller 22*a* is positioned so as not to interfere with any other propeller 22. This means that the plane of rotation of side propeller 22*a* does not intersect the plane of rotation of any other propeller 22. For example, the vertical upper end of the plane of rotation of side propeller 22*a* is disposed vertically lower than an extended plane of the plane of rotation of propeller 22 disposed closest to side propeller 22*a*. Stated differently, side propeller 22*a* is positioned lower than the virtual plane. The virtual plane may be approximately parallel to or include the upper surface of vehicle main body 1220, and may be approximately parallel to or include the planes of rotation of the plurality of propellers 22. With this, even when propeller 22 disposed on the side surface of vehicle main body 1220 rotates, contact with any other propeller 22 can be inhibited.

Control processor 11 stops actuation of propeller actuation motor 1211*b* so that the lengthwise direction of propeller 22 is approximately parallel to the lengthwise direction of vehicle main body 1220. This allows unmanned aerial vehicle 10*f* to have a smaller width and therefore a smaller flight frame. As used herein, a "flight frame" refers to a frame for defining the range in which lifting system 6*a* coupled to rails 7 moves.

<First Thruster Device 110>

First thruster device 110 is a device capable of correcting the position of a package relative to a delivery box. First thruster device 110 can communicate with vehicle main body 1220 of unmanned aerial vehicle 10*f* via wire 51, but may also communicate wirelessly using a communication module or the like. First thruster device 110 may be unmanned aerial vehicle 10*f*, one example of which is a drone. First thruster device 110 is one example of a first adapter.

First thruster device 110 is a first child vehicle of unmanned aerial vehicle 10*f* and is attachable to and detachable from unmanned aerial vehicle 10*f*.

First thruster device 110 includes support member 111, wire 51, a plurality of second propeller actuation motors 112, a plurality of propellers 113, thruster controller 124, wire control module 125, one or more actuators 126, and camera sensor 127. Support member 111 is one example of a first support member.

Support member 111 is a support member capable of holding the package at a predetermined attitude by engaging with the upper portion of the package. Support member 111 attachably and detachably holds a package. Support member 111 has a polygonal frame that surrounds the package. Support member 111 can hold the package at a predetermined attitude by housing the package inside an opening formed in the central region of support member 111 and gripping the package around the top edge of the package to clamp the package, or by connecting to the package. Support member 111 is one example of a first adapter.

Support member 111 is attachable to and detachable from unmanned aerial vehicle 10*f*. The lower end of wire 51 (the sub-wire to be described below) is coupled to support member 111. Support member 111 has a plan view shape that corresponds to the shape of the package. In the present embodiment, support member 111 has a rectangular shape, which is one example of a polygonal shape.

Support member 111 supports the plurality of second propeller actuation motors 112. The plurality of second propeller actuation motors 112 and the plurality of propellers 113 are provided on the outer peripheral side portions of support member 111. In the present embodiment, two propellers 113 and two second propeller actuation motors 112 are provided on each side of support member 111.

Wire 51 connects first thruster device 110 and unmanned aerial vehicle 10*f*. One end of wire 51 is coupled to unmanned aerial vehicle 10*f* and the other end is coupled to first thruster device 110.

Wire 51 is capable of hanging support member 111, and is directly connected to at least one connection point of support member 111. Wire 51 hangs support member 111 by one end of wire 51 being connected to support member 111 and the other end being connected to an object positioned spaced apart from the ground surface. The object is, for example, rail 7 or unmanned aerial vehicle 10*f* such as a drone described above. When first thruster device 110 is hung from an object, wire 51 holds first thruster device 110 at a horizontal attitude.

Wire 51 may include a communication line that communicatively connects unmanned aerial vehicle 10*f* and first thruster device 110, and may include a power line that supplies power to unmanned aerial vehicle 10*f*. In configurations in which wire 51 does not include the communication line and or the power line, wire 51 may be mere metal or resin wire 51. In such cases, unmanned aerial vehicle 10*f* and first thruster device 110 may be communicably connected by wireless communication. First thruster device 110 may include battery 14 in such cases.

The plurality of second propeller actuation motors 112 are electric motors that respectively rotate the plurality of propellers 113 by the main bodies of the motors rotating rotary shafts. Each of the plurality of second propeller actuation motors 112 is individually controlled to be actuated and stopped by thruster controller 124. Second propeller actuate motors 112 may, for example, be supplied with power from battery 14 of vehicle main body 1220 of unmanned aerial vehicle 10*f* via wire 51. Support member 111 may be provided with a battery, and each of the plurality of second propeller actuation motors 112 may be supplied with power from the battery.

The plurality of second propeller actuation motors 112 are arranged on the side portion forming the outer periphery of support member 111. The plurality of second propeller actuation motors 112 are dispersedly arranged so as to surround support member 111 and are supported by support member 111. The plurality of second propeller actuation motors 112 are pivotably supported by actuators 126 relative to the frame.

Each of the plurality of propellers 113 is disposed on an outer peripheral side portion of support member 111 so as to generate a horizontal thrust. Each of the plurality of propellers 113 is provided on support member 111 in an attitude in which the planes of rotation of the plurality of propellers 113 and the vertical direction are roughly parallel, and air is carried out to the outside of support member 111. The plane of rotation is a plane in which the blades of propeller 113 rotate and is orthogonal to the axis of rotation of propeller 113 (axis of rotation of second propeller actuation motor 112).

The plurality of propellers 113 include one or more first propellers disposed on a pair of first side portions included in the outer peripheral side portions of support member 111, and one or more second propellers disposed on a pair of second side portions different than the pair of first side portions of support member 111 and included in the outer peripheral side portions of support member 111. In the present embodiment, the one or more first propellers are provided on the front first side portion and the rear first side portion of the pair of first side portions, and the one or more second propellers are provided on the right second side portion and the left second side portion of the pair of second side portions.

The plurality of propellers 113 correspond one-to-one with rotary shafts of the plurality of second propeller actuation motors 112 and are fixed one-to-one with rotary shafts of the plurality of second propeller actuation motors 112. The plurality of propellers 113 are respectively actuated by the plurality of second propeller actuation motors 112, and generate thrust along the lengthwise direction of the rotary shafts. The planes of rotation of the plurality of propellers 113 incline relative to a virtual surface in synchronization with the pivoting of the plurality of second propeller actuation motors 112. When the attitudes of the plurality of second propeller actuation motors 112 relative to support member 111 are the same, the virtual surface is a plane including the centers of the plurality of propellers 113. The virtual surface is preferably a virtual plane. The center of propeller 113 is the point where the axis of the rotary shaft of second propeller actuation motor 112 intersects with the plane of rotation of propeller 113.

An angle θ of the rotary shaft (i.e., the axis) of each of the plurality of second propeller actuation motors 112 relative to the virtual surface is at least −45 degrees and at most +45 degrees. The angle θ is the range over which the rotary shaft of each of the plurality of second propeller actuation motors 112 can pivot relative to the virtual surface, and the angle θ of the axis of the rotary shaft relative to the virtual surface ranges from −45 degrees to +45 degrees with reference to the virtual surface. In particular, the angle θ is preferably at least −30 degrees and at most +30 degrees.

Camera sensor 127 is provided on the package side of support member 111, that is, on the vertically downward side, and outputs image information obtained by capturing an image of a delivery box to thruster controller 124. A plurality of camera sensors 127 may be provided. Moreover, camera sensor 127 is not an essential element of first thruster device 110. Accordingly, first thruster device 110 need not include camera sensor 127.

Thruster controller 124 controls the plurality of second propeller actuation motors 112 of first thruster device 110 to actuate at least one of the plurality of second propeller actuation motors 112 during at least part of a period of time during which wire 51 reeled out.

More specifically, thruster controller 124 calculates the positions of the delivery box and the package based on image information obtained from camera sensor 127 of first thruster device 110 and image information obtained from camera sensor 45 of unmanned aerial vehicle 10*f*. Thruster controller 124 controls the plurality of second propeller actuation motors 112 of first thruster device 110 so as to position the package vertically above the opening of the delivery box, to move first thruster device 110 and the package so that the package fits inside the opening of the delivery box as viewed from above. More specifically, thruster controller 124 calculates an error (misalignment) between the opening of the delivery box and the package, and corrects the position of the package relative to the opening of the delivery box so as to correct the calculated error.

Thruster controller 124 adjusts the angle θ formed by the rotary shafts of the plurality of second propeller actuation motors 112 relative to the virtual surface by controlling the one or more actuators 126. Thruster controller 124 controls the attitude of the plurality of second propeller actuation motors 112 by rotating the plurality of second propeller actuation motors 112 relative to support member 111 by controlling actuator 126. Thruster controller 124 controls the angle θ at which the plurality of second propeller actuation motors 112 are rotated relative to support member 111, and the angle θ of the rotary shafts of the plurality of second propeller actuation motors 112 relative to the virtual surface. Note that thruster controller 124 can individually control the angle θ of each of the plurality of second propeller actuation motors 112 relative to the virtual surface.

Thruster controller 124 also controls the rotation rate of the rotary shafts of the plurality of second propeller actuation motors 112. Thruster controller 124 controls the rotation rate of the rotary shafts by changing the value of the current supplied to the plurality of second propeller actuation motors 112. Thruster controller 124 also can also individually control the rotation rate of each of the rotary shafts of the plurality of second propeller actuation motors 112.

Thruster controller 124 includes a first mode and a second mode. The first mode inclines the rotary shafts of the plurality of second propeller actuation motors 112 so that the angle θ of the rotary shafts relative to the virtual surface is 0 degrees. The second mode inclines one or more rotary shafts relative to the virtual surface so that the angle θ is an elevation angle.

Thruster controller 124 controls wire control module 125 by obtaining tension information. More specifically, thruster controller 124 adjusts the distance of first thruster device 110 relative to unmanned aerial vehicle 10*f* by controlling the reeling in or out of wire 51.

Wire control module 125 includes a wire actuation motor and a reel.

The wire actuation motor is an electric motor that rotates the reel which reels wire 51 in and out. Each wire actuation motor is actuated and controlled by thruster controller 124.

The reel can reel wire 51 in and out by rotating. The rotation of the reel is controlled by wire control module 125.

Wire control module 125 controls the reeling in and out of wire 51 based on instructions from thruster controller 124. To attach first thruster device 110 to unmanned aerial vehicle 10*f*, wire control module 125 rotates the reel by actuating the wire actuation motor to reel in wire 51 when it obtains a reel-in instruction for wire 51 from thruster controller 124. To separate first thruster device 110 from unmanned aerial vehicle 10*f*, wire control module 125 rotates the reel by actuating the wire actuation motor to reel out wire 51 when it obtains a reel-out instruction for (obtains an instruction to reel out) wire 51 from thruster controller 124.

The one or more actuators 126 adjust the angle θ formed by the rotary shafts of the plurality of second propeller actuation motors 112 relative to the virtual surface. More specifically, the one or more actuators 126 are actuated by thruster controller 124 to rotate the plurality of second propeller actuation motors 112 to change the attitude of the plurality of second propeller actuation motors 112 relative to support member 111. The one or more actuators 126 are, for example, an actuation mechanism such as a gear, a pulley, a belt, or the like.

As illustrated in FIG. 1B, lifting system 6*a* is capable of passing through a flight frame of 120 cm in width and 60 cm in height. More specifically, vehicle main body 1220 is 150 cm in length, which is the dimension parallel to the lengthwise direction of rails 7, 90 cm in width, and 60 cm in height. In lifting system 6*a*, when propellers 22 of unmanned aerial vehicle 10*f* are rotating, the height is 60 cm and the width is 90 cm, and when propellers 22 of unmanned aerial vehicle 10*f* are stopped, the height is 60 cm and the width is 60 cm. In lifting system 6*a*, when propellers 22 are rotating, there is a spacing of 15 cm at both lateral ends of unmanned aerial vehicle 10*f*, and in the height direction (vertical direction), there is a spacing of 50 cm above unmanned aerial vehicle 10*f* and a spacing of 10 cm below unmanned aerial vehicle 10*f*. Rails 7 are spaced 30 cm from the top of unmanned aerial vehicle 10*f*. Note that these values are non-limiting examples, and are not limited to the examples in the present embodiment.

The size of first thruster device 110 loaded with a package is 65 cm in length, 45 cm in width, and 50 cm in height. Note that various sizes of packages can be loaded on first thruster device 110.

In lifting system 6*a*, first thruster device 110 is not limited to carrying a single package and may carry a plurality of packages. Stated differently, first thruster device 110 may hold a plurality of packages and support them in a predetermined attitude. First thruster device 110 can disconnect one or more of the plurality of packages when storing the packages in the delivery box.

Figure 2:
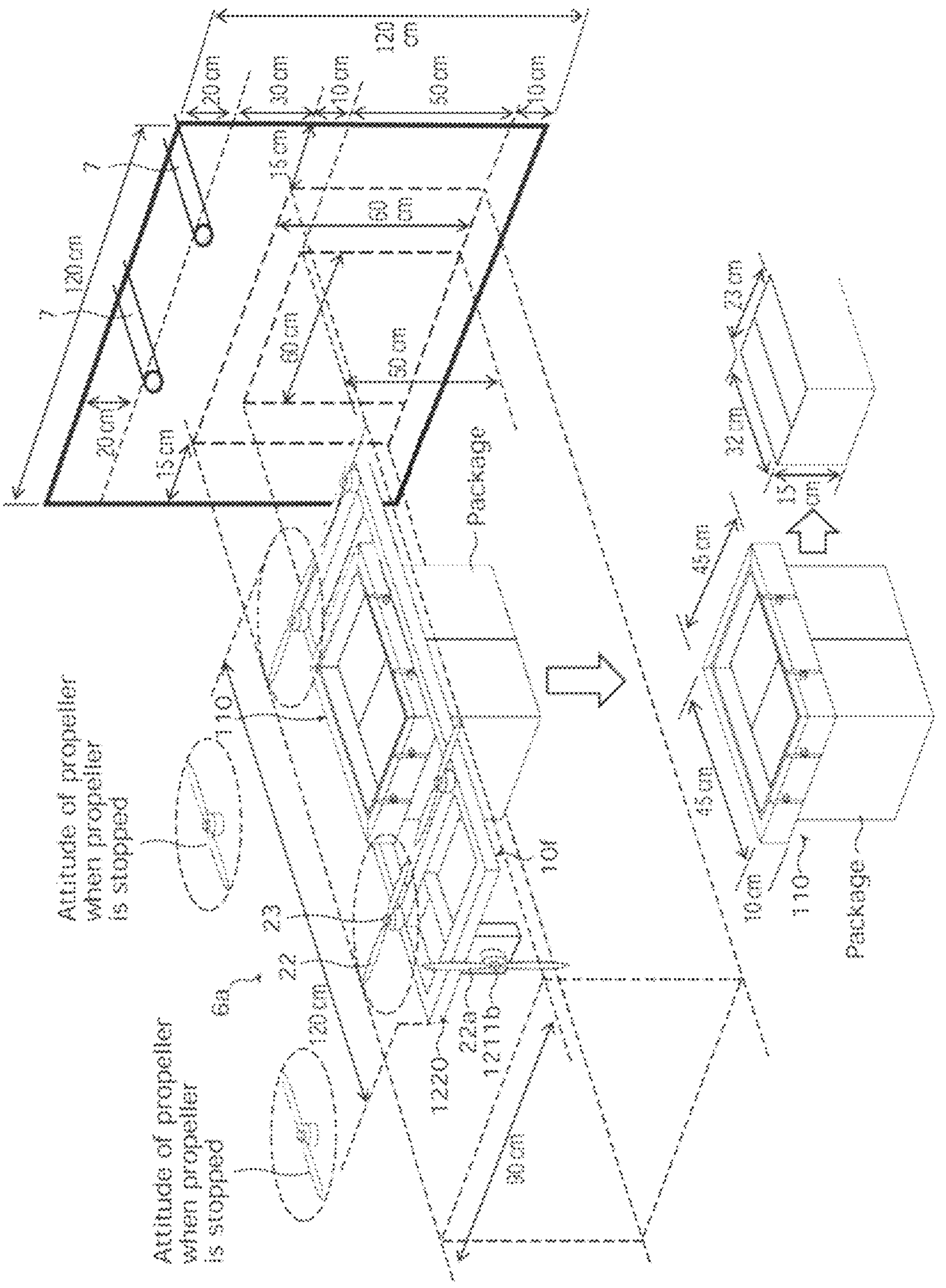
FIG. 2 is a schematic diagram illustrating an example of a first thruster device holding two packages.
Figure 3:
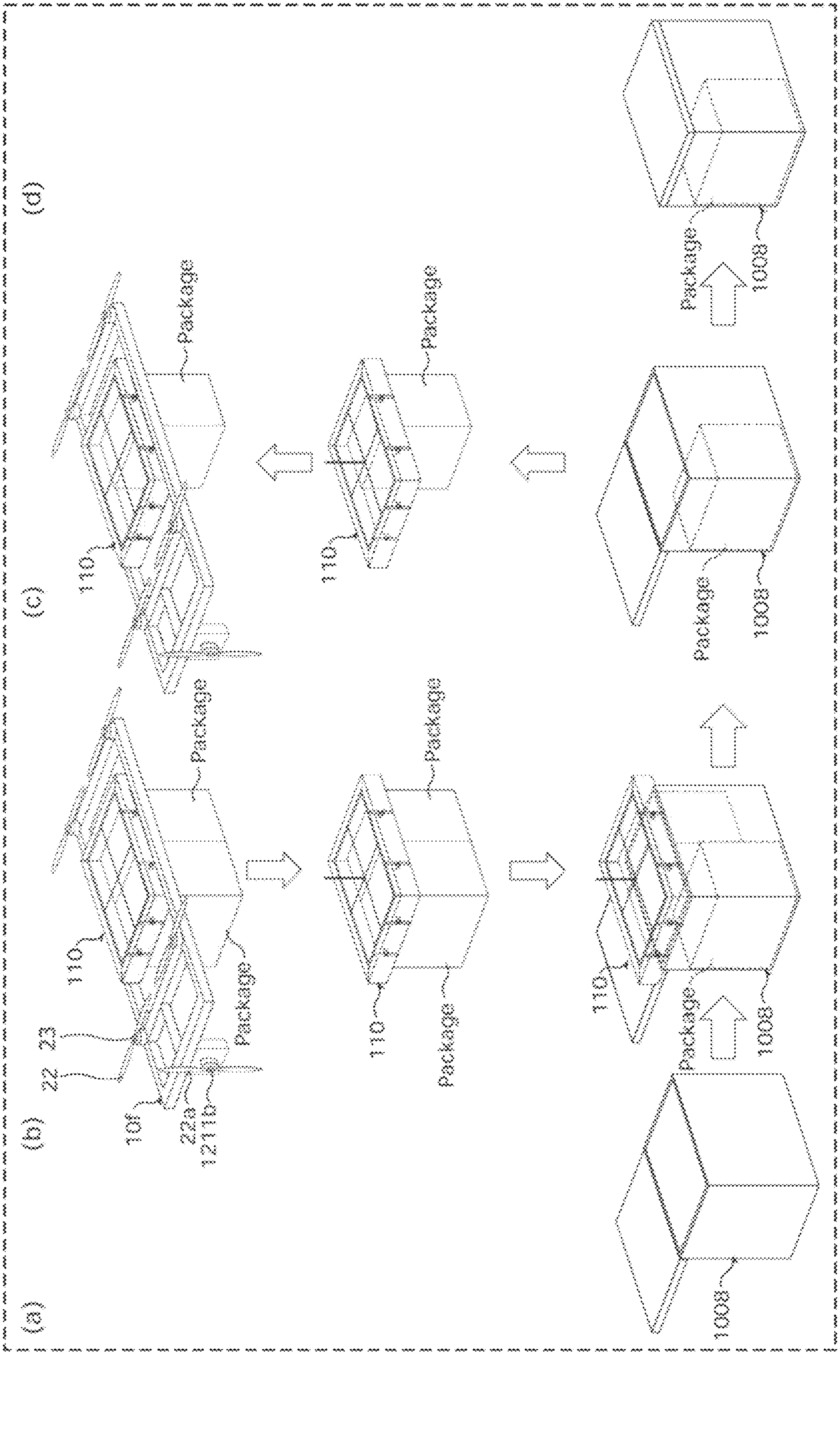
FIG. 3 is a schematic diagram illustrating an example of the storing of two packages into the delivery box by the first thruster device.

FIG. 2 is a schematic diagram illustrating an example of first thruster device 110 holding two packages. FIG. 3 is a schematic diagram illustrating an example of the storing of two packages into delivery box 1008 by first thruster device 110.

FIG. 3 assumes that unmanned aerial vehicle 10*f* has arrived at a position vertically above delivery box 1008.

As illustrated in (a) in FIG. 3, first, unmanned aerial vehicle 10*f* flies to and arrives at a position vertically above delivery box 1008, which is the receiver of the package.

Next, as illustrated in (a) and (b) in FIG. 3, control processor 11 controls wire control module 12*c* to rotate the reel to start reeling out wire 51. With this, first thruster device 110 starts descending.

First thruster device 110 corrects its position relative to delivery box 1008 while descending. Control processor 11 repeatedly corrects the overlap error between first thruster device 110 and the opening of delivery box 1008 in the vertical direction to align the opening of delivery box 1008 with first thruster device 110, i.e., the package.

As illustrated in (c) in FIG. 3, first thruster device 110 unloads one of the packages into delivery box 1008. More specifically, first thruster device 110 descends to cover the opening of delivery box 1008, and disconnects and stores one of the two packages that is to be stored in the delivery box. Stated differently, control processor 11 extracts each package whose identification code (e.g., address) matches the identification code (e.g., address) of the delivery box to which the package(s) is (are) to be delivered, and stores only the extracted package(s) in the delivery box. In the present embodiment, since one package is a match, first thruster device 110 disconnects and stores one package.

As illustrated in (d) in FIG. 3, first thruster device 110 is raised and attached to vehicle main body 1220 of unmanned aerial vehicle 10*f* after disconnecting the package and storing the package in delivery box 1008. Lifting system 6*a* then returns to the sender.

In this way, since a plurality of packages can be loaded on first thruster device 110, lifting system 6*a* can deliver packages to a plurality of receivers in a single flight. This inhibits a reduction in social energy efficiency resulting from lifting system 6*a* moving to deliver packages. Moreover, since the overall increase in the amount of movement by lifting system 6*a* can be inhibited, a reduction in delivery efficiency can be inhibited.

Figure 4:
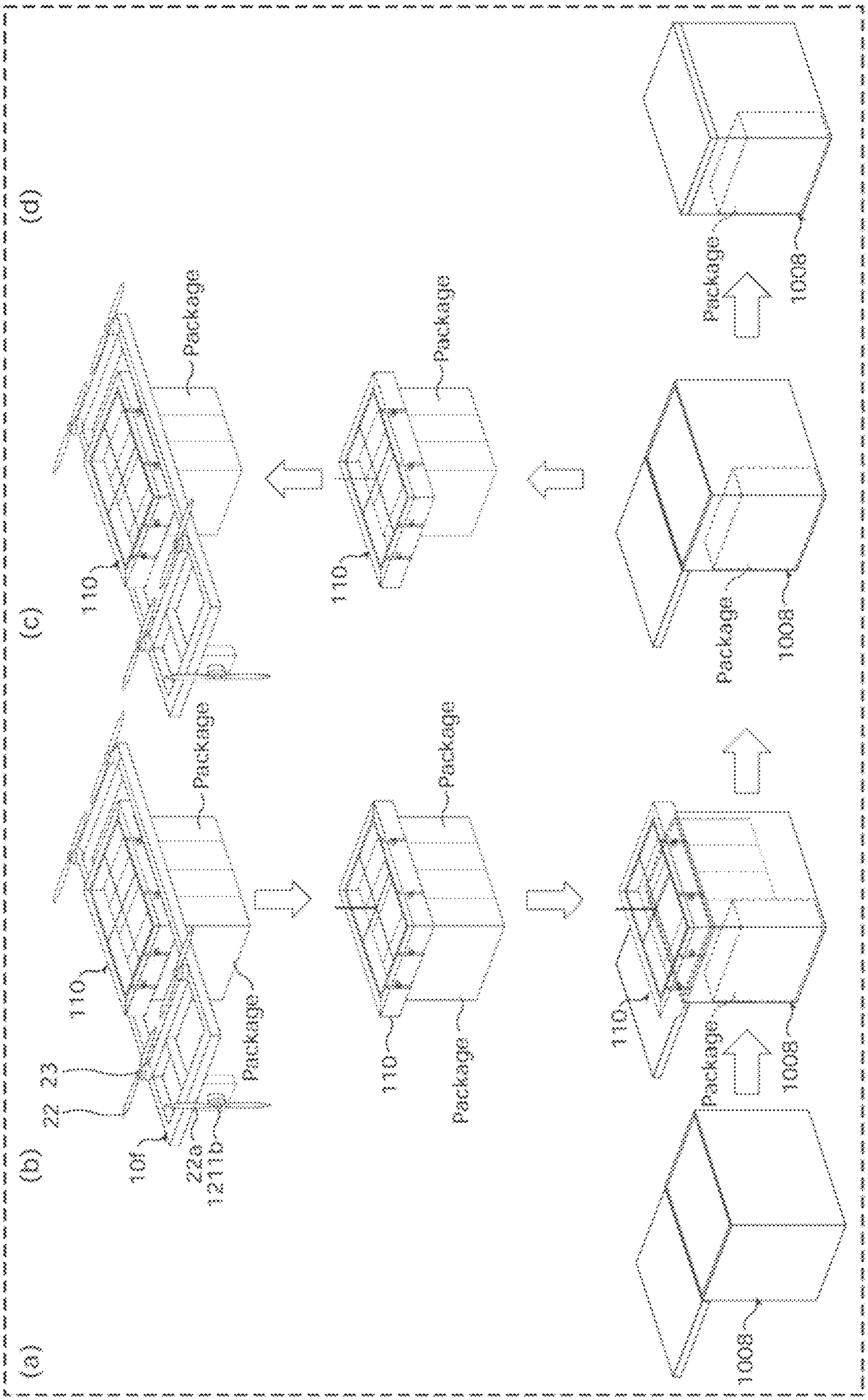
FIG. 4 is a schematic diagram illustrating an example of the storing of four packages into the delivery box by the first thruster device.
Figure 5:
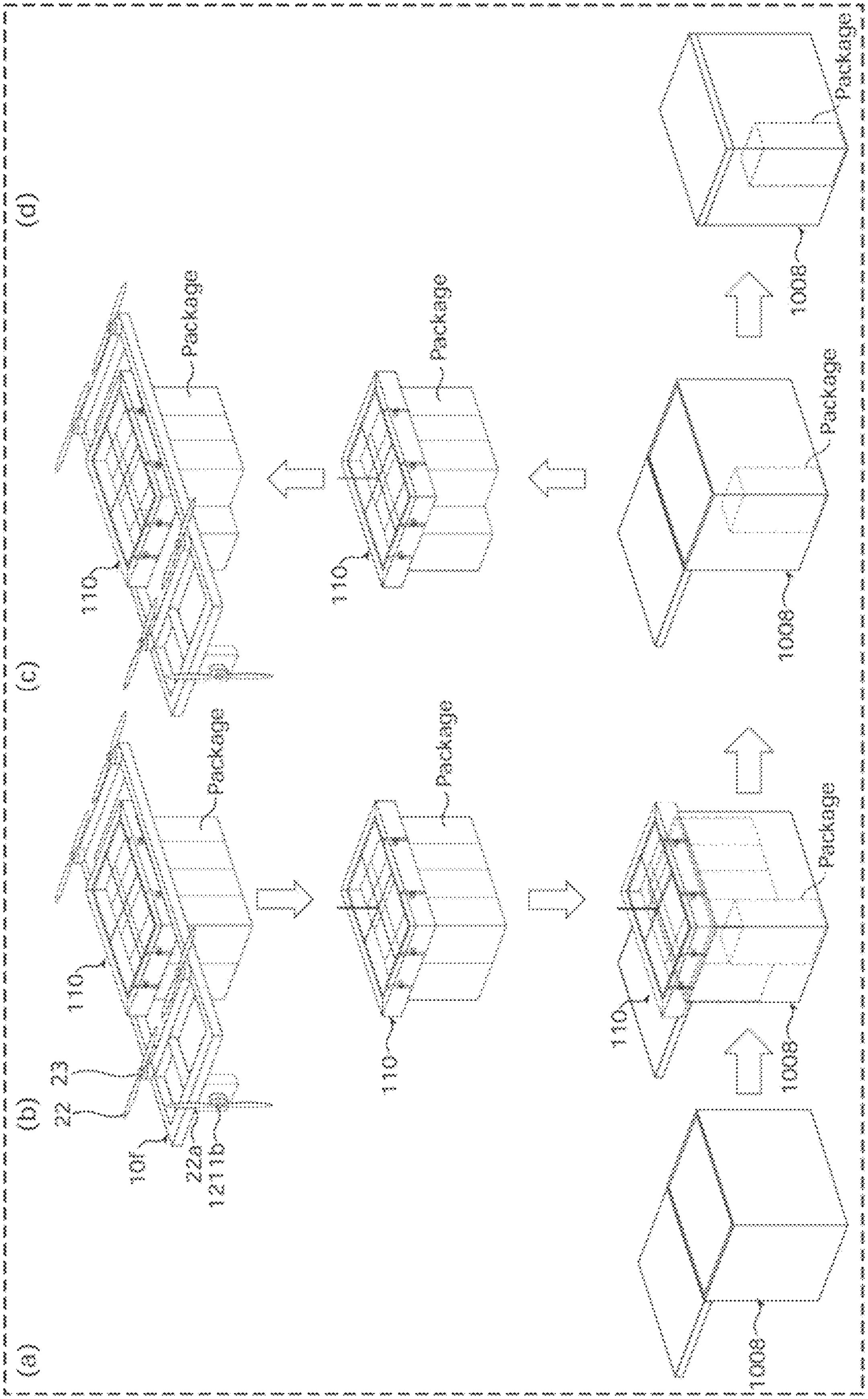
FIG. 5 is a schematic diagram illustrating an example of the storing of eight packages into the delivery box by the first thruster device.

FIG. 4 is a schematic diagram illustrating an example of the storing of four packages into delivery box 1008 by first thruster device 110. FIG. 5 is a schematic diagram illustrating an example of the storing of eight packages into delivery box 1008 by first thruster device 110. The description of FIG. 3 also applies to the examples illustrated in FIG. 4 and FIG. 5 as well.

Variation 1 of Embodiment 1

Hereinafter, since the basic configuration of lifting system 6*b* of the flying body according to the present variation is the same as the basic configuration described in Embodiment 1, repeated description of the basic configuration of lifting system 6*b* in the present variation will be omitted where appropriate. The present variation differs from the embodiment in that the additionally provided second thruster device 130 carries a package, and that first thruster device 110 and second thruster device 130 are arranged in unmanned aerial vehicle 10*f* in a line parallel to the lengthwise directions of rails 7.

Figure 6:
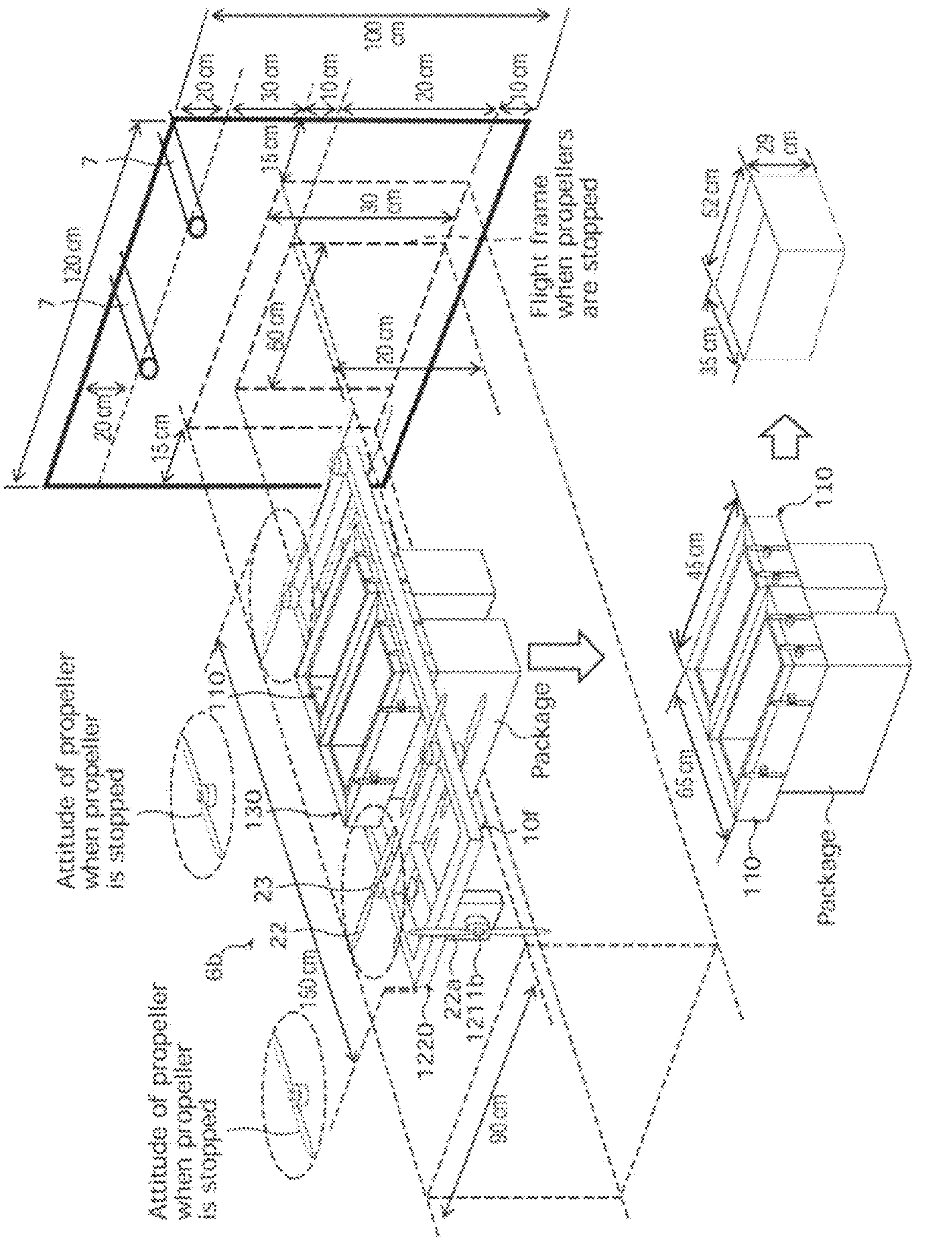
FIG. 6 is a perspective view illustrating an example of a lifting system and packages according to Variation 1 of Embodiment 1.

FIG. 6 is a perspective view illustrating an example of lifting system 6*b* and packages according to Variation 1 of Embodiment 1.

In the present variation, as illustrated in FIG. 6, each of first thruster device 110 and second thruster device 130 holds a package and supports the package in a predetermined attitude. The packages may be destined for the same receiver or destined for different receivers. Since second thruster device 130 has the same configuration as first thruster device 110, repeated description will be omitted.

When lifting system 6*b* reaches the receiver, control processor 11 of unmanned aerial vehicle 10*f* extracts each package whose identification code (e.g., address) matches the identification code (e.g., address) of delivery box 1008 to which the package(s) is (are) to be delivered, and only those thruster device(s) loaded with said package(s) descend to delivery box 1008. If a plurality of packages are to be delivered to the same receiver, for example, first thruster device 110 may store a package in delivery box 1008, and then second thruster device 130 may store another package in delivery box 1008.

Variation 2 of Embodiment 1

Hereinafter, since the basic configuration of lifting system 6*b* of the flying body according to the present variation is the same as the basic configuration described in Embodiment 1 and the like, repeated description of the basic configuration of lifting system 6*b* in the present variation will be omitted where appropriate. The present variation differs from the embodiment in that vehicle main body 1220 includes eight propellers 22 and a single side propeller 22*a*.

Figure 7:
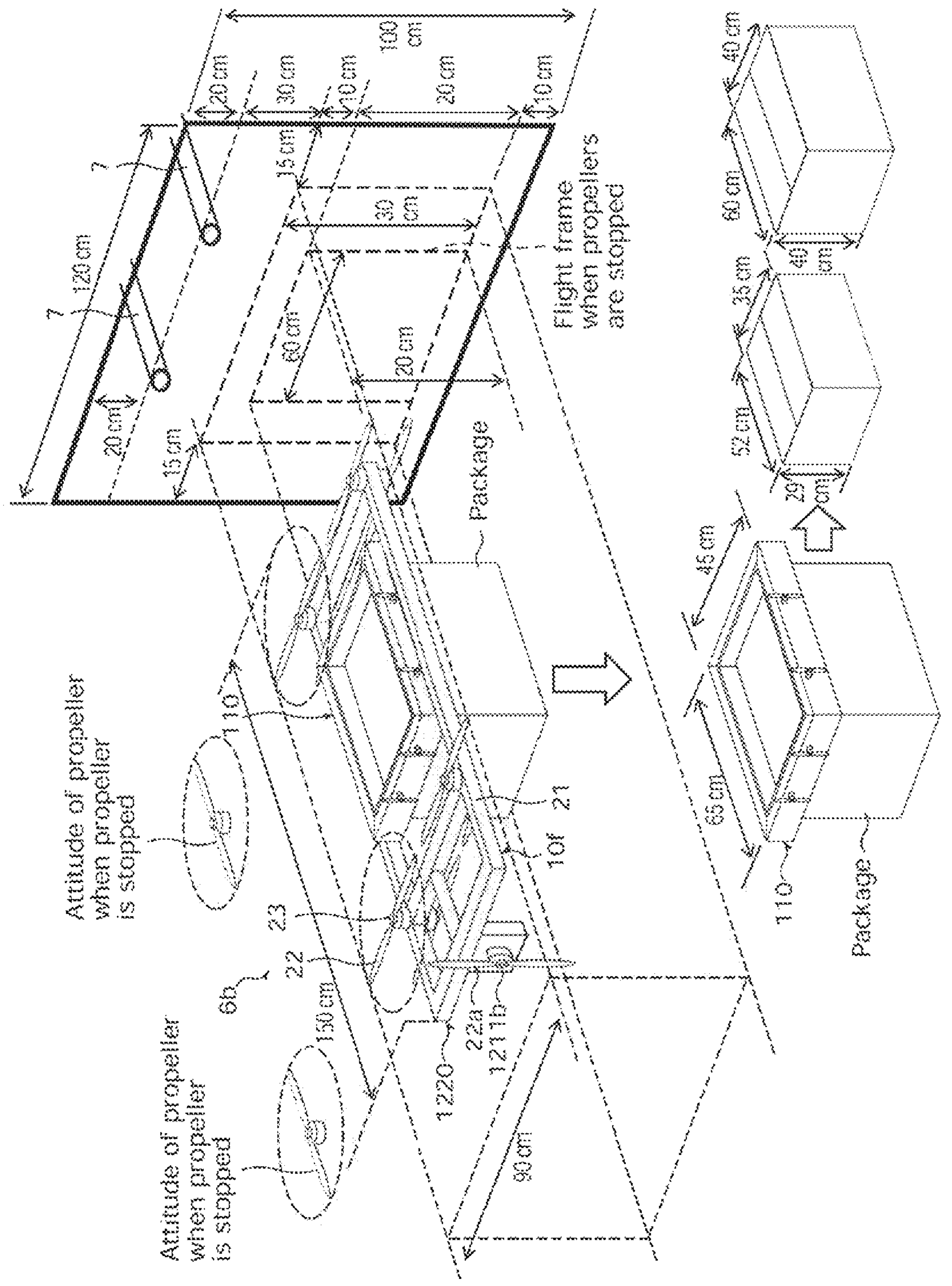
FIG. 7 is a perspective view illustrating an example of a lifting system and packages according to Variation 2 of Embodiment 1.

FIG. 7 is a perspective view illustrating an example of lifting system 6*b* and packages according to Variation 2 of Embodiment 1.

As illustrated in FIG. 7, pairs of propellers 22 are disposed in a plurality of locations on main body 21 of vehicle main body 1220, such that each pair of propellers 22 sandwiches main body 21. One propeller in a pair of propellers 22 is disposed vertically above main body 21 and the other propeller is disposed vertically below main body 21. In the present variation, four pairs of propellers 22 are affixed in four locations on main body 21.

A pair of propellers 22 may rotate in synchronization and, alternatively, may rotate out of synchronization. One propeller in a pair of propellers 22 may rotate clockwise and the other may rotate counterclockwise. The direction of rotation of propellers 22 is controlled by control processor 11 controlling propeller actuation motor 1211*b*. Stated differently, control processor 11 may cause a pair of propellers 22 to rotate in synchronization or out of synchronization. Control processor 11 may separately control the direction and speed of rotation of each of the pair of propellers. In such cases, vehicle main body 1220 may be provided with a number of propeller actuation motors 1211*b* based on the number of propellers.

Variation 3 of Embodiment 1

Hereinafter, since the basic configuration of lifting system 6*b* according to the present variation is the same as the basic configuration described in Embodiment 1 and the like, repeated description of the basic configuration of lifting system 6*b* in the present variation will be omitted where appropriate. The present variation differs from the embodiment in that a portion of main body 21 of vehicle main body 1220 can pivot.

Figure 8:
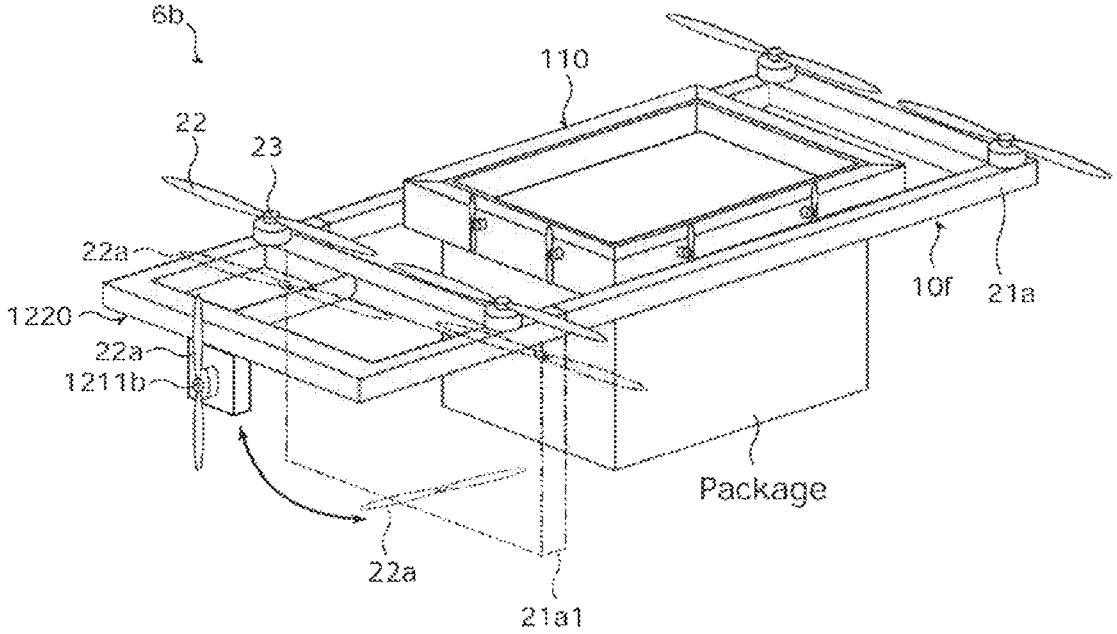
FIG. 8 is a perspective view illustrating an example of a lifting system according to Variation 3 of Embodiment 1.

FIG. 8 is a perspective view illustrating an example of lifting system 6*b* according to Variation 3 of Embodiment 1. In FIG. 8, pivoting frame portion 21*a*1 in a non-pivoted position is illustrated with solid lines, pivoting frame portion 21*a*1 in a pivoted position is illustrated by double-dotted lines.

Unmanned aerial vehicle 10*f* includes pivoting frame portion 21*a*1, which is a portion of main body 21*a* that pivots, a hinge that allows pivoting frame portion 21*a*1 to pivot, and an actuation motor. Pivoting frame portion 21*a*1 includes two propeller actuation motors 1211*b*. Pivoting frame portion 21*a*1 is pivoted so as to fold vehicle main body 1220 about the hinge as an axis, so as to fold into an attitude approximately parallel to the vertical direction. The actuation motor is controlled by control processor 11 to rotate pivoting frame portion 21*a*1 about the hinge to place pivoting frame portion 21*a*1 in an attitude approximately parallel to the vertical direction or to place pivoting frame portion 21*a*1 in an attitude approximately parallel to the horizontal direction. When unmanned aerial vehicle 10*f* is connected to rails 7, control processor 11 folds vehicle main body 1220 so that the pivoting frame portion is in an attitude approximately parallel to the vertical direction, and actuates the two propeller actuation motors 1211*b* fixed to the pivoting frame portion.

The two propeller actuation motors 1211*b* rotate their respective propellers 22 to provide horizontal thrust to unmanned aerial vehicle 10*f*, that is, thrust in a direction orthogonal to the plane of rotation of side propeller 22*a*. This causes unmanned aerial vehicle 10*f* to move in the lengthwise direction of rails 7.

Embodiment 2

Configuration

Hereinafter, since the basic configuration of lifting system 6*c* according to the present embodiment is the same as the basic configuration of the lifting system according to Embodiment 1 and the like, repeated description of the basic configuration of lifting system 6*c* in the present embodiment will be omitted where appropriate. The present embodiment differs from other embodiments and the like in that first arm 1331 and second arm 1332 are provided with rollers 1351 and that GPS sensor 1352 is arranged on the fixed portion.

Figure 9:
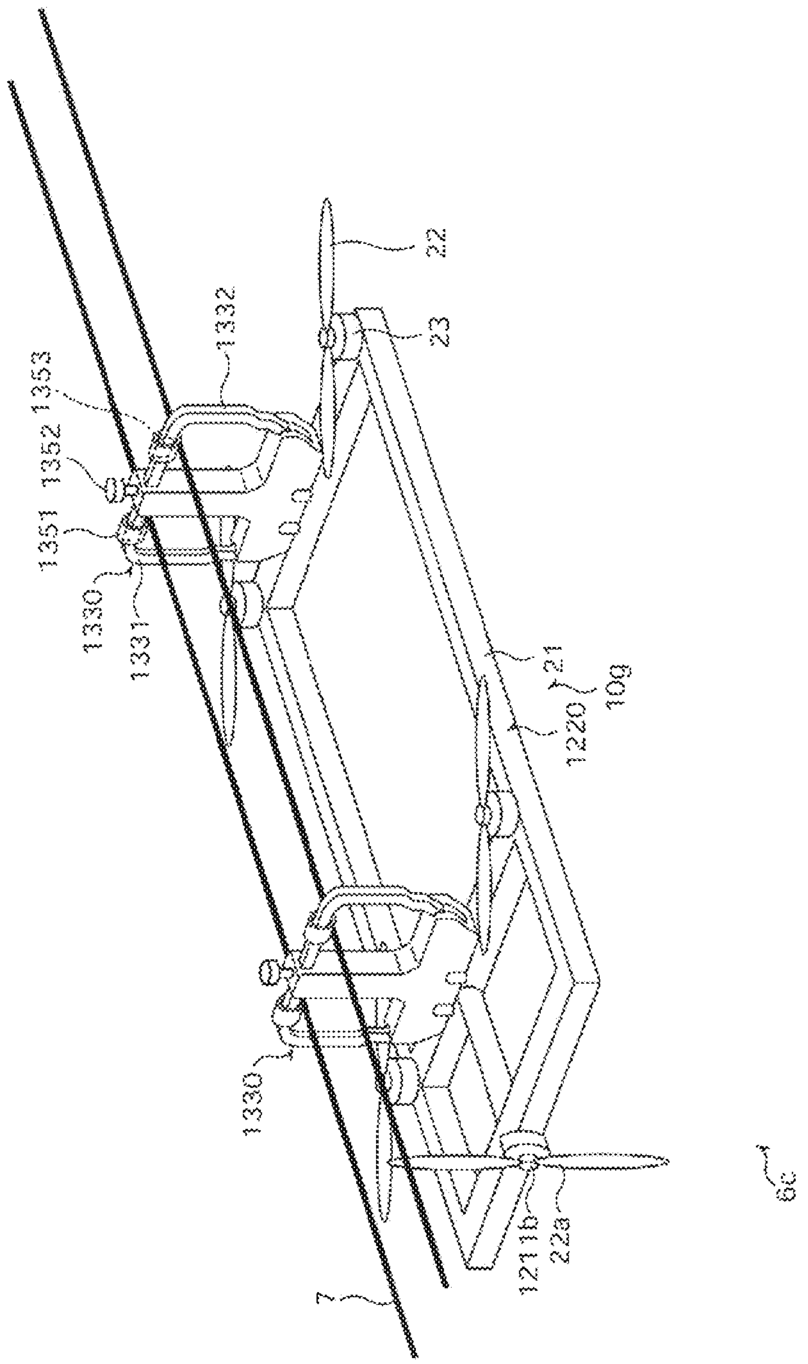
FIG. 9 is a perspective view illustrating an example of a lifting system according to Embodiment 2.
Figure 10:
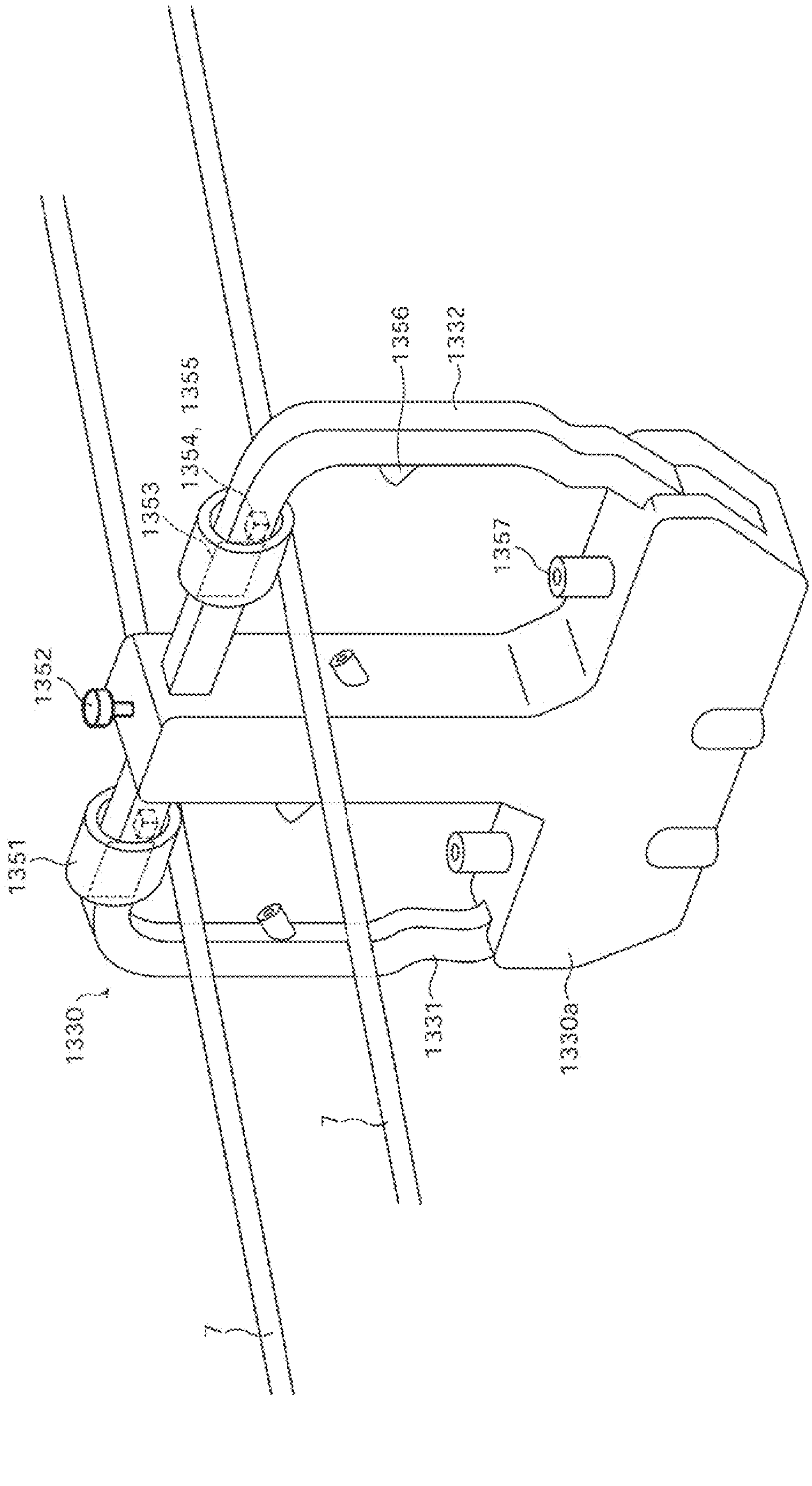
FIG. 10 is an enlarged perspective view illustrating an example of a connector according to Embodiment 2.

FIG. 9 is a perspective view illustrating an example of lifting system 6*c* according to Embodiment 2. Illustration of the first thruster device is omitted in FIG. 9. FIG. 10 is an enlarged perspective view illustrating an example of connector 1330 according to Embodiment 2.

The present embodiment is an example of lifting system 6*c* that travels along two rails 7, as illustrated in FIG. 9 and FIG. 10. In unmanned aerial vehicle 10*g* of lifting system 6*c*, two connectors 1330 arranged in the lengthwise direction of vehicle main body 1220 are fixed to main body 21 of vehicle main body 1220. In the present embodiment, rails 7 are power lines.

First arm 1331 and second arm 1332 are fixed to main body 21 of vehicle main body 1220. Each of first arm 1331 and second arm 1332 includes roller 1351, roller actuation motor 1353, weight sensor 1354, electric field sensor 1355, camera sensor 1356, and infrared sensor 1357.

Each of first arm 1331 and second arm 1332 is provided with roller 1351. Roller 1351 is pivotable with respect to first arm 1331 and second arm 1332 at a point where first arm 1331 and second arm 1332 and rail 7 face each other. Roller 1351 is a wheel for rotational contact with rail 7.

Each of first arm 1331 and second arm 1332 is provided with roller actuation motor 1353 in one-to-one correspondence with roller 1351. Roller actuation motor 1353 actuates and rotates a corresponding roller 1351 under control by control processor 11. Stated differently, respective roller actuation motors 1353 actuate and rotate respective rollers 1351 to cause lifting system 6*c* to travel over rails 7.

Figure 11:
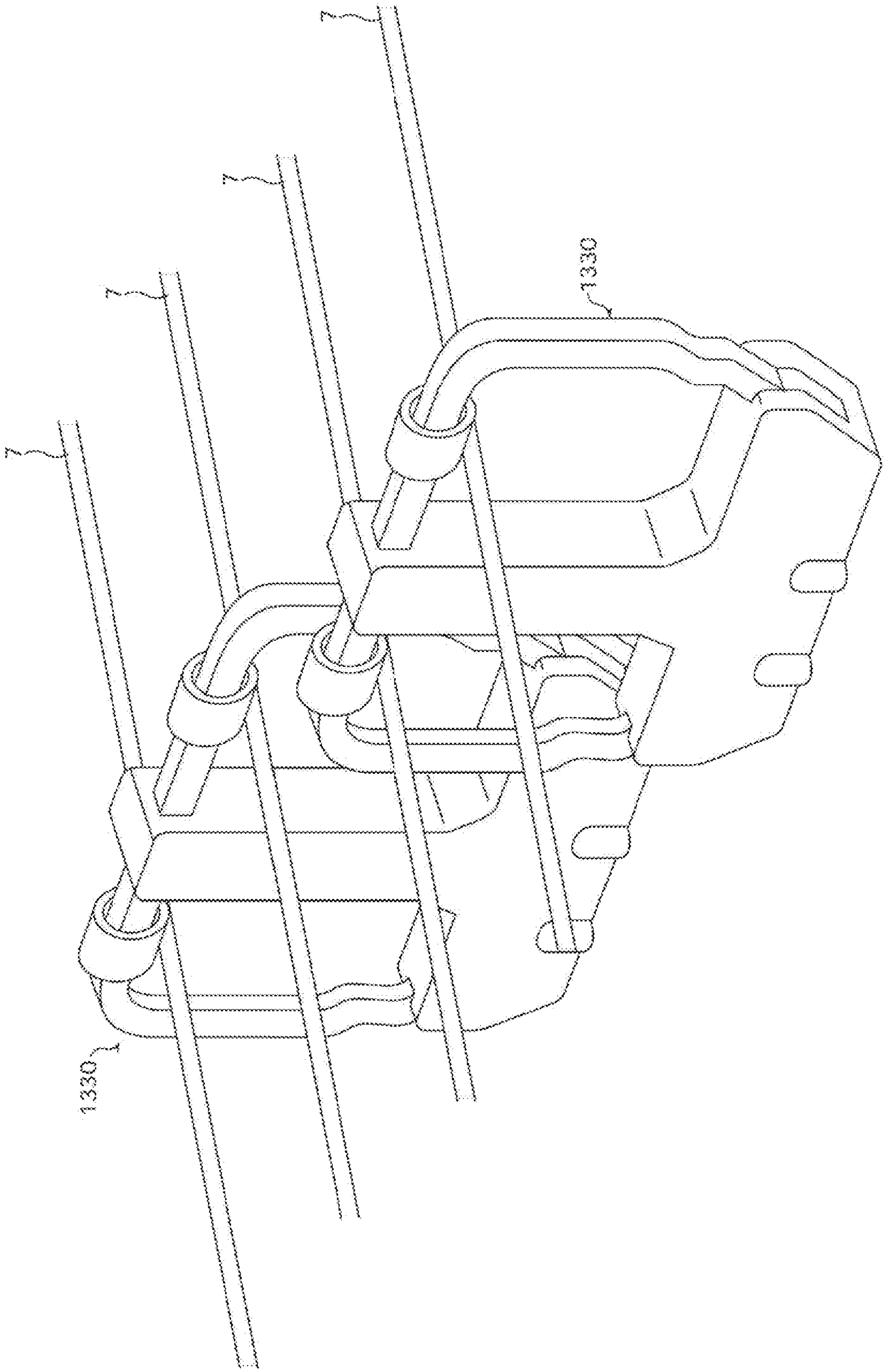
FIG. 11 is an enlarged perspective view illustrating an example of a plurality of connectors connected to a plurality of rails according to Embodiment 2.

When a plurality of rails 7 are aligned like in FIG. 11, a plurality of connectors 1330 may be arranged on main body 21 illustrated in FIG. 9 so as to be aligned in a direction orthogonal to the lengthwise direction of rails 7. With this configuration, a single lifting system 6*c* can inspect the condition of a plurality of rails 7. FIG. 11 is an enlarged perspective view illustrating an example of a plurality of connectors 1330 connected to a plurality of rails 7 according to Embodiment 2.

To move lifting system 6*c* on rails 7, control processor 11 carries out control to stop actuation of propeller actuation motors 1211*b* and actuate roller actuation motors 1353.

GPS sensor 1352 is disposed at the tip of base portion 1330*a*. In the present embodiment, GPS sensor 1352 is provided at the tip of base portion 1330*a* at the two arms to facilitate reception of the position of lifting system 6*c*. GPS sensor 1352 is one example of a sensor.

As illustrated in FIG. 9 and FIG. 10, lifting system 6*c* of the present embodiment is held while hanging by two arms from two rails 7. By control processor 11 controlling the respective roller actuation motors 1353 and the respective propeller actuation motors 1211*b*, unmanned aerial vehicle 10*g* can move along rails 7 by actuating roller actuation motors 1353.

Each of first arm 1331 and second arm 1332 is provided with weight sensor 1354. Weight sensor 1354 detects the weight of lifting system 6*c* applied to rails 7 when rollers 1351 first arm 1331 and second arm 1332 contact rails 7. Weight sensors 1354 are provided on the inner portions of rollers 1351 of first arm 1331 and second arm 1332. Weight sensor 1354 outputs weight information indicating the detected weight of lifting system 6*c* to control processor 11.

Each of first arm 1331 and second arm 1332 is provided with electric field sensor 1355. Electric field sensor 1355 detects the state of the magnetic field of rails 7 on the travel route. Electric field sensor 1355 outputs to control processor 11 magnetic field information that is associated with the position information obtained by GPS sensor 1352 and indicates the state of the detected magnetic field of rails 7.

Each of first arm 1331, second arm 1332, and base portion 1330*a* is provided camera sensor 1356. Each camera sensor 1356 detects the state and the like of rails 7 by capturing images of rails 7.

Infrared sensor 1357 is provided on base portion 1330*a*. Infrared sensor 1357 detects the state and the like of rails 7 by capturing images of rails 7 in dark environments such as at night.

Camera sensors 1356 and infrared sensor 1357 capture images of the surface of rails 7 and output image information of the captured state of rails 7 to control processor 11.

Control processor 11 can calculate the tension applied to rails 7 by obtaining the weight information from weight sensor 1354. When a plurality of lifting systems 6*c* are on the same rails 7, control processor 11 may determine whether the load capacity of rails 7 is exceeded based on the weight information. If the load capacity of rails 7 is exceeded, control processor 11 suspends (or postpones) the traveling of lifting system 6*c*.

Control processor 11 may detect whether rollers 1351 are disengaged from rails 7 by obtaining contact information from electric field sensors 1355. If rollers 1351 are disengaged from rails 7, control processor 11 may correct the attitude of lifting system 6*c* so that respective rollers 1351 travel on rails 7, by controlling respective propeller actuation motors 1211*b* to rotate propellers 22.

Control processor 11 obtains the electric field information from respective electric field sensors 1355 and transmits the information to management server 9 via the communicator. Control processor 11 transmits image information of the captured state of rails 7 from respective camera sensors 1356 to management server 9 via the communicator. This allows management server 9 to easily inspect the condition of rails 7 based on the magnetic field information and image information received from lifting system 6*c*. Stated differently, management server 9 can inspect whether rails 7 are, for example, damaged or not based on the magnetic field information and the image information.

Variation 1 of Embodiment 2

Hereinafter, since the basic configuration of the lifting system according to the present embodiment is the same as the basic configuration of the lifting system according to Embodiment 2 and the like, repeated description of the basic configuration of the lifting system in the present embodiment will be omitted where appropriate. The present variation differs from the embodiment and the like in that connector 1340 is provided with brushes 1358.

Figure 12:
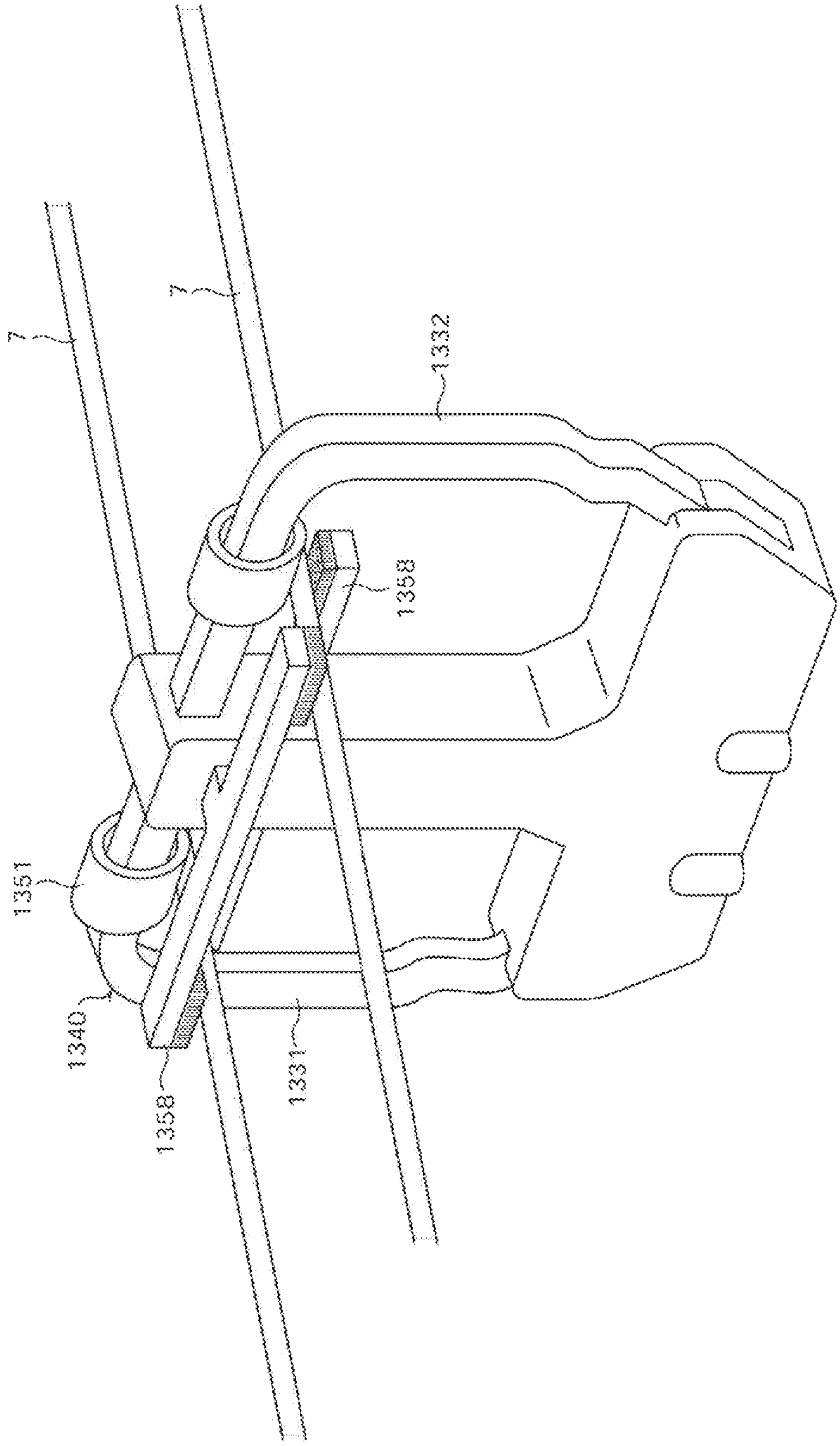
FIG. 12 is an enlarged perspective view illustrating an example of a connector according to Variation 1 of Embodiment 2.

FIG. 12 is an enlarged perspective view illustrating an example of connector 1340 according to Variation 1 of Embodiment 2.

As illustrated in FIG. 12, connector 1340 of unmanned aerial vehicle includes brushes 1358 that contact the surfaces of rails 7. Brushes 1358 are fixed to base portion 1330*a* and remove deposits from rails 7 by contacting the surfaces of rails 7 as lifting system travels along rails 7. Brushes 1358 are disposed in front of rollers 1351 relative to the direction of travel of the lifting system. This allows brushes 1358 to remove deposits from rails 7 so that rollers 1351 do not run over deposits as the lifting system travels along rails 7. Therefore, in this lifting system, since it is difficult for rollers 1351 to separate from rails 7, it is possible to inhibit a reduction in the operating efficiency of the lifting system.

When rails 7 are power lines in particular, deposits on the wire can be properly removed to allow lifting system to safely travel on rails 7.

When a plurality of rails 7 are aligned, a plurality of arms may be arranged on main body 21 so as to be aligned in a direction orthogonal to the lengthwise direction of rails 7. Such a configuration allows a single lifting system to clean a plurality of rails 7.

Variation 2 of Embodiment 2

Hereinafter, since the basic configuration of the lifting system according to the present variation is the same as the basic configuration of the lifting system according to Embodiment 2 and the like, repeated description of the basic configuration of lifting system in the present variation will be omitted where appropriate. The present variation differs from the embodiment and the like in that, the inner diameter of one of two connectors 1341 and 1342 is large and the inner diameter of the other of the two connectors 1341 and 1342 is small.

Figure 13:
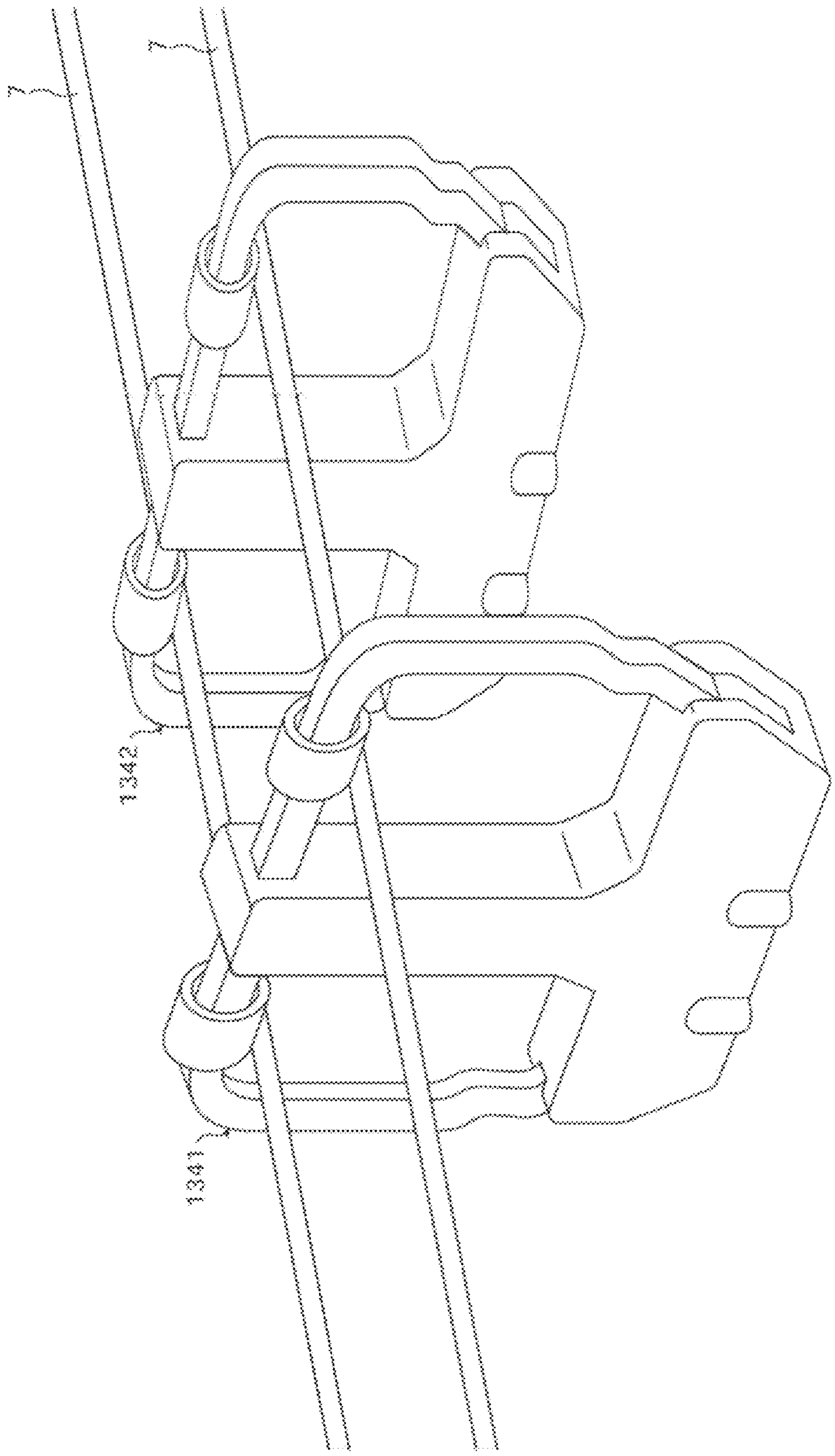
FIG. 13 is an enlarged perspective view illustrating an example of a connector according to Variation 2 of Embodiment 2.

FIG. 13 is an enlarged perspective view illustrating an example of connectors 1341 and 1342 according to Variation 2 of Embodiment 2.

As illustrated in FIG. 13, the unmanned aerial vehicle includes one connector 1341 with a larger inner diameter and another connector 1342 with a smaller inner diameter than connector 1341. Among the two connectors 1341 and 1342 included in the unmanned aerial vehicle, connector 1341 is used when the lifting system is engaging rails 7. In other words, connector 1341 can travel on rails 7.

When connector 1341 moves on rails 7, the swaying of the lifting system is increased by disturbances such as wind. As a result, if distances between the respective camera sensors on connector 1341 and the respective rails 7 are not maintained constant, and the images obtained by the camera sensors may be disturbed. For this reason, control processor 11 controls the actuation of connector 1341 so that, when the lifting system sways significantly (greater than or equal to a predetermined vibration frequency), the lifting system is further connected to rails 7 by connector 1342 after connecting connector 1341 to rails 7. This can reduce swaying in the lifting system.

Embodiment 3

Configuration

Hereinafter, since the basic configuration of lifting system 6*c* according to the present embodiment is the same as the basic configuration of the lifting system according to Embodiment 1 and the like, repeated description of the basic configuration of lifting system 6*c* in the present embodiment will be omitted where appropriate. The present embodiment differs from other embodiments and the like in that it exemplifies a case where delivery box 1108 collects a user's package.

Figure 14:
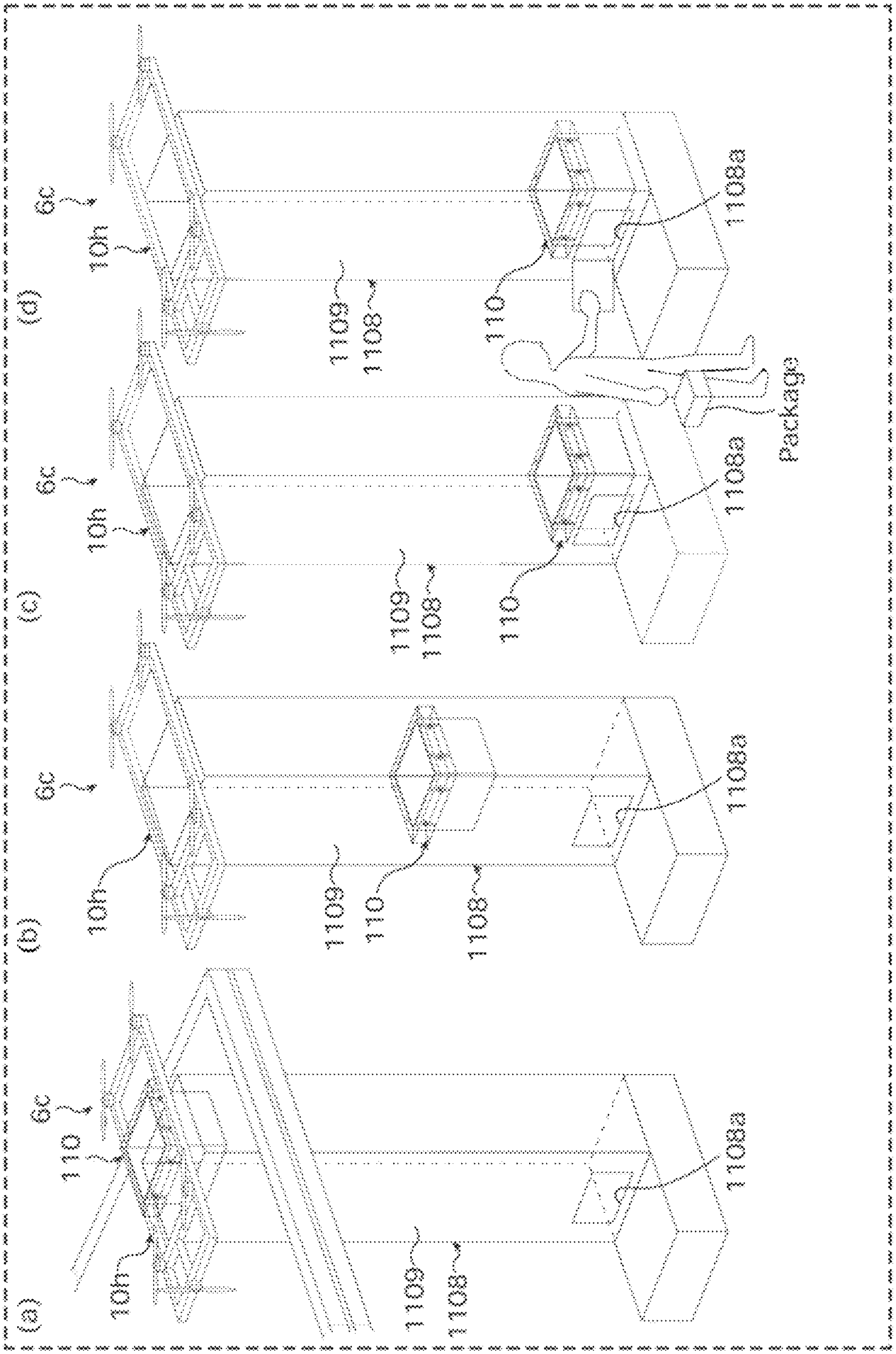
FIG. 14 is a schematic diagram illustrating an example of a lifting system retrieving a package for delivery according to Embodiment 3.
Figure 15:
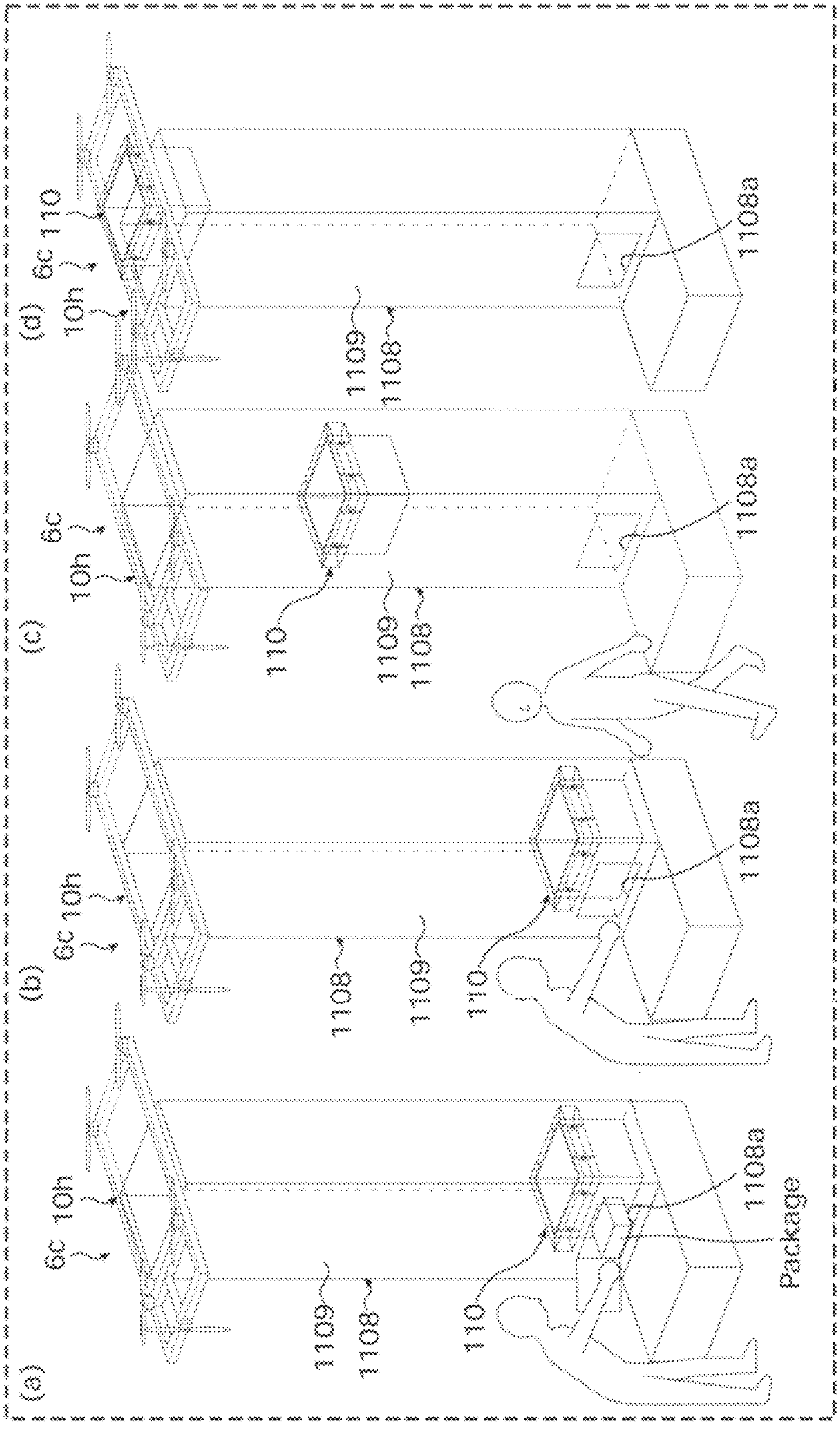
FIG. 15 is a schematic diagram illustrating an example of a package being loaded onto the lifting system according to Embodiment 3.
Figure 16:
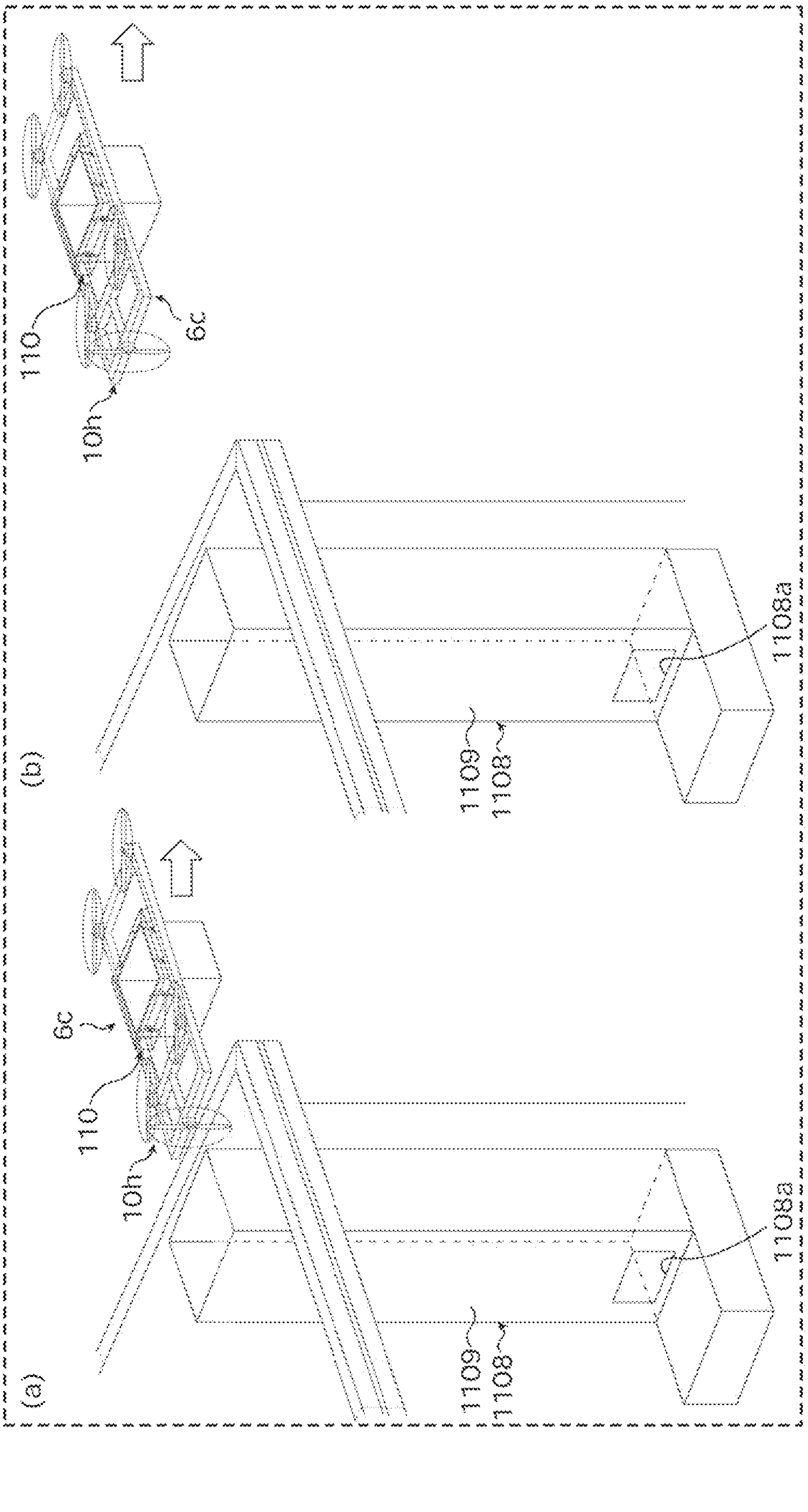
FIG. 16 is a schematic diagram illustrating an example of an unmanned aerial vehicle flying away after a package is loaded onto the lifting system according to Embodiment 3.
Figure 17:
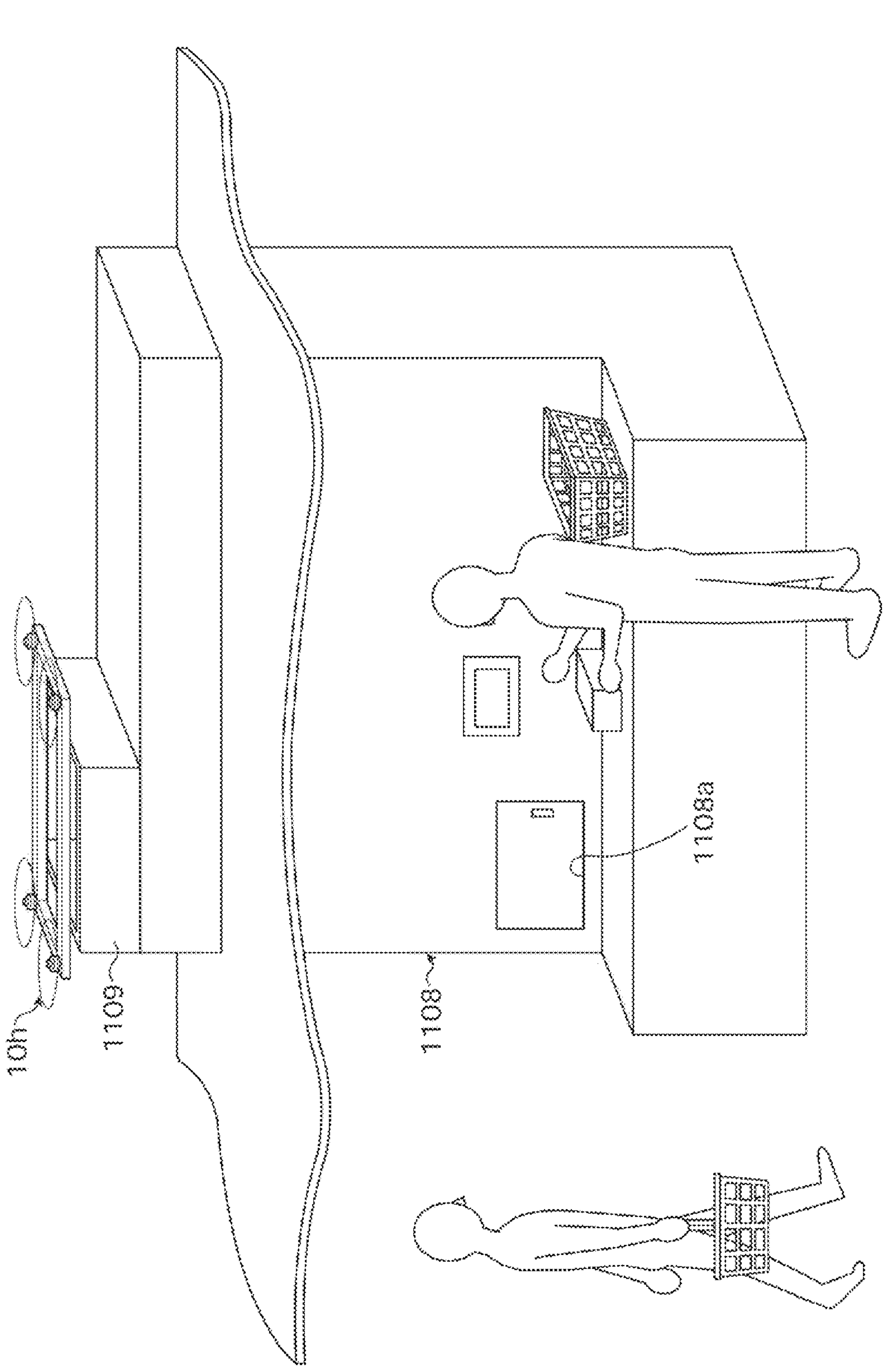
FIG. 17 is a schematic diagram illustrating an example of the lifting system retrieving a package through a delivery box provided in a public facility according to Embodiment 3.

FIG. 14 is a schematic diagram illustrating an example of lifting system 6*c* retrieving a package for delivery according to Embodiment 3. FIG. 15 is a schematic diagram illustrating an example of a package being loaded onto lifting system 6*c* according to Embodiment 3. FIG. 16 is a schematic diagram illustrating an example of unmanned aerial vehicle 10*h* flying away after a package is loaded onto lifting system 6*c* according to Embodiment 3. FIG. 17 is a schematic diagram illustrating an example of lifting system 6*c* retrieving a package through delivery box 1108 provided in a public facility according to Embodiment 3. Delivery box 1108 in the present embodiment is a box for collecting and delivering a package that a user wants to be delivered to a destination point.

In the present embodiment, delivery box 1108 is provided in a public facility such as a convenience store, and an opening of delivery box 1108 is provided on the roof of the public facility. Stated differently, delivery box 1108 includes elongated loading entrance portion 1109 that extends vertically.

As illustrated in (a) and (b) in FIG. 14 and in FIG. 17, first, when unmanned aerial vehicle 10*h* arrives at a position vertically above delivery box 1108, which is the receiver, control processor 11 controls the plurality of propeller actuation motors 1211*b* so as to align the opening of delivery box 1108 with the package to be loaded on first thruster device 110. Lifting system 6*c* descends to cover the opening of delivery box 1108 and inserts first thruster device 110 into the opening of delivery box 1108.

As illustrated in (b) in FIG. 14, control processor 11 controls wire control module 12*c* to start reeling out the wire. First thruster device 110 descends while being guided by loading entrance portion 1109 of delivery box 1108.

As illustrated in (c) and (d) in FIG. 14 and in (a) in FIG. 15, first thruster device 110 is then placed on the bottom of delivery box 1108. The user opens the side lid of delivery box 1108 and attaches a package to first thruster device 110 through loading port 1108*a* to load the package onto first thruster device 110. At this time, thruster controller 124 of first thruster device 110 detects that a package has been loaded via a sensor, such as a switch sensor or a weight sensor or the like. Note that the user may store the package in delivery box 1108 in advance. In such cases, first thruster device 110 may automatically load the package.

As illustrated in (b) and (c) in FIG. 15, when the user closes the side lid of delivery box 1108 and the sensor detects that a package has been loaded, the controller controls the wire control module to start reeling in the wire based on the sensor's detection result. First thruster device 110 ascends while being guided by loading entrance portion 1109 of delivery box 1108.

As illustrated in (c) and (d) in FIG. 15 and in (a) and (b) in FIG. 16, first thruster device 110 attaches to the main body of unmanned aerial vehicle 10*h*. Lifting system 6*c* then moves away from the opening of delivery box 1108 and moves to the receiver from the sender, which is the public facility in this case.

Embodiment 4

Configuration

Hereinafter, since the basic configuration of lifting system 6*c* according to the present embodiment is the same as the basic configuration of the lifting system according to Embodiment 1 and the like, repeated description of the basic configuration of lifting system 6*c* in the present embodiment will be omitted where appropriate. The present embodiment differs from other embodiments and the like in that it exemplifies a case in which lifting system 6*c* retrieves and delivers a package stored in a delivery box.

The present embodiment describes processes from the loading of a package onto first thruster device 110 by a user to the delivering of the package to a delivery box at a receiver.

Figure 18:
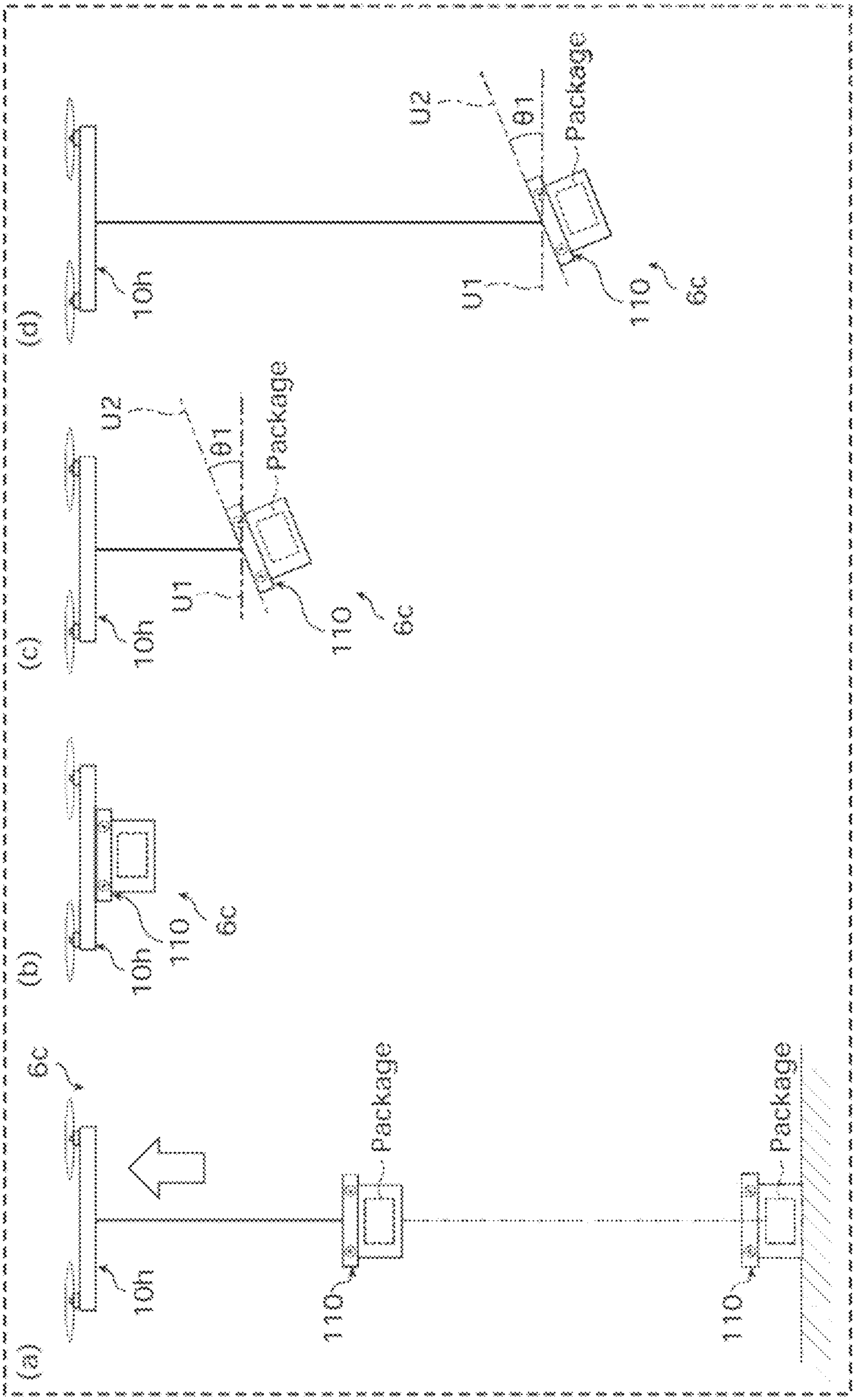
FIG. 18 is a schematic diagram illustrating an example of a first thruster device of a lifting system retrieving a package according to Embodiment 4.
Figure 19:
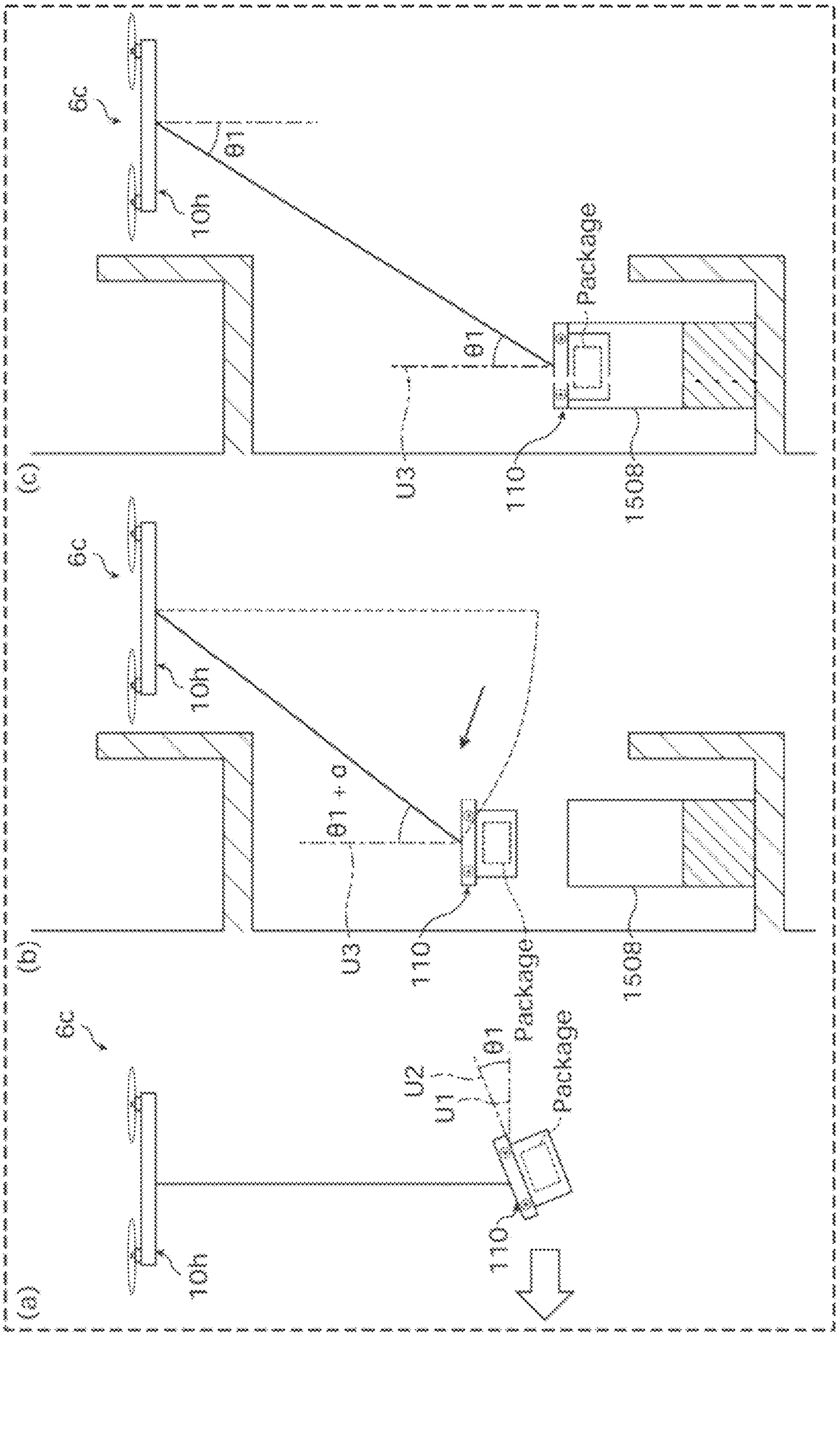
FIG. 19 is a schematic diagram illustrating an example of the first thruster device of the lifting system storing the retrieved package in a delivery box according to Embodiment 4.
Figure 20:
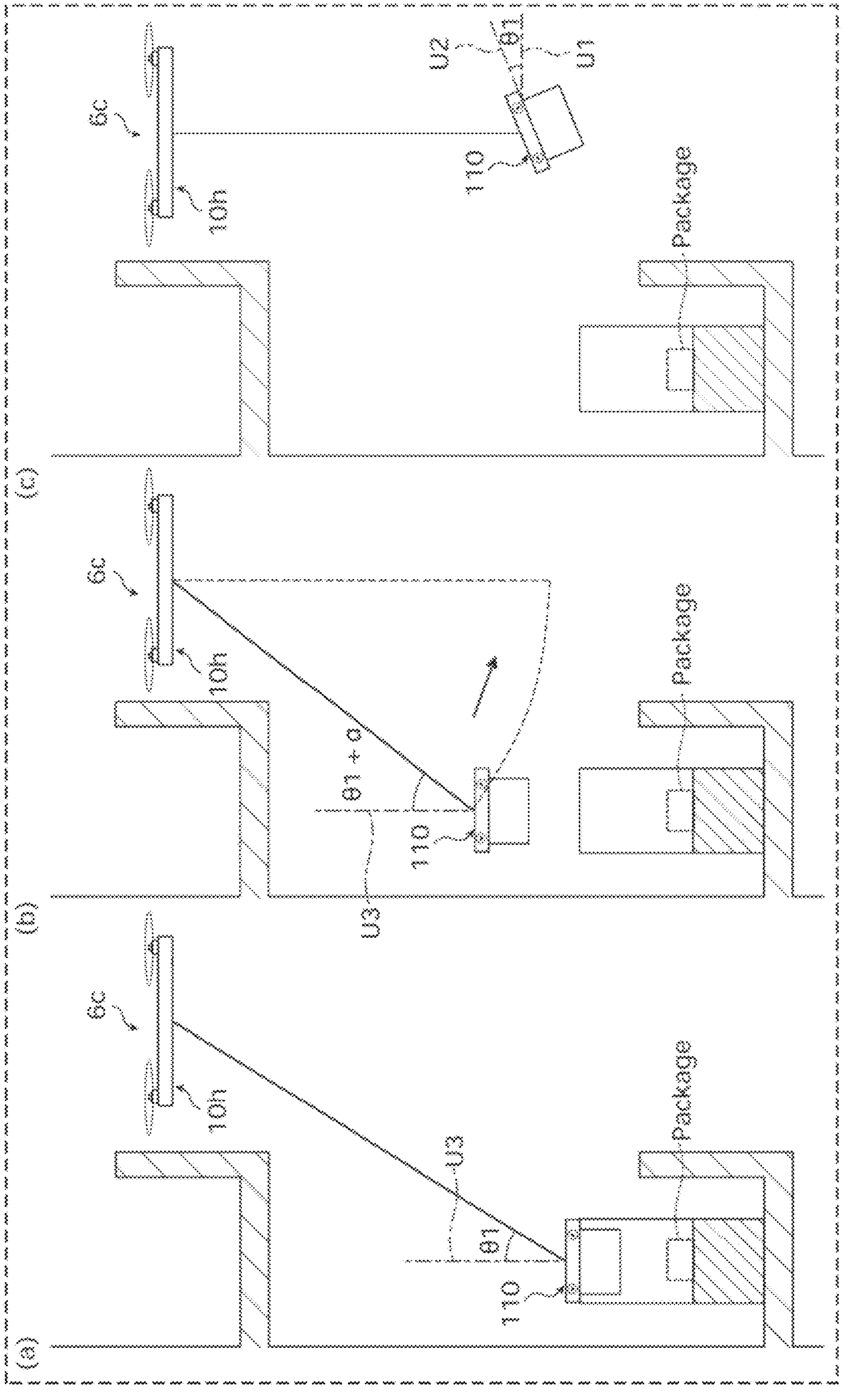
FIG. 20 is a schematic diagram illustrating an example of the first thruster device of the lifting system separating from the delivery box after storing the package in the delivery box according to Embodiment 4.
Figure 21:
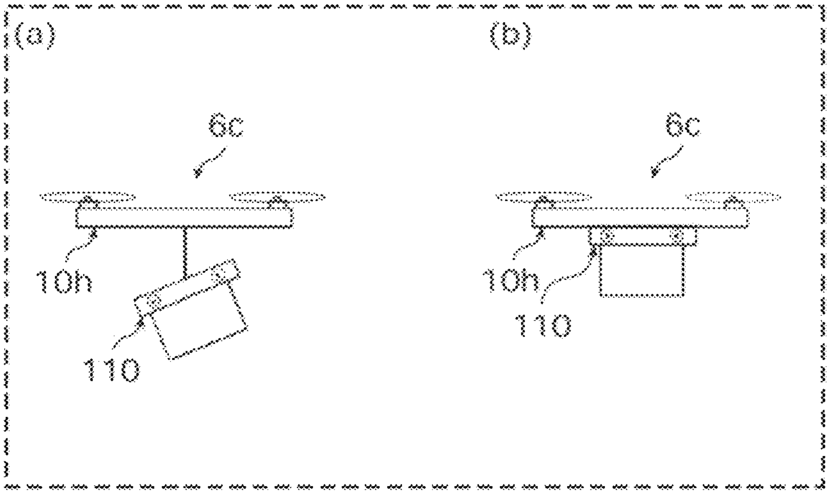
FIG. 21 is a schematic diagram illustrating an example of the unmanned aerial vehicle of the lifting system being attached to the first thruster device according to Embodiment 4.

FIG. 18 is a schematic diagram illustrating an example of first thruster device 110 of lifting system 6*c* retrieving a package according to Embodiment 4. FIG. 19 is a schematic diagram illustrating an example of first thruster device 110 of lifting system 6*c* storing the retrieved package in delivery box 1508 according to Embodiment 4. FIG. 20 is a schematic diagram illustrating an example of first thruster device 110 of lifting system 6*c* separating from delivery box 1508 after storing the package in delivery box 1508 according to Embodiment 4. FIG. 21 is a schematic diagram illustrating an example of unmanned aerial vehicle 10*h* of lifting system 6*c* being attached to first thruster device 110 according to Embodiment 4.

As illustrated in (a) in FIG. 18, once first thruster device 110 has retrieved the package and first thruster device 110 has loaded the package, control processor 11 controls wire control module 12*c* to start reeling in the wire. Note that wire control module 125 of first thruster device 110 may start the reeling in of the wire. First thruster device 110 loaded with the package then ascends, and first thruster device 110 is attached to the main body of unmanned aerial vehicle 10*h*.

Then, as illustrated in (b) in FIG. 18, lifting system 6*c* moves away from the opening of delivery box 1508 and moves to the receiver from the sender, which is a public facility in this case.

As illustrated in (c) in FIG. 18, when lifting system 6*c* comes near delivery box 1508, which is the receiver, control processor 11 outputs an incline instruction to first thruster device 110 to cause the attitude of first thruster device 110 to incline at an angle relative to the horizontal plane. When thruster controller 124 obtains the incline instruction, it inclines the support member so that virtual surface U2 (horizontal plane U1 in the present embodiment) of first thruster device 110 intersects a plane orthogonal to the lengthwise direction of the wire. More specifically, when thruster controller 124 obtains the incline instruction from control processor 11, thruster controller 124 moves the connection point from the center of gravity of first thruster device 110 when first thruster device 110 is viewed from above. More specifically, thruster controller 124 slides vertical crosspiece 1015*b* and horizontal crosspiece 1015*c* in outer frame 1015*a* in a direction away from delivery box 1508, thereby moving the connection point away from the center of gravity of first thruster device 110. As a result, in lifting system 6*c*, first thruster device 110 inclines, that is to say, the support member of first thruster device 110 inclines at an angle θ1 relative to horizontal plane U1.

As illustrated in (d) in FIG. 18, thruster controller 124 controls wire control module 125 to start reeling out the wire. This causes first thruster device 110 to descend while the attitude of first thruster device 110 is maintained inclined relative to horizontal plane U1.

As illustrated in (a) and (b) in FIG. 19, thruster controller 124 controls wire control module 125 to continue reeling out the wire, recognizes delivery box 1508 based on the image information, and controls the plurality of second propeller actuation motors 112 according to the position of the recognized delivery box 1508. With this, first thruster device 110 moves toward delivery box 1508. First thruster device 110 then moves to a position vertically above the opening of delivery box 1508. At this time, first thruster device 110 moves in an arc centered around the axis of unmanned aerial vehicle 10*h*. When first thruster device 110 reaches a position vertically above the opening of delivery box 1508, virtual surface U2 of first thruster device 110 is approximately parallel to horizontal plane U1. At this time, the angle between vertical line U3 passing through first thruster device 110 and the lengthwise direction of the wire, and the angle between vertical line U3 passing through unmanned aerial vehicle 10*h* and the lengthwise direction of the wire is θ1+α, which is greater than the angle θ1.

As illustrated in (a), (b), and (c) in FIG. 19, thruster controller 124 controls wire control module 125 to continue to reel out the wire and controls the plurality of propeller actuation motors based on the image information to lower first thruster device 110 into the opening of delivery box 1508. First thruster device 110 is lowered in an attitude in which virtual surface U2 of first thruster device 110 is approximately parallel to horizontal plane U1.

As illustrated in (c) in FIG. 19, first thruster device 110 lands on delivery box 1508 so as to cover the opening of delivery box 1508, and the package is inserted through the opening of delivery box 1508.

As illustrated in (a) in FIG. 20, first thruster device 110 disconnects the package to store the package in delivery box 1508.

As illustrated in (b) and (c) in FIG. 20, thruster controller 124 controls wire control module 125 to reel in the wire and controls the plurality of second propeller actuation motors 112 based on the image information to raise first thruster device 110. As a result, first thruster device 110 is separated from the opening of delivery box 1508. Thruster controller 124 controls wire control module 125 to stop the reeling in of the wire. At this time, first thruster device 110 moves in an arc because it is pulling on the wire with respect to unmanned aerial vehicle 10*h* fixed to the rail. Stated differently, first thruster device 110 moves to a position vertically below unmanned aerial vehicle 10*h* like a pendulum by rotation of the propellers by the plurality of second propeller actuation motors 112 or by its own weight.

As illustrated in (a) and (b) in FIG. 21, first thruster device 110 is raised and attached to unmanned aerial vehicle 10*h* by controlling wire control module 125 to reel in the wire. In lifting system 6*c*, unmanned aerial vehicle 10*h* then returns to the sender.

Next, a configuration in which first thruster device 110 inclines with respect to a horizontal plane will be described.

Figure 22:
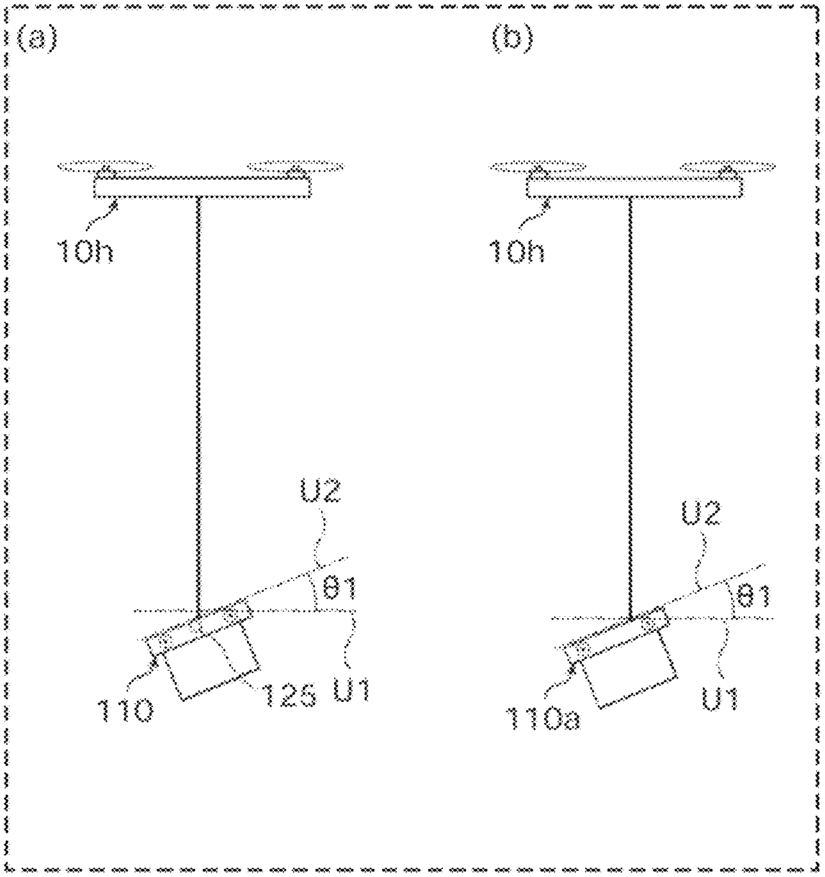
FIG. 22 is a schematic diagram illustrating an example of the first thruster device of the lifting system inclined with respect to a horizontal plane according to Embodiment 4.

FIG. 22 is a schematic diagram illustrating an example of first thruster device 110 of lifting system 6*c* inclined with respect to a horizontal plane according to Embodiment 4. In FIG. 22, (a) illustrates first thruster device 110 according to Example 1 and (b) illustrates first thruster device 110 according to Example 2.

Next, a configuration for inclining first thruster device 110 will be described.

Example 1

In (a) in FIG. 22, wire control module 125 of first thruster device 110 may include a hinge and a hinge actuation motor. Wire control module 125 may incline the support member so that virtual surface U2 of first thruster device 110 intersects a plane orthogonal to the lengthwise direction of the wire. This allows the support member of first thruster device 110 to be inclined at an angle θ1 with respect to horizontal plane U1.

Example 2

First thruster device 110*a* in (b) in FIG. 22 may incline the support member so that virtual surface U2 of first thruster device 110 intersects a plane orthogonal to the lengthwise direction of the wire by changing the position of the connection point between the wire and the support member relative to the center of gravity of the support member. This allows the support member of first thruster device 110 to be inclined at an angle θ1 with respect to horizontal plane U1.

Embodiment 5

Configuration

Hereinafter, since the basic configuration of lifting system 6*c* according to the present embodiment is the same as the basic configuration of the lifting system according to Embodiment 4 and the like, repeated description of the basic configuration of lifting system 6*c* in the present embodiment will be omitted where appropriate.

Figure 23:
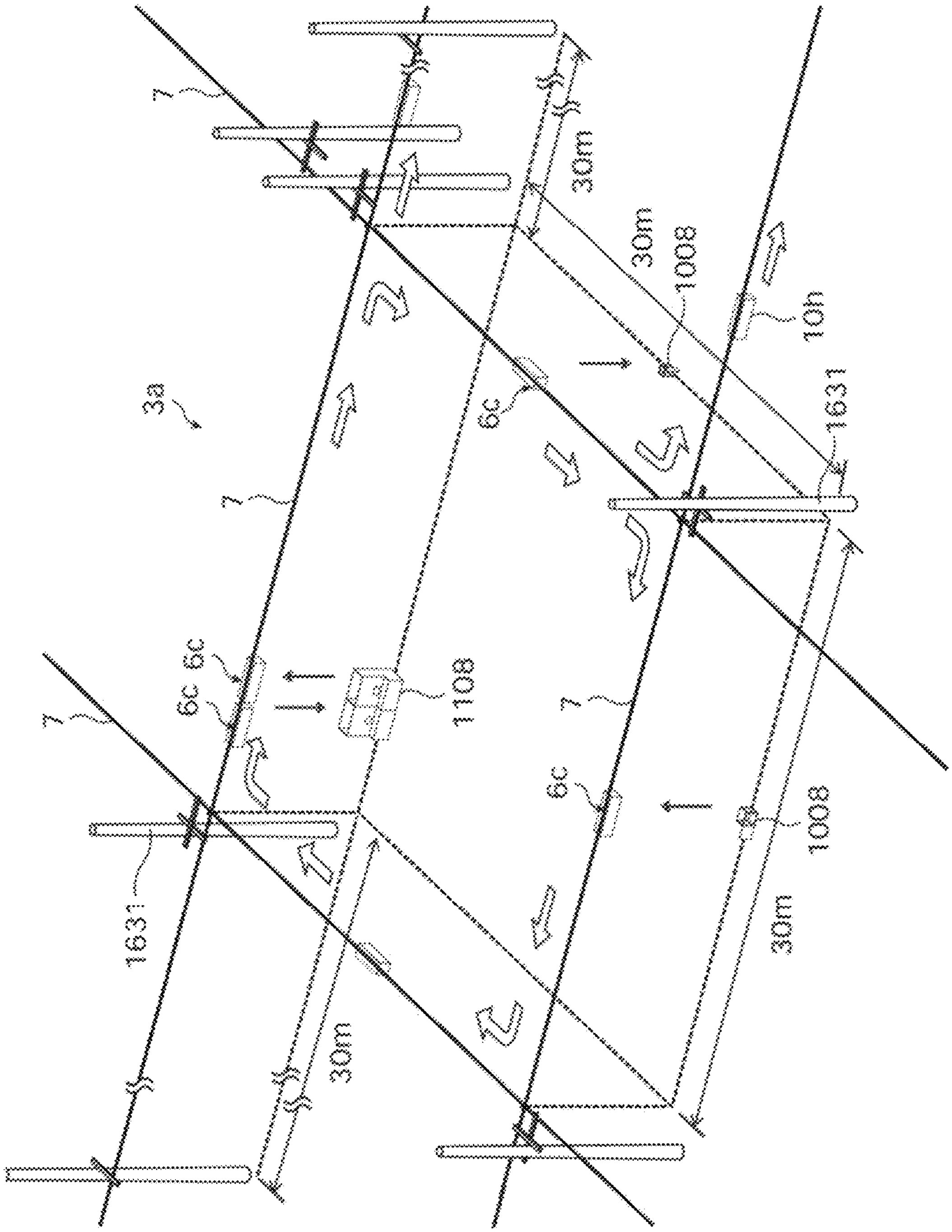
FIG. 23 is a schematic diagram illustrating an example of a comprehensive overview of a logistics system according to Embodiment 5.
Figure 24:
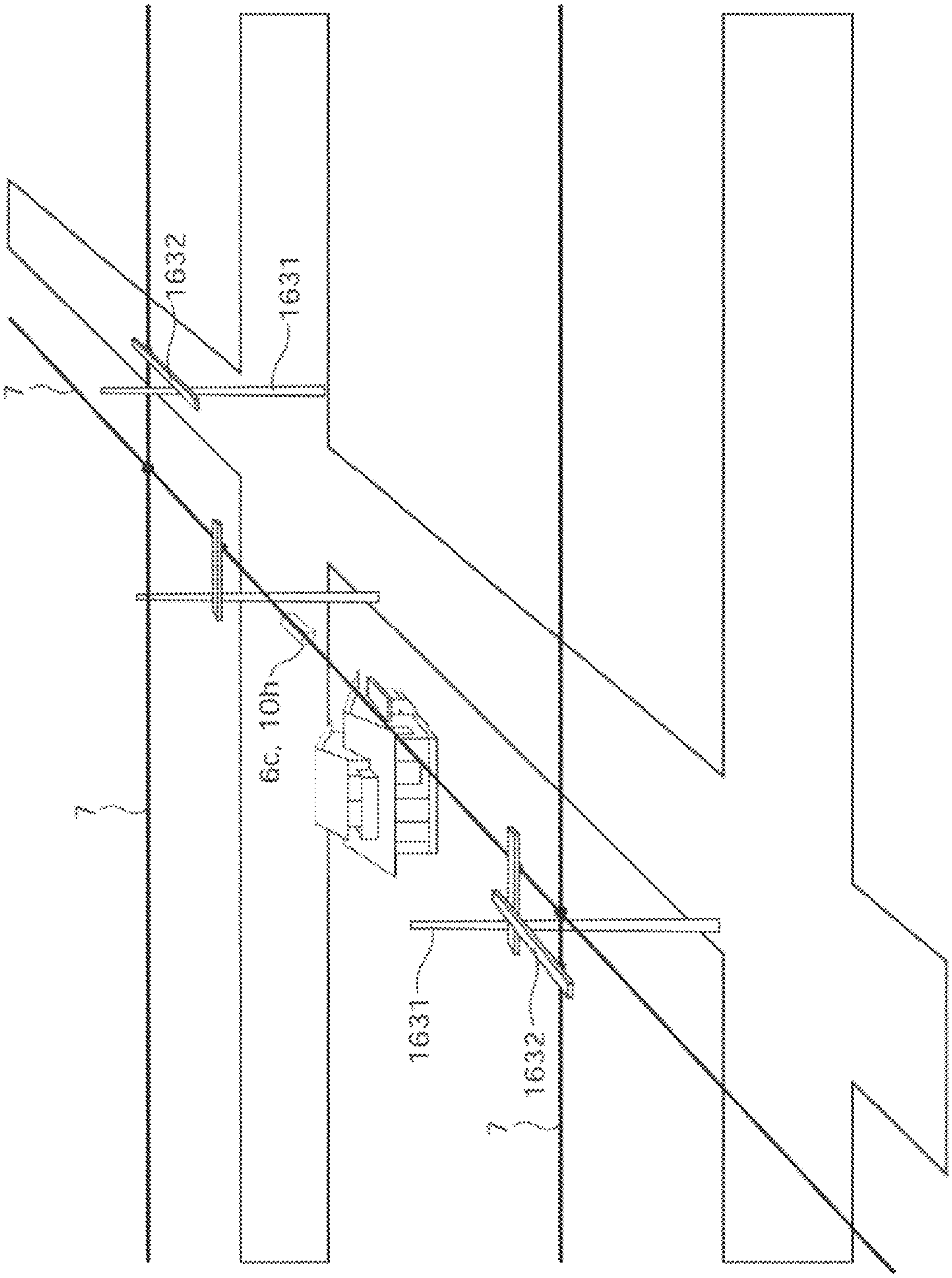
FIG. 24 is another schematic diagram illustrating an example of a comprehensive overview of the logistics system according to Embodiment 5.

FIG. 23 is a schematic diagram illustrating an example of a comprehensive overview of logistics system 3*a* according to Embodiment 5. FIG. 24 is another schematic diagram illustrating an example of a comprehensive overview of logistics system 3*a* according to Embodiment 5.

In logistics system 3*a* according to the present embodiment, lifting system 6*c*, support pillars, and rails 7 are used to collect and deliver packages.

As illustrated in FIG. 23 and FIG. 24, in logistics system 3*a*, rails 7 are stretched out supported by support pillars. In the present embodiment, rails 7 are power lines and support pillars are utility poles. Unmanned aerial vehicle 10*h* of lifting system 6*c* can travel along rails 7 to collect packages and deliver packages. Once unmanned aerial vehicle 10*h* collects a package from delivery box 1108 for collecting packages, it travels along rail 7 to the destination point. When unmanned aerial vehicle 10*h* arrives at the destination point, first thruster device 110 descends while unmanned aerial vehicle 10*h* holds onto rails 7 to store the package in delivery box 1008. Unmanned aerial vehicle 10*h* then returns to delivery box 1108 to collect the next package.

Figure 25:
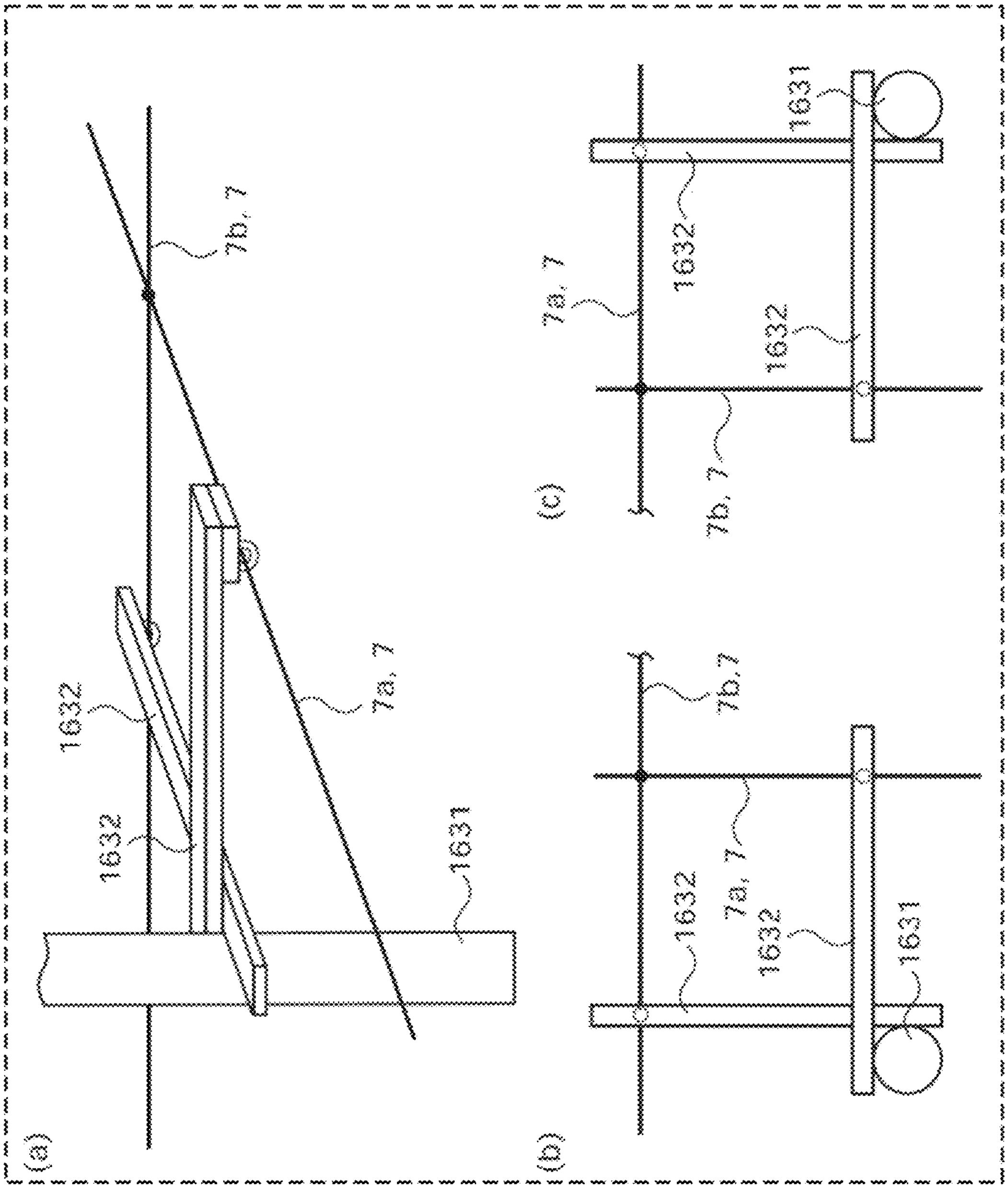
FIG. 25 is a schematic diagram illustrating an example of a support pillar and rails in the logistics system according to Embodiment 5.

FIG. 25 is a schematic diagram illustrating an example of a support pillar and rails in logistics system 3*a* according to Embodiment 5. In FIG. 25, (a) is a perspective view of the support pillar and rails, and (b) and (c) are plan views of the support pillar and rails as viewed from above.

Logistics system 3*a* includes support pillars, rails 7, and lifting system 6*c*.

As illustrated in FIG. 25, the support pillar includes support pillar main body 1631 for supporting rails 7 and rail support portions 1632 for supporting rails 7. Rail support portion 1632 is an elongated support member extending orthogonally to the lengthwise direction of the support pillar. In the present embodiment, two rail support portions 1632 extending in a direction orthogonal to the lengthwise direction of support pillar main body 1631 are fixed to support pillar main body 1631. One of the two rail support portions 1632 extends from support pillar main body 1631 in a first predefined direction and the other of the two rail support portions 1632 extends from support pillar main body 1631 in a second predefined direction orthogonal to the first predefined direction. The one of the rail support portions 1632 supports first rail 7*a* and the other of the rail support portions 1632 supports second rail 7*b*, which is different rail than first rail 7*a*. First rail 7*a* and second rail 7*b* are provided such that the lengthwise directions thereof are orthogonal. Stated differently, first rail 7*a* intersects second rail 7*b*.

Variation of Embodiment 5

Hereinafter, since the basic configuration of unmanned aerial vehicle 10*j* according to the present variation is the same as the basic configuration of the unmanned aerial vehicle of Embodiment 5 and the like, repeated description of the basic configuration of unmanned aerial vehicle 10*j* in the present variation will be omitted where appropriate.

Figure 26:
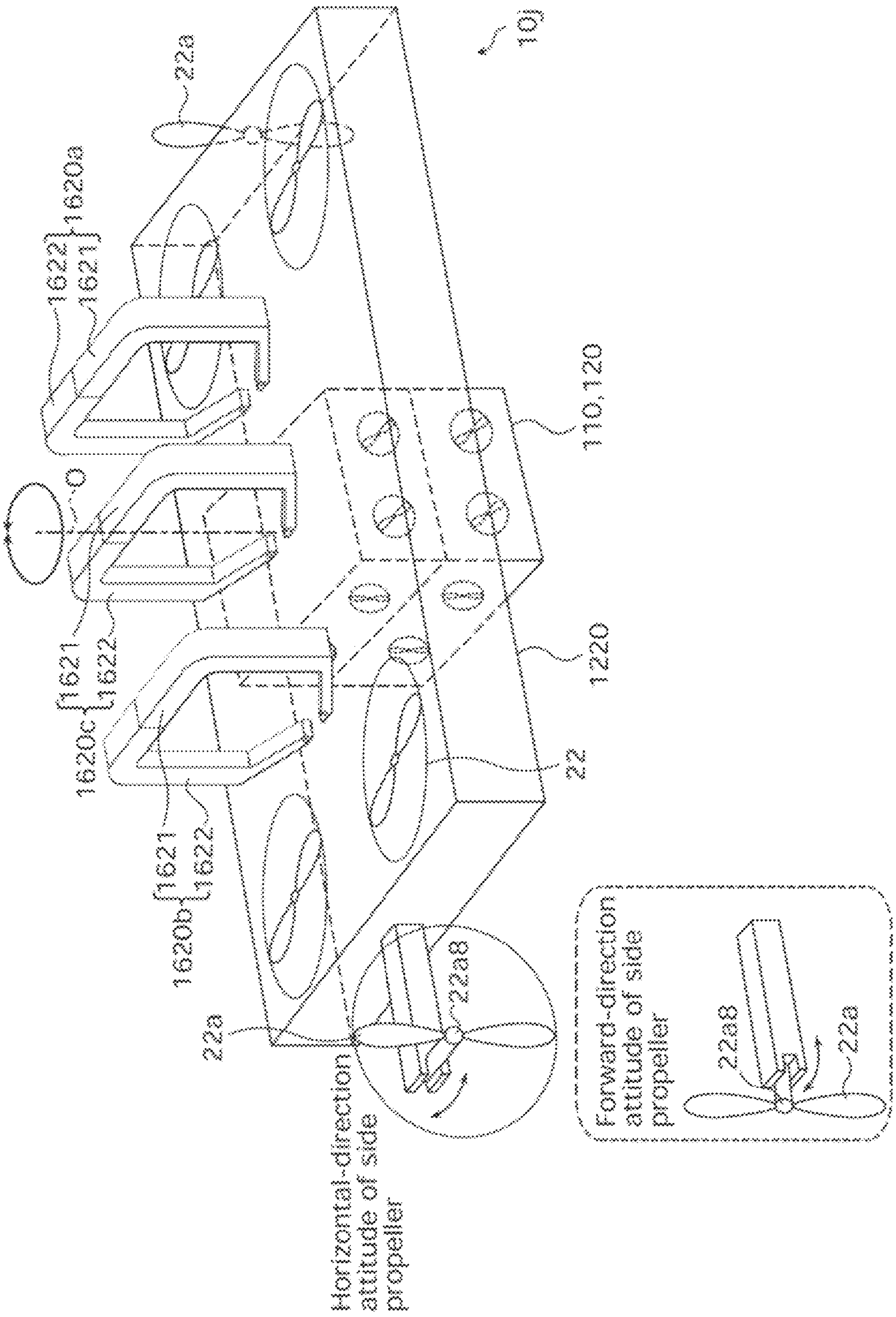
FIG. 26 is a perspective view illustrating an example of an unmanned aerial vehicle according to a variation of Embodiment 5.

FIG. 26 is a perspective view illustrating an example of unmanned aerial vehicle 10*j* according to a variation of Embodiment 5.

As illustrated in FIG. 26, unmanned aerial vehicle 10*j* includes three connectors. The three connectors are aligned in the lengthwise direction of rail 7. The three connectors are referred to as first connector 1620*a*, second connector 1620*b*, and third connector 1620*c*.

First connector 1620*a* is arranged in the frontmost position of unmanned aerial vehicle 10*j* among the three connectors, second connector 1620*b* is arranged in the rearmost position of unmanned aerial vehicle 10*j* among the three connectors, and third connector 1620*c* is arranged between first connector 1620*a* and second connector 1620*b*. Although each of first connector 1620*a*, second connector 1620*b*, and third connector 1620*c* has the same configuration, each of first connector 1620*a*, second connector 1620*b*, and third connector 1620*c* may have different shaped first and second hooks 1621 and 1622.

Third connector body 1620*c* is rotatable around axis O parallel to the vertical direction. Third connector body 1620*c* can rotate 360°. Third connector body 1620*c* rotates under control by actuation controller 12. More specifically, when switching the connection of third connector 1620*c* between first rail 7*a* and second rail 7*b*, control processor 11 rotates third connector 1620*c* by a predetermined angle via actuation controller 12. Even more specifically, actuation controller 12 controls the actuator to pivot each of first hook 1621 and second hook 1622 around a predetermined axis to open third connector 1620*c* and release the connection between first rail 7*a* and third connector 1620*c*. Actuation controller 12 rotates third connector 1620*c* by a predetermined angle around axis O. When third connector 1620*c* is in a position where it can be connected to second rail 7*b*, actuation controller 12 pivots each of first hook 1621 and second hook 1622 around a predetermined axis to close third connector 1620*c* and connect second rail 7*b* to third connector 1620*c*. Third connector 1620*c* is one example of an arm.

Operations

Figure 27:
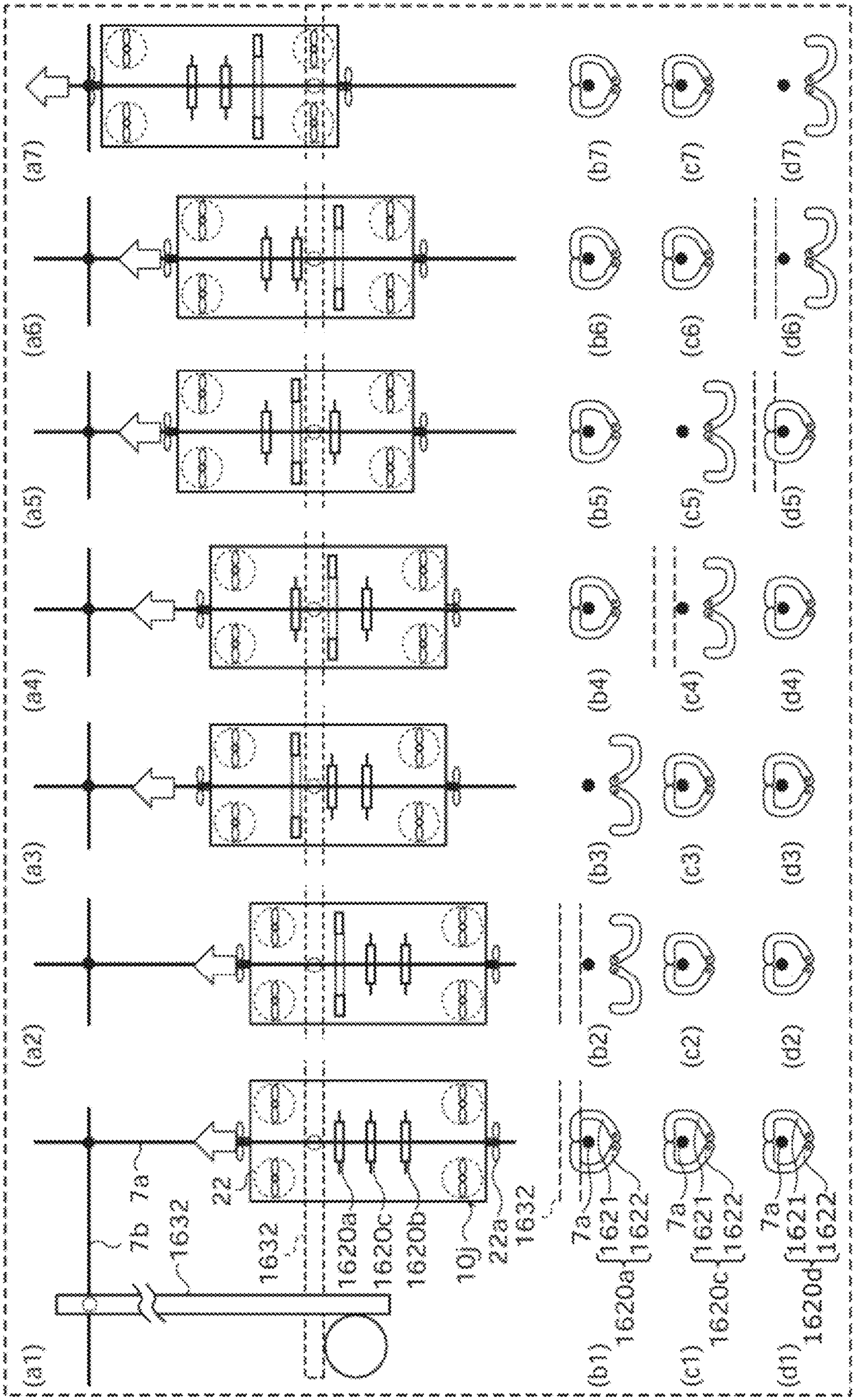
FIG. 27 is a schematic diagram illustrating an example of the unmanned aerial vehicle according to a variation of Embodiment 5 passing one of rail support portions supporting a first rail while traveling along the first rail.

FIG. 27 is a schematic diagram illustrating an example of unmanned aerial vehicle 10*j* according to a variation of Embodiment passing one of rail support portions 1632 supporting first rail 7*a* while traveling along first rail 7*a*. In FIG. 27, (a*) illustrates an example of unmanned aerial vehicle 10*j* as viewed from above, (b*) illustrates an example of a view of first connector 1620*a* and first rail 7*a* in the traveling direction, (c*) illustrates an example of a view of third connector 1620*c* and first rail 7*a* in the traveling direction, and (d*) illustrates an example of a view of second connector 1620*b* and first rail 7*a* in the traveling direction. The "*" is a placeholder for a number indicating the order in which the figures are described in FIG. 27. Also, in FIG. 27, reference signs are omitted where appropriate.

As illustrated in (a1), (b1), (c1), (a2), (b2), and (c2) in FIG. 27, unmanned aerial vehicle 10*j* travels along first rail 7*a* by rotating side propellers 22*a*. As first connector 1620*a* approaches one rail support portion 1632 illustrated using a dashed line, unmanned aerial vehicle 10*j* pivots first hook 1621 and second hook 1622 of first connector 1620*a* to open first connector 1620*a*. First connector 1620*a* is disconnected from first rail 7*a* and is disposed vertically below the one rail support portion 1632 so that first connector 1620*a* and the one rail support portion 1632 do not come into contact with each other. At this time, since third connector 1620*c* and second connector 1620*b* are connected to first rail 7*a*, the attitude of unmanned aerial vehicle 10*j* is maintained. When disconnecting first connector 1620*a* from first rail 7*a*, unmanned aerial vehicle 10j may provide buoyancy vertically upwardly by rotating the front propellers 22, as shown by the solid lines.

As illustrated in (a3), (b3), (c3), (a4), (b4), and (c4) in FIG. 27, when first connector 1620a passes vertically below the one rail support portion 1632, unmanned aerial vehicle 10j pivots first hook 1621 and second hook 1622 of first connector 1620a to close first connector 1620a, thereby coupling first connector 1620a to first rail 7a. As third connector 1620c approaches one rail support portion 1632, unmanned aerial vehicle 10j pivots first hook 1621 and second hook 1622 of third connector 1620c to open third connector 1620c. Third connector 1620c is disconnected from first rail 7a and is disposed vertically below the one rail support portion 1632 so that third connector 1620c and the one rail support portion 1632 do not come into contact with each other. At this time, first connector 1620a and second connector 1620b are connected to first rail 7a.

As illustrated in (a5), (b5), (c5), (a6), (b6), (c6), (a7), (b7), and (c7) in FIG. 27, when third connector 1620c passes vertically below the one rail support portion 1632, unmanned aerial vehicle 10j pivots first hook 1621 and second hook 1622 of third connector 1620c to close third connector 1620c, thereby coupling third connector 1620c to first rail 7a. As second connector 1620b approaches the one rail support portion 1632, unmanned aerial vehicle 10j pivots first hook 1621 and second hook 1622 of second connector 1620b to open second connector 1620b. Second connector 1620b is disconnected from first rail 7a and is disposed vertically below the one rail support portion 1632 so that second connector 1620b and the one rail support portion 1632 do not come into contact with each other. At this time, since first connector 1620a and third connector 1620c are connected to first rail 7a, the attitude of unmanned aerial vehicle 10j is maintained. When disconnecting second connector 1620b from first rail 7a, unmanned aerial vehicle 10j may provide buoyancy vertically upwardly by rotating the rear propellers 22, as shown by the solid lines. As a result, unmanned aerial vehicle 10j moves along first rail 7a while maintaining its attitude, and second connector 1620b passes vertically below the one rail support portion 1632.

Figure 28:
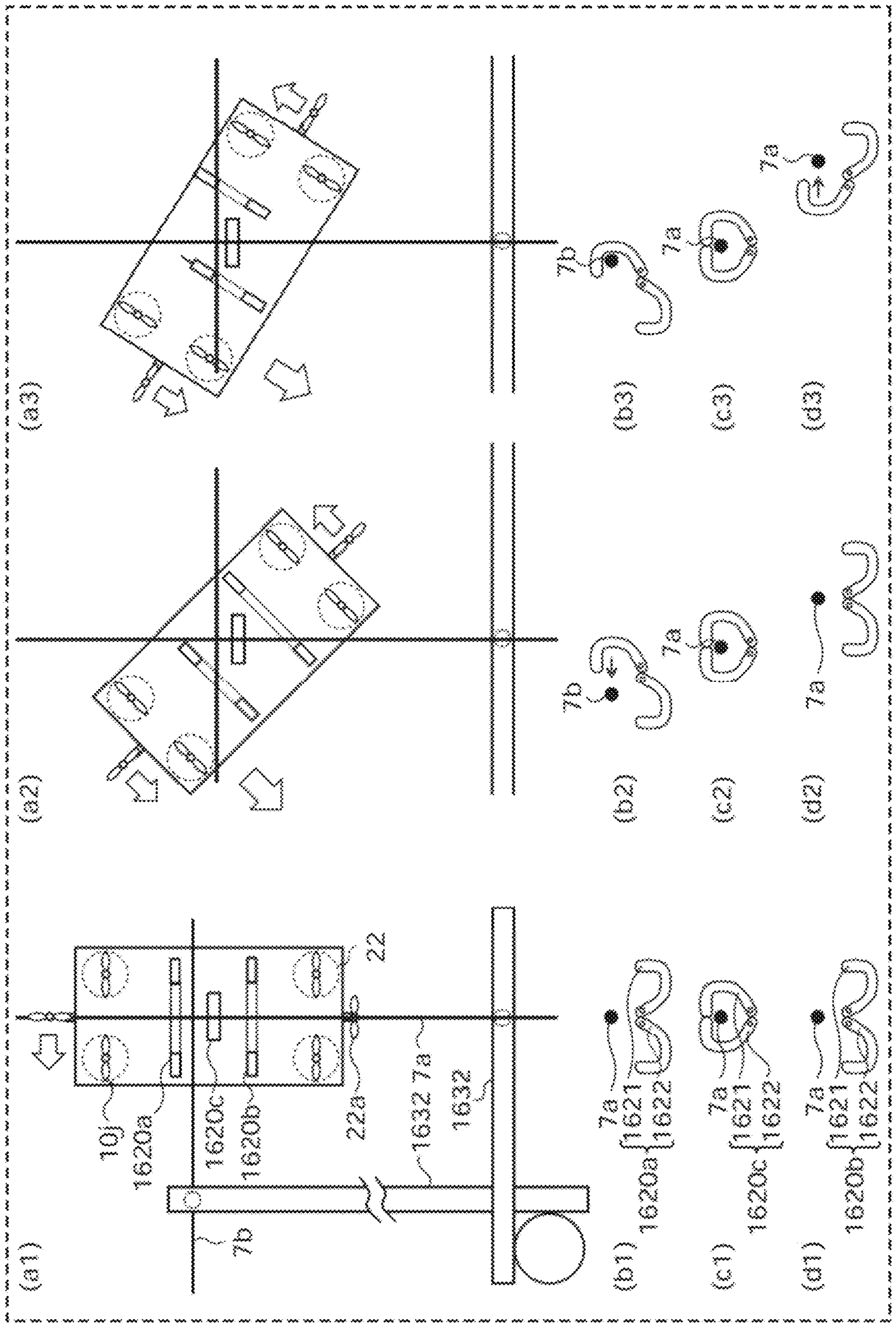
FIG. 28 is a schematic diagram illustrating an example of the first connector and the second connector of the unmanned aerial vehicle disconnecting from the first rail according to a variation of Embodiment 5.

FIG. 28 is a schematic diagram illustrating an example of first connector 1620a and second connector 1620b of unmanned aerial vehicle 10j disconnecting from first rail 7a according to a variation of Embodiment 5. In FIG. 28, (a*) illustrates an example of unmanned aerial vehicle 10j as viewed from above, (b*) illustrates an example of a view of first connector 1620a and first rail 7a in the traveling direction, (c*) illustrates an example of a view of third connector 1620c and first rail 7a in the traveling direction, and (d*) illustrates an example of a view of second connector 1620b and first rail 7a in the traveling direction. The "*" is a placeholder for a number indicating the order in which the figures are described in FIG. 28. Also, in FIG. 28, reference signs are omitted where appropriate.

As illustrated in (a1), (b1), (c1), (a2), (b2), (c2), (a3), (b3) and (c3) of FIG. 28, unmanned aerial vehicle 10j passed vertically below second rail 7b with first connector 1620a in the open state so that first connector 1620a did not contact second rail 7b. Unmanned aerial vehicle 10j temporarily comes to a stop when first connector 1620a passes vertically below first rail 7a. When unmanned aerial vehicle 10j is viewed from vertically above, the connection point between first rail 7a and second rail 7b is located between first connector 1620a and third connector 1620c. Unmanned aerial vehicle 10j further pivots first hook 1621 and second hook 1622 of second connector 1620b to open second connector 1620b. Second connector 1620b is disconnected from first rail 7a and is disposed vertically below first rail 7a so that second connector 1620b does not contact first rail 7a. Unmanned aerial vehicle 10j then rotates counterclockwise. Stated differently, unmanned aerial vehicle 10j rotates counterclockwise by rotating side propellers 22a after changing the attitudes of side propellers 22a (when horizontal) so as to cause unmanned aerial vehicle 10j illustrated in (a) in FIG. 28 to rotate in the horizontal direction. Unmanned aerial vehicle 10j is then rotated to a position where first connector 1620a and second connector 1620b overlap second rail 7b when viewed from vertically above. Unmanned aerial vehicle 10j then pivots each of first hook 1621 of first connector 1620a and second hook 1622 of second connector 1620b to a position where they can contact second rail 7b.

Figure 29:
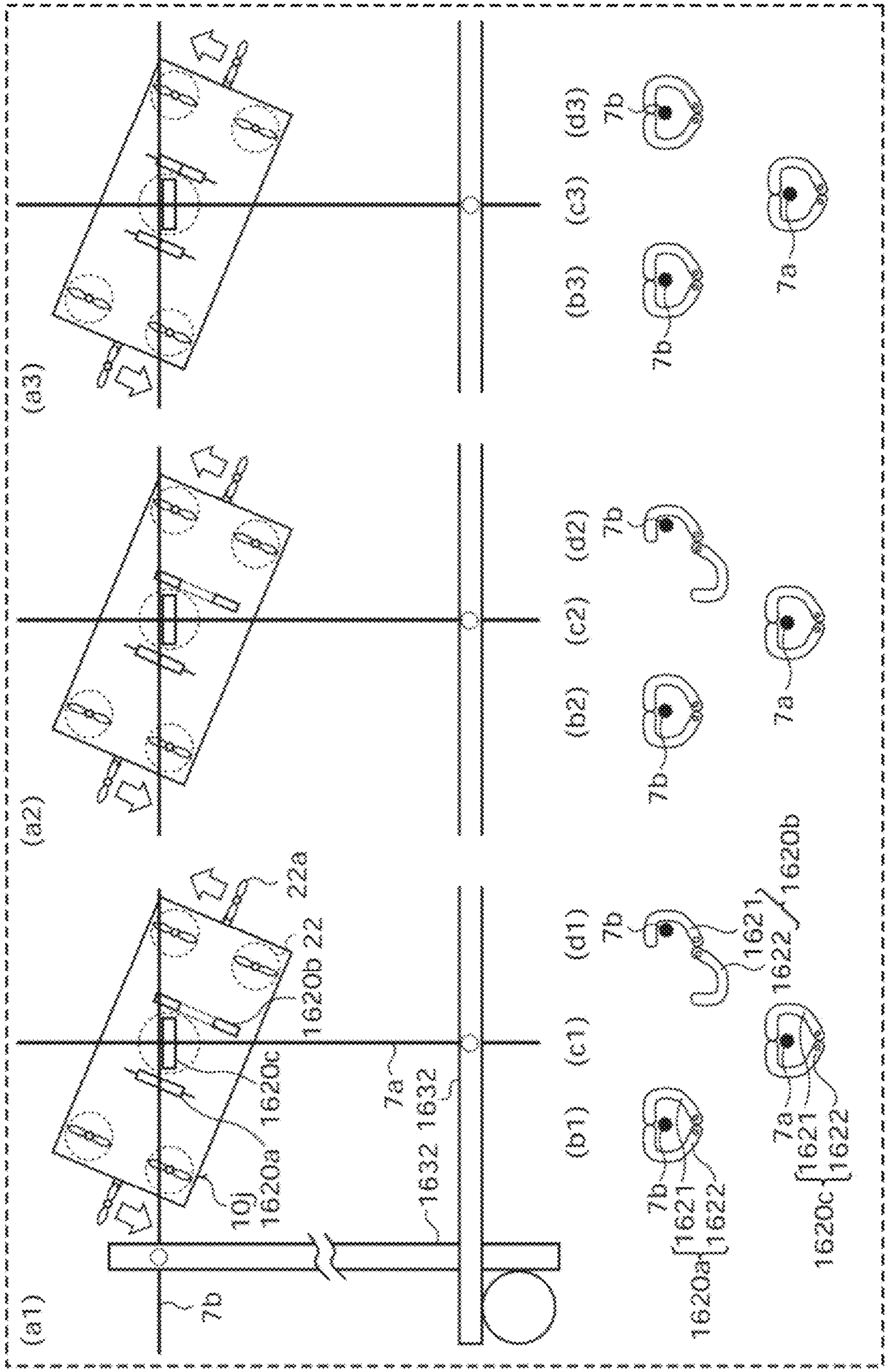
FIG. 29 is a schematic diagram illustrating an example of the first connector and the second connector of the unmanned aerial vehicle connecting to the second rail according to a variation of Embodiment 5.

FIG. 29 is a schematic diagram illustrating an example of first connector 1620a and second connector 1620b of unmanned aerial vehicle 10j connected to second rail 7b according to a variation of Embodiment 5. In FIG. 29, (a*) illustrates an example of unmanned aerial vehicle 10j as viewed from above, (b*) illustrates an example of a view of first connector 1620a and second rail 7b in the traveling direction, (c*) illustrates an example of a view of third connector 1620c and first rail 7a in the traveling direction, and (d*) illustrates an example of a view of second connector 1620b and second rail 7b in the traveling direction. The "*" is a placeholder for a number indicating the order in which the figures are described in FIG. 29. In the present variation, unmanned aerial vehicle 10j is exemplified as turning left. Also, in FIG. 29, reference signs are omitted where appropriate.

As illustrated in (a1), (b1), (c1), (a2), (b2), (c2), (a3), (b3) and (c3) in FIG. 29, unmanned aerial vehicle 10j pivots second hook 1622 of first connector 1620a to close first connector 1620a, thereby coupling first connector 1620a to second rail 7b. At this time, third connector 1620c is connected to first rail 7a. When unmanned aerial vehicle 10j rotates such that second hook 1622 of second connector 1620b and second rail 7b are in contact or near each other (i.e., when rail 7b is on the inner side of second hook 1622), unmanned aerial vehicle 10j also pivots first hook 1621 of second connector 1620b to close second connector 1620b and couple second connector 1620b to second rail 7b.

Figure 30:
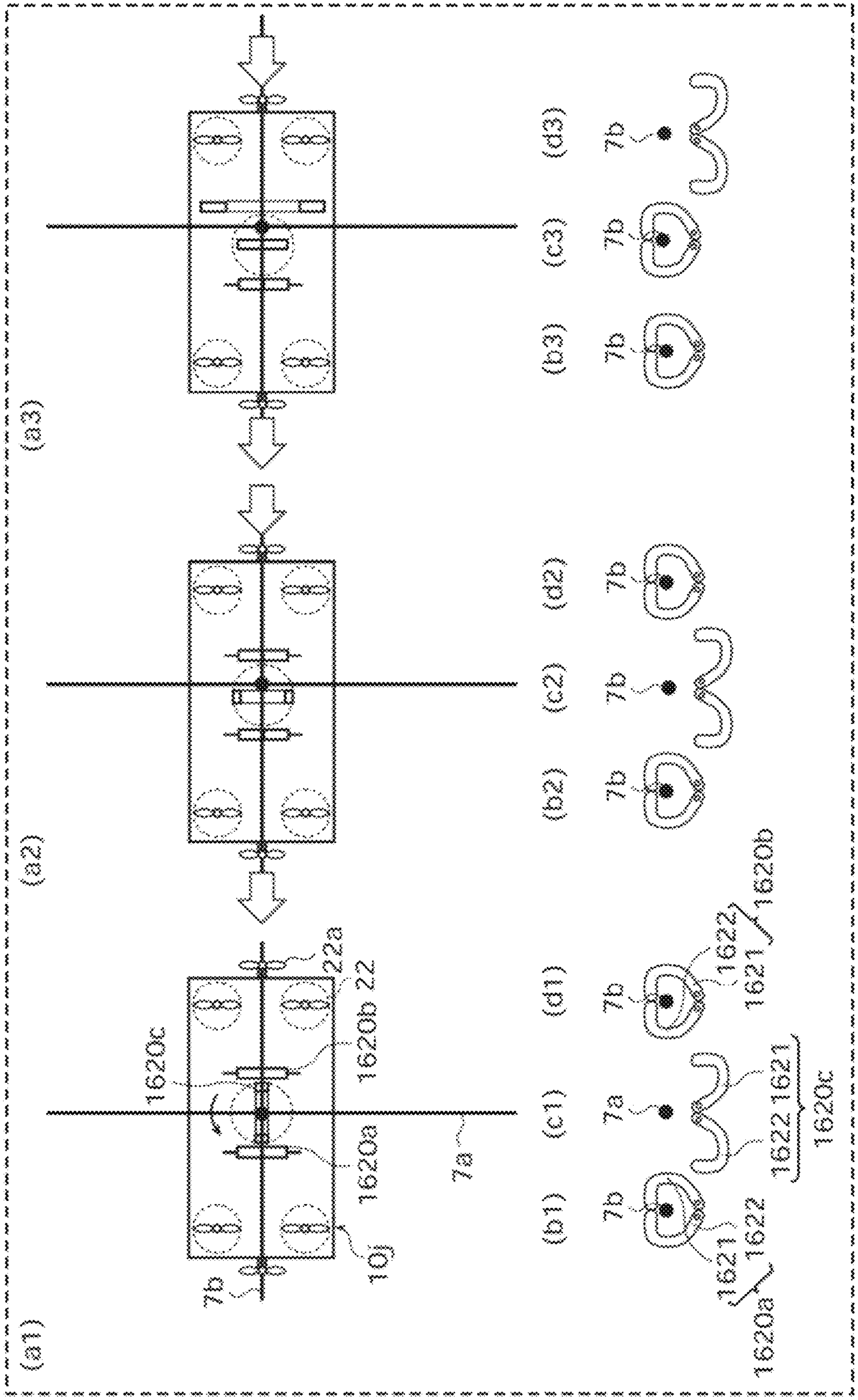
FIG. 30 is a schematic diagram illustrating an example of a third connector of the unmanned aerial vehicle connecting to the second rail according to a variation of Embodiment 5.

FIG. 30 is a schematic diagram illustrating an example of third connector 1620c of unmanned aerial vehicle 10j connected to second rail 7b according to a variation of Embodiment 5. In FIG. 30, (a*) illustrates an example of unmanned aerial vehicle 10j as viewed from above, (b*) illustrates an example of a view of first connector 1620a and second rail 7b in the traveling direction, (c*) illustrates an example of a view of third connector 1620c and second rail 7b in the traveling direction, and (d*) illustrates an example of a view of second connector 1620b and second rail 7b in the traveling direction. The "*" is a placeholder for a number indicating the order in which the figures are described in FIG. 30. Also, in FIG. 30, reference signs are omitted where appropriate.

As illustrated in (a1), (b1), and (c1) in FIG. 30, unmanned aerial vehicle 10j pivots first hook 1621 and second hook 1622 of third connector 1620c to open third connector 1620c. Third connector 1620c is disconnected from first rail 7a and is positioned vertically below first rail 7a and second rail 7b so that it does not contact first rail 7a and second rail 7b. Unmanned aerial vehicle 10j is then rotated to a position where third connector 1620c overlaps the connection point of first rail 7a and second rail 7b when viewed from vertically above. Stated differently, unmanned aerial vehicle

10*j* rotates so that the lengthwise direction of vehicle main body 1220 is parallel to the lengthwise direction of second rail 7*b*. The disconnection of third connector 1620*c* from first rail 7*a* may be done at the same time as the rotation of unmanned aerial vehicle 10*j*. At this time, first connector 1620*a* and second connector 1620*b* are still connected to second rail 7*b*.

As illustrated in (a2), (b2), and (c2) in FIG. 30, unmanned aerial vehicle 10*j* rotates third connector 1620*c* until it is in the same attitude as first connector 1620*a* and second connector 1620*b*. Stated differently, third connector body 1620*c* rotates 90° about an axis parallel to the vertical direction. By rotating side propellers 22*a*, unmanned aerial vehicle 10*j* travels along second rail 7*b* to a position where it can connect to second rail 7*b* (a position not in contact with first rail 7*a*). Unmanned aerial vehicle 10*j* pivots first hook 1621 and second hook 1622 of third connector 1620*c* to close third connector 1620*c*, thereby coupling third connector 1620*c* to second rail 7*b*. With this, unmanned aerial vehicle 10*j* can pass through the connection point between first rail 7*a* and second rail 7*b*.

As illustrated in (a3), (b3), and (c3) in FIG. 30, unmanned aerial vehicle 10*j* pivots first hook 1621 and second hook 1622 of second connector 1620*b* to open second connector 1620*b*. Second connector 1620*b* is disconnected from second rail 7*b* and is positioned vertically below second rail 7*b* so that second connector 1620*b* and second rail 7*b* do not come into contact. At this time, since first connector 1620*a* and third connector 1620*c* are connected to second rail 7*b*, the attitude of unmanned aerial vehicle 10*j* is maintained. By rotating side propellers 22*a*, unmanned aerial vehicle 10*j* travels leftward along second rail 7*b* and second connector 1620*b* passes vertically below first rail 7*a*.

Figure 31:
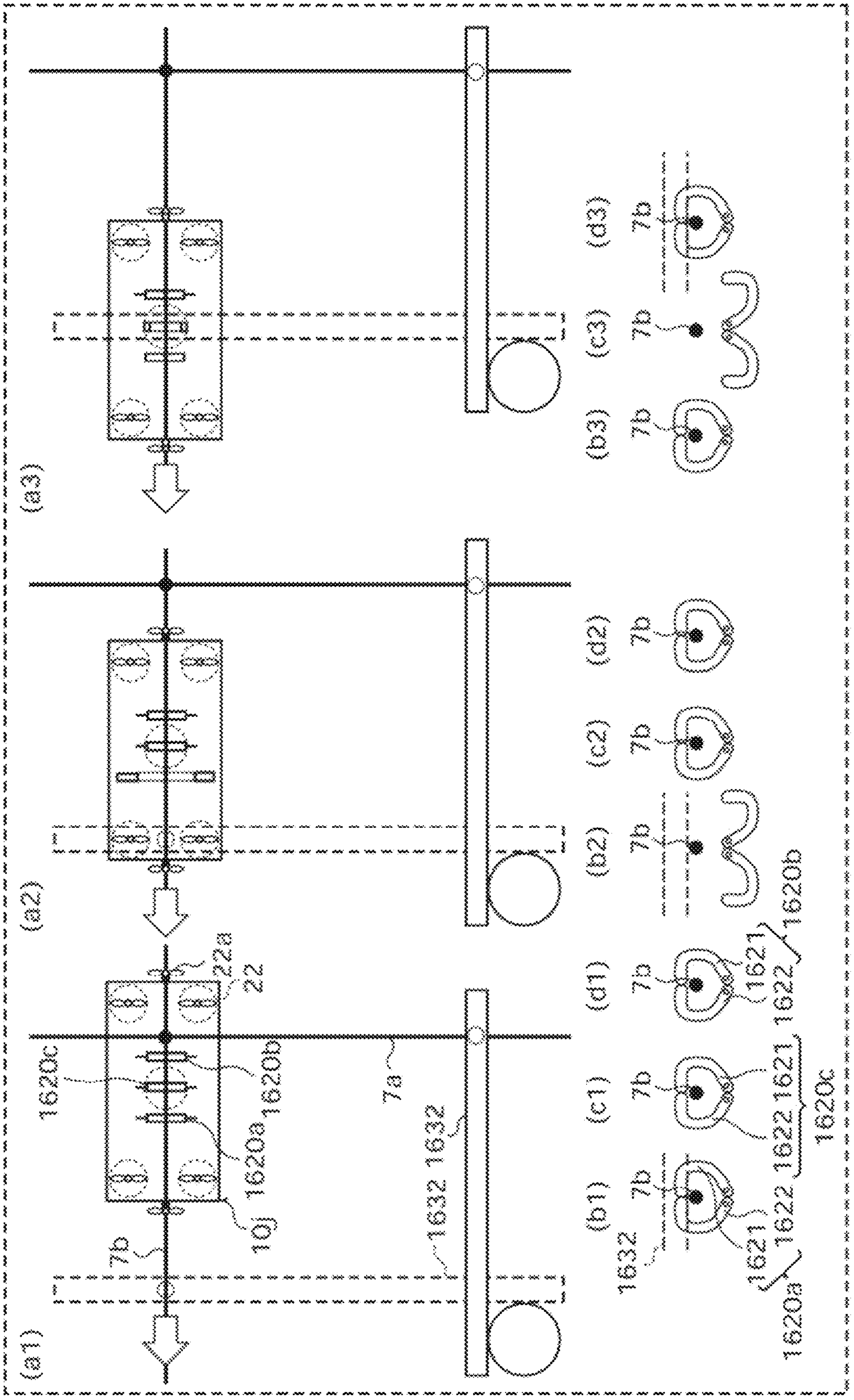
FIG. 31 is a schematic diagram illustrating an example of the first connector and the third connector of the unmanned aerial vehicle according to a variation of Embodiment 5 passing a rail support.

FIG. 31 is a schematic diagram illustrating an example of first connector 1620*a* and third connector 1620*c* of unmanned aerial vehicle 10*j* passing another rail support portion 1632 according to a variation of Embodiment 5. In FIG. 31, (a*) illustrates an example of unmanned aerial vehicle 10*j* as viewed from above, (b*) illustrates an example of a view of first connector 1620*a* and second rail 7*b* in the traveling direction, (c*) illustrates an example of a view of third connector 1620*c* and second rail 7*b* in the traveling direction, and (d*) illustrates an example of a view of second connector 1620*b* and second rail 7*b* in the traveling direction. The "*" is a placeholder for a number indicating the order in which the figures are described in FIG. 31. Also, in FIG. 31, reference signs are omitted where appropriate.

As illustrated in (a1), (b1), (c1), (a2), (b2), (c2), (a3), (b3), and (c3) in FIG. 31, unmanned aerial vehicle 10*j* travels along second rail 7*b* by rotating side propellers 22*a*. As unmanned aerial vehicle 10*j* approaches the other rail support portion 1632 indicated by the dashed line, it pivots first hook 1621 and second hook 1622 of first connector 1620*a* to open first connector 1620*a*. First connector 1620*a* is disconnected from second rail 7*b* and is disposed vertically below the other rail support portion 1632 so that first connector 1620*a* and the other rail support portion 1632 do not come into contact with each other. At this time, third connector 1620*c* and second connector 1620*b* are connected to second rail 7*b*. As a result, unmanned aerial vehicle 10*j* moves along second rail 7*b* while maintaining its attitude, and first connector 1620*a* passes vertically below the other rail support portion 1632.

Unmanned aerial vehicle 10*j* pivots first hook 1621 and second hook 1622 of first connector 1620*a* to close first connector 1620*a*, thereby coupling first connector 1620*a* to second rail 7*b*. As third connector 1620*c* approaches the other rail support portion 1632, unmanned aerial vehicle 10*j* pivots first hook 1621 and second hook 1622 of third connector 1620*c* to open third connector 1620*c*. Third connector 1620*c* is disconnected from second rail 7*b* and is disposed vertically below the other rail support portion 1632 so that third connector 1620*c* and the other rail support portion 1632 do not come into contact with each other. At this time, first connector 1620*a* and second connector 1620*b* are connected to first rail 7*a*.

Figure 32:
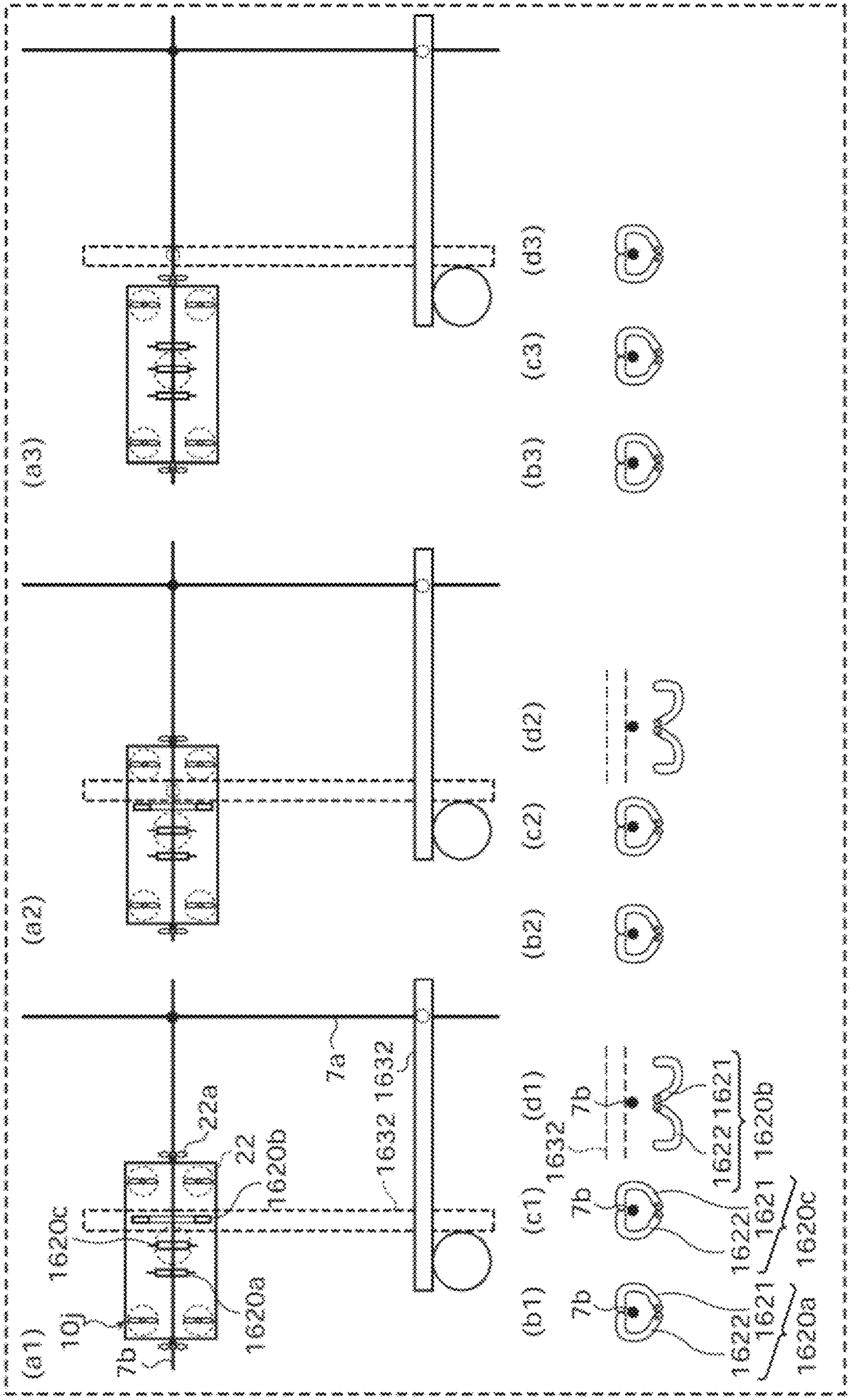
FIG. 32 is a schematic diagram illustrating an example of the second connector of the unmanned aerial vehicle according to a variation of Embodiment 5 passing a rail support.

FIG. 32 is a schematic diagram illustrating an example of second connector 1620*b* of unmanned aerial vehicle 10*j* passing another rail support portion 1632 according to a variation of Embodiment 5. In FIG. 32, (a*) illustrates an example of unmanned aerial vehicle 10*j* as viewed from above, (b*) illustrates an example of a view of first connector 1620*a* and second rail 7*b* in the traveling direction, (c*) illustrates an example of a view of third connector 1620*c* and second rail 7*b* in the traveling direction, and (d*) illustrates an example of a view of second connector 1620*b* and second rail 7*b* in the traveling direction. The "*" is a placeholder for a number indicating the order in which the figures are described in FIG. 32. Also, in FIG. 32, reference signs are omitted where appropriate.

As illustrated in (a1), (b1), (c1), (a2), (b2), and (c2) in FIG. 32, unmanned aerial vehicle 10*j* moves along second rail 7*b* while maintaining its attitude, and third connector 1620*c* passes vertically below the other rail support portion 1632. Unmanned aerial vehicle 10*j* pivots first hook 1621 and second hook 1622 of second connector 1620*b* to close third connector 1620*c*, thereby coupling third connector 1620*c* to second rail 7*b*. At this time, first connector 1620*a* and second connector 1620*b* are connected to second rail 7*b*.

As second connector 1620*b* approaches the other rail support portion 1632, unmanned aerial vehicle 10*j* pivots first hook 1621 and second hook 1622 of second connector 1620*b* to open second connector 1620*b*. Second connector 1620*b* is disconnected from second rail 7*b* and is disposed vertically below the other rail support portion 1632 so that second connector 1620*b* and the other rail support portion 1632 do not come into contact with each other. At this time, first connector 1620*a* and third connector 1620*c* are connected to second rail 7*b*. As a result, unmanned aerial vehicle 10*j* moves along second rail 7*b* while maintaining its attitude, and second connector 1620*b* passes vertically below the other rail support portion 1632. Unmanned aerial vehicle 10*j* pivots first hook 1621 and second hook 1622 of second connector 1620*b* to close second connector 1620*b*, thereby coupling second connector 1620*b* to second rail 7*b*.

In this way, unmanned aerial vehicle 10*j* can pass through the respective rail support portions 1632 and the connection point between first rail 7*a* and second rail 7*b*.

Embodiment 6

Configuration

Hereinafter, since the basic configuration of unmanned aerial vehicle 10*k* according to the present embodiment is the same as the basic configuration of the unmanned aerial vehicle according to Embodiment 5 and the like, repeated description of the basic configuration of unmanned aerial vehicle 10*k* in the present embodiment will be omitted where appropriate. The present embodiment differs from Embodiment 5 and the like in that the arms of the connectors are provided with rollers.

Figure 33:
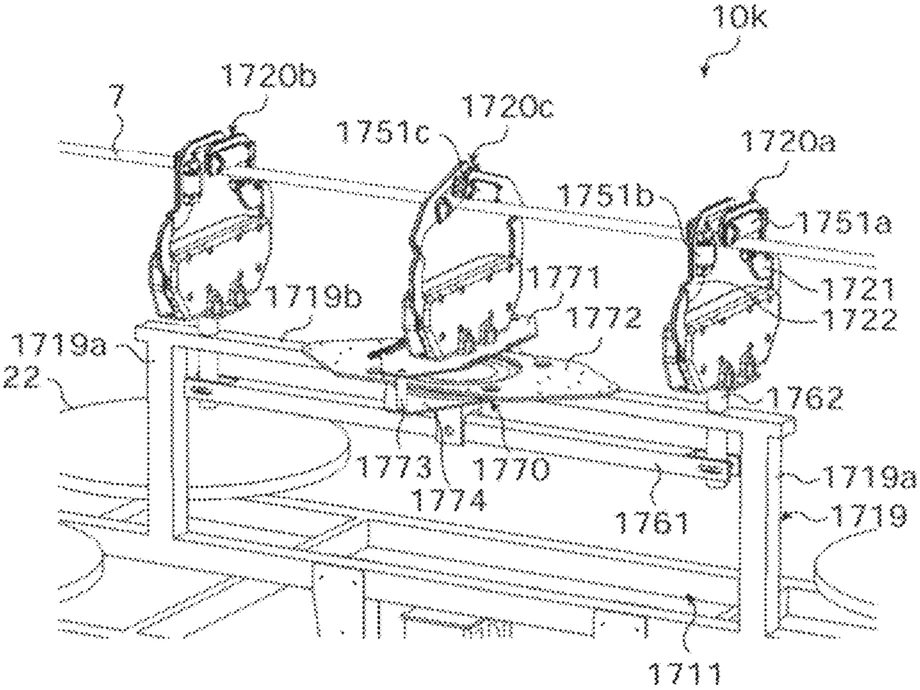
FIG. 33 is a perspective view illustrating an example of a first connector, a second connector, and a third connector and the like of an unmanned aerial vehicle according to Embodiment 6.

FIG. 33 is a perspective view illustrating an example of first connector 1720*a*, second connector 1720*b*, and third connector 1720*c* and the like of unmanned aerial vehicle 10*k* according to Embodiment 6.

Vehicle main body 1711 of unmanned aerial vehicle 10*k* includes first connector support portion 1719 formed along the lengthwise direction of vehicle main body 1711 (the lengthwise direction of rail 7), and second connector support portion 1770.

First connector support portion 1719 includes a pair of standing portions 1719*a*, main girder 1719*b*, pivoting portion 1761, and a plurality of support rods 1762. In the present embodiment, the plurality of connectors are first connector 1720*a*, second connector 1720*b*, and third connector 1720*c*.

The pair of standing portions 1719*a* are provided on the vertically upward side of vehicle main body 1711, and are columnar bodies that rise from vehicle main body 1711. The pair of standing portions 1719*a* are aligned in the lengthwise direction of vehicle main body 1711. The pair of standing portions 1719*a* support main girder 1719*b*.

Main girder 1719*b* connects the leading ends of the pair of standing portions 1719*a* together. Main girder 1719*b* extends in the lengthwise direction of vehicle main body 1711 and supports first connector 1720*a*, second connector 1720*b*, and third connector 1720*c*.

Pivoting portion 1761 is an elongated columnar body that extends in the lengthwise direction of main girder 1719*b*. Pivoting portion 1761 is located vertically below main girder 1719*b*, and the central portion in the lengthwise direction is fixed to main girder 1719*b* so as to be pivotable around a predetermined axis. The pivoting plane in which pivoting portion 1761 can pivot is approximately parallel to the vertical direction. The lower end of one support rod 1762 is fixed to the front side of pivoting portion 1761 so as to be pivotable around a predetermined axis, and the lower end of one support rod 1762 is also fixed to the rear side of pivoting portion 1761 so as to be pivotable around a predetermined axis. Pivoting portion 1761 pushes the respective support rods 1762 up and down by pivoting in the pivoting plane. Stated differently, pivoting portion 1761 displaces the positions of the connectors via support rods 1762 by pivoting like a seesaw.

The plurality of support rods 1762 are pivotably supported by pivoting portion 1761 so that they rise from pivoting portion 1761 and are inserted through main girder 1719*b*. The plurality of support rods 1762 are displaceable in the vertical direction by pivoting portion 1761 pivoting according to the pivoting plane. In the present embodiment, two support rods 1762 are provided on pivoting portion 1761. Each of support rods 1762 is inserted through main girder 1719*b* and is pivotably supported by pivoting portion 1761, preventing wobbling or rattling.

The plurality of support rods 1762 affix the plurality of connectors. In the present embodiment, first connector 1720*a* is fixed to the leading end of one of the plurality of support rods 1762, and second connector 1720*b* is fixed to the leading end of one of the plurality of support rods 1762. The number of support rods 1762 provided in first connector support portion 1719 depends according to number of connectors.

The heights of first connector 1720*a* and second connector 1720*b* are adjusted by pivoting pivoting portion 1761 around a predetermined axis with respect to main girder 1719*b*. The configuration for displacing the positions of first connector 1720*a* and second connector 1720*b* is not limited to pivoting portion 1761 and the plurality of support rods 1762 as exemplified in the present embodiment; any known technique may be used as long as it is capable of raising and lowering first connector 1720*a* and second connector 1720*b*.

Control processor 11 controls actuation controller 12 according to the information obtained from the respective distance sensors so that the position of first connector 1720*a* is higher than the position of second connector 1720*b* when the distance between a rail support (or, if a plurality of rails 7 intersect, the intersecting rails 7) and first connector 1720*a* becomes less than a predetermined distance. Stated differently, actuation controller 12 inclines pivoting portion 1761 so that the front is higher than rear by controlling the actuator so as to pivot pivoting portion 1761 around a predetermined axis relative to main girder 1719*b*. Since this causes support rod 1762 to push first connector 1720*a* up via pivoting portion 1761 and support rod 1762 to push second connector 1720*b* down via pivoting portion 1761, the position of first connector 1720*a* is higher than the position of second connector 1720*b*. Since first hook 1721 and second hook 1722 of first connector 1720*a* are separated from rail 7, actuation controller 12 controls the actuator to rotate each of first hook 1721 and second hook 1722 around a predetermined axis to open first connector 1720*a*. This makes inhibits friction between rail 7 and first and second hooks 1721 and 1722 when opening first connector 1720*a*. This allows first connector 1720*a* to be easily disconnected from rail 7. The same applies for second connector 1720*b*.

Figure 34:
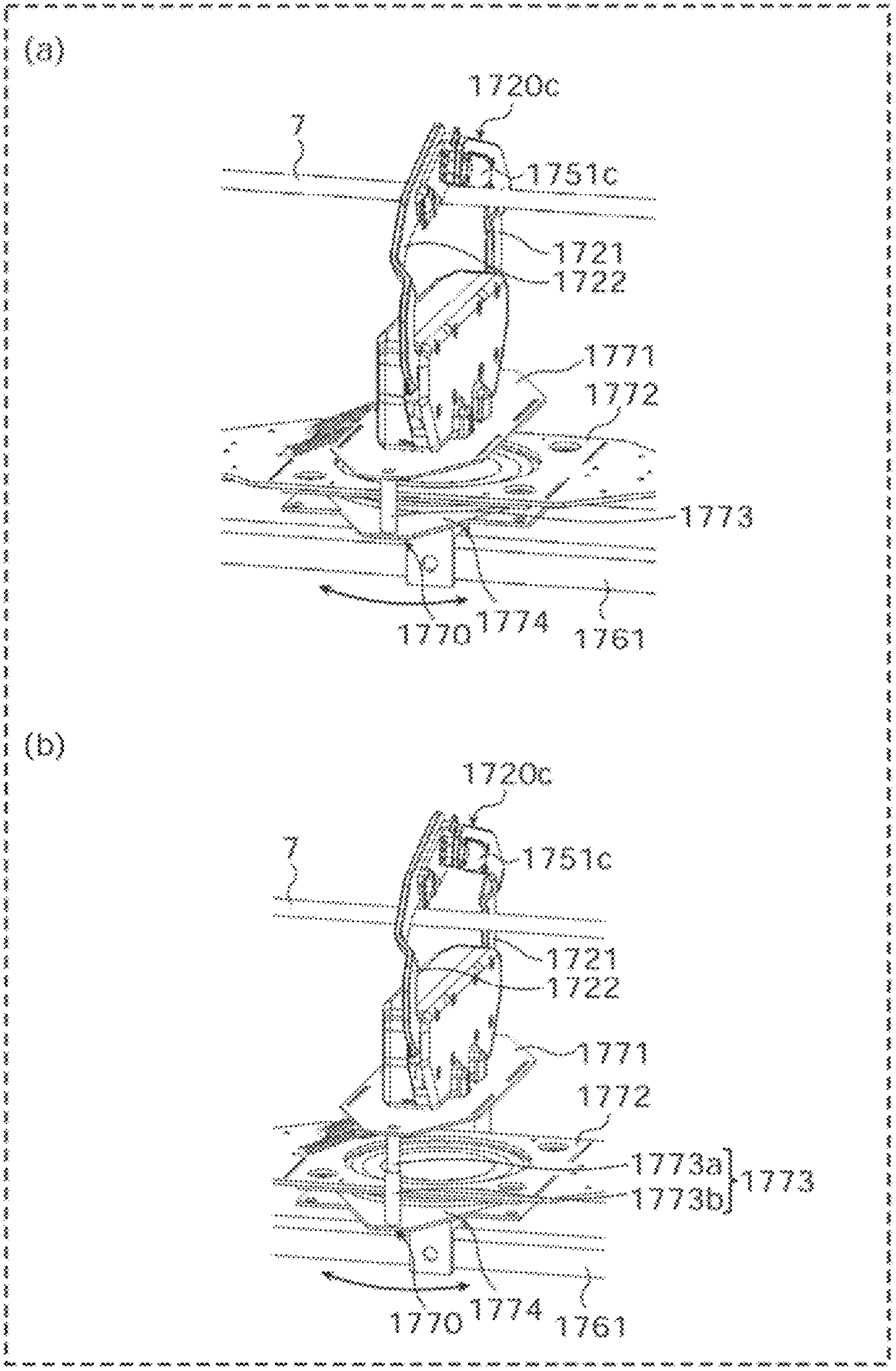
FIG. 34 is a perspective view illustrating an example of the second connector of the unmanned aerial vehicle according to Embodiment 6 being moved in the vertical direction.

FIG. 34 is a perspective view illustrating an example of second connector 1720*b* of unmanned aerial vehicle 10*k* according to Embodiment 6 being moved in the vertical direction. In FIG. 34, (a) illustrates the normal (descended) position of third connector 1720*c*, and (b) illustrates the displaced (ascended) position of third connector 1720*c*.

As illustrated in FIG. 33 and FIG. 34, second connector support portion 1770 includes first fixed portion 1771 that fixes third connector 1720*c*, second fixed portion 1772 that can be pivoted around an axis parallel to the vertical direction with respect to main girder 1719*b*, position adjustment portion 1773 that couples first fixed portion 1771 and second fixed portion 1772 and displaces the position of first fixed portion 1771 with respect to second fixed portion 1772, third fixed portion 1774 that is fixed to main girder 1719*b* so as to overlap second fixed portion 1772, and a plurality of rollers disposed between second fixed portion 1772 and third fixed portion 1774. Each of first fixed portion 1771, second fixed portion 1772, and third fixed portion 1774 is an example of the fixed portion.

First fixed portion 1771 is a plate-like component that fixes third connector body 1720*c* on the upper surface, and is positioned separated from main girder 1719*b*.

Second fixed portion 1772 is a plate-like component that is fixed to main girder 1719*b* and supports first fixed portion 1771 via position adjustment portion 1773. Second fixed portion 1772 is positioned to overlap first fixed portion 1771. An annular groove to accommodate the plurality of rollers is formed in the central region of second fixed portion 1772.

Position adjustment portion 1773 connects first fixed portion 1771 and second fixed portion 1772, and adjusts the position of first fixed portion 1771 relative to second fixed portion 1772 under control by actuation controller 12. Stated differently, position adjustment portion 1773 displaces the position of third connector 1720*c* by raising and lowering first fixed portion 1771. In the present embodiment, position adjustment portion 1773 includes first columnar portion 1773*a* that is fixed to first fixed portion 1771 and second columnar portion 1773*b* that is fixed to second fixed portion 1772, as illustrated in (b) in FIG. 34. Second columnar portion 1773*b* is a tubular component that accommodates first columnar portion 1773*a* therein, and first columnar portion 1773*a* slides (raises and lowers) in the vertical direction under control by actuation controller 12. First columnar portion 1773*a* may be a tubular component that accommodates second columnar portion 1773*b* therein. Position adjustment portion 1773 is not limited to the example given in the present embodiment; any known technique may be used as long as it is capable of raising and lowering third connector 1720*c*.

Third fixed portion 1774 is a plate-like component fixed to main girder 1719*b*. An annular groove to accommodate the plurality of rollers is formed in the central region of third fixed portion 1774, in a position opposing the annular groove of second fixed portion 1772. Since third fixed portion 1774 is fixed to main girder 1719*b*, when the connector is connected to rail 7, the added weight of unmanned aerial vehicle 10*k* pushes it against second fixed portion 1772 with the plurality of rollers therebetween. This inhibits third fixed portion 1774 from separating from second fixed portion 1772, and also allows third fixed portion 1774 to support the plurality of rollers disposed between the annular groove of second fixed portion 1772 and the annular groove of third fixed portion 1774.

The plurality of rollers are, for example, balls, conical rollers, etc., and are disposed between and sandwiched by the annular groove of second fixed portion 1772 and the annular groove of third fixed portion 1774. The plurality of rollers rotate in response to the rotation of second fixed portion 1772.

Second fixed portion 1772, third fixed portion 1774, and the plurality of rollers function as a turntable, since second fixed portion 1772 can rotate around an axis parallel to the vertical direction with respect to third fixed portion 1774.

First connector 1720*a*, second connector 1720*b*, and third connector 1720*c* of unmanned aerial vehicle 10*k* are aligned in the lengthwise direction of rail 7. First connector 1720*a*, second connector 1720*b*, and third connector 1720*c* are fixed to main girder 1719*b*.

First connector 1720*a* is arranged in the frontmost position of unmanned aerial vehicle 10*k* among the three connectors, second connector 1720*b* is arranged in the rearmost position of unmanned aerial vehicle 10*k* among the three connectors, and third connector 1720*c* is arranged between first connector 1720*a* and second connector 1720*b*. The configurations of first connector 1720*a* and second connector 1720*b* are similar, and the configuration of third connector 1720*c* is different from the configurations of first connector 1720*a* and second connector 1720*b*.

As illustrated in FIG. 33, each of first hook 1721 and second hook 1722 of first connector 1720*a* includes first roller 1751*a* and second roller 1751*b*. Each of first hook 1721 and second hook 1722 of second connector 1720*b* also includes first roller 1751*a* and second roller 1751*b*.

First roller(s) 1751*a* is/are positioned vertically above rail 7 when first connector 1720*a* and/or second connector 1720*b* is/are closed. Second roller 1751*b* is a wheel for rotational contact with rail 7. The axis of rotation of first roller 1751*a* is orthogonal to the lengthwise direction of rail 7, and is approximately parallel to the horizontal direction. First roller 1751*a* is one example of the roller.

Second roller(s) 1751*b* is/are positioned vertically above rail 7 when first connector 1720*a* and/or second connector 1720*b* is/are closed. Second roller 1751*b* is a wheel for rotational contact with rail 7. The axis of rotation of second roller 1751*b* is orthogonal to the lengthwise direction of rail 7, and is approximately parallel to the vertical direction. Second roller 1751*b* is one example of the roller.

When first connector 1720*a* and/or second connector 1720*b* are in the closed state, first roller 1751*a* of first hook 1721 and first roller 1751*a* of second hook 1722 are positioned vertically above rail 7, and second roller 1751*b* of first hook 1721 and second roller 1751*b* of second hook 1722 are disposed on the lateral sides of rail 7 so as to sandwich rail 7.

Third roller 1751*c* is provided on each of first hook 1721 and second hook 1722 of third connector body 1720*c*.

Third roller 1751*c* is positioned vertically above rail 7 when third connector 1720*c* is closed. Third roller 1751*c* is a wheel for rotational contact with rail 7. The axis of rotation of first roller 1751*a* is orthogonal to the lengthwise direction of rail 7, and is approximately parallel to the horizontal direction. Third roller 1751*c* is one example of the roller.

For example, when first connector 1720*a* is in the closed state, first roller 1751*a* of first hook 1721 and first roller 1751*a* of second hook 1722 are positioned vertically above rail 7, and second roller 1751*b* of first hook 1721 and second roller 1751*b* of second hook 1722 are disposed on the lateral sides of rail 7 so as to sandwich rail 7.

Operation Example 1

Figure 35:
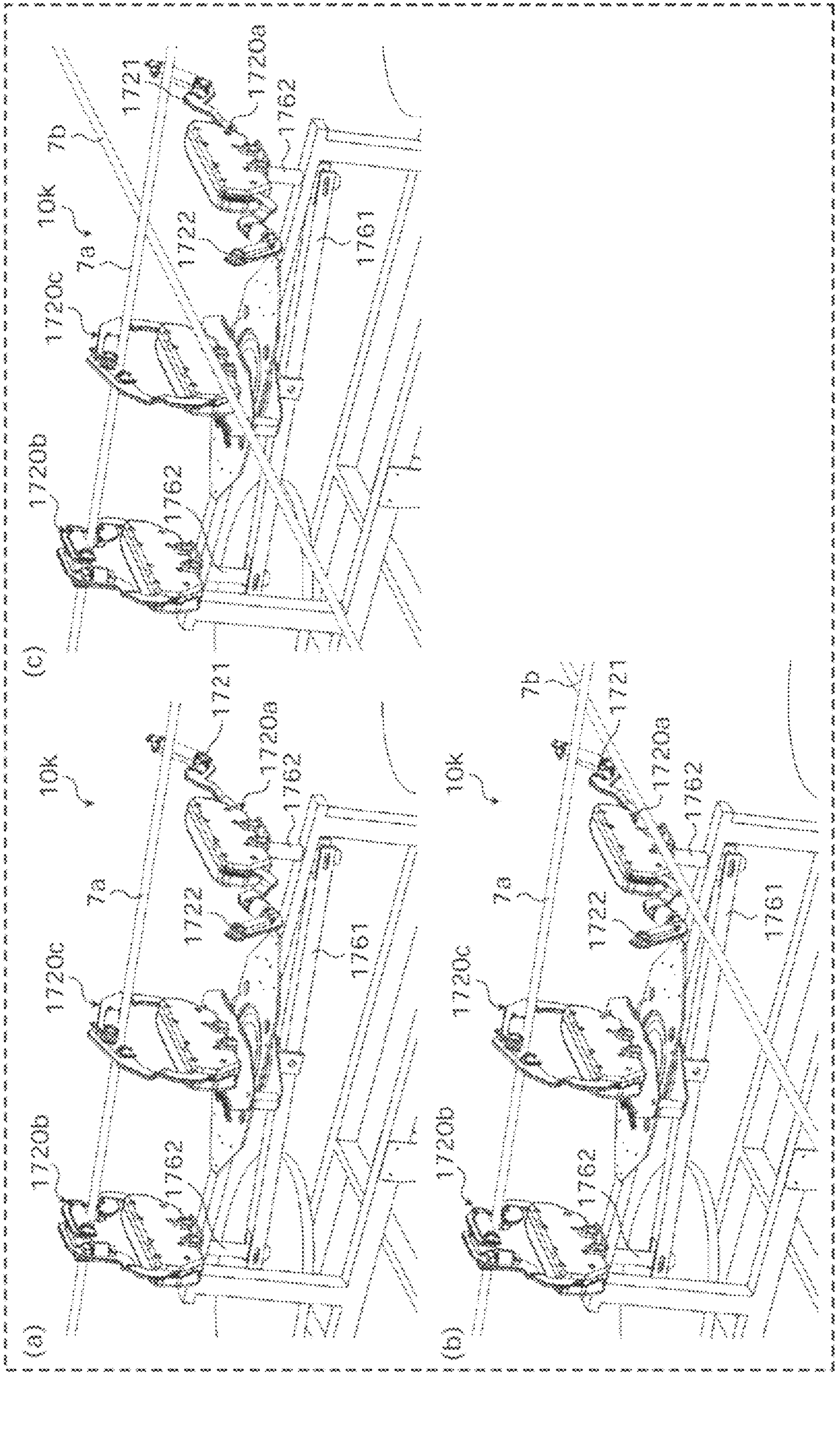
FIG. 35 is a perspective view illustrating an example of how the first connector of the unmanned aerial vehicle according to Embodiment 6 passes across a second rail.

FIG. 35 is a perspective view illustrating an example of how first connector 1720*a* of unmanned aerial vehicle 10*k* according to Embodiment 6 passes across second rail 7*b*.

As illustrated in (a) and (b) in FIG. 35, unmanned aerial vehicle 10*k* travels along first rail 7*a* by rotating the side propellers. When first connector 1720*a* approaches second rail 7*b*, unmanned aerial vehicle 10*k* pivots pivoting portion 1761 so as to push first connector 1720*a* up and push second connector 1720*b* down. This causes first hook 1721 and second hook 1722 of first connector 1720*a* to separate from first rail 7*a*. When unmanned aerial vehicle 10*k* pushes first connector 1720*a* up to separate first connector 1720*a* from first rail 7*a*, it pivots first hook 1721 and second hook 1722 of first connector 1720*a* to open first connector 1720*a*. First connector 1720*a* is disconnected from first rail 7*a* and is positioned vertically below second rail 7*b* so that first connector 1720*a* and second rail 7*b* do not come into contact. At this time, since third connector 1720*c* and second connector 1720*b* are connected to first rail 7*a*, the attitude of unmanned aerial vehicle 10*k* is maintained. When disconnecting first connector 1720*a* from first rail 7*a*, unmanned aerial vehicle 10*k* may provide buoyancy vertically upwardly by rotating the front propellers.

As illustrated in (c) in FIG. 35, unmanned aerial vehicle 10*k* moves along first rail 7*a* while maintaining its attitude, and first connector 1720*a* passes vertically below second rail 7*b*.

Figure 36:
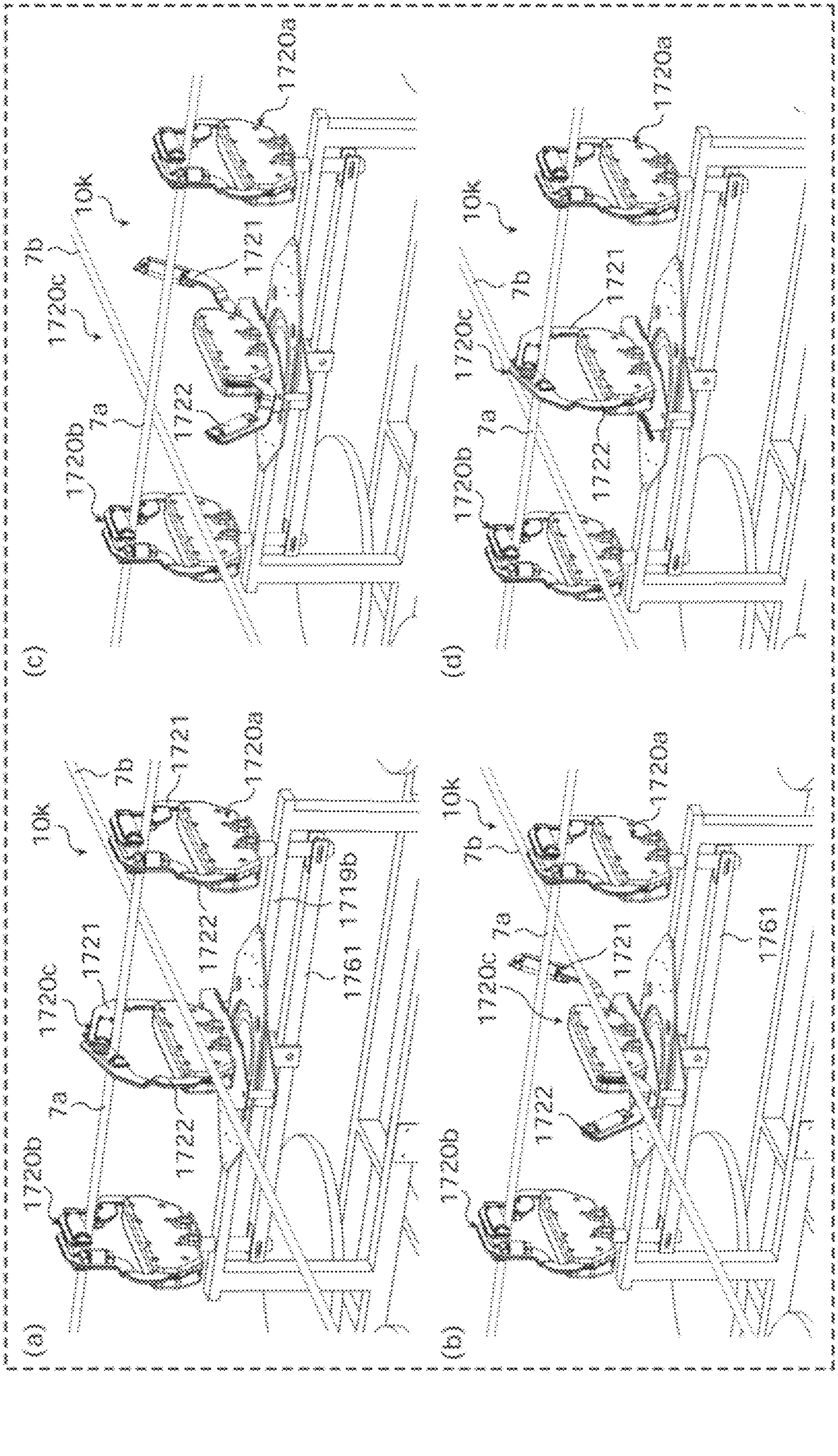
FIG. 36 is a perspective view illustrating an example of how the third connector of the unmanned aerial vehicle according to Embodiment 6 passes across a second rail.

FIG. 36 is a perspective view illustrating an example of how third connector 1720*c* of unmanned aerial vehicle 10*k* according to Embodiment 6 passes across second rail 7*b*.

As illustrated in (a) in FIG. 36, when first connector 1720*a* passes vertically below second rail 7*b*, unmanned aerial vehicle 10*k* pivots first hook 1721 and second hook 1722 of first connector 1720*a* to close first connector 1720*a*, thereby coupling first connector 1720*a* to first rail 7*a*. Unmanned aerial vehicle 10*k* then pivots pivoting portion 1761 to push second connector 1720*b* up and push first connector 1720*a* down to return pivoting portion 1761 to its original attitude (the attitude where main girder 1719*b* and pivoting portion 1761 are approximately parallel; the attitude just before pivoting pivoting portion 1761). At this time, third connector 1720*c* and second connector 1720*b* are connected to first rail 7*a*.

As illustrated in (b) in FIG. 36, when third connector 1720*c* approaches second rail 7*b*, unmanned aerial vehicle 10*k* actuates position adjustment portion 1773 to raise third connector 1720*c* into its ascended stated. This causes first hook 1721 and second hook 1722 of third connector 1720*c* to separate from first rail 7*a*. When unmanned aerial vehicle 10*k* pushes third connector 1720*c* up to separate third connector 1720*c* from first rail 7*a*, it pivots first hook 1721 and second hook 1722 of third connector 1720*c* to open third connector 1720*c*. Third connector 1720*c* is disconnected from first rail 7*a* and is positioned vertically below second rail 7*b* so that third connector 1720*c* and second rail 7*b* do not come into contact. At this time, since first connector 1720*a* and second connector 1720*b* are connected to first rail 7*a*, the attitude of unmanned aerial vehicle 10*k* is maintained.

As illustrated in (c) in FIG. 36, unmanned aerial vehicle 10*k* moves along first rail 7*a* while maintaining its attitude, and third connector 1720*c* passes vertically below second rail 7*b*.

As illustrated in (d) in FIG. 36, when third connector 1720*c* passes vertically below second rail 7*b*, unmanned aerial vehicle 10*k* pivots first hook 1721 and second hook 1722 of third connector 1720*c* to close third connector 1720*c*, thereby coupling third connector 1720*c* to first rail 7*a*. Unmanned aerial vehicle 10*k* then actuates position adjustment portion 1773 to lower third connector 1720*c* into its descended state. At this time, first connector 1720*a* and third connector 1720*c* are connected to first rail 7*a*.

Figure 37:
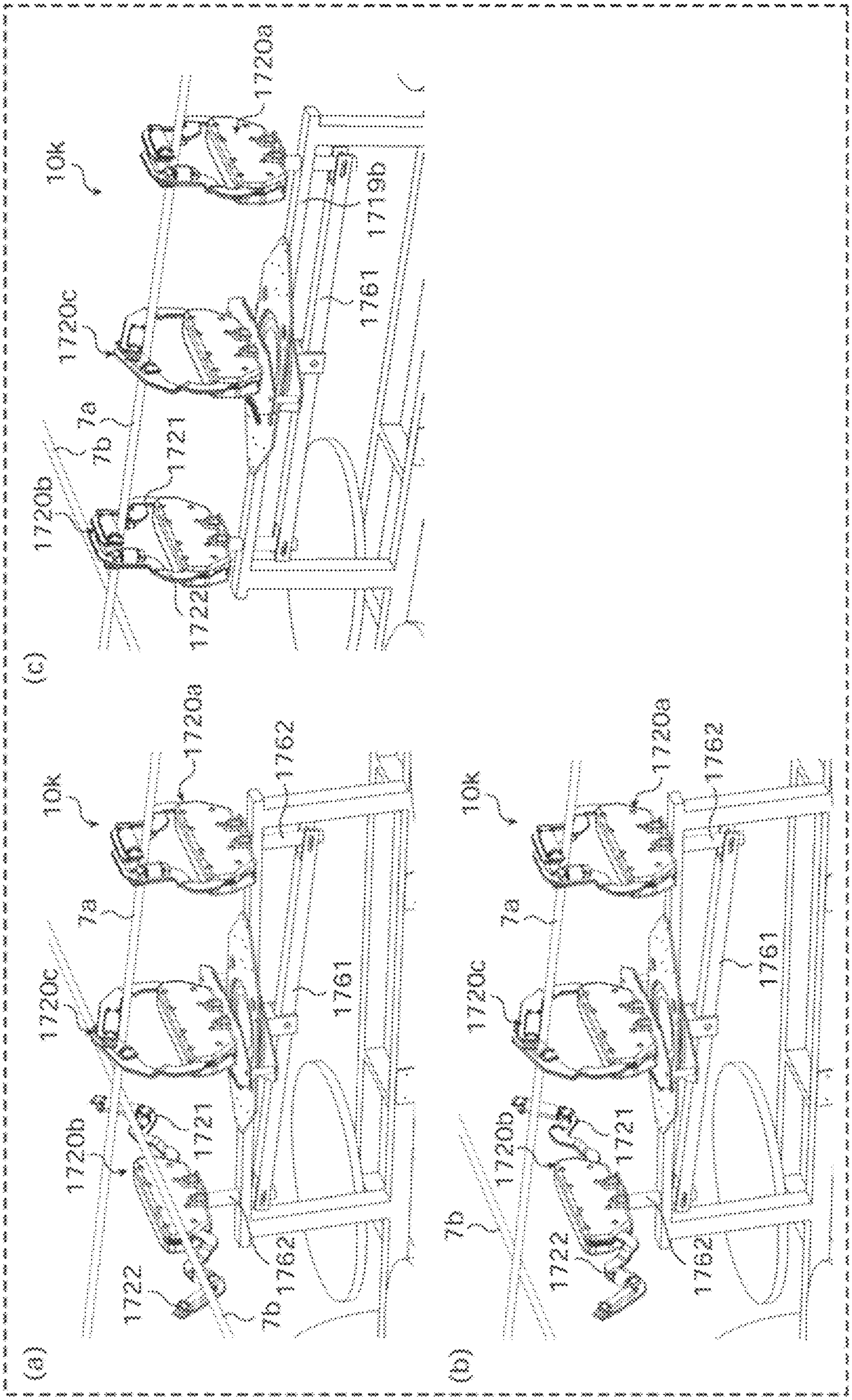
FIG. 37 is a perspective view illustrating an example of how the second connector of the unmanned aerial vehicle according to Embodiment 6 passes across a second rail.

FIG. 37 is a perspective view illustrating an example of how second connector 1720*b* of unmanned aerial vehicle 10*k* according to Embodiment 6 passes across second rail 7*b*.

As illustrated in (a) in FIG. 37, when second connector 1720*b* approaches second rail 7*b*, unmanned aerial vehicle 10*k* pivots pivoting portion 1761 to push second connector 1720*b* up and push first connector 1720*a* down. This causes first hook 1721 and second hook 1722 of second connector 1720*b* to separate from first rail 7*a*. When unmanned aerial vehicle 10*k* pushes second connector 1720*b* up to separate second connector 1720*b* from first rail 7*a*, it pivots first hook 1721 and second hook 1722 of second connector 1720*b* to open second connector 1720*b*. Second connector 1720*b* is disconnected from first rail 7*a* and is positioned vertically below second rail 7*b* so that second connector 1720*b* and second rail 7*b* do not come into contact. At this time, since first connector 1720*a* and third connector 1720*c* are connected to first rail 7*a*, the attitude of unmanned aerial vehicle 10*k* is maintained. When disconnecting second connector 1720*b* from first rail 7*a*, unmanned aerial vehicle 10*k* may provide buoyancy vertically upwardly by rotating the front propellers.

As illustrated in (b) in FIG. 37, unmanned aerial vehicle 10*k* moves along first rail 7*a* while maintaining its attitude, and second connector 1720*b* passes vertically below second rail 7*b*.

As illustrated in (c) in FIG. 37, when second connector 1720*b* passes vertically below second rail 7*b*, unmanned aerial vehicle 10*k* pivots first hook 1721 and second hook 1722 of second connector 1720*b* to close second connector 1720*b*, thereby coupling second connector 1720*b* to first rail 7*a*. Unmanned aerial vehicle 10*k* then pivots pivoting portion 1761 to push first connector 1720*a* up and push second connector 1720*b* down to return pivoting portion 1761 to its original attitude (the attitude where main girder 1719*b* and pivoting portion 1761 are approximately parallel; the attitude just before pivoting pivoting portion 1761). At this time, first connector 1720*a* and third connector 1720*c* are connected to first rail 7*a*.

Unmanned aerial vehicle 10*k* can thus pass through the connection point between first rail 7*a* and second rail 7*b*.

Operation Example 2

Figure 38:
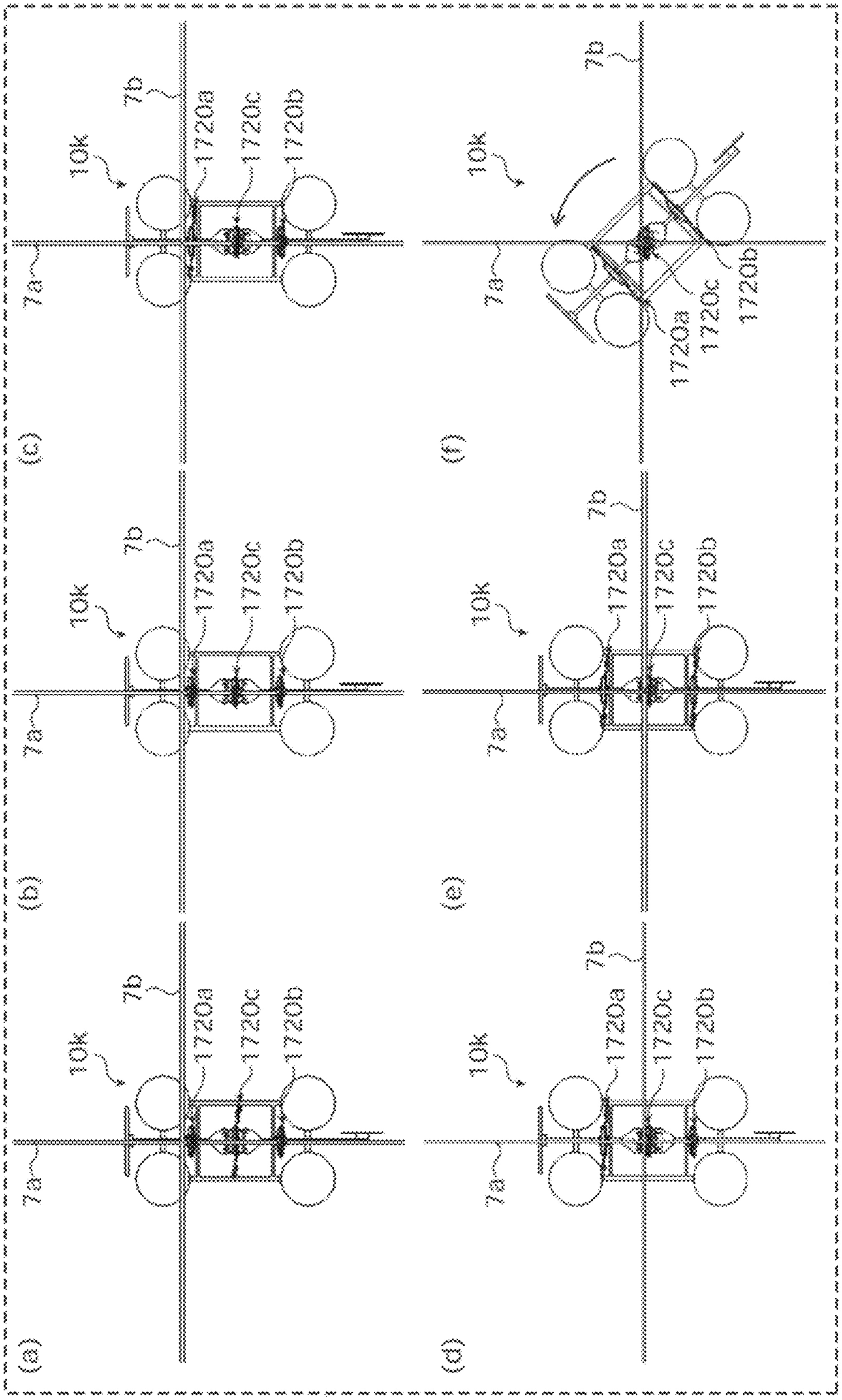
FIG. 38 is a schematic diagram illustrating an example of the unmanned aerial vehicle according to Embodiment 6 coupling to the second rail from the first rail.

FIG. 38 is a schematic diagram illustrating an example of unmanned aerial vehicle 10*k* according to Embodiment 6 coupling to second rail 7*b* from first rail 7*a*.

Unmanned aerial vehicle 10*k* travels along first rail 7*a* by rotating the side propellers. As illustrated in (a) and (b) in FIG. 38, when first connector 1720*a* approaches second rail 7*b*, unmanned aerial vehicle 10*k* pivots first hook 1721 and second hook 1722 of third connector 1720*c* to close third connector 1720*c*. As illustrated in (c) in FIG. 38, unmanned aerial vehicle 10*k* pivots first hook 1721 and second hook 1722 of first connector 1720*a* to open first connector 1720*a*. First connector 1720*a* is disconnected from first rail 7*a* and is positioned vertically below second rail 7*b* so that first connector 1720*a* and second rail 7*b* do not come into contact.

As illustrated in (d) in FIG. 38, when first connector 1720*a* passes vertically below second rail 7*b* and third connector 1720*c* approaches second rail 7*b*, unmanned aerial vehicle 10*k* stops traveling by stopping the rotation of side propellers 22*a*. As illustrated in (e) in FIG. 38, unmanned aerial vehicle 10*k* pivots first hook 1721 and second hook 1722 of second connector 1720*b* to open second connector 1720*b*. Second connector 1720*b* is disconnected from first rail 7*a* and is positioned vertically below second rail 7*b* so that second connector 1720*b* and second rail 7*b* do not come into contact.

As illustrated in (f) in FIG. 38, since only third connector 1720*c* is coupled to first rail 7*a*, in order to rotate itself counterclockwise, unmanned aerial vehicle 10*k* changes the attitude of side propeller 22*a* so that unmanned aerial vehicle 10*k* rotates horizontally as illustrated in FIG. 26, and then rotates side propeller 22*a*.

Figure 39:
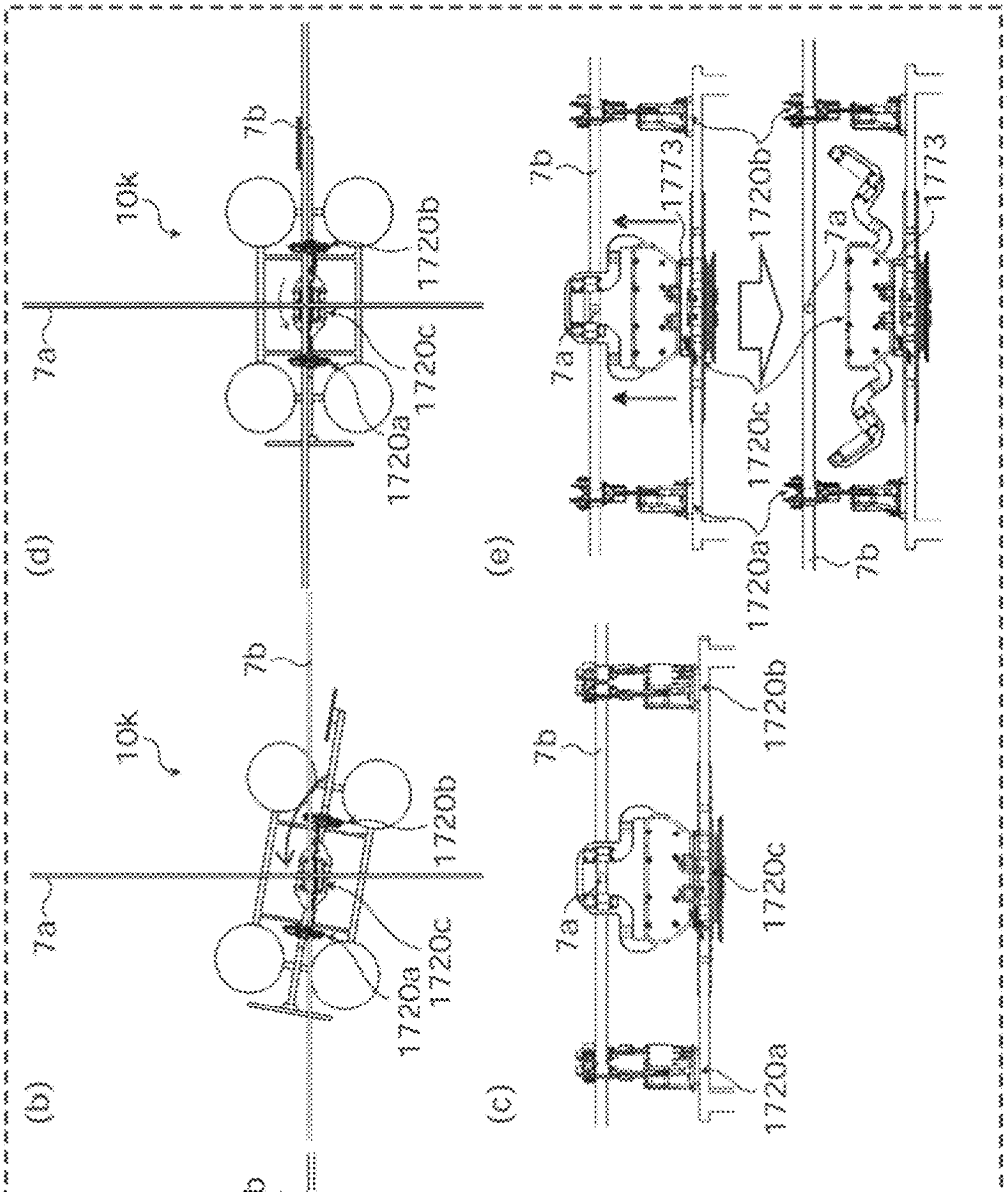
FIG. 39 is a schematic diagram illustrating an example of the third connector of the unmanned aerial vehicle disconnecting from the first rail according to Embodiment 6.

FIG. 39 is a schematic diagram illustrating an example of third connector 1720*c* of unmanned aerial vehicle 10*k* disconnecting from first rail 7*a* according to Embodiment 6. In FIG. 39, (a), (b), and (d) illustrate unmanned aerial vehicle 10*k* as viewed from above, and (c) and (e) illustrate side views of first connector 1720*a*, second connector 1720*b*, and third connector 1720*c* of unmanned aerial vehicle 10*k*.

As illustrated in (a), (b), and (c) in FIG. 39, unmanned aerial vehicle 10*k* rotates to a position where first connector 1720*a* and second connector 1720*b* overlap second rail 7*b*. Unmanned aerial vehicle 10*k* rotates to a position where first connector 1720*a* and second connector 1720*b* overlap second rail 7*b*, pivots first hooks 1721 and second hooks 1722 of first connector 1720*a* and second connector 1720*b* to close first connector 1720*a* and second connector 1720*b*, thereby coupling first connector 1720*a* and second connector 1720*b* to second rail 7*b*.

As illustrated in (d) and (e) in FIG. 39, unmanned aerial vehicle 10*k* actuates position adjustment portion 1773 to raise third connector 1720*c* into its ascended stated. This causes first hook 1721 and second hook 1722 of third connector 1720*c* to separate from first rail 7*a*. When unmanned aerial vehicle 10*k* separates third connector 1720*c* from first rail 7*a*, it pivots first hook 1721 and second hook 1722 of third connector 1720*c* to open third connector 1720*c*. Third connector 1720*c* is disconnected from first rail 7*a* and is positioned vertically below first rail 7*a* and second rail 7*b* so that third connector 1720*c* does not come into contact with first rail 7*a* or second rail 7*b*. Unmanned aerial vehicle 10*k* is then rotated to a position where third connector 1720*c* overlaps the connection point of first rail 7*a* and second rail 7*b*. Stated differently, unmanned aerial vehicle 10*k* rotates so that the lengthwise direction of vehicle main body 1711 is approximately parallel to the lengthwise direction of second rail 7*b*.

Figure 40:
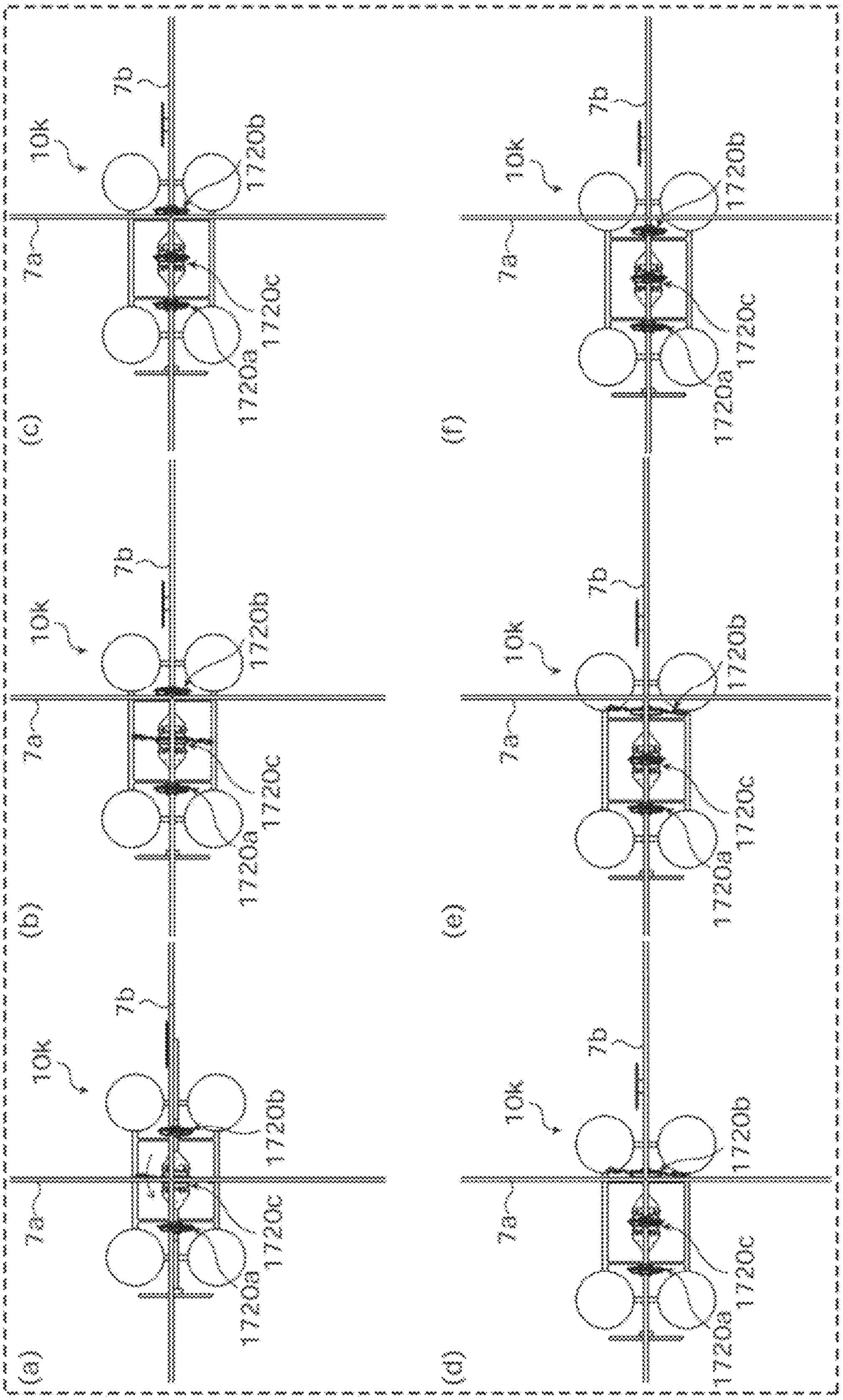
FIG. 40 is a schematic diagram illustrating an example of how the unmanned aerial vehicle according to Embodiment 6 passes through the connection point between the first rail and the second rail after connecting the third connector of the unmanned aerial vehicle to the second rail.

FIG. 40 is a schematic diagram illustrating an example of how unmanned aerial vehicle 10*k* according to Embodiment 6 passes through the connection point between first rail 7*a* and second rail 7*b* after connecting third connector 1720*c* of unmanned aerial vehicle 10*k* to second rail 7*b*.

As illustrated in (a) and (b) in FIG. 40, unmanned aerial vehicle 10*k* rotates third connector 1720*c* until it is in the same attitude as first connector 1720*a* and second connector 1720*b*. Stated differently, third connector body 1720*c* rotates 90° about an axis parallel to the vertical direction. By rotating side propellers 22*a*, unmanned aerial vehicle 10*k* travels along second rail 7*b* to a position where it can connect to second rail 7*b* (a position in which third connector 1720*c* is not in contact with first rail 7*a*). As illustrated in (c) in FIG. 40, unmanned aerial vehicle 10*k* pivots first hook 1721 and second hook 1722 of third connector 1720*c* to close third connector 1720*c*, thereby coupling third connector 1720*c* to second rail 7*b*.

As illustrated in (d) in FIG. 40, unmanned aerial vehicle 10*k* pivots first hook 1721 and second hook 1722 of second connector 1720*b* to open second connector 1720*b*. Second connector 1720*b* is disconnected from second rail 7*b* and is positioned vertically below second rail 7*b* so that second connector 1720*b* and second rail 7*b* do not come into contact. As illustrated in (e) in FIG. 40, by rotating side propellers 22*a*, unmanned aerial vehicle 10*k* travels leftward along second rail 7*b* and second connector 1720*b* passes vertically below first rail 7*a*. As illustrated in (f) in FIG. 40, unmanned aerial vehicle 10*k* pivots first hook 1721 and second hook 1722 of second connector 1720*b* to close second connector 1720*b*, thereby coupling second connector 1720*b* to second rail 7*b*.

With this, unmanned aerial vehicle 10*k* can pass through the connection point between first rail 7*a* and second rail 7*b*.

Variation of Embodiment 6

Hereinafter, since the basic configuration according to the present variation is the same as the basic configuration of the unmanned aerial vehicle of Embodiment 6 and the like, repeated description of the basic configuration of unmanned aerial vehicle 10*k* in the present variation will be omitted where appropriate. The present variation differs from Embodiment 6 and the like in regard to the connection between connector 1720 and rail 7. In the present variation, for simplification, first connector 1720*a*, second connector 1720*b*, and third connector 1720*c* may be collectively referred to as connector 1720. Connector 1720 is one example of an arm.

Figure 41:
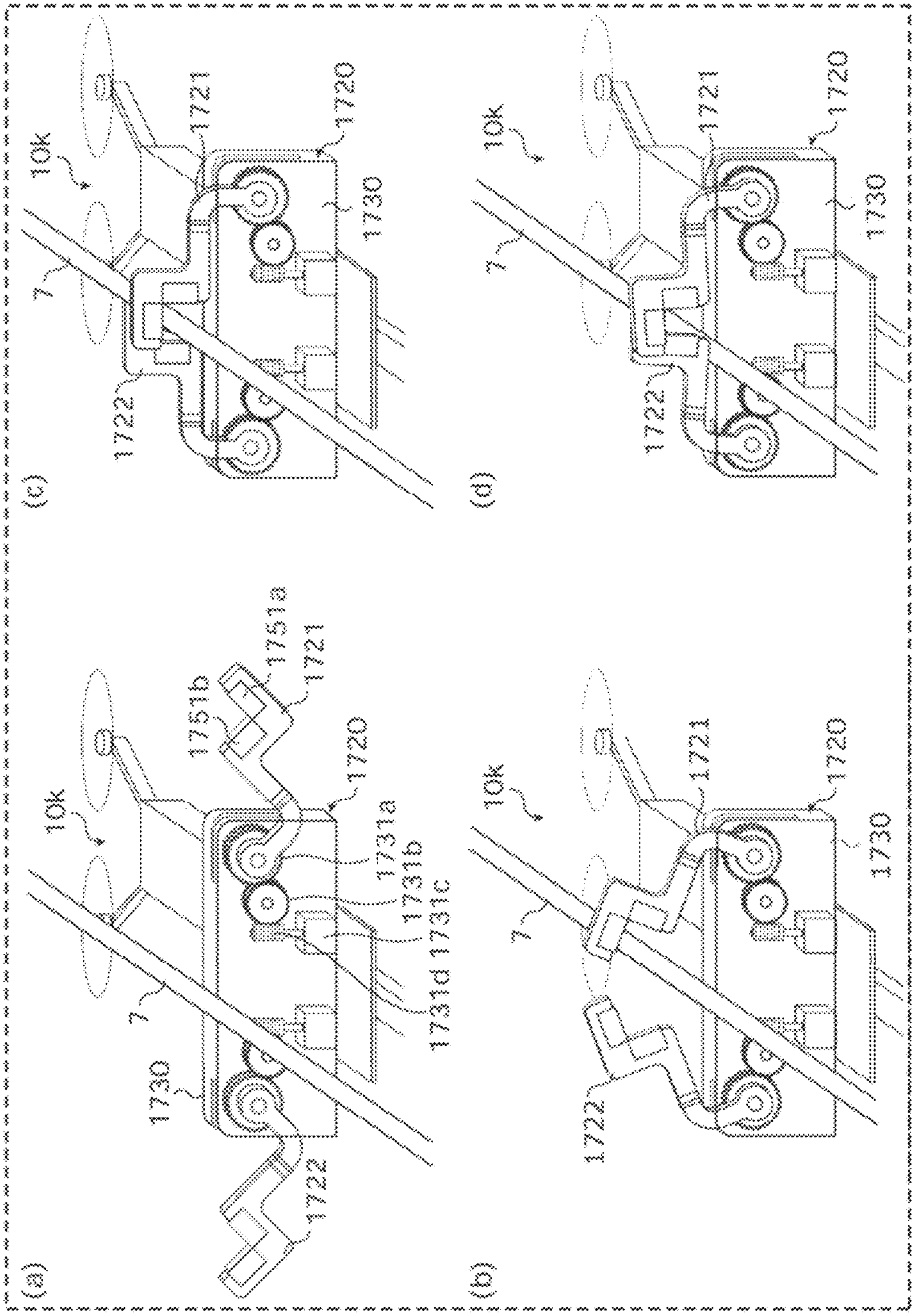
FIG. 41 is a perspective view illustrating an example of a connector of an unmanned aerial vehicle according to a variation of Embodiment 6.
Figure 42:
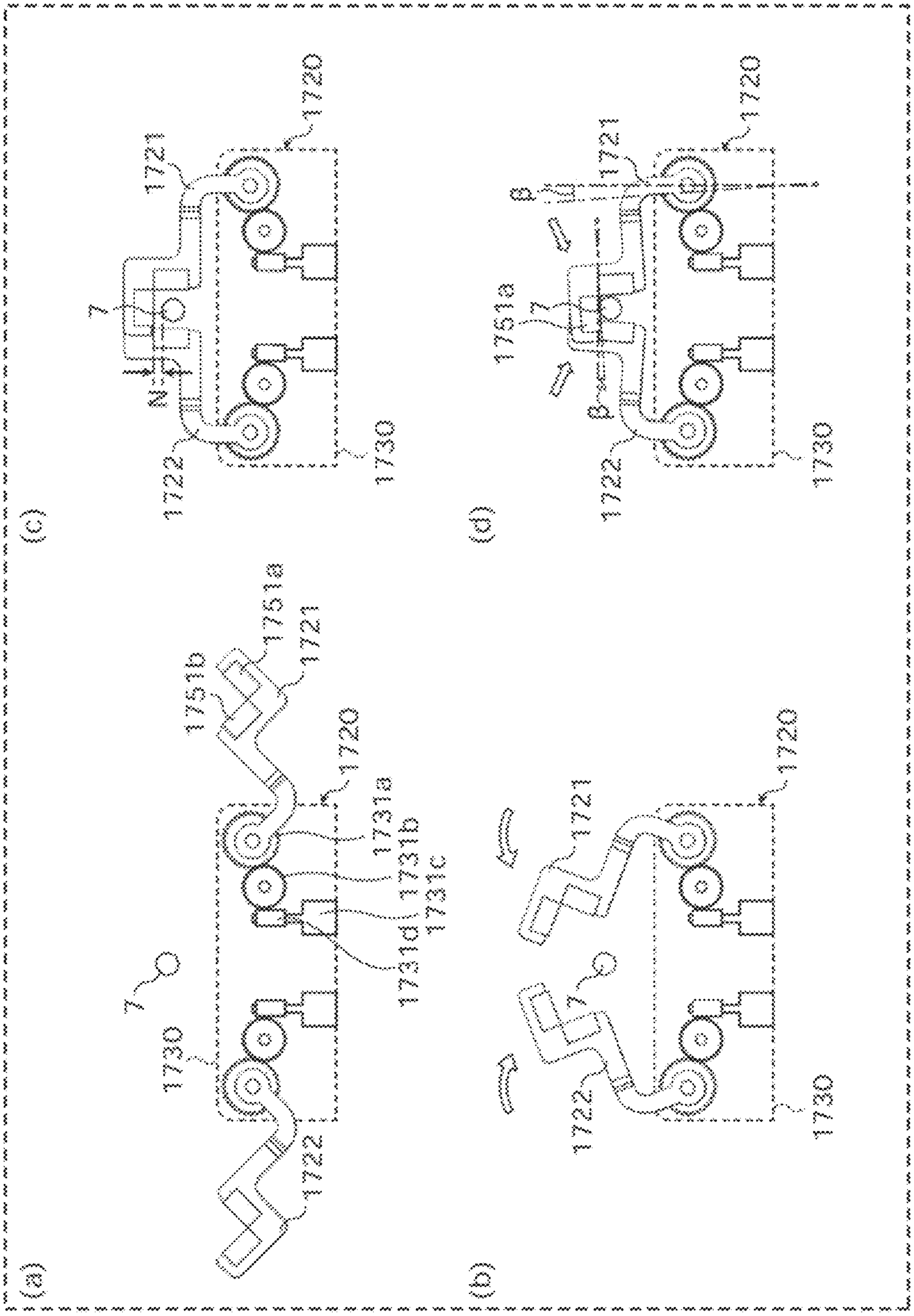
FIG. 42 is a front view illustrating an example of the connector of the unmanned aerial vehicle according to a variation of Embodiment 6 when viewed from the front.

FIG. 41 is a perspective view illustrating an example of connector 1720 of unmanned aerial vehicle 10*k* according to a variation of Embodiment 6. FIG. 42 is a front view illustrating an example of connector 1720 of unmanned aerial vehicle 10*k* according to a variation of Embodiment 6 when viewed from the front. Although FIG. 42 illustrates the connecting of connector 1720 to rail 7, since the releasing of connector 1720 from rail 7 is the reverse of (*a*) through (*d*) in FIG. 42, description of these operations will be omitted.

As illustrated in FIG. 41, connector 1720 includes first hook 1721 and second hook 1722, two first gears 1731*a*, two second gears 1731*b*, two motors 1731*c*, and two third gears 1731*d*. The two first gears 1731*a*, the two second gears 1731*b*, the two motors 1731*c* and the two third gears 1731*d* are the actuators described above and are actuated and controlled by actuation controller 12.

The two first gears 1731*a* are housed rotatably in enclosure 1730, and rotate around an axis to pivot first hook 1721 and second hook 1722 around that axis.

One of the two first gears 1731*a* is fixed to the end (base) of first hook 1721 opposite end of first hook 1721 at which the roller is provided. The other of the two first gears 1731*a* is fixed to the end (base) of second hook 1722 opposite end of second hook 1722 at which the roller is provided. The two first gears 1731*a* engage one-to-one with the two second gears 1731*b*, respectively, and rotate with the rotation of the two second gear 1731*b*, respectively, thereby rotating first hook 1721 and second hook 1722.

The two second gears 1731*b* are housed rotatably in enclosure 1730, and rotate around an axis different from that of first gear 1731*a* to rotate first gear 1731*a*. One of the two second gears 1731*b* engages with one of first gears 1731*a* to rotate one of first gears 1731*a* around its axis. The other of the two second gears 1731*b* engages with the other first gear 1731*a* to rotate the other first gear 1731*a* around its axis.

The two motors 1731*c* are housed in enclosure 1730 such that the axial directions of their rotary shafts are perpendicular to the axial directions of first gears 1731*a* and the axial directions of second gears 1731*b*.

Each rotary shaft of the two motors 1731*c* is provided with third gear 1731*d*, and the two third gears 1731*d* engage one-to-one with the two second gears 1731*b*, respectively. Stated differently, one of the two motors 1731*c* rotates first hook 1721 via one of first gears 1731*a*, by third gear 1731*d* engaging with one of second gears 1731*b*. The other of the two motors 1731*c* rotates second hook 1722 via the other of first gears 1731*a*, by third gear 1731*d* engaging with the other of second gears 1731*b*.

In (a) in FIG. 41 and (a) in FIG. 42, connector 1720 is in the open state, and connector 1720 is not connected to rail 7. As illustrated in (b) in FIG. 41 and (b) in FIG. 42, actuation controller 12 actuates each of the two motors 1731*c* to rotate third gear 1731*d*, which in turn rotates the two first gears 1731*a* one-by-one via the two second gears 1731*b*. This causes first hook 1721 and second hook 1722 to pivot.

As illustrated in (c) in FIG. 41 and (c) in FIG. 42, the respective actuators position first hook 1721 and second hook 1722 to cover rail 7 from above. In other words, first rollers 1751*a* of first hook 1721 and second hook 1722 are positioned vertically above rail 7, and first rollers 1751*a* and rail 7 are separated by a predetermined distance N. Here, the attitudes of first rollers 1751*a* of first hook 1721 and second hook 1722 are such that the axial directions of the axes of rotation of first rollers 1751*a* are approximately parallel to the horizontal direction.

As illustrated in (d) in FIG. 41 and (d) in FIG. 42, actuation controller 12 further pivots first hook 1721 and second hook 1722 by controlling the actuators. This causes first hook 1721 and second hook 1722 to push down on rail 7 from vertically above. The axial directions of the axes of rotation of first rollers 1751*a* of first hook 1721 and second hook 1722 are each inclined at a predetermined angle relative to the horizontal direction. Stated differently, as illustrated in (c) in FIG. 42, the lengthwise direction of first hook 1721 relative to first gear 1731*a* is approximately parallel to the vertical direction, but as illustrated in (d) in FIG. 42, the lengthwise direction of first hook 1721 relative to first gear 1731*a* is inclined by an angle β relative to the vertical direction.

Thus, in this unmanned aerial vehicle 10*k*, when connecting connector 1720 to rail 7, as illustrated in (c) in FIG. 41 and (c) in FIG. 42, the axial directions of the axes of rotation of first rollers 1751*a* are approximately parallel to the horizontal direction, and connector 1720 and rail 7 are separated from each other. When connecting connector 1720 to rail 7, connector 1720 covers rail 7 from the vertically upper side of rail 7, which makes it difficult for friction to occur between connector 1720 and rail 7. This unmanned aerial vehicle 10*k* can therefore easily connect connector 1720 to rail 7.

Stated differently, closing first hook 1721 and second hook 1722 closes connector 1720, thereby connecting connector 1720 to rail 7.

Figure 43:
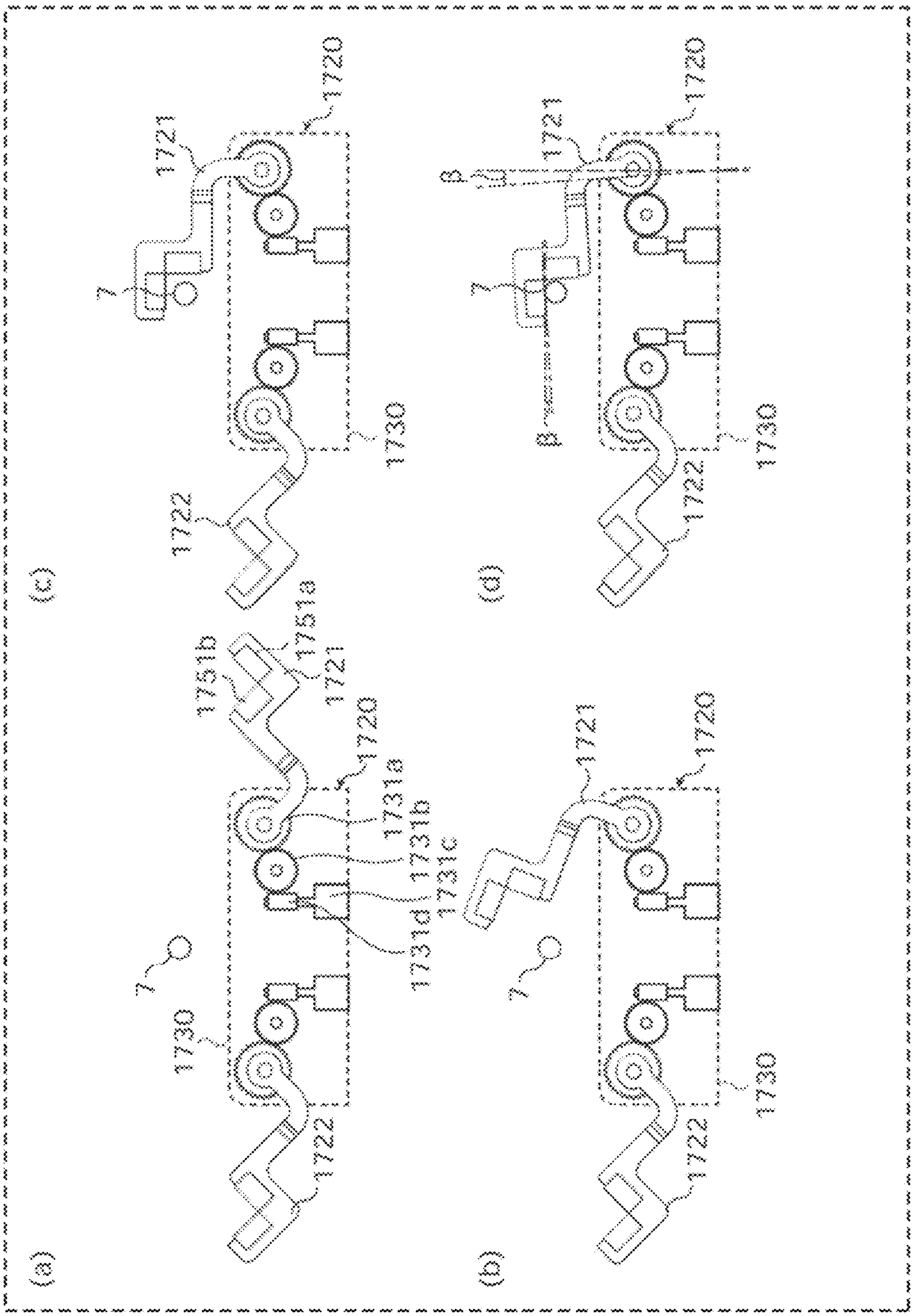
FIG. 43 is a front view illustrating an example of a first hook connecting to a rail when the connector of the unmanned aerial vehicle according to a variation of Embodiment 6 when viewed from the front.

FIG. 43 is a front view illustrating an example of first hook 1721 connecting to rail 7 when connector 1720 of unmanned aerial vehicle 10*k* according to a variation of Embodiment 6 when viewed from the front. Although FIG. 43 illustrates an example of first hook 1721 connecting to rail 7, the same applies to the connection of second hook 1722 to rail 7.

In (a) in FIG. 43, connector 1720 is in the open state, and connector 1720 is not connected to rail 7. As illustrated in (b) in FIG. 43, actuation controller 12 controls the actuator to actuate one motor 1731*c* corresponding to first hook 1721 to rotate third gear 1731*d*, which in turn rotates one first gear 1731*a* through one second gear 1731*b*. This causes first hook 1721 to pivot.

As illustrated in (c) in FIG. 43, the actuator positions first hook 1721 to cover rail 7 from above. In other words, first roller 1751*a* of first hook 1721 is positioned vertically above rail 7, and first roller 1751*a* and rail 7 are separated by a predetermined distance. Here, the attitude of first roller 1751*a* of first hook 1721 is such that the axial direction of the axis of rotation of first roller 1751*a* is approximately parallel to the horizontal direction.

As illustrated in (d) in FIG. 43, actuation controller 12 further pivots first hook 1721 by controlling the actuator. This causes first hook 1721 to push down on rail 7 from vertically above. The axial direction of the axis of rotation of first roller 1751*a* of first hook 1721 is inclined at a predetermined angle relative to the horizontal direction. Stated differently, as illustrated in (c) in FIG. 43, the lengthwise direction of first hook 1721 relative to first gear 1731*a* is approximately parallel to the vertical direction, but as illustrated in (d) in FIG. 43, the lengthwise direction of first hook 1721 relative to first gear 1731*a* is inclined by an angle β relative to the vertical direction. First hook 1721 is thus connected to rail 7 by pivoting first hook 1721.

Figure 44:
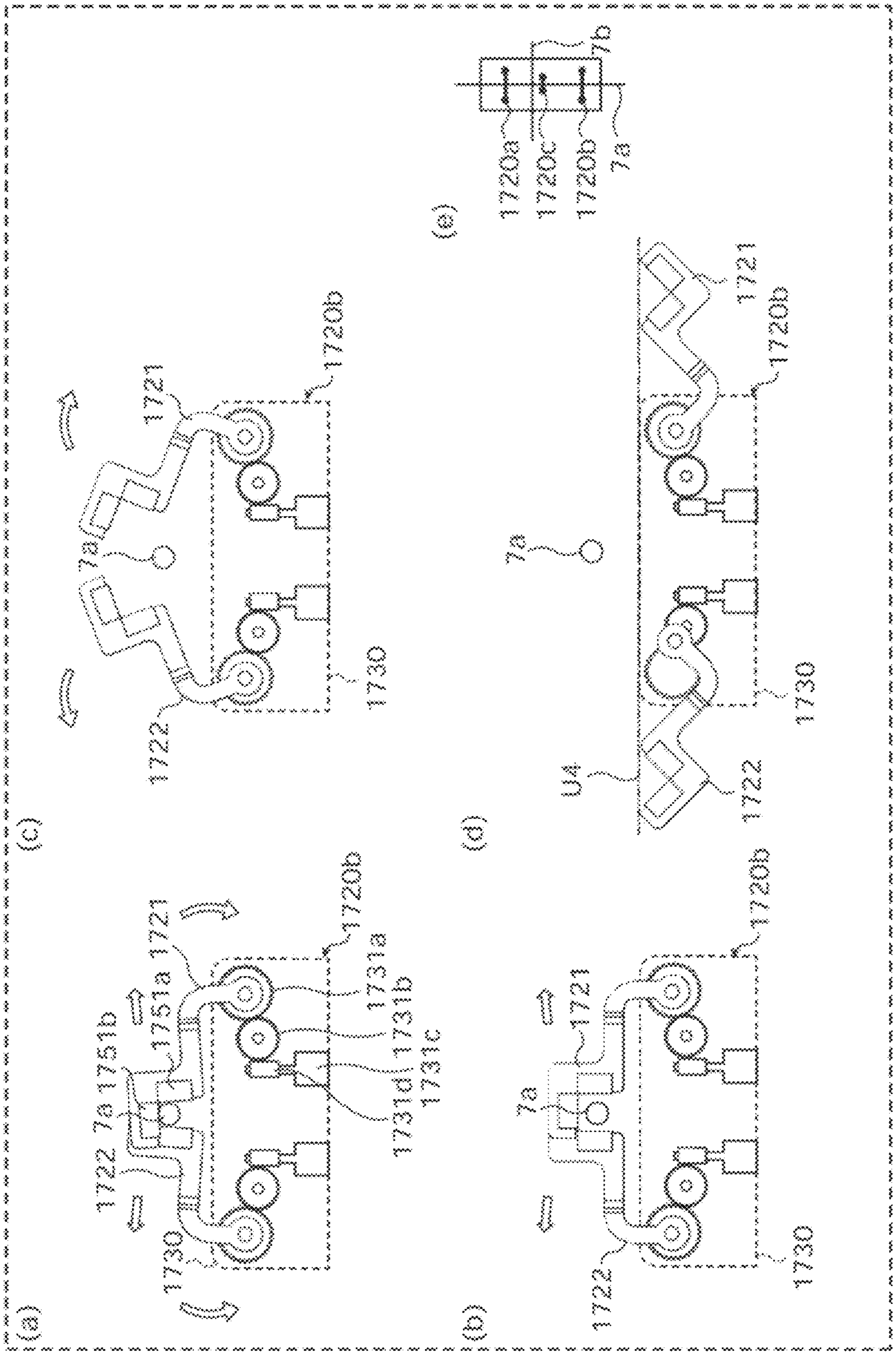
FIG. 44 includes a front view of the connector of the unmanned aerial vehicle according to a variation of Embodiment 6, illustrating an example of how the connection between the connector and the first rail is released, and a schematic diagram illustrating an example of the unmanned aerial vehicle as viewed from above.

FIG. 44 includes a front view of second connector 1720*b* of unmanned aerial vehicle 10*k* according to a variation of Embodiment 6, illustrating an example of how the connection between second connector 1720*b* and first rail 7*a* is released, and a schematic diagram illustrating an example of unmanned aerial vehicle 10*k* as viewed from above. FIG. 44 illustrates an example in which the connection is switched from one rail 7, exemplified as first rail 7*a*, to another rail 7, exemplified as second rail 7*b*, just like in FIG. 38 and the like. In FIG. 44, connector 1720 is exemplified as second connector 1720*b*.

As illustrated in (a) in FIG. 44, the axial directions of the axes of rotation of first rollers 1751*a* of first hook 1721 and second hook 1722 are each inclined at a predetermined angle relative to the horizontal direction. Stated differently, as illustrated in (b) in FIG. 44, the lengthwise direction of first hook 1721 relative to first gear 1731*a* is approximately parallel to the vertical direction, but as illustrated in (a) in FIG. 44, the lengthwise direction of first hook 1721 relative to first gear 1731*a* is inclined by an angle relative to the vertical direction. As illustrated in (b) in FIG. 44, actuation controller 12 actuates each of the two motors 1731*c* to rotate third gear 1731*d*, which in turn rotates the two first gears 1731*a* one-by-one via the two second gears 1731*b*. This causes first hook 1721 and second hook 1722 to pivot. First hook 1721 and second hook 1722 are then separated from the vertical top of first rail 7*a*, so that first rollers 1751*a* are not in contact with first rail 7*a* and second connector 1720*b* is separated from first rail 7*a*.

As illustrated in (b) in FIG. 44, the respective actuators position first rollers 1751*a* of first hook 1721 and second hook 1722 vertically above first rail 7*a*, separating the respective first rollers 1751*a* from first rail 7*a* by a predetermined distance. Here, the attitudes of first rollers 1751*a* of first hook 1721 and second hook 1722 are such that the axial directions of the axes of rotation of first rollers 1751*a* are approximately parallel to the horizontal direction.

As illustrated in (c) and (d) in FIG. 44, the respective actuators further pivot first hook 1721 and second hook 1722 to open second connector 1720*b* and disconnect second connector 1720*b* from first rail 7*a*. First hook 1721 and second hook 1722 are positioned below a virtual plane that extends approximately parallel along the upper surface of enclosure 1730.

In FIG. 44, (e) illustrates an example second connector 1720*b* disconnected from first rail 7*a* when unmanned aerial vehicle 10*k* in (*d*) in FIG. 44 is viewed from above. In (e) in FIG. 44, first connector 1720*a* is in the open state as well, but third connector 1720*c* is connected to first rail 7*a*.

Figure 45:
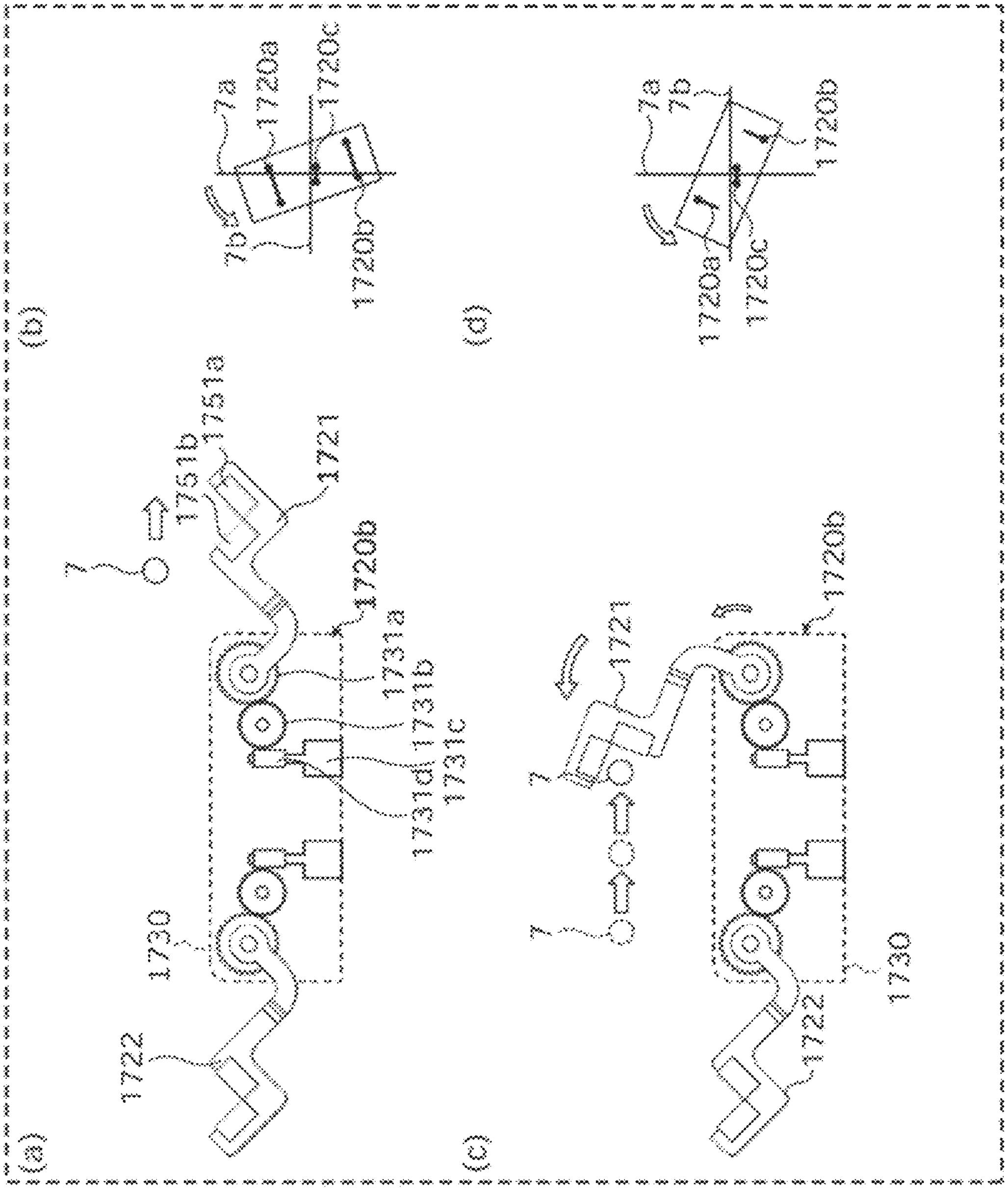
FIG. 45 includes a front view of the connector of the unmanned aerial vehicle according to a variation of Embodiment 6, illustrating an example of the switching of the connection of the connector from the first rail to a second rail, and a schematic diagram illustrating an example of the unmanned aerial vehicle when viewed from above.

FIG. 45 includes a front view of connector 1720 of unmanned aerial vehicle 10*k* according to a variation of Embodiment 6, illustrating an example of the switching of the connection of connector 1720 from first rail 7*a* to second rail 7*b*, and a schematic diagram illustrating an example of unmanned aerial vehicle 10*k* when viewed from above.

In (a) and (c) in FIG. 45, second connector 1720*b* is used as an example. In FIG. 45, (b) and (d) illustrate an example of unmanned aerial vehicle 10*k* rotated from the state in (e) in FIG. 44. As illustrated in (a) and (b) in FIG. 45, unmanned aerial vehicle 10*k* rotates counterclockwise by changing the attitude of a side propeller so that unmanned aerial vehicle 10*k* rotates horizontally and then rotating the side propeller.

As illustrated in (c) and (d) in FIG. 45, while unmanned aerial vehicle 10*k* is rotating counterclockwise, actuation controller 12 controls the actuators to actuate the one motor 1731*c* corresponding to first hook 1721 of first connector 1720*a* to rotate third gear 1731*d*, which rotates the one first gear 1731*a* via the one second gear 1731*b*. This consequently pivots first hook 1721 of first connector 1720*a* to position first hook 1721 to cover second rail 7*b* from above. While unmanned aerial vehicle 10*k* is rotating counterclockwise, actuation controller 12 controls the actuators to actuate the other motor 1731*c* corresponding to second hook 1722 of second connector 1720*b* to rotate third gear 1731*d*, which rotates the other first gear 1731*a* via the other second gear 1731*b*. This consequently pivots second hook 1722 of second connector 1720*b* to position second hook 1722 to cover second rail 7*b* from above.

Figure 46:
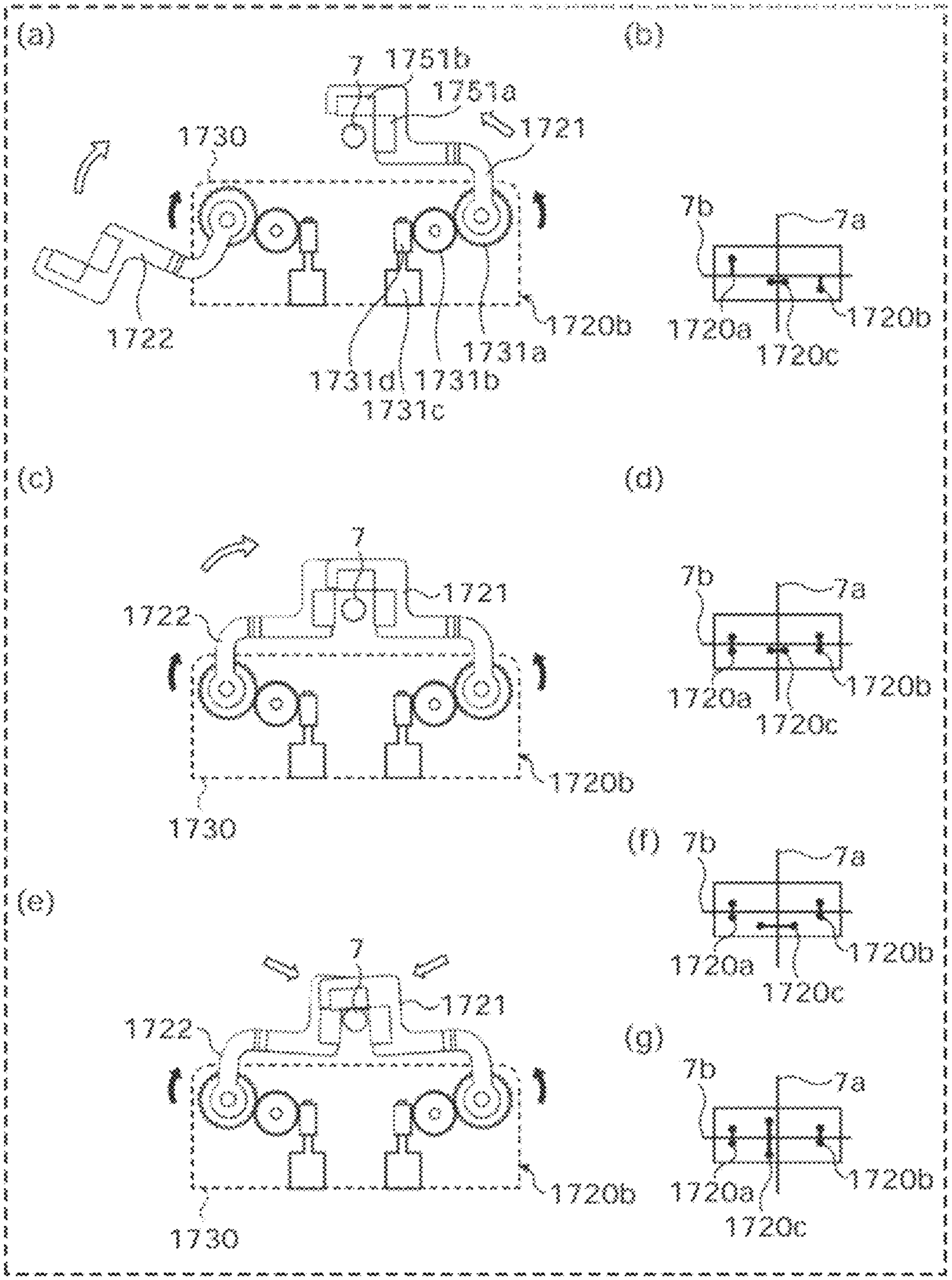
FIG. 46 is a front view of the connector of the unmanned aerial vehicle according to a variation of Embodiment 6 when viewed from the front, illustrating an example of connecting the connector to the second rail.

FIG. 46 is a front view of connector 1720 of unmanned aerial vehicle 10*k* according to a variation of Embodiment 6 when viewed from the front, illustrating an example of connecting connector 1720 to second rail 7*b*.

As illustrated in (a) and (b) in FIG. 46, unmanned aerial vehicle 10*k* rotates counterclockwise to an attitude where the lengthwise direction of unmanned aerial vehicle 10*k* is approximately parallel to the lengthwise direction of second rail 7*b*. In other words, unmanned aerial vehicle 10*k* rotates 90° from the state illustrated in (e) in FIG. 44.

In unmanned aerial vehicle 10*k*, actuation controller 12 controls the actuators to actuate the other motor 1731*c* corresponding to second hook 1722 of first connector 1720*a* to rotate third gear 1731*d*, which rotates the other first gear 1731*a* via the other second gear 1731*b*. This consequently pivots second hook 1722 of first connector 1720*a* to position second hook 1722 to cover second rail 7*b* from above, as illustrated in (c) and (d) in FIG. 46. In unmanned aerial vehicle 10*k*, actuation controller 12 controls the actuators to actuate the one motor 1731*c* corresponding to first hook 1721 of second connector 1720*b* to rotate third gear 1731*d*, which rotates the one first gear 1731*a* via the one second gear 1731*b*. This consequently pivots first hook 1721 of second connector 1720*b* to position first hook 1721 to cover second rail 7*b* from above.

As illustrated in (e) in FIG. 46, actuation controller 12 further pivots first hook 1721 and second hook 1722 by controlling the respective actuators of first connector 1720*a* and second connector 1720*b*. This causes first hook 1721 and second hook 1722 to push down on rail 7 so rail 7 it covered from vertically above. The axial directions of the axes of rotation of first rollers 1751*a* of first hook 1721 and second hook 1722 are each inclined at a predetermined angle relative to the horizontal direction.

As illustrated in (f) and (g) in FIG. 46, unmanned aerial vehicle 10*k* disconnects third connector 1720*c* from first rail 7*a* and rotates third connector 1720*c* 90° to connect third connector 1720*c* to second rail 7*b*.

First hook 1721 and second hook 1722 close, thus closing third connector 1720*c* and connecting third connector 1720*c* to second rail 7*b*.

Embodiment 7

Configuration

Hereinafter, since the basic configuration of first thruster device 110*a*1 in the present embodiment is the same as the basic configuration of the first thruster device according to Embodiment 1 and the like, description of the first thruster device and the basic configuration thereof according to the present embodiment will be omitted where appropriate. The present embodiment differs from Embodiment 1 and the like in regard to first thruster device 110*a*1 being provided with first guide portion 1811.

Figure 47:
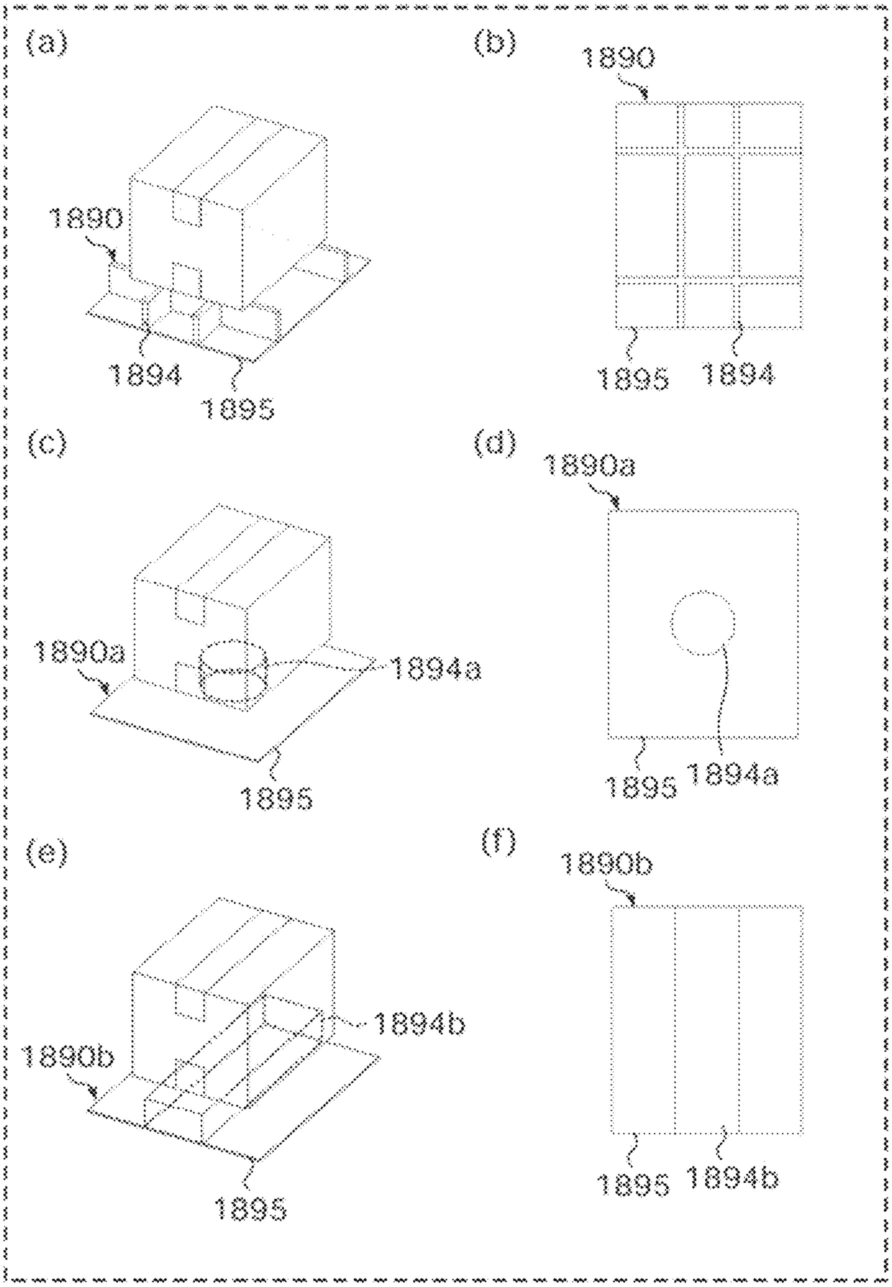
FIG. 47 is a perspective view of an example of a platform included in a system according to Embodiment 7.
Figure 48:
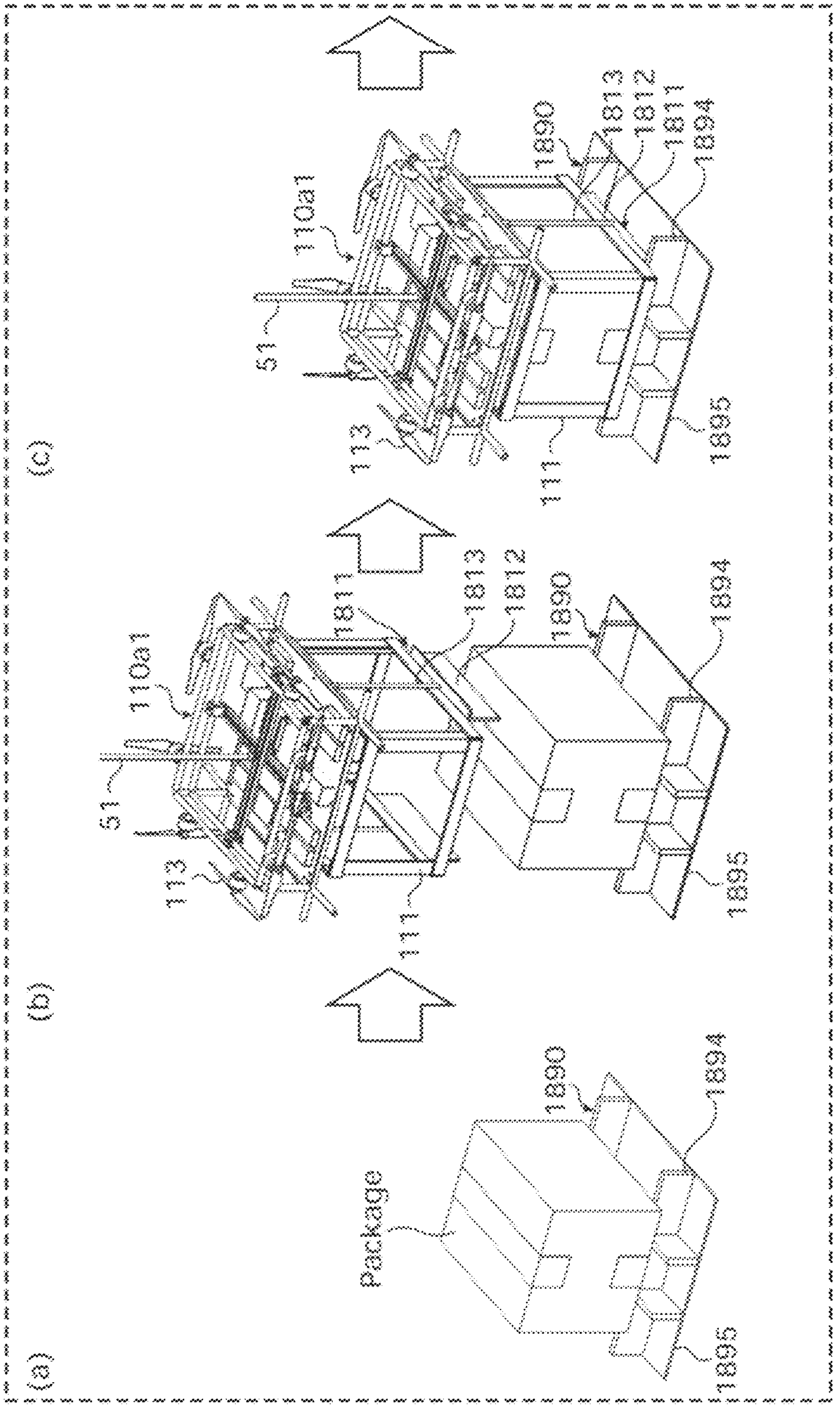
FIG. 48 is a perspective view illustrating an example of how a first thruster device of a lifting system according to Embodiment 7 retrieves a package placed on the platform.
Figure 49:
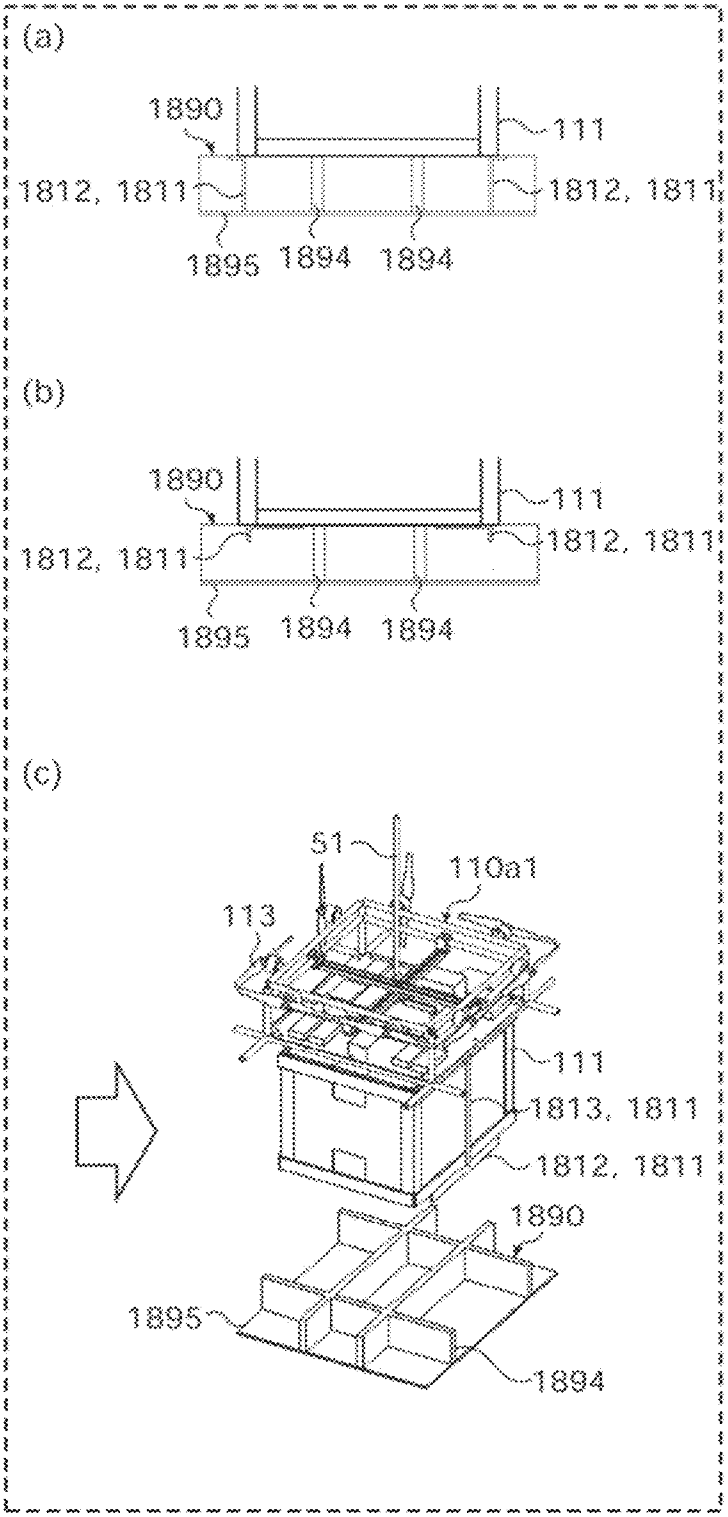
FIG. 49 includes a side view illustrating an example of the first thruster device of the lifting system according to Embodiment 7 retrieving a package placed on the platform.

FIG. 47 is a perspective view of an example of platform 1890 included in the system according to Embodiment 7. FIG. 48 is a perspective view illustrating an example of how first thruster device 110*a*1 of the lifting system according to Embodiment 7 retrieves a package placed on platform 1890. FIG. 49 includes a side view illustrating an example of first thruster device 110*a*1 of the lifting system according to Embodiment 7 retrieving a package placed on platform 1890.

The system according to the present embodiment includes platform 1890 and a lifting system, as illustrated in FIG. 47 and FIG. 48.

Platform 1890 is a platform on which the lifting system places a package for delivery or transport. Platform 1890 includes bottom plate portion 1895 that is placed on the floor or ground surface etc., and package support portion 1894 that is formed on the upper surface of bottom plate portion 1895.

Package support portion 1894 is a protrusion protruding from bottom plate portion 1895. More specifically, as illustrated in (a) in FIG. 47, package support portion 1894 include of a plurality of plates arranged standing upright from the upper surface of bottom plate portion 1895. When package support portion 1894 is viewed from above, it is formed in a lattice pattern on bottom plate portion 1895. When package support portion 1894 is viewed from above, package support portion 1894 may be slatted. In platform 1890, package can be placed so as to be adjacent to the sides of package support portion 1894, which is made up of boards. Stated differently, the sides of package support portion 1894 correspond to a loading surface.

In platform 1890, since package support portion 1894 is lattice shaped, a space is formed for guiding first guide portion 1811 of first thruster device 110*a*1, that is, a gap is formed between the package and bottom plate portion 1895. The space is a recess where contact with first guide portion 1811 is avoided when first guide portion 1811 is displaced.

As illustrated in (b) and (c) in FIG. 47, package support portions 1894*a* and 1894*b* may be columnar or tubular portions that project from the upper surface of bottom plate portions 1895*a* and 1895*b*. In (c) in FIG. 47 according to the present embodiment, bottom plate portion 1895*a* is exemplified as a cylinder-shaped columnar portion, and in (e) in FIG. 47, bottom plate portion 1895*b* is illustrated as a polygonal columnar portion, but the shapes of package support portions 1894*a* and 1894*b* are not limited as long as they are capable of supporting a package. The surface area of the bottom surface of the package in (d) and (f) in FIG. 47 is larger than the loading surface of package support portions 1894*a* and 1894*b*, which are in contact with that bottom surface.

Package support portion 1894 can be of any shape, as long as a space is formed between the bottom surface of the package and bottom plate portion 1895 where the package can be supported by rotational support portion 1812 of first guide portion 1811 rotating. Accordingly, the shape of package support portion 1894 is not limited to the shape illustrated in FIG. 47.

As illustrated in FIG. 48, first thruster device 110*a*1 further includes a pair of first guide portions 1811.

Each first guide portion 1811 includes first connecting portion 1813 and rotational support portion 1812.

First connecting portion 1813 is an elongated rod extending in the vertical direction that is provided along the side of first support member 111. The upper end of first connecting portion 1813 is coupled to an actuator provided in first thruster device 110*a*1, and the lower end of first connecting portion 1813 is coupled to rotational support portion 1812 provided in first thruster device 110*a*1. First connecting portion 1813 is actuated by the actuator of first thruster device 110*a*1 to impart a force for rotating rotational support portion 1812. First connecting portion 1813 is actuated by the actuator under control by thruster controller 124 of first thruster device 110*a*1 to rotate rotational support portion 1812 by applying stress to rotational support portion 1812 vertically upward and vertically downward.

As illustrated in (c) in FIG. 48 and (a) and (b) in FIG. 49, rotational support portion 1812 is located at the lower edge of first support member 111 of first thruster device 110*a*1 and rotates around a predetermined axis. Rotational support portion 1812 is an elongated component formed in an approximate L-shape when viewed from the side. Rotational support portion 1812 supports the bottom surface of the package by rotating around a predetermined axis to scoop up the package from below when retrieving it. Rotational support portion 1812 is displaced between a support state in which it can support the package and an unsupported state in which it does not support the package by rotating from the support state.

Operations

As illustrated in (a) and (b) in FIG. 48, first thruster device 110*a*1 descends from the airspace above the package on platform 1890 and aligns itself with the package. After alignment, first thruster device 110*a*1 descends and inserts the package inside first support member 111.

As illustrated in (c) in FIG. 48, rotational support portion 1812 of first thruster device 110*a*1 is positioned between two adjacent package support portions 1894 in platform 1890. When positioning rotational support portion 1812, rotational support portion 1812 is guided by the two adjacent package support portions 1894, which adjusts the attitude of first support member 111 relative to the package.

Thruster controller 124 of first thruster device 110*a*1 detects that first thruster device 110*a*1 has been placed in a position where it can retrieve a package. For example, when thruster controller 124 obtains information indicating that first thruster device 110*a*1 has contacted the loading surface, it actuates the pair of first guide portions 1811 by controlling actuators in first thruster device 110*a*1. More specifically, as illustrated in (a) and (b) in FIG. 49, the pair of first connecting portions 1813 are actuated by actuators to impart a force for rotating the pair of rotational support portions 1812 in a one-to-one manner. Stated differently, the pair of first connecting portions 1813 apply stress in a vertically downward direction to the pair of rotational support portions 1812, causing the pair of rotational support portions 1812 to rotate around a predetermined axis. The pair of rotational support portions 1812 support the package from both sides of the bottom surface of the package by rotating in the space between the two adjacent package support portions 1894 and the package to scoop up the package. With this, first thruster device 110*a*1 supports the package.

As illustrated in (c) in FIG. 49, first thruster device 110*a*1 retrieves the package and ascends toward the unmanned aerial vehicle.

Variation 1 of Embodiment 7

Hereinafter, since the basic configuration of first thruster device 110*a*2 according to the present variation is the same as the basic configuration of the first thruster device according to Embodiment 7 and the like, repeated description of the basic configuration of first thruster device 110*a*2 in the present variation will be omitted where appropriate. The present variation differs from Embodiment 7 and the like in regard to the shape of platform 1880 of the system. The present variation differs from Embodiment 7 and the like in regard to first thruster device 110*a*2 being further provided with second guide portion 1821.

Figure 50:
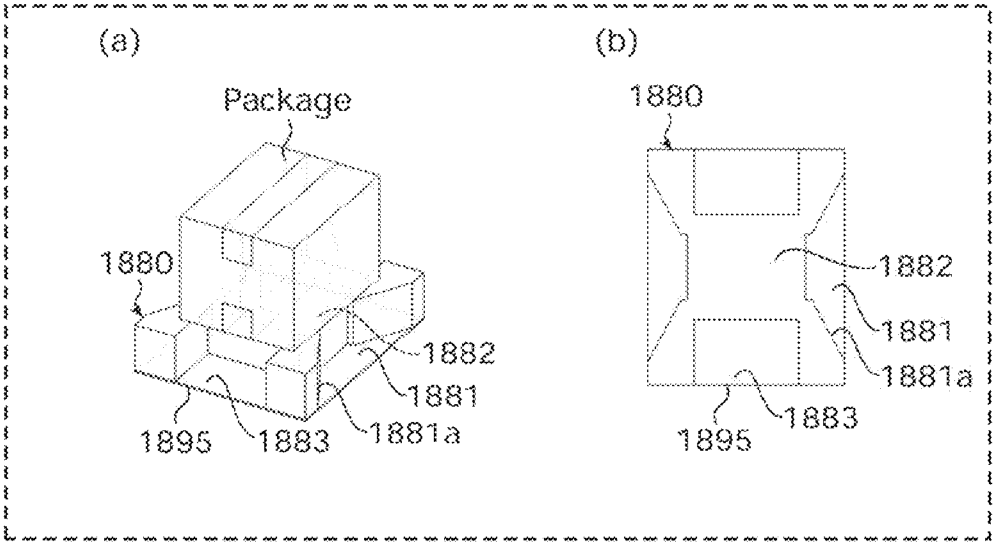
FIG. 50 includes a perspective view of an example of a platform included in a system according to a variation of Embodiment 7, and a plan view of the platform.

FIG. 50 includes a perspective view of an example of platform 1880 included in the system according to a variation of Embodiment 7, and a plan view of platform 1880. In FIG. 50, (a) illustrates a package placed on platform 1880, and (b) illustrates platform 1880 as viewed from vertically above.

As illustrated in (a) and (b) in FIG. 50, package support portion 1894 is a protrusion protruding from bottom plate portion 1895. The central portion of package support portion 1894 is formed to be large enough to support a package to be placed on it, and the upper surface of package support portion 1894 forms flat loading surface 1882 on which the package can be placed. As illustrated in (b) in FIG. 50, package support portion 1894 has an X-shape in plan view. Package support portion 1894 includes first notch 1883 and second notch 1881 for guiding first guide portion 1811 and second guide portion 1821 of first thruster device 110*a*2.

First notch 1883 corresponds to first guide portion 1811. First notch 1883 is a space for avoiding contact with first guide portion 1811 when first guide portion 1811 is displaced. The number of first notches 1883 corresponds to the number of first guide portions 1811, more specifically, first notches 1883 are provided to correspond one-to-one with first guide portions 1811. In the present embodiment, two first notches 1883 are formed in package support portion 1894.

Second notch 1881 corresponds to second guide portion 1821. Second notch 1881 is a space for avoiding contact with second guide portion 1821 when second guide portion 1821 is displaced. The number of second notches 1881 corresponds to the number of second guide portions 1821, more specifically, second notches 1881 are provided to correspond one-to-one with second guide portions 1821. In the present embodiment, two second notches 1881 are formed in package support portion 1894. Inner surface 1881*a* of second notch 1881 has a spindle or pyramidal shape that gradually narrows as it approaches the center portion of package support portion 1894. The smaller base end of inner surface 1881*a* of second notch 1881 (the center portion of package support portion 1894) is shaped in accordance with the shape of slide guide portion 1821*b*2 (described below) so that slide guide portion 1821*b*2 can be placed.

Figure 51:
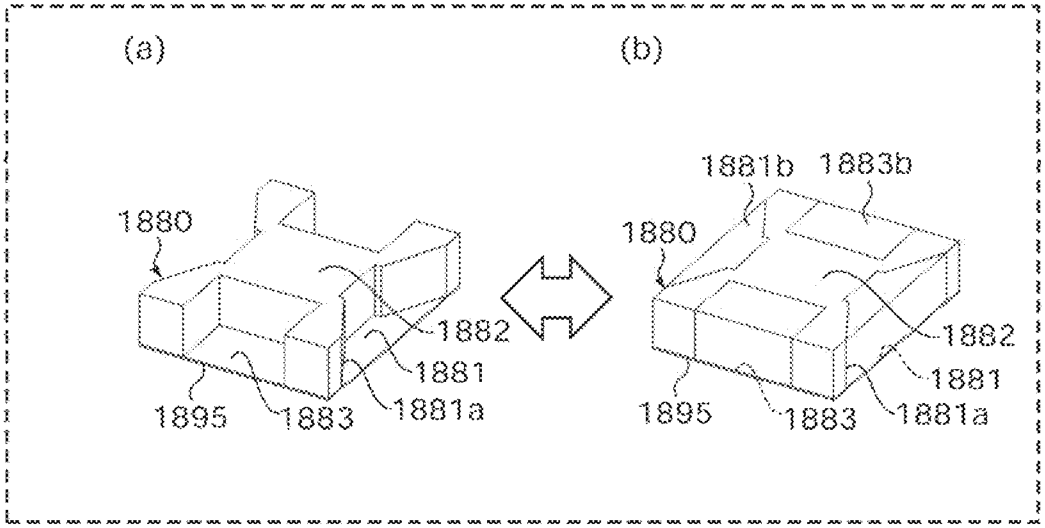
FIG. 51 is a perspective view of an example of the platform included in the system according to Variation 1 of Embodiment 7 changing shape.

FIG. 51 is a perspective view of an example of platform 1880 included in the system according to Variation 1 of Embodiment 7 changing shape. In FIG. 51, (a) illustrates a first state for when placing a package on platform 1880, and (b) illustrates a second state for when not placing a package on platform 1880 (i.e., when platform 1880 is not in use).

Platform 1880 further includes a plurality of movable floors 1881*b* and 1883*b* for filling in first notch 1883 and second notch 1881. When platform 1880 is changed from the first state to the second state, the plurality of movable floors 1881*b* and 1883*b* rise to fill in first notch 1883 and second notch 1881. The plurality of movable floors 1881*b* and 1883*b* may be housed in bottom plate portion 1895.

If the package is to be collected, platform 1880 may include a gravity sensor or a pressure sensor or the like. Stated differently, when a package is loaded on loading surface 1882 of platform 1880, movable floors 1881*b* and 1883*b* may be lowered to change platform 1880 from the second state to the first state by detecting the weight of the package.

When delivering a package, platform 1880 may be changed from the second state to the first state by lowering movable floors 1881*b* and 1883*b* when it detects an unmanned aerial vehicle or first thruster device 110*a*2 stopped in the airspace above platform 1880. Platform 1880 may be changed from the second state to the first state by obtaining a signal from an unmanned aerial vehicle or first thruster device 110*a*2.

Figure 52:
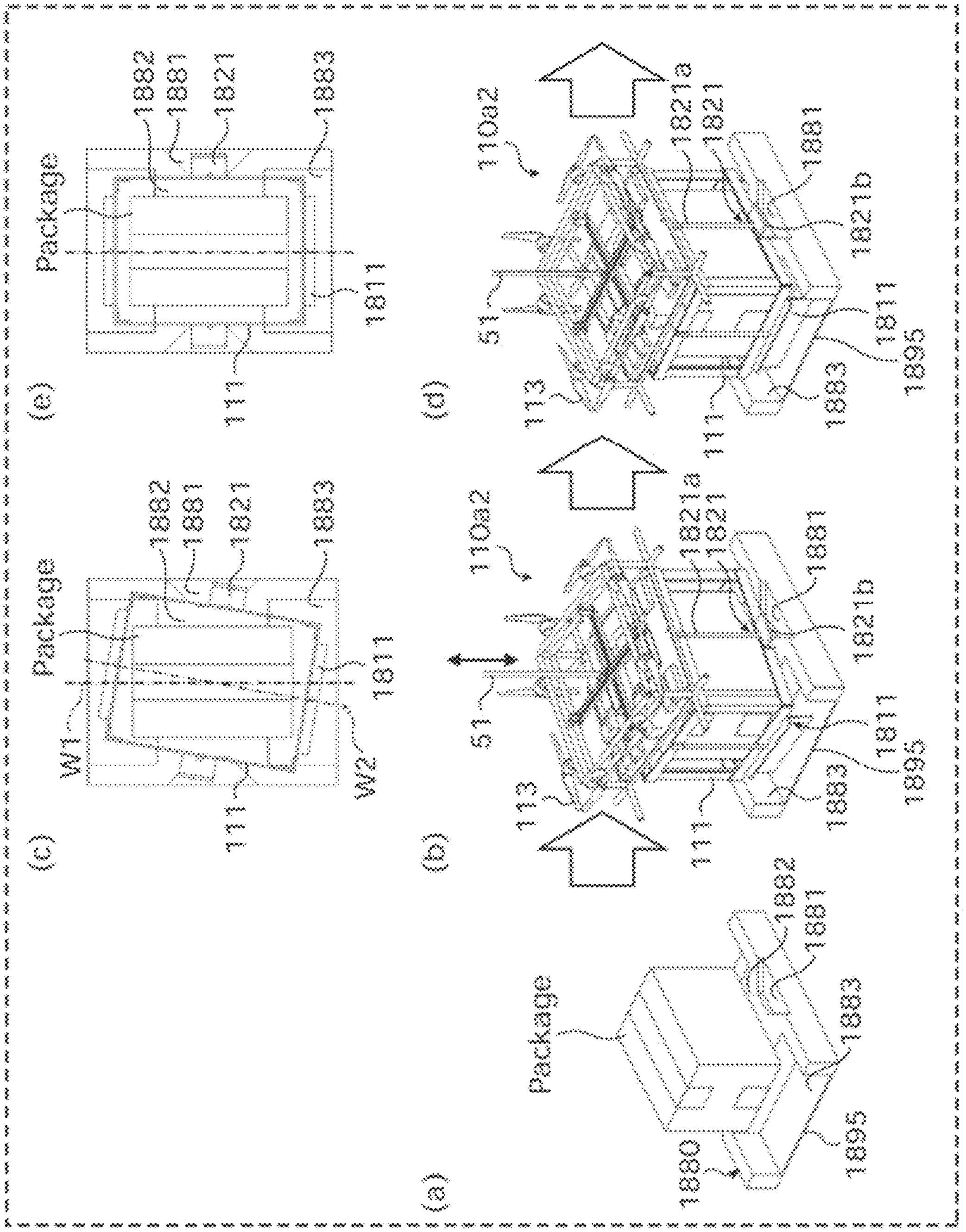
FIG. 52 is a perspective view illustrating an example of how a first thruster device of a lifting system according to Variation 1 of Embodiment 7 retrieves a package placed on the platform.
Figure 53:
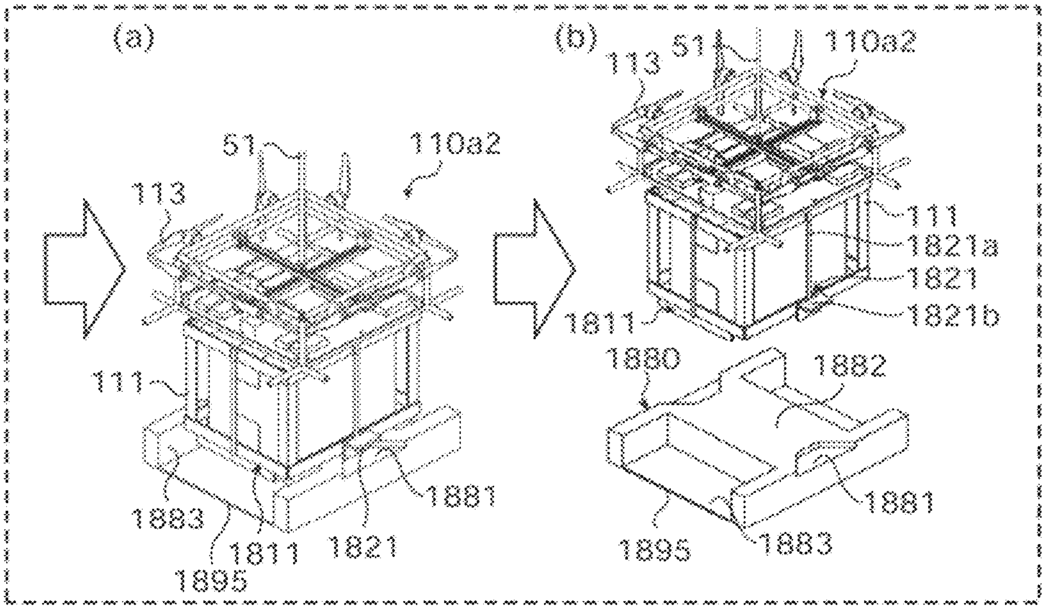
FIG. 53 is a perspective view illustrating an example of how the first thruster device of the lifting system according to Variation 1 of Embodiment 7 retrieved a package placed on the platform.
Figure 54:
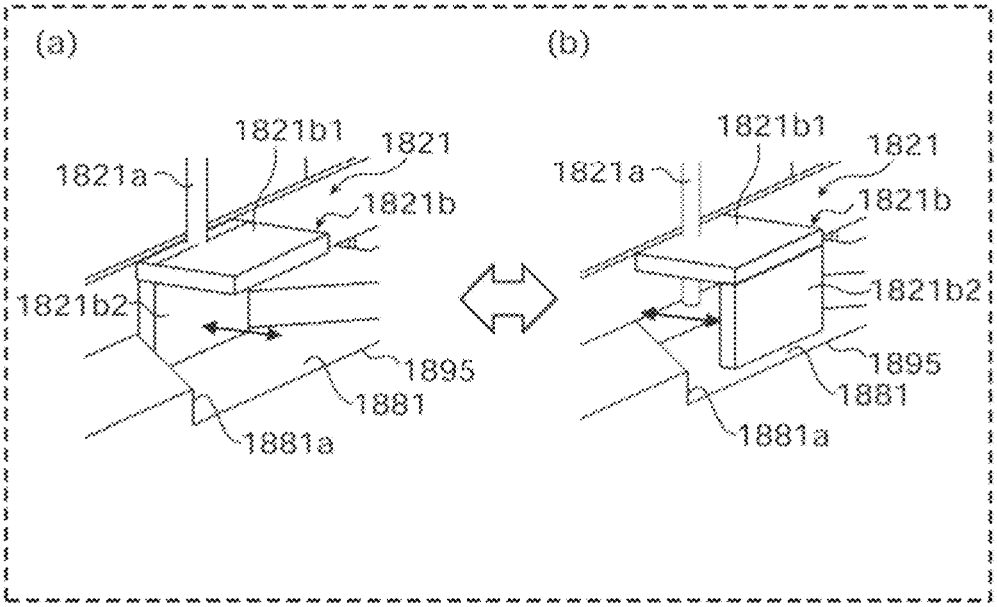
FIG. 54 is a perspective view illustrating the movement of a second guide portion of the first thruster device of the lifting system according to Variation 1 of Embodiment 7.

FIG. 52 is a perspective view illustrating an example of how first thruster device 110*a*2 of the lifting system according to Variation 1 of Embodiment 7 retrieves a package placed on platform 1880. FIG. 53 is a perspective view illustrating an example of how first thruster device 110*a*2 of the lifting system according to Variation 1 of Embodiment 7 retrieves a package placed on platform 1880. FIG. 54 is a perspective view illustrating the movement of second guide portion 1821 of first thruster device **110*a*2** of the lifting system according to Variation 1 of Embodiment 7.

As illustrated in FIG. 52 and FIG. 53, first thruster device **110*a*2 further includes a pair of second guide portions 1821**.

Each second guide portion 1821 includes second connecting portion **1821*a* and slide portion 1821*b***.

Second connecting portion **1821*a* is an elongated rode extending in the vertical direction. The upper end of second connecting portion 1821*a* provided along the side of first support member 111 is coupled to an actuator included in first thruster device 110*a*2, and the lower end of second connecting portion 1821*a* is coupled to slide main body portion 1821*b*1 of slide portion 1821*b* included in first thruster device 110*a*2. Second connecting portion 1821*a* transfers a force for moving slide portion 1821*b* to slide main body portion 1821*b*1 when the actuator of first thruster device 110*a*2** is actuated.

As illustrated in (b) in FIG. 52 and (a) and (b) in FIG. 53, a pair of slide portions **1821*b* are arranged at the lower edge of first support member 111 of first thruster device 110*a*2 and move slide guide portion 1821*b*2** so as to sandwich the package.

More specifically, each slide portion **1821*b* includes slide main body portion 1821*b*1 and slide guide portion 1821*b*2**.

Slide main body portion **1821*b*1 is an actuator that is positioned and fixed to the lower edge of first support member 111 and moves slide guide portion 1821*b*2** in the horizontal direction.

Slide guide portion **1821*b*2 is an upright plate-like component and can be moved by slide main body portion 1821*b*1 along the lower end surface of slide main body portion 1821*b*1. Slide guide portion 1821*b*2 is supported by slide main body portion 1821*b*1 in an upright attitude vertically below slide main body portion 1821*b*1, which is a plate-like component that is approximately parallel to the horizontal direction. The pair of slide guide portions 1821*b*2 approach the package so as to sandwich the package from both sides in order to correct the attitude of first support member 111 relative to the package placed on platform 1880 using slide main body portion 1821*b*1. Slide guide portion 1821*b*2 may be moved by slide main body portion 1821*b*1 so as to slide away from the package when disconnecting the package from first support member 111**.

Operations

As illustrated in (a) and (b) in FIG. 52, first thruster device **110*a*2 descends from the airspace above the package on platform 1880 and aligns itself with the package. After alignment, first thruster device 110*a*2 descends and inserts the package inside first support member 111**.

As illustrated in (b) and (c) in FIG. 52, first thruster device **110*a*2 further finely adjusts its position relative to the package. In FIG. 52, (c) illustrates first thruster device 110*a*2 and a package as viewed from above. In FIG. 52, (c) shows that the lengthwise direction of first thruster device 110*a*2** is misaligned with the lengthwise direction of the package by a predetermined angle.

Thruster controller 124 of first thruster device **110*a*2 detects that first thruster device 110*a*2 has been placed in a position where it can retrieve a package. For example, when thruster controller 124 obtains information indicating that first thruster device 110*a*2 has contacted loading surface 1882, it actuates the slide portions 1821*b* of the pair of second guide portions 1821 as illustrated in (a) and (b) in FIG. 54 by controlling actuators in first thruster device 110*a*2. This causes the pair of slide guide portions 1821*b*2 to approach the package by slide main body portion 1821*b*1 so that the package is sandwiched from both sides. At this time, the pair of slide guide portions 1821*b*2 approach the package while sliding on inner surfaces 1881*a* (the side surfaces) of the pair of second notches 1881 formed in platform 1880. This adjusts the attitude of first support member 111 relative to the package, as illustrated in (d) and (e) in FIG. 52. In FIG. 52, (e) illustrates first thruster device 110*a*2 and a package as viewed from above. In FIG. 52, (e) shows that the lengthwise direction of first thruster device 110*a*2 is approximately parallel to the lengthwise direction of the package. Accordingly, with this first thruster device 110*a*2, the pair of first guide portions 1811** can properly support the package, whereby the package can be delivered safely.

Thruster controller 124 of first thruster device **110*a*2 detects that first thruster device 110*a*2 has been placed in a position where it can retrieve a package. For example, when thruster controller 124 obtains information indicating that first thruster device 110*a*2 has contacted loading surface 1882, it actuates the pair of first guide portions 1811 by controlling actuators in first thruster device 110*a*2. More specifically, as illustrated in (a) in FIG. 53, the pair of first connecting portions 1813 are actuated by actuators to impart a force for rotating the pair of rotational support portions 1812 in a one-to-one manner. Stated differently, the pair of first connecting portions 1813 apply stress in a vertically downward direction to the pair of rotational support portions 1812, causing the pair of rotational support portions 1812 to rotate around a predetermined axis. The pair of rotational support portions 1812 support the package from both sides of the bottom surface of the package by rotating in the space between the two adjacent package support portions 1894 and the package to scoop up the package. With this, first thruster device 110*a*2** supports the package.

As illustrated in (b) in FIG. 53, first thruster device **110*a*2** retrieves the package and ascends toward the unmanned aerial vehicle.

Variation 2 of Embodiment 7

Configuration

Hereinafter, since the basic configuration of first thruster device **110*a*3 according to the present variation is the same as the basic configuration of the first thruster device according to Variation 1 of Embodiment 7 and the like, repeated description of the basic configuration of first thruster device 110*a*3 in the present variation will be omitted where appropriate. The present variation differs from Variation 1 of Embodiment 7 and the like in regard to the configuration of second guide portion 1823**.

Figure 55:
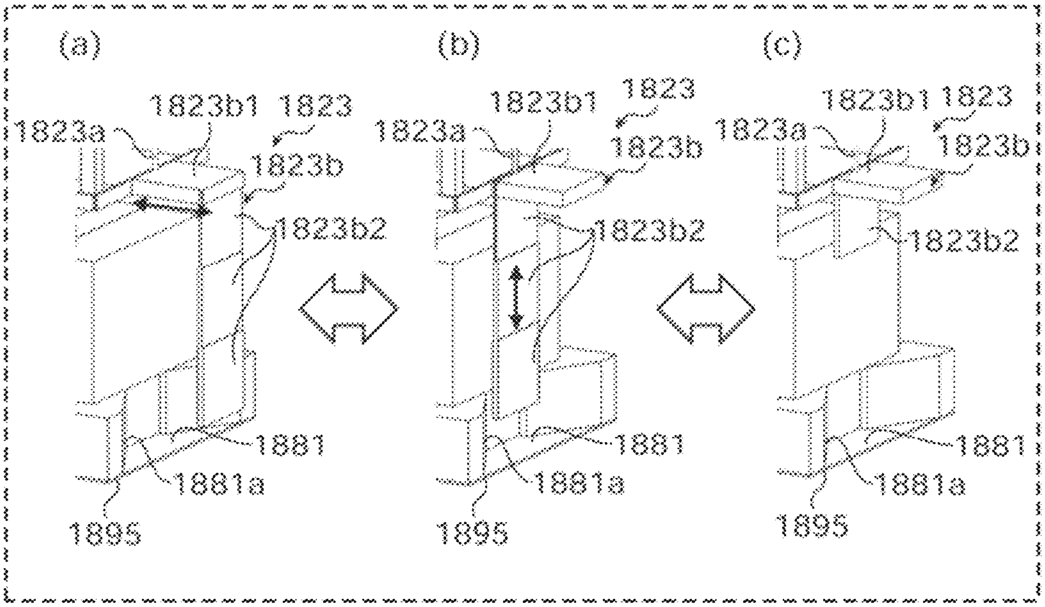
FIG. 55 is a perspective view illustrating the movement of a second guide portion of the first thruster device of the lifting system according to Variation 2 of Embodiment 7.

FIG. 55 is a perspective view illustrating the movement of second guide portion 1823 of first thruster device **110*a*3 of the lifting system according to Variation 2 of Embodiment 7. In FIG. 55, (a) illustrates a plurality of slide guide portions 1823*b*2 in an extended state and separated from the package, (b) illustrates the plurality of slide guide portions 1823*b*2 in an extended state and approaching the package, and (c) illustrates the plurality of slide guide portions 1823*b*2** in a collapsed state.

Each slide portion **1823*b* includes slide main body portion 1823*b*1 and a plurality of slide guide portions 1823*b*2**.

As illustrated in (a) and (c) in FIG. 55, when first support member 111 approaches the space directly above the package, slide main body portion **1823*b*1 arranges the plurality of slide guide portions 1823*b*2 so that the plurality of slide guide portions 1823*b*2 are aligned connected end to end in the vertical direction. As illustrated in (b) in FIG. 55, the pair of slide main body portion 1823*b*1 move the plurality of slide guide portions 1823*b*2 to bring the plurality of slide guide portions 1823*b*2 closer to the package to sandwich the package from both sides. Here, slide guide portion 1823*b*2 located at the lowest end of the plurality of slide guide portions 1823*b*2 is located in the space defined by second notch section 1881 of platform 1880 to properly support the attitude of first support member 111** relative to the package.

Operations

Figure 56:
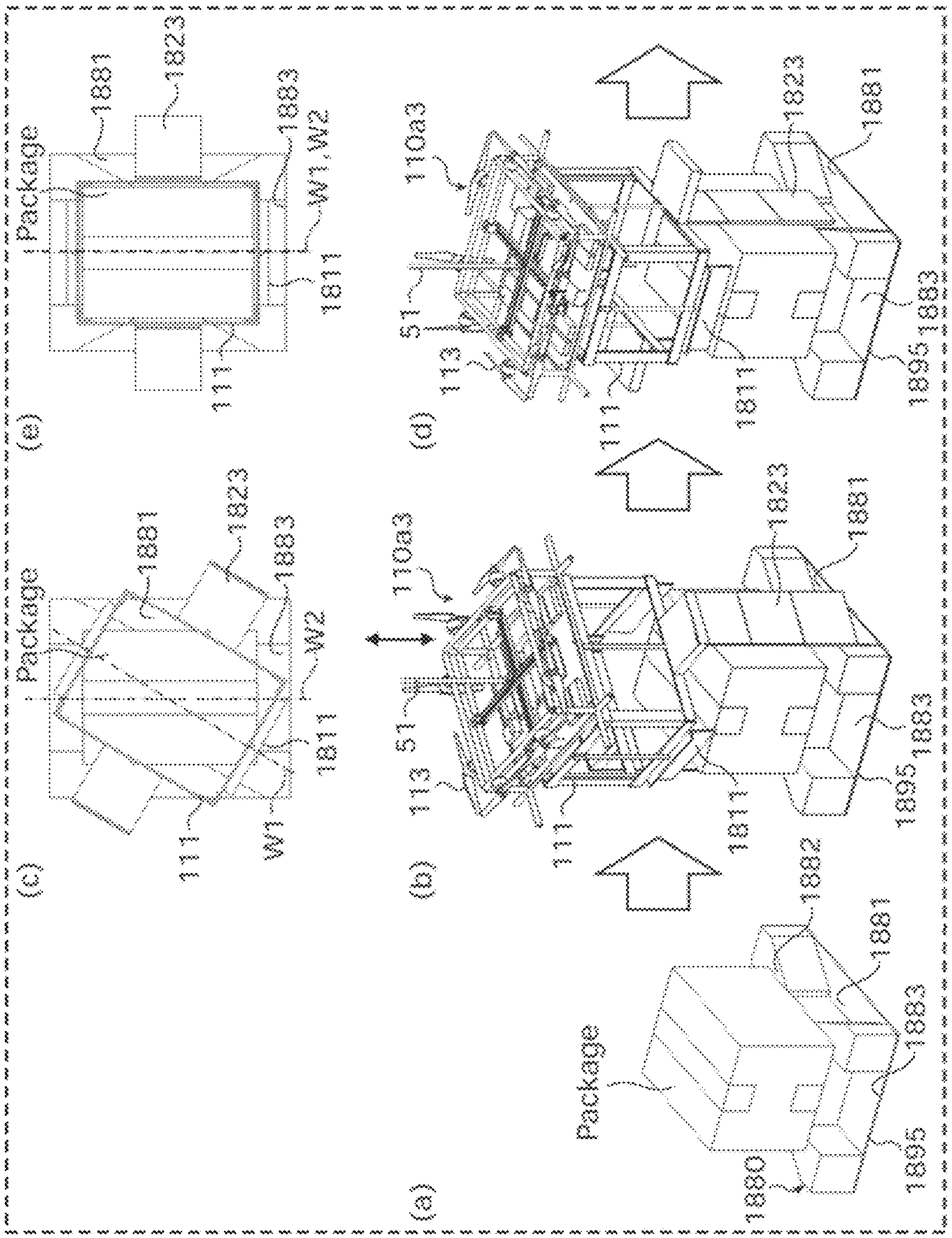
FIG. 56 is a perspective view illustrating an example of how a first thruster device of a lifting system according to Variation 2 of Embodiment 7 retrieves a package placed on the platform.

FIG. 56 is a perspective view illustrating an example of how first thruster device **110*a*3 of the lifting system according to Variation 2 of Embodiment 7 retrieves a package placed on platform 1880**.

As illustrated in (a) and (b) in FIG. 56, first thruster device **110*a*3 descends from the airspace above the package on platform 1880 and aligns itself with the package. After alignment, first thruster device 110*a*3 descends and inserts the package inside first support member 111**.

As illustrated in (b) and (c) in FIG. 56, first thruster device **110*a*3 further finely adjusts its position relative to the package. In FIG. 56, (c) illustrates first thruster device 110*a*3 and a package as viewed from above. In FIG. 56, (c) shows that the lengthwise direction of first thruster device 110*a*3** is misaligned with the lengthwise direction of the package by a predetermined angle.

Thruster controller 124 of first thruster device **110*a*3 detects that first thruster device 110*a*3 has been placed in a position where it can retrieve a package. For example, when thruster controller 124 obtains information indicating that first thruster device 110*a*3 has contacted loading surface 1882, it actuates the slide portions 1823*b* of the pair of second guide portions 1823 as illustrated in (e) and (d) in FIG. 56 by controlling actuators in first thruster device 110*a*3. This causes a pair of the plurality of slide guide portions 1823*b*2 to approach the package by slide main body portion 1823*b*1 so that the package is sandwiched from both sides. At this time, the pair of the plurality of slide guide portions 1823*b*2 that are located on the lowest end approach the package while sliding on inner surfaces 1881*a* (the side surfaces) of the pair of second notches 1881 formed in platform 1880. This adjusts the attitude of first support member 111 relative to the package, as illustrated in (e) in FIG. 56. In FIG. 56, (e) illustrates first thruster device 110*a*3 and a package as viewed from above. In FIG. 56, (e) shows that the lengthwise direction of first thruster device 110*a*3 is approximately parallel to the lengthwise direction of the package. Accordingly, with this first thruster device 110*a*3, the pair of first guide portions 1811** can properly support the package, whereby the package can be delivered safely.

Figure 57:
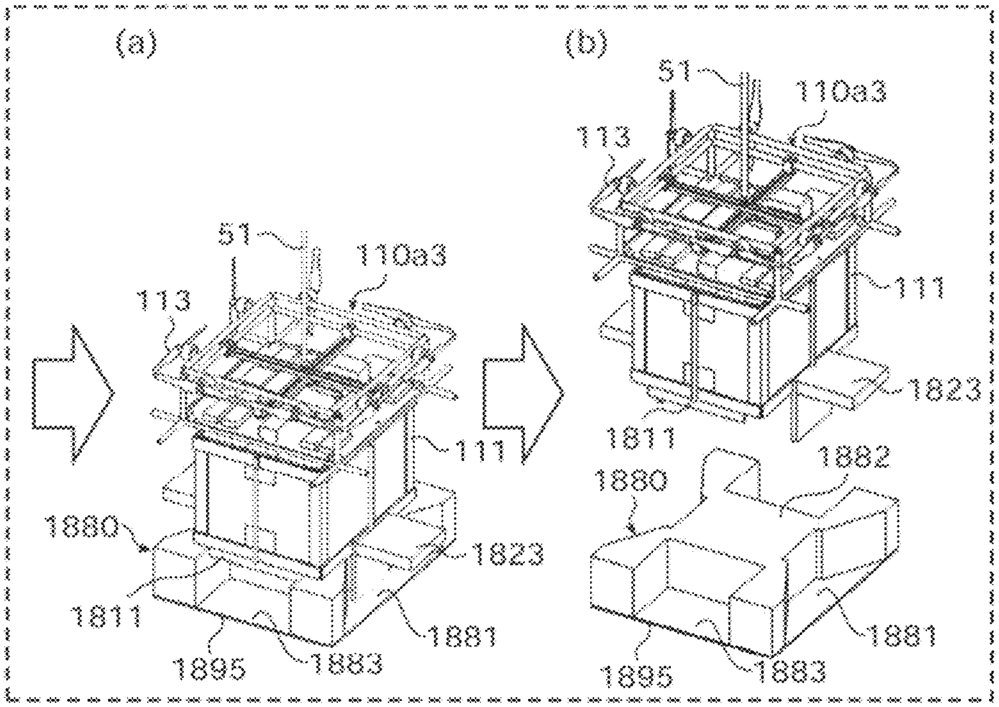
FIG. 57 is a perspective view illustrating an example of how the first thruster device of the lifting system according to Variation 2 of Embodiment 7 retrieved a package placed on the platform.

FIG. 57 is a perspective view illustrating an example of how first thruster device **110*a*3 of the lifting system according to Variation 2 of Embodiment 7 retrieves a package placed on platform 1880**.

As illustrated in (a) in FIG. 57, first thruster device **110*a*3 descends and slide main body portion 1823*b*1 folds the plurality of slide guide portions 1823*b*2 to collapse them together as one. Thruster controller 124 of first thruster device 110*a*3 detects that first thruster device 110*a*3 has been placed in a position where it can retrieve a package. For example, when thruster controller 124 obtains information indicating that first thruster device 110*a*3 has contacted loading surface 1882, it actuates the pair of first guide portions 1811 by controlling actuators in first thruster device 110*a*3. More specifically, the pair of connecting portions are actuated by actuators to impart a force for rotating the pair of rotational support portions 1812 in a one-to-one manner. Stated differently, the pair of connecting portions apply stress in a vertically downward direction to the pair of rotational support portions 1812, causing the pair of rotational support portions 1812 to rotate around a predetermined axis. The pair of rotational support portions 1812 support the package from both sides of the bottom surface of the package by rotating in the space between the two adjacent package support portions 1894 and the package to scoop up the package. With this, first thruster device 110*a*3** supports the package.

As illustrated in (b) in FIG. 57, first thruster device **110*a*3** retrieves the package and ascends toward the unmanned aerial vehicle.

Embodiment 8

Configuration

Hereinafter, since the basic configuration of unmanned aerial vehicle **10*m* according to the present embodiment is the same as the basic configuration of the unmanned aerial vehicle according to Embodiment 5 and the like, repeated description of the basic configuration of unmanned aerial vehicle 10*m*** in the present embodiment will be omitted where appropriate.

Figure 58A:
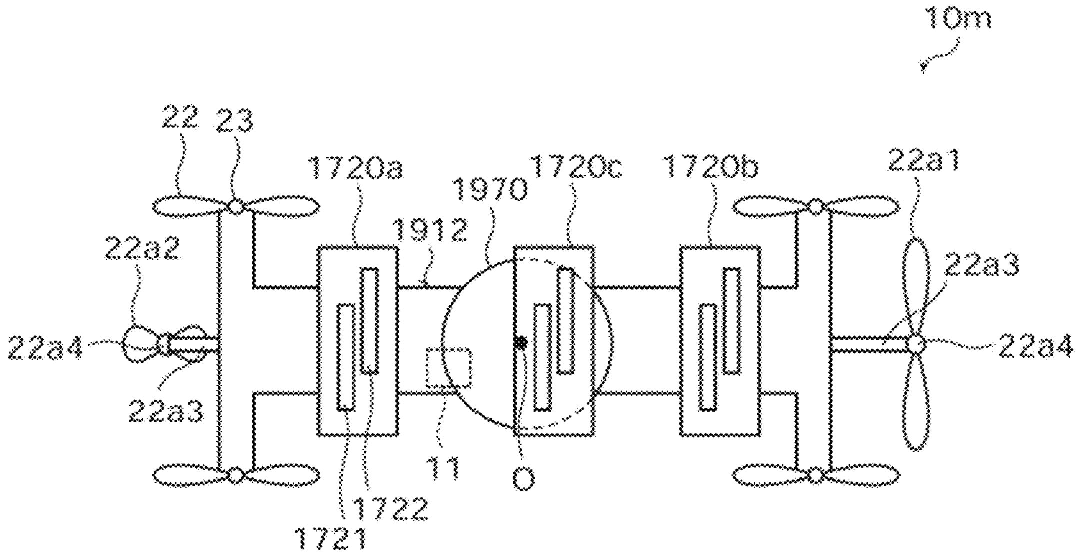
FIG. 58A is a schematic diagram illustrating an example of an unmanned aerial vehicle according to Embodiment 8.
Figure 58B:
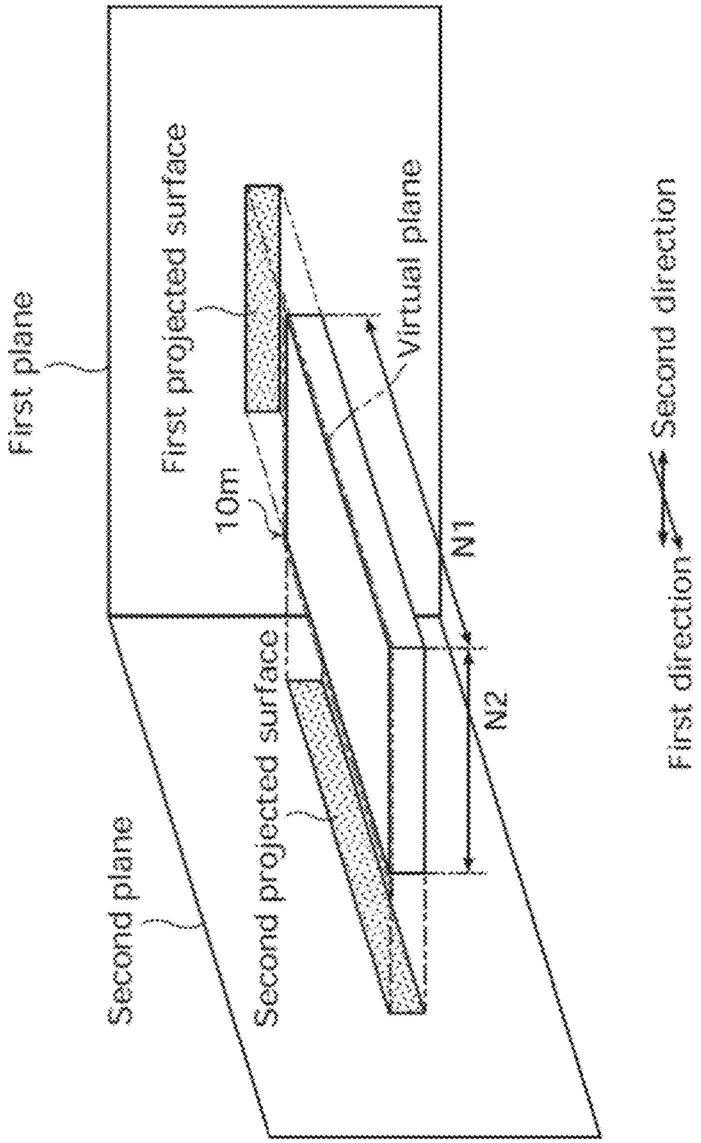
FIG. 58B is a schematic diagram illustrating an example of a first projected surface and a second projected surface and the like of the unmanned aerial vehicle according to Embodiment 8.

FIG. 58A is a schematic diagram illustrating an example of unmanned aerial vehicle **10*m* according to Embodiment 8. FIG. 58B is a schematic diagram illustrating an example of a first projected surface and a second projected surface and the like of unmanned aerial vehicle 10*m*** according to Embodiment 8.

As illustrated in FIG. 58A and FIG. 58B, first length N1 of vehicle main body 1912 in a first direction is longer than second length N2 of vehicle main body 1912 in a second direction approximately orthogonal to the first direction. The first direction is parallel to the direction of travel of unmanned aerial vehicle **10*m*. In the present embodiment, when unmanned aerial vehicle 10*m* is moving along first rail 7*a*, the first direction is parallel to the lengthwise direction of first rail 7*a*. Vehicle main body 1912 is therefore elongated in the lengthwise direction of first rail 7*a*. Vehicle main body 1912** is one example of the main body.

Since vehicle main body 1912 is elongated in a direction approximately parallel to the first direction, a first surface area of a first minimum rectangle that circumscribes the first projected surface (indicated by dotted shading) formed by projecting unmanned aerial vehicle **10*m* onto a first plane whose normal vector extends in the first direction is smaller than a second surface area of a second minimum rectangle that circumscribes the second projected surface (indicated by dotted shading) formed by projecting unmanned aerial vehicle 10*m* onto a second plane whose normal vector extends in the second direction. In other words, since the thickness of vehicle main body 1912 remains the same in both the first plane and the second plane, so long as the widthwise length of unmanned aerial vehicle 10*m* projected on the first plane is shorter than the traveling direction length of unmanned aerial vehicle 10*m*** projected on the second plane, the first surface area will be smaller than the second surface area.

Unmanned aerial vehicle **10*m* also includes a plurality of propellers 22, a plurality of first propeller actuation motors 23, at least one side propeller 22*a*1, at least one third propeller actuation motor 22*a*3, control processor 11, at least one connector, and connector support portion 1970**.

The plurality of propellers 22 are positioned in a virtual plane parallel to the first and second directions. The plurality of propellers 22 include first propeller 22, second propeller 22 adjacent to first propeller 22 in the second direction, third propeller 22 adjacent to first propeller 22 in the first direction, and fourth propeller 22 adjacent to second propeller 22 in the first direction and adjacent to third propeller 22 in the second direction. For example, first propeller 22 and second propeller 22 are the two propellers 22 disposed on the front of vehicle main body 1912. Third propeller 22 and fourth propeller 22 are the two propellers 22 disposed on the rear of vehicle main body 1912. Since vehicle main body 1912 is elongated in a direction approximately parallel to the first direction, a first distance between first propeller 22 and second propeller 22 is shorter than a second distance between first propeller 22 and third propeller 22. Propeller 22 is one example of the main rotary wing.

The plurality of first propeller actuation motors 23 are provided in vehicle main body 1912 and respectively rotate the plurality of propellers 22. First propeller actuation motor 23 is one example of the main motor.

The at least one connector can be hung from at least one rail spaced apart from the ground surface. Unmanned aerial vehicle 10*m* according to the present embodiment includes three connectors provided on vehicle main body 1912. The three connectors are the same as first connector 1720*a*, second connector 1720*b*, and third connector 1720*c* according to Embodiment 6 and the like, but connectors from another embodiment may be used. The three connectors are aligned in the lengthwise direction of the rail. First connector 1720*a* is offset in the first direction from the center of vehicle main body 1912. Second connector 1720*b* is offset in the direction opposite the first direction from the center of vehicle main body 1912. Third connector 1720*c* is disposed between first connector 1720*a* and second connector 1720*b*, and is located near the center of vehicle main body 1912. In the present embodiment, third connector 1720*c* is offset toward the rear from center point O (the center) of vehicle main body 1912. In other words, in the present embodiment, third connector 1720*c* is not located on center point O, but may be located on center point O.

The connector is one example of the connecting device. First connector 1720*a* is one example of the first connecting device, second connector 1720*b* is one example of the second connecting device, and third connector 1720*c* is one example of the third connecting device.

First connector 1720*a*, second connector 1720*b*, and third connector 1720*c* each include first hook 1721 and second hook 1722. First hook 1721 is one example of the first arm, and second hook 1722 is one example of the second arm.

The at least one third propeller actuation motor 22*a*3 is provided on vehicle main body 1912 and rotates the at least one side propeller. In the present embodiment, third propeller actuation motors 22*a*3 are provided on the front and rear side surfaces of vehicle main body 1912. Accordingly, the front third propeller actuation motor 22*a*3 propels the front side propeller 22*a*2. The front side propeller 22*a*2 is disposed in a position corresponding to the rear side propeller 22*a*1 in the first direction, and is a propeller for rotating vehicle main body 1912. Side propeller 22*a*2 uses propulsive force to change traveling direction of unmanned aerial vehicle 10*m*. In order for the rear third propeller actuation motor 22*a*3 to propel vehicle main body 1912 in the first direction, rotary shaft 22*a*4 of third propeller actuation motor 22*a*3 extends in the first direction and rotates the rear side propeller 22*a*1. Rotary shaft 22*a*4 of at least the front third propeller actuation motor 22*a*3 has an angle of inclination relative to the first direction that is variable in a plane whose normal vector extends in the second direction, as illustrated in FIG. 8. The rear third propeller actuation motor 22*a*3 is one example of the auxiliary motor. Side propeller 22*a*1 is one example of the auxiliary rotary wing. Note that side propeller 22*a*2 may be one example of the auxiliary rotary wing, and in such cases, the front third propeller actuation motor 22*a*3 may be one example of the auxiliary motor.

The at least one side propeller provides propulsion force for propelling vehicle main body 1912 in the first direction. In the present embodiment, the side propeller is the rear side propeller 22*a*1, which is a propeller disposed on the rear of vehicle main body 1912. Side propeller 22*a*1 is rotated by the rear third propeller actuation motor 22*a*3. Note that the front side propeller 22*a*2 may provide propulsion force for propelling vehicle main body 1912 in the first direction.

Control processor 11 controls elements included in vehicle main body 1912. For example, control processor 11 controls the plurality of first propeller actuation motors 23 and the at least one third propeller actuation motor 22*a*3. Control processor 11 may also control, for example, first connector 1720*a*, second connector 1720*b*, and third connector 1720*c*. Control processor 11 is one example of the control circuit.

At the intersection of first rail 7*a* and second rail 7*b*, control processor 11 determines whether or not first connector 1720*a* has approached second rail 7*b* when unmanned aerial vehicle 10*m* switches (connection) from first rail 7*a* to second rail 7*b*. Stated differently, control processor 11 determines whether the distance between second rail 7*b* and first connector 1720*a* is less than a predetermined distance.

When control processor 11 determines that first connector 1720*a* has approached second rail 7*b*, it detaches first connector 1720*a* from first rail 7*a* and propels unmanned aerial vehicle 10*m* in the first direction by rotating side propeller 22*a*2. In other words, if the distance between second rail 7*b* and first connector 1720*a* is less than a predetermined distance, control processor 11 opens first connector 1720*a* to disconnect first connector 1720*a* from first rail 7*a*, and then controls the rear third propeller actuation motor 22*a*3 to rotate side propeller 22*a*1 and propel unmanned aerial vehicle 10*m* forward.

Control processor 11 determines whether or not first connector 1720*a* has passed second rail 7*b*, and if control processor 11 determines that first connector 1720*a* has passed second rail 7*b*, control processor 11 detaches second connector 1720*b* from first rail 7*a*, rotates unmanned aerial vehicle 10*m* so that the first direction of unmanned aerial vehicle 10*m* is parallel to the direction in which second rail 7*b* extends, and then connects first connector 1720*a* and second connector 1720*b* to second rail 7*b*. Stated differently, control processor 11 determines whether or not first connector 1720*a* has passed vertically below second rail 7*b*, and after first connector 1720*a* has passed vertically below second rail 7*b*, opens first connector 1720*a* and second connector 1720*b* to disconnect them from first rail 7*a*, rotates vehicle main body 1912, and then connects first connector 1720*a* and second connector 1720*b* to second rail 7*b*.

When control processor 11 determines that first connector 1720*a* has passed second rail 7*b*, control processor 11 connects first connector 1720*a* to first rail 7*a*, and determines whether the center of gravity of unmanned aerial vehicle 10*m* is balanced or not. In other words, when first connector 1720*a* has passed second rail 7*b*, control processor 11 determines whether there is a problem with the balance of the center of gravity (the attitude) of vehicle main body 1912.

When control processor 11 determines that the center of gravity of unmanned aerial vehicle 10*m* is balanced, control processor 11 detaches first connector 1720*a* and second connector 1720*b* from first rail 7*a*, rotates unmanned aerial vehicle 10*m* so that the first direction of unmanned aerial vehicle 10*m* is parallel to the direction in which second rail 7*b* extends, and then connects first connector 1720*a* and second connector 1720*b* to second rail 7*b*. In other words, when there is no problem with the balance of the center of gravity (the attitude) of vehicle main body 1912, control processor 11 opens first connector 1720*a* and second connector 1720*b* to disconnect them from first rail 7*a*, rotates vehicle main body 1912, and then connects first connector 1720*a* and second connector 1720*b* to second rail 7*b*.

Figure 59:
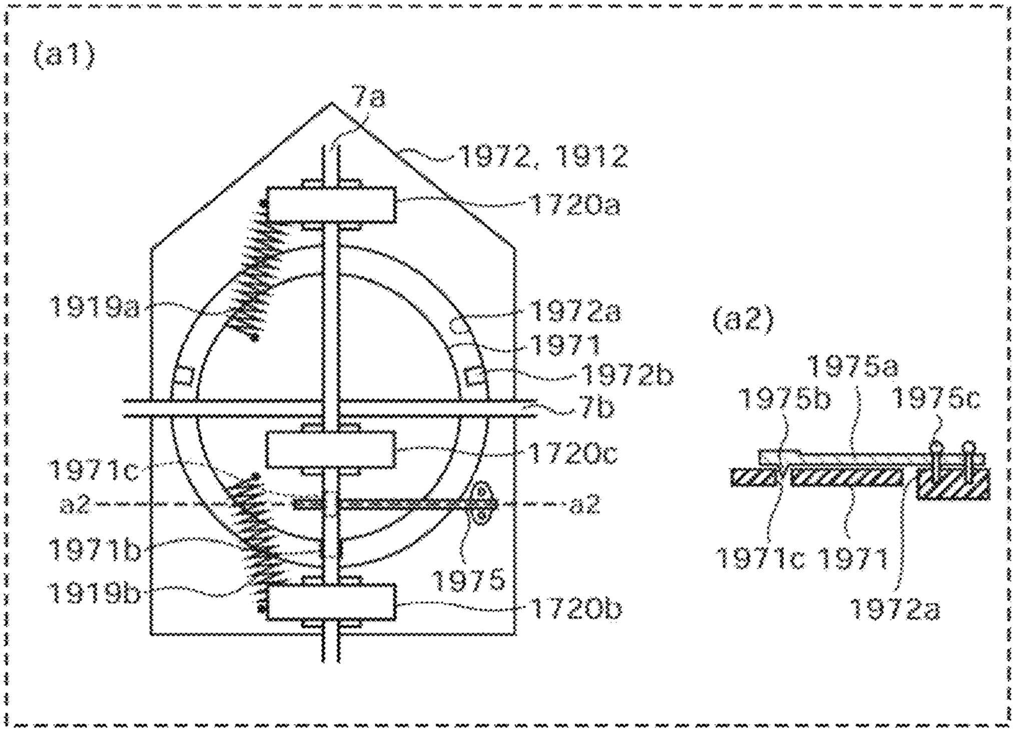
FIG. 59 includes a schematic diagram illustrating an example of a connector support portion and a ratchet of the unmanned aerial vehicle according to Embodiment 8, and a cross-sectional view of a cross section of the connector support portion and the ratchet.

FIG. 59 includes a schematic diagram illustrating an example of connector support portion 1970 and ratchet 1975 of unmanned aerial vehicle 10*m* according to Embodiment 8, and a cross-sectional view of a cross section of connector support portion 1970 and ratchet 1975.

With unmanned aerial vehicle 10*m* according to the present embodiment, as illustrated in FIG. 59, the front side propeller 22*a*2 of vehicle main body 1912 applies stress for rotating second fixed portion 1972 (for rotating vehicle main body 1912) relative to first fixed portion 1971. The rear side propeller 22*a*1 of vehicle main body 1912 applies stress for moving vehicle main body 1912 forward. Each of the front and rear side propellers 22*a*1 of vehicle main body 1912 may apply stress that causes vehicle main body 1912 to rotate, and may apply stress that cause vehicle main body 1912 to move forward.

Connector support portion 1970 is disposed between third connector 1720*c* and vehicle main body 1912. Connector support portion 1970 includes first fixed portion 1971, second fixed portion 1972, a plurality of rollers, ratchet 1975, and tension springs 1919*a* and 1919*b*. First fixed portion 1971 and second fixed portion 1972 are arranged so as to overlap in this order.

Third connector body 1720*c* is fixed to first fixed portion 1971. More specifically, first fixed portion 1971 is a plate-like component that fixes third connector body 1720*c* on its upper surface and is positioned separated from vehicle main body 1912. First fixed portion 1971 rotates around an axis parallel to the vertical direction (i.e., around center point O) with respect to vehicle main body 1912 and second fixed portion 1972. First fixed portion 1971 is one example of the turntable.

Second fixed portion 1972 fixed to vehicle main body 1912 so as to overlap first fixed portion 1971. Second fixed portion 1972 is a plate-like component fixed to vehicle main body 1912. Second fixed portion 1972 is one example of the turntable.

Engagement hole 1972*a* is formed in the central portion of second fixed portion 1972. Part or all of first fixed portion 1971 is arranged in engagement hole 1972*a* of second fixed portion 1972. First fixed portion 1971 and engagement hole 1972*a* of second fixed portion 1972 are circular in plan view. Since the outer surface of first fixed portion 1971 and the inner surface of engagement hole 1972*a* of second fixed portion 1972 are separated by a predetermined distance, first fixed portion 1971 can be rotated relative to engagement hole 1972*a* of second fixed portion 1972. The central axis (center point O) of first fixed portion 1971 and the central axis of engagement hole 1972*a* of second fixed portion 1972 are approximately aligned.

Note that as engagement hole 1972*a*, a recess may be formed in the central portion of second fixed portion 1972 instead of a through-hole, and a through-hole or recess may be formed to engage first fixed portion 1971.

An annular groove may be formed in the central portion of each of first fixed portion 1971 and second fixed portion 1972. The annular grooves are formed on the inner circumference or outer circumference of first fixed portion 1971 and engagement hole 1972*a* of second fixed portion 1972. The plurality of rollers may be arranged along the annular grooves formed in the central portions of first fixed portion 1971 and second fixed portion 1972. The plurality of rollers may be sandwiched between first fixed portion 1971 and second fixed portion 1972, and second fixed portion 1972 may be rotated with respect to first fixed portion 1971, like a bearing.

One convex rotation stopping portion 1971*b* protruding toward second fixed portion 1972 is formed on the outer peripheral surface of first fixed portion 1971. Two convex rotation stopping portions 1972*b* protruding toward first fixed portion 1971 are formed on the inner peripheral surface of engagement hole 1972*a* of second fixed portion 1972. The two rotation stopping portions 1972*b* of engagement hole 1972*a* of second fixed portion 1972 are positioned to have point symmetry about the central axis of engagement hole 1972*a* of second fixed portion 1972.

In any embodiment, not just the present embodiment, two or more rotation stopping portions 1971*b* may be formed on first fixed portion 1971, and one or three or more rotation stopping portions 1972*b* may be formed on second fixed portion 1972.

Even if second fixed portion 1972 pivots around the central axis of engagement hole 1972*a*, the pivoting of second fixed portion 1972 is restricted by the contact of rotation stopping portion 1972*b* of second fixed portion 1972 with rotation stopping portion 1971*b* of first fixed portion 1971. Stated differently, second fixed portion 1972 is pivotably adjustable by a specified angle relative to first fixed portion 1971.

Engagement portion 1971*c* for engaging ratchet 1975 is formed in first fixed portion 1971. Engagement portion 1971*c* is a recess for engaging the protrusion of ratchet 1975, but it may be a protrusion. Engagement portion 1971*c* is formed on the upper surface of first fixed portion 1971 where third connector 1720*c* is located, but may be formed on the outer peripheral surface of first fixed portion 1971. In such cases, ratchet 1975 may be fixed to second fixed portion 1972 so that it presses against the outer peripheral surface of first fixed portion 1971. In such cases, engagement portion 1971*c* may be formed on the outer peripheral surface of first fixed portion 1971.

Ratchet 1975 is fixed to second fixed portion 1972. More specifically, ratchet 1975 includes plate spring 1975*a*, engagement receiving portion 1975*b*, and fastening portion 1975*c*. Plate spring 1975*a* has an elongated shape and is positioned so as to extend from second fixed portion 1972 across to first fixed portion 1971. One end of plate spring 1975*a* is fixed to second fixed portion 1972 by fastening portion 1975*c* so that the other end is biased against the upper surface of first fixed portion 1971. Engagement receiving portion 1975*b* engages with engagement portion 1971*c* formed in first fixed portion 1971 by being biased by first fixed portion 1971. Engagement receiving portion 1975*b* is a protruding portion fixed to one end of plate spring 1975*a* that protrudes toward the upper surface of first fixed portion 1971. Note that if engagement portion 1971*c* of first fixed portion 1971 is a protrusion, engagement receiving portion 1975*b* is a recess that recedes away from the upper surface of first fixed portion 1971. In the present embodiment, engagement receiving portion 1975*b* has the shape of an isosceles triangle, but engagement receiving portion 1975*b* may have the shape of a right-angled triangle, a cylinder, or a prism. In the present embodiment, engagement receiving portion 1975*b* has a sloping surface. The sloping surface is a surface inclined with respect to a plane perpendicular to the circumferential direction in which second fixed portion 1972 pivots, to enable one end of ratchet 1975 to be pushed upward when second fixed portion 1972 pivots with respect to first fixed portion 1971. In engagement receiving portion 1975*b*, the surface opposite to the surface on which the sloping surface is formed may be an approximately parallel surface to the direction orthogonal to the lengthwise direction of plate spring 1975*a* (i.e., the second direction). Fastening portion 1975*c* is a screw, bolt, etc., that fastens plate spring 1975*a* to second fixed portion 1972.

When second fixed portion 1972 pivots with respect to first fixed portion 1971 when engagement receiving portion 1975*b* of ratchet 1975 is engaged with engagement portion 1971*c* of first fixed portion 1971, the rotational force of second fixed portion 1972 causes engagement portion 1971*c* of first fixed portion 1971 to slide down the sloping surface of engagement receiving portion 1975*b* of ratchet 1975. When the rotational force of second fixed portion 1972 overcomes the force exerted by plate spring 1975*a* of ratchet 1975, engagement receiving portion 1975*b* of ratchet 1975 separates from engagement portion 1971*c* of first fixed portion 1971, and the engagement between engagement receiving portion 1975*b* of ratchet 1975 and engagement portion 1971*c* of first fixed portion 1971 is released. Here, the tip of engagement receiving portion 1975*b* of ratchet 1975 slides along the upper surface of first fixed portion 1971.

Tension springs 1919*a* and 1919*b* are connected to first fixed portion 1971 and vehicle main body 1912 (or second fixed portion 1972). In the present embodiment, each of the two tension springs 1919*a* and 1919*b* is connected to first fixed portion 1971 and vehicle main body 1912. More specifically, one end of tension spring 1919*a* (hereafter referred to as front tension spring 1919*a*) is coupled to the front of first fixed portion 1971, and the other end of tension spring 1919*a* is coupled to the front of vehicle main body 1912. One end of tension spring 1919*b* (hereafter referred to as the rear tension spring) is coupled to the rear of first fixed portion 1971, and the other end of tension spring 1919*b* is coupled to the rear of vehicle main body 1912.

Looking at unmanned aerial vehicle 10*m* from above, when second fixed portion 1972 pivots (when vehicle main body 1912 pivots) clockwise relative to first fixed portion 1971, the connection point between one end of front tension spring 1919*a* and first fixed portion 1971 and the connection point between the other end of front tension spring 1919*a* and vehicle main body 1912 separate, increasing the distance therebetween. Front tension spring 1919*a* is thus stretched. The connection point of the one end of rear tension spring 1919*b* and first fixed portion 1971 and the connection point of the other end of rear tension spring 1919*b* and vehicle main body 1912 come closer together, reducing the distance therebetween. Front tension spring 1919*a* therefore contracts.

Looking at unmanned aerial vehicle 10*m* from above, when second fixed portion 1972 pivots (when vehicle main body 1912 pivots) counterclockwise relative to first fixed portion 1971, the connection point between one end of front tension spring 1919*a* and first fixed portion 1971 and the connection point between the other end of front tension spring 1919*a* and vehicle main body 1912 come closer together, reducing the distance therebetween. Front tension spring 1919*a* therefore contracts. The connection point of the one end of rear tension spring 1919*b* and first fixed portion 1971 and the connection point of the other end of rear tension spring 1919*b* and vehicle main body 1912 separate far apart, increasing the distance therebetween. Rear tension spring 1919*b* is thus stretched.

Operation Example 1

Figure 60:
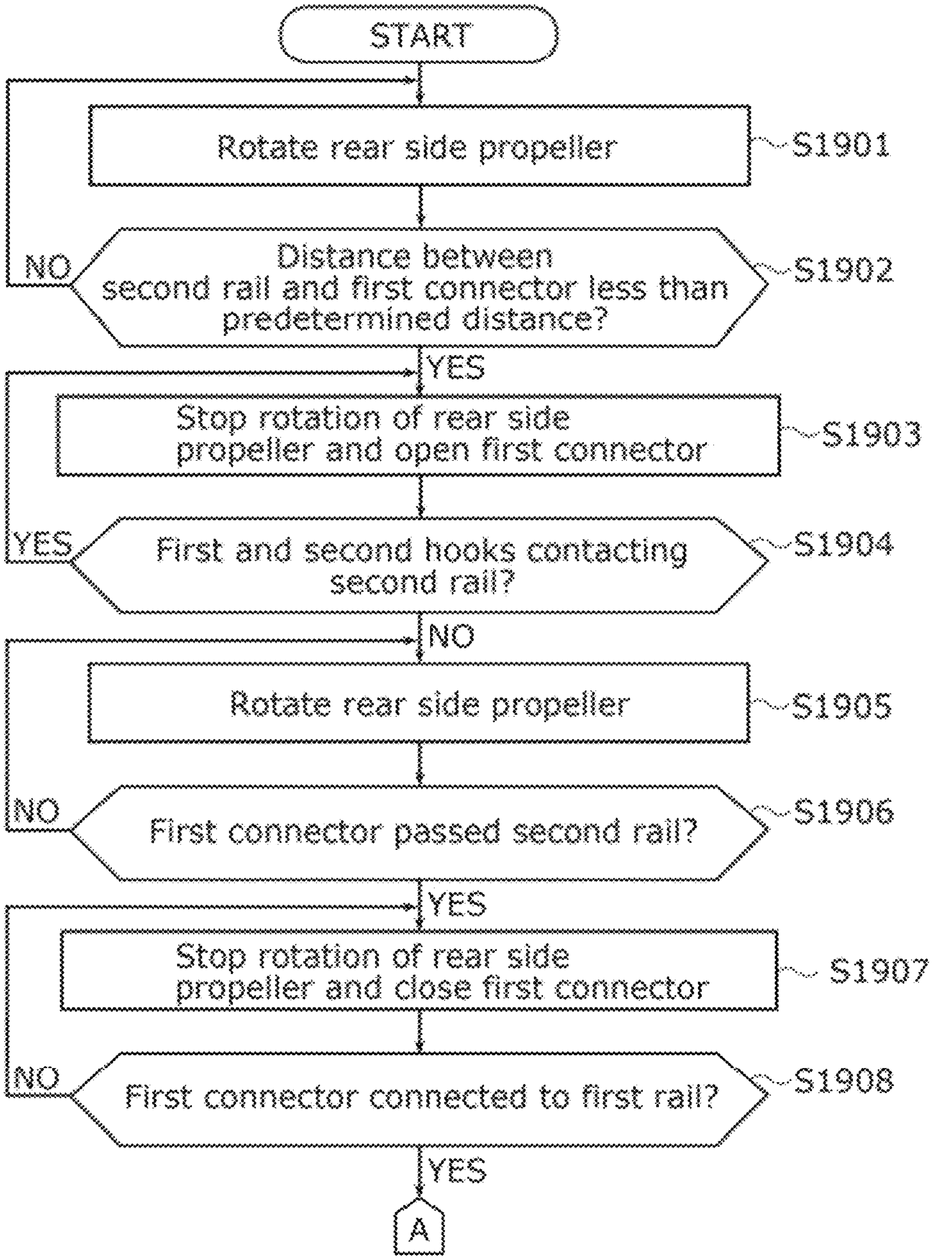
FIG. 60 is a flowchart illustrating an example of operations performed when a first connector of the unmanned aerial vehicle according to Embodiment 8 passes a second rail.
Figure 61:
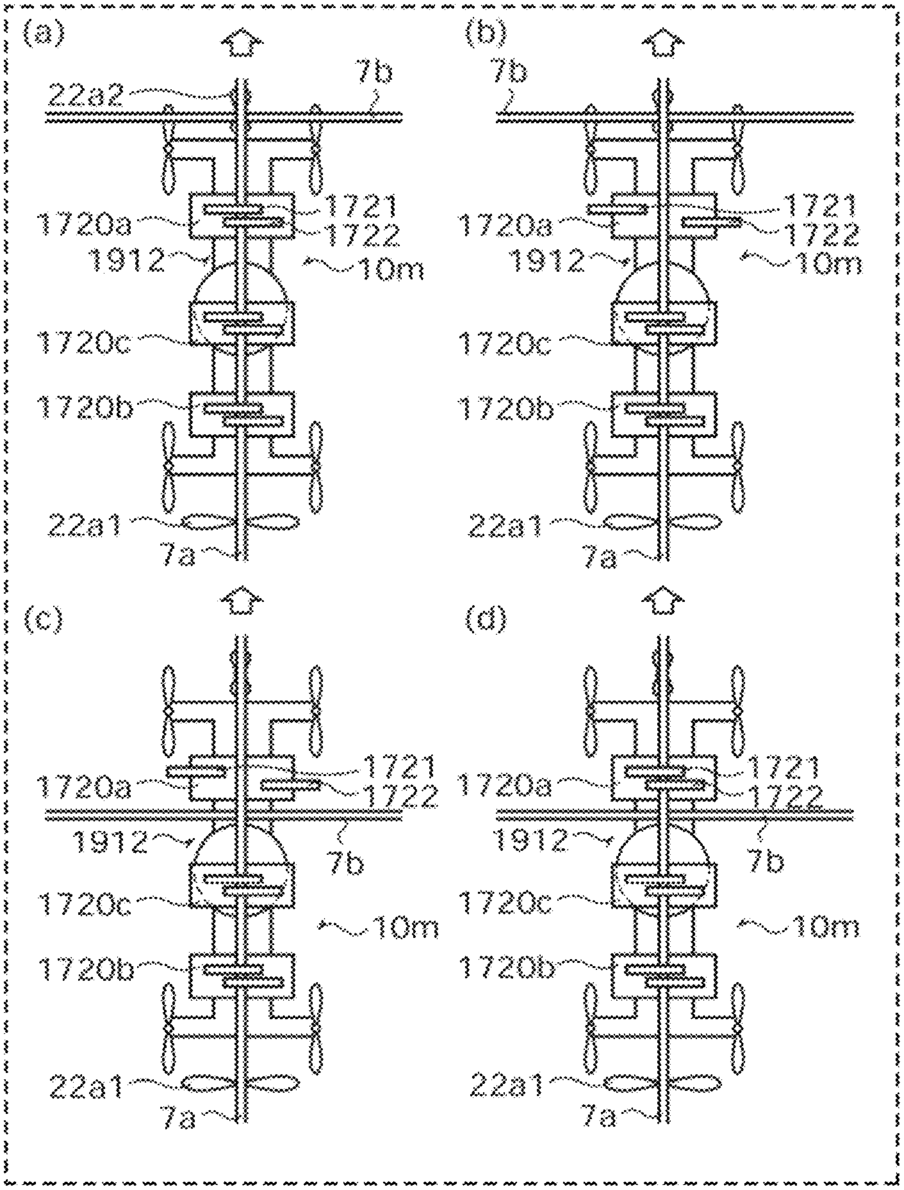
FIG. 61 is a schematic diagram illustrating an example of the operations illustrated in FIG. 60 that are performed by the unmanned aerial vehicle.

First, an example where unmanned aerial vehicle 10*m* changes course from first rail 7*a* to second rail 7*b*, as illustrated in FIG. 60 and FIG. 61, will be given.

FIG. 60 is a flowchart illustrating an example of operations performed when first connector 1720*a* of unmanned aerial vehicle 10*m* according to Embodiment 8 passes second rail 7*b*. FIG. 61 is a schematic diagram illustrating an example of the operations illustrated in FIG. 60 that are performed by unmanned aerial vehicle 10*m*. FIG. 61 illustrates an example of unmanned aerial vehicle 10*m* according to Embodiment 8 coupling to second rail 7*b* from first rail 7*a*.

Unmanned aerial vehicle 10*m* travels along first rail 7*a* by rotating side propeller 22*a*1 (S1901). Control processor 11 determines whether the distance between second rail 7*b* and first connector 1720*a* is less than a predetermined distance (S1902). If the distance between second rail 7*b* and first connector 1720*a* is greater than or equal to the predetermined distance (NO in S1902), control processor 11 returns to step S1901.

If the distance between second rail 7*b* and first connector 1720*a* is less than the predetermined distance (YES in S1902), control processor 11 pivots first hook 1721 and second hook 1722 of first connector 1720*a* to open first connector 1720*a* since first connector 1720*a* is located within a close distance to second rail 7*b*. Here, control processor 11 stops rotation of side propeller 22*a*1 by controlling the rear third propeller actuation motor 22*a*3 for rotating side propeller 22*a*1 (S1903). This causes unmanned aerial vehicle 10*m* to stop traveling.

Control processor 11 determines whether first connector 1720*a* is positioned vertically lower than second rail 7*b*, to prevent contact between first connector 1720*a* and second rail 7*b* in the open state. Stated differently, control processor 11 determines whether first hook 1721 and second hook 1722 of first connector 1720*a* contact second rail 7*b* (S1904).

If first hook 1721 and second hook 1722 of first connector 1720*a* contact second rail 7*b* (YES in S1904), control processor 11 returns the process to step S1903. If first hook 1721 and second hook 1722 of first connector 1720*a* do not contact second rail 7*b* (NO in S1904), control processor 11 rotates side propeller 22*a*1 by controlling the rear third propeller actuation motor 22*a*3 (S1905). This causes unmanned aerial vehicle 10*m* to move forward.

Control processor 11 determines whether first connector 1720*a* has passed vertically below second rail 7*b* (S1906).

If first connector 1720*a* has not passed vertically below second rail 7*b* (NO in S1906), control processor 11 returns the process to step S1905. If first connector 1720*a* has passed vertically below second rail 7*b* (YES in S1906), control processor 11 stops rotation of side propeller 22*a*1 by controlling the rear third propeller actuation motor 22*a*3. This causes unmanned aerial vehicle 10*m* to stop traveling. Control processor 11 also pivots first hook 1721 and second hook 1722 of first connector 1720*a* to close first connector 1720*a* (S1907).

Control processor 11 determines whether the closed first connector 1720*a* has connected to first rail 7*a* (S1908). If the closed first connector 1720*a* is not connected to first rail 7*a* (NO in S1908), control processor 11 rotates side propellers 22*a*1 and 22*a*2 to correct the attitude of vehicle main body

1912 and/or opens first connector 1720*a* to allow connection of first connector 1720*a* to first rail 7*a*, and returns the process to step S1907. If the closed first connector 1720*a* is connected to first rail 7*a* (YES in S1908), control processor 11 proceeds to A in FIG. 62.

Figure 62:
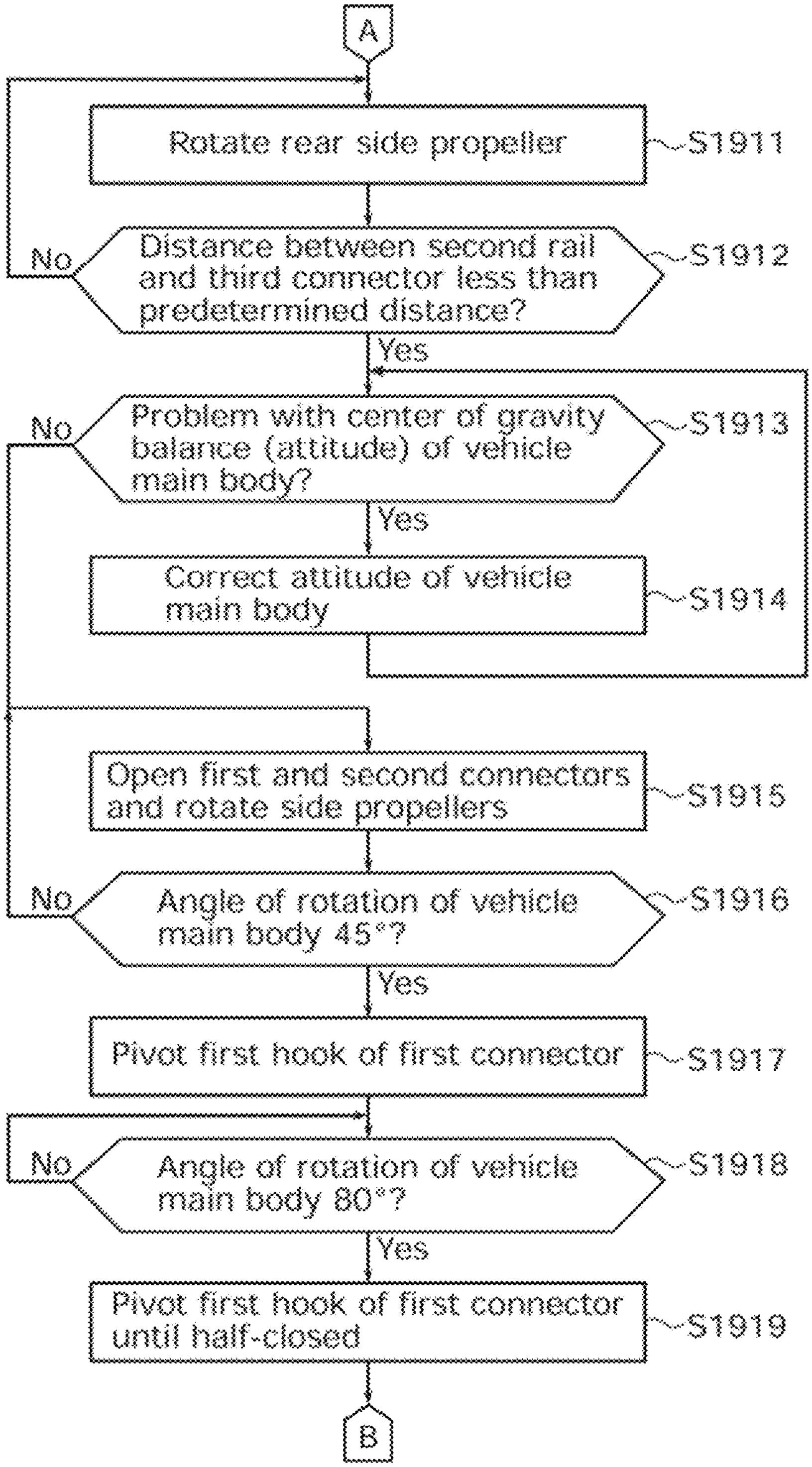
FIG. 62 is a flowchart illustrating an example of operations performed when a vehicle main body of the unmanned aerial vehicle according to Embodiment 8 rotates.
Figure 63:
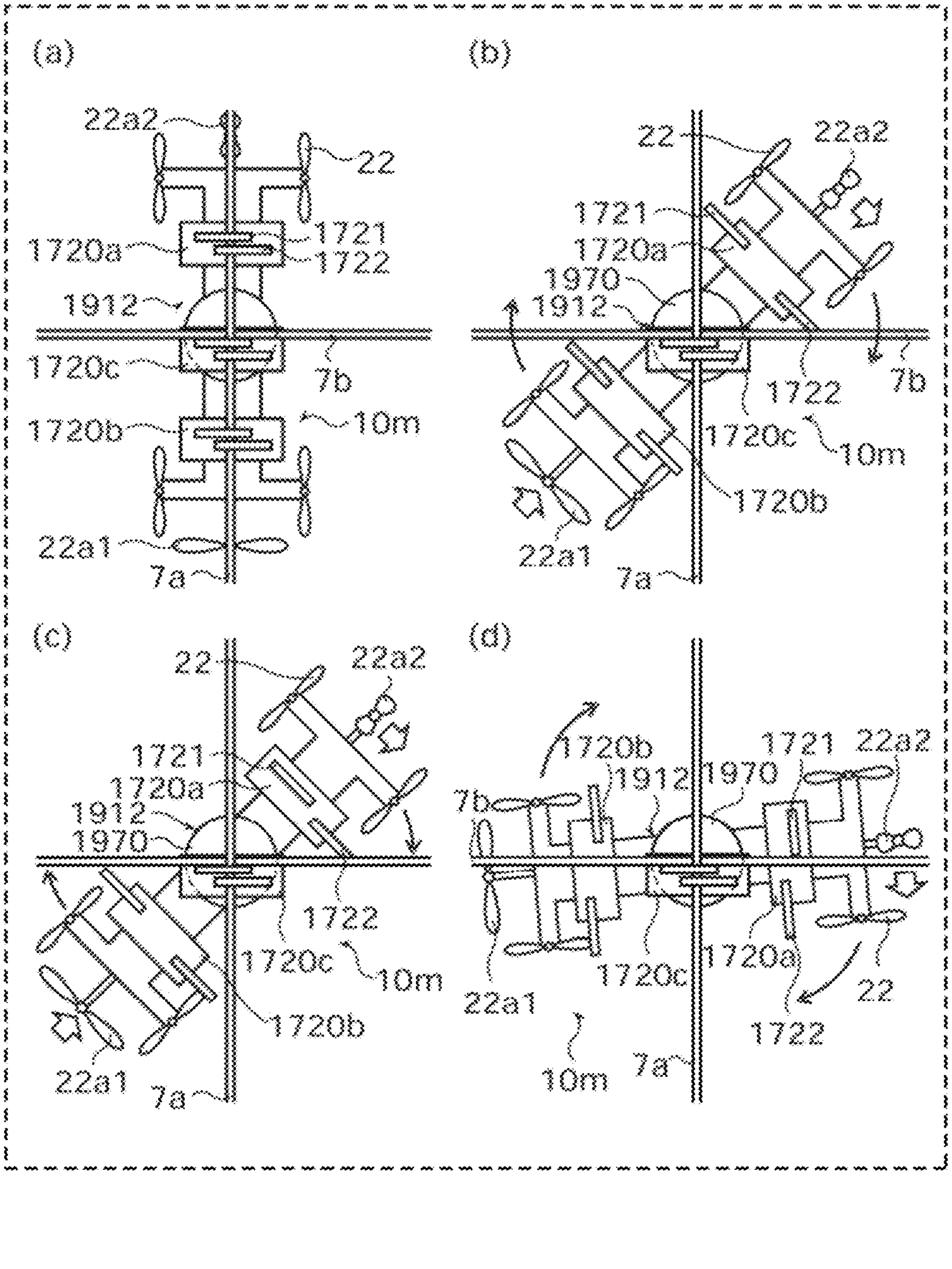
FIG. 63 is a schematic diagram illustrating an example of the operations illustrated in FIG. 62 that are performed by the unmanned aerial vehicle.

FIG. 62 is a flowchart illustrating an example of operations performed when vehicle main body 1912 of unmanned aerial vehicle 10*m* according to Embodiment 8 rotates. FIG. 63 is a schematic diagram illustrating an example of the operations illustrated in FIG. 62 that are performed by unmanned aerial vehicle 10*m*.

As illustrated in FIG. 62 and FIG. 63, control processor 11 rotates side propeller 22*a*1 by controlling the rear third propeller actuation motor 22*a*3 (S1911). This causes unmanned aerial vehicle 10*m* to move forward.

Control processor 11 determines whether the distance between second rail 7*b* and third connector 1720*c* is less than a predetermined distance (S1912). If the distance between second rail 7*b* and third connector 1720*c* is greater than or equal to the predetermined distance (NO in S1912), control processor 11 returns to step S1911.

If the distance between second rail 7*b* and third connector 1720*c* is less than the predetermined distance (YES in S1912), control processor 11 determines whether there is a problem with the balance of the center of gravity (attitude) of vehicle main body 1912, that is, whether vehicle main body 1912 is inclined at a predetermined angle or more with respect to the horizontal plane (S1913). If vehicle main body 1912 is inclined at the predetermined angle or more with respect to the horizontal plane, that is, if there is a problem with the balance of the center of gravity (attitude) of vehicle main body 1912 (YES in S1913), control processor 11 corrects the attitude of vehicle main body 1912. More specifically, control processor 11 corrects the attitude of vehicle main body 1912 by rotating propellers 22 via the respective propeller control modules of vehicle main body 1912 so that vehicle main body 1912 is approximately parallel to the horizontal plane (S1914). Processing then returns to step S1913.

When vehicle main body 1912 is inclined at less than the predetermined angle with respect to the horizontal plane, that is, when there is no problem with the balance of the center of gravity (attitude) of vehicle main body 1912 (NO in S1913), control processor 11 opens first connector 1720*a* and second connector 1720*b*. Control processor 11 then rotates side propellers 22*a*1 and 22*a*2 by controlling the respective front and rear third propeller actuation motors 22*a*3 (S1915). This causes unmanned aerial vehicle 10*m* to rotate approximately about third connector 1720*c* so that third connector 1720*c* is held by second rail 7*b*.

Control processor 11 determines whether the angle of rotation of vehicle main body 1912 has reached 45° (S1916). The angle of rotation is the angle in the lengthwise direction in which vehicle main body 1912 has rotated relative to the lengthwise direction of the state of vehicle main body 1912 at the time vehicle main body 1912 begins to rotate.

Control processor 11 returns to step S1915 if the angle of rotation of vehicle main body 1912 has not reached 45° (NO in S1916). When the angle of rotation of vehicle main body 1912 reaches 45° (YES in S1916), control processor 11 pivots first hook 1721 of first connector 1720*a* (S1917). At this time, rail 7 and first hook 1721 of first connector 1720*a* will not contact each other even if vehicle main body 1912 rotates.

Control processor 11 determines whether the angle of rotation of vehicle main body 1912 has reached 80° (S1918).

Control processor 11 returns to step S1918 if the angle of rotation of vehicle main body 1912 has not reached 80° (NO in S1918). At this time, control processor 11 rotates vehicle main body 1912 by rotating the side propellers 22*a*1 and 22*a*2. When the angle of rotation of vehicle main body 1912 reaches 80° (YES in S1918), control processor 11 pivots first hook 1721 of first connector 1720*a* until it is in a half-closed state (S1919), and the processing proceeds to B in FIG. 64. The half-closed state is when first hook 1721 can hook onto rail 7 and second hook 1722 is open.

Figure 64:
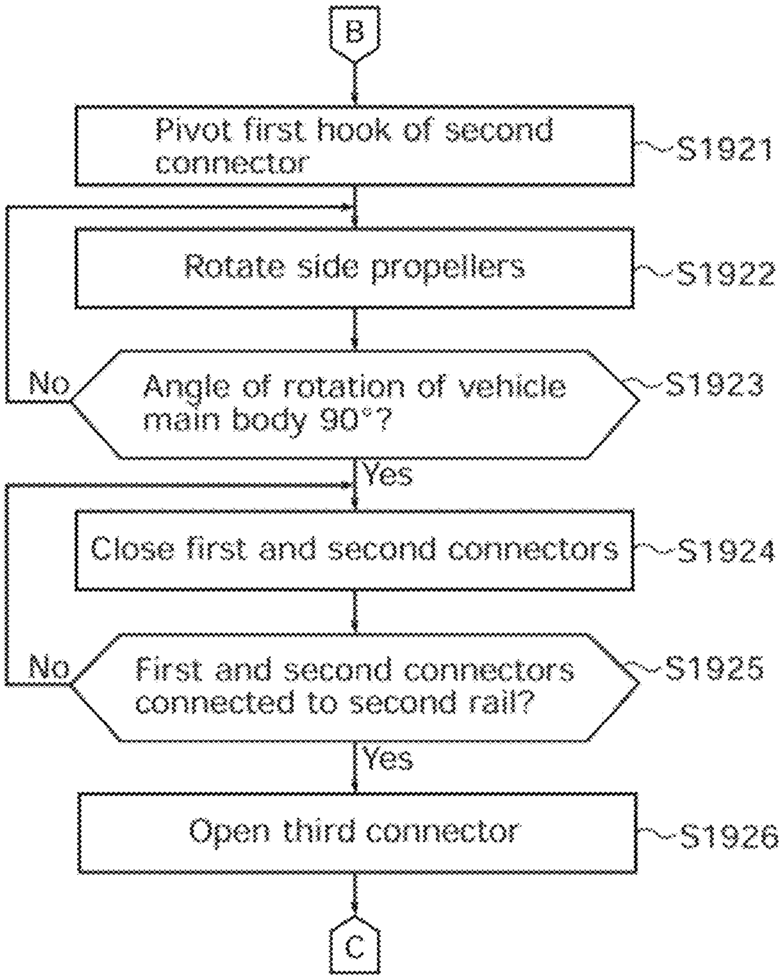
FIG. 64 is a flowchart illustrating an example of the operations performed by the unmanned aerial vehicle according to Embodiment 8 when a first connector and a second connector are connected to the second rail and subsequently a third connector is disconnected from the first rail.
Figure 65:
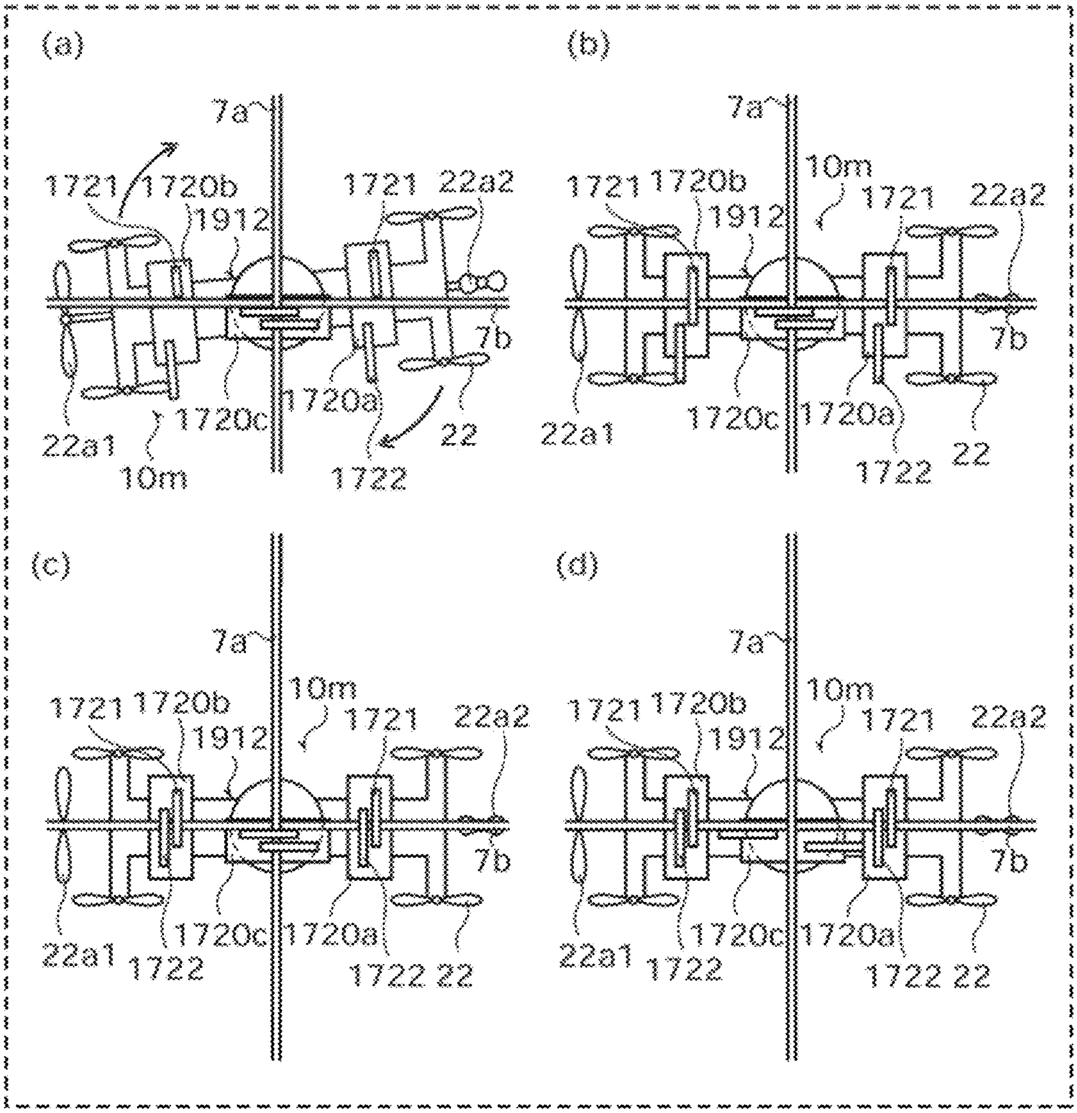
FIG. 65 is a schematic diagram illustrating an example of the operations illustrated in FIG. 64 that are performed by the unmanned aerial vehicle.

FIG. 64 is a flowchart illustrating an example of the operations performed by unmanned aerial vehicle 10*m* according to Embodiment 8 when first connector 1720*a* and second connector 1720*b* are connected to second rail 7*b* and subsequently the third connector is disconnected from first rail 7*a*. FIG. 65 is a schematic diagram illustrating an example of the operations illustrated in FIG. 64 that are performed by unmanned aerial vehicle 10*m*.

As illustrated in FIG. 64 and FIG. 65, control processor 11 pivots first hook 1721 of second connector 1720*b* (S1921). At this time, first and second rails 7*a* and 7*b* and first hook 1721 of second connector 1720*b* will not contact each other even if vehicle main body 1912 rotates.

Control processor 11 then rotates side propellers 22*a*1 and 22*a*2 by controlling the rear third propeller actuation motors 22*a*3 (S1922). This causes unmanned aerial vehicle 10*m* to rotate approximately about third connector 1720*c*.

Control processor 11 determines whether the angle of rotation of vehicle main body 1912 has reached 90° (S1923).

Control processor 11 returns to step S1923 if the angle of rotation of vehicle main body 1912 has not reached 90° (NO in S1922). At this time, control processor 11 rotates vehicle main body 1912 by rotating the side propellers 22*a*1 and 22*a*2 to adjust the angle of rotation. When the angle of rotation of vehicle main body 1912 reaches 90° (YES in S1923), control processor 11 closes first connector 1720*a* and second connector 1720*b* (S1924). Stated differently, control processor 11 pivots second hooks 1722 of first connector 1720*a* and second connector 1720*b* to close first connector 1720*a* and second connector 1720*b*.

Control processor 11 determines whether the closed first connector 1720*a* and second connector 1720*b* have connected to second rail 7*b* (S1925). If the closed first connector 1720*a* and second connector 1720*b* are not connected to second rail 7*b* (NO in S1925), control processor 11 corrects the attitude of vehicle main body 1912 by rotating side propellers 22*a*1 and 22*a*2, and/or corrects the attitude of vehicle main body 1912 to an attitude that allows for first connector 1720*a* and second connector 1720*b* to connect to second rail 7*b* by opening first connector 1720*a* and second connector 1720*b*, and then returns the process to step S1924. If the closed first connector 1720*a* and second connector 1720*b* have connected to second rail 7*b* (YES in S1925), control processor 11 opens third connector 1720*c* (S1926). The processing then proceeds to C in FIG. 66.

Figure 66:
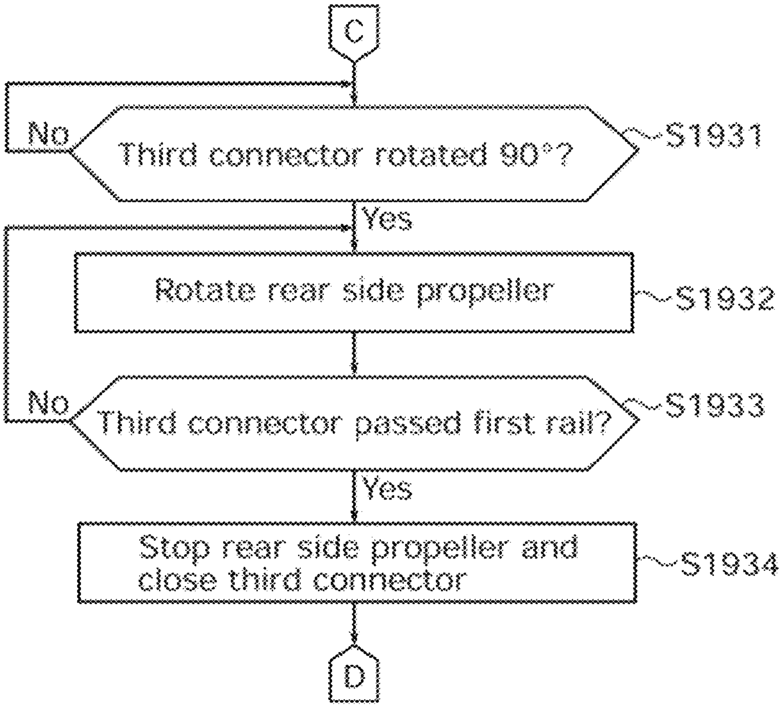
FIG. 66 is a flowchart illustrating an example of operations performed when connecting the third connector of the unmanned aerial vehicle according to Embodiment 8 to the second rail.
Figure 67:
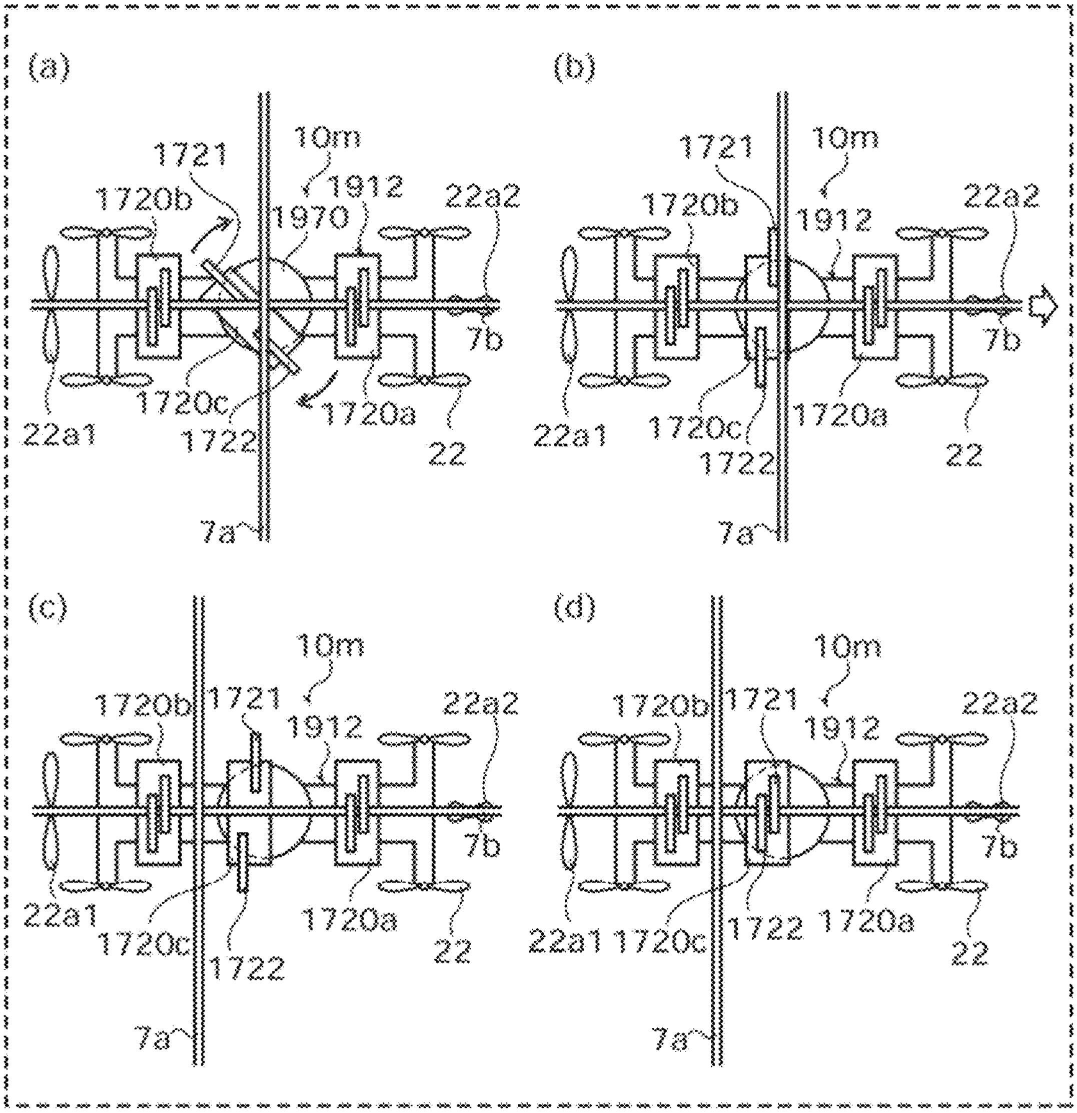
FIG. 67 is a schematic diagram illustrating an example of the operations illustrated in FIG. 66 that are performed by the unmanned aerial vehicle.

FIG. 66 is a flowchart illustrating an example of operations performed when connecting third connector 1720*c* of unmanned aerial vehicle 10*m* according to Embodiment 8 to second rail 7*b*. FIG. 67 is a schematic diagram illustrating an example of the operations illustrated in FIG. 66 that are performed by unmanned aerial vehicle 10*m*.

As illustrated in FIG. 66 and FIG. 67, when third connector 1720*c* is open, in connector support portion 1970, first fixed portion 1971 is pivoted by tension springs 1919*a* and 1919*b* relative to vehicle main body 1912, which is fixedly holding second fixed portion 1972. This puts first connector 1720*a*, second connector 1720*b*, and third connector 1720*c* in attitudes that enable connection to second rail 7*b*. Stated differently, control processor 11 determines whether the open third connector 1720*c* has rotated or not to determine whether the openings of first hook 1721 and second hook 1722 of the first, second and third connectors 1720*a*, 1720*b* and 1720*c*, respectively, are in an intersecting attitude with second rail 7*b*. Since first rail 7*a* and second rail 7*b* are arranged orthogonally to each other in the present embodiment, control processor 11 determines whether the angle of rotation of the open third connector 1720*c* has rotated 90° (S1931).

If the open third connector 1720*c* has not rotated approximately 90° (NO in S1931), control processor 11 performs the same process until third connector 1720*c* has. Although the angle to which third connector 1720*c* rotates is exemplified as 90°, the angle is not limited to 90° and may be less than 90°. The angle to be determined in step S1931 may depend on the angle between first rail 7*a* and second rail 7*b*. Control processor 11 may also rotate third connector 1720*c* by controlling a motor or the like.

If the open third connector 1720*c* has rotated approximately 90° (YES in S1931), control processor 11 rotates side propeller 22*a*1 by controlling the rear third propeller actuation motor 22*a*3 (S1932). This causes unmanned aerial vehicle 10*m* to move forward.

Control processor 11 determines whether third connector 1720*c* has passed vertically below first rail 7*a* (S1933).

If third connector 1720*c* has not passed vertically below first rail 7*a* (NO in S1933), control processor 11 returns the process to step S1932. If third connector 1720*c* has passed vertically below first rail 7*a* (YES in S1933), control processor 11 stops rotation of side propeller 22*a*1 by controlling the rear third propeller actuation motor 22*a*3. This causes unmanned aerial vehicle 10*m* to stop traveling. Control processor 11 also pivots first hook 1721 and second hook 1722 of third connector 1720*c* to close third connector 1720*c* (S1934). The processing then proceeds to D in FIG. 68.

Figure 68:
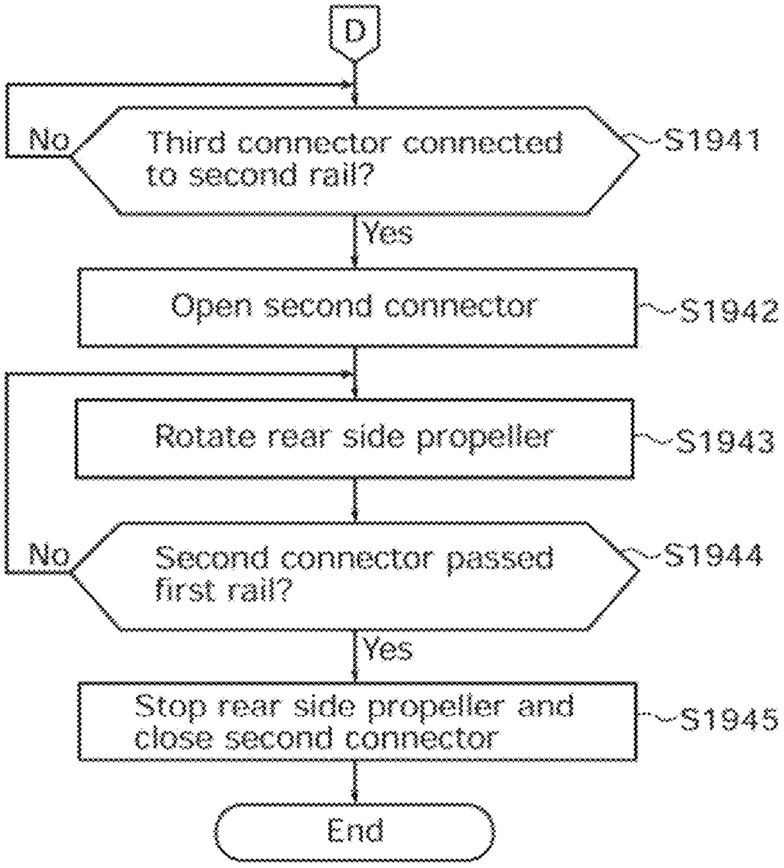
FIG. 68 is a flowchart illustrating an example of operations performed when a second connector of the unmanned aerial vehicle according to Embodiment 8 passes a first rail.
Figure 69:
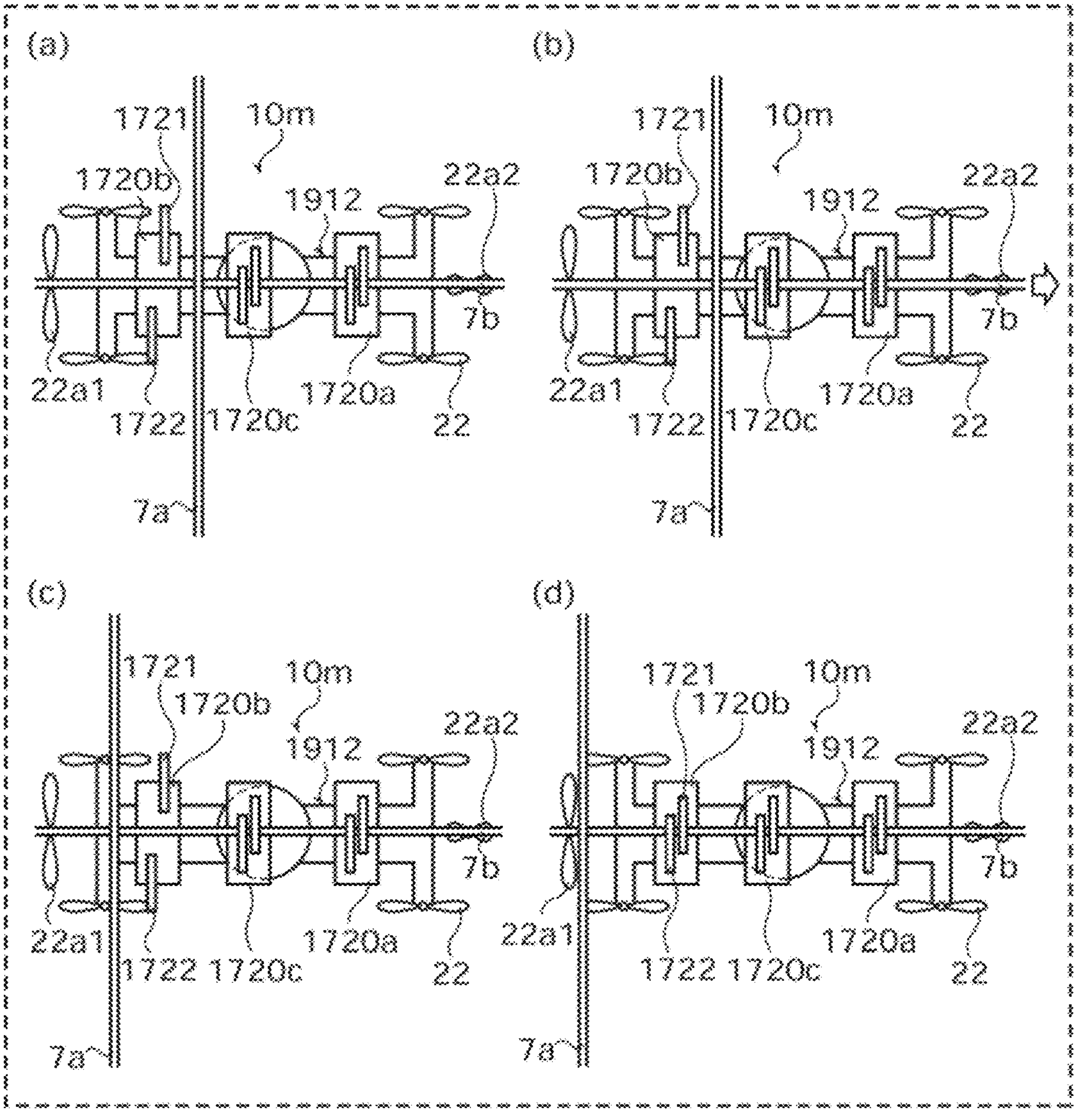
FIG. 69 is a schematic diagram illustrating an example of the operations illustrated in FIG. 68 that are performed by the unmanned aerial vehicle.

FIG. 68 is a flowchart illustrating an example of operations performed when second connector 1720*b* of unmanned aerial vehicle 10*m* according to Embodiment 8 passes first rail 7*a*. FIG. 69 is a schematic diagram illustrating an example of the operations illustrated in FIG. 68 that are performed by unmanned aerial vehicle 10*m*.

As illustrated in FIG. 68 and FIG. 69, control processor 11 determines whether the closed third connector 1720*c* is connected to second rail 7*b* (S1941). If the closed third connector 1720*c* is not connected to second rail 7*b* (NO in S1941), control processor 11 corrects the attitude of vehicle main body 1912 by rotating side propellers 22*a*1 and 22*a*2, and/or corrects the attitude of vehicle main body 1912 to an attitude that allows for third connector 1720*c* to connect to second rail 7*b* by opening third connector 1720*c*, and then returns the process to step S1941. If the closed third connector 1720*c* has connected to second rail 7*b* (YES in S1941), control processor 11 opens second connector 1720*b* (S1942).

Control processor 11 then rotates side propeller 22*a*1 by controlling the rear third propeller actuation motor 22*a*3 (S1943). This causes unmanned aerial vehicle 10*m* to move forward.

Control processor 11 determines whether second connector 1720*b* has passed vertically below first rail 7*a* (S1944).

If second connector 1720*b* has not passed vertically below first rail 7*a* (NO in S1944), control processor 11 returns the process to step S1943. If second connector 1720*b* has passed vertically below first rail 7*a* (YES in S1944), control processor 11 stops rotation of side propeller 22*a*1 by controlling the rear third propeller actuation motor 22*a*3. This causes unmanned aerial vehicle 10*m* to stop traveling. Control processor 11 also pivots first hook 1721 and second hook 1722 of second connector 1720*b* to close second connector 1720*b* (S1945), whereby second connector 1720*b* is connected to second rail 7*b*.

In this way, unmanned aerial vehicle 10*m* can change course from first rail 7*a* to second rail 7*b*.

Operation Example 2

Next, an example will be given in which unmanned aerial vehicle 10*m* traveling on first rail 7*a* changes direction at the intersection of first rail 7*a* and second rail 7*b*, and turns back along first rail 7*a* that it has been traveling on. Since the processes from S1901 through S1931 in Operation Example 1 described above are the same, repeated explanation is omitted, and the explanation is given starting from FIG. 70.

Figure 70:
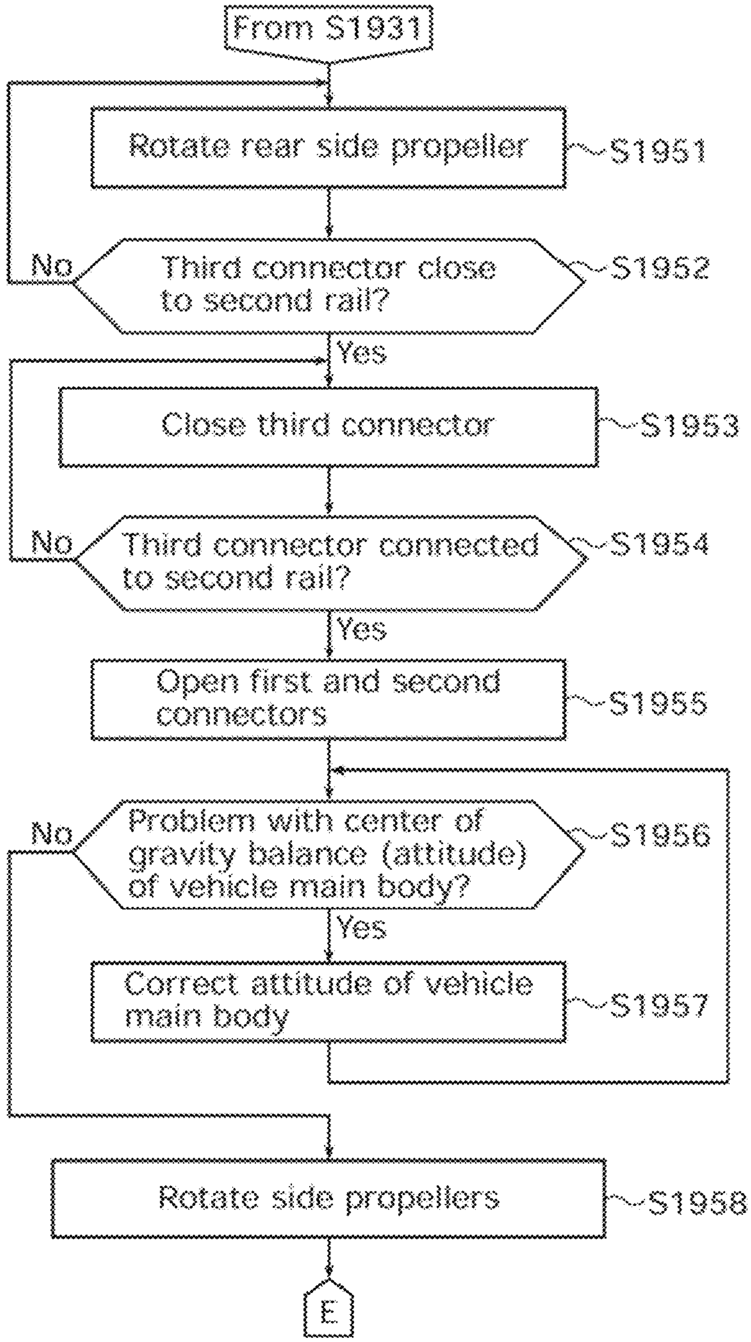
FIG. 70 is a flowchart illustrating an example of operations performed when the vehicle main body of the unmanned aerial vehicle further rotates when the unmanned aerial vehicle turns back at the intersection of the first rail and the second rail.
Figure 71:
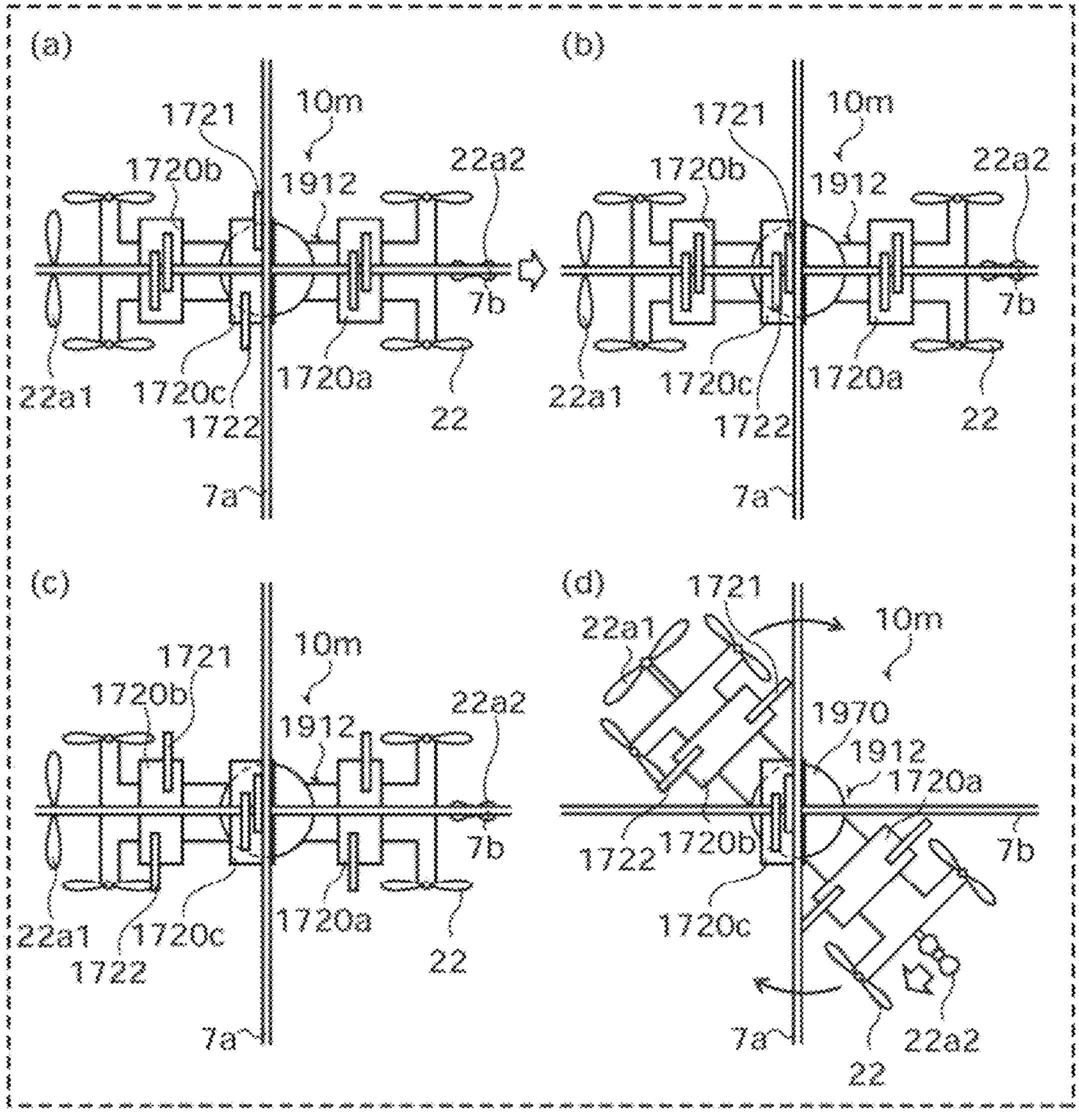
FIG. 71 is a schematic diagram illustrating an example of the operations illustrated in FIG. 70 that are performed by the unmanned aerial vehicle.

FIG. 70 is a flowchart illustrating an example of operations performed when vehicle main body 1912 of unmanned aerial vehicle 10*m* further rotates when unmanned aerial vehicle 10*m* turns back at the intersection of first rail 7*a* and second rail 7*b*. FIG. 71 is a schematic diagram illustrating an example of the operations illustrated in FIG. 70 that are performed by unmanned aerial vehicle 10*m*.

As illustrated in FIG. 70 and FIG. 71, control processor 11 rotates side propeller 22*a*1 by controlling the rear third propeller actuation motor 22*a*3 (S1951).

Control processor 11 determines whether second rail 7*b* and third connector 1720*c* are close to each other (S1952). Second rail 7*b* and third connector 1720*c* being close to each other includes second rail 7*b* and third connector 1720*c* contacting one another, and also includes, for example, being within a predetermined distance of each other. If second rail 7*b* and third connector 1720*c* are not close to each other (NO in S1952), control processor 11 returns to step S1951.

If second rail 7*b* and third connector 1720*c* are close to each other (YES in S1952), control processor 11 closes third connector 1720*c* (S1953).

Control processor 11 determines whether the closed third connector 1720*c* has connected to second rail 7*b* (S1954). If the closed third connector 1720*c* is not connected to second rail 7*b* (NO in S1954), control processor 11 corrects the attitude of vehicle main body 1912 by rotating side propellers 22*a*1 and 22*a*2, and/or corrects the attitude of vehicle main body 1912 to an attitude that allows for third connector 1720*c* to connect to second rail 7*b* by opening third connector 1720*c*, and then returns the process to step S1953. If the closed third connector 1720*c* has connected to second rail 7*b* (YES in S1954), control processor 11 opens first connector 1720*a* and second connector 1720*b* (S1955).

Control processor 11 determines whether there is a problem with the balance of the center of gravity (attitude) of vehicle main body 1912, that is, whether vehicle main body 1912 is inclined at a predetermined angle or more with respect to the horizontal plane (S1956). If vehicle main body 1912 is inclined at the predetermined angle or more with respect to the horizontal plane, that is, if there is a problem with the balance of the center of gravity (attitude) of vehicle main body 1912 (YES in S1956), control processor 11 corrects the attitude of vehicle main body 1912. More specifically, control processor 11 corrects the attitude of vehicle main body 1912 by rotating propellers 22 via the respective propeller control modules of vehicle main body

1912 so that vehicle main body 1912 is approximately parallel to the horizontal plane (S1957). Processing then returns to step S1956.

If vehicle main body 1912 is inclined at less than the predetermined angle with respect to the horizontal plane, that is, when there is no problem with the balance of the center of gravity (attitude) of vehicle main body 1912 (NO in S1956), control processor 11 rotates side propellers 22*a*1 and 22*a*2 by controlling the front and rear third propeller actuation motors 22*a*3 (S1958). This causes unmanned aerial vehicle 10*m* to rotate approximately about third connector 1720*c* so that third connector 1720*c* is held by first rail 7*a*. The processing then proceeds to E in FIG. 72.

Figure 72:
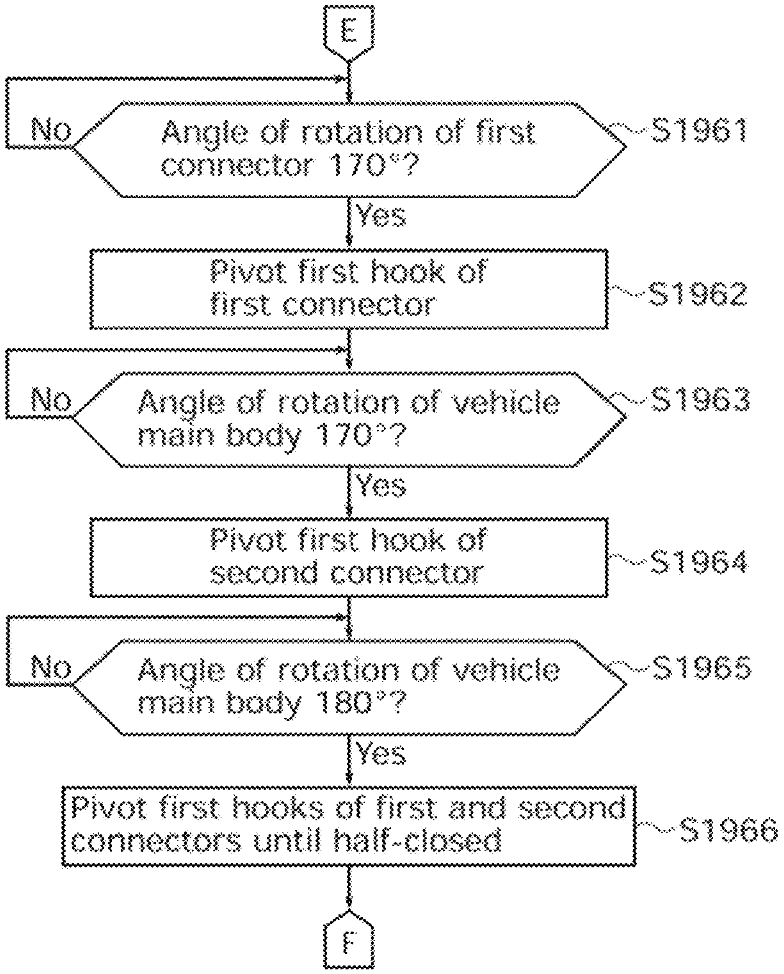
FIG. 72 is a flowchart illustrating an example of operations performed when connecting the first connector and the second connector to the first rail after the vehicle main body of the unmanned aerial vehicle has rotated when the unmanned aerial vehicle turns back at the intersection of the first rail and the second rail.
Figure 73:
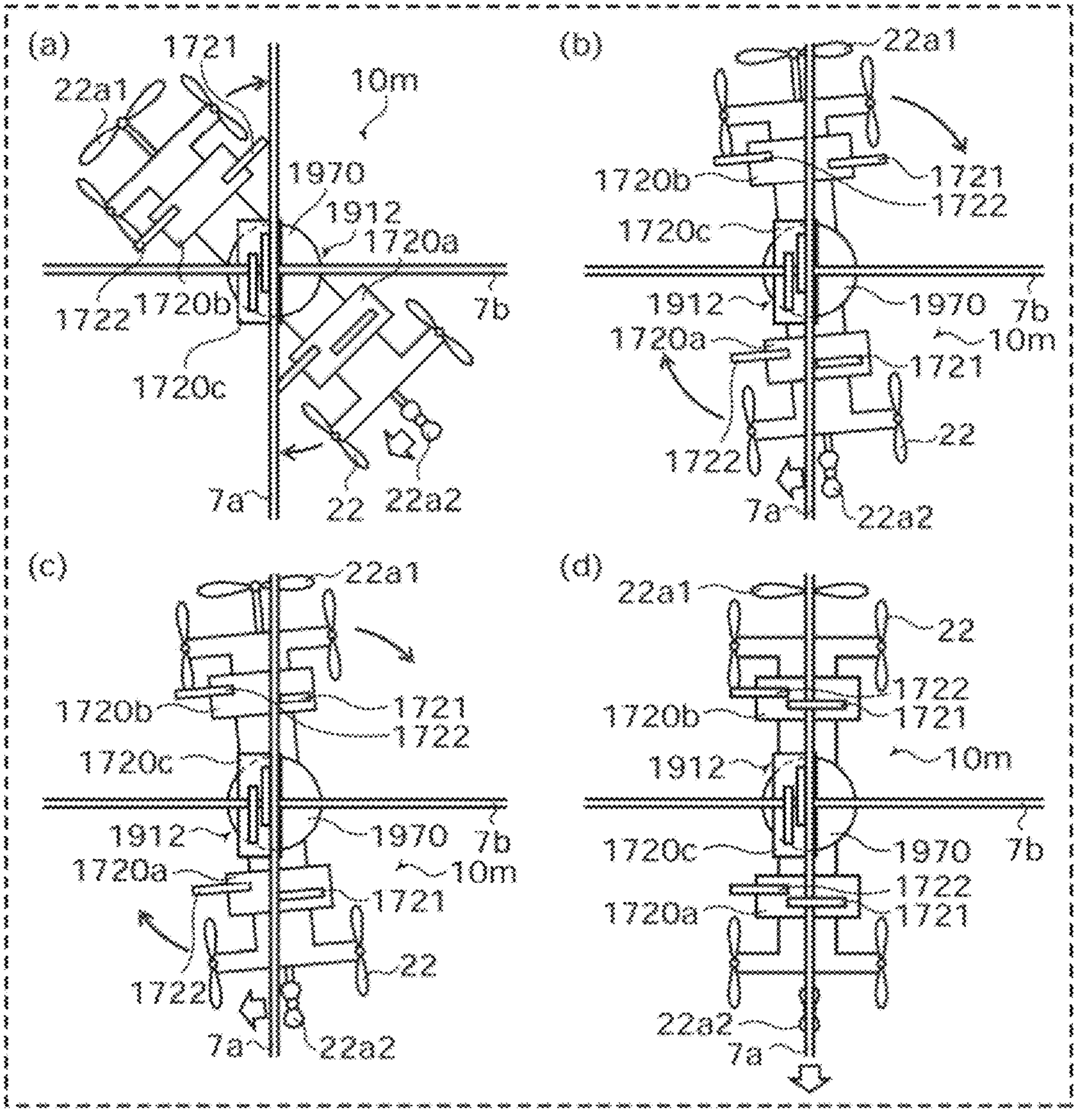
FIG. 73 is a schematic diagram illustrating an example of the operations illustrated in FIG. 72 that are performed by the unmanned aerial vehicle.

FIG. 72 is a flowchart illustrating an example of operations performed when connecting first connector 1720*a* and second connector 1720*b* to first rail 7*a* after vehicle main body 1912 of unmanned aerial vehicle 10*m* has rotated when unmanned aerial vehicle 10*m* turns back at the intersection of first rail 7*a* and second rail 7*b*. FIG. 73 is a schematic diagram illustrating an example of the operations illustrated in FIG. 72 that are performed by unmanned aerial vehicle 10*m*.

As illustrated in FIG. 72 and FIG. 73, control processor 11 determines whether the angle of rotation of vehicle main body 1912 has reached 170° (S1961).

Control processor 11 returns to step S1961 if the angle of rotation of vehicle main body 1912 has not reached 170° (NO in S1961), that is, if the angle of rotation is less than 170°. When the angle of rotation of vehicle main body 1912 reaches 170° (YES in S1961), control processor 11 pivots first hook 1721 of second connector 1720*b* (S1962). At this time, first rail 7*a* and first hook 1721 of first connector 1720*a* will not contact each other even if vehicle main body 1912 rotates.

Control processor 11 determines whether the angle of rotation of vehicle main body 1912 is 170° or greater (S1963).

Control processor 11 returns to step S1963 if the angle of rotation of vehicle main body 1912 is not 170° or greater (NO in S1963). At this time, control processor 11 rotates vehicle main body 1912 by rotating and adjusting the side propellers 22*a*1 and 22*a*2. When the angle of rotation of vehicle main body 1912 is 170° or greater (YES in S1963), control processor 11 pivots first hook 1721 of second connector 1720*b* (S1964). At this time, first rail 7*a* and first hook 1721 of second connector 1720*b* will not contact each other even if vehicle main body 1912 rotates.

Control processor 11 determines whether the angle of rotation of vehicle main body 1912 is 180° (S1965).

Control processor 11 returns to step S1965 if the angle of rotation of vehicle main body 1912 is not 180° (NO in S1965). At this time, control processor 11 rotates vehicle main body 1912 by rotating the side propellers 22*a*1 and 22*a*2. When the angle of rotation of vehicle main body 1912 reaches 180° (YES in S1965), control processor 11 pivots first hooks 1721 of first connector 1720*a* and second connector 1720*b* until it is in a half-closed state (S1966). The processing then proceeds to F in FIG. 74.

Figure 74:
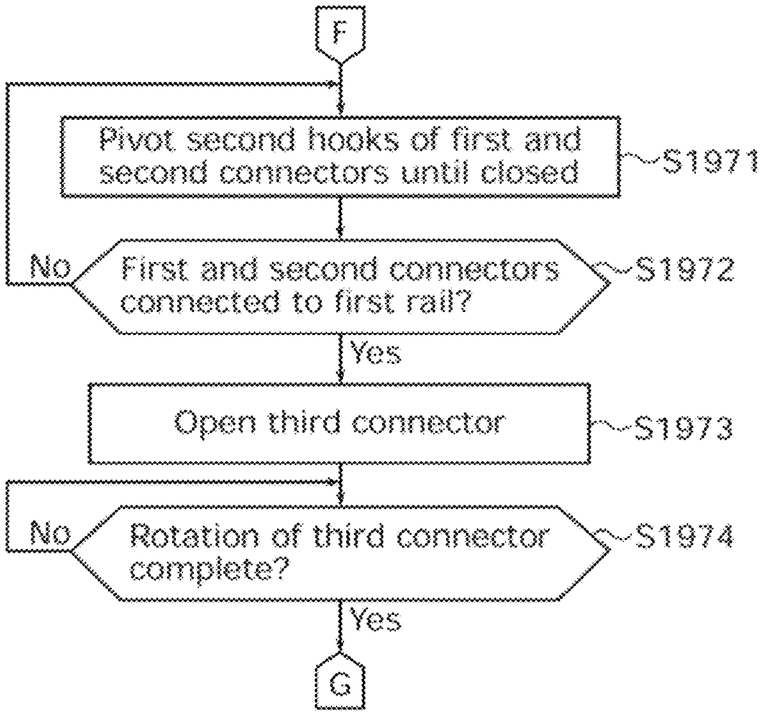
FIG. 74 is a flowchart illustrating an example of operations performed when disconnecting the third connector of the unmanned aerial vehicle from the second rail and causing the third connector to be eccentric, when the unmanned aerial vehicle turns back at the intersection of the first rail and the second rail.
Figure 75:
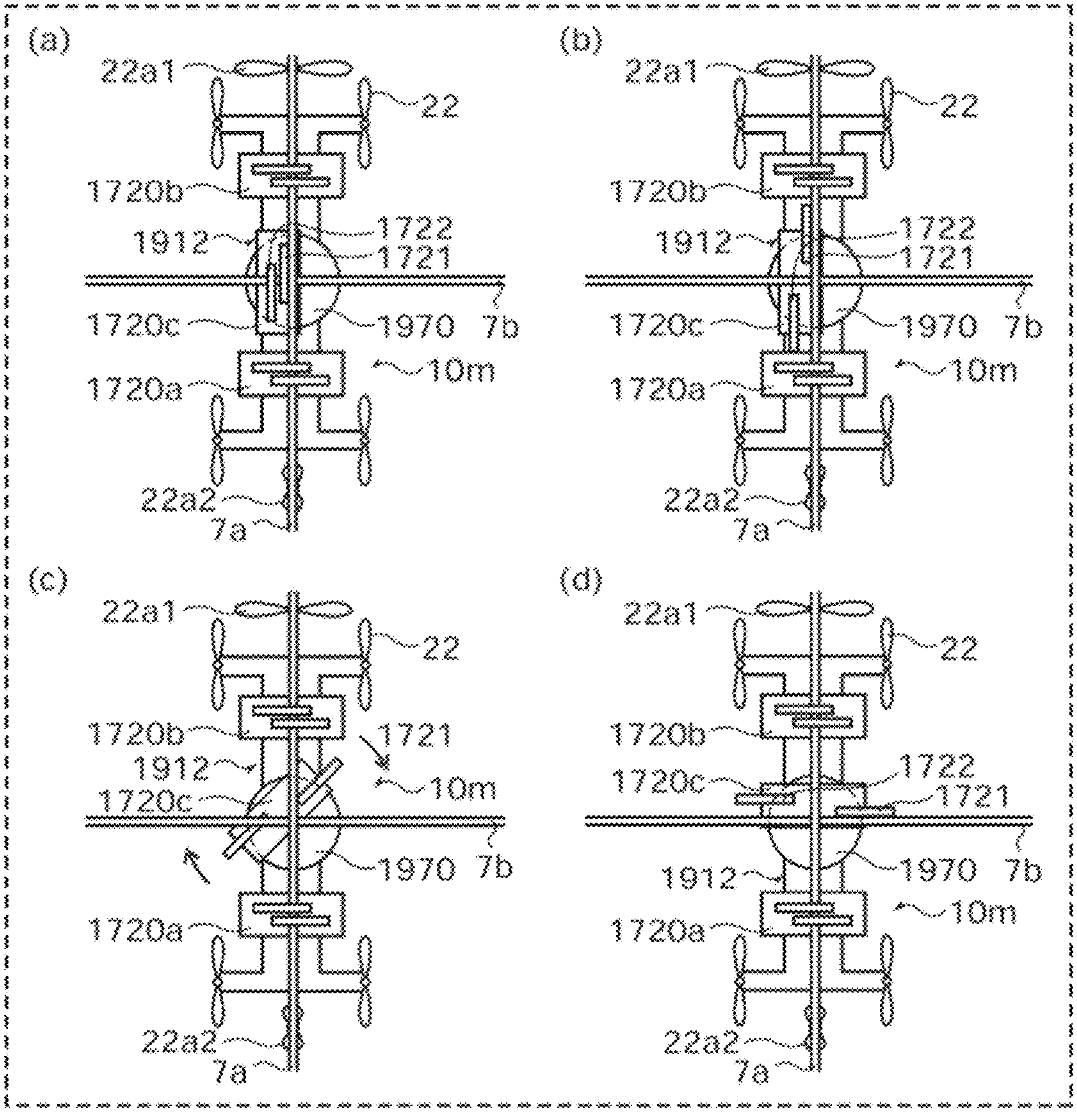
FIG. 75 is a schematic diagram illustrating an example of the operations illustrated in FIG. 74 that are performed by the unmanned aerial vehicle.

FIG. 74 is a flowchart illustrating an example of operations performed when disconnecting third connector 1720*c* of unmanned aerial vehicle 10*m* from second rail 7*b* and causing third connector 1720*c* to be eccentric, when unmanned aerial vehicle 10*m* turns back at the intersection of first rail 7*a* and second rail 7*b*. FIG. 75 is a schematic diagram illustrating an example of the operations illustrated in FIG. 74 that are performed by unmanned aerial vehicle 10*m*.

As illustrated in FIG. 74 and FIG. 75, control processor 11 pivots second hooks 1722 of first connector 1720*a* and second connector 1720*b* to close first connector 1720*a* and second connector 1720*b* (S1971).

Control processor 11 determines whether the closed first connector 1720*a* and second connector 1720*b* have connected to first rail 7*a* (S1972). If the closed first and second connectors 1720*a* and 1720*b* are not connected to first rail 7*a* (NO in S1972), control processor 11 corrects the attitude of vehicle main body 1912 by rotating side propellers 22*a*1 and 22*a*2, and/or corrects the attitude of vehicle main body 1912 to an attitude that allows for first and second connectors 1720*a* and 1720*b* to connect to first rail 7*a* by opening first and second connectors 1720*a* and 1720*b*, and then returns the process to step S1971. If the closed first connector 1720*a* and second connector 1720*b* have connected to first rail 7*a* (YES in S1972), control processor 11 opens third connector 1720*c* (S1973).

When third connector 1720*c* opens, first fixed portion 1971 is pivoted by tension springs 1919*a* and 1919*b* relative to vehicle main body 1912, which is fixedly holding second fixed portion 1972. This puts first connector 1720*a*, second connector 1720*b*, and third connector 1720*c* in attitudes that enable connection to first rail 7*a*. Stated differently, control processor 11 determines whether the open third connector 1720*c* has rotated or not to determine whether the openings of first hook 1721 and second hook 1722 of the first, second and third connectors 1720*a*, 1720*b* and 1720*c*, respectively, are in an intersecting attitude with first rail 7*a*. In the present embodiment, control processor 11 determines whether the open third connector 1720*c* has rotated (S1974).

If the open third connector 1720*c* has not rotated approximately 90° (NO in S1974), control processor 11 performs the same process until third connector 1720*c* has. Although the angle to which third connector 1720*c* rotates is exemplified as 90°, the angle is not limited to 90° and may be less than 90°. The angle to be determined in step S1974 may depend on the angle between first rail 7*a* and second rail 7*b*.

Figure 76:
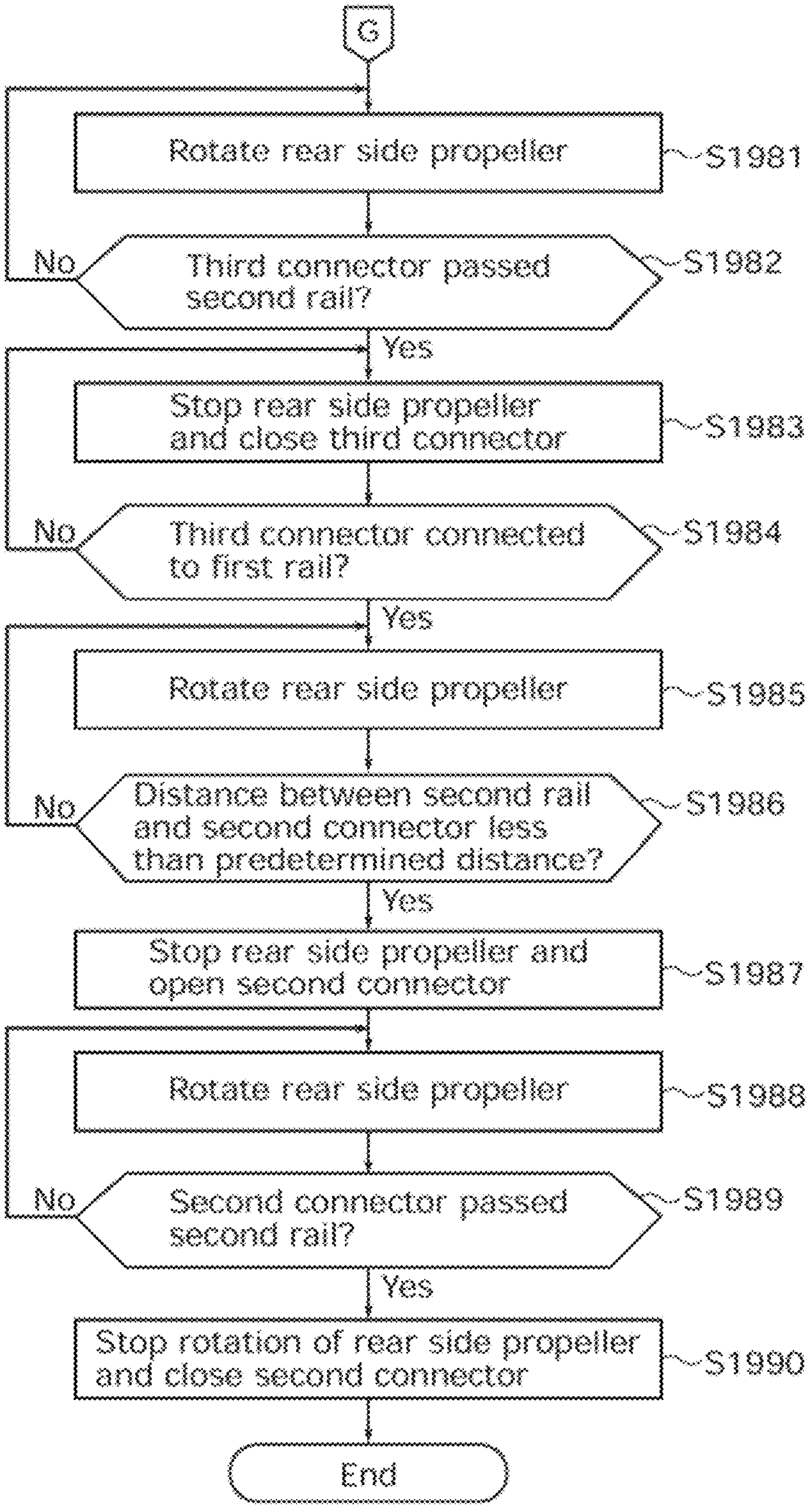
FIG. 76 is a flowchart illustrating an example of operations performed when, after the third connector of the unmanned aerial vehicle is connected to the first rail, the second connector is disconnected from the first rail and the second connector, which has passed the first rail, connects to the first rail, when the unmanned aerial vehicle turns back at the intersection of the first rail and the second rail.

When the opened third connector 1720*c* has rotated approximately 90° (YES in S1974), control processor 11 proceeds to G in FIG. 76.

Figure 77:
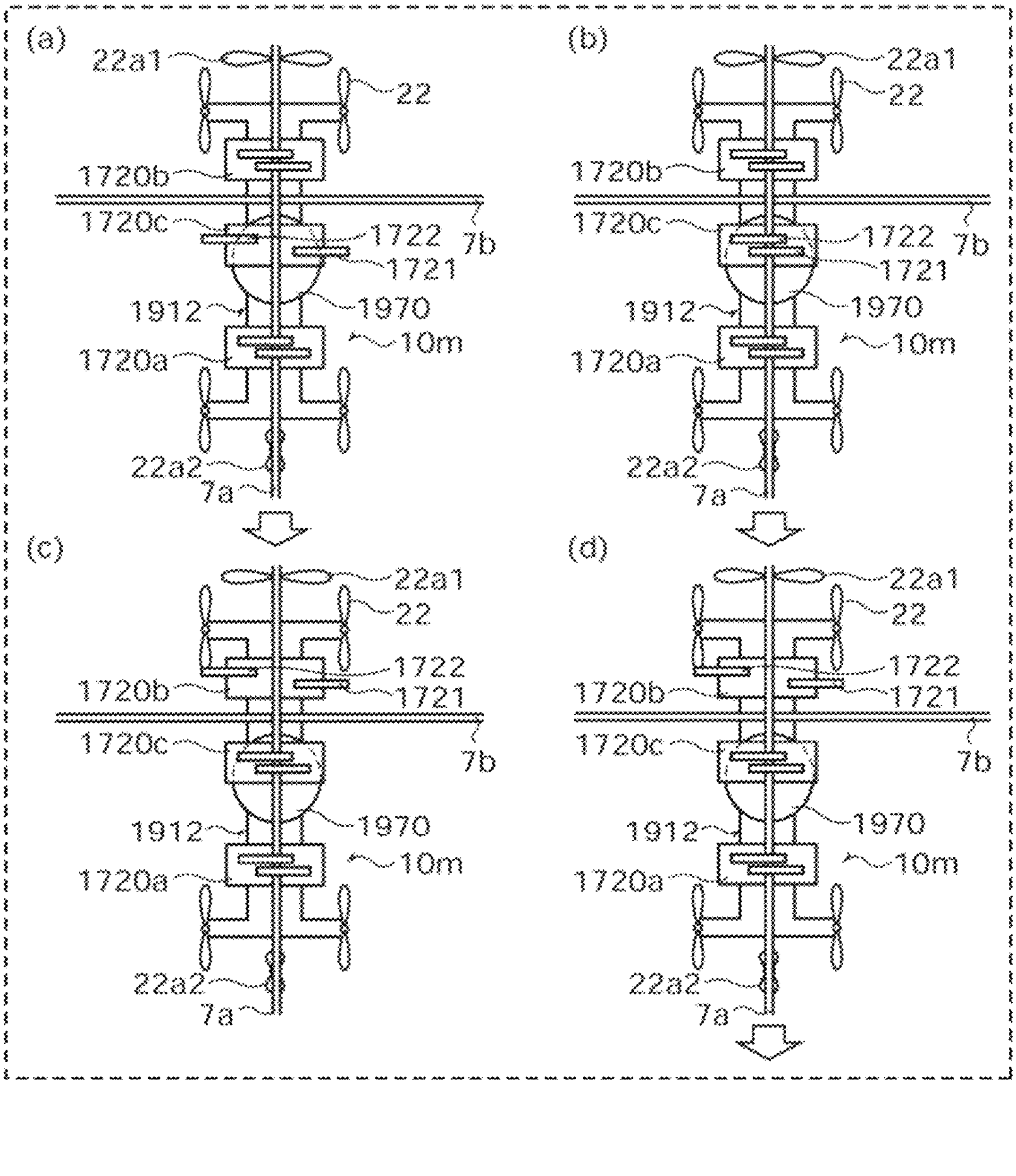
FIG. 77 is a schematic diagram illustrating an example of the operations illustrated in FIG. 76 that are performed by the unmanned aerial vehicle.
Figure 78:
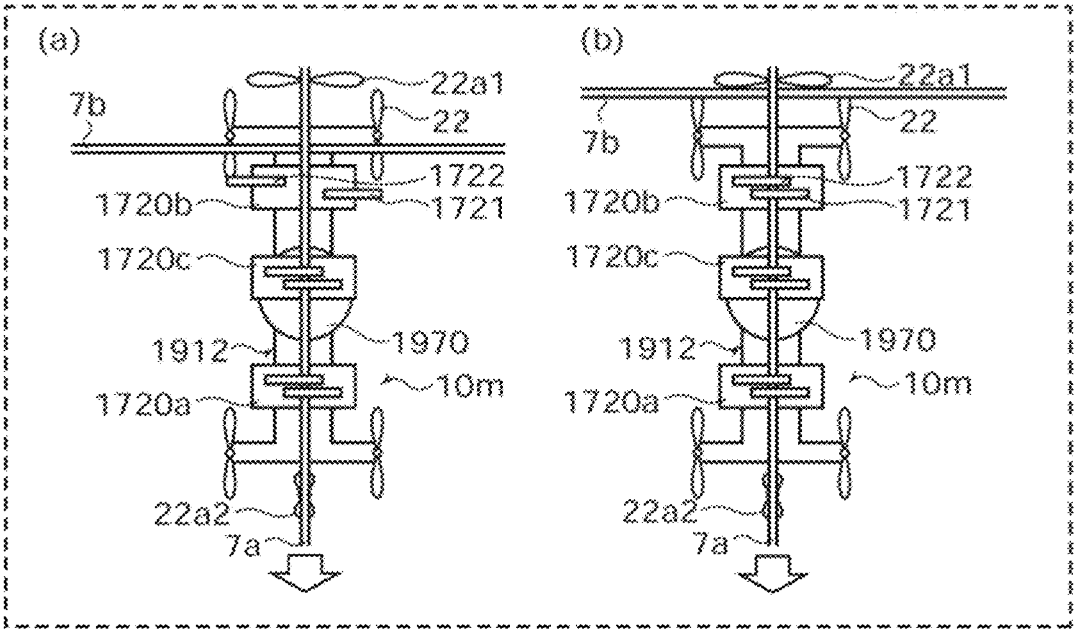
FIG. 78 is a schematic diagram illustrating an example of the operations illustrated in FIG. 76 that are performed by the unmanned aerial vehicle.

FIG. 76 is a flowchart illustrating an example of operations performed when, after third connector 1720*c* of unmanned aerial vehicle 10*m* is connected to first rail 7*a*, second connector 1720*b* is disconnected from first rail 7*a* and second connector 1720*b*, which has passed first rail 7*a*, connects to first rail 7*a*, when unmanned aerial vehicle 10*m* turns back at the intersection of first rail 7*a* and second rail 7*b*. FIG. 77 is a schematic diagram illustrating an example of the operations illustrated in FIG. 76 that are performed by unmanned aerial vehicle 10*m*. FIG. 78 is a schematic diagram illustrating an example of the operations illustrated in FIG. 76 that are performed by unmanned aerial vehicle 10*m*.

As illustrated in FIG. 76 through FIG. 78, control processor 11 rotates side propeller 22*a*1 by controlling the rear third propeller actuation motor 22*a*3 (S1981). This causes unmanned aerial vehicle 10*m* to move forward.

Control processor 11 determines whether third connector 1720*c* has passed vertically below second rail 7*b* (S1982).

If third connector 1720*c* has not passed vertically below second rail 7*b* (NO in S1982), control processor 11 returns the process to step S1981. If third connector 1720*c* has passed vertically below second rail 7*b* (YES in S1982), control processor 11 stops rotation of side propeller 22*a*1 by controlling the rear third propeller actuation motor 22*a*3. This causes unmanned aerial vehicle 10*m* to stop traveling.

Control processor 11 also pivots first hook 1721 and second hook 1722 of third connector 1720*c* to close third connector 1720*c* (S1983).

Control processor 11 determines whether the closed third connector 1720*c* has connected to first rail 7*a* (S1984). If the closed third connector 1720*c* is not connected to first rail 7*a* (NO in S1984), control processor 11 corrects the attitude of vehicle main body 1912 by rotating side propellers 22*a*1 and 22*a*2, and/or corrects the attitude of vehicle main body 1912 to an attitude that allows for third connector 1720*c* to connect to first rail 7*a* by opening third connector 1720*c*, and then returns the process to step S1983. If the closed third connector 1720*c* has connected to first rail 7*a* (YES in S1984), control processor 11 rotates side propeller 22*a*1 by controlling the rear third propeller actuation motor 22*a*3 (S1985). This causes unmanned aerial vehicle 10*m* to move forward.

Control processor 11 determines whether the distance between second rail 7*b* and second connector 1720*b* is less than a predetermined distance (S1986). If the distance between second rail 7*b* and second connector 1720*b* is greater than or equal to the predetermined distance (NO in S1986), control processor 11 returns to step S1985.

If the distance between second rail 7*b* and second connector 1720*b* is less than the predetermined distance (YES in S1986), control processor 11 stops rotation of side propeller 22*a*1 (S1987) by controlling the rear third propeller actuation motor 22*a*3. This causes unmanned aerial vehicle 10*m* to stop traveling. Control processor 11 also pivots first hook 1721 and second hook 1722 of second connector 1720*b* to open second connector 1720*b* (S1987).

Control processor 11 then rotates side propeller 22*a*1 by controlling the rear third propeller actuation motor 22*a*3 (S1988). This causes unmanned aerial vehicle 10*m* to move forward.

Control processor 11 determines whether second connector 1720*b* has passed vertically below second rail 7*b* (S1989).

If second connector 1720*b* has not passed vertically below second rail 7*b* (NO in S1989), control processor 11 returns the process to step S1988. If second connector 1720*b* has passed vertically below second rail 7*b* (YES in S1989), control processor 11 stops rotation of side propeller 22*a*1 by controlling the rear third propeller actuation motor 22*a*3 (S1990). This causes unmanned aerial vehicle 10*m* to stop traveling. Control processor 11 also pivots first hook 1721 and second hook 1722 of second connector 1720*b* to close second connector 1720*b* (S1990).

Operation Example 3

Next, an example of the movement of connector support portion 1970, first connector 1720*a*, second connector 1720*b*, and third connector 1720*c* when unmanned aerial vehicle 10*m* connected to first rail 7*a* changes its connection point from first rail 7*a* to second rail 7*b* will be given.

Figure 79:
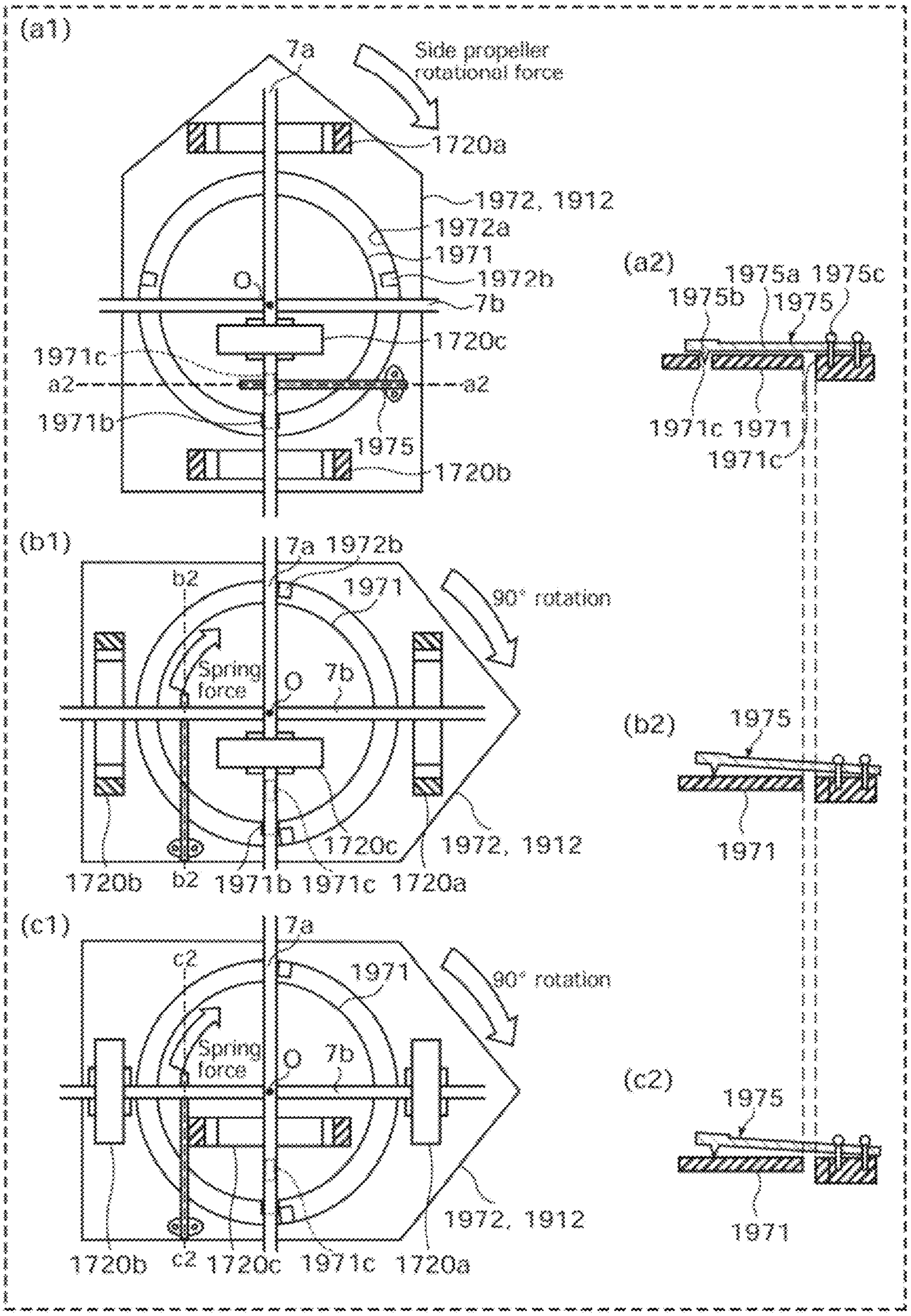
FIG. 79 includes a schematic diagram illustrating an example of the connector support portion and the ratchet when the unmanned aerial vehicle has rotated, and a cross-sectional view of a cross section of the connector support portion and the ratchet.

FIG. 79 includes a schematic diagram illustrating an example of connector support portion 1970 and ratchet 1975 when unmanned aerial vehicle 10*m* has rotated, and a cross-sectional view of a cross section of connector support portion 1970 and ratchet 1975.

In FIG. 79, (a1), (b1), and (c1) illustrate examples the relationship between vehicle main body 1912 of unmanned aerial vehicle 10*m* and first and second fixed portions 1971 and 1972 fixed to vehicle main body 1912, and the relationship between first connector 1720*a*, second connector 1720*b*, third connector 1720*c*, first rail 7*a*, and second rail 7*b*. In FIG. 79, (a2) is a cross-sectional view of ratchet 1975 and first fixed portion 1971 and the like taken at line a2-a2 in (a1) in FIG. 79, (b2) is a cross-sectional view of ratchet 1975 and first fixed portion 1971 and the like taken at line b2-b2 in (b1) in FIG. 79, and (c2) is a cross-sectional view of ratchet 1975 and first fixed portion 1971 and the like taken at line c2-c2 in (c1) in FIG. 79. The same applies to FIG. 81 and subsequent figures, so these explanations are omitted. Note that (a1), (b1), and (c1) in FIG. 79 correspond to FIG. 63 and FIG. 65.

As illustrated in (a1) in FIG. 79, control processor 11 opens first and second connectors 1720*a* and 1720*b* and rotates side propellers 22*a*1 and 22*a*2. As illustrated in (a2) in FIG. 79, before vehicle main body 1912 rotates around center point O, i.e., the center point of first fixed portion 1971, engagement receiving portion 1975*b* of ratchet 1975 is engaged with engagement portion 1971*c* of first fixed portion 1971.

When vehicle main body 1912 rotates around center point O, as illustrated in (b2) in FIG. 79, the rotational force of second fixed portion 1972 fixed to vehicle main body 1912 pushes up engagement receiving portion 1975*b* of ratchet 1975 in connector support portion 1970, causing engagement receiving portion 1975*b* to separate from engagement portion 1971*c* of first fixed portion 1971. When vehicle main body 1912 rotates, since plate spring 1975*a* of ratchet 1975 is fixed at its other end by fastening portion 1975*c* and is biased, engagement receiving portion 1975*b* of ratchet 1975 is pressed against the upper surface of first fixed portion 1971 and the rotation of vehicle main body 1912 causes first engagement receiving portion 1975*b* of ratchet 1975 to slide on the upper surface of first fixed portion 1971. As illustrated in (b2) in FIG. 79, when second fixed portion 1972 rotates together with vehicle main body 1912 by approximately 90°, rotation stopping portion 1972*b* of second fixed portion 1972 contacts rotation stopping portion 1971*b* of first fixed portion 1971, thereby restricting the rotation of second fixed portion 1972 and thus the rotation of vehicle main body 1912. Vehicle main body 1912 of unmanned aerial vehicle 10*m* then rotates while third connector 1720*c* is connected to first rail 7*a*.

As illustrated in (c1) in FIG. 79, if the closed first connector 1720*a* and second connector 1720*b* have connected to second rail 7*b*, control processor 11 opens third connector 1720*c*. As illustrated in (c2) in FIG. 79, the state of ratchet 1975 is the same as in (b2) in FIG. 79.

First fixed portion 1971 is pulled so as to rotate clockwise by front and rear tension springs 1919*a* and 1919*b*. As illustrated in (c1) in FIG. 79, when third connector 1720*c* is open, first fixed portion 1971 is rotated by front and rear tension springs 1919*a* and 1919*b* relative to vehicle main body 1912, which fixedly holds second fixed portion 1972. As illustrated in (a2) in FIG. 79, when first fixed portion 1971 rotates 90°, after sliding on the upper surface of engagement receiving portion 1975*b* of ratchet 1975, engagement receiving portion 1975*b* of ratchet 1975 engages engagement portion 1971*c* of first fixed portion 1971, thereby inhibiting the rotation of first fixed portion 1971 relative to second fixed portion 1972. Therefore, as illustrated in (a1) in FIG. 81, third connector 1720*c* is eccentric by 90° about center point O with the rotation of first fixed portion 1971, and is in an attitude that enables connection to second rail 7*b*.

Figure 81:
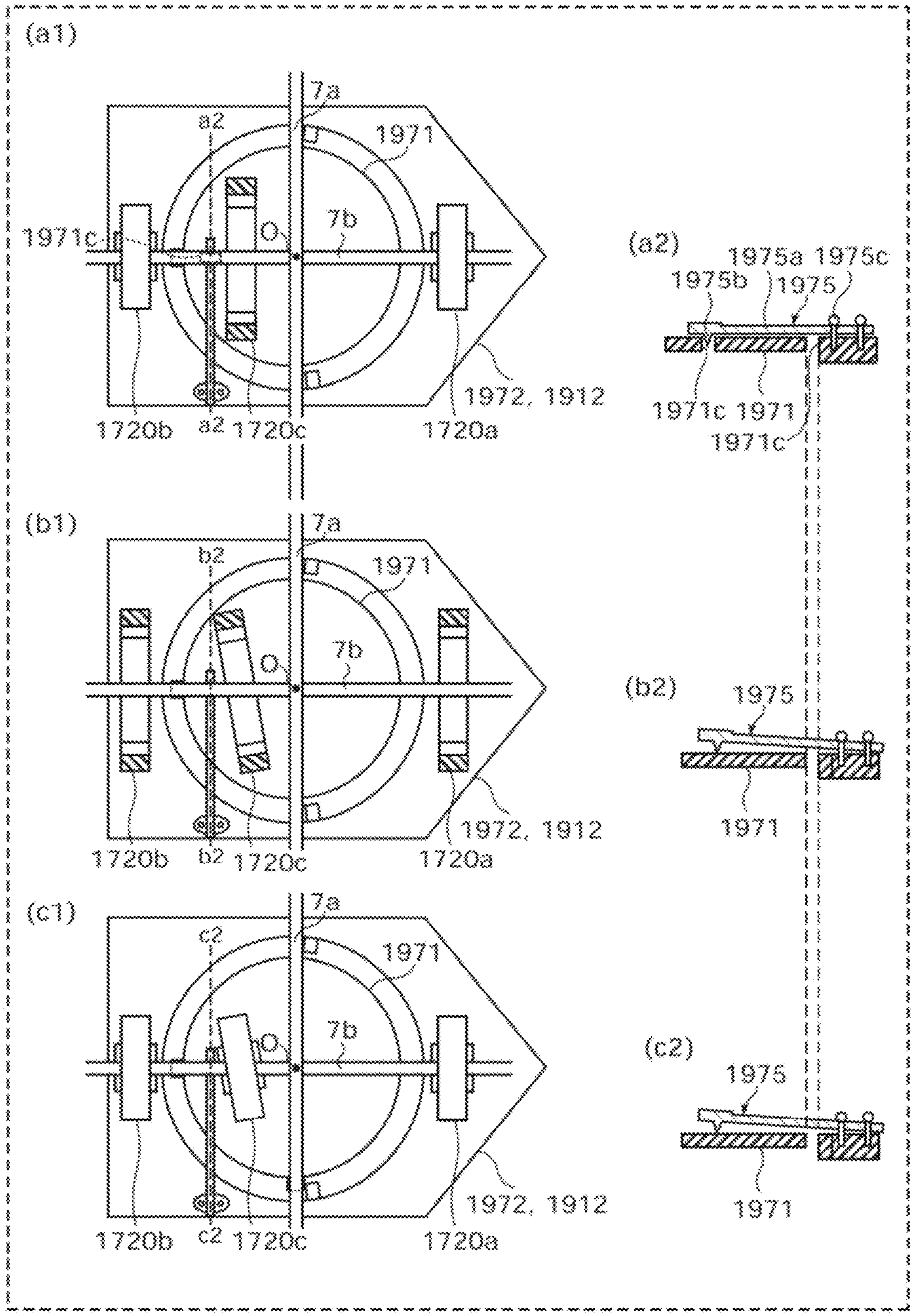
FIG. 81 includes a schematic diagram illustrating an example of the third connector when the unmanned aerial vehicle has rotated, and a cross-sectional view illustrating example of a cross section of the connector support portion and the ratchet.

Even if first fixed portion 1971 is pulled by front and rear tension springs 1919*a* and 1919*b*, first fixed portion 1971 may stop without rotating 90° due to a defect in tension springs 1919*a* and 1919*b*, as illustrated in (b1) in FIG. 81.

In such cases, as illustrated in (c1) in FIG. 81, control processor 11 pivots first hook 1721 and second hook 1722 of third connector 1720*c* to close third connector 1720*c*.

Figure 80:
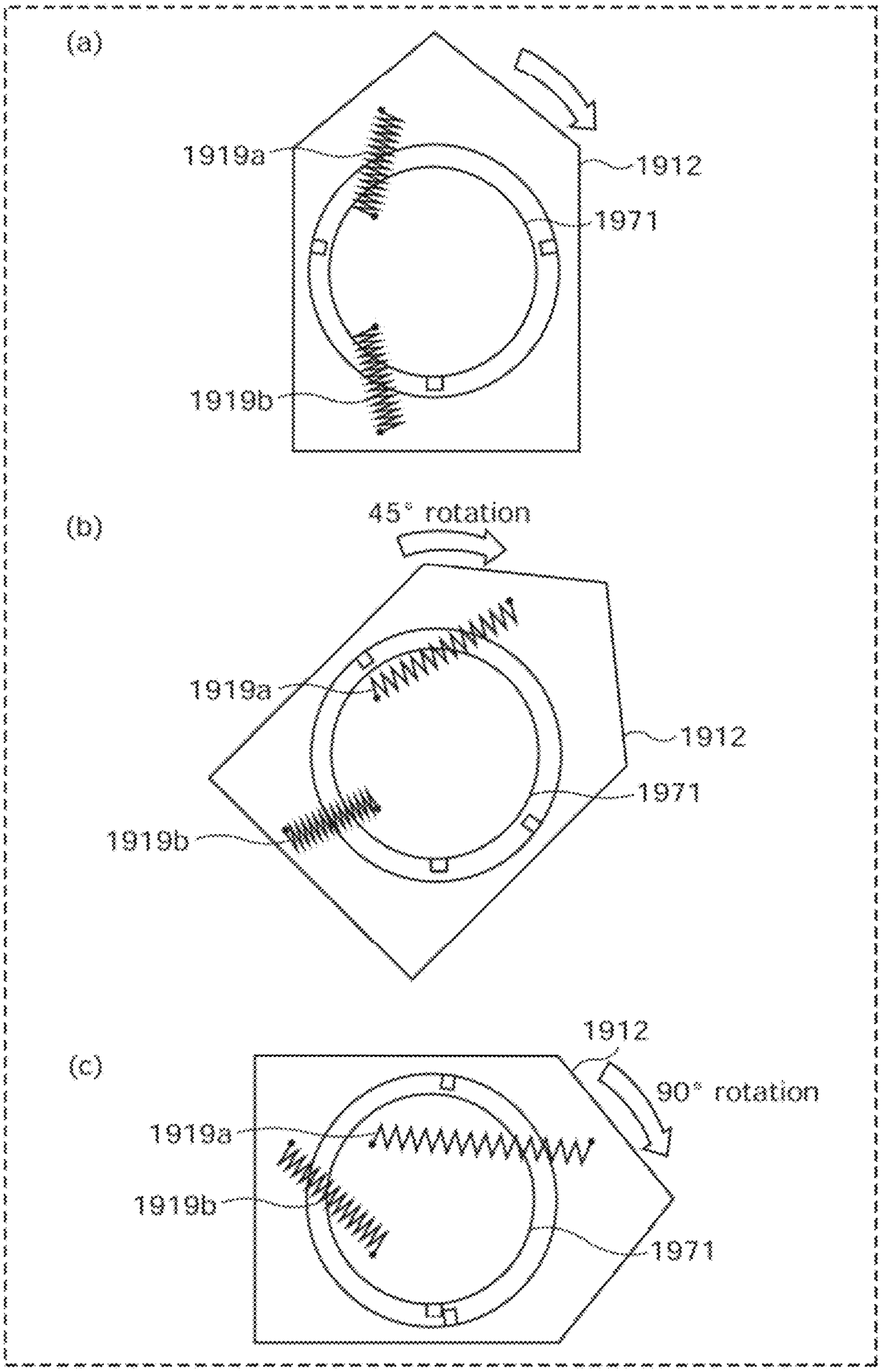
FIG. 80 is schematic diagram illustrating an example of tension springs and of the connector support portion when the unmanned aerial vehicle rotates.

The movement of the respective tension springs 1919*a* and 1919*b* in (a1) and (b1) in FIG. 79 will now be explained in greater detail with reference to FIG. 80. FIG. 80 is schematic diagram illustrating an example of tension springs 1919*a* and 1919*b* of connector support portion 1970 when unmanned aerial vehicle 10*m* rotates.

In FIG. 80, (a) illustrates the state of (a1) in FIG. 79. In (a) in FIG. 80, the respective tension springs 1919*a* and 1919*b* are of natural length. In FIG. 80, (b) illustrates vehicle main body 1912 rotated at an angle of 45° relative to (a) in FIG. 80. Here, front tension spring 1919*a* is stretched beyond its natural length (the length of the stretch is medium and the elastic force is normal), and rear tension spring 1919*b* is slightly stretched beyond its natural length (the length of the stretch is small and the elastic force is low) or contracted beyond its natural length.

In FIG. 80, (c) illustrates vehicle main body 1912 rotated at an angle of 90° relative to (a) in FIG. 80. Here, front tension spring 1919*a* is stretched significantly beyond its natural length (the length of the stretch is long and the elastic force is high), and rear tension spring 1919*b* is also stretched beyond its natural length (the length of the stretch is medium and the elastic force is normal).

Thus, as illustrated in (c) in FIG. 80, the elastic forces of front and rear tension springs 1919*a* and 1919*b* apply a clockwise turning force to first fixed portion 1971.

Figure 82:
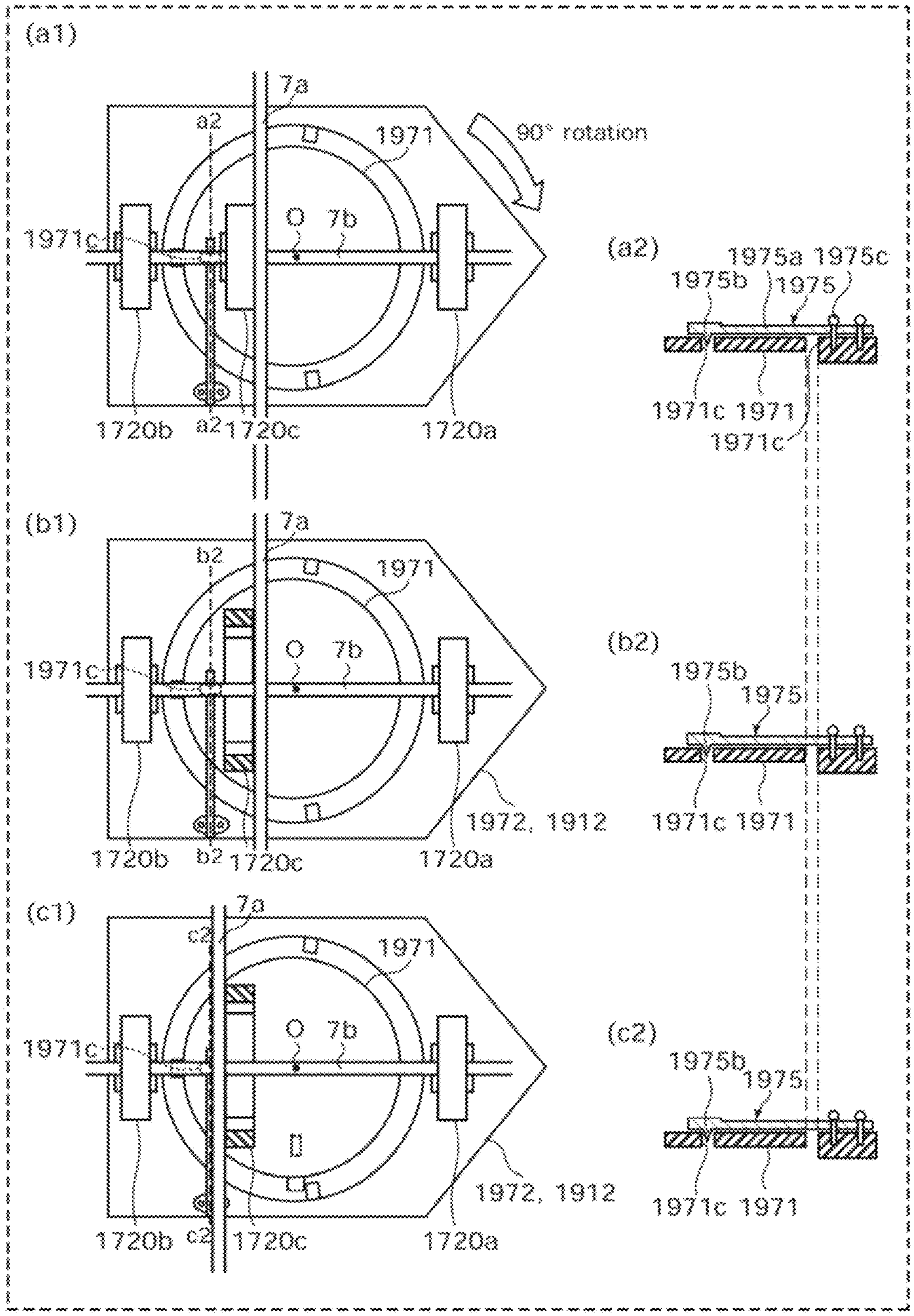
FIG. 82 is a schematic diagram illustrating an example of the third connector of the unmanned aerial vehicle passing the first rail, and a cross-sectional view illustrating an example of a cross section of the connector support portion and the ratchet.

FIG. 81 includes a schematic diagram illustrating an example of third connector 1720*c* when unmanned aerial vehicle 10*m* has rotated, and a cross-sectional view illustrating example of a cross section of connector support portion 1970 and ratchet 1975. FIG. 82 is a schematic diagram illustrating an example of third connector 1720*c* of unmanned aerial vehicle 10*m* passing first rail 7*a*, and a cross-sectional view illustrating an example of a cross section of connector support portion 1970 and ratchet 1975.

As illustrated in (a1), (b1), (c1), (a2), (b2), and (c2) in FIG. 81, control processor 11 controls rear third propeller actuation motor 22*a*3 to rotate side propeller 22*a*2 and move unmanned aerial vehicle 10*m*. This causes third connector 1720*c* to press against first rail 7*a*, which causes first fixed portion 1971 to rotate via third connector 1720*c*, correcting the attitude of third connector 1720*c*. Stated differently, the attitude of third connector 1720*c* is corrected so that the plane in which first hook 1721 and second hook 1722 of third connector 1720*c* are open is approximately orthogonal to second rail 7*b*. Stated differently, the attitude of third connector 1720*c* is corrected so that the above-described plane of third connector 1720*c* is approximately parallel to the lengthwise direction of first rail 7*a*. Thus, by moving unmanned aerial vehicle 10*m* and pushing third connector 1720*c* against first rail 7*a*, as illustrated in (a1) and (a2) in FIG. 82, the attitude of third connector 1720*c* can be corrected, so the same advantageous effects can be achieved as in the case of rotating side propeller 22*a*1, by controlling the front third propeller actuation motor 22*a*3.

As illustrated in (b1) and (b2) in FIG. 82, control processor 11 opens attitude-corrected third connector 1720*c*. As illustrated in (c1) and (c2) in FIG. 82, control processor 11 controls rear third propeller actuation motor 22*a*3 to rotate side propeller 22*a*1. This causes third connector 1720*c* to pass vertically below first rail 7*a* since unmanned aerial vehicle 10*m* moves forward.

Figure 83:
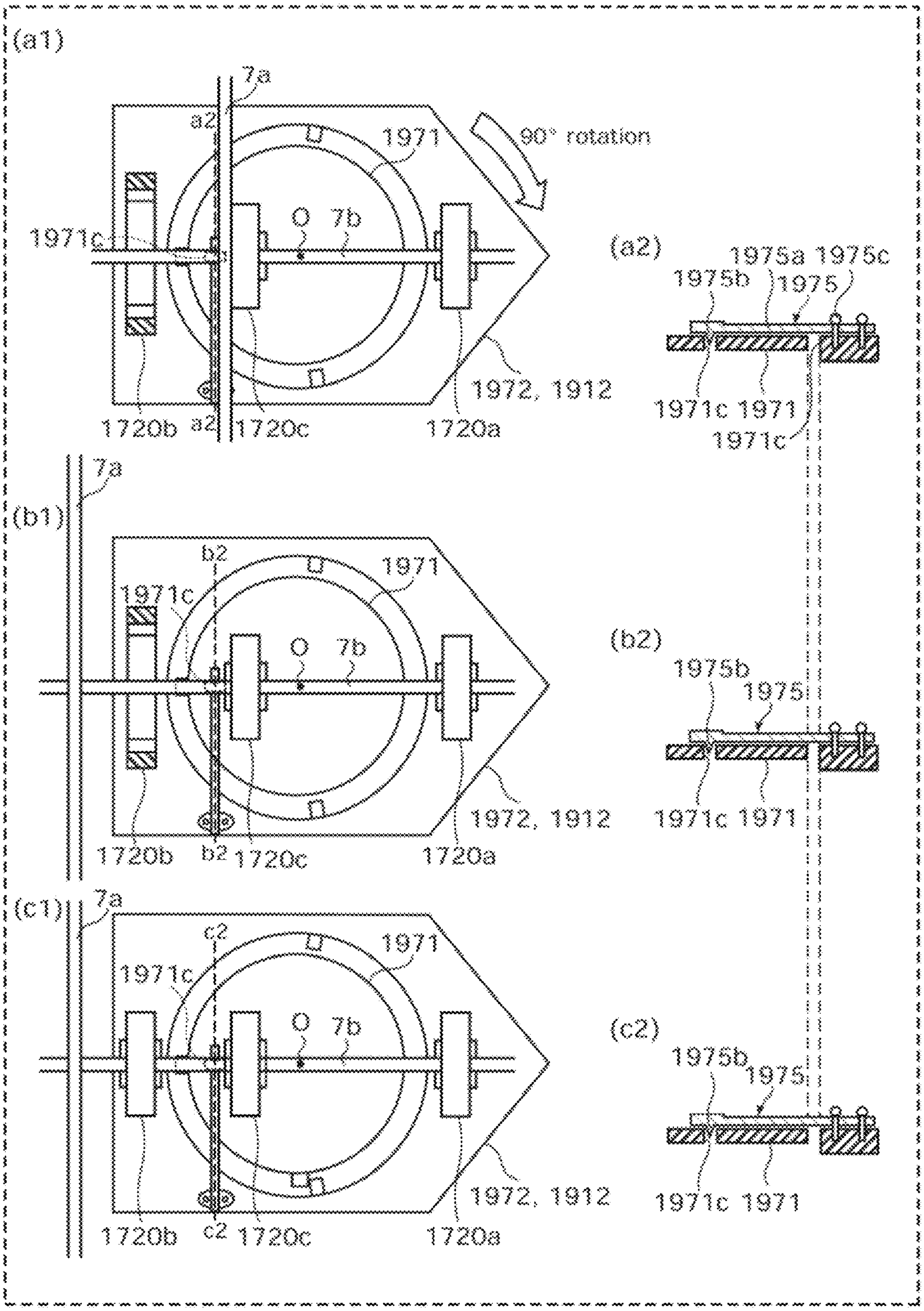
FIG. 83 is a schematic diagram illustrating an example of the second connector of the unmanned aerial vehicle passing the first rail, and a cross-sectional view illustrating an example of a cross section of the connector support portion and the ratchet.

FIG. 83 is a schematic diagram illustrating an example of second connector 1720*b* of unmanned aerial vehicle 10*m* passing first rail 7*a*, and a cross-sectional view illustrating an example of a cross section of connector support portion 1970 and ratchet 1975.

As illustrated in (a1) and (a2) in FIG. 83, control processor 11 pivots first hook 1721 and second hook 1722 of third connector 1720*c* to close third connector 1720*c*. Control processor 11 also pivots first hook 1721 and second hook 1722 of second connector 1720*b* to open second connector 1720*b*.

As illustrated in (b1) and (b2) in FIG. 83, since control processor 11 rotates side propeller 22*a*1 by controlling rearward third propeller actuation motor 22*a*3, second connector 1720*b* passes vertically below first rail 7*a* as unmanned aerial vehicle 10*m* moves forward. As illustrated in (c1) and (c2) in FIG. 83, control processor 11 pivots first hook 1721 and second hook 1722 of second connector 1720*b* to close second connector 1720*b*.

Operation Example 4

Figure 84:
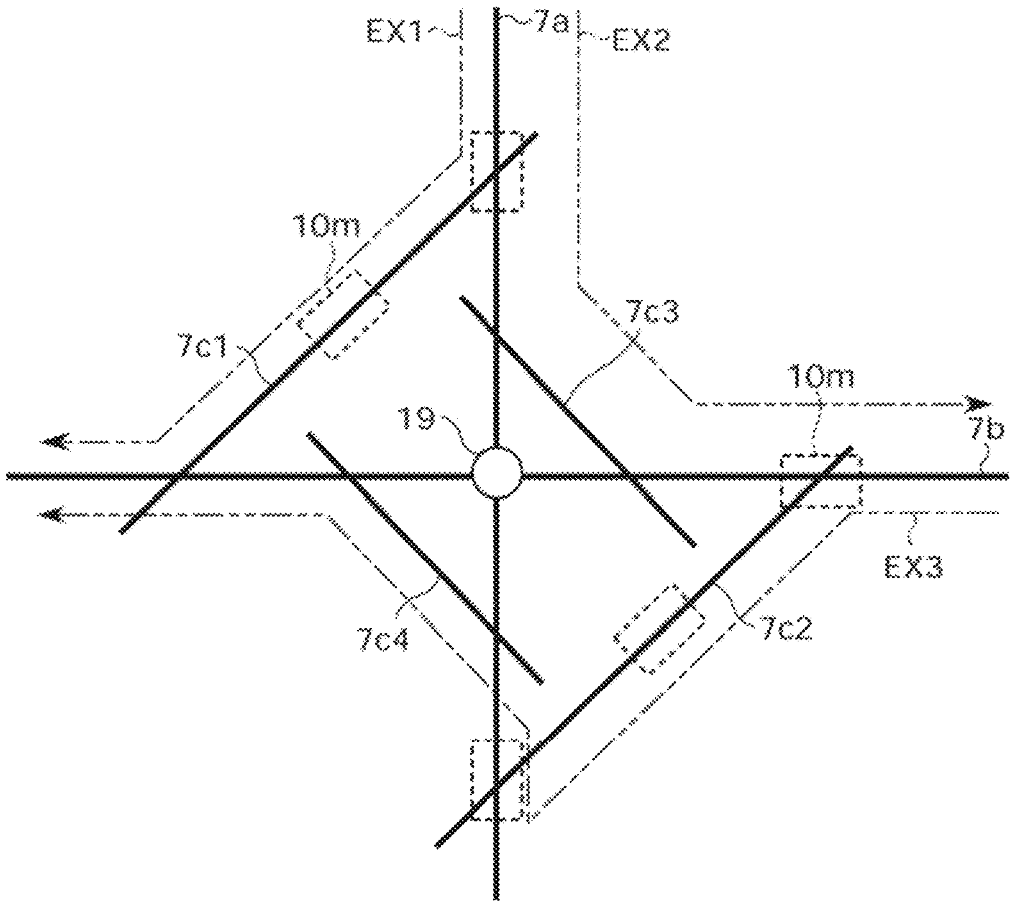
FIG. 84 is a schematic diagram illustrating an example of how the unmanned aerial vehicle bypasses a utility pole.

Next, an example will be given with reference to FIG. 84 of unmanned aerial vehicle 10*m* bypassing support pillar 19 when first rail 7*a* and second rail 7*b* are connected and fixed to support pillar 19. In this example, first rail 7*a* and second rail 7*b* are directly fixed to support pillar 19, which prevents flexure of first rail 7*a* and second rail 7*b*. FIG. 84 is a schematic diagram illustrating an example of how unmanned aerial vehicle 10*m* bypasses support pillar 19.

This operation example also includes third rails 7*c*1, 7*c*2, 7*c*3, and 7*c*4 that connect first rail 7*a* and second rail 7*b*, as illustrated in FIG. 84.

First rail 7*a* is positioned so that the lengthwise direction of first rail 7*a* and the lengthwise direction of second rail 7*b* are approximately orthogonal to each other. Each of third rails 7*c*1 and 7*c*2 is connected to and supported by first and second rails 7*a* and 7*b* so as to intersect first and second rails 7*a* and 7*b*. Third rail 7*c*1 and third rail 7*c*2 are arranged so that the lengthwise direction of third rail 7*c*1 and the lengthwise direction of third rail 7*c*2 are approximately parallel and have point symmetry with support pillar 19 as the center point. Each of third rails 7*c*3 and 7*c*4 is also connected to and supported by first and second rails 7*a* and 7*b* so as to intersect first and second rails 7*a* and 7*b*. Third rail 7*c*3 and third rail 7*c*4 are arranged between third rail 7*c*1 and third rail 7*c*2 so that the lengthwise direction of third rail 7*c*3 and the lengthwise direction of third rail 7*c*4 are approximately parallel and have point symmetry with support pillar 19 as the center point. The lengthwise directions of third rail 7*c*3 and third rail 7*c*4 are approximately orthogonal to the lengthwise directions of third rail 7*c*1 and third rail 7*c*2.

In this operation example, how unmanned aerial vehicle 10*m* moves is shown by double-dotted line arrows EX1, EX2, and EX3. Arrow EX1 illustrates unmanned aerial vehicle 10*m* making a right turn.

Regarding arrow EX1, unmanned aerial vehicle 10*m* can turn right by switching (switching connections) from first rail 7*a* to third rail 7*c*1 above support pillar 19 (top side of the figure) and then further switching to second rail 7*b* to the left of support pillar 19 (left side of the figure).

Arrow EX2 illustrates unmanned aerial vehicle 10*m* making a left turn. Regarding arrow EX2, unmanned aerial vehicle 10*m* can turn left by switching from first rail 7*a* to third rail 7*c*3 above support pillar 19 and then further switching to second rail 7*b* to the right of support pillar 19 (right side of the figure).

Arrow EX3 illustrates unmanned aerial vehicle 10*m* traveling straight. Regarding arrow EX3, unmanned aerial vehicle 10*m* switches from second rail 7*b* to the right of support pillar 19 to third rail 7*c*2, and then further switches to first rail 7*a* below support pillar 19 (lower side of the figure). Next, unmanned aerial vehicle 10*m* switches from first rail 7*a* below support pillar 19 to third rail 7*c*4, and then further switches to second rail 7*b* to the left of support pillar 19. This allows unmanned aerial vehicle 10*m* to consequently travel straight on second rail 7*b*.

When unmanned aerial vehicle 10*m* is going backwards, as shown by arrow EX3, unmanned aerial vehicle 10*m* that moved on second rail 7*b* to the right of support pillar 19 switches to second rail 7*b* to the left of support pillar 19, and then switches to third rail 7*c*1. Next, unmanned aerial vehicle 10*m* switches from third rail 7*c*1 to first rail 7*a* above support pillar 19, and then further switches to third rail 7*c*3. Unmanned aerial vehicle 10*m* can change direction by switching from third rail 7*c*3 to second rail 7*b* to the right of support pillar 19, allowing unmanned aerial vehicle 10*m* to reverse direction.

Advantageous Effects

Next, advantageous effects achieved by unmanned aerial vehicle 10*m* according to the present embodiment will be described.

As described above, unmanned aerial vehicle 10*m* according to the present embodiment includes: vehicle main body 1912 having first length N1 in a first direction that is longer than second length N2 in a second direction orthogonal to the first direction; a plurality of propellers 22 that rotate in a virtual plane parallel to the first direction and the second direction; a plurality of first propeller actuation motors 23 that are provided on vehicle main body 1912 and respectively rotate the plurality of propellers 22; at least three connectors that are hangable from at least one rail spaced apart from the ground surface; at least one side propeller 22*a*1 that provides propulsion force for propelling vehicle main body 1912 in the first direction; at least one third propeller actuation motor 22*a*3 that is provided on vehicle main body 1912 and rotates the at least one side propeller 22*a*1; and control processor 11 that controls the plurality of first propeller actuation motors 23 and the at least one third propeller actuation motor 22*a*3.

With this, the connector allows vehicle main body 1912 to be connected to and hang from the rail, thus preventing unmanned aerial vehicle 10*m* from falling even if propeller 22 does not rotate.

Moreover, by rotating side propeller 22*a*1 while the connector is connected to and hanging from the rail, unmanned aerial vehicle 10*m* can move along the rail, and thus can move to the destination point. In such cases, instead of actuating first propeller actuation motor 23, third propeller actuation motor 22*a*3 can be used to move unmanned aerial vehicle 10*m*, thus reducing power consumption in unmanned aerial vehicle 10*m*.

In unmanned aerial vehicle 10*m* according to the present embodiment, the connector includes first connector 1720*a*, second connector 1720*b*, and third connector 1720*c*, first connector 1720*a* is positioned offset in the first direction from the center of vehicle main body 1912, second connector 1720*b* is positioned offset in a direction opposite the first direction from the center of vehicle main body 1912, and third connector 1720*c* is positioned between first connector 1720*a* and second connector 1720*b*, near the center of vehicle main body 1912.

This enables unmanned aerial vehicle 10*m* to more safely transfer from one rail on which it is traveling to another by using three connectors.

Using three connectors also enables unmanned aerial vehicle 10*m* to more stably connect to the rails. Therefore, with unmanned aerial vehicle 10*m*, safety can be ensured.

Unmanned aerial vehicle 10*m* according to the present embodiment further includes first fixed portion 1971 disposed between third connector 1720*c* and vehicle main body 1912, and ratchet 1975 including engagement receiving portion 1975*b* that engages with engagement portion 1971*c* of first fixed portion 1971 by being biased by first fixed portion 1971.

With this, the orientation of unmanned aerial vehicle 10*m* can be rotated by rotating first fixed portion 1971. When rotated by a predetermined angle, engagement portion 1971*c* of first fixed portion 1971 and engagement receiving portion 1975*b* of ratchet 1975 engage to control the rotation of first fixed portion 1971 or vehicle main body 1912. Since this allows vehicle main body 1912 to be oriented as desired, unmanned aerial vehicle 10*m* can safely transfer from one rail on which it is traveling to another.

In the control method according to the present embodiment, unmanned aerial vehicle 10*m* includes first fixed portion 1971 between third connector 1720*c* and vehicle main body 1912 of unmanned aerial vehicle 10*m*, and an orientation of unmanned aerial vehicle 10*m* is changed by rotating vehicle main body 1912 relative to first fixed portion 1971.

With this configuration, since this allows vehicle main body 1912 to be oriented as desired, unmanned aerial vehicle 10*m* can safely transfer from one rail on which it is traveling to another.

In unmanned aerial vehicle 10*m* according to the present embodiment, a first surface area of a first minimum rectangle that circumscribes a first projected surface formed by projecting unmanned aerial vehicle 10*m* onto a first plane whose normal vector extends in the first direction is smaller than a second surface area of a second minimum rectangle that circumscribes a second projected surface formed by projecting unmanned aerial vehicle 10*m* onto a second plane whose normal vector extends in the second direction.

With this configuration, vehicle main body 1912 is elongated in the lengthwise direction of the rail, so unmanned aerial vehicle 10*m* can stably travel along the rail.

In unmanned aerial vehicle 10*m* according to the present embodiment, the plurality of propellers 22 include: first propeller 22; second propeller 22 adjacent to first propeller 22 in the second direction; third propeller 22 adjacent to first propeller 22 in the first direction; and fourth propeller 22 adjacent to second propeller 22 in the first direction and adjacent to third propeller 22 in the second direction. A first distance between first propeller 22 and second propeller 22 is shorter than a second distance between first propeller 22 and third propeller 22.

This configuration makes it possible to arrange first propeller 22 and second propeller 22 along the lengthwise direction of the rail and arrange third propeller 22 and fourth propeller 22 along the lengthwise direction of the rail. Accordingly, the attitude of vehicle main body 1912 can be further stabilized when unmanned aerial vehicle 10*m* travels along the rail.

In unmanned aerial vehicle 10*m* according to the present embodiment, rotary shaft 22*a*4 of the at least one third propeller actuation motor 22*a*3 extends in the first direction.

This configuration enables unmanned aerial vehicle 10*m* to easily provide propulsion force for causing unmanned aerial vehicle 10*m* to travel along the rail.

In unmanned aerial vehicle 10*m* according to the present embodiment, the at least one side propeller 22*a*1 is positioned lower than the virtual plane.

With this configuration, since contact between propeller 22 and side propeller 22*a*1 can be inhibited, the safety of unmanned aerial vehicle 10*m* can be increased.

In unmanned aerial vehicle 10*m* according to the present embodiment, rotary shaft 22*a*4 of the at least one third propeller actuation motor 22*a*3 has an angle of inclination relative to the first direction that is variable in a plane whose normal vector extends in the second direction.

With this configuration, since rotary shaft 22*a*4 of third propeller actuation motor 22*a*3 is variable, unmanned aerial vehicle 10*m* can be rotated in the yaw direction (horizontal direction). This makes it possible to change the orientation of unmanned aerial vehicle 10*m*.

A control method according to the present embodiment is a control method of controlling unmanned aerial vehicle 10*m*, unmanned aerial vehicle 10*m* including vehicle main body 1912 having first length N1 in a first direction that is longer than second length N2 in a second direction orthogonal to the first direction; a plurality of propellers 22 that rotate in a virtual plane parallel to the first direction and the second direction; a plurality of first propeller actuation motors 23 that are provided on vehicle main body 1912 and respectively rotate the plurality of propellers 22; at least three connectors that are hangable from at least one rail spaced apart from the ground surface; at least one side propeller 22*a*1 that provides propulsion force for propelling vehicle main body 1912 in the first direction; at least one third propeller actuation motor 22*a*3 that is provided on vehicle main body 1912 and rotates the at least one side propeller 22*a*1; and control processor 11 that controls the plurality of first propeller actuation motors 23 and the at least one third propeller actuation motor 22*a*3. First connector 1720*a* is positioned offset in the first direction from a center of vehicle main body 1912, second connector 1720*b* is positioned offset in a direction opposite the first direction from the center of vehicle main body 1912, and third connector 1720*c* is positioned between first connector 1720*a* and second connector 1720*b*, near the center of vehicle main body 1912. The control method includes, when unmanned aerial vehicle 10*m* switches connection from first rail 7*a* to second rail 7*b* at an intersection of first rail 7*a* to second rail 7*b*: determining whether first connector 1720*a* has approached second rail 7*b*; when it is determined that first connector 1720*a* has approached second rail 7*b*, detaching first connector 1720*a* from first rail 7*a* and propelling unmanned aerial vehicle 10*m* in the first direction by rotating the at least one side propeller 22*a*1; determining whether first connector 1720*a* has passed second rail 7*b*; and when it is determined that first connector 1720*a* has passed second rail 7*b*, detaching second connector 1720*b* from first rail 7*a*, rotating unmanned aerial vehicle 10*m* until the first direction of unmanned aerial vehicle 10*m* is parallel to a direction of extension of second rail 7*b*, and after rotation of unmanned aerial vehicle 10*m*, connecting first connector 1720*a* and second connector 1720*b* to second rail 7*b*.

This configuration allows unmanned aerial vehicle 10*m* to switch connections (transfer) from first rail 7*a* to second rail 7*b*.

In the control method according to the present embodiment, when it is determined that first connector 1720*a* has passed second rail 7*b*, first connector 1720*a* is connected to first rail 7*a* and whether a center of gravity of unmanned aerial vehicle 10*m* is balanced is determined, and when it is determined that the center of gravity of unmanned aerial vehicle 10*m* is balanced, first connector 1720*a* and second connector 1720*b* are detached from first rail 7*a*, unmanned aerial vehicle 10*m* is rotated until the first direction of unmanned aerial vehicle 10*m* is parallel to the direction of extension of second rail 7*b*, and after unmanned aerial vehicle 10*m* rotates, first connector 1720*a* and second connector 1720*b* are connected to second rail 7*b*.

With this configuration, for example, even if second rail 7*b* is inclined relative to first rail 7*a*, unmanned aerial vehicle 10*m* can switch connection from first rail 7*a* to second rail 7*b*, by changing the balance of the center of gravity of unmanned aerial vehicle 10*m*.

In the control method according to the present embodiment, after first connector 1720*a* and second connector 1720*b* are connected to second rail 7*b* after unmanned aerial vehicle 10*m* has rotated, the attitude of third connector 1720*c* is matched to an attitude of each of first connector 1720*a* and second connector 1720*b* by detaching third connector 1720*c* from first rail 7*a* and rotating first fixed portion 1971.

With this configuration, by detaching third connector 1720*c* from first rail 7*a*, the attitude of third connector 1720*c* can be matched to the attitude of each of first connector 1720*a* and second connector 1720*b*. Accordingly, third connector 1720*c* can be connected to second rail 7*b* along with first connector 1720*a* and second connector 1720*b*.

In the control method according to the present embodiment, unmanned aerial vehicle 10*m* includes side propeller 22*a*2 for rotation that is disposed in a position corresponding to side propeller 22*a*1 in the first direction, and an orientation of unmanned aerial vehicle 10*m* is changed using a propulsion force of side propeller 22*a*2 for rotation.

With this configuration, the traveling direction of unmanned aerial vehicle 10*m* can be easily changed by rotating side propeller 22*a*2.

Variation 1 of Embodiment 8

Hereinafter, since the basic configuration of unmanned aerial vehicle 10*m* according to the present variation is the same as the basic configuration of the unmanned aerial vehicle of Embodiment 8 and the like, repeated description of the basic configuration of unmanned aerial vehicle 10*m* in the present variation will be omitted where appropriate.

Figure 85:
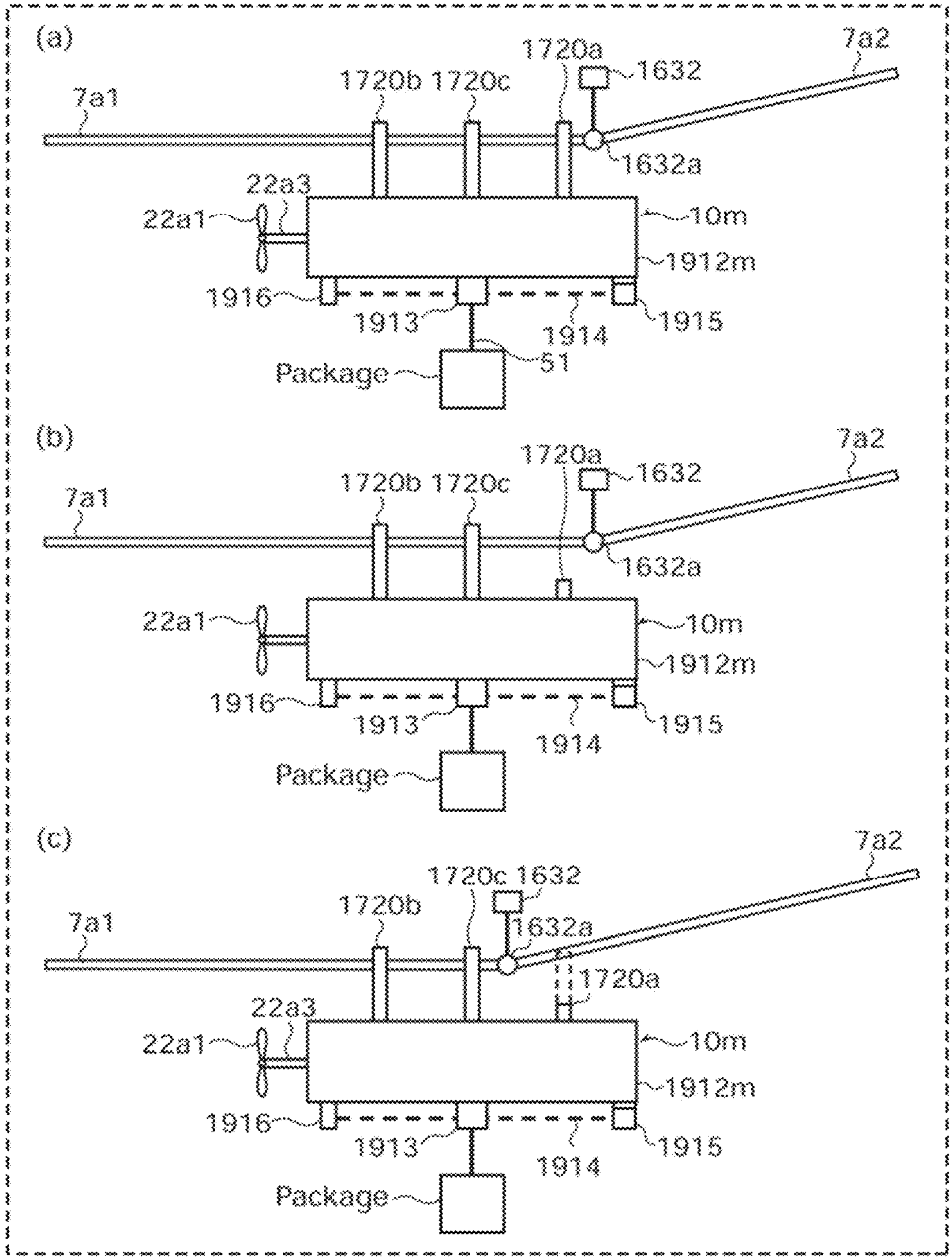
FIG. 85 is a schematic diagram illustrating an example of how an unmanned aerial vehicle according to Variation 1 of Embodiment 8 disconnects a first connector from a horizontal rail.

FIG. 85 is a schematic diagram illustrating an example of how unmanned aerial vehicle 10*m* according to Variation 1 of Embodiment 8 disconnects first connector 1720*a* from the horizontal rail.

As illustrated in (a) in FIG. 85, vehicle main body 1912*m* of unmanned aerial vehicle 10*m* differs from Embodiment 8 and other embodiments in that it further includes shaft 1914, slider 1913, and slider motor 1915.

Shaft 1914 is located on the lower surface on the lower side of vehicle main body 1912*m* and is supported by shaft support members 1916 located at the front and rear ends of vehicle main body 1912*m*. Stated differently, shaft 1914 is supported by two shaft support members 1916 so that both ends of shaft 1914 are sandwiched between the two shaft support members 1916. Shaft 1914 extends in the lengthwise direction of vehicle main body 1912*m*. Stated differently, shaft 1914 is arranged in vehicle main body 1912*m* so that its lengthwise direction is approximately parallel to the lengthwise direction of the rail.

While coupled to shaft 1914, slider 1913 is arranged below vehicle main body 1912*m* so that it slides along the lengthwise direction of shaft 1914. Stated differently, slider 1913 can displace its position by sliding along the lengthwise direction of shaft 1914. A package is connected to slider 1913 via wire 51. Stated differently, slider 1913 and the package act as counterbalance for main vehicle main body 1912*m*. Even if the package is not connected to unmanned aerial vehicle 10*m*, slider 1913 alone can function as a counterbalance for main vehicle main body 1912*m*.

Slider motor 1915 is an actuator capable of displacing the position of slider 1913. Stated differently, slider motor 1915 can change the position of the center of gravity of vehicle main body 1912*m* by moving the position of slider 1913 toward the front or rear of vehicle main body 1912*m* relative to the center line centered on the center point O of vehicle main body 1912*m*.

If the rail is inclined at a predetermined angle or more relative to the horizontal plane in the path for unmanned aerial vehicle 10*m* to travel, control processor 11 controls slider motor 1915 to move the position of slider 1913 forward or backward relative to the center line, thereby changing the position of the center of gravity of vehicle main body 1912*m*.

Operations

Next, an example of how unmanned aerial vehicle 10*m* switches from horizontal rail 7*a*1 to inclined rail 7*a*2.

The rail in this operation includes horizontal rail 7*a*1 that is approximately parallel to the horizontal plane and inclined rail 7*a*2 that is inclined relative to the horizontal plane. More specifically, one end of horizontal rail 7*a*1 is connected to the other end of inclined rail 7*a*2 via coupler 1632*a*. Coupler 1632*a* is connected and fixed to rail support portion 1632, which is provided on a utility pole or similar structure provided in the ground surface or the like. In this operation, unmanned aerial vehicle 10*m* is exemplified as traveling from rail 7*a*1 toward rail 7*a*2.

Unmanned aerial vehicle 10*m* travels along rail 7*a*1 by rotating side propellers 22*a*1. As illustrated in (a) in FIG. 85, when the distance between coupler 1632*a* and first connector 1720*a* is less than a predetermined distance, control processor 11 stops the rotation of side propeller 22*a*1 by controlling rear third propeller actuation motor 22*a*3 for rotating side propeller 22*a*1. This causes unmanned aerial vehicle 10*m* to stop traveling.

As illustrated in (b) in FIG. 85, control processor 11 pivots the first and second hooks of first connector 1720*a* to open first connector 1720*a* when the distance between coupler 1632*a* and first connector 1720*a* is less than the predetermined distance. By opening first connector 1720*a*, the first and second hooks of first connector 1720*a* will not come into contact with coupler 1632*a* when vehicle main body 1912*m* passes vertically below coupler 1632*a*.

Control processor 11 then rotates side propeller 22*a*1 by controlling the rear third propeller actuation motor 22*a*3. With this, unmanned aerial vehicle 10*m* moves forward and first connector 1720*a* passes vertically below coupler 1632*a*, as illustrated in (c) in FIG. 85. At this time, since rail 7*a*2 is inclined relative to rail 7*a*1, even if first connector 1720*a* is closed, the first and second hooks may come into contact with rail 7*a*2, as shown by the dashed line, and first connector 1720*a* may not be able to couple to rail 7*a*2.

Figure 86:
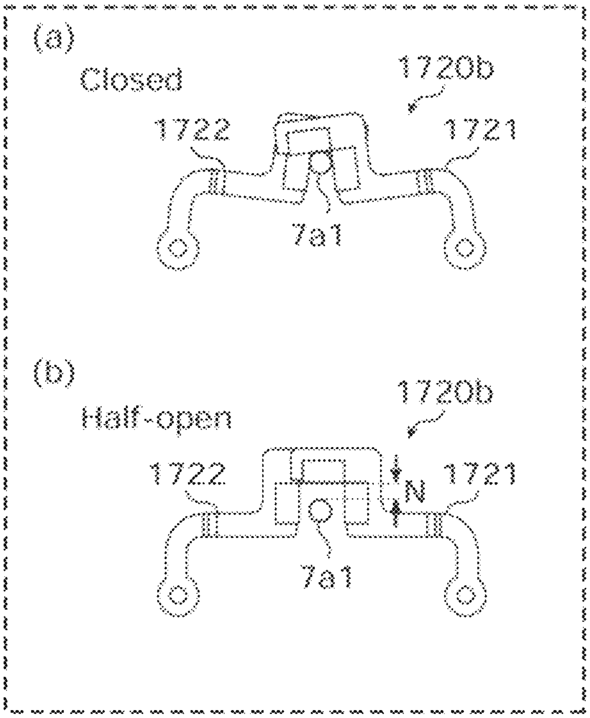
FIG. 86 is a schematic diagram illustrating an example of the relationship between the second connector and the horizontal rail when the second connector is closed and the relationship between the second connector and the horizontal rail when the second connector is half open.
Figure 87:
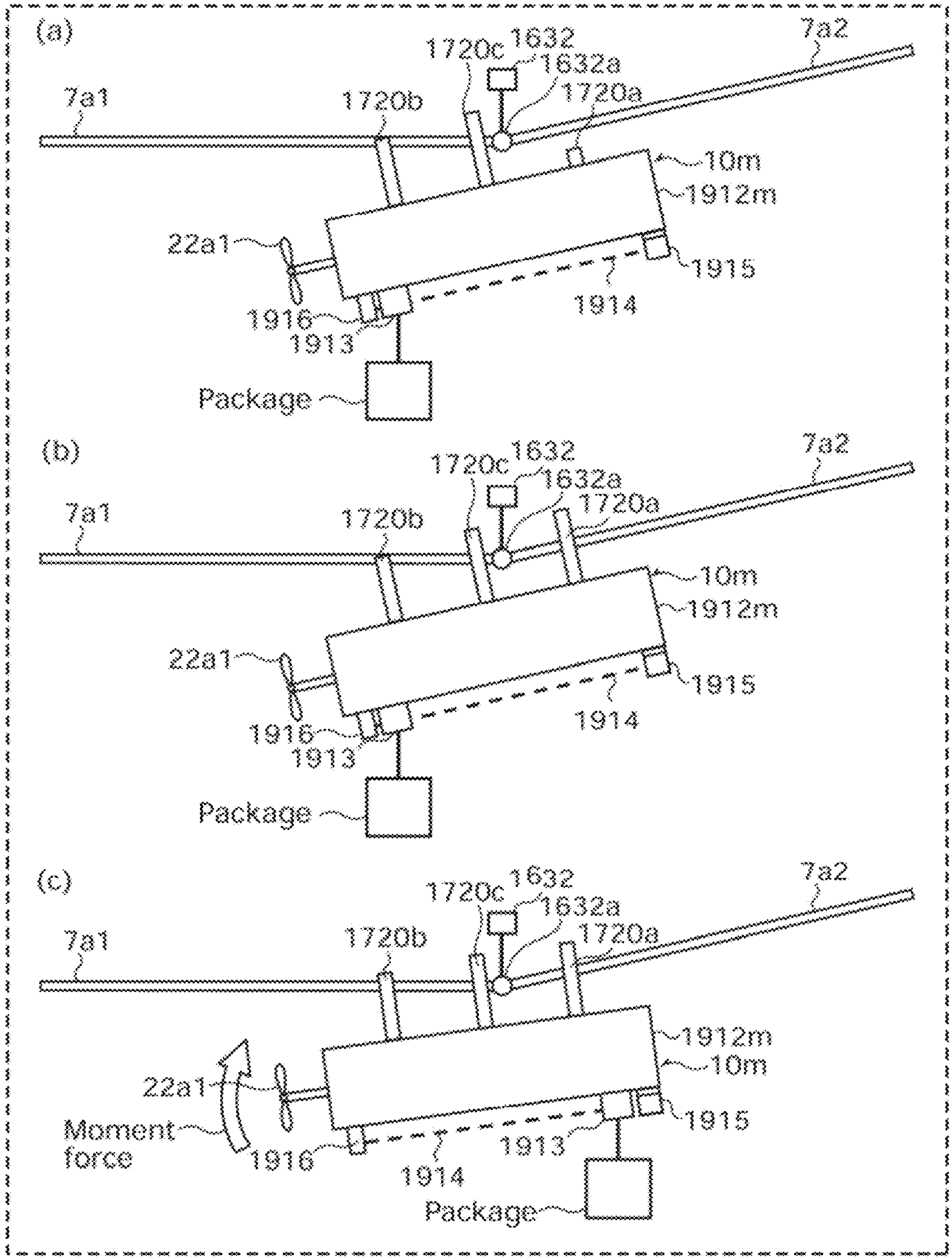
FIG. 87 is a schematic diagram illustrating an example of the connecting of the first connector to an inclined rail by moving rearward the center of gravity of the vehicle main body of the unmanned aerial vehicle according to Variation 1 of Embodiment 8.

FIG. 86 is a schematic diagram illustrating an example of the relationship between second connector 1720*b* and horizontal rail 7*a*1 when second connector 1720*b* is closed and the relationship between second connector 1720*b* and horizontal rail 7*a*1 when second connector 1720*b* is half open. FIG. 87 is a schematic diagram illustrating an example of the connecting of first connector 1720*a* to inclined rail 7*a*2 by moving rearward the center of gravity of vehicle main body 1912*m* of unmanned aerial vehicle 10*m* according to Variation 1 of Embodiment 8.

Therefore, from the closed state of second connector 1720*b*, as illustrated in (a) in FIG. 86 and (a) in FIG. 87, control processor 11 moves the first and second hooks of second connector 1720*b* slightly to a half open (or one could say a half closed) state, as illustrated in (b) in FIG. 86. This creates a gap of distance N between first and second hooks and rail 7*a*1.

As illustrated in (a) in FIG. 87, control processor 11 controls slider motor 1915 to move slider 1913 to the rear of vehicle main body 1912*m* (opposite the direction of the travel). This shifts the position of the center of gravity of vehicle main body 1912*m* toward the rear of vehicle main body 1912*m* from the center line. Because the distance in the height direction from the upper surface of vehicle main body 1912*m* to the first and second hooks of second connector 1720*b* is greater than the distance in the height direction from the upper surface of vehicle main body 1912*m* to the first and second hooks of third connector 1720*c*, the front of vehicle main body 1912*m* is lifted to tilt vehicle main body 1912*m* so that the attitude of vehicle main body 1912*m* is in line with rail 7*a*2.

As illustrated in (b) in FIG. 87, control processor 11 pivots the first and second hooks of first connector 1720*a* to close first connector 1720*a*. This connects first connector 1720*a* to rail 7*a*2.

As illustrated in (c) in FIG. 87, control processor 11 controls slider motor 1915 to move slider 1913 to the front of vehicle main body 1912*m* (the direction of the travel). This shifts the position of the center of gravity of vehicle main body 1912*m* toward the front of vehicle main body 1912*m* from the center line. Consequently, a moment force is exerted to lift the rear of vehicle main body 1912*m*, as indicated by the arrow.

Figure 88:
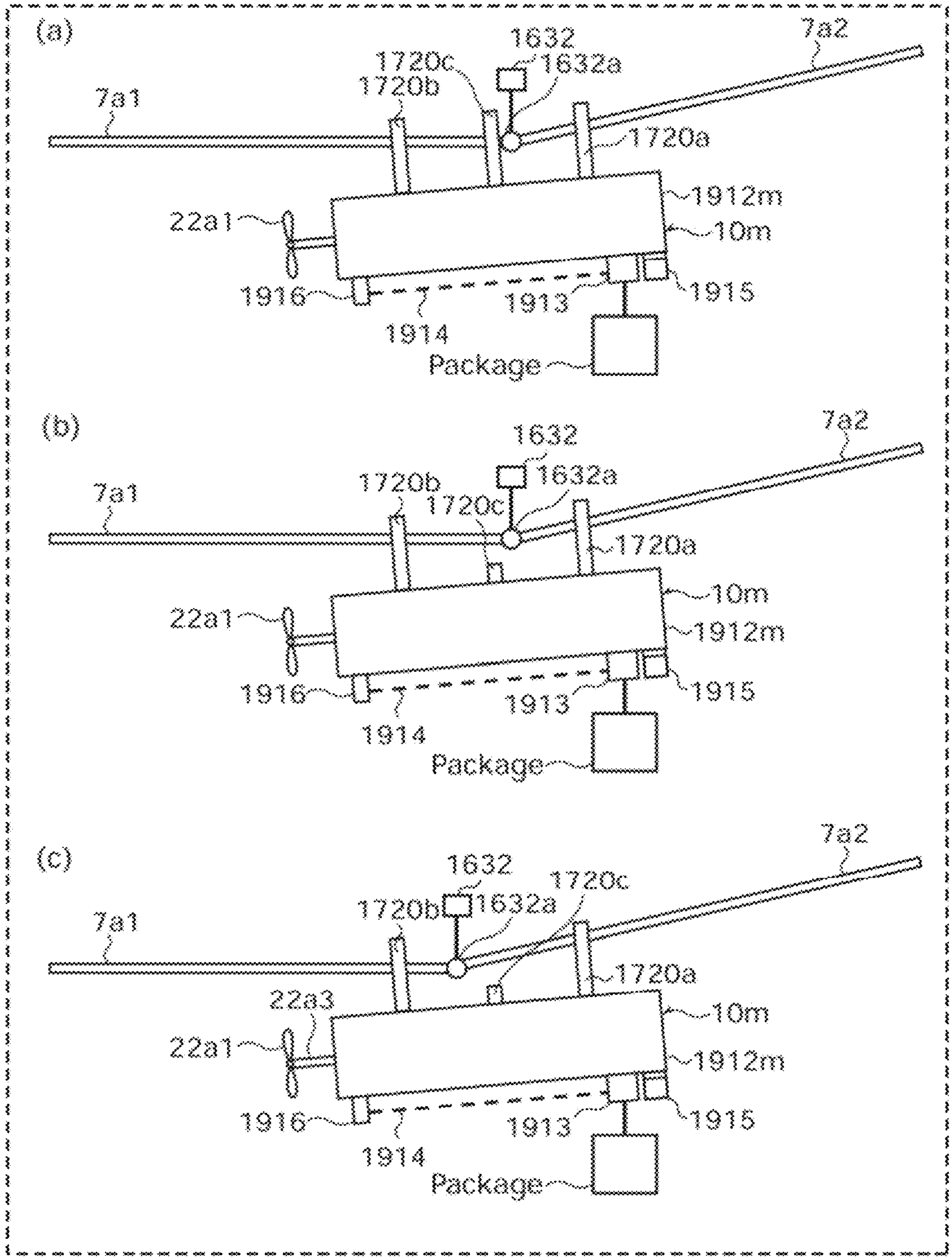
FIG. 88 is a schematic diagram illustrating an example of how the unmanned aerial vehicle according to Variation 1 of Embodiment 8 disconnects a third connector from the horizontal rail and the third connector passes vertically below a coupler.

FIG. 88 is a schematic diagram illustrating an example of how unmanned aerial vehicle 10*m* according to Variation 1 of Embodiment 8 disconnects third connector 1720*c* from horizontal rail 7*a*1 and third connector 1720*c* passes vertically below coupler 1632*a*.

As illustrated in (a) in FIG. 88, since the shift in the position of the center of gravity lifts the rear of vehicle main body 1912*m*, control processor 11 closes the half-open second connector 1720*b*.

As illustrated in (b) FIG. 88, the first and second hooks of third connector 1720*c* are pivoted to open third connector 1720*c*.

As illustrated in (c) in FIG. 88, control processor 11 controls rear third propeller actuation motor 22*a*3 to rotate side propeller 22*a*1. With this, unmanned aerial vehicle 10*m* moves forward and third connector 1720*c* passes vertically below coupler 1632*a*.

Figure 89:
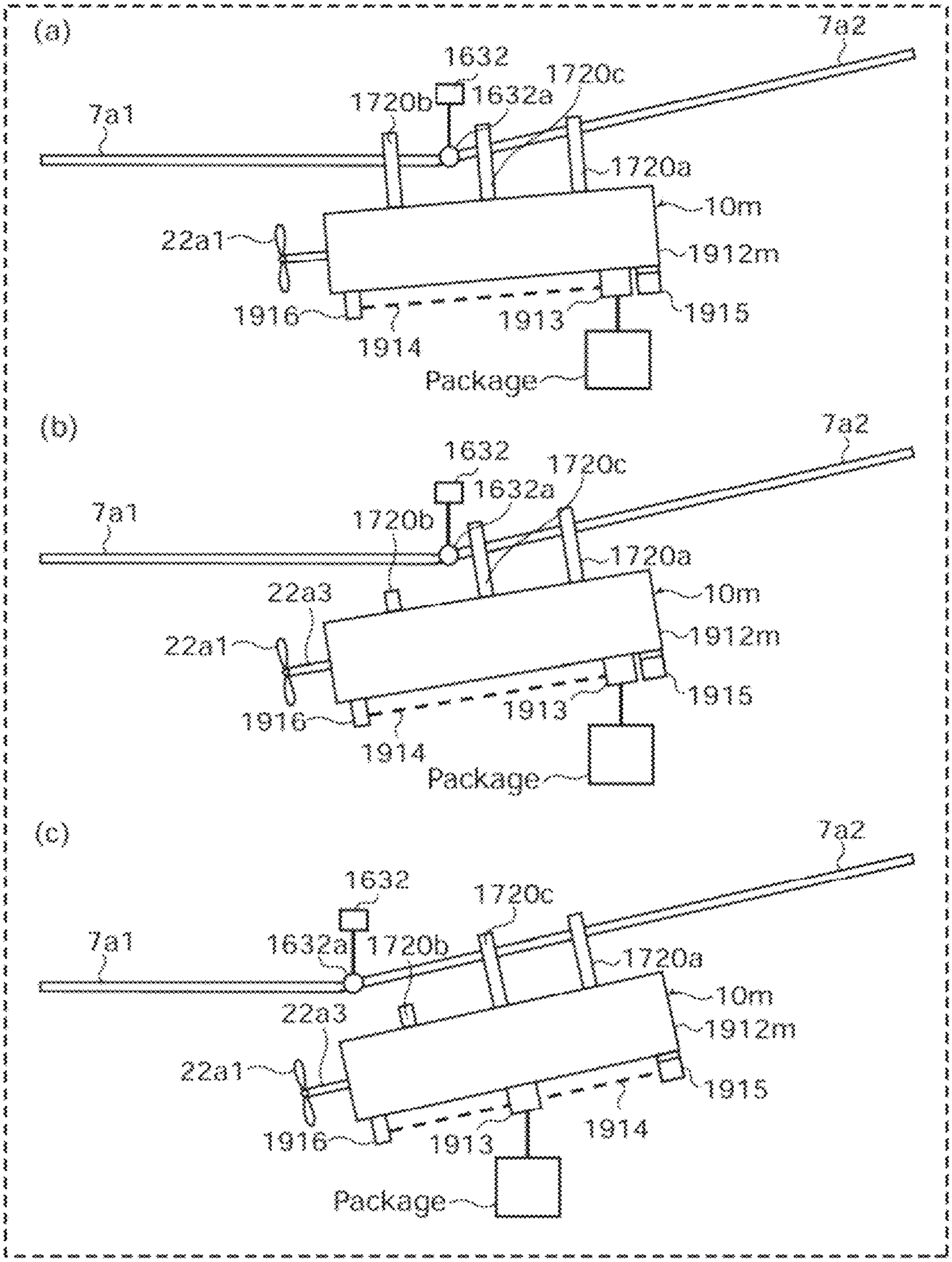
FIG. 89 is a schematic diagram illustrating an example of how the unmanned aerial vehicle according to Variation 1 of Embodiment 8 disconnects a second connector from the horizontal rail and the second connector passes vertically below a coupler.

FIG. 89 is a schematic diagram illustrating an example of how unmanned aerial vehicle 10*m* according to Variation 1 of Embodiment 8 disconnects second connector 1720*b* from horizontal rail 7*a*1 and second connector 1720*b* passes vertically below coupler 1632*a*.

As illustrated in (a) in FIG. 89, control processor 11 pivots the first and second hooks of third connector 1720*c* to close third connector 1720*c*. This connects third connector 1720*c* to rail 7*a*2.

As illustrated in (b) FIG. 89, the first and second hooks of second connector 1720*b* are pivoted to open second connector 1720*b*. Control processor 11 also controls slider motor 1915 to move slider 1913 on the centerline of vehicle main body 1912*m*. This shifts the position of the center of gravity of vehicle main body 1912*m* onto the center line of vehicle main body 1912*m*.

As illustrated in (c) in FIG. 89, control processor 11 controls rear third propeller actuation motor 22*a*3 to rotate side propeller 22*a*1. With this, unmanned aerial vehicle 10*m* moves forward and second connector 1720*b* passes vertically below coupler 1632*a*.

Figure 90:
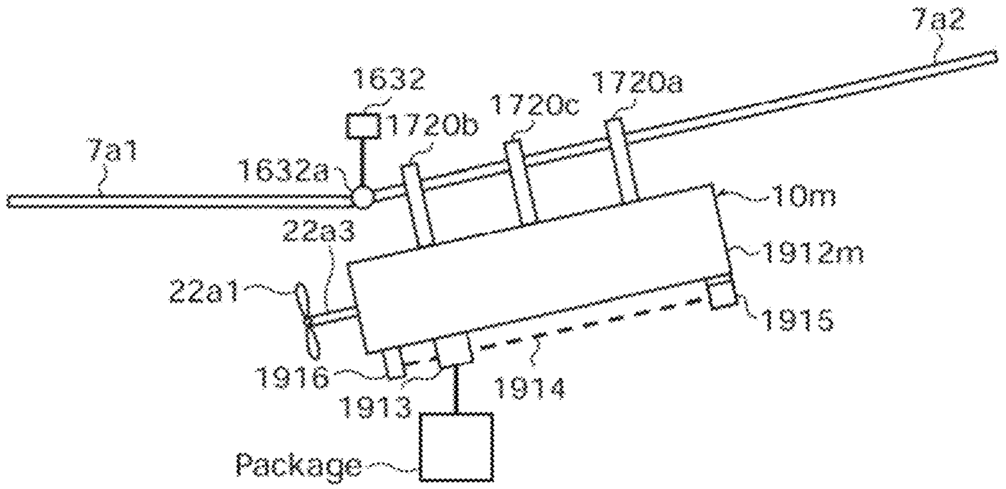
FIG. 90 is a schematic diagram illustrating an example of the unmanned aerial vehicle according to Variation 1 of Embodiment 8 connecting the second connector to the inclined rail.

FIG. 90 is a schematic diagram illustrating an example of unmanned aerial vehicle 10*m* according to Variation 1 of Embodiment 8 connecting second connector 1720*b* to inclined rail 7*a*2.

As illustrated in FIG. 90, control processor 11 pivots the first and second hooks of second connector 1720*b* to close second connector 1720*b*. This connects second connector 1720*b* to rail 7*a*2.

Control processor 11 also controls slider motor 1915 to move slider 1913 toward the rear of vehicle main body 1912*m*. This shifts the position of the center of gravity of vehicle main body 1912*m* toward the rear of vehicle main body 1912*m* from the center line. Control processor 11 then rotates side propeller 22*a*1 by controlling the rear third propeller actuation motor 22*a*3. This causes unmanned aerial vehicle 10*m* to move forward.

Variation 2 of Embodiment 8

Hereinafter, since the basic configuration of unmanned aerial vehicle 10*m*1 according to the present variation is the same as the basic configuration of the unmanned aerial vehicle of Embodiment 8 and the like, repeated description of the basic configuration of unmanned aerial vehicle 10*m*1 in the present variation will be omitted where appropriate.

Vehicle main body 1912*m* of unmanned aerial vehicle 10*m*1 differs from, for example, Variation 1 of Embodiment 8 in that it further includes fourth connector 1720*d*.

Fourth connector 1720*d* is disposed between first connector 1720*a* and third connector 1720*c*. Since the configuration of fourth connector 1720*d* is the same as that of first connector 1720*a*, second connector 1720*b*, and third connector 1720*c*, repeated description will be omitted.

Operations

Figure 91:
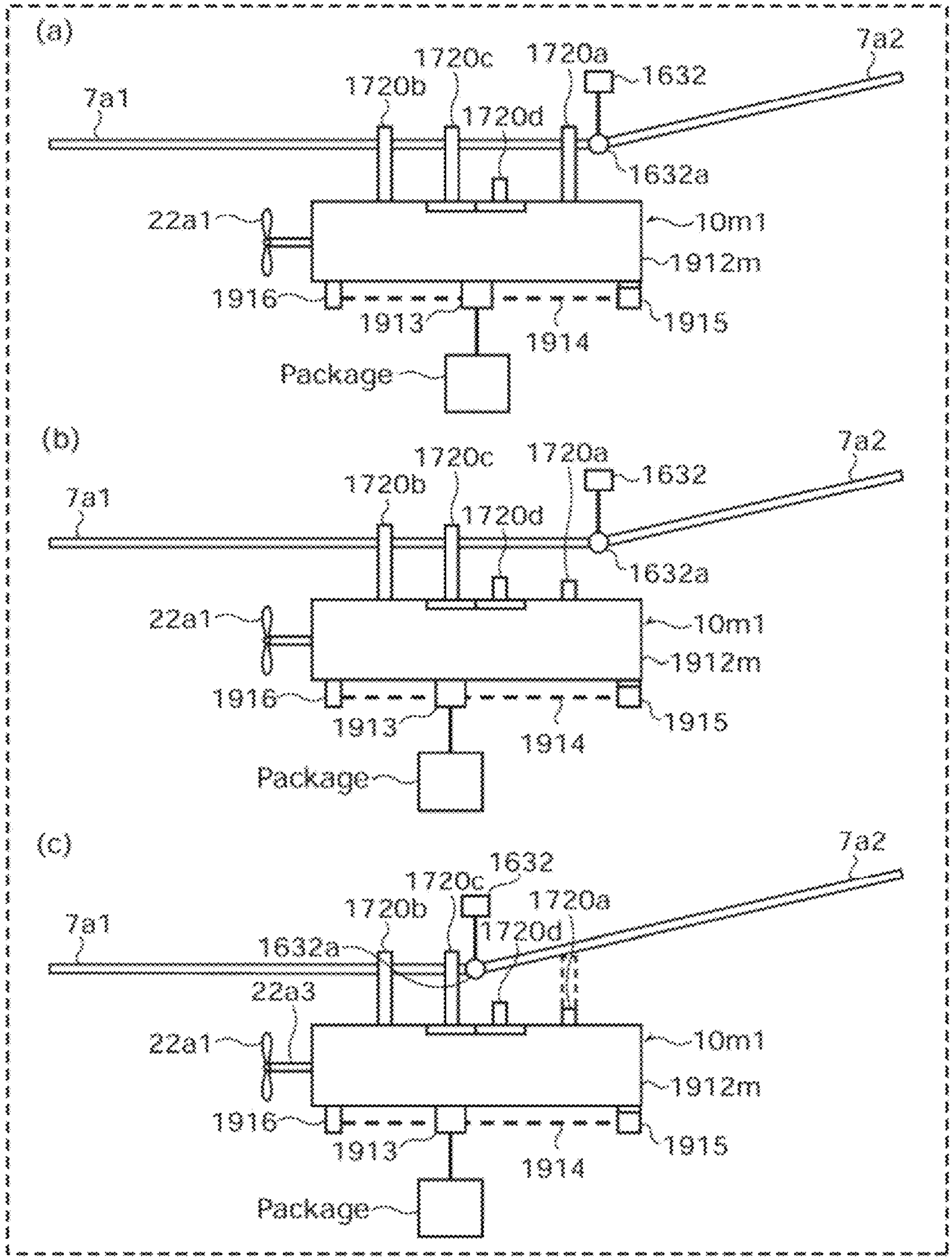
FIG. 91 is a schematic diagram illustrating an example of how an unmanned aerial vehicle according to Variation 2 of Embodiment 8 disconnects a first connector from a horizontal rail.

Next, an example of how unmanned aerial vehicle 10*m* switches from horizontal rail 7*a*1 to inclined rail 7*a*2 will be given with reference to FIG. 91 and other figures. FIG. 91 is a schematic diagram illustrating an example of how unmanned aerial vehicle 10*m* according to Variation 2 of Embodiment 8 disconnects first connector 1720*a* from horizontal rail 7*a*1.

The rail in this operation includes horizontal rail 7*a*1 that is approximately parallel to the horizontal plane and inclined rail 7*a*2 that is inclined relative to the horizontal plane. More specifically, one end of horizontal rail 7*a*1 is connected to the other end of inclined rail 7*a*2 via coupler 1632*a*. Coupler 1632*a* is connected and fixed to rail support portion 1632, which is provided on a utility pole or similar structure provided in the ground surface or the like. This operation illustrates an example of unmanned aerial vehicle 10*m*1 traveling from rail 7*a*1 to rail 7*a*2, where fourth connector 1720*d* is open during normal travel.

Unmanned aerial vehicle 10*m*1 travels along rail 7*a*1 by rotating side propeller 22*a*1. As illustrated in (a) in FIG. 91, when the distance between coupler 1632*a* and first connector 1720*a* is less than a predetermined distance, control processor 11 stops the rotation of side propeller 22*a*1 by controlling rear third propeller actuation motor 22*a*3 for rotating side propeller 22*a*1. This causes unmanned aerial vehicle 10*m*1 to stop traveling.

As illustrated in (b) in FIG. 91, control processor 11 pivots the first and second hooks of first connector 1720*a* to open first connector 1720*a* when the distance between coupler 1632*a* and first connector 1720*a* is less than the predetermined distance. By opening first connector 1720*a*, the first and second hooks of first connector 1720*a* will not come into contact with coupler 1632*a* when vehicle main body 1912*m* passes vertically below coupler 1632*a*. Fourth connector 1720*d* also does not contact coupler 1632*a*.

Control processor 11 also controls slider motor 1915 to move slider 1913 toward the rear of vehicle main body 1912*m*, just slightly beyond the central axis. In this operation example, control processor 11 causes slider 1913 to be positioned vertically below third connector 1720*c*. This shifts the position of the center of gravity of vehicle main body 1912*m* to a position vertically below third connector 1720*c*.

Control processor 11 then rotates side propeller 22*a*1 by controlling the rear third propeller actuation motor 22*a*3. With this, unmanned aerial vehicle 10*m*1 moves forward and first connector 1720*a* and fourth connector 1720*d* pass vertically below coupler 1632*a*, as illustrated in (c) in FIG. 91. At this time, since rail 7*a*2 is inclined relative to rail 7*a*1, even if first connector 1720*a* is closed, the first and second hooks may come into contact with rail 7*a*2, as shown by the dashed line, and first connector 1720*a* may not be able to couple to rail 7*a*2.

Figure 92:
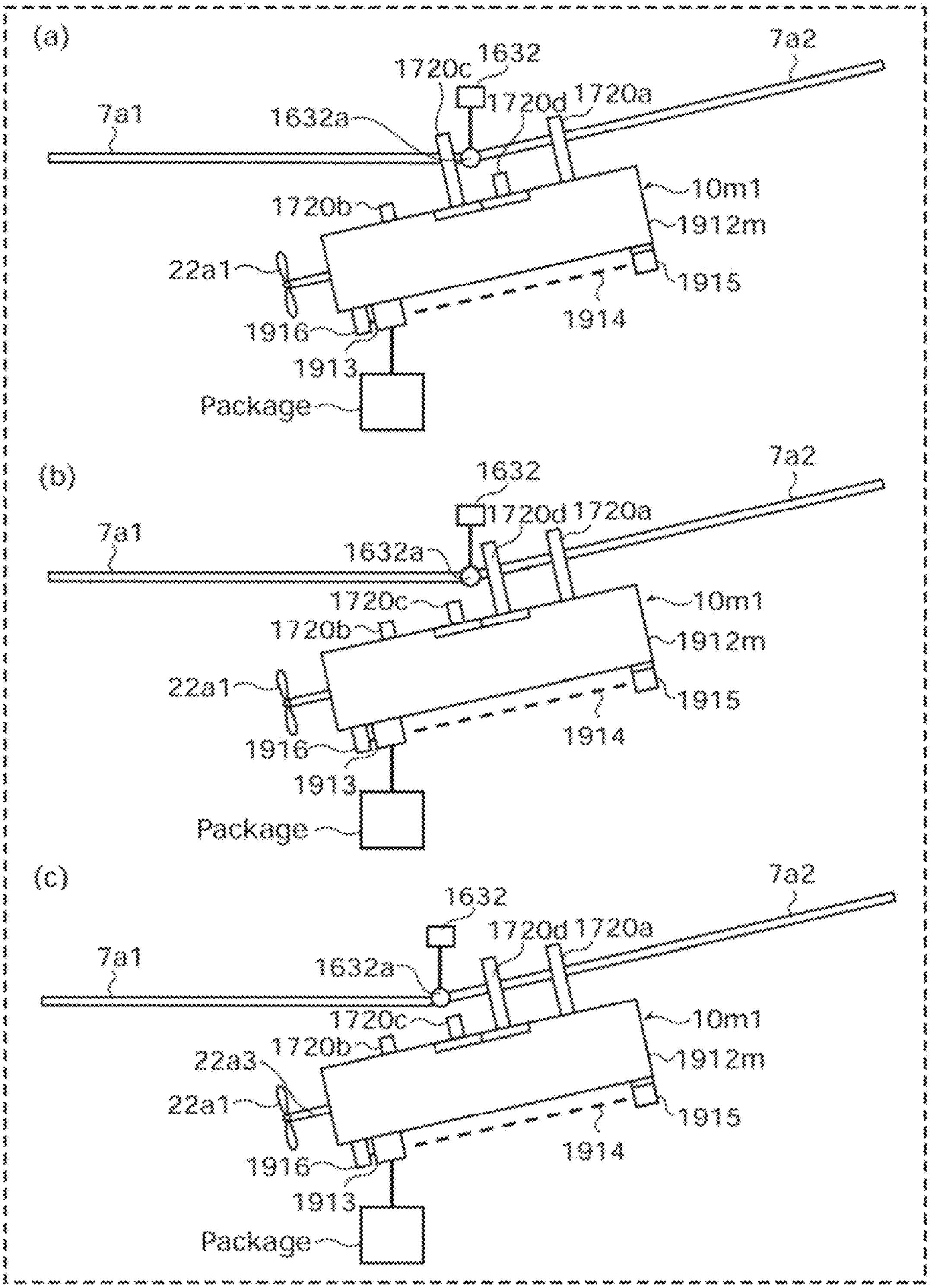
FIG. 92 is a schematic diagram illustrating an example of the connecting of the first connector and a fourth connector to an inclined rail by moving rearward the center of gravity of the vehicle main body of the unmanned aerial vehicle according to Variation 2 of Embodiment 8.

FIG. 92 is a schematic diagram illustrating an example of the connecting of first connector 1720*a* and fourth connector 1720*d* to inclined rail 7*a*2 by moving rearward the center of gravity of vehicle main body 1912*m* of unmanned aerial vehicle 10*m* according to Variation 2 of Embodiment 8.

As illustrated in (a) in FIG. 92, control processor 11 pivots the first and second hooks of second connector 1720*b* to open second connector 1720*b*. Control processor 11 also controls slider motor 1915 to move slider 1913 further toward the rear of vehicle main body 1912*m*. This shifts the position of the center of gravity of vehicle main body 1912*m* toward the rear of vehicle main body 1912*m*.

Accordingly, the front of vehicle main body 1912*m* is lifted to tilt vehicle main body 1912*m* so that the attitude of vehicle main body 1912*m* is in line with rail 7*a*2. Control processor 11 pivots the first and second hooks of first connector 1720*a* to close first connector 1720*a*. This connects first connector 1720*a* to rail 7*a*2.

As illustrated in (b) in FIG. 92, control processor 11 pivots the first and second hooks of fourth connector 1720*d* to close fourth connector 1720*d*. This connects fourth connector 1720*d* to rail 7*a*2. The first and second hooks of third connector 1720*c* are pivoted to open third connector 1720*c*.

As illustrated in (c) in FIG. 92, control processor 11 controls rear third propeller actuation motor 22*a*3 to rotate side propeller 22*a*1. With this, unmanned aerial vehicle 10*m*1 moves forward, and third connector 1720*c* and second connector 1720*b* pass vertically below coupler 1632*a* in this order, as illustrated in (c) in FIG. 92 and (a) in FIG. 93.

Figure 93:
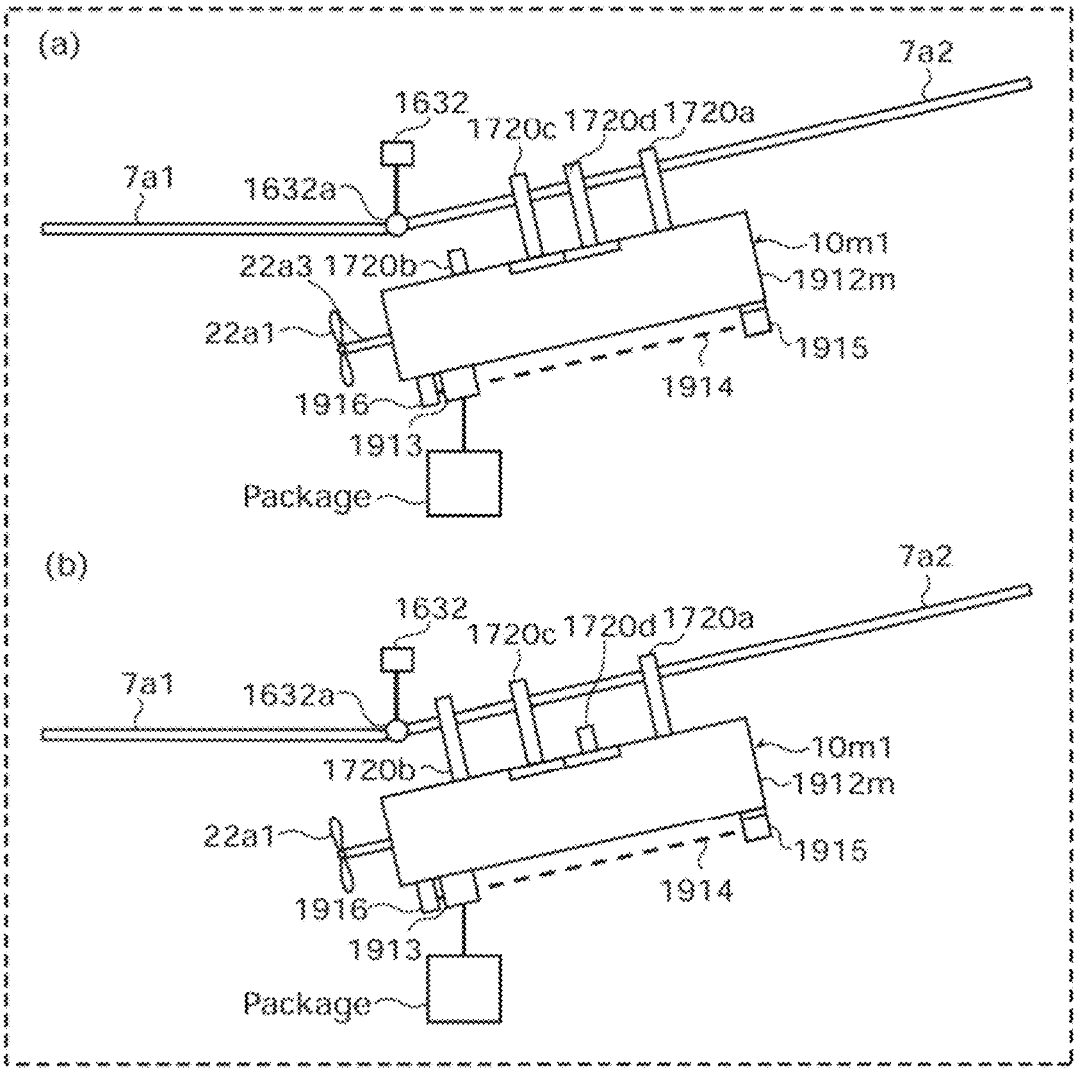
FIG. 93 is a schematic diagram illustrating an example of the connecting of the second connector and the third connector to the inclined rail and the disconnecting of the fourth connector from the inclined rail by moving rearward the center of gravity of the vehicle main body of the unmanned aerial vehicle according to Variation 2 of Embodiment 8.

FIG. 93 is a schematic diagram illustrating an example of the connecting of second connector 1720*b* and third connector 1720*c* to inclined rail 7*a*2 and disconnecting fourth connector 1720*d* from inclined rail 7*a*2 by moving rearward the center of gravity of vehicle main body 1912*m* of unmanned aerial vehicle 10*m* according to Variation 2 of Embodiment 8.

As illustrated in (a) in FIG. 93, control processor 11 pivots the first and second hooks of third connector 1720*c* to close third connector 1720*c*. This connects third connector 1720*c* to rail 7*a*2.

As illustrated in (b) in FIG. 93, control processor 11 pivots the first and second hooks of second connector 1720*b* to close second connector 1720*b*. This connects second connector 1720*b* to rail 7*a*2. Control processor 11 also pivots the first and second hooks of fourth connector 1720*d* to open fourth connector 1720*d*. This disconnects fourth connector 1720*d* from rail 7*a*2. Control processor 11 then rotates side propeller 22*a*1 by controlling the rear third propeller actuation motor 22*a*3. This causes unmanned aerial vehicle 10*m*1 to move forward.

Embodiment 9

Configuration

Hereinafter, since the basic configuration of unmanned aerial vehicle 10*n* according to the present embodiment is the same as the basic configuration of the unmanned aerial vehicle according to Embodiment 5 and the like, repeated description of the basic configuration of unmanned aerial vehicle 10*n* in the present embodiment will be omitted where appropriate. The present embodiment differs from Embodiment 5, etc., in that first connector 1720*a* of unmanned aerial vehicle 10*n* is eccentric about the approximate center of vehicle main body 1912. The present embodiment may also be used with lifting systems and unmanned aerial vehicles according to embodiments other than Embodiment 5.

Figure 94:
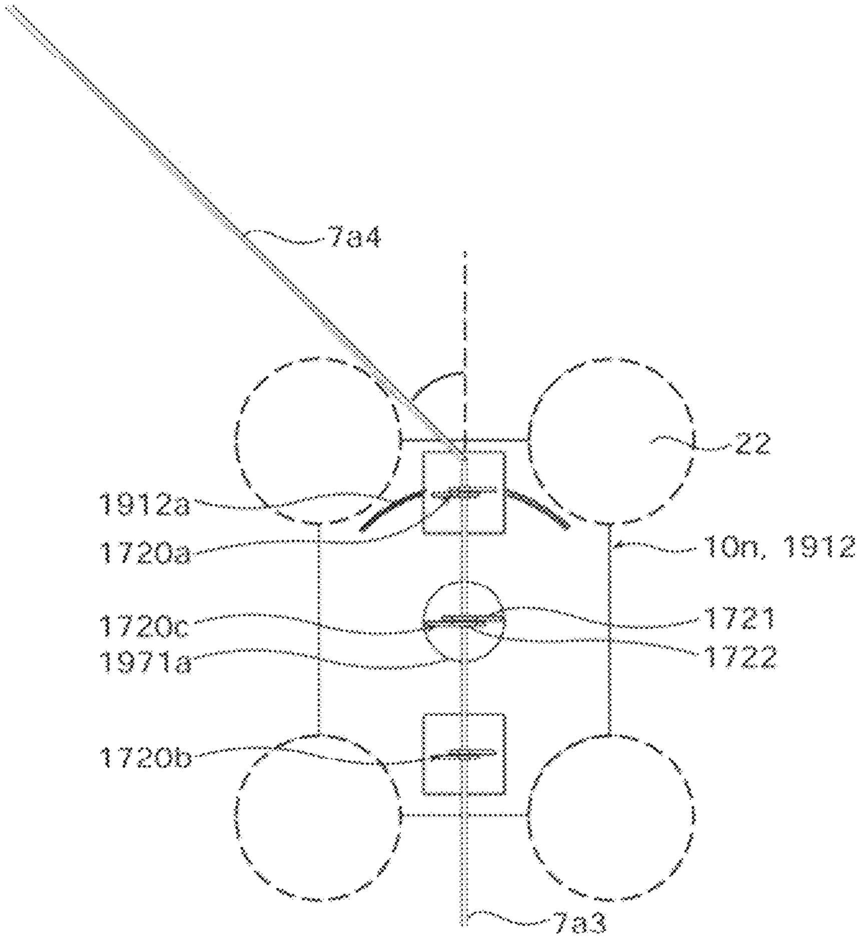
FIG. 94 is a schematic diagram illustrating an example of an unmanned aerial vehicle according to Embodiment 9.
Figure 95:
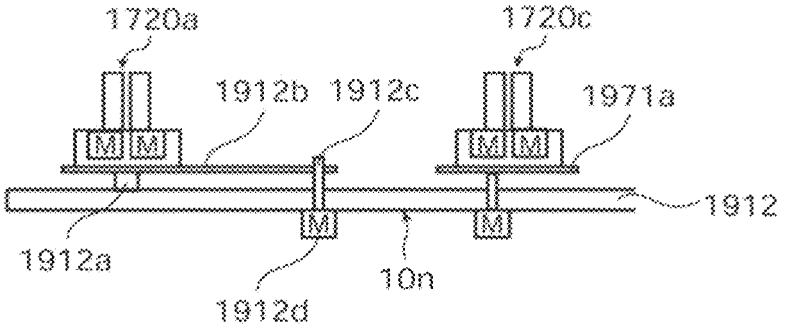
FIG. 95 is a schematic diagram illustrating an example of a first connector and a third connector of the unmanned aerial vehicle according to Embodiment 9 as viewed from the side.
Figure 96:
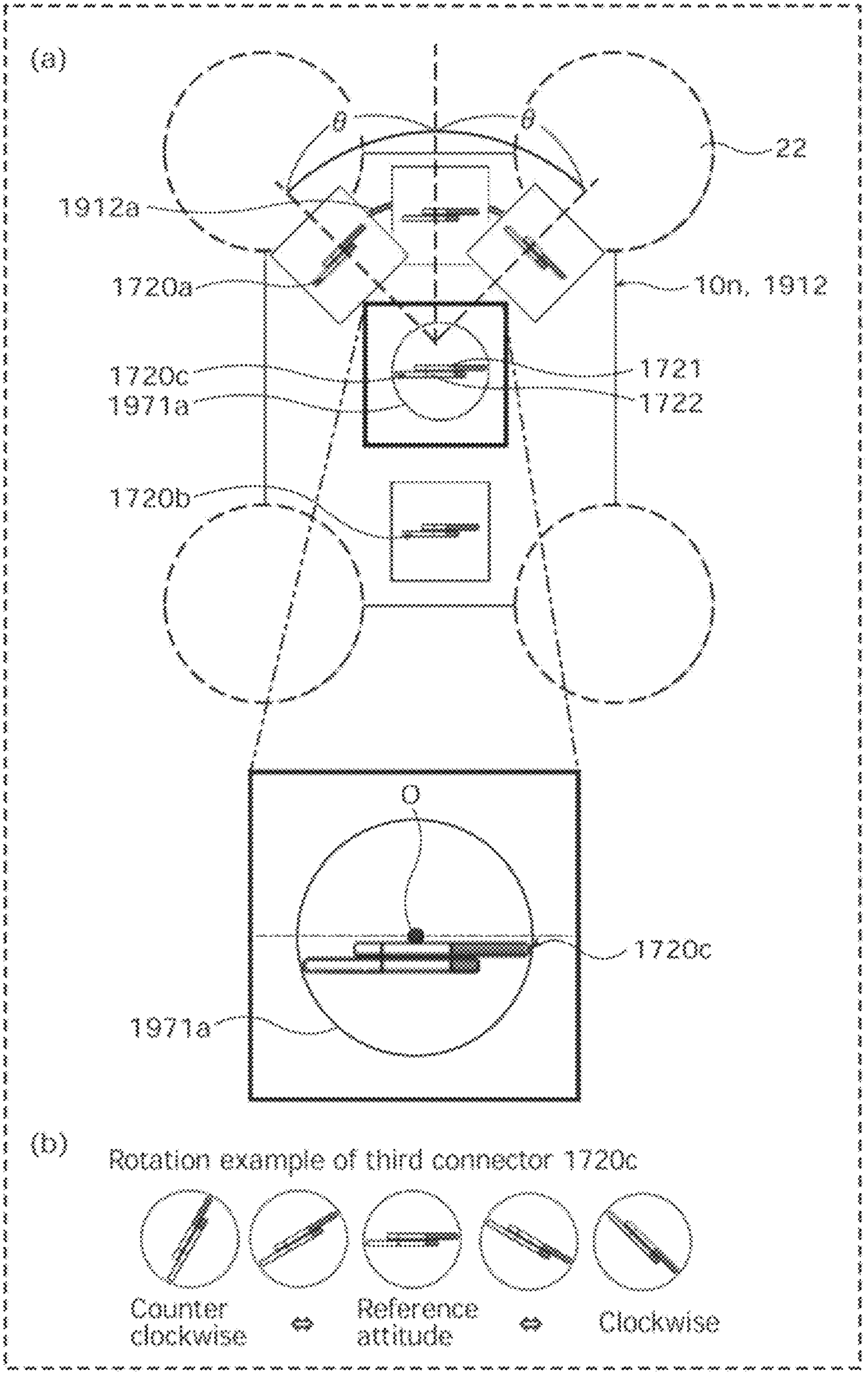
FIG. 96 includes a plan view illustrating an example of the unmanned aerial vehicle in Embodiment 9 and an enlarged partial view of the third connector and a turntable, and a schematic diagram illustrating an example of the third connector and the turntable rotating around a central point.

FIG. 94 is a schematic diagram illustrating an example of unmanned aerial vehicle 10*n* according to Embodiment 9. FIG. 95 is a schematic diagram illustrating an example of first connector 1720*a* and third connector 1720*c* of unmanned aerial vehicle 10*n* according to Embodiment 9 as viewed from the side. In FIG. 96, (a) is a plan view illustrating an example of unmanned aerial vehicle 10*n* in Embodiment 9 and an enlarged partial view of third connector 1720*c* and turntable 1971*a*, and (b) is a schematic diagram illustrating an example of third connector 1720*c* and turntable 1971*a* rotating around a central point.

As illustrated in FIG. 94 through FIG. 96, first connector 1720*a* is provided in vehicle main body 1912 so that it moves predetermined angle θ about the approximate center of vehicle main body 1912. First connector 1720*a* moves in an arc defined by a predetermined angle θ between the lengthwise direction of vehicle main body 1912 and a line connecting the approximate center of vehicle main body 1912 and first connector 1720*a*. In the present embodiment, the predetermined angle θ is approximately 90°.

Accordingly, guide rail 1912*a* is formed on vehicle main body 1912 to allow first connector 1720*a* to slide. More specifically, unmanned aerial vehicle 10*n* includes rotating plate 1912*b* that rotates along the direction in which guide rail 1912*a* extends, rotary shaft 1912*c* that permits rotation of rotating plate 1912*b*, and motor 1912*d* that rotates rotary shaft 1912*c*.

As illustrated in FIG. 95, first connector 1720*a* is coupled and fixed to the upper surface of rotating plate 1912*b*. Rotating plate 1912*b* is also coupled to rotary shaft 1912*c* and rotates around the axis of rotary shaft 1912*c*. As rotating plate 1912*b* rotates, it is guided by guide rail 1912*a* of vehicle main body 1912, which restricts the amount of rotation of rotating plate 1912*b*. Guide rail 1912*a* is arc-shaped with an angle of approximately 90° around the center of rotary shaft 1912*c*. Rotary shaft 1912*c* is fixed to the center portion of vehicle main body 1912. More specifically, rotary shaft 1912*c* is fixed to vehicle main body 1912 in an attitude in which the extension line of its axial center is approximately orthogonal to the virtual plane described above. In the present embodiment, rotary shaft 1912*c* is essentially positioned between first connector 1720*a* and third connector 1720*c*.

Third connector 1720*c* according to the present embodiment is also located further away from the center point O of turntable 1971*a* (one example of the first fixed portion). Therefore, as illustrated in (a) and (b) in FIG. 96, third connector 1720*c* is eccentric about center point O with the rotation of turntable 1971*a*.

Operation Example

Figure 97:
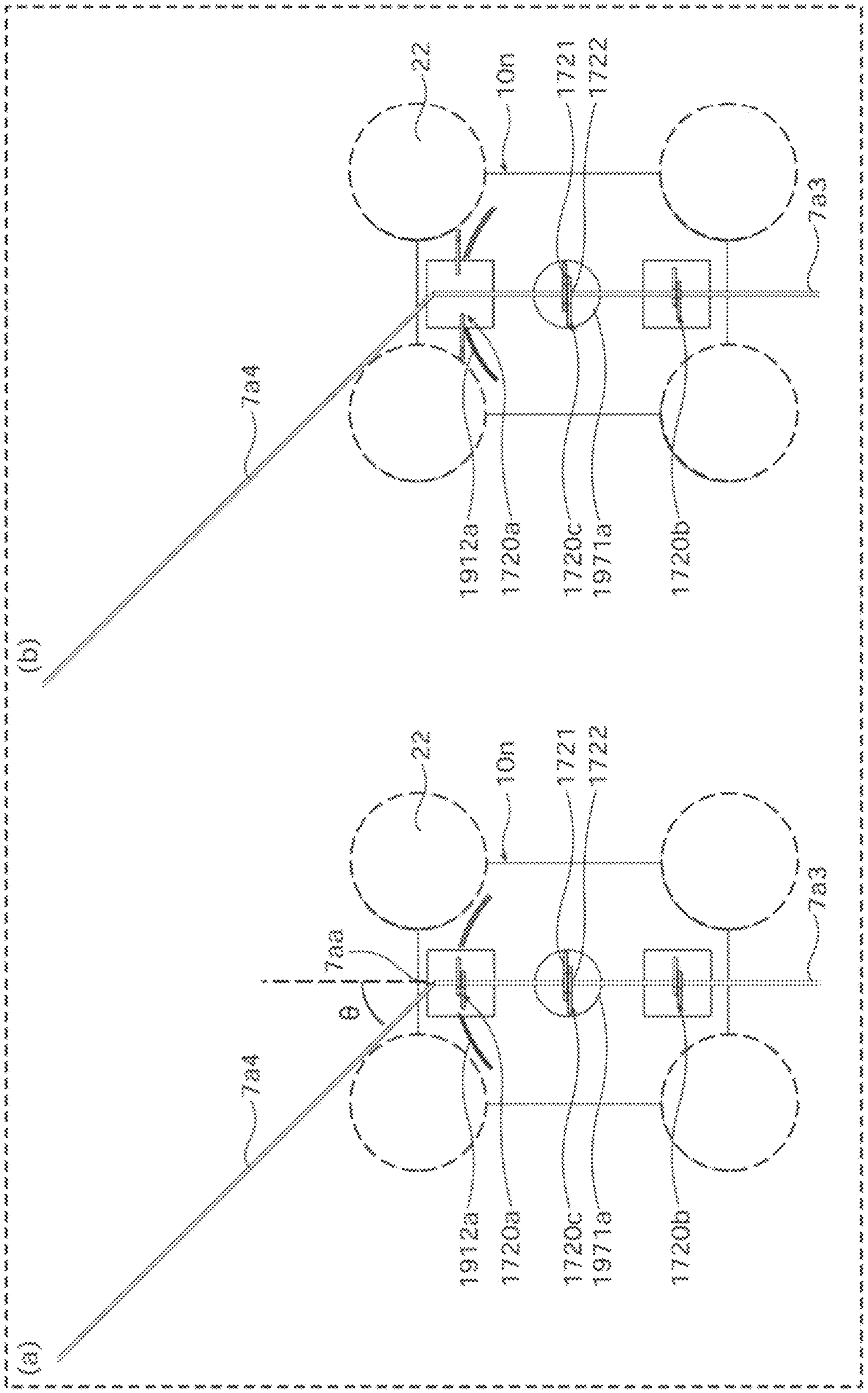
FIG. 97 is a schematic diagram illustrating an example of the first connector of the unmanned aerial vehicle according to Embodiment 9 opening.
Figure 98:
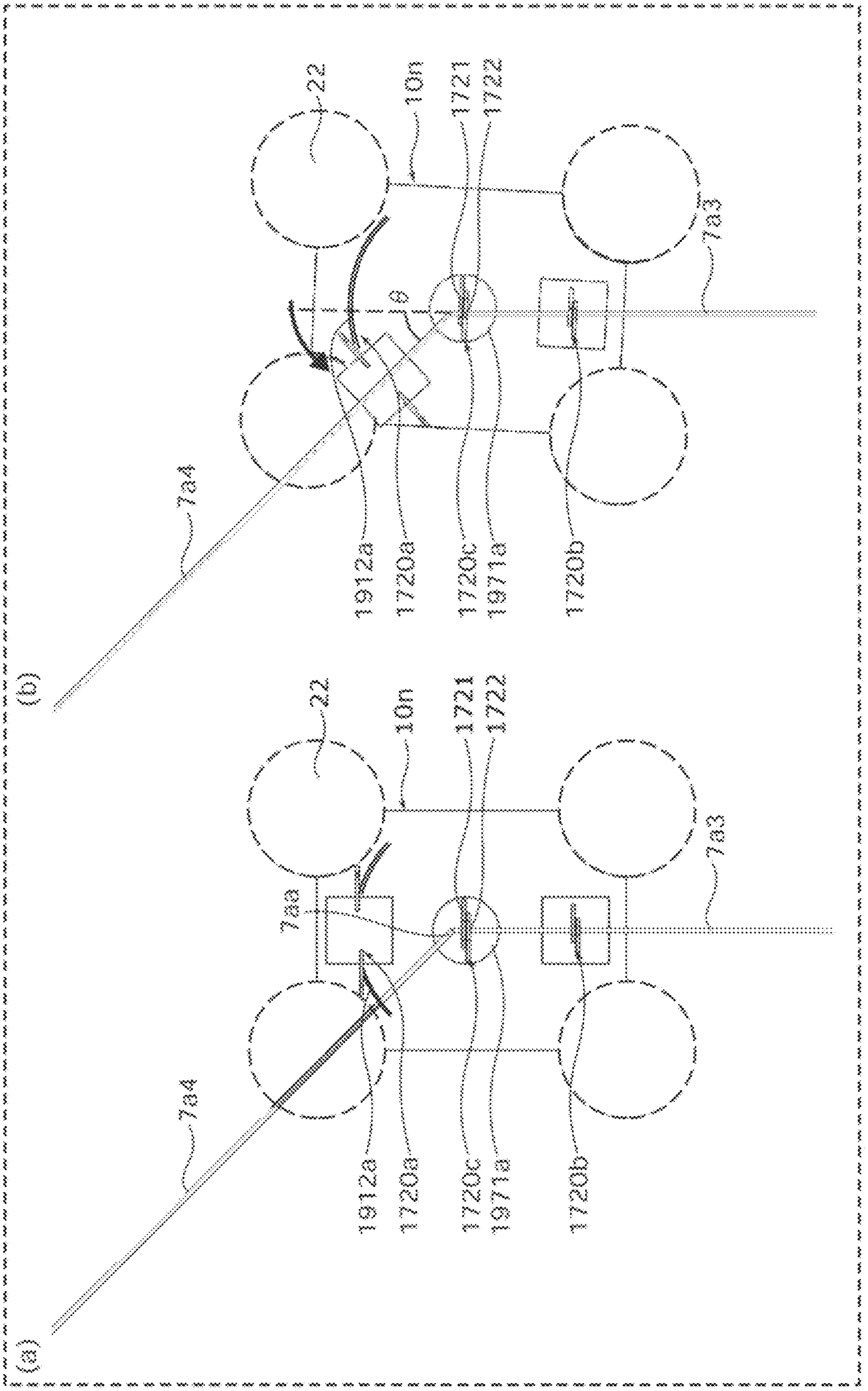
FIG. 98 is a schematic diagram illustrating an example of the first connector of the unmanned aerial vehicle according to Embodiment 9 becoming eccentric relative to the axial center of a rotary shaft.
Figure 99:
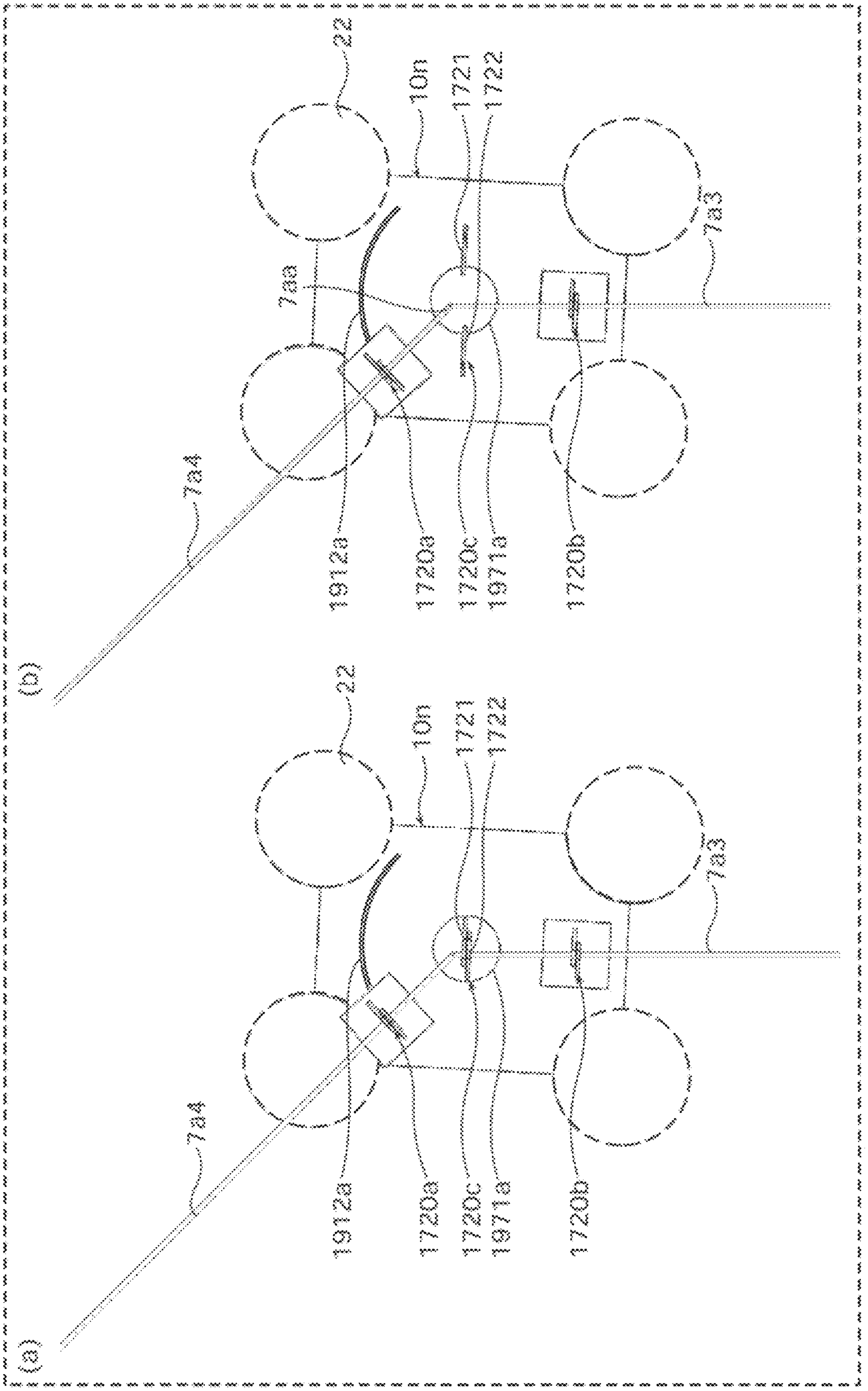
FIG. 99 is a schematic diagram illustrating an example of the first connector of the unmanned aerial vehicle according to Embodiment 9 closing and the third connector of the unmanned aerial vehicle according to Embodiment 9 opening.
Figure 100:
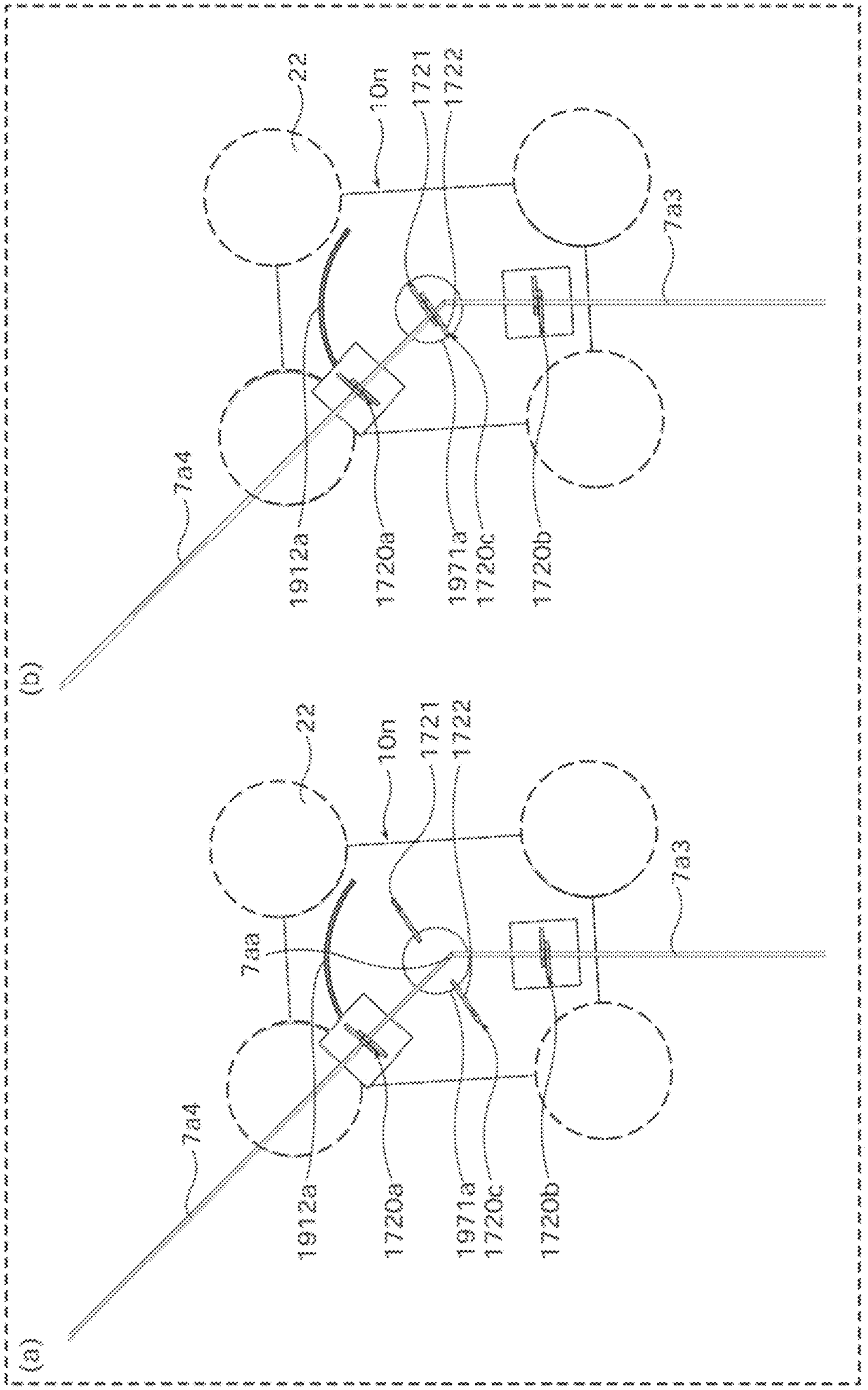
FIG. 100 is a schematic diagram illustrating an example of how the third connector of the unmanned aerial vehicle according to Embodiment 9 is eccentric with respect to the center point of the turntable and the third connector closing.
Figure 101:
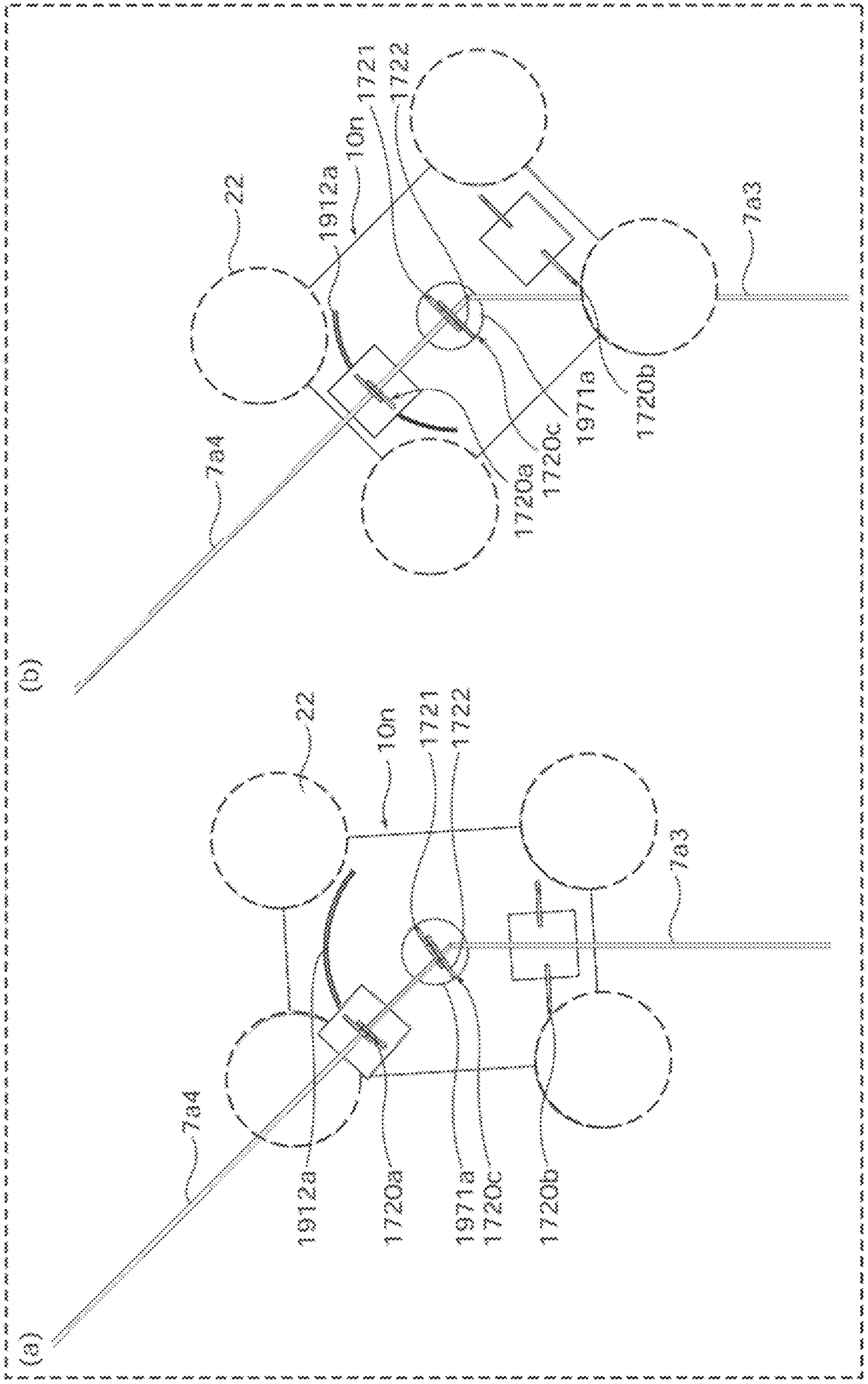
FIG. 101 is a schematic diagram illustrating an example of the second connector of the unmanned aerial vehicle according to Embodiment 9 opening and the vehicle main body rotating.
Figure 102:
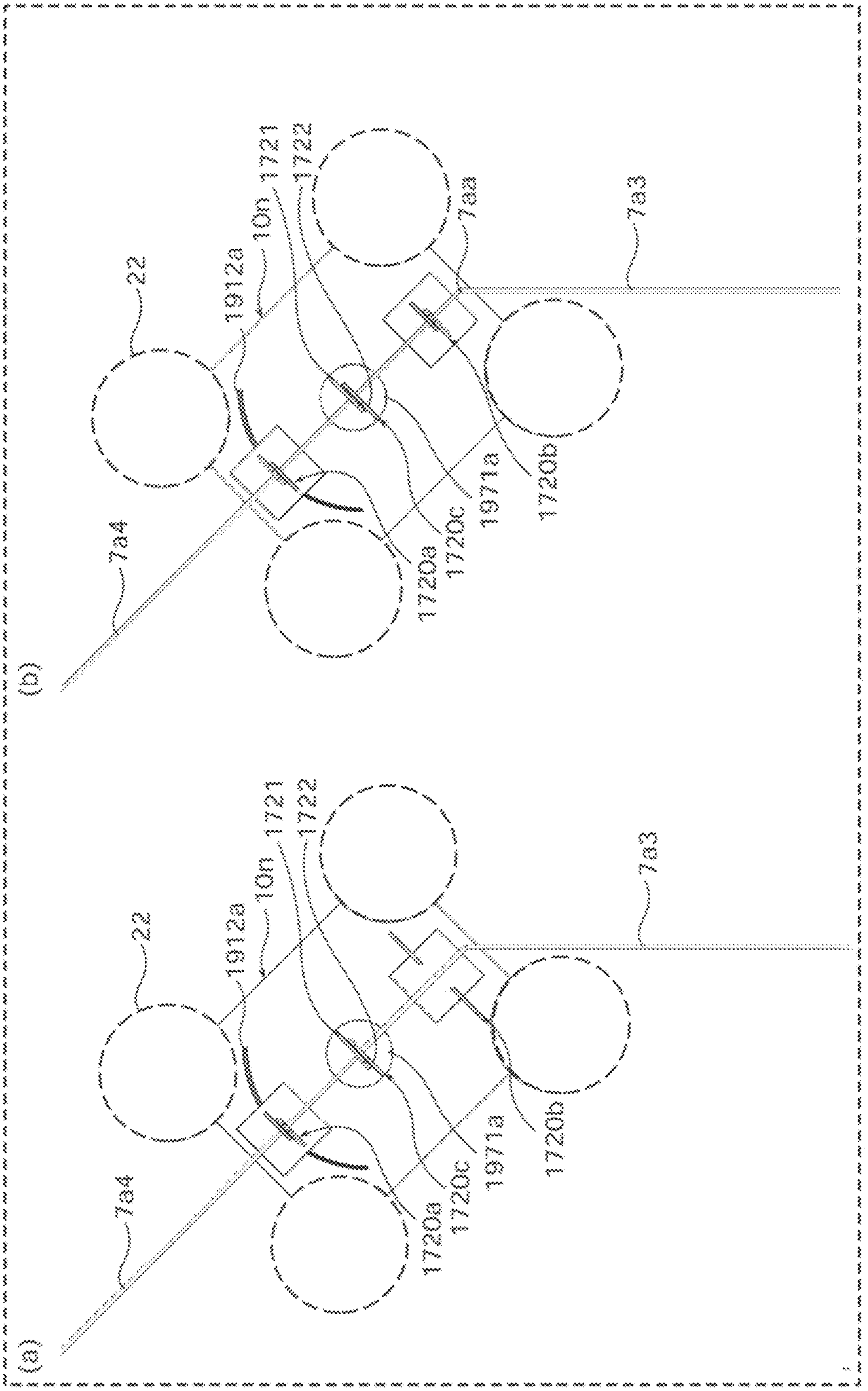
FIG. 102 is a schematic diagram illustrating an example of the second connector of the unmanned aerial vehicle according to Embodiment 9 closing.

First, an example will be given of unmanned aerial vehicle 10*n* switching from rail 7*a*3 to rail 7*a*4, as illustrated in FIG. 97 through FIG. 102. FIG. 97 is a schematic diagram illustrating an example of first connector 1720*a* of unmanned aerial vehicle 10*n* according to Embodiment 9 opening. FIG. 98 is a schematic diagram illustrating an example of first connector 1720*a* of unmanned aerial vehicle 10*n* according to Embodiment 9 becoming eccentric relative to the axial center of rotary shaft 1912*c*. FIG. 99 is a schematic diagram illustrating an example of first connector 1720*a* of unmanned aerial vehicle 10*n* according to Embodiment 9 closing and third connector 1720*c* of unmanned aerial vehicle 10*n* according to Embodiment 9 opening. FIG. 100 is a schematic diagram illustrating an example of how third connector 1720*c* of unmanned aerial vehicle 10*n* according to Embodiment 9 is eccentric with respect to the center point of turntable 1971*a* and third connector 1720*c* closing. FIG. 101 is a schematic diagram illustrating an example of second connector 1720*b* of unmanned aerial vehicle 10*n* according to Embodiment 9 opening and vehicle main body 1912 rotating. FIG. 102 is a schematic diagram illustrating an example of second connector 1720*b* of unmanned aerial vehicle 10*n* according to Embodiment 9 closing.

As illustrated in (a) in FIG. 97, the rails in this operation include rail 7*a*3, which extends in a direction approximately parallel to the horizontal plane, and rail 7*a*4, which extends in a direction approximately parallel to the horizontal plane and is angled relative to rail 7*a*3. More specifically, one end of rail 7*a*3 is connected to the other end of rail 7*a*4. The connection portion between rail 7*a*3 and rail 7*a*4 may be referred to as bend 7*aa*. In this operation, unmanned aerial vehicle 10*n* is exemplified as traveling from rail 7*a*3 toward rail 7*a*4.

Unmanned aerial vehicle 10*n* travels along rail 7*a*3 by rear third propeller actuation motor 22*a*3 rotating side propeller 22*a*1, as shown, for example, in FIG. 58A. Control processor 11 determines whether the distance between rail 7*a*4 and first connector 1720*a* is less than a predetermined distance.

If the distance between rail 7*a*4 and first connector 1720*a* is less than the predetermined distance, control processor 11 pivots first hook 1721 and second hook 1722 of first connector 1720*a* as illustrated in (b) in FIG. 97 to open first connector 1720*a*, because first connector 1720*a* is close to bend 7*aa*. At this time, control processor 11, as illustrated in FIG. 1A, etc., controls third propeller actuation motor 22*a*3 to stop the rotation of side propeller 22*a*1. This causes unmanned aerial vehicle 10*n* to stop traveling.

When first connector 1720*a* opens, control processor 11 then rotates side propeller 22*a*1 by controlling the rear third propeller actuation motor 22*a*3. This causes unmanned aerial vehicle 10*n* to move forward until first connector 1720*a* passes vertically below bend 7*aa* and third connector 1720*c* approaches rail 7*a*4, as illustrated in (a) in FIG. 98. If the distance between rail 7*a*4 and third connector 1720*c* is less than the predetermined distance, control processor 11 controls third propeller actuation motor 22*a*3 to stop the rotation of side propeller 22*a*1. This causes unmanned aerial vehicle 10*n* to stop traveling.

Control processor 11 actuates motor 1912*d* to rotate rotary shaft 1912*c* of FIG. 95. More specifically, control processor 11 actuates motor 1912*d* to rotate rotary shaft 1912*c* of FIG. 95 so that first connector 1720*a* overlaps rail 7*a*4 in the top view. As illustrated in FIG. 95 and (b) in FIG. 98, this causes first connector 1720*a* to move to a position vertically below rail 7*a*4 by the rotation of rotary shaft 1912*c* causing rotating plate 1912*b* to rotate (counterclockwise) about the axis of rotation of rotary shaft 1912*c*. This places first connector 1720*a* vertically below rail 7*a*4. In the present embodiment, first connector 1720*a* is located on the left side of vehicle main body 1912 in the top view. First connector 1720*a* may be positioned on the right side of vehicle main body 1912 in the top view, depending on how bend 7*aa* bends.

As illustrated in FIG. 99, control processor 11 pivots first hook 1721 and second hook 1722 of first connector 1720*a* to close first connector 1720*a*. First connector 1720*a* connects to rail 7*a*4 by first connector 1720*a* closing.

Control processor 11 opens third connector 1720*c* by pivoting first hook 1721 and second hook 1722 of third connector 1720*c*, as illustrated in (b) in FIG. 99, when first connector 1720*a* closes because third connector 1720*c* is close to bend 7*aa*.

When third connector 1720*c* opens, control processor 11 then rotates side propeller 22*a*1 by controlling the rear third propeller actuation motor 22*a*3. This causes unmanned aerial vehicle 10*n* to move forward until third connector 1720*c* passes vertically below bend 7*aa*, as illustrated in (a) in FIG. 100.

When third connector 1720*c* of unmanned aerial vehicle 10*n* passes vertically below bend 7*aa*, control processor 11 stops the rotation of side propeller 22*a*1 by controlling the rear third propeller actuation motor 22*a*3. This causes unmanned aerial vehicle 10*n* to stop at a point immediately after third connector 1720*c* passes vertically below bend 7*aa*.

Control processor 11 causes the open third connector 1720*c* to be eccentric about center point O by rotating turntable 1971*a*. More specifically, control processor 11 causes third connector 1720*c* to be eccentric about center point O so that the openings of first hook 1721 and second hook 1722 of third connector 1720*c* intersect with rail 7*a*4. Third connector 1720*c* is then eccentric counterclockwise by rotation of turntable 1971*a* and moves to a position vertically below rail 7*a*4. This places third connector 1720*c* vertically below rail 7*a*4.

As illustrated in (b) in FIG. 100, control processor 11 pivots first hook 1721 and second hook 1722 of third connector 1720*c* to close third connector 1720*c*. Third connector 1720*c* connects to rail 7*a*3 by third connector 1720*c* closing.

When third connector 1720*c* closes, control processor 11 opens second connector 1720*b* by pivoting first hook 1721 and second hook 1722 of second connector 1720*b* as illustrated in (a) in FIG. 101, because second connector 1720*b* is close to bend 7*aa*.

As illustrated in FIG. 95 and (b) in FIG. 101, control processor 11 actuates motor 1912*d* to rotate rotary shaft 1912*c* to return first connector 1720*a* to its original position and rotate turntable 1971*a* to return third connector 1720*c* to its original position.

More specifically, control processor 11 rotates rotating plate 1912*b* about its axial center (clockwise) by rotating rotary shaft 1912*c* so that first connector 1720*a* is positioned in the center of vehicle main body 1912 in the width direction (so that first connector 1720*a*, third connector 1720*c*, and second connector 1720*b* line up linearly). By the rotation of rotary shaft 1912*c* rotating plate 1912*b* to rotate about its axial center (clockwise), first connector 1720*a* returns to its original position.

Control processor 11 also rotates (clockwise) turntable 1971*a* so that the plane in which first hook 1721 and second hook 1722 of third connector 1720*c* are open and the plane in which first hook 1721 and second hook 1722 of second connector 1720*b* are open are opposite (approximately parallel to) one another. By the rotation of turntable 1971*a* causing third connector 1720*c* to be eccentric (clockwise eccentric) about center point O, third connector 1720*c* returns to its original position.

Vehicle main body 1912 is also rotated (counter clockwise) by the rotational force of first connector 1720*a* and third connector 1720*c*. In this way, the planes in which first hook 1721 and second hook 1722 of the first, third, and second connectors 1720*a*, 1720*c*, and 1720*b*, respectively, are aligned so that they are opposite (approximately parallel to) one another, and all attitudes are restored.

Once vehicle main body 1912 rotates and the attitudes of the first, third, and second connectors 1720*a*, 1720*c*, and 1720*b* are all restored, control processor 11 controls the rear third propeller actuation motor 22*a*3 to rotate side propeller 22*a*1. This causes unmanned aerial vehicle 10*n* to move forward until second connector 1720*b* passes vertically below bend 7*aa*, as illustrated in (a) in FIG. 102.

When second connector 1720*b* of unmanned aerial vehicle 10*n* passes vertically below bend 7*aa*, control processor 11 stops the rotation of side propeller 22*a*1 by controlling the rear third propeller actuation motor 22*a*3. This causes unmanned aerial vehicle 10*n* to stop at a point immediately after second connector 1720*b* passes vertically below bend 7*aa*.

As illustrated in (b) in FIG. 102, control processor 11 pivots first hook 1721 and second hook 1722 of second connector 1720*b* to close second connector 1720*b*. Second connector 1720*b* connects to rail 7*a*4 by second connector 1720*b* closing.

This allows unmanned aerial vehicle 10*n* to connect from rail 7*a*3 to rail 7*a*4. Control processor 11 then rotates side propeller 22*a*1 by controlling the rear third propeller actuation motor 22*a*3. This allows unmanned aerial vehicle 10*n* to start traveling on rail 7*a*4.

Embodiment 10

Configuration

Hereinafter, since the basic configuration of lifting system 5*b* and unmanned aerial vehicle 10*n*1 according to the present embodiment is the same as the basic configuration of the lifting system and the unmanned aerial vehicle according to Embodiment 1 and the like, repeated description of the basic configuration of lifting system 5*b* and unmanned aerial vehicle 10*n*1 in the present embodiment will be omitted where appropriate. In the present embodiment, lifting system 5*b* differs from Embodiment 1 and the like in that first thruster device 110 is housed in second thruster device 130. The present embodiment may also be used with lifting systems and unmanned aerial vehicles according to embodiments other than Embodiment 1.

Figure 103:
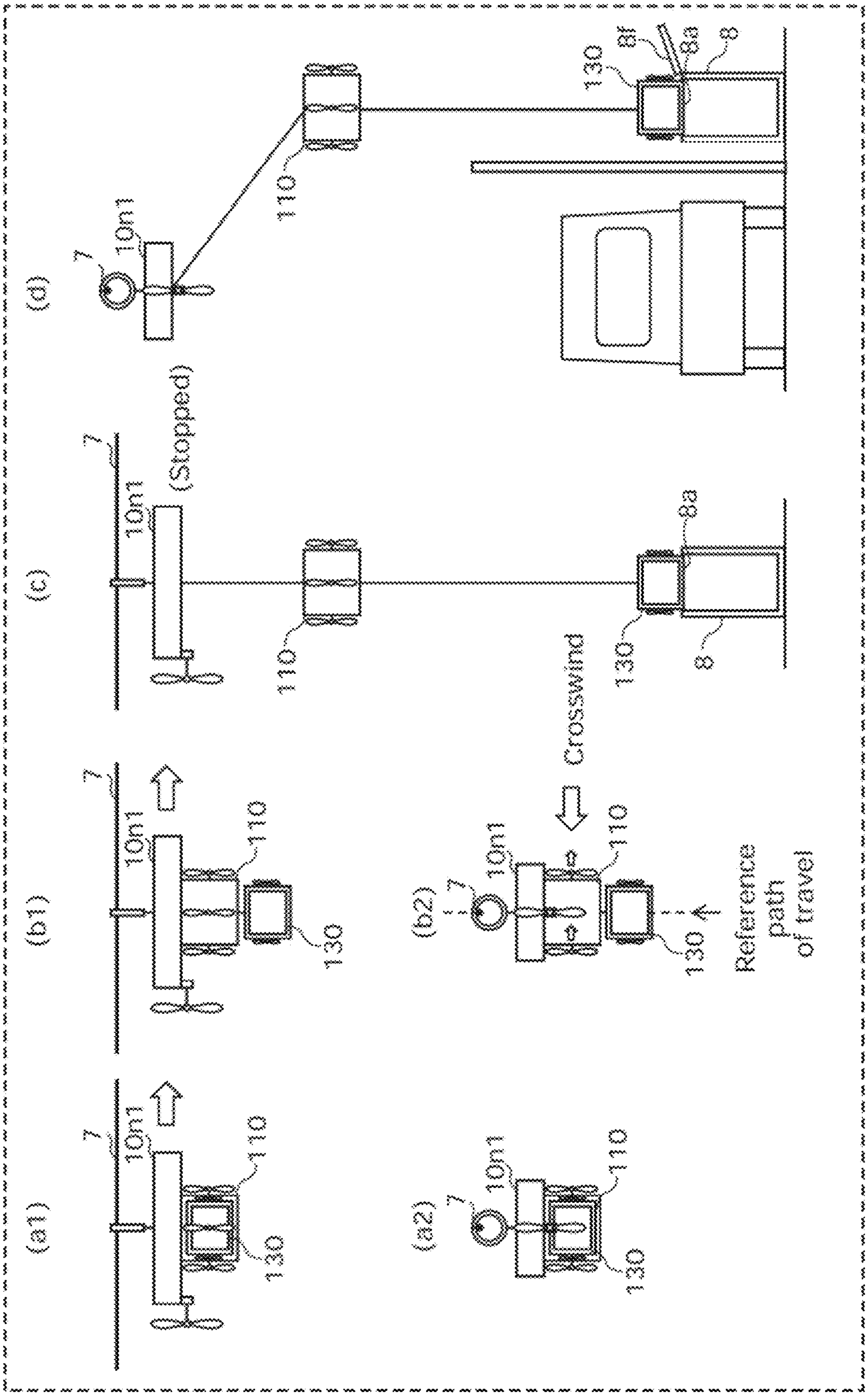
FIG. 103 is a schematic diagram illustrating an example of an unmanned aerial vehicle according to Embodiment 10 and how the unmanned aerial vehicle stores a package in a delivery box.

FIG. 103 is a schematic diagram illustrating an example of unmanned aerial vehicle **10*n*1 according to Embodiment 10 and how unmanned aerial vehicle 10*n*1 stores a package in delivery box 8. In FIG. 103, (a1) is a side view of unmanned aerial vehicle 10*n*1. In FIG. 103, (a2) is a front view of unmanned aerial vehicle 10*n*1. In FIG. 103, (b1) is a side view illustrating an example of second thruster device 130 being lowered from unmanned aerial vehicle 10*n*1. In FIG. 103, (b2) is a front view illustrating an example of second thruster device 130 being lowered from unmanned aerial vehicle 10*n*1. In FIG. 103, (c) is a side view illustrating an example of first thruster device 110 and second thruster device 130 being lowered from unmanned aerial vehicle 10*n*1 and a package being stored in delivery box 8. In FIG. 103, (d) is a side view illustrating an example of first thruster device 110 and second thruster device 130 being lowered in the horizontal direction and a package being stored in delivery box 8**.

As illustrated in (a1) and (a2) in FIG. 103, a space is formed in first thruster device 110 that can house second thruster device 130. More specifically, support member 111, as shown for example in FIG. 1A, of first thruster device 110 is a rectangular frame or enclosure, which can house second thruster device 130 inside. Support member 111 is therefore larger than second thruster device 130. Second thruster device 130 can be loaded with a package.

When unmanned aerial vehicle **10*n*1 travels, second thruster device 130 is housed in first thruster device 110. However, when unmanned aerial vehicle 10*n*1 travels, second thruster device 130 may be out of first thruster device 110**.

As illustrated in (b1) and (b2) in FIG. 103, if first thruster device 110 and second thruster device 130 are exposed to a crosswind while traveling, first thruster device 110 and second thruster device 130 rotate propellers 113, which are located on the surface opposite the crosswind, to reduce the effects of the crosswind so that unmanned aerial vehicle **10*n*1 does not deviate from the reference path of travel. Unmanned aerial vehicle 10*n*1** may be equipped with, for example, an anemometer.

When unmanned aerial vehicle **10*n*1 arrives to a position vertically above delivery box 8, unmanned aerial vehicle 10*n*1 lowers both first thruster device 110 and second thruster device 130. If first thruster device 110 and second thruster device 130 are still exposed to a crosswind during their descent, first thruster device 110 and second thruster device 130 may reduce the effects of the crosswind by rotating propellers 113**, which are located on the surface opposite the crosswind.

When first thruster device 110 and second thruster device 130 have descended a predetermined distance, only second thruster device 130 is lowered further with respect to first thruster device 110. Accordingly, in the example in (c) in FIG. 103, second thruster device 130 arrives at the plane of opening **8*a* of delivery box 8. As described above, as illustrated in (d) in FIG. 103, when there is no rail 7 vertically above delivery box 8, first thruster device 110 and second thruster device 130 may be lowered in a horizontally downward direction to a position vertically above delivery box 8 so that second thruster device 130 arrives at the plane of opening 8*a* of delivery box 8**.

Figure 104:
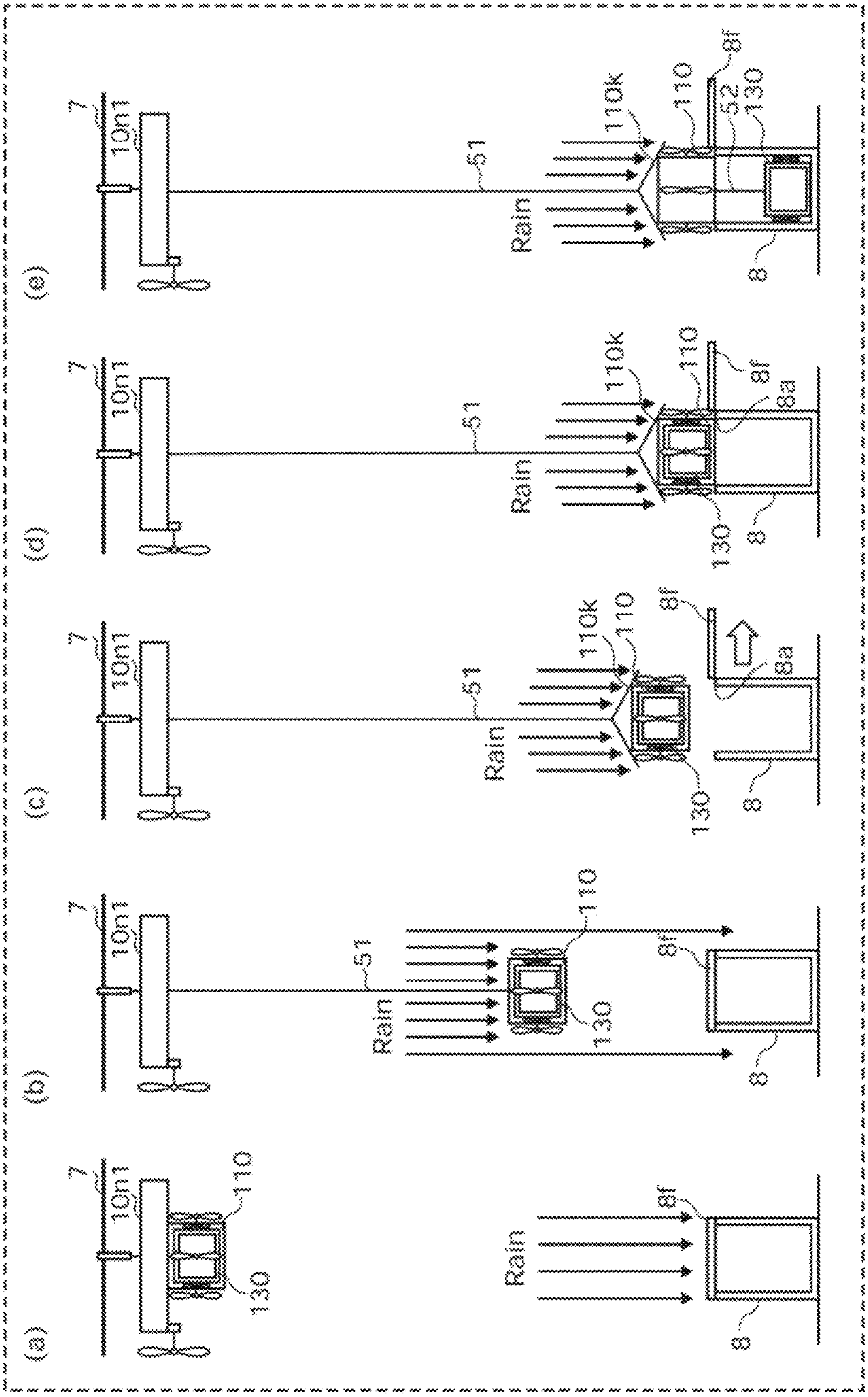
FIG. 104 is a schematic diagram illustrating an example of the unmanned aerial vehicle according to Embodiment 10 storing a package in the delivery box in the rain.

Unmanned aerial vehicle **10*n*1 may also include umbrella 110*k*, as illustrated in FIG. 104 to be described below. For example, in the case of rain, snow, or other weather conditions, when second thruster device 130 of unmanned aerial vehicle 10*n*1 puts a package into delivery box 8, delivery box 8 must have its lid 8*f* (one example of a door) opened, but if lid 8*f* is open, rain, snow, or other elements get inside delivery box 8. First thruster device 110 may therefore include umbrella 110*k*. For example, umbrella 110*k* is positioned on the vertical upper surface of support member 111 of first thruster device 110. If the weather is not rainy, snowy, etc., umbrella 110*k* may be folded (closed). Umbrella 110*k*, when open, is conical, pyramidal, hemispherical, etc. Umbrella 110*k* may also be opened during rain, snow, or other weather conditions. The opening and closing of umbrella 110*k* may be performed by control processor 11 of unmanned aerial vehicle 10*n*1, for example, illustrated in FIG. 104. Control processor 11 controls the actuator that opens and closes umbrella 110*k* to open and close umbrella 110*k***.

Control processor 11 may also determine the presence or absence of rain, snow, etc., by obtaining weather information from an external server or other source. Control processor 11 may also determine the presence or absence of rain, snow, etc., by capturing images of the surroundings with camera sensor 45, for example, illustrated in FIG. 104.

Operation Example

FIG. 104 is a schematic diagram illustrating an example of unmanned aerial vehicle **10*n*1 according to Embodiment 10 storing a package in delivery box 8 in the rain. This operation example assumes that it is raining in the surrounding area. In this operation example, second thruster device 130** is loaded with a package.

As illustrated in (a) and (b) in FIG. 104, unmanned aerial vehicle **10*n*1 first arrives at a position vertically above delivery box 8, which is the receiver, while connected to rail 7. When unmanned aerial vehicle 10*n*1 arrives, thruster controller 124 of first thruster device 110 illustrated in, for example, FIG. 1A controls wire control module 125 to begin reeling out wire 51. This causes first thruster device 110 and second thruster device 130** to descend with the package.

When the distance between the package and delivery box 8 reaches a predetermined distance as wire control module 125 of the first thruster device continues to reel out wire 51, as illustrated in (c) in FIG. 104, control processor 11 controls the actuator of first thruster device 110 to open umbrella **110*k* included in first thruster device 110. This makes it difficult for delivery box 8, which is positioned vertically below umbrella 110*k*, to get wet even when it is raining because umbrella 110*k*** blocks the rain.

When umbrella **110*k* is opened, delivery box 8 opens lid 8*f* to open opening 8*a*. Delivery box 8 may open lid 8*f* to open opening 8*a* when second thruster device 130 or the package and delivery box 8** come even closer together.

Here, control processor 11 may cause delivery box 8 to open lid **8*f* by sending an opening instruction to delivery box 8 to open lid 8*f* via second communicator 13 illustrated in FIG. 1A, for example. If delivery box 8 includes a camera sensor, proximity sensor, or other sensor, delivery box 8 may automatically open lid 8*f* when such a sensor detects that second thruster device 130 and the package have come within a predetermined distance of delivery box 8**.

Even when opening **8*a* is open, umbrellas 110*k* can block the rain, thus preventing rain from entering the interior of delivery box 8**.

As illustrated in (d) in FIG. 104, when lid **8*f* of delivery box 8 is opened to open opening 8*a*, first thruster device 110, second thruster device 130 and the package arrive at opening 8*a*, which covers opening 8*a*. As illustrated in (e) in FIG. 104, thruster controller 124 illustrated in, for example, FIG. 1A of second thruster device 130 controls wire control module 145 to start reeling out wire 52. This lowers second thruster device 130 and the package. When second thruster device 130 lands on the bottom of delivery box 8, second thruster device 130 disconnects the package and stores the package inside delivery box 8**.

Figure 105:
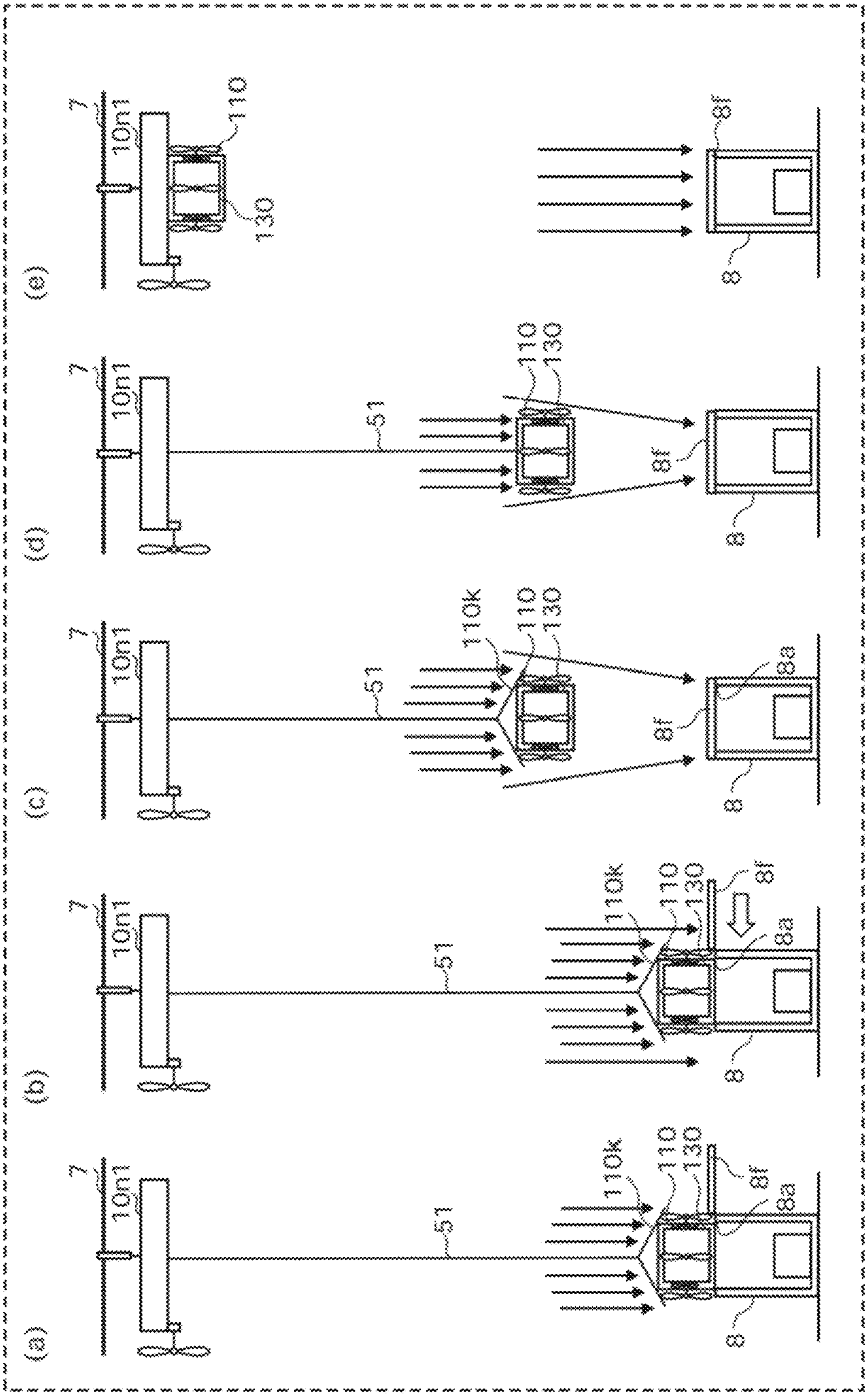
FIG. 105 is a schematic diagram illustrating an example of the unmanned aerial vehicle according to Embodiment 10 storing a package in the delivery box in the rain and then flying away.

As illustrated in (a) in FIG. 105, once the package is disconnected, thruster controller 144 of second thruster device 130 controls wire control module 145 to begin reeling in wire 52. This lifts and houses second thruster device 130 inside first thruster device 110, so thruster controller 144 of second thruster device 130 controls wire control module 145 to stop reeling in wire 52.

Once second thruster device 130 is housed inside first thruster device 110, thruster controller 124 of first thruster device 110 controls wire control module 125 to start reeling in wire 51. As a result, when first thruster device 110 and second thruster device 130 are lifted and are a predetermined distance away from the plane in which opening 8*a* of delivery box 8 opens, delivery box 8 promptly closes lid 8*f* to close opening 8*a*, as illustrated in (b) and (c) in FIG. 105.

As illustrated in (d) in FIG. 105, when lid 8*f* of delivery box 8 is closed, control processor 11 controls the actuator of first thruster device 110 to close umbrella 110*k* included in first thruster device 110.

Thruster controller 124 of first thruster device 110 controls wire control module 125 to continue reeling in wire 51, thereby raising first thruster device 110 and second thruster device 130. As illustrated in (e) in FIG. 105, since first thruster device 110 and second thruster device 130 are attached to unmanned aerial vehicle 10*n*1, thruster controller 124 of first thruster device 110 controls wire control module 125 to stop reeling in wire 51. Unmanned aerial vehicle 10*n*1 then returns to the sender.

Embodiment 11

Hereinafter, since the basic configuration of delivery box 8 according to the present embodiment is the same as the basic configuration of the delivery box according to Embodiment 1 and the like, and the basic configuration of unmanned aerial vehicle 10 according to the present embodiment is the same as the basic configuration of the unmanned aerial vehicle according to Embodiment 1 and the like, repeated description of the basic configuration of delivery box 8 and unmanned aerial vehicle 10 in the present embodiment will be omitted where appropriate. The present embodiment may also be used with lifting systems and unmanned aerial vehicles according to embodiments other than Embodiment 1.

Figure 106:
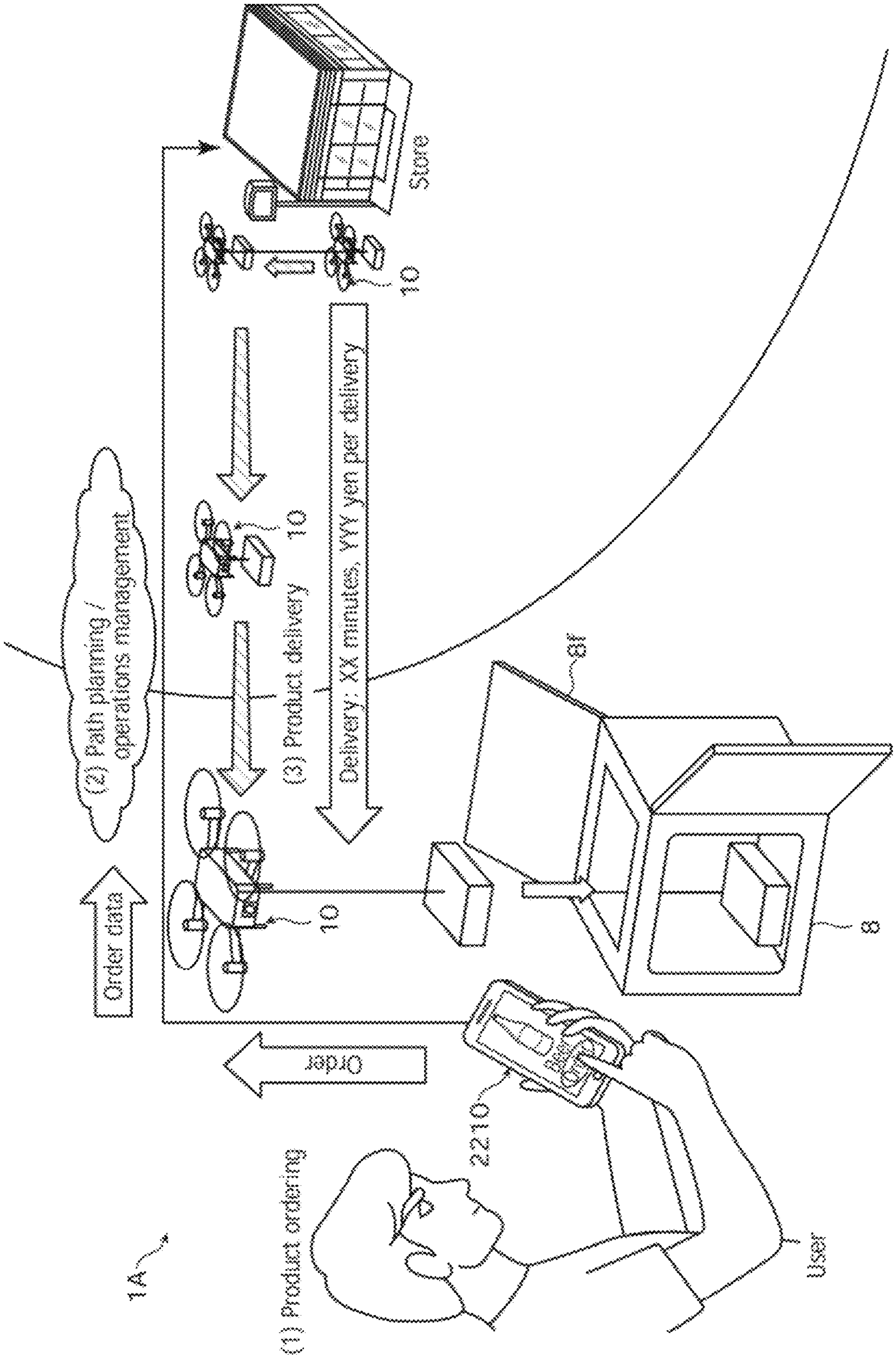
FIG. 106 is a schematic diagram illustrating an example of how a product ordered by a user is delivered using a delivery system according to Embodiment 11.

The present embodiment describes delivery system 1A (one example of a system) that uses unmanned aerial vehicle 10 to execute a flight plan for delivering a package to delivery box 8. FIG. 106 is a schematic diagram illustrating an example of how a product ordered by a user is delivered using delivery system 1A according to Embodiment 11. The package is one example of a transported item.

Outline

As illustrated in FIG. 106, for example, a user orders a product from delivery system 1A via terminal device 2210, such as a smartphone or tablet. Delivery system 1A delivers the package, which is the ordered product, to the user. Stated differently, delivery system 1A can store a package, which is an ordered product, in the user's delivery box 8. Delivery system 1A manages the packing of the package, the point in time when the package is shipped, the expected period of time for delivery, the point in time when package is delivered, etc., depending on, for example, the type and condition of the package, and stores the package in delivery box 8 when predetermined conditions are met.

However, if the user orders a product via terminal device 2210 but the interior of delivery box 8 is full, unmanned aerial vehicle 10 cannot store the package in delivery box 8. In this case, after having the package removed from inside delivery box 8 by the user, the package can be stored in empty delivery box 8. For this reason, delivery system 1A ensures that packages are delivered to delivery box 8.

When the product ordered by the user is clothing, shoes, a watch, or a bag, etc., it is normal for the user to try on the product first to determine whether the product meets their expectations. Accordingly, when the product needs to be tried on, delivery system 1A delivers the product a plurality of times to the user until the user decides to purchase the product. This allows the user to try on the product and decide whether or not to purchase the product.

If the package is frozen food, refrigerated food, ramen noodles, pizza, etc., which require temperature retention (one example of a transported item requiring cold or heat retention), package platform 2220 of unmanned aerial vehicle 10 and delivery box 8 must be able to achieve a certain level of temperature retention. Unmanned aerial vehicle 10 is also required to store the package in delivery box 8 within a predetermined period of time. Strict time management is therefore required for some types of packages. For example, frozen food such as ice cream is a package that needs to be delivered to the user while it is cold, and is a package that has a tendency to melt easily. Hot foods such as ramen noodles and home-delivered pizza are packages that need to be delivered to the user while they are still warm, and are packages that have a tendency to get cold easily. Accordingly, when delivering a product that requires temperature retention, delivery system 1A takes into account the time required for delivery, the temperature at the time of shipment, the weather, the atmospheric temperature, and other factors.

Delivery System 1A

Figure 107:
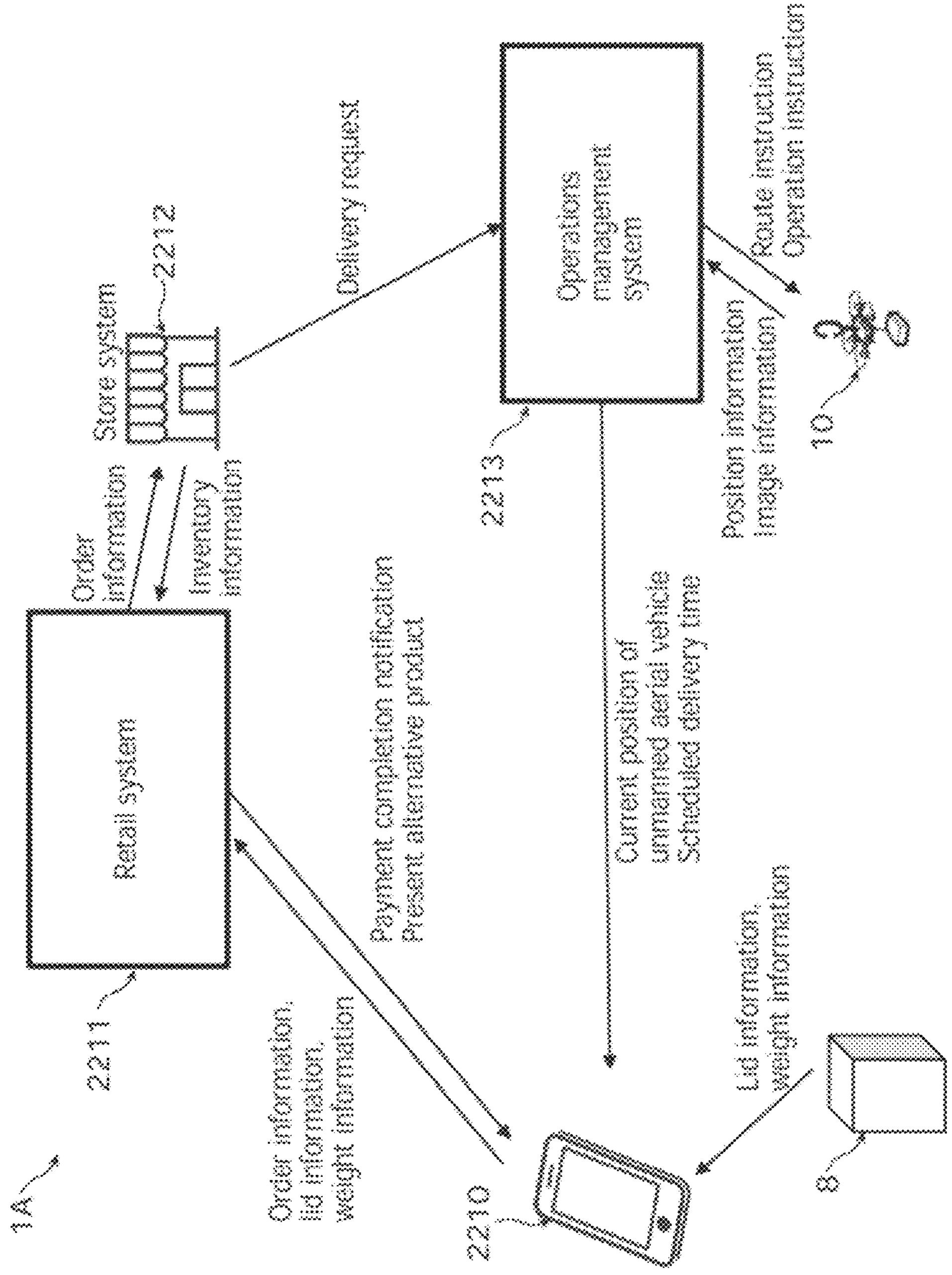
FIG. 107 is a block diagram illustrating an example of the delivery system according to Embodiment 11.

FIG. 107 is a block diagram illustrating an example of delivery system 1A according to Embodiment 11.

As illustrated in FIG. 107, delivery system 1A includes terminal device 2210, retail system 2211, a plurality of store systems 2212, operations management system 2213, unmanned aerial vehicle 10, and delivery box 8.

Terminal device 2210 is a smartphone, tablet terminal, personal computer, etc., equipped with a user application. The user application is used when the user wants to order a product from retail system 2211, and displays a menu screen of services or products on terminal device 2210. Through user operation, terminal device 2210 registers the user via a displayed menu screen.

When a user orders a product via terminal device 2210 after user registration, terminal device 2210 accesses retail system 2211, which manages store systems 2212, through user operation. The user application displays products and the inventory status of products of store systems 2212 on the menu screen. Terminal device 2210, i.e., the user application, accepts order information, which is information about an ordered product or products, through user operation, and transmits the accepted order information to retail system 2211 and to store system 2212 via retail system 2211. Here, the order information is information indicating the product(s) selected by the user, the weight of the product(s), the user's name, the user's address, the desired time of delivery (desired arrival time), etc. The desired time of delivery is the time when the package is handed directly to the user or when the package is stored in delivery box 8.

Retail system 2211 is system that manages store systems 2212. For example, retail system 2211 aggregates products for presentation to users via the user application by obtaining inventory information, which is information indicating the availability of products held by each of store systems 2212, from store systems 2212. Stated differently, retail system 2211 collectively manages the inventory status (inventory information) of all products held by each of multiple store systems 2212. Retail system 2211 also sends inventory information to terminal device 2210. This will display the products and product availability, etc., on the menu screen of the user application.

Retail system 2211 also maintains a customer database of information about registered users. The customer database is an aggregate of the information about the users. Information about the users includes, for example, user addresses, user names, user telephone numbers, user ages, user genders, and product purchase history.

When retail system 2211 receives the order information from terminal device 2210 with the decision to purchase the product, it notifies terminal device 2210 of the completion of the payment. The menu screen of the user application will then display a payment completion notification. The user recognizes that the product purchase has been completed by the display of the payment completion notification. When retail system 2211 receives the order information from terminal device 2210, it sends the order information to store system 2212 that holds the product indicated in the order information.

If the product the user is seeking is not available in store system 2212, retail system 2211 may present an alternative product similar to the product the user is seeking to terminal device 2210.

Store system 2212 is a system used by a store to deliver products ordered by users. Store system 2212 manages the delivery of products ordered by users, manages the products in the store, and manages the inventory status of products handled by the store. Store system 2212 sends inventory information to retail system 2211 at predetermined intervals.

When store system 2212 receives order information from terminal device 2210 via retail system 2211, it makes a delivery request to operations management system 2213. Stated differently, store system 2212 sends a delivery request to operations management system 2213 in response to the order information.

Operations management system 2213 manages each of a plurality of unmanned aerial vehicles 10 for delivering packages of products to users who ordered the products. Operations management system 2213 manages the operation of each of the plurality of unmanned aerial vehicles 10. For example, upon obtaining order information (one example of the first obtainment step), operations management system 2213 selects, from the plurality of unmanned aerial vehicles 10, an unmanned aerial vehicle that can deliver the package by the desired time of delivery indicated in the order information. Once the package, i.e., the product, is loaded onto the selected unmanned aerial vehicle 10, operations management system 2213 moves unmanned aerial vehicle 10 to the user's address indicated in the order information. Operations management system 2213 may also notify user's terminal device 2210 that the package cannot be delivered if there is no unmanned aerial vehicle 10 available to deliver the package by the desired time of delivery indicated in the order information. Such a notice may be displayed on the menu screen of terminal device 2210 when the user orders a product.

Unmanned aerial vehicle 10 is managed by operations management system 2213 to deliver the loaded package to the user. For example, once the package is loaded, unmanned aerial vehicle 10 travels to the user's address indicated in the order information obtained from operations management system 2213 (one example of the first obtainment step). When unmanned aerial vehicle 10 moves with a loaded package, it obtains position information indicating its own current position via the GPS sensor (one example of the second obtainment step) and image information by capturing images of the surroundings of unmanned aerial vehicle 10 via camera sensor 45. Unmanned aerial vehicle 10 transmits the obtained position information and image information to operations management system 2213 at predetermined intervals. The information transmitted by unmanned aerial vehicle 10 may be only the position information.

Unmanned aerial vehicle 10 transmits the position information and the image information to operations management system 2213 and receives control instructions such as route instructions and operation instructions from operations management system 2213. A route instruction is an instruction for unmanned aerial vehicle 10 to travel according to a travel route. The route instructions include instructions to change routes, etc. The operation instructions include instructions to stop traveling, restart traveling, and instructions for reeling in and out the wire, etc.

By having operations management system 2213 obtain image information from unmanned aerial vehicle 10, the operator can monitor the status of unmanned aerial vehicle 10. Stated differently, operations management system 2213 displays this image information to the operator, i.e., the manager.

After obtaining the position information from unmanned aerial vehicle 10, operations management system 2213 calculates the expected time of arrival, which is the time at which unmanned aerial vehicle 10 loaded with the package will arrive at the user's address, based on the position information and other data. Operations management system 2213 may further calculate the expected time of arrival more accurately based on the weight of the product, the specifications of unmanned aerial vehicle 10, the operation statuses of other unmanned aerial vehicles 10, weather conditions, and the user's address. Operations management system 2213 calculates the expected time of arrival each time it obtains position information from unmanned aerial vehicle 10 or at predetermined intervals. Operations management system 2213 transmits the information indicating the calculated expected time of arrival and the position information to terminal device 2210. This causes terminal device 2210 to display, on the menu screen of the user application, the expected time of arrival as indicated by the relevant information received from operations management system 2213, and the current position of unmanned aerial vehicle 10 as indicated by the position information.

If unmanned aerial vehicle 10 is unable to deliver a package due to a malfunction or other reason, delivery system 1A may take action such as refunding, delivering an alternative product, etc., if the package cannot be delivered while maintaining the quality of the package.

Figure 108:
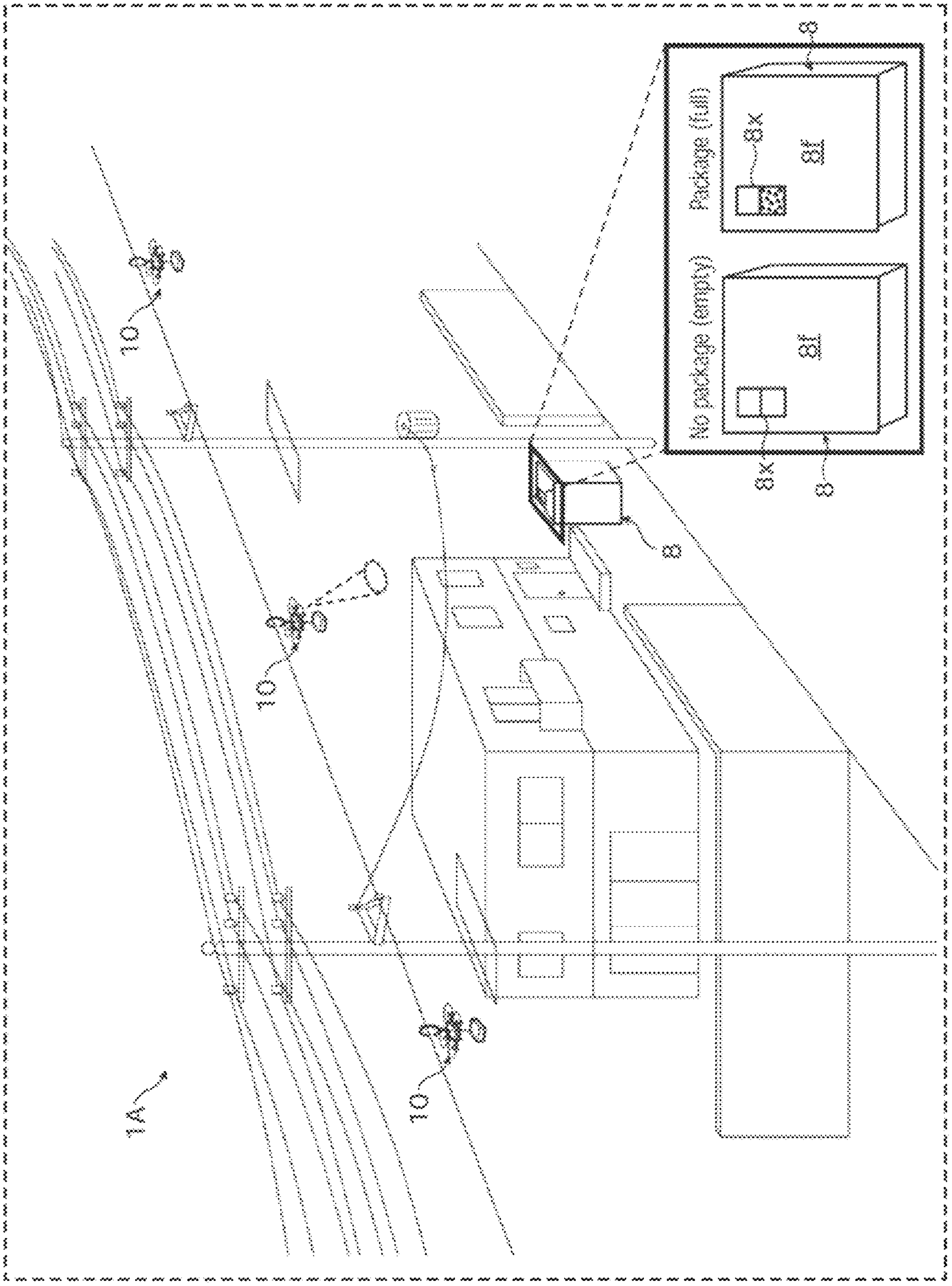
FIG. 108 is a schematic diagram illustrating an example of how the unmanned aerial vehicle of the delivery system according to Embodiment 11 recognizes a delivery box and delivers a package, and a perspective view of the delivery box.

FIG. 108 is a schematic diagram illustrating an example of how unmanned aerial vehicle 10 of delivery system 1A according to Embodiment 11 recognizes delivery box 8 and delivers a package, and a perspective view of delivery box 8.

As illustrated in FIG. 108, delivery box 8 is located, for example, at a location corresponding to the user's address indicated in the order information. When unmanned aerial vehicle 10 arrives at a position vertically above the relevant delivery box 8, unmanned aerial vehicle 10 obtains information indicating that delivery box 8 is full or information indicating that delivery box 8 is empty.

As one example, unmanned aerial vehicle 10 checks whether delivery box 8 is full or empty. More specifically, delivery box 8 displays coded medium 8*x* on its vertical upper surface that can be recognized by camera sensor 45 of unmanned aerial vehicle 10. Coded medium 8*x* indicates whether delivery box 8 is full or empty. In addition, coded medium 8*x* may indicate an ID that identifies delivery box 8, the name of the user using delivery box 8, and the address of the user. For example, when a package is stored inside delivery box 8, delivery box 8 rewrites the information to indicate that it is full, i.e., currently storing a package inside. When a package is removed from inside delivery box 8, delivery box 8 rewrites the information to indicate that it is empty, i.e., currently not storing a package inside. In the present embodiment, coded medium 8*x* is located in the area of the corner of the vertical upper surface, and is about 10 cm square.

As another example, delivery box 8 may itself check whether it is full or empty, i.e., whether it is storing a package or not. After checking whether it is full or empty, delivery box 8 may transmit to unmanned aerial vehicle 10 information indicating that it is full or information indicating that it is empty, or it may indicate this by rewriting coded medium 8*x*.

When unmanned aerial vehicle 10 reads information indicating that delivery box 8 is full, it transmits the information indicating that delivery box 8 is full to terminal device 2210 via operations management system 2213. This allows the user to recognize that unmanned aerial vehicle 10 is unable to store the package in delivery box 8 since the menu screen of terminal device 2210 displays that delivery box 8 is full. This allows the user to empty the inside of delivery box 8 by removing the package stored in delivery box 8. When the user removes the package from inside delivery box 8, the user notifies of the completion of the removal via the menu screen of terminal device 2210. This allows unmanned aerial vehicle 10 to store a package inside delivery box 8.

Delivery box 8 includes a box main body, a lid sensor, a weight sensor, and a power detection circuit.

Delivery box 8 opens its 8*f* to accept packages. When the lid sensor of delivery box 8 detects that lid 8*f* has opened, delivery box 8 sends information indicating that lid 8*f* has opened to terminal device 2210 via a communicator. When the package is stored and loaded inside delivery box 8, delivery box 8 closes lid 8*f*. When the lid sensor of delivery box 8 detects that lid 8*f* is closed, delivery box 8 presents information indicating that lid 8*f* is closed by rewriting coded medium 8*x*. Delivery box 8 may transmit information indicating that lid 8*f* is closed to terminal device 2210 via the communicator.

Delivery box 8 can also generate power via the energy from lid 8*f* opening and closing. Thus, delivery box 8 can generate power by opening and closing lid 8*f*, which is done when packages are stored in or removed from delivery box 8. Solar panels may be used to generate solar power. When the power detection circuit detects that the amount of power stored by power generation is greater than or equal to a predetermined value (one example of the measurement step of measuring the amount of power), the weight sensor detects the internal weight. When the weight sensor detects the internal weight, delivery box 8 presents weight information, which is information indicating the weight of the package, by rewriting coded medium 8*x*. Delivery box 8 may transmit weight information, which is information indicating the weight of the package, to terminal device 2210 via the communicator. This causes terminal device 2210 to display, on the user application menu screen, that lid 8*f* of delivery box 8 has been opened or closed (that lid 8*f* opened or that lid 8*f* closed) and the weight of the package. Operations management system 2213 can also determine whether or not a package is stored inside delivery box 8 based on the weight of the package.

[Temperature Retention of Package Platform 2220 of Unmanned Aerial Vehicle 10 and Delivery Box 8]

Figure 109:
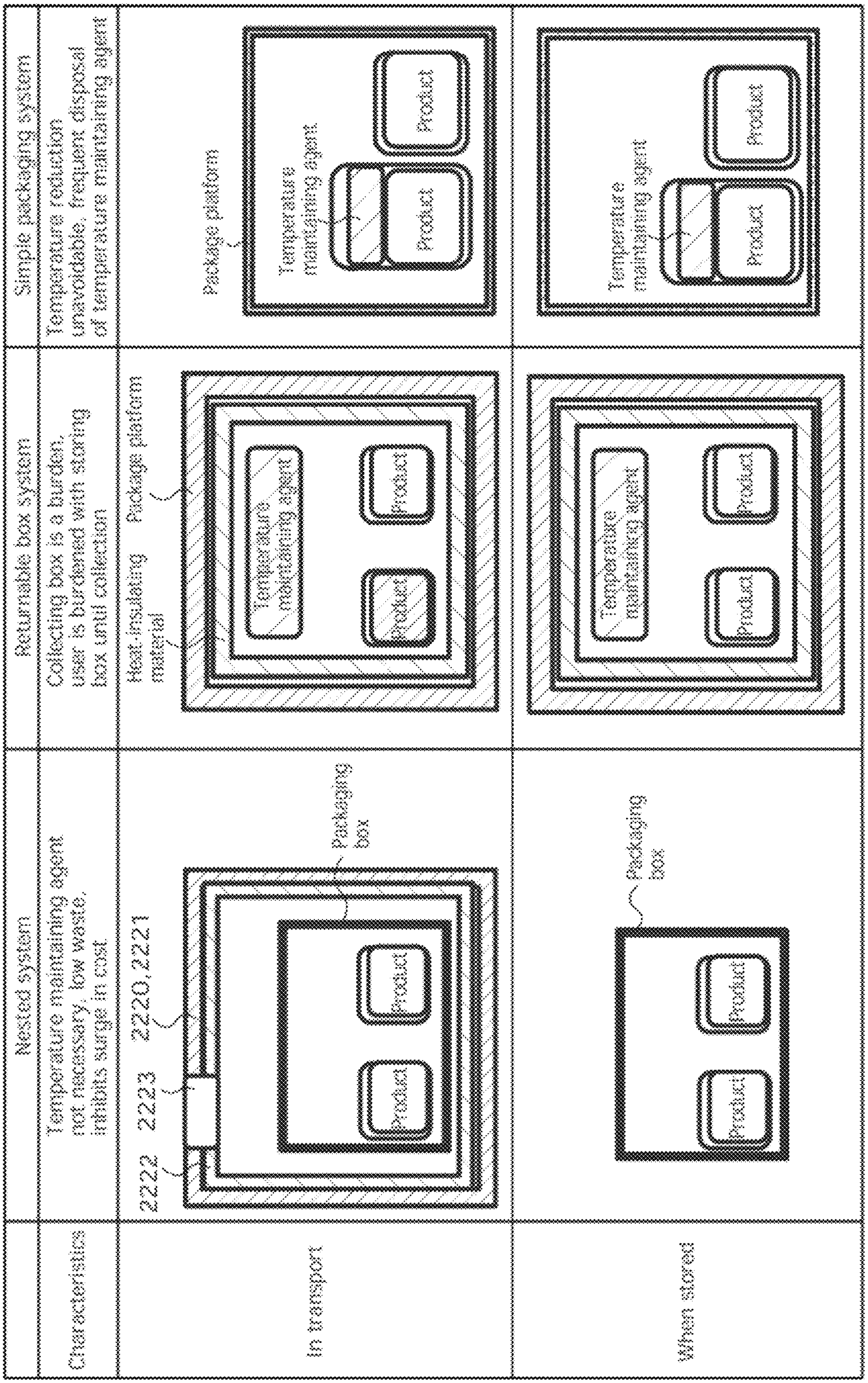
FIG. 109 illustrates an example of the method used to ensure temperature retention of a package platform of the unmanned aerial vehicle of the delivery system and the delivery box of the delivery system according to Embodiment 11.

FIG. 109 illustrates an example of the method used to ensure temperature retention of package platform 2220 of unmanned aerial vehicle 10 of delivery system 1A and delivery box 8 of delivery system 1A according to Embodiment 11. In the present embodiment, package platform 2220 of unmanned aerial vehicle 10 employs a nested system.

If the package is frozen food, refrigerated food, or if the package is hot food, etc., package platform 2220 of unmanned aerial vehicle 10 should have the ability to maintain the temperature of the package fora predetermined period of time, as illustrated in FIG. 109. Stated differently, the delivery time of the route traveled by unmanned aerial vehicle 10, the atmospheric temperature, the weather conditions, etc., need to be taken into account when unmanned aerial vehicle 10 carries the package. Package platform 2220 of unmanned aerial vehicle 10 and delivery box 8 according to the present embodiment therefore have the following function. Package platform 2220 of unmanned aerial vehicle 10 may be mounted on the first thruster device or the second thruster device, or directly on the unmanned aerial vehicle.

Package platform 2220 of unmanned aerial vehicle 10 is covered with heat-insulating material 2222 that provides high temperature retention. Package platform 2220 includes package platform main body 2221 that can cover the entire perimeter of the package, heat-insulating material 2222 spread over the entire interior of package platform main body 2221, and Peltier element 2223. Heat-insulating material 2222 is arranged layered on the inner surface of package platform main body 2221 so as to cover the entire space for placing the package that is formed in package platform main body 2221. Peltier element 2223 is placed by hollowing out a portion of heat-insulating material 2222 inside package platform main body 2221. Peltier element 2223 can be provided to automatically cool or warm the interior of package platform 2220. Peltier element 2223 according to the present embodiment includes, for example, a flat rectangular package platform main body 2221. For example, when cooling the interior of package platform 2220, one side of Peltier element 2223 will be cold while the other side will be warm, so it is preferable to place the other side exposed to the exterior of package platform 2220. Although the Peltier element 2223 is used for package platform 2220 in the present embodiment, Peltier element 2223 does not need to be used. For example, the shipper may pre-chill or pre-warm package platform 2220.

When unmanned aerial vehicle 10 carries a package, the package is packaged in a box and placed on package platform 2220. Examples of the box in which the package is packaged include a styrofoam box, a corrugated cardboard box, etc. This further enhances the temperature retention of the package. In the present embodiment, since package platform 2220 of unmanned aerial vehicle 10 is highly effective in retaining temperature, temperature retention can be ensured without using a temperature maintaining agent. In addition, since the use of a temperature maintaining agent is not necessary, a surge in the cost of package delivery can be inhibited. Temperature maintaining agents include cooling agents to maintain the temperature of a product at a cold temperature and warming agents to maintain the temperature of a product at a warm temperature.

If the package platform of unmanned aerial vehicle 10 is a returnable box system, the package platform is used as a delivery box, and the entire package platform is delivered to the user. In such cases, the user must store the package platform, and the unmanned aerial vehicle must travel to the receiver again to retrieve the package platform. This reduces the availability of the unmanned aerial vehicle.

On the other hand, if the package platform of the unmanned aerial vehicle is a simple packaging system, the simple packaging package platform is used as a delivery box, and the entire simple packaging package platform is delivered to the user. In such cases, since the user discards the simple packaging package platform, there is no need to store the package platform. However, a temperature maintaining agent is used for ensuring temperature retention inside the package platform. This leads to the disposal of cooling materials, which in turn leads to a surge in package delivery costs. In addition, the temperature inside the package platform is likely to change while the unmanned aerial vehicle is delivering package, which may make it impossible to ensure temperature retention. In this case, the unmanned aerial vehicle may not be able to deliver the package with its quality intact.

Therefore, in the present embodiment, when the product requires temperature retention, delivery system 1A, for example, estimates the storage time when the package will be stored in delivery box 8 of the user that is the receiver, calculates the expected delivery period, which indicates the period from the shipment time of the package to the predicted storage time, and, based on the calculated expected delivery period, determines whether or not the permissible delivery time (deliverable time) is met. If predetermined conditions are not met based on the calculated expected delivery period, i.e., if the expected delivery period exceeds the permissible delivery time, delivery system 1A cannot deliver the package with its quality intact. In such cases, delivery system 1A cancels the delivery of the package being delivered, or collects the package being delivered. Stated differently, the permissible delivery time is the amount of time that the package can be delivered to the user in while maintaining the quality of the product, which is the package.

Operation Example 1

Next, operations performed in delivery system 1A when unmanned aerial vehicle 10 arrives at a position vertically above delivery box 8 and checks whether delivery box 8 is full or empty will be described.

Figure 110:
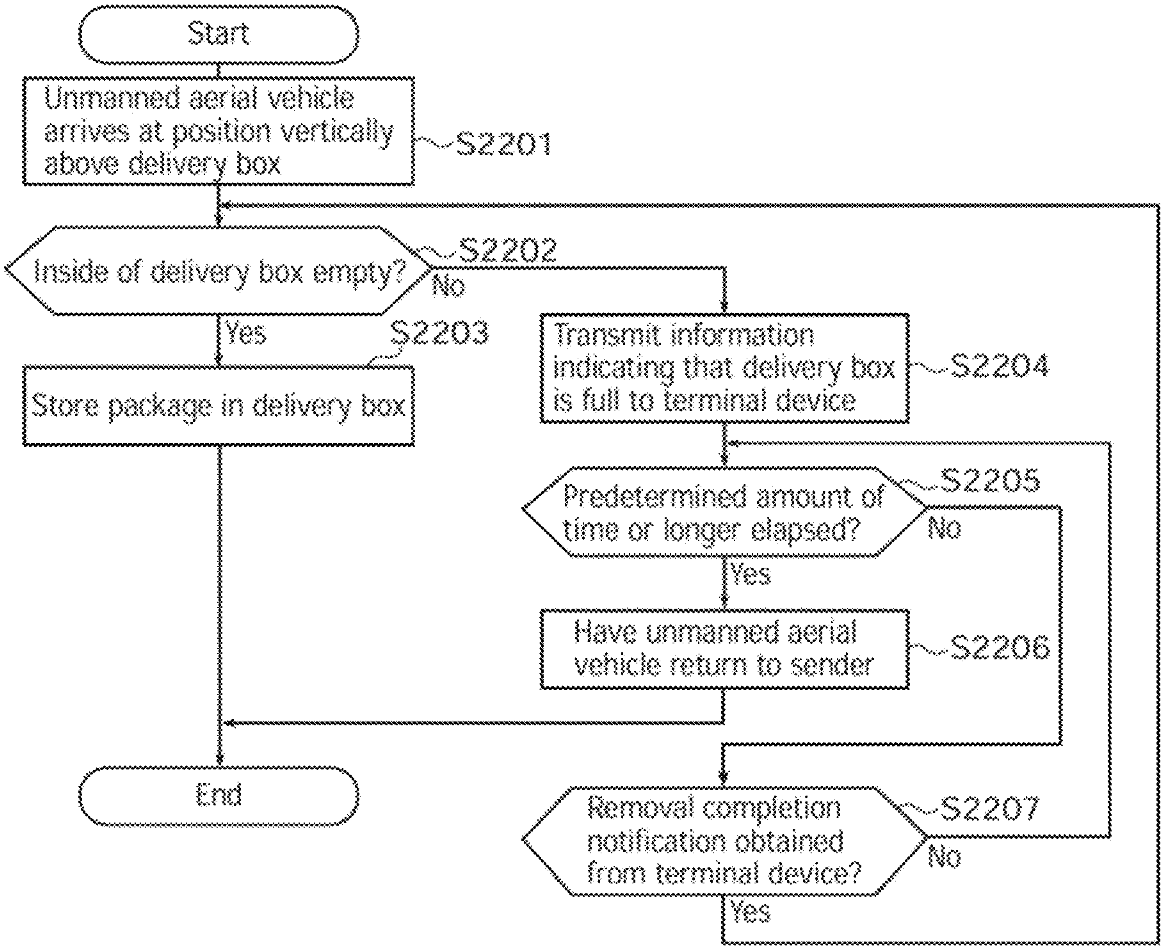
FIG. 110 is a flowchart illustrating an example of operations performed when the unmanned aerial vehicle of the delivery system according to Operation Example 1 of Embodiment 11 checks whether the delivery box is full or empty.

FIG. 110 is a flowchart illustrating an example of operations performed when unmanned aerial vehicle 10 of delivery system 1A according to Operation Example 1 of Embodiment 11 checks whether delivery box 8 is full or empty.

As illustrated in FIG. 110, unmanned aerial vehicle 10 arrives at a position vertically above delivery box 8 of the receiver (S2201).

Unmanned aerial vehicle 10 obtains information indicating that the inside of delivery box 8 is full or information indicating that the inside of delivery box 8 is empty. In this operation example, camera sensor 45 of unmanned aerial vehicle 10 obtains information indicating that unmanned aerial vehicle 10 is full or information indicating that unmanned aerial vehicle 10 is empty by capturing an image of coded medium 8*x*. Control processor 11 determines whether the inside of delivery box 8 is empty or not (S2202) based on the information indicating that delivery box 8 is full and the information indicating that delivery box 8 is empty.

If control processor 11 determines that the inside of delivery box 8 is empty (YES in S2202), it controls wire control module 125 illustrated in, for example, FIG. 1A, to start reeling out wire 51 to lower the package. At this time, lid 8*f* of delivery box 8 opens, so unmanned aerial vehicle 10 stores the package inside delivery box 8 (S2203).

However, if control processor 11 determines that the inside of delivery box 8 is not empty (i.e., is full) (NO in S2202), it means that another package is stored inside delivery box 8 and the package to be delivered cannot be stored, so information indicating that delivery box 8 is full is transmitted to terminal device 2210 via second communicator 13 illustrated in, for example, FIG. 1A (S2204). The menu screen of the user application on terminal device 2210 displays that delivery box 8 is full. This enables the user to recognize that unmanned aerial vehicle 10 is unable to store the package. Control processor 11 may transmit a message stating "if you remove the package currently in delivery box 8 within X hours, we will deliver the package" to terminal device 2210 via the second communicator, to display this message on the menu screen of the user application on terminal device 2210. If the user removes the package currently in delivery box 8, terminal device 2210 will send a removal completion notification to unmanned aerial vehicle 10. The removal completion notification may be transmitted in response to the user operating the menu screen of the user application on terminal device 2210, or when delivery box 8 detects that the package has been removed and rewrites coded medium 8*x* to switch from information indicating that delivery box 8 is full to information indicating that delivery box 8 is empty.

Here, control processor 11 measures how much time has elapsed since unmanned aerial vehicle 10 arrived at the position vertically above delivery box 8 of the receiver. Stated differently, control processor 11 includes a timer function (timekeeping unit). Control processor 11 determines whether the measured amount of elapsed time is greater than or equal to a predetermined time (S2205).

If the elapsed time is greater than or equal to the predetermined time (YES in S2205), control processor 11 cancels the delivery of the package and controls the propeller actuation motor to cause unmanned aerial vehicle 10 to go back to the sender (S2206). This is because if the product cannot be stored in delivery box 8 and no action is taken by the user after attempts to notify the user, it is assumed that the package cannot be delivered.

If the elapsed time is less than the predetermined time (NO in S2205), control processor 11 determines whether or not terminal device 2210 of the user has obtained a removal completion notification, which is information indicating that the package that was in delivery box 8 has been removed from delivery box 8 (S2207).

If control processor 11 has not obtained the removal completion notification (NO in S2207), the process returns to step S2205.

However, if control processor 11 has obtained the removal completion notification (YES in S2207), the process returns to step S2202. For example, if the user removes the package currently in delivery box 8 from delivery box 8 and selects the removal completion notification via the menu screen of terminal device 2210, terminal device 2210 transmits the removal completion notification to unmanned aerial vehicle 10 via operations management system 2213, etc. In this way, with delivery system 1A, unmanned aerial vehicle 10 can store packages in delivery box 8.

Operation Example 2

Next, the specific operations performed when camera sensor of unmanned aerial vehicle 10 checks whether delivery box 8 is full or empty in step S2202 of Operation Example 1 will be described.

Figure 111:
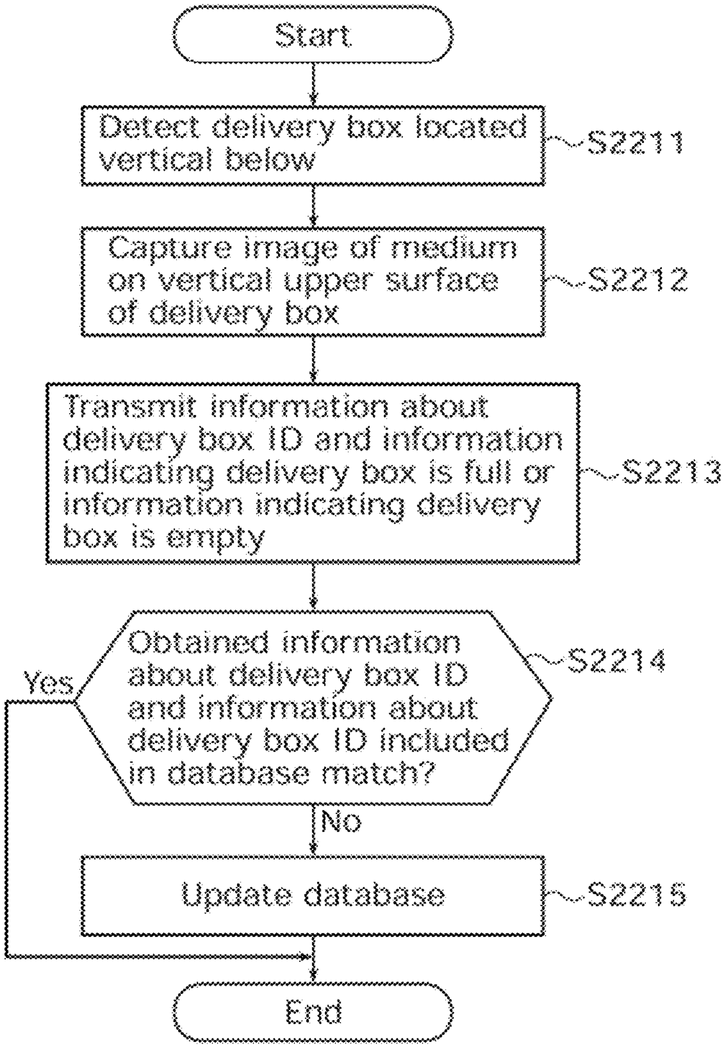
FIG. 111 is a flowchart illustrating an example of other operations performed when the unmanned aerial vehicle of the delivery system according to Operation Example 2 of Embodiment 11 checks whether the delivery box is full or empty.

FIG. 111 is a flowchart illustrating an example of other operations performed when unmanned aerial vehicle 10 of delivery system 1A according to Operation Example 2 of Embodiment 11 checks whether delivery box 8 is full or empty.

As illustrated in FIG. 111, camera sensor 45 of unmanned aerial vehicle 10, which is located vertically above delivery box 8 of the receiver, detects delivery box 8 by capturing an image of delivery box 8 (S2211).

Camera sensor 45 obtains information about the ID of delivery box 8 and information indicating that the inside of delivery box 8 is full or information indicating that the inside of delivery box 8 is empty, as indicated by coded medium 8*x* on the vertical upper surface of delivery box 8, by capturing an image of coded medium 8*x* (S2212). As mentioned above, coded medium 8*x* indicates whether the inside of delivery box 8 is full or empty. Camera sensor 45 outputs the obtained information about the ID of delivery box 8 and the information indicating that delivery box 8 is full or the information indicating that delivery box 8 is empty to control processor 11 of unmanned aerial vehicle 10.

Control processor 11 transmits the obtained information about the ID of delivery box 8 and the information indicating that delivery box 8 is full or the information indicating that delivery box 8 is empty to operations management system 2213 via second communicator 13 (S2213).

Operations management system 2213 determines whether the information about the ID of delivery box 8 obtained matches the information about the ID of delivery box 8 included in a database maintained in the storage or the like (in other words, whether the information has changed) (S2214). The information about the ID is, for example, identification information of delivery box 8, the user's address, name, the location of delivery box 8, etc.

If operations management system 2213 determines that the obtained information about the ID of delivery box 8 does not match the information about the ID of delivery box 8 included in the database (NO in S2214), the database is updated by rewriting the information about the ID of delivery box 8 included in the database with the obtained information about the ID of delivery box 8 (S2215).

If operations management system 2213 determines that the obtained information about the ID of delivery box 8 matches the information about the ID of delivery box 8 included in the database (YES in S2214), the process ends.

Although the present operational example is regarding an example in which unmanned aerial vehicle 10 obtains information about the ID of delivery box 8 of the receiver, the present operation example is not limited to this example. For example, while unmanned aerial vehicle 10 is traveling, it may obtain information about the IDs of all delivery boxes 8 present on the travel route. Operations management system 2213 may check the information about the IDs of delivery boxes 8 obtained by unmanned aerial vehicle 10 while it is moving against the information about the IDs of delivery boxes 8 included in the database. If the obtained information about the ID of delivery box 8 does not match the information about the ID of delivery box 8 included in the database, operations management system 2213 may update the database by rewriting the information about the ID of delivery box 8 included in the database with the obtained information about the ID of delivery box 8.

Operation Example 3

Next, specific operations performed in step S2202 of Operation Example 1 when delivery box 8 itself checks whether it is full or empty will be described.

Figure 112:
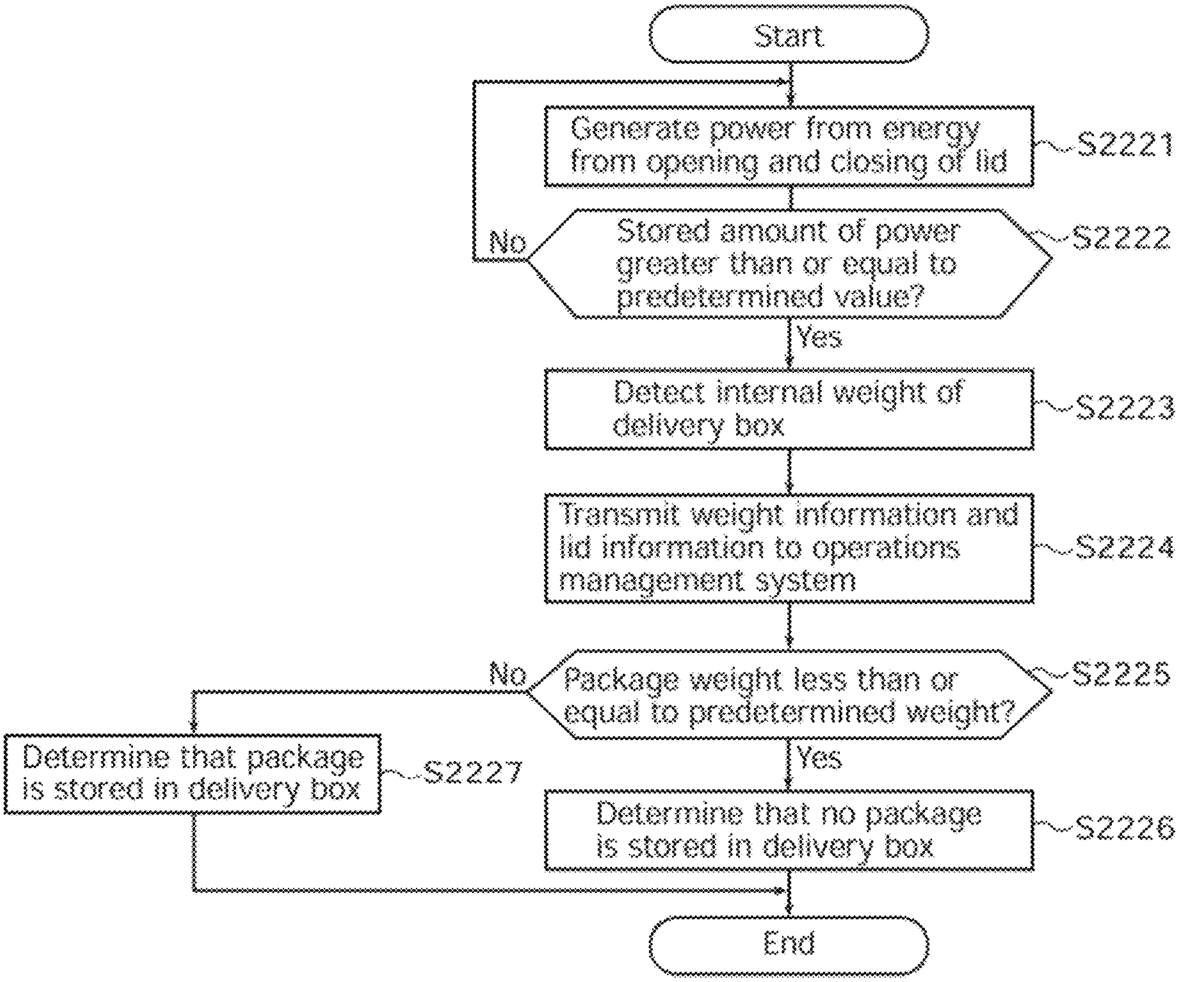
FIG. 112 is a flowchart illustrating an example of operations performed when the delivery box of the delivery system according to Operation Example 3 of Embodiment 11 checks whether itself is full or empty.

FIG. 112 is a flowchart illustrating an example of operations performed when delivery box 8 of delivery system 1A according to Operation Example 3 of Embodiment 11 checks whether itself is full or empty.

As illustrated in FIG. 112, when lid 8*f* of delivery box 8 opens and closes, delivery box 8 generates power via the energy from lid 8*f* opening and closing, and stores the power (S2221: power generation step).

The power detection circuit of delivery box 8 detects whether the amount of power stored by power generation is greater than or equal to a predetermined value (S2222).

If the power detection circuit detects that the amount of power stored by power generation is less than the predetermined value (NO in S2222), delivery box 8 returns the process to step S2221.

If the power detection circuit detects that the amount of power stored by power generation is greater than or equal to the predetermined value (YES in S2222), the weight sensor detects the internal weight when lid 8*f* opens and closes. Stated differently, the weight sensor detects the internal weight of delivery box 8 when lid 8*f* of delivery box 8 opens and closes (S2223).

When the weight sensor detects the internal weight, delivery box 8 transmits the internal weight information to operations management system 2213 via terminal device 2210 or directly to operations management system 2213. When the lid sensor detects the opening and closing of lid 8*f* when a package is taken out, delivery box 8 sends lid information, which is information indicating that lid 8*f* has been opened and closed (one example of the information pertaining to the opening and closing of the door), to operations management system 2213 via terminal device 2210, or directly to operations management system 2213 (S2224: transmission step). If delivery box 8 transmits the lid information directly to operations management system 2213, it communicates using, for example, a low power wide area (LPWA) network. If delivery box 8 transmits the lid information directly to terminal device 2210, it communicates using, for example, a local area network (LAN).

Upon receiving the internal weight information, operations management system 2213 determines whether the weight of the package indicated by the received internal weight information is less than or equal to a predetermined weight (S2225). In the present operation example, operations management system 2213 is what makes the determination, but if terminal device 2210 obtains the internal weight information, the user application of terminal device 2210 may make the determination.

If operations management system 2213 determines that the weight of the package is less than or equal to the predetermined weight (YES in S2225), it determines that the package is not stored inside delivery box 8 (S2226). Delivery system 1A then ends the processing.

If operations management system 2213 determines that the weight of the package is greater than the predetermined weight (NO in S2225), it determines that the package is stored inside delivery box 8 (S2227). Delivery system 1A then ends the processing.

Operation Example 4

Next, operations performed when a user orders a product via the user application on terminal device 2210 will be described. In the present operation example, a user orders a product via terminal device 2210, but payment for the purchase of the product is made after the product is delivered and the user is willing to purchase the product. In the present operation example, the user does not purchase the product before the product is delivered to the user. In the present operation example, one package, which is the product, is carried per unmanned aerial vehicle 10. The present operation example assumes that clothing, shoes, a watch, or a bag, etc., is being delivered to the user.

Figure 113:
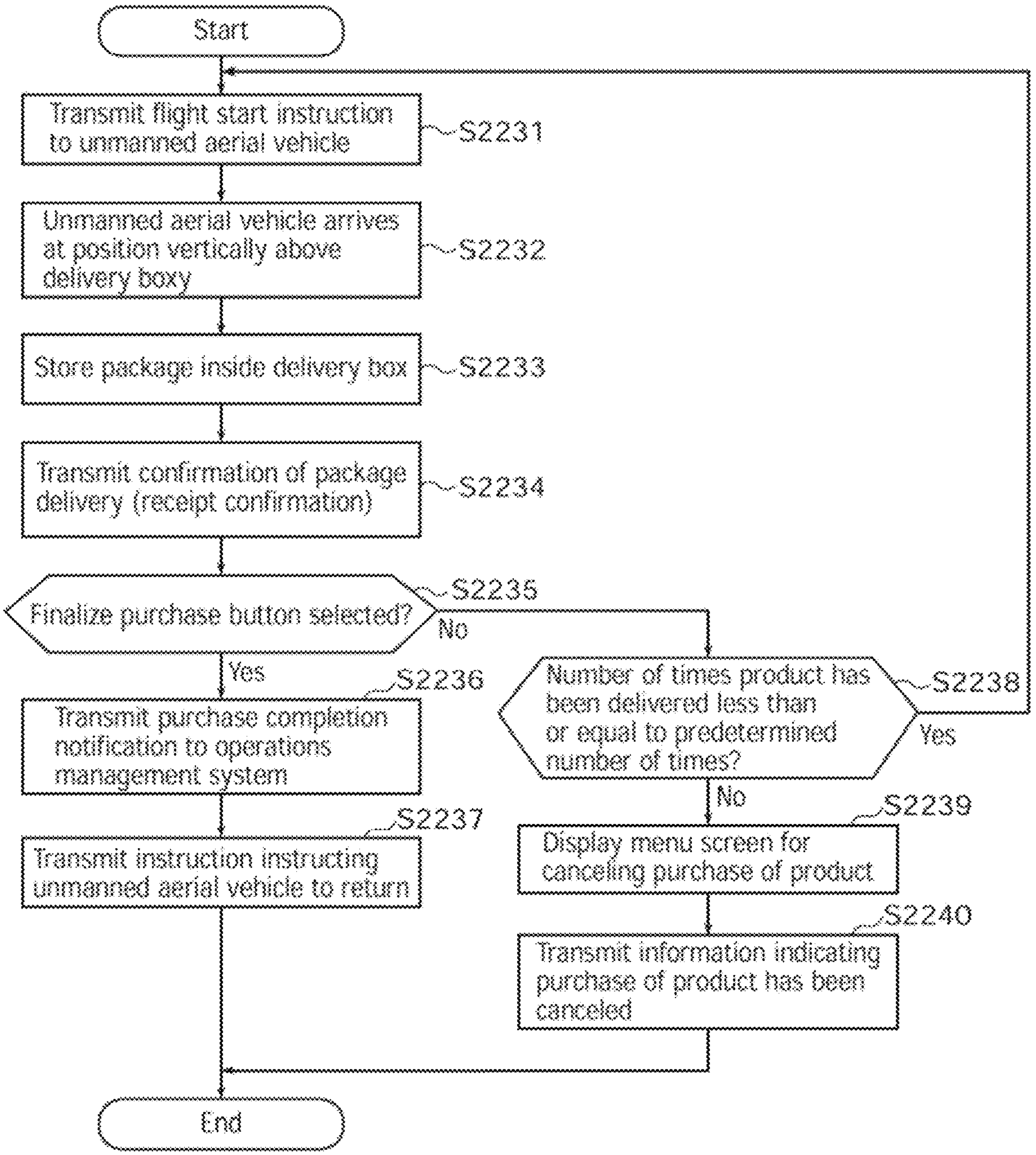
FIG. 113 is a flowchart illustrating an example of operations performed when a product is ordered using the delivery system according to Operation Example 4 of Embodiment 11.

FIG. 113 is a flowchart illustrating an example of operations performed when a product is ordered using delivery system 1A according to Operation Example 4 of Embodiment 11.

As illustrated in FIG. 113, upon obtaining the order information, operations management system 2213 selects, from among a plurality of unmanned aerial vehicles 10, an unmanned aerial vehicle 10 that can deliver the package by the desired time of delivery indicated in the order information. Once the package, which is the product, is loaded onto the selected unmanned aerial vehicle 10, operations management system 2213 sends a flight start instruction to unmanned aerial vehicle 10 to move unmanned aerial vehicle 10 to the user's address indicated in the order information (S2231). Unmanned aerial vehicle 10 will then begin delivering the package in a manner that satisfies the conditions stipulated in the order information, such as the user's address and the desired time of delivery.

Unmanned aerial vehicle 10 moves according to the flying route and arrives at a position vertically above delivery box 8 (S2232).

Unmanned aerial vehicle 10 controls wire control module 125 illustrated in, for example, FIG. 1A, to start reeling out wire 51 to lower the package. Lid 8*f* of delivery box 8 opens, so unmanned aerial vehicle 10 can store the package inside delivery box 8 (S2233). The packages are thus stored in delivery box 8.

When the weight sensor detects the internal weight, i.e., the weight of the stored package, delivery box 8 notifies terminal device 2210 of the weight information. More specifically, delivery box 8 notifies terminal device 2210 that a package has been stored inside as the weight information. Here, delivery box 8 notifies terminal device 2210 of the weight information via coded medium 8*x* or the communicator. This enables the user to recognize that the package has been delivered since the menu screen of the user application on terminal device 2210 displays that the package has been stored in delivery box 8. The user application on terminal device 2210 displays a button on the menu screen indicating confirmation of package delivery. Upon receiving an input by the user, the user application transmits a confirmation of package delivery (receipt confirmation) to operations management system 2213 (S2234).

When the package is delivered, the user determines whether the product in the package meets their expectations or not. For example, when the package is clothing, shoes, a watch, or a bag, etc., the user tries on the product first to determine whether the product meets their expectations. If the user likes the product, he or she will purchase it.

The user application displays a finalize purchase button and a cancel purchase button on the menu screen for selecting whether or not to purchase the delivered product. The user application determines whether the finalize purchase button has been selected (S2235).

If the user selects the finalize purchase button (YES in S2235), the user application sends a purchase completion notification to operations management system 2213 (S2236). Stated differently, if the user selects the finalize purchase button, it means that the user is willing to purchase the delivered product and has made payment for purchasing the product.

Upon receipt of the purchase completion notification, operations management system 2213 transmits an instruction instructing unmanned aerial vehicle 10 to come back (S2237). Unmanned aerial vehicle 10 will then return to the facility of operations management system 2213. Delivery system 1A then ends the processing.

However, if the user selects the cancel purchase button (NO in S2235), the user application determines whether a replacement product can be delivered. More specifically, the user application determines whether the number of times the product of the current purchase has been delivered is less than or equal to a predetermined number of times (S2238). Here, if the user selects the cancel purchase button, it means that the user has no intention of purchasing the product in the delivered package, and wishes to purchase an alternative product, etc.

If the user application determines that the number of times the product of the current purchase has been delivered is less than or equal to the predetermined number of times (YES in S2238), it sends a redelivery request to operations management system 2213. Delivery system 1A then returns to step S2231, and delivers a package of an alternative product to the user. Stated differently, if the user has no intention of purchasing the delivered product, the user can only exchange the product a predetermined number of times or less. The predetermined number of times is, for example, approximately three times. In such cases, one product is stored per unmanned aerial vehicle 10, and up to three unmanned aerial vehicles 10 deliver products in sequence. Such a rule is preferably applied to products such as clothing or furniture, etc., but such a rule is not limited to clothing or furniture, etc. The rule may be applied to products such as stationery, food, electronics, tools, groceries, consumables, etc. Moreover, the predetermined number of times may be four or more times, and may be two or fewer times.

However, if the user application determines that the number of times the product of the current purchase has been delivered is greater than the predetermined number of times (NO in S2238), a menu screen for canceling the purchase of the product is displayed (S2239).

The user application then sends information indicating the cancellation of the purchase of the product to operations management system 2213 (S2240). Thus, operations management system 2213 cancels the order of the product indicated in the order information transmitted from terminal device 2210. Delivery system 1A then ends the processing.

As described above, if the user selects the cancel purchase button (NO in S2235), unmanned aerial vehicle 10 retrieves the package, which is the product, delivered to the user. Stated differently, the user loads and returns the package to unmanned aerial vehicle 10. Whether or not the user has returned the package to unmanned aerial vehicle 10 can be determined by camera sensor 45, the weight sensor, etc.

Once the package has been returned to unmanned aerial vehicle 10, unmanned aerial vehicle 10 returns to the facility of operations management system 2213.

Unmanned aerial vehicle 10 may wait at a position vertically above the user's delivery box 8 after delivering the package to the user until the finalize purchase button or the cancel purchase button is selected by the user. Unmanned aerial vehicle 10 may go back to the facility of operations management system 2213 if the finalize purchase button or the cancel purchase button has not been selected by the user for a predetermined period of time or longer.

Operation Example 5

Next, other operations performed when a user orders a product via the user application on terminal device 2210 will be described. Although similar to Operation Example 4, the present operation example differs in that a plurality of packages, which are products, are carried per unmanned aerial vehicle 10.

Figure 114:
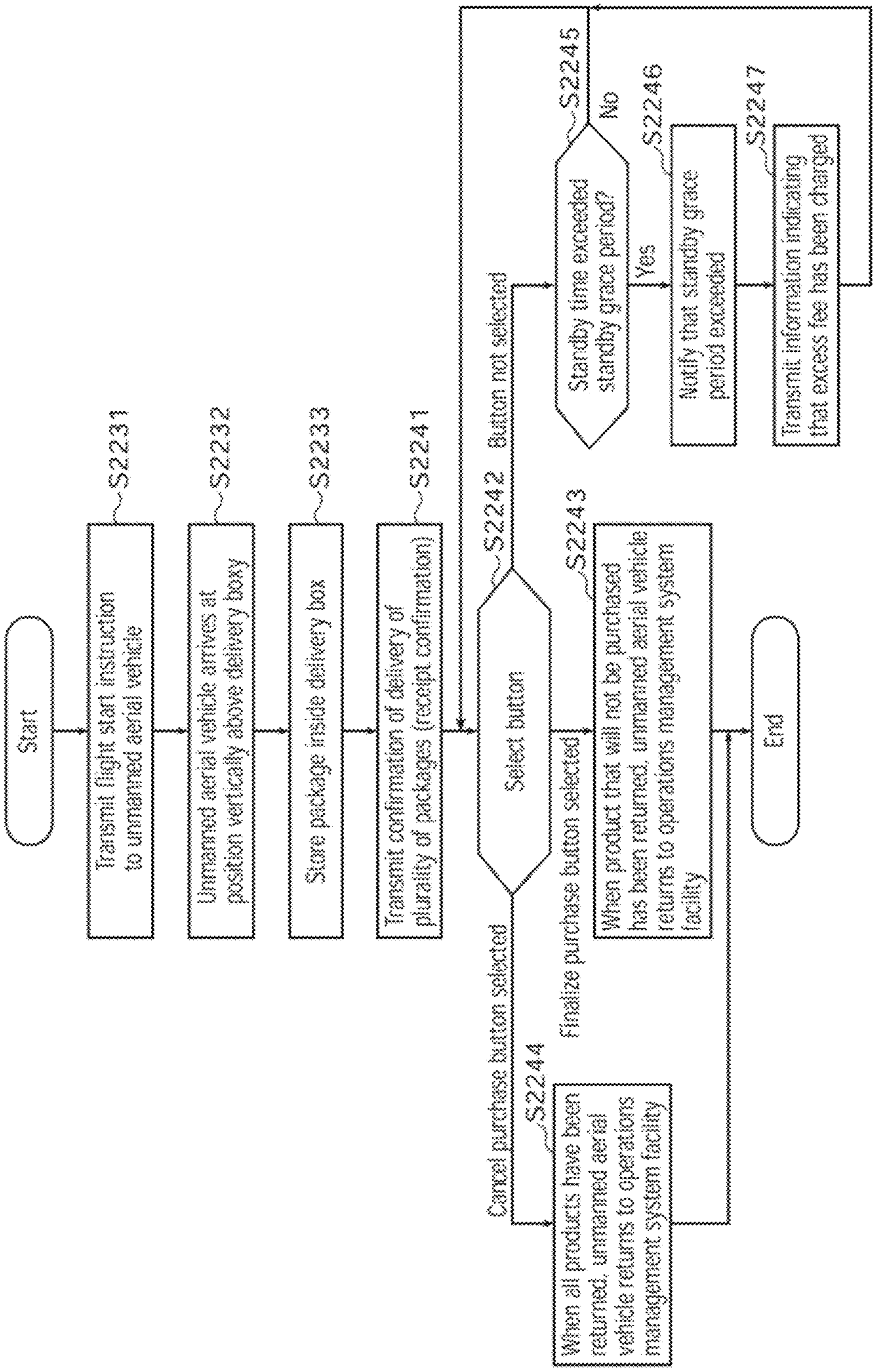
FIG. 114 is a flowchart illustrating an example of other operations performed when a product is ordered using the delivery system according to Operation Example 5 of Embodiment 11.

FIG. 114 is a flowchart illustrating an example of other operations performed when a product is ordered using delivery system 1A according to Operation Example 5 of Embodiment 11. Processes that are the same as in FIG. 113 are assigned with the same reference signs as appropriate.

As illustrated in FIG. 114, upon obtaining the order information, operations management system 2213 selects, from among a plurality of unmanned aerial vehicles 10, an unmanned aerial vehicle 10 that can deliver the package by the desired time of delivery indicated in the order information. Once the packages, which are products, are loaded onto the selected unmanned aerial vehicle 10, operations management system 2213 sends a flight start instruction to unmanned aerial vehicle 10 to move unmanned aerial vehicle 10 to the user's address indicated in the order information (S2231). Unmanned aerial vehicle 10 will then begin delivering the packages in a manner that satisfies the conditions stipulated in the order information, such as the user's address and the desired time of delivery. Although a plurality of products are delivered to a single address in the present operation example, this example is non-limiting. For example, unmanned aerial vehicle 10 may be loaded with a plurality of first products to be delivered to a first address and a plurality of second products to be delivered to a second address different than the first address.

Unmanned aerial vehicle 10 moves according to the flying route and arrives at a position vertically above delivery box 8 (S2232).

Unmanned aerial vehicle 10 controls wire control module 125 illustrated in, for example, FIG. 1A, to start reeling out wire 51 to lower the packages simultaneously or individually. Lid **8*f* of delivery box 8 opens, so unmanned aerial vehicle 10 can store the packages inside delivery box 8 (S2233). The packages are thus stored in delivery box 8**.

Unmanned aerial vehicle 10 may wait at a position vertically above the user's delivery box 8 after delivering the packages to the user until the finalize purchase button or the cancel purchase button is selected by the user. Unmanned aerial vehicle 10 may also go back to the facility of operations management system 2213, perform another delivery, and return to a position vertically above delivery box 8 where the products that were delivered and are to be returned are stored for pickup after a predetermined time. Thus, unmanned aerial vehicle 10 can bring back the packages of the returned products.

When the weight sensor detects the internal weight, i.e., the weight of the stored packages, delivery box 8 notifies terminal device 2210 of the weight information. More specifically, delivery box 8 notifies terminal device 2210 that packages have been stored inside as the weight information. This enables the user to recognize that the packages have been delivered since the menu screen of the user application on terminal device 2210 displays that the packages have been stored in delivery box 8. The user application on terminal device 2210 displays a button on the menu screen indicating confirmation of the delivery of the packages. Upon receiving an input by the user, the user application sends a confirmation of the delivery of the packages to operations management system 2213 (S2241). The user application is not limited to confirming delivery of the plurality of packages by receiving an input by the user. For example, the user application may determine that the packages have been received based on the weight information detected by the weight sensor of delivery box 8 and the lid information for lid **8*f*** detected by the lid sensor, for example.

The user application displays a finalize purchase button and a cancel purchase button on the menu screen for selecting whether or not to purchase any of the delivered packages of the products. The user application determines whether the finalize purchase button or the cancel purchase button has been selected (S2242). Stated differently, the user decides one or more products to purchase from among the products delivered, or not to purchase any of them.

When the user has decided on the product(s) to be purchased, and the user selects the finalize purchase button (the finalize purchase button is selected in S2242), the user application sends a purchase completion notification to operations management system 2213. If there is a product or products that the user is not going to purchase, operations management system 2213 transmits, to unmanned aerial vehicle 10, a retrieval instruction to retrieve the product(s) that will not be purchased, and instruction that instructs unmanned aerial vehicle 10 to come back. Operations management system 2213 also sends an instruction to terminal device 2210 prompting the return of any product that will not be purchased. This causes the user application to display a message prompting the user to return the product to unmanned aerial vehicle 10. This enables the user to recognize that any product not purchased should be returned. Unmanned aerial vehicle 10 retrieves any product other than those that will be purchased. The user loads and returns the product to unmanned aerial vehicle 10. Once the product has been returned to unmanned aerial vehicle 10, unmanned aerial vehicle 10 returns to the facility of operations management system 2213 (S2243). Delivery system 1A then ends the processing.

If the user will not purchase any product, when the user selects the cancel purchase button (the cancel purchase button is selected in S2242), the user application sends a purchase cancel notification to operations management system 2213. Operations management system 2213 transmits, to unmanned aerial vehicle 10, a retrieval instruction to retrieve all of the products since none of them will be purchased, and instruction that instructs unmanned aerial vehicle 10 to come back. Operations management system 2213 also sends an instruction to terminal device 2210 prompting the return of all of the products. This causes the user application to display a message prompting the user to return all of the products to unmanned aerial vehicle 10. This enables the user to recognize that the products should be returned. Unmanned aerial vehicle 10 then retrieves all of the delivered products. The user loads and returns all of the products to unmanned aerial vehicle 10. Once all of the products have been returned to unmanned aerial vehicle 10, unmanned aerial vehicle 10 returns to the facility of operations management system 2213 (S2244). Delivery system 1A then ends the processing.

However, if neither the finalize purchase button nor the cancel purchase button is selected (if button not selected in S2242), the user application determines whether the standby time of unmanned aerial vehicle 10 exceeds the standby grace period (S2245). The standby grace period is several minutes or several tens of minutes, for example, and can be changed as needed.

If the standby time of unmanned aerial vehicle 10 has not exceeded the standby grace period (NO in S2245), the user application returns to step S2242.

If the standby time of unmanned aerial vehicle 10 has exceeded the standby grace period (YES in S2245), unmanned aerial vehicle 10 notifies operations management system 2213 that the standby grace period has been exceeded (S2246).

When operations management system 2213 obtains the notification from step S2246 that the standby time of unmanned aerial vehicle 10 has exceeded the standby grace period, operations management system 2213 transmits information to terminal device 2210 indicating that an excess fee has been charged (S2247). The user application on terminal device 2210 displays information on the menu screen indicating the excess fee charge. The user application then returns to step S2242.

Operation Example 6

Next, an operation performed when a user orders a plurality of products spread across a plurality of store systems 2212 within retail system 2211 will be described.

Figure 115:
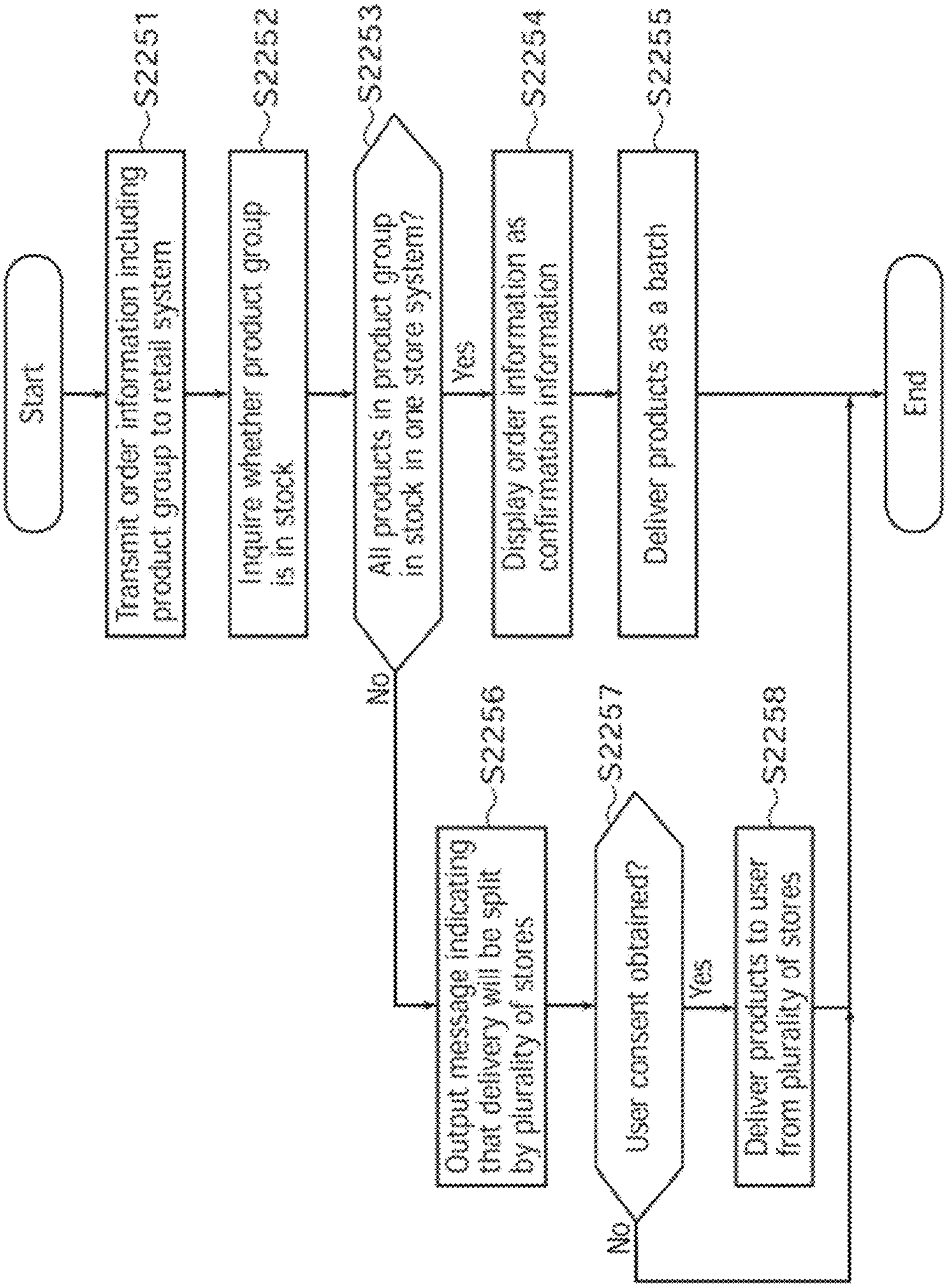
FIG. 115 is a flowchart illustrating an example of operations performed when products spread across a plurality of store systems are ordered using the delivery system according to Operation Example 6 of Embodiment 11.

FIG. 115 is a flowchart illustrating an example of operations performed when products spread across a plurality of store system 2212 are ordered using delivery system 1A according to Operation Example 6 of Embodiment 11.

As illustrated in FIG. 115, when products are selected across a plurality of store systems 2212 in retail system 2211 by the user, the user application of terminal device 2210 transmits, via second communicator 13, order information including a product group desired by the user to retail system 2211 (S2251).

When retail system 2211 receives the user's desired product group from terminal device 2210, it inquires each store as to whether the product group desired by the user in stock (S2252).

When the respective store systems 2212 receive the inquiry from retail system 2211 as to whether or not the product group is in stock, they check the availability of the product group desired by the user. If a store system 2212 has one or more products in the product group in stock, it sends information to retail system 2211 indicating the products in stock. If none of the products are in stock, the store system 2212 sends information to retail system 2211 indicating that none of the products are in stock.

When retail system 2211 receives information indicating that the products are in stock from the stores, it determines whether all products in the user's desired product group are in stock in one store system 2212 (S2253).

If retail system 2211 determines that all of the products in the product group desired by the user are in stock in one store system 2212 (YES in S2253), it sends the order information including the product group desired by the user to terminal device 2210 as confirmation information confirming that the products can be shipped. If terminal device 2210 receives the confirmation information, the user application displays the order information on the menu screen as confirmation information (S2254).

Store system 2212 that has all of the products in the product group in stock then delivers the products as a batch in accordance with the user's address and desired time of delivery, etc. (S2255). The product group is thus delivered to the user as a package. Delivery system 1A then ends the processing.

If retail system 2211 determines that all of the products of the user's desired product group are not in stock in one store system 2212 (NO in S2253), it causes terminal device 2210 to output a message indicating that the products are spread across a plurality of stores and the delivery will be split (S2256). Examples of messages indicating that delivery will be split by a plurality of stores include "Delivery will be split by a plurality of stores, is this OK?" or "Since the delivery will be split into multiple shipments, an extra delivery fee applies. Is this OK?", etc. Thus, retail system 2211 causes terminal device 2210 to output a confirmation message to the user if the delivery is to be split by a plurality of stores.

Retail system 2211 determines whether the user's consent has been obtained (S2257).

If the user's consent is obtained (YES in S2257), unmanned aerial vehicle 10 delivers the product from the stores to the user (S2258). The product group is thus delivered to the user as a package. Delivery system 1A then ends the processing.

If the user's consent is not obtained (NO in S2257), retail system 2211 cancels the user's desired product group. Delivery system 1A then ends the processing.

If the result of step S2253 is NO, if some of the products in the product group do not exist, retail system 2211 may output to the user application menu screen, for example, "May I cancel the order for only some of the products?".

Operation Example 7

Next, operations performed when instructing the user to make the product receivable prior to placing an order will be described. In the present operation example, the main case is that the user application instructs the user to empty delivery box 8.

Figure 116:
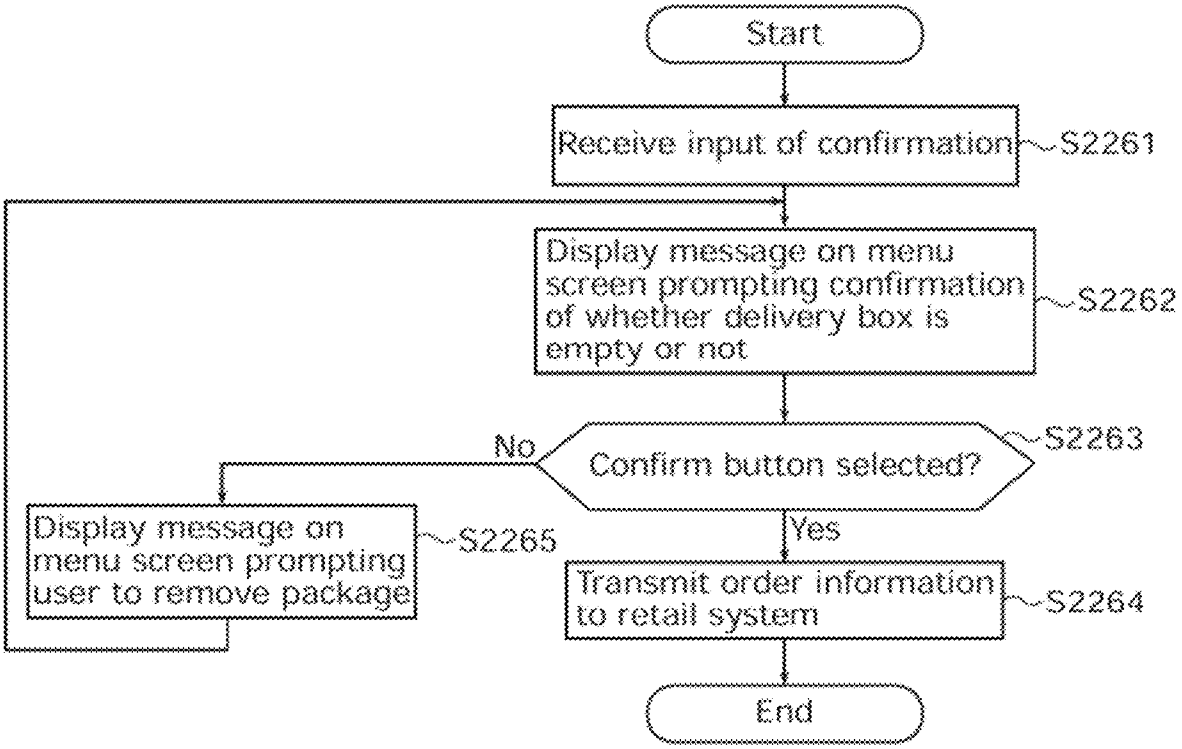
FIG. 116 is a flowchart illustrating an example of operations performed when the user application instructs the user to empty the inside of the delivery box when ordering a product using the delivery system in Operation Example 7 according to Embodiment 11.

FIG. 116 is a flowchart illustrating an example of operations performed when the user application instructs the user to empty the inside of delivery box 8 when ordering a product using delivery system 1A in Operation Example 7 according to Embodiment 11.

As illustrated in FIG. 116, the user application on terminal device 2210 displays a message on the menu screen in response to operation by the user, prompting the user to confirm the contents of the product to be ordered before sending the order information to retail system 2211. Terminal device 2210 is then operated by the user to confirm the contents of the product to be ordered and to input that confirmation is complete (S2261).

The user application displays a message on the menu screen prompting the user to confirm whether the inside of delivery box 8 is empty (S2262). With this, the user checks whether a package is stored in delivery box 8 or not, and if a package is stored, the user can empty delivery box 8 by removing the package.

The user application displays a confirm button on the menu screen indicating that the user emptied delivery box 8. The user application determines whether the confirm button has been selected (S2263).

If the confirm button has been selected (YES in S2263), the user application transmits the order information to retail system 2211 (S2264). Since this allows unmanned aerial vehicle 10 to store the product in delivery box 8 according to the order information, the user can receive the ordered product.

If the confirm button has not been selected (NO in S2263), the user application displays a message on the menu screen prompting the user to remove the package to empty delivery box 8 (S2265). With this, the user retrieves the package stored inside delivery box 8. The user application then returns to step S2262.

Thus, in the present operation example, the inside of delivery box 8 must be empty to allow the user to complete the product order (i.e., the product order cannot be placed). This allows unmanned aerial vehicle 10 to reliably deliver packages to delivery box 8.

Operation Example 8

Next, other operations performed when instructing the user to make the product receivable prior to placing an order will be described. The present operation example is similar to Operation Example 7, but differs from Operation Example 7 mainly in that the present operation example illustrates an example of a case in which delivery box 8 instructs the user to empty delivery box 8 via the user application.

Figure 117:
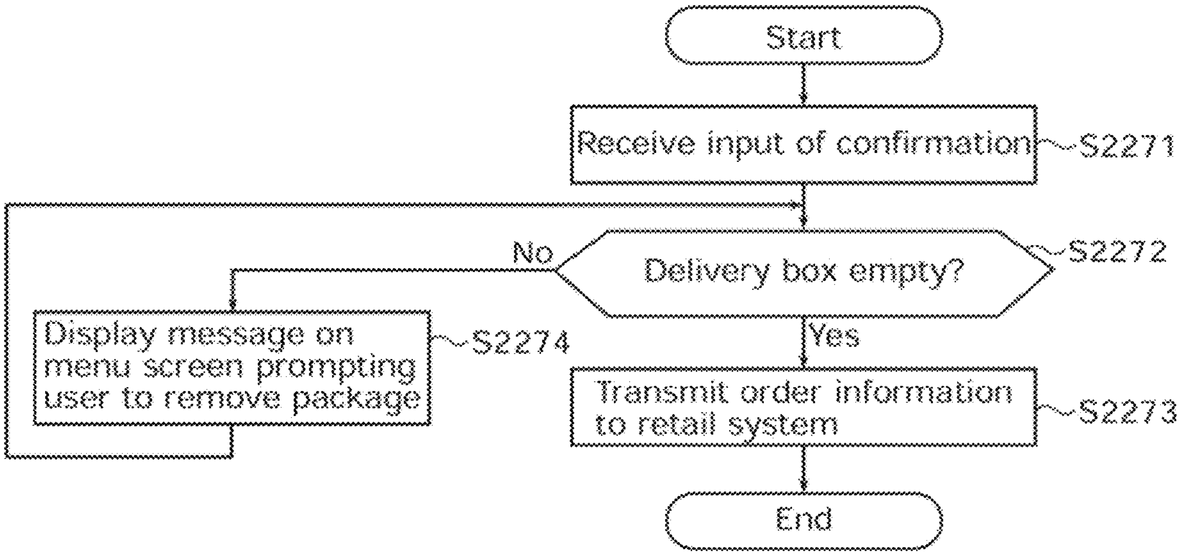

FIG. 117 is a flowchart illustrating an example of operations performed when delivery box 8 instructs the user to empty the inside of delivery box 8 when ordering a product using delivery system 1A in Operation Example 8 according to Embodiment 11.

As illustrated in FIG. 117, the user application on terminal device 2210 displays a message on the menu screen in response to operation by the user, prompting the user to confirm the contents of the product to be ordered before sending the order information to retail system 2211. Terminal device 2210 is then operated by the user to confirm the contents of the product to be ordered and to input that confirmation is complete (S2271). The user application waits until it receives information from delivery box 8 indicating that delivery box 8 is empty. For example, the user application may send a request to delivery box 8 for information indicating whether the inside of delivery box 8 is full or empty. In the present operation example, delivery box 8 may have a communicator, such as a wireless communication module, for transmitting information indicating that the box is full and information indicating that the box is empty, and for displaying the information indicating that the box is full and the information indicating that the box is empty, coded medium 8*x* for being captured by the camera sensor of terminal device 2210 may be rewritten.

Delivery box 8 checks whether it is empty inside or not by detecting the internal weight using the weight sensor (S2272).

If the weight sensor detects the internal weight of delivery box 8 and the inside is determined to be empty (YES in S2272), delivery box 8 transmits information indicating that the inside is empty to terminal device 2210.

When the user application of terminal device 2210 receives information indicating that delivery box 8 is empty from delivery box 8 via second communicator 13, the order information, which is information about the order of the product that the user confirmed in step S2271, is transmitted to retail system 2211 via second communicator 13 (S2273). This allows unmanned aerial vehicle 10 to deliver the product to the user, who can then receive the product.

If the weight sensor detects the internal weight of delivery box 8 and the inside is determined to be full (NO in S2272), delivery box 8 transmits information indicating that the inside is full to terminal device 2210. When delivery box 8 is capable of storing a plurality of packages, even if the weight sensor detects internal weight, delivery box 8 does not need to determine that the inside is full if there is space available for storage in delivery box 8. Delivery box 8 may transmit information to terminal device 2210 indicating that the inside is full only when it is unable to store another package inside.

When the user application of terminal device 2210 receives information indicating that delivery box 8 is full, it displays a message on the menu screen prompting the user to remove the package to empty the inside of delivery box 8 (S2274). With this, the user retrieves the package stored inside delivery box 8. The user application then returns to step S2272.

Thus, in the present operation example, the inside of delivery box 8 must be empty to allow the user to order products. This allows unmanned aerial vehicle 10 to reliably deliver packages to delivery box 8.

Operation Example 9

Next, operations performed when the order of delivery is switched based on the desired time of delivery when a user places an order A for a product and another user places an order B for a product will be described.

Figure 119:
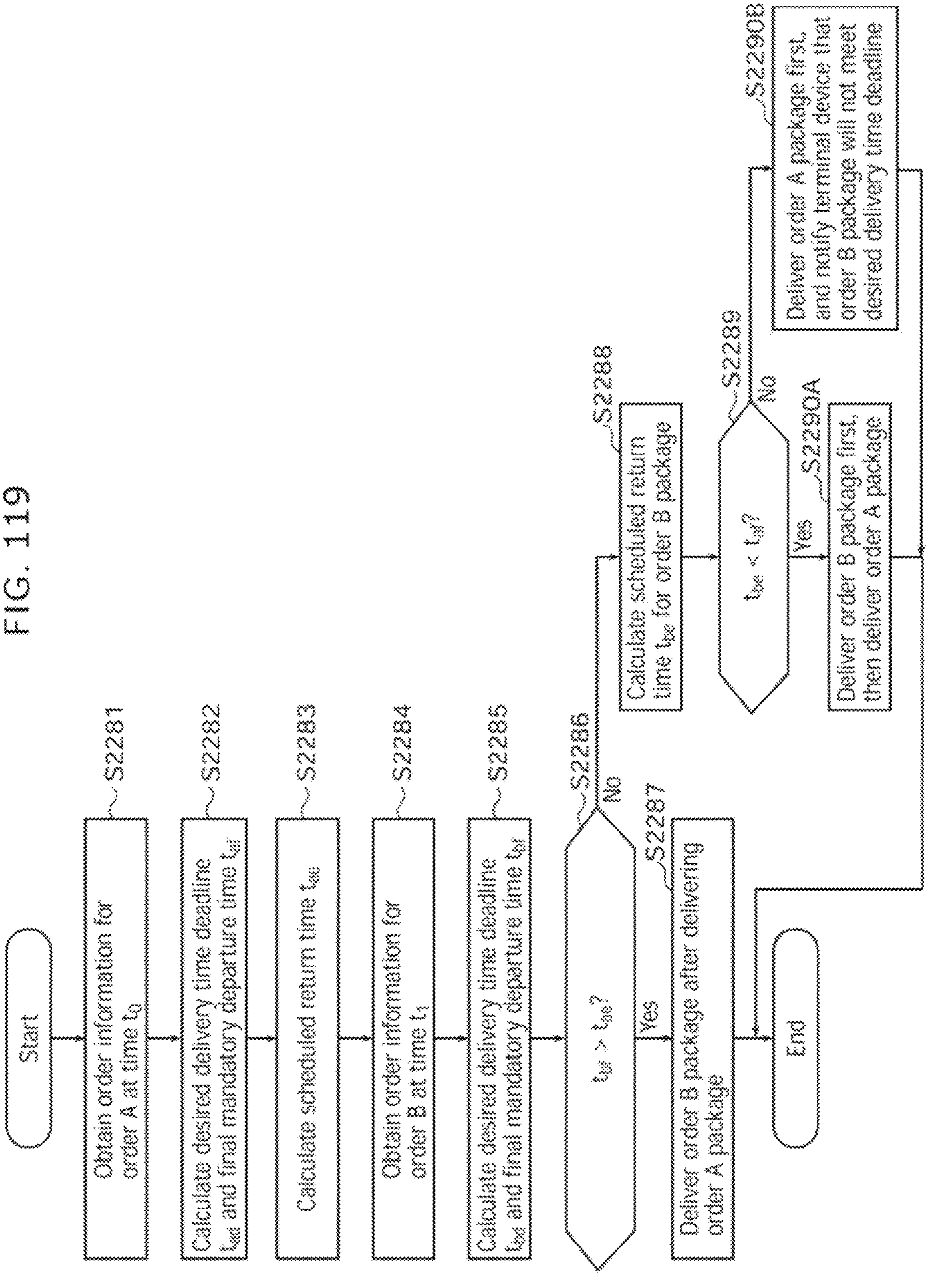

FIG. 118 illustrates an example of when delivery system 1A of Operation Example 9 according to Embodiment 11 swaps the order of delivery of order A and order B when order A and order B are received. In FIG. 118, time is represented on the horizontal axis and order A and order B are represented on the vertical axis. FIG. 119 is a flowchart of an example of operations performed when delivery system 1A of Operation Example 9 according to Embodiment 11 swaps the order of delivery of order A and order B when order A and order B are received.

As illustrated in FIG. 118 and FIG. 119, when operations management system 2213 obtains the order information for order A at time $t_0$ (S2281), it calculates desired delivery time deadline $t_{ad}$ based on the order time and the desired time of delivery indicated in the order information. Operations management system 2213 calculates final mandatory departure time $t_{af}$ based on the distance to the receiver indicated in the order information (S2282).

Operations management system 2213 schedules the earliest possible departure time $t_a$ from the present time as the scheduled departure time and calculates scheduled return time $t_{ae}$ (S2283).

When operations management system 2213 obtains the order information for order B at time $t_1$ (S2284), similarly, it calculates desired delivery time deadline $t_{bd}$ based on the order time and the desired time of delivery indicated in the order information. Operations management system 2213 calculates final mandatory departure time $t_{bf}$ based on the distance to the receiver indicated in the order information. Operations management system 2213 schedules the earliest possible departure time $t_a$ from the present time as the scheduled departure time and calculates scheduled return time $t_{be}$ (S2285).

In principle, operations management system 2213 sends out unmanned aerial vehicle 10 on a first come, first served basis, that is, in the order in which the orders are received, but it compares scheduled return time $t_{ae}$ when order A departs first with final mandatory departure time $t_{bf}$ of order B, and determines whether $t_{bf}>t_{ae}$ (S2286).

If $t_{bf}>t_{ae}$ (YES in S2286), operations management system 2213 delivers the package of order B after delivering the package of order A as scheduled (S2287), because order B can meet the final mandatory departure time $t_{bf}$ even if order A is delivered first. Operations management system 2213 then ends the process.

If $t_{bf}>t_{ae}$ is not satisfied (NO in S2286), operations management system 2213 derives that desired delivery time deadline $t_{bd}$ for order B will not be met if the package of order B is delivered after the package of order A is delivered.

Therefore, operations management system 2213 recalculates scheduled return time $t_{be}$ for a case in which the package of order B is shipped before the package of order A. Operations management system 2213 calculates scheduled return time $t_{be}$ for when the package of order B is sent out at scheduled departure time to for the package of order A (S2288).

Operations management system 2213 compares scheduled return time $t_{be}$ for when the package of order B is sent out with final mandatory departure time $t_{af}$ for order A, and determines whether $t_{be}<t_{af}$ (S2289).

If $t_{be}<t_{af}$ (YES in S2289), operations management system 2213 determines that there is no problem with delivering the package of order A after delivering the package of order B, and thus delivers the package of order B first and then delivers the package of order A (S2290A). Stated differently, operations management system 2213 changes the delivery order based on the desired delivery time deadline, instead of adopting the first come, first served principle, that is, instead of in the order in which the orders are received. Stated differently, operations management system 2213 changes the delivery priority based on the desired delivery time deadline. For example, delivery defined by the period from time $t_a$ indicated by the dashed square in FIG. 119 to $t_{ae}$ indicated by the dashed triangle is deferred to the period from time $t_a$ indicated by the solid square to $t_{ae}$ indicated by the solid triangle. Moreover, for example, delivery defined by the period from time $t_{bf}$ indicated by the dashed square in FIG. 119 to $t_{bd}$ indicated by the dashed triangle is advanced to the period from time $t_a$ indicated by the solid square to $t_{be}$ indicated by the solid triangle. Thus, operations management system 2213 is able to deliver the packages of order A and order B by the desired delivery time deadline. Operations management system 2213 then ends the process.

If $t_{be}<t_{af}$ is not satisfied (NO in S2289), it means that even if the delivery order is changed, the package of order B will not be delivered by desired delivery time deadline $t_{bd}$, so operations management system 2213 will follow the original first come, first served principle and deliver the package of order A first, and notify the user's terminal device 2210 that the package of order B will not meet the desired time of delivery (S2290B). Operations management system 2213 then ends the process.

Operation Example 10

Next, operations performed when a user orders a product that requires temperature retention and unmanned aerial vehicle 10 delivers the product to the user within a predetermined transport temperature range will be described.

Figure 120:
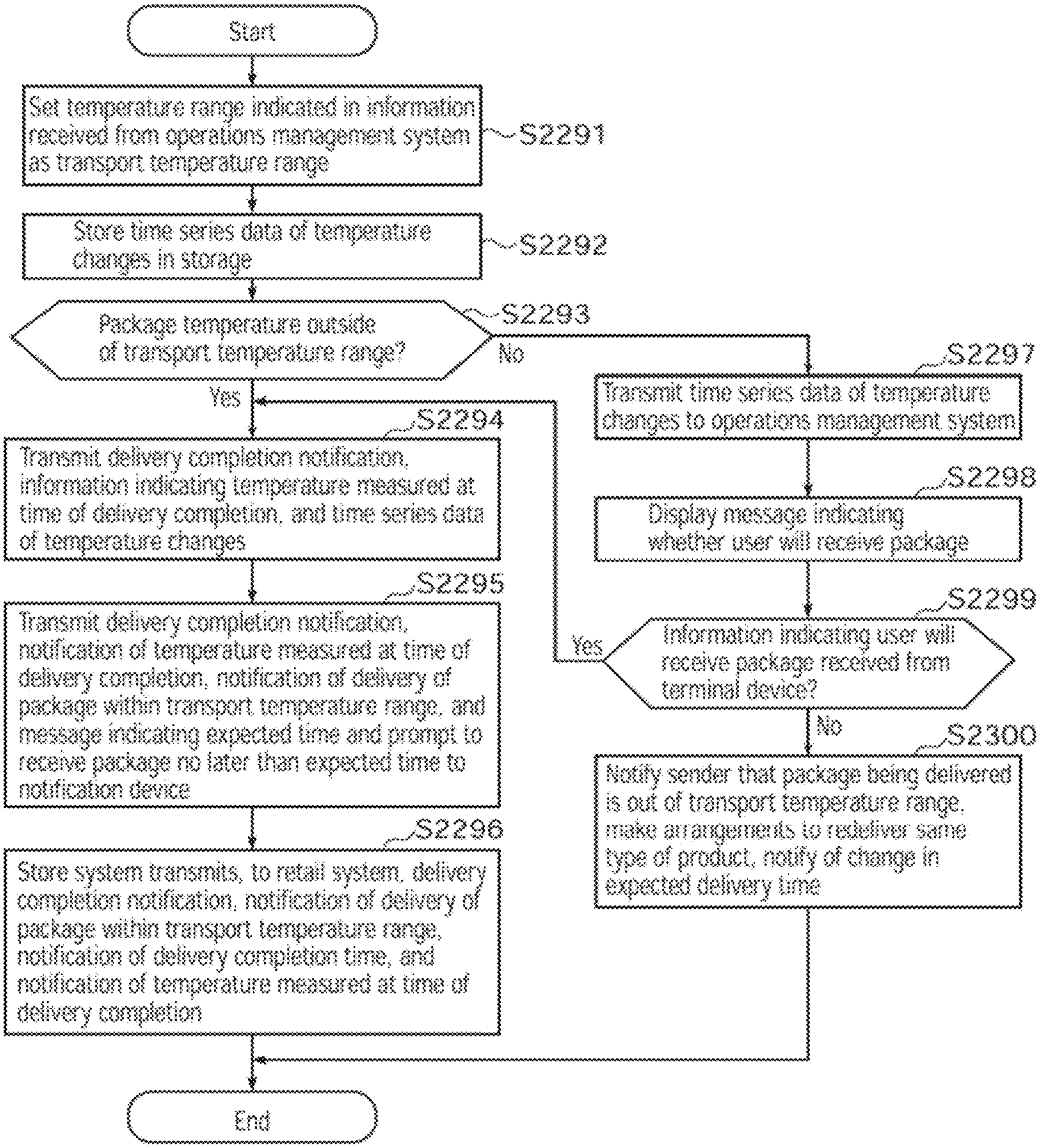

FIG. 120 is a flowchart illustrating an example of operations performed when unmanned aerial vehicle 10 of delivery system 1A of Operation Example 10 according to Embodiment 11 delivers a package to a user within a predetermined transport temperature range.

As illustrated in FIG. 120, when a product is ordered from retail system 2211 by the user, operations management system 2213 transmits information to unmanned aerial vehicle 10 indicating a temperature range determined in advance based on the package to be loaded on unmanned aerial vehicle 10. Unmanned aerial vehicle sets the temperature range indicated by the information received from operations management system 2213 as the transport temperature range (S2291). When a plurality of products are purchased and a plurality of products are bundled into one, unmanned aerial vehicle 10 extrapolates a common range of the temperature ranges for each of the plurality of products and uses the extrapolated common range as the transport temperature range. If the temperature ranges for each of the plurality of products diverge and a common range cannot be extrapolated, unmanned aerial vehicle 10 may send information indicating that a common range cannot be extrapolated to terminal device 2210 via operations management system 2213. In such cases, terminal device 2210 may be notified that the delivery will be divided over a plurality of deliveries.

Unmanned aerial vehicle 10 moves toward the receiver in a way that ensures compliance with the set transport temperature range. More specifically, unmanned aerial vehicle 10 includes a temperature sensor. The temperature sensor successively detects the temperature of the package placed inside package platform 2220 and outputs information indicating the detected temperature of the package to control processor 11.

Control processor 11 generates time series data of temperature changes based on the information indicating the temperature of the package, and stores the generated time series data of temperature changes in the storage (S2292).

After obtaining the information indicating the temperature of the package obtained from the temperature sensor, during the period until the package is stored in delivery box 8 at the receiver (until delivery is completed), control processor 11 determines whether the temperature of the package indicated by the obtained temperature is outside of the transport temperature range (S2293). Stated differently, during delivery, control processor 11 successively monitors the temperature of the package placed inside package platform 2220 detected by the temperature sensor. Control processor 11 executes this determination until the package is stored in delivery box 8 at the receiver.

In step S2293, control processor 11 may determine whether a value obtained by integrating or summing over time the temperature difference in which the temperature of the package was out of the transport temperature range exceeds a predetermined value. This makes it possible to ignore minor deviations from the transport temperature range, instantaneous measurement errors, etc., that have little or no effect on the product. This can reduce excessive discounting, discarding of products, etc.

If control processor 11 determines that the temperature of the package as indicated by the obtained temperature is not outside of the transport temperature range before the delivery is completed (YES in S2293), it notifies operations management system 2213 via second communicator 13 with a delivery completion notification because this means that the delivery was made with the quality of the product maintained. The temperature sensor measures the temperature of the package when the package is stored from package platform 2220 to delivery box 8 of the receiver at the time of delivery completion, and control processor 11 transmits the temperature measured at the time of delivery completion to operations management system 2213 via second communicator 13. Control processor 11 also transmits the time series data of temperature changes generated based on the information indicating the temperature of the package during delivery to operations management system 2213 via the second communicator (S2294).

Operations management system 2213 obtains, from unmanned aerial vehicle 10, a delivery completion notification, information indicating the temperature measured at the time of delivery completion, and time series data of temperature changes in the package. Operations management system 2213 notifies terminal device 2210 of the delivery completion notification, the temperature measured at the time of delivery completion, and that the package was delivered within the transport temperature range. Furthermore, operations management system 2213 calculates the expected time when the package stored in delivery box 8 will fall out of the transport temperature range due to atmospheric conditions, and notifies terminal device 2210 of the calculated expected time and a message prompting the user to receive the package no later than the expected time (S2295). This allows the user to promptly retrieve the package delivered to delivery box 8. The user can thus receive packages whose temperatures are retained. This delivery system can therefore deliver packages to users with the quality of the packages intact.

Operations management system 2213 transmits, to the store system 2212 that is the shipper or retail system 2211, the delivery completion notification, a notification that the package was transported within the transport temperature range, a notification of the time of delivery completion, and a notification of the temperature measured at the time of delivery completion (S2296). Delivery system 1A then ends the processing.

However, if control processor 11 determines that the temperature of the package as indicated by the obtained temperature is outside of the transport temperature range before the delivery is completed (NO in S2293), control processor 11 transmits the time series data of temperature changes generated based on the information indicating the temperature of the package during delivery to operations management system 2213 via second communicator 13 (S2297).

Operations management system 2213 notifies the user via terminal device 2210 that the temperature of the package is out of the transport temperature range, and confirms whether the user is willing to receive the package. The user application on terminal device 2210 displays a message on the menu screen indicating whether or not the user is willing to receive the package even if the package temperature is outside the transport temperature range (S2298). The user application may offer the user a discount on the fee (delivery charge or product price) via the menu screen if the user is willing to receive the package.

Operations management system 2213 determines whether it has received, within a predetermined period of time after the notification of the message in step S2298, information from terminal device 2210 indicating that the user is willing to receive the package (S2299).

If operations management system 2213 determines that it has received information indicating that the user is willing to receive the package from terminal device 2210 within the predetermined period of time after the notification of the message in step S2298 (YES in S2299), that is, if the user is willing to receive the package, it proceeds to step S2294.

However, if operations management system 2213 determines that it has not received any information indicating that the user is willing to receive the package from terminal device 2210 within the predetermined period of time after the notification of the message in step S2298 (NO in S2299), the sender is notified the package has fallen out of the transport temperature range during delivery to the sender. Operations management system 2213 makes arrangements for redelivering the same type of product. Operations management system 2213 notifies terminal device 2210 of the user of the change in expected delivery time (S2300). Delivery system 1A then ends the processing.

Operation Example 11

Next, operations performed when a user orders a product that requires temperature retention and unmanned aerial vehicle 10 determines whether to go back mid-delivery when unmanned aerial vehicle 10 cannot deliver the product to the user within a predetermined transport temperature range will be described. In the present operation example, the products are mainly frozen.

Figure 121:
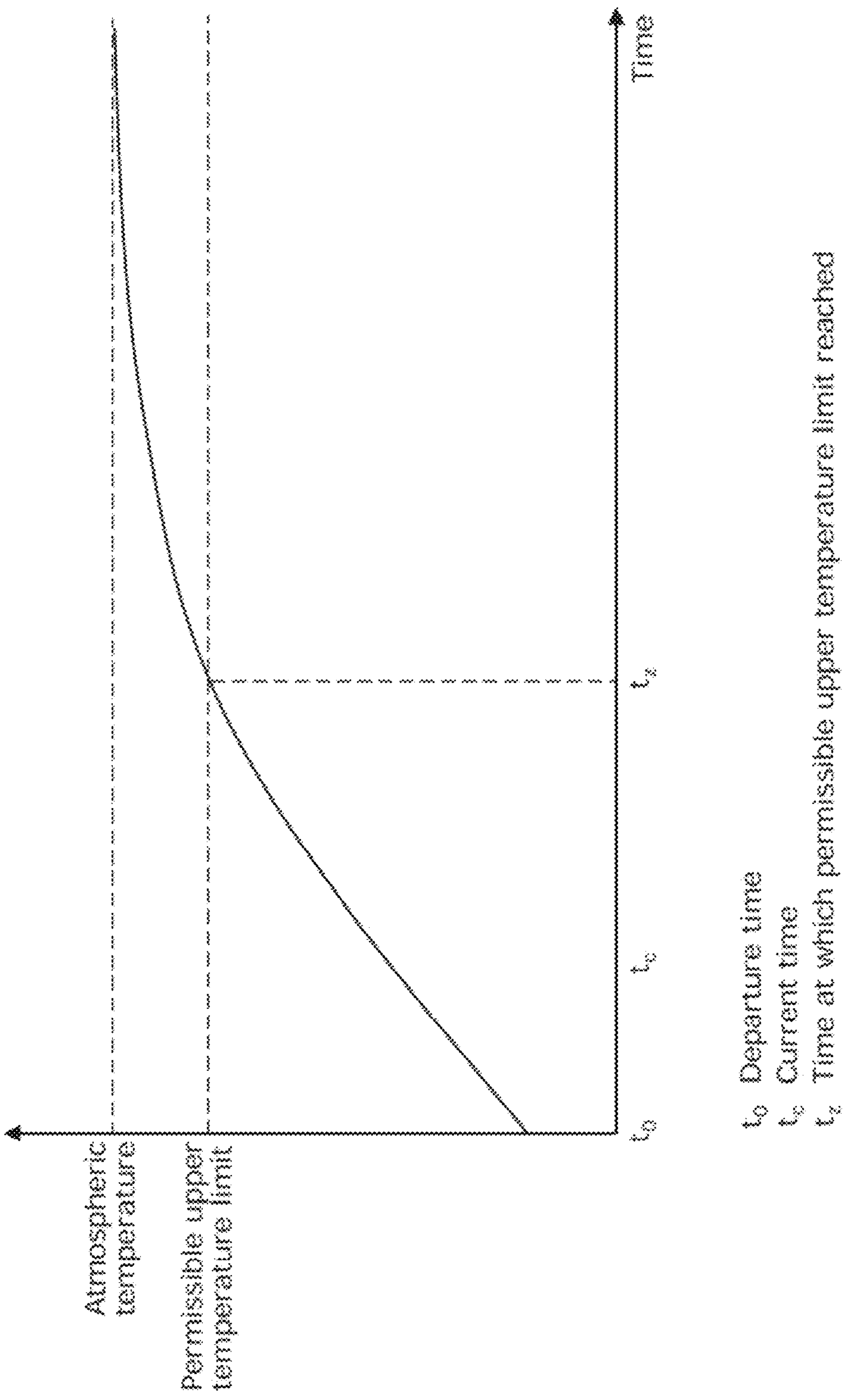

FIG. 121 illustrates an example of the time to reach the permissible upper temperature limit (one example of the expected time to reach the permissible upper temperature limit) based on the relationship between time and the atmospheric temperature, in delivery system 1A of Operation Example 11 according to Embodiment 11. In FIG. 121, time is represented on the horizontal axis and atmospheric temperature is represented on the vertical axis.

As illustrated in FIG. 121, control processor 11 of unmanned aerial vehicle 10 obtains the departure position, which is the position of the sender of unmanned aerial vehicle 10 (one example of the fourth obtainment step), the destination position, which is the position of the receiver of the package carried by unmanned aerial vehicle 10 (one example of the fifth obtainment step), the current position of unmanned aerial vehicle 10 (one example of the sixth obtainment step), and the permissible upper temperature limit of the package (example of the seventh obtainment step). Control processor 11 of unmanned aerial vehicle 10 performs the following processes based on this obtained data. Control processor 11 of unmanned aerial vehicle 10 measures or calculates average travel speed (predetermined speed) V, distance $L_{CX}$ from the current position of unmanned aerial vehicle 10 to the destination point of the receiver, amount of temperature change ΔT of the package, and distance $L_X$ from the sender to the receiver (distance based on the travel route), and determines whether $L_{CX}>L_X/2$. When $L_{CX}>L_X/2$, control processor 11 cancels the delivery and returns to the departure point if $L_{CX}>(t_Z-\Delta T-t_C)V$. Stated differently, if unmanned aerial vehicle 10 is unable to deliver the product to the user with the quality of the product intact, it will cancel the delivery and return to the sender. These determinations may be made by operations management system 2213. Here, time $t_Z$ can be determined from, for example, the current temperature and heat capacity of the package (including packaging and insulation mechanisms), the thermal conductivity of the packaging, thermal conductivity of insulation mechanisms, refrigeration performance of package platform 2220, heating performance of package platform 2220, and atmospheric temperature.

Although $L_X/2$ is used in $L_{CX}>L_X/2$, which indicates the relationship between $L_{CX}$, the distance from the current position to the destination point of the receiver, and $L_X$, the distance from the sender to the receiver (distance based on the travel route), and ΔT, the amount of temperature change of the package, this example is non-limiting. $L_X/n$ may be used (n is an integer of 1 or greater). In the present embodiment, n=2 is given as an example. $L_X/n$ is one example of the predetermined value. The predetermined value is the value at which the temperature of the package reaches the permissible upper temperature limit when unmanned aerial vehicle is moved at the predetermined speed.

This allows the product to be returned to the refrigerator and freezer or warming cabinet again without being greater than or equal to or less than or equal to the permissible upper temperature limit. The amount of temperature change $\Delta T$ of the package may decrease with decreasing distance $L_{CX}$ from the sender to the receiver. This allows for a more reliable determination of the scheduled return time, even in situations where the remaining delivery time is short and uncertainty is low.

If $L_{CX}=L_X$, unmanned aerial vehicle 10 will cancel the delivery of the package. In such cases, the user application of terminal device 2210 may disable the ability to select the purchase of a product.

When $L_{CX}<L_X/2$, control processor 11 cancels the delivery if $L_{CX}>(t_Z-t_C)V$. Stated differently, the temperature of the package will exceed the permissible upper temperature limit regardless of whether it is moved to the receiver or the sender, so the package is discarded. In this way, the delivery by unmanned aerial vehicle 10 can be carried out promptly and the availability of unmanned aerial vehicle 10 can be improved. $(t_Z-t_C)V$ may be calculated as one example of the predetermined value.

Operation Example 12

Next, another operation example of Operation Example 11 will be described. Operations similar to those in Operation Example 11, etc., are denoted with the same reference signs, and repeated description will be omitted as appropriate.

Figure 122:
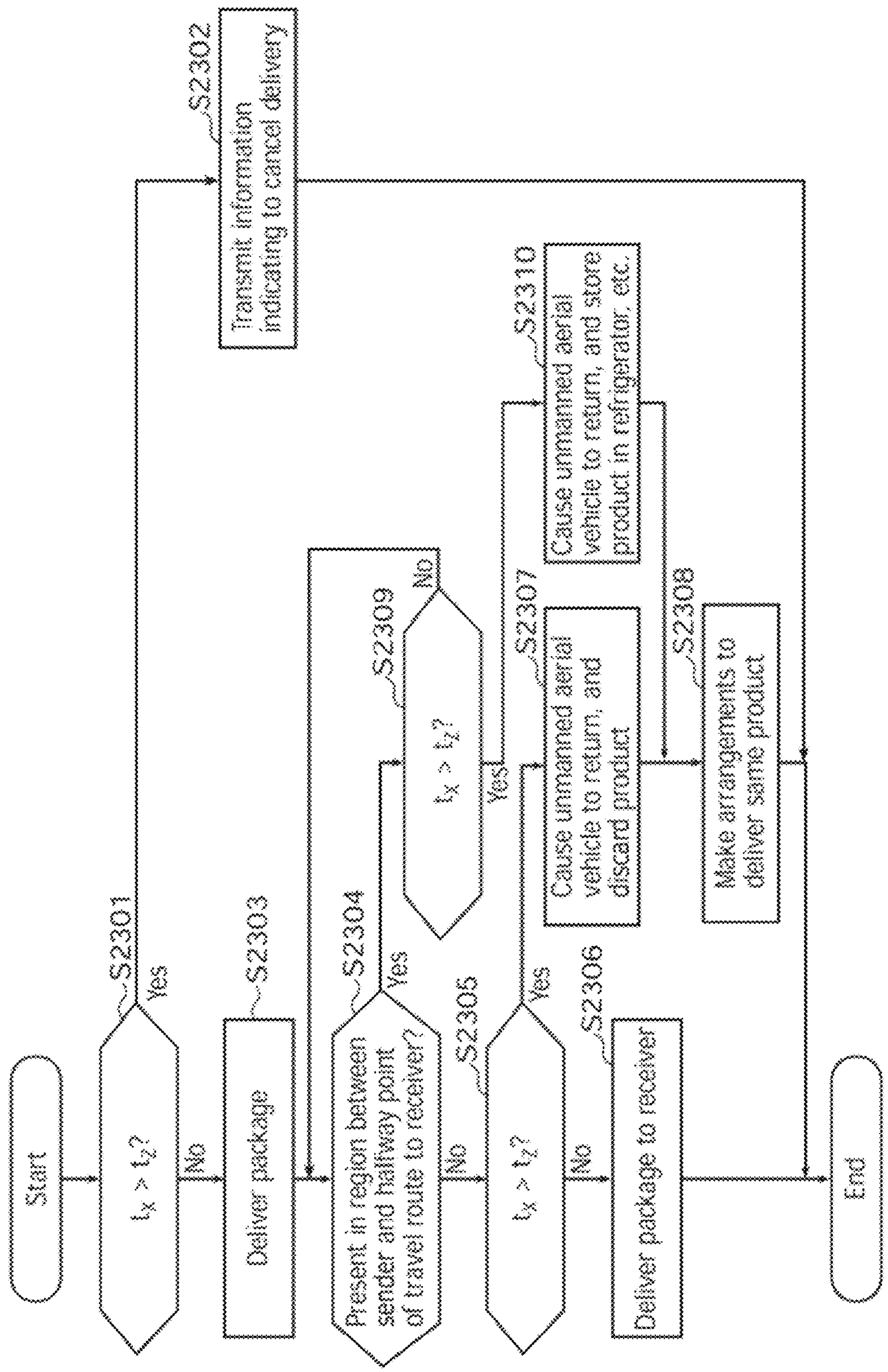

FIG. 122 is a flowchart illustrating another example of operations performed when unmanned aerial vehicle 10 of delivery system 1A of Operation Example 12 according to Embodiment 11 cannot deliver a package to a user within the predetermined transport temperature range. The operation example will be described with reference FIG. 121 of Operation Example 11.

As illustrated in FIG. 121 and FIG. 122, control processor 11 of unmanned aerial vehicle 10 obtains the destination position, which is the position of the receiver of the package carried by unmanned aerial vehicle 10 (one example of the first obtainment step), and the current position of unmanned aerial vehicle 10 (one example of the second obtainment step). Control processor 11 of unmanned aerial vehicle 10 performs the following processes based on this obtained data. Control processor 11 of unmanned aerial vehicle 10 calculates the expected delivery time $t_X=t_C+L_{CX}/V$ based on average travel speed V, distance $L_{CX}$ from the current position of unmanned aerial vehicle 10 to the destination point of the receiver, and current time $t_C$. Expected delivery time $t_X$ is one example of the point in time at which unmanned aerial vehicle 10 will reach the receiver from its current position.

Control processor 11 obtains the permissible upper temperature limit for the package (one example of the third obtainment step) and calculates time $t_Z$, which is the expected time at which the package will reach or exceed the permissible upper temperature limit (expected time that the permissible upper temperature limit will be reached) to obtain time $t_Z$ (one example of the sixth obtainment step). Control processor 11 determines, at the sender, whether $t_X>t_Z$ (S2301).

If $t_X>t_Z$ (YES in S2301), control processor 11 cancels the delivery and sends unmanned aerial vehicle 10 back to the place of departure, and transmits information indicating to cancel the delivery to terminal device 2210 and operations management system 2213 via second communicator 13 (S2302). Stated differently, since unmanned aerial vehicle 10 is unable to deliver the product to the user with the quality of the product intact, it cancels the delivery and returns to the sender. These determinations may be made by operations management system 2213. Delivery system 1A then ends the processing.

If $t_X>t_Z$, the user application may forgo displaying the product so that the user is unable to order the product. The user application may also be grayed out so that the user cannot select a product.

If $t_X>t_Z$ is not satisfied (NO in S2301), control processor 11 allows unmanned aerial vehicle 10 to continue delivering the package (S2303).

Control processor 11 determines whether unmanned aerial vehicle 10 is present in the region between the sender and the halfway point of the travel route from the sender to the receiver (S2304).

When control processor 11 determines that unmanned aerial vehicle 10 is present in the region between the receiver and the halfway point of the travel route from the sender to the receiver (NO in S2304), control processor 11 determines if $t_X>t_Z$ (S2305).

If control processor 11 determines that $t_X>t_Z$ is not satisfied (NO in S2305), operations management system 2213 allows unmanned aerial vehicle 10 to continue delivering the package to the receiver (S2306). Delivery system 1A then ends the processing.

However, if control processor 11 determines that $t_X>t_Z$ (YES in S2305), operations management system 2213 causes unmanned aerial vehicle 10 to cancel the delivery and return to the sender. The product returned as a result of unmanned aerial vehicle 10 returning to the sender is discarded (S2307). Stated differently, when unmanned aerial vehicle 10 is present in the region between the receiver and the halfway point of the travel route from the sender to the receiver, the package is discarded because the temperature of the package will exceed the permissible upper temperature limit regardless of whether unmanned aerial vehicle 10 moves to the sender or the receiver. If there is a storage location for the product that is closer than the receiver, or the user requests the product be delivered to that location, unmanned aerial vehicle 10 may deliver the package to that location.

Operations management system 2213 arranges for the same product to be delivered by another unmanned aerial vehicle 10 (S2308). Delivery system 1A then ends the processing.

However, when control processor 11 determines that unmanned aerial vehicle 10 is present in the region between the sender and the halfway point of the travel route from the sender to the receiver (YES in S2304), control processor 11 determines if $t_X>t_Z$ (S2309).

If control processor 11 determines that $t_X>t_Z$ is not satisfied (NO in S2309), the process returns to step S2304.

If control processor 11 determines that $t_X>t_Z$ (YES in S2309), operations management system 2213 causes unmanned aerial vehicle 10 to cancel the delivery and return to the sender (S2310). In this case, the package is not discarded. By returning to the sender in this manner, the product can be stored at the appropriate temperature, thus restoring or inhibiting deterioration in the quality of the product. Stated differently, the product can be returned back to the refrigerator or freezer without reaching or exceeding the permissible upper temperature limit. Therefore, even if the product cannot be delivered, the quality of the product will not be compromised, and thus the waste loss of the product can be inhibited. Operations management system 2213 then ends the process through step S2308.

Operation Example 13

Next, operations performed when setting the order in which products are delivered according to urgency of product delivery and temperature changes during delivery will be described.

Figure 123:
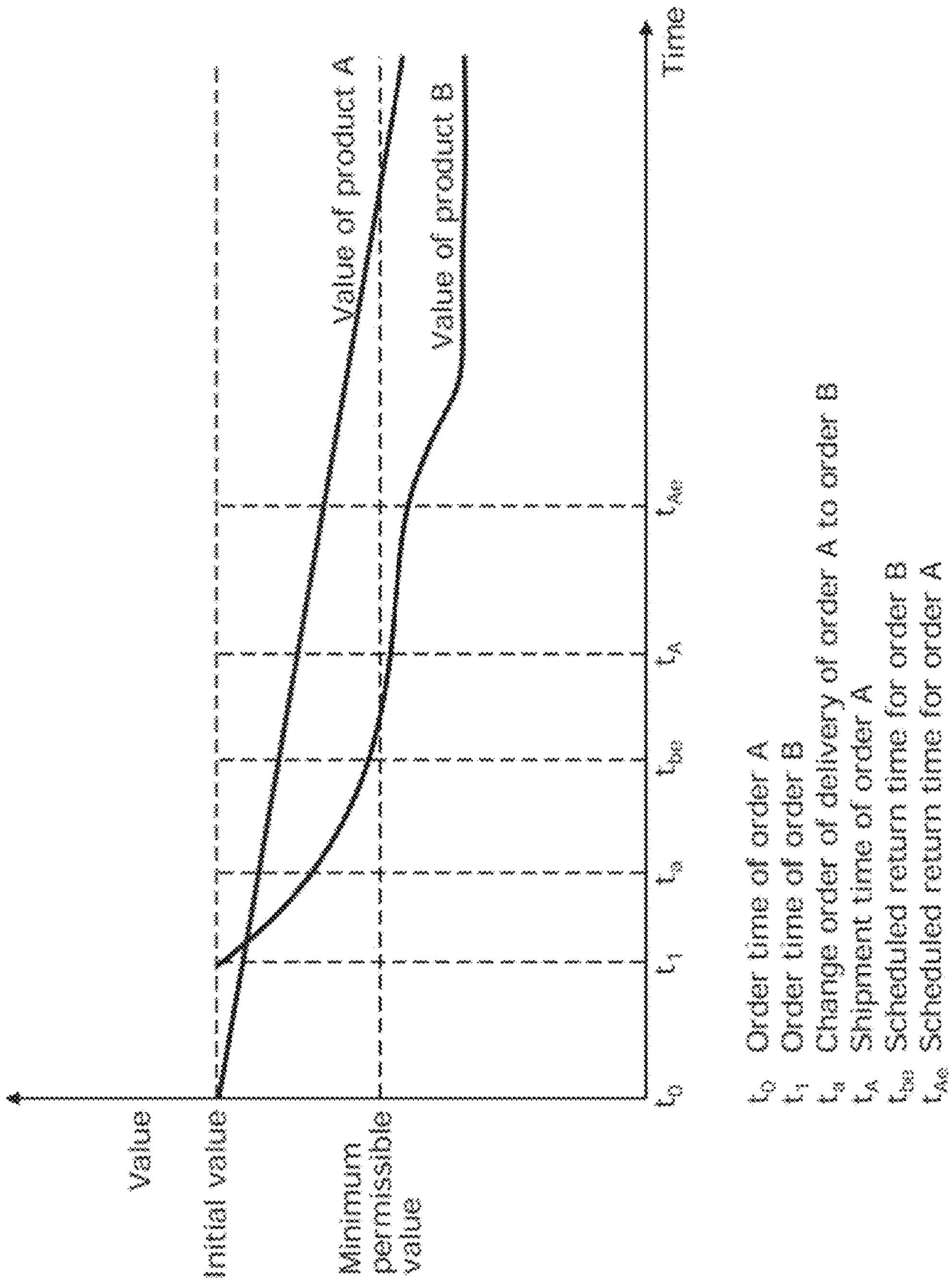

FIG. 123 illustrates an example of the time to reach the minimum permissible value based on the relationship between time and the value of the package in delivery system 1A of Operation Example 13 according to Embodiment 11. In FIG. 123, time is represented on the horizontal axis and the value of the ordered product is represented on the vertical axis.

In FIG. 123, assume that at time to, which when product A is ordered, product A is scheduled to be shipped at time $t_a$, but before that, at time $t_1$, product B is ordered that requires urgent delivery. In such cases, operations management system 2213 switches product A scheduled to be shipped at time $t_a$ to product B so that product B is shipped at time $t_a$. Product B that requires urgent delivery is, for example, a product that the user wants immediately, and is often a product that requires temperature retention, such as ramen, pizza, ice cream, etc., and for which the time between the order time and the desired delivery time deadline is short.

User requests include, for example, a user request for a product "within xx hours" and another user's request for a product "right now". To the other user that requested the product "right now", the value of the desired product is high. In the eyes of the user, if the desired product is not delivered immediately, the value of the product is diminished. As illustrated in FIG. 123, the value of product A tends to decline gradually over time, while the value of product B tends to decline more significantly than the value of product A.

Operations management system 2213 pre-determines a value function that is dependent on the user's order, for example, V=a(t)+b, based on the user's urgency preference, the type of product, and the importance of temperature management of the product. Operations management system 2213 determines the order in which to deliver the products (the priority of the delivery of the products) based on the pre-determined value function. Therefore, operations management system 2213 delivers the products to the users in such a way that they do not fall below the permissible marginal value. The permissible marginal value refers to the time-based value that a user can tolerate to receive the product. If the product is ramen, pizza, ice cream, etc., there is a generally acceptable temperature range for the product, so the time before the product falls below the permissible marginal value is short. If the product is non-urgent snack or consumable or the like, the time until the value falls below the permissible marginal value will be longer. Note that a product that falls below the permissible marginal value means that in the eyes of the user, the value of the product has been significantly reduced.

For example, in such cases, operations management system 2213 switches product A scheduled to be shipped at time $t_a$ to product B, and delivers product B at time $t_{be}$. Operations management system 2213 then makes changes to ship product A at time $t_A$, and delivers product A to the user at time $t_{Ae}$. This allows operations management system 2213 to change the order of shipment of products A and B, so that they are delivered to their respective users without falling below the permissible marginal value.

[Dynamic Setting of Delivery Fee]

Next, a case will be described in which the fee is varied depending on the combination of the desired delivery time and time of day at the time the user places the order.

FIG. 124 illustrates an example of the dynamic setting of delivery fees when using delivery system 1A according to Embodiment 11.

At the time the user places an order, the user application displays the desired delivery time and the time of day on the menu screen.

For example, if the user desires delivery within a specified time from the current time, the delivery management system determines the current time and the expected time of arrival relative to the current time. FIG. 124 defines which of the cheapest categories the expected time of arrival determined by the delivery management system belongs to among the categories to which the expected time of arrival belongs.

In FIG. 124, the fee is set higher during peak hours than at other times of day. Since this inhibits a concentration of orders during peak hours, the delivery management system can make deliveries more efficiently (leveling the availability of unmanned aerial vehicles 10).

In FIG. 124, the closer the time from the current time (time of placement of order) is specified, the higher the fee is. This allows the delivery management system to plan deliveries efficiently because it can encourage users to place orders sufficiently ahead of time.

Note that the fees are not limited to the example illustrated in FIG. 124. For example, the fees may vary depending on the combination of delivery distance and desired delivery time. Fees may be categorized, for example, XX yen for "delivery distance of 100 meters or less," XX yen for "delivery distance of 100 to 200 meters," and so on. The fees may be calculated by adding, to the base fee, an amount obtained by multiplying the per-distance fee by the distance delivered. The base fee and the per-distance fee may be determined based on the desired delivery time and time of day category.

Embodiment 12

Configuration

Hereinafter, since the basic configuration of package transport device 10*p* according to the present embodiment is the same as the basic configuration of the unmanned aerial vehicle of Embodiment 1 and the like, regarding the basic configuration of package transport device 10*p* in the present embodiment, the same reference signs as above will be used and repeated description will be omitted where appropriate. The present embodiment may also be used with lifting systems and unmanned aerial vehicles according to embodiments other than Embodiment 1.

Figure 125:
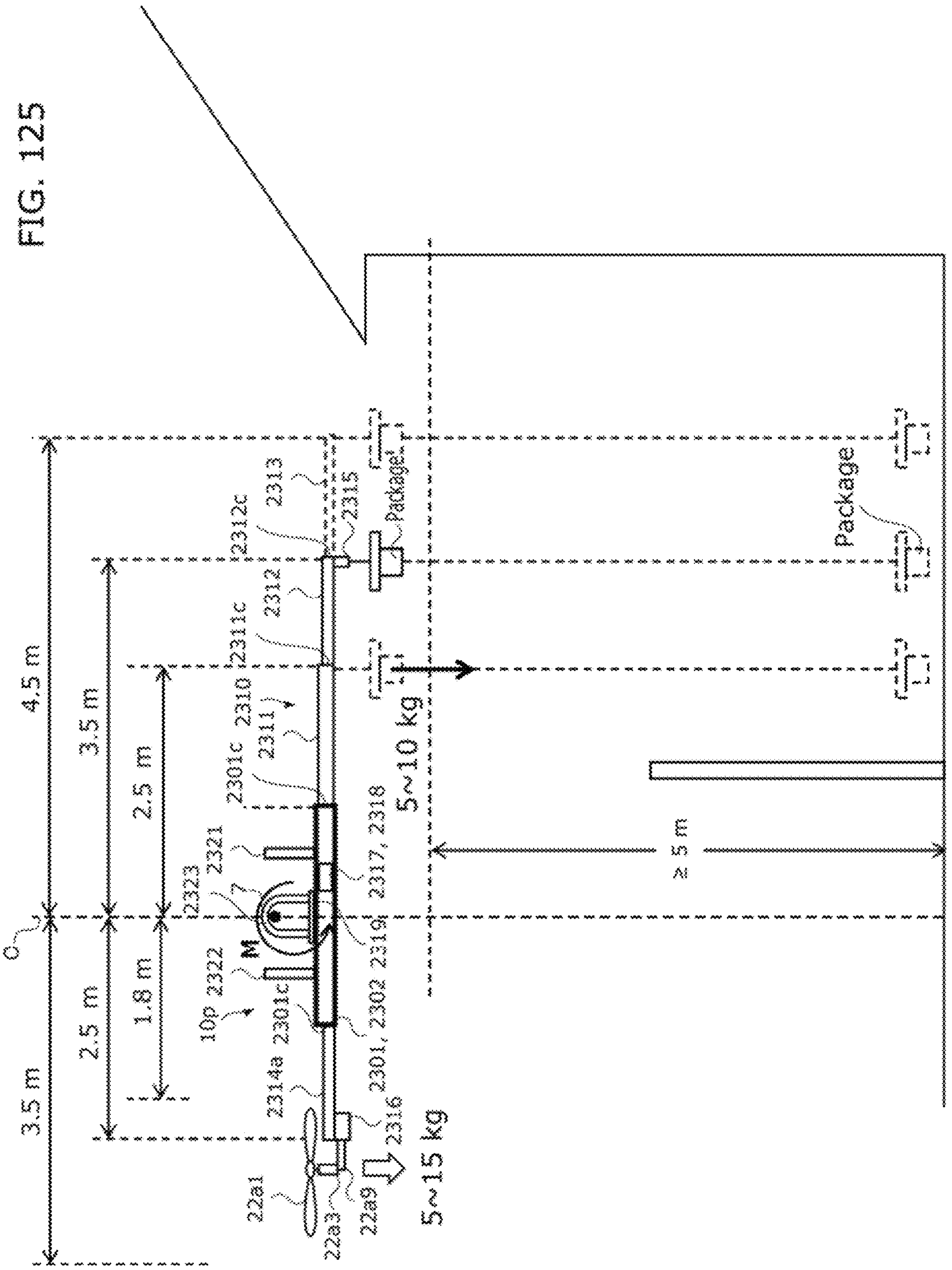

FIG. 125 illustrates an example of package transport device 10*p* delivering a package according to Embodiment 12.

As illustrated in FIG. 125, package transport device 10*p* is a flying body, i.e., an unmanned aerial vehicle such as a drone, and is also a mobile body that travels on rails 7. In other words, package transport device 10*p* not only flies in the air, but can also move along rails 7 provided above the ground that it is attached to. Stated differently, package transport device 10*p* can carry a package from the sender to the receiver while a plurality of connectors are connected to rail 7. The present embodiment illustrates an example in which package transport device 10*p* delivers to the yard of the receiver, which is, but not limited to, a facility such as a house.

Package transport device 10*p* includes vehicle main body 2301, slider portion 2310, a plurality of connectors, turntable 2319, side propeller 22*a*1, and third propeller actuation motor 22*a*3.

Vehicle main body 2301 includes frame 2302 that is rectangular in plan view. Frame 2302 is, for example, a rectangular frame-shaped body. Vehicle main body 2301 is provided with the plurality of connectors, turntable 2319, package holder 2315, and a plurality of propellers. The plurality of connectors, turntable 2319, etc., are provided on the top of vehicle main body 2301. Package transport device 10*p* may include a plurality of propellers that can fly vehicle main body 2301 by being rotationally driven by a propeller actuation motor that provides lift to fly vehicle main body 2301. Vehicle main body 2301 is one example of the main body.

Slider portion 2310 is extendable with respect to vehicle main body 2301. Slider portion 2310 includes a plurality of sliders, package holder 2315, counterweight 2316, and motor actuator 2317.

The plurality of sliders include first slider 2311, second slider 2312, third slider 2313, and first auxiliary slider 2314*a*. In the present embodiment, the plurality of sliders include four sliders, but the plurality of sliders may include three or fewer sliders, or five or more sliders. Hereinafter, first slider 2311, second slider 2312, third slider 2313, and first auxiliary slider 2314*a*, etc., may be collectively referred to simply as "sliders".

First slider 2311, second slider 2312, and third slider 2313 are arranged on one side of vehicle main body 2301 and extend from the one side of vehicle main body 2301 further along the lengthwise direction of vehicle main body 2301. FIG. 125 illustrates first slider 2311, second slider 2312, and third slider 2313 extended along the lengthwise direction of vehicle main body 2301 so as to move away from vehicle main body 2301. First slider 2311, second slider 2312, and third slider 2313 are aligned from vehicle main body 2301 in this order. First slider 2311 is one example of the first slider portion. Second slider 2312 is one example of the second slider portion. Third slider 2313 is one example of the third slider portion.

More specifically, first slider 2311 is coupled on the one side of vehicle main body 2301, and can extend from the one side of vehicle main body 2301 along the lengthwise direction of vehicle main body 2301 so as to move away from vehicle main body 2301, and can be inserted into vehicle opening 2301*c* on the one side of vehicle main body 2301. Second slider 2312 is coupled to first slider 2311 and can extend from the one side of first slider 2311 along the lengthwise direction of vehicle main body 2301 so as to move away from vehicle main body 2301, and can be inserted into first opening 2311*c* of first slider 2311. Third slider 2313 is coupled to second slider 2312 and can extend from the one side of second slider 2312 along the lengthwise direction of vehicle main body 2301 so as to move away from vehicle main body 2301, and can be inserted into second opening 2312*c* of second slider 2312.

First auxiliary slider 2314*a* is located on the other side of vehicle main body 2301 and extends from the other side of vehicle main body 2301 further along the lengthwise direction of vehicle main body 2301. FIG. 125 illustrates first auxiliary slider 2314*a* extended along the lengthwise direction of vehicle main body 2301 so as to move away from vehicle main body 2301, in a direction away from the side on which first slider 2311, second slider 2312, and third slider 2313 are provided. More specifically, first auxiliary slider 2314*a* is coupled on the other side of vehicle main body 2301, and can extend from the other side of vehicle main body 2301 along the lengthwise direction of vehicle main body 2301 so as to move away from vehicle main body 2301, and can be inserted into vehicle opening 2301*c* on the other side of vehicle main body 2301. Stated differently, first auxiliary slider 2314*a*, vehicle main body 2301, first slider 2311, second slider 2312, and third slider 2313 are aligned in this order. Note that in the present embodiment, one slider is provided on the other side of vehicle main body 2301, but two or more sliders may be provided.

Package holder 2315 is provided at the leading end of slider portion 2310. In the present embodiment, package holder 2315 is provided at the leading end of third slider 2313 (the end of third slider 2313 on the side opposite the vehicle main body 2301 side).

Package holder 2315 is located at one end (the leading end on the one side) of slider portion 2310 and can hold an attached package. Note that package holder 2315 is exemplified as located at the leading end of third slider 2313, but there may be two or less or four or more sliders. In such cases, package holder 2315 is provided at the leading end of the slider farthest from vehicle main body 2301 when all sliders are extended.

Counterweight 2316 is a weighted body with a predetermined weight that is provided at the other end (the leading end on the other side) of slider portion 2310. This allows vehicle main body 2301 to work to increase the moment M of the lifting of the package, using the connector corresponding to centerline O and connected to rail 7 as a fulcrum. In the present embodiment, counterweight 2316 is provided at the leading end of first auxiliary slider 2314*a* (the end of first auxiliary slider 2314*a* on the side opposite the vehicle main body 2301 side). Counterweight 2316 is, for example, a battery that provides power to motor actuator 2317, control processor 2318, etc., for moving package transport device 10*p*. Counterweight 2316 may be the same weight as the weight of the package, or it may be a different weight.

When package transport device 10*p* arrives at rail 7 located in front of the receiver, control processor 2318 drives the motor that rotates turntable 2319 so as to rotate turntable 2319 and thus rotate vehicle main body 2301. Here, control processor 2318 controls the motor so as to rotate turntable 2319 to cause the one side of vehicle main body 2301 (the side of vehicle main body 2301 on which package holder 2315 is provided) to face the receiver. With this, vehicle main body 2301 assumes an attitude in which the lengthwise direction of vehicle main body 2301 intersects the lengthwise direction of rail 7.

After turntable 2319 rotates vehicle main body 2301, control processor 2318 controls motor actuator 2317 to extend each of the sliders with respect to vehicle main body 2301. More specifically, control processor 2318 controls motor actuator 2317 to extend first slider 2311, second slider 2312, and third slider 2313 from vehicle opening 2301*c* on the one side of the vehicle main body 2301 and concurrently extend first auxiliary slider 2314*a* from vehicle opening 2301*c* on the other side of vehicle main body 2301. Thus, slider portion 2310 is extended with respect to vehicle main body 2301 after turntable 2319 rotates vehicle main body 2301 with respect to third connector 2323 and rail 7.

Control processor 2318 may control the rotation rate of the plurality of propellers and side propeller 22*a*1, etc., so that the lengthwise direction of vehicle main body 2301 is approximately parallel to the horizontal direction, by controlling motor actuator 2317 so as to adjust the amount (length) of extension of the sliders and/or controlling the propeller actuation motor and third propeller actuation motor 22a3, etc., such that the attitude of vehicle main body 2301 is balanced between the package side and the counterweight 2316 side. In this way, slider portion 2310 extends so as to maintain balance between the weight of the package and the weight of counterweight 2316. Stated differently, first auxiliary slider 2314a can extend so as to maintain balance between the weight of the package and the buoyancy of side propeller 22a1.

With this, package holder 2315 is positioned in the airspace on the receiver side relative to vehicle main body 2301 and rail 7, and counterweight 2316 is positioned on the side opposite the receiver side relative to vehicle main body 2301 and rail 7. This allows vehicle main body 2301 to maintain its attitude while positioning the package attached to package holder 2315 in the airspace above the delivery destination point, such as a delivery box at the receiver.

After turntable 2319 rotates vehicle main body 2301, motor actuator 2317 extends each of the sliders with respect to vehicle main body 2301. More specifically, in response to a control instruction from control processor 2318, motor actuator 2317 extends first slider 2311, second slider 2312, and third slider 2313 along the lengthwise direction of vehicle main body 2301 so as to move away from vehicle main body 2301, and concurrently extends first auxiliary slider 2314a along the lengthwise direction of vehicle main body 2301.

The connector is held by (connected to) rail 7 located above vehicle main body 2301. More specifically, the connector can be connected to rail 7 located at a position spaced apart from the ground surface with vehicle main body 2301 hanging from the connector. In the present embodiment, vehicle main body 2301 includes a plurality of connectors. The plurality of connectors include first connector 2321, second connector 2322, and third connector 2323. In the present embodiment, three connectors—namely first connector 2321, second connector 2322, and third connector 2323—are provided as the plurality of connectors. However, the plurality of connectors may include two or four or more.

First connector 2321 is located on one side in the lengthwise direction of frame 2302. Second connector 2322 is located on the other side in the lengthwise direction of frame 2302. Third connector 2323 is located in the central region of frame 2302 between the one side and the other side in the lengthwise direction of frame 2302. A connector is one example of the rail holder. First connector 2321 is one example of the first rail holder. Second connector 2322 is one example of the second rail holder. Third connector 2323 is one example of the third rail holder.

Turntable 2319 is provided on the upper surface of vehicle main body 2301, between vehicle main body 2301 and third connector 2323. Third connector 2323 is coupled to turntable 2319. In response to a control instruction from control processor 2318, turntable 2319 applies stress to rotate vehicle main body 2301. Accordingly, when third connector 2323 is connected to rail 7, turntable 2319 can rotate vehicle main body 2301 around center point O. With this, turntable 2319 rotates vehicle main body 2301 until the lengthwise direction of frame 2302 approximately perpendicularly intersects the extending direction of rail 7.

Side propeller 22a1 is provided on the other side of vehicle main body 2301 (the side opposite the side in the traveling direction). Side propeller 22a1 provides propulsion force to vehicle main body 2301 in a direction parallel to rail 7. More specifically, side propeller 22a1 provides propulsion force to vehicle main body 2301 by being rotated by third propeller actuation motor 22a3 attached to propeller support portion 22a9 provided on the other side of first auxiliary slider 2314a. Stated differently, third propeller actuation motor 22a3 controls the rotation rate of side propeller 22a1 in response to a control instruction from control processor 2318. Side propeller 22a1 is one example of the propulsion blade.

Figure 126:
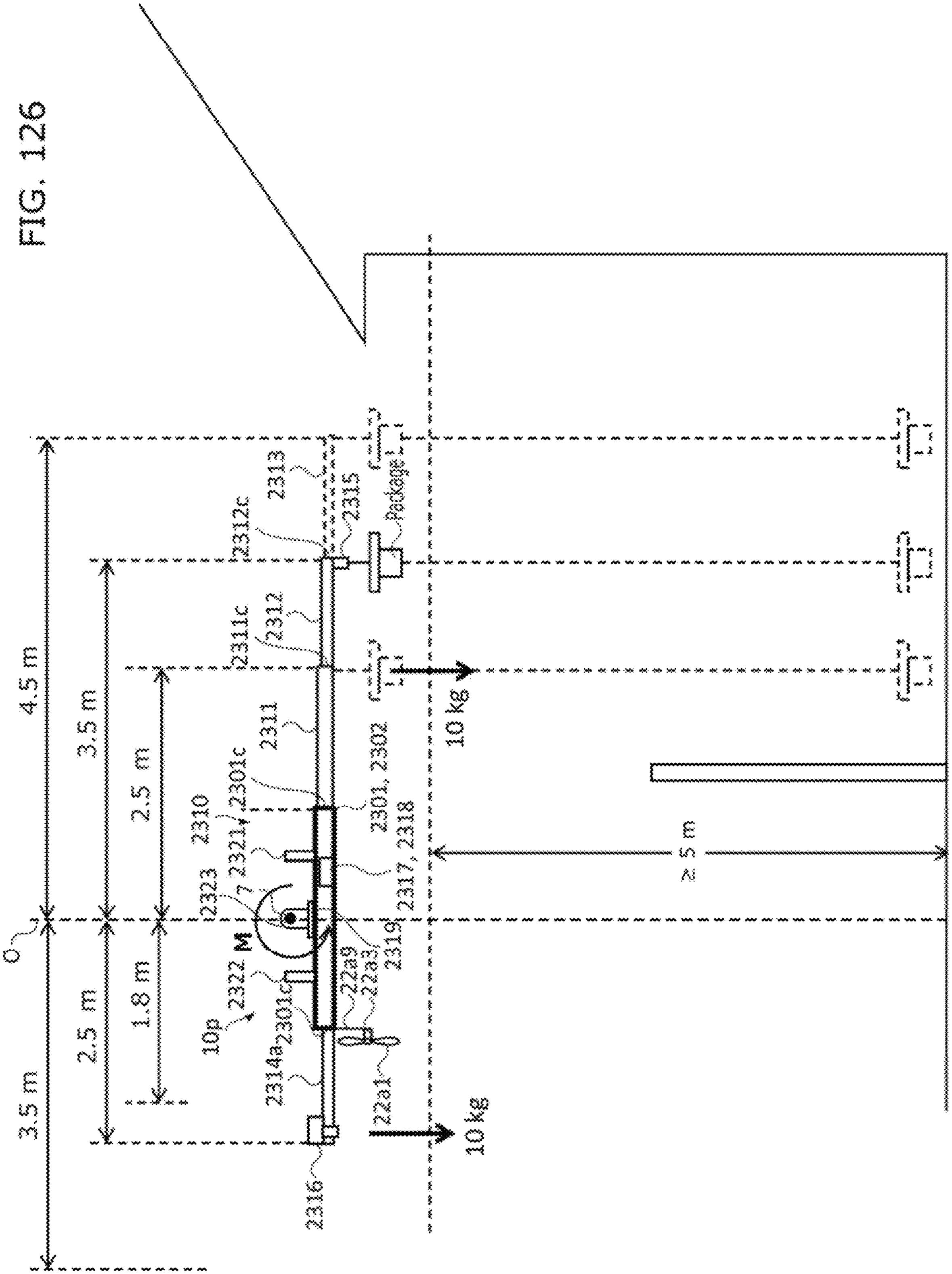

Note that propeller support portion 22a9 may be provided on the other side of vehicle main body 2301, as illustrated in FIG. 126. FIG. 126 illustrates an example of another package transport device 10p delivering a package according to Embodiment 12.

Side propeller 22a1 can change its attitude with respect to vehicle main body 2301 together with third propeller actuation motor 22a3 by control processor 2318 controlling the attitude of propeller support portion 22a9. Stated differently, side propeller 22a1 can provide propulsion force to vehicle main body 2301 in the vertical direction and provide propulsion force to vehicle main body 2301 in a direction intersecting the lengthwise direction, by being rotated by third propeller actuation motor 22a3. The attitude of propeller support portion 22a9 can be changed by control processor 2318 controlling a motor capable of changing the attitude of propeller support portion 22a9.

When package transport device 10p includes a propeller actuation motor and a plurality of propellers, the plurality of propellers are provided on the upper surface of vehicle main body 2301. The plurality of propellers correspond one to one to the plurality of propellers actuation motors, and by rotationally driving the propeller actuation motors, the plurality of propellers rotate around the relative axes of rotation of the propeller actuation motors to provide vehicle main body 2301 with thrust and buoyancy.

When package transport device 10p arrives at the portion of rail 7 in front of the receiver, it is positioned at approximately five meters or more above the ground surface, including the package. Assuming the load weight of the package is approximately 5 to 10 kg and the weight of counterweight 2316 is approximately 5 to 15 kg, first slider 2311, second slider 2312, third slider 2313, and first auxiliary slider 2314a can be extended as follows. For example, since there is approximately 2.5 meters from center point O of vehicle main body 2301 to the leading end of first slider 2311, approximately 3.5 meters from center point O of vehicle main body 2301 to the leading end of second slider 2312, and approximately 4.5 meters from center point O of vehicle main body 2301 to the leading end of third slider 2313, the package can be delivered reliably even if the receiver is distanced from rail 7. Since there is approximately 1.8 meters to 3.5 meters from center point O of vehicle main body 2301 to the leading end of first auxiliary slider 2314a, the attitude of vehicle main body 2301 can be maintained. Stated differently, by extending first slider 2311, second slider 2312, and third slider 2313 with respect to vehicle main body 2301 and extending first auxiliary slider 2314a with respect to vehicle main body 2301, it is possible to position the package attached to package holder 2315 in the airspace above the delivery box at the receiver while maintaining the attitude of vehicle main body 2301.

Note that one or more sliders are extended depending on the distance from rail 7 to the location where the package is to be placed at the receiver. Accordingly, not all sliders are necessarily extended as is illustrated in FIG. 125. The illustration in FIG. 125 is merely one example. The same applies to the other figures. The length of the sliders, the weight of the counterweight, and the weight of the package are non-limiting examples.

[Variation 1]

Figure 127:
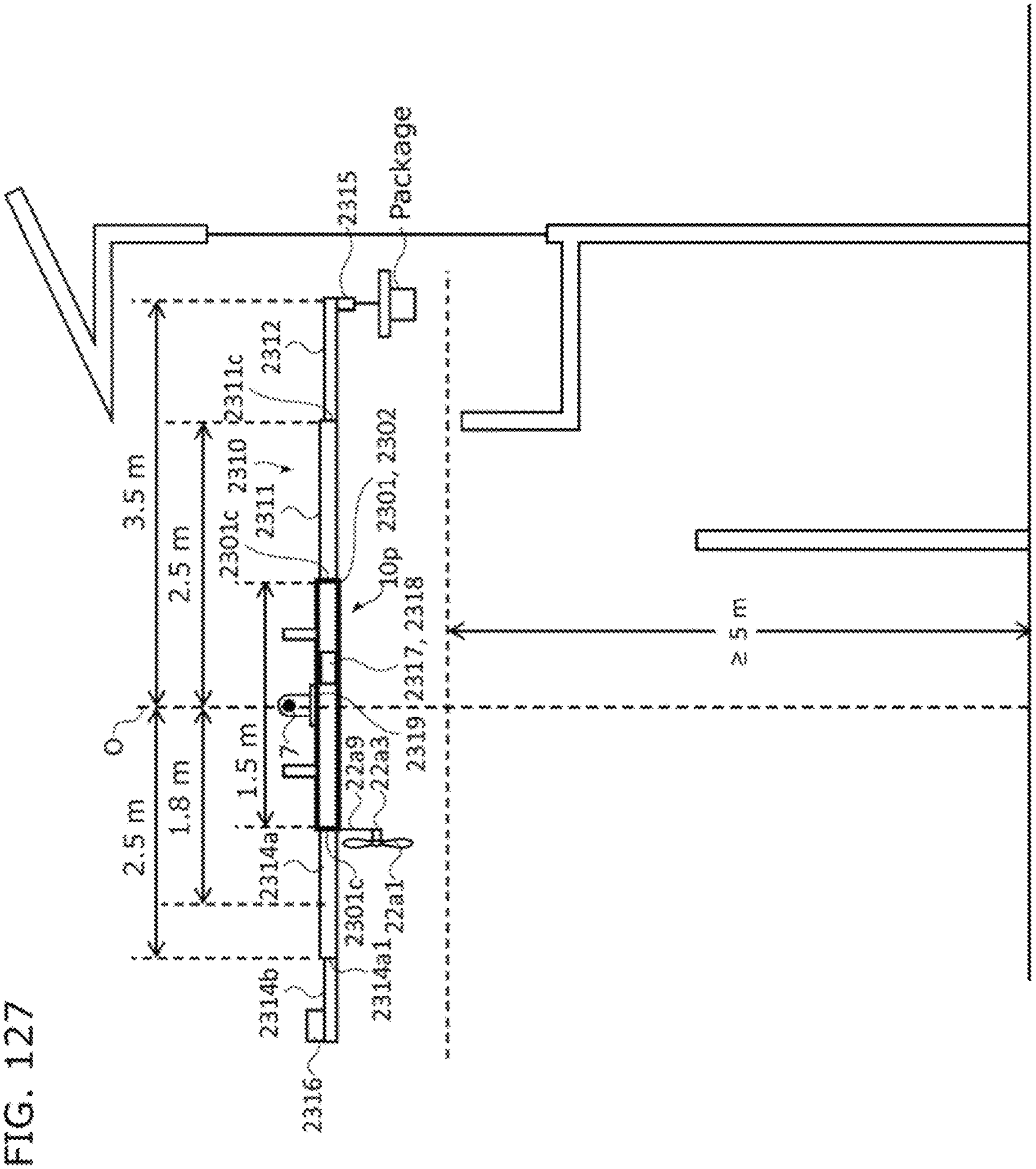

In the present variation, an example in which package transport device 10*p* includes four sliders will be given with reference to FIG. 127. FIG. 127 illustrates an example of another package transport device 10*p* delivering a package. The present variation differs from Embodiment 12 in that package transport device 10*p* includes second auxiliary slider 2314*b* in place of third slider 2313.

The sliders of package transport device 10*p* include first slider 2311, second slider 2312, first auxiliary slider 2314*a*, and second auxiliary slider 2314*b*.

First slider 2311 and second slider 2312 are arranged on one side of vehicle main body 2301 and extend from the one side of vehicle main body 2301 further along the lengthwise direction of vehicle main body 2301. More specifically, first slider 2311 is coupled on the one side of vehicle main body 2301, and can extend from the one side of vehicle main body 2301 along the lengthwise direction of vehicle main body 2301 so as to move away from vehicle main body 2301, and can be inserted into vehicle opening 2301*c* on the one side of vehicle main body 2301. Second slider 2312 is coupled to first slider 2311 and can extend from the one side of first slider 2311 along the lengthwise direction of vehicle main body 2301 so as to move away from vehicle main body 2301, and can be inserted into first opening 2311*c* of first slider 2311.

First auxiliary slider 2314*a* and second auxiliary slider 2314*b* are located on the other side of vehicle main body 2301 and extend from the other side of vehicle main body 2301 further along the lengthwise direction of vehicle main body 2301. FIG. 127 illustrates first auxiliary slider 2314*a* and second auxiliary slider 2314*b* extended along the lengthwise direction of vehicle main body 2301 so as to move away from vehicle main body 2301, in a direction away from the side on which first slider 2311 and second slider 2312 are provided. More specifically, first auxiliary slider 2314*a* is coupled on the other side of vehicle main body 2301, and can extend from the other side of vehicle main body 2301 along the lengthwise direction of vehicle main body 2301 so as to move away from vehicle main body 2301, and can be inserted into vehicle opening 2301*c* on the other side of vehicle main body 2301. Second auxiliary slider 2314*b* is coupled to first auxiliary slider 2314*a* and can extend from the other side of first auxiliary slider 2314*a* along the lengthwise direction of vehicle main body 2301 so as to move away from vehicle main body 2301, and can be inserted into first opening 2314*a*1 of first auxiliary slider 2314*a*.

When package transport device 10*p* arrives at the portion of rail 7 in front of the receiver, it is positioned at five meters or more above the ground surface, including the package. For example, assuming the length of vehicle main body 2301 is approximately 1.5 meters, since there is approximately 2.5 meters from centerline O of vehicle main body 2301 to the leading end of first slider 2311, and approximately 3.5 meters from centerline O of vehicle main body 2301 to the leading end of second slider 2312, the package can be delivered reliably even if the receiver is distanced from rail 7. The present variation illustrates the delivery of a package to the balcony of a facility. Since there is approximately 1.8 meters from centerline O of vehicle main body 2301 to the leading end of first auxiliary slider 2314*a* and approximately 2.5 meters from centerline O of vehicle main body 2301 to the leading end of second auxiliary slider 2314*b*, the attitude of vehicle main body 2301 can be maintained. Stated differently, by extending first slider 2311 and second slider 2312 with respect to vehicle main body 2301 and extending first auxiliary slider 2314*a* and second auxiliary slider 2314*b* with respect to vehicle main body 2301, it is possible to position the package attached to package holder 2315 in the airspace above the delivery box at the receiver while maintaining the attitude of vehicle main body 2301.

[Variation 2]

Figure 128:
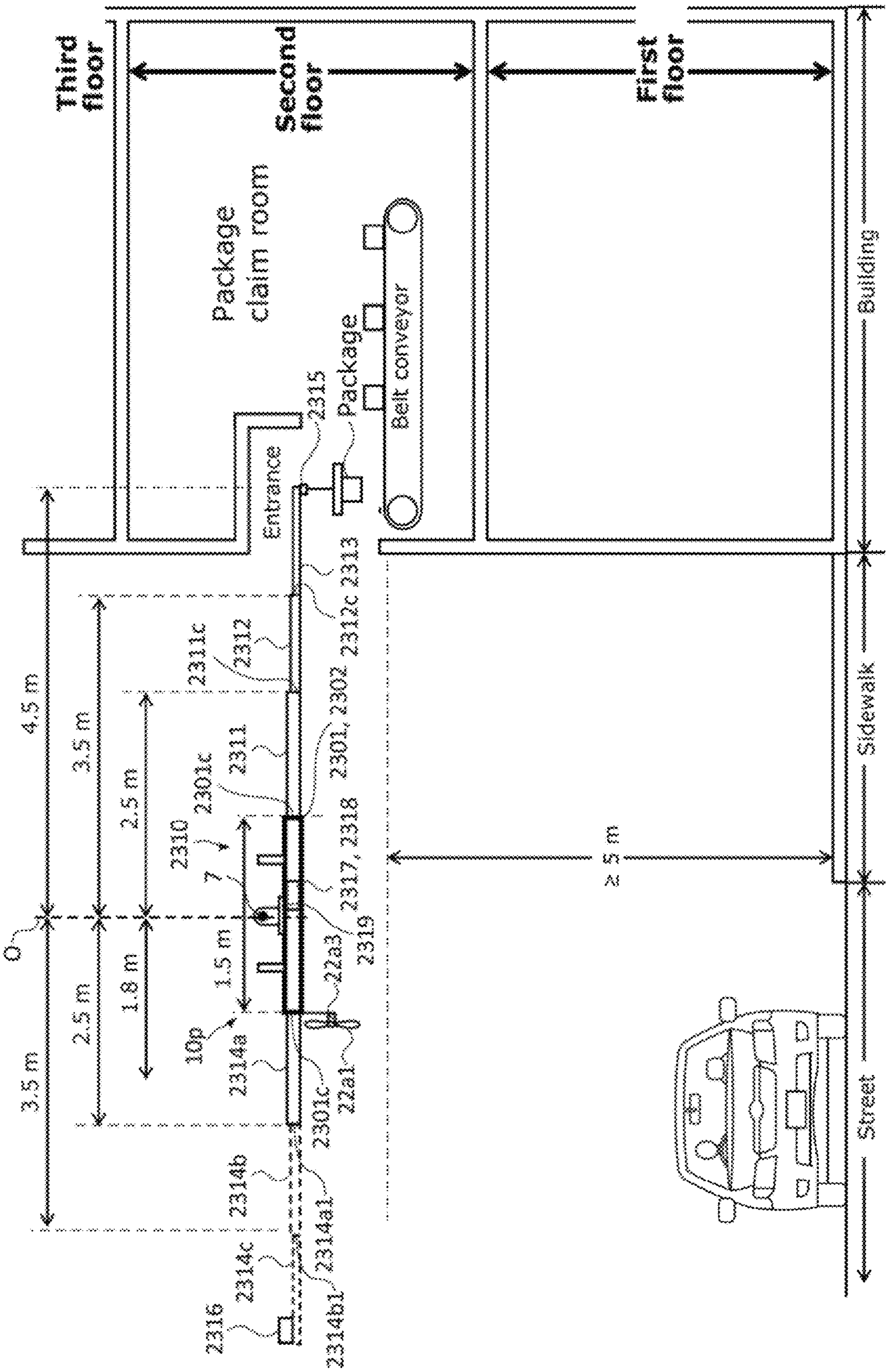

In the present variation, an example in which package transport device 10*p* includes six sliders will be given with reference to FIG. 128. FIG. 128 illustrates an example of yet another package transport device 10*p* delivering a package. The present variation differs from Embodiment 12 in that package transport device 10*p* further includes second auxiliary slider 2314*b* and third auxiliary slider 2314*c*.

The sliders of package transport device 10*p* include first slider 2311, second slider 2312, third slider 2313, first auxiliary slider 2314*a*, second auxiliary slider 2314*b*, and third auxiliary slider 2314*c*.

First slider 2311, second slider 2312, and third slider 2313 are arranged on one side of vehicle main body 2301 and extend from the one side of vehicle main body 2301 further along the lengthwise direction of vehicle main body 2301. More specifically, first slider 2311 is coupled on the one side of vehicle main body 2301, and can extend from the one side of vehicle main body 2301 along the lengthwise direction of vehicle main body 2301 so as to move away from vehicle main body 2301, and can be inserted into vehicle opening 2301*c* on the one side of vehicle main body 2301. Second slider 2312 is coupled to first slider 2311 and can extend from the one side of first slider 2311 along the lengthwise direction of vehicle main body 2301 so as to move away from vehicle main body 2301, and can be inserted into first opening 2311*c* of first slider 2311. Third slider 2313 is coupled to second slider 2312 and can extend from the one side of second slider 2312 along the lengthwise direction of vehicle main body 2301 so as to move away from vehicle main body 2301, and can be inserted into second opening 2312*c* of second slider 2312.

First auxiliary slider 2314*a*, second auxiliary slider 2314*b*, and third auxiliary slider 2314*c* are disposed on the other side of vehicle main body 2301, and extend further along the lengthwise direction of vehicle main body 2301 from the other side of vehicle main body 2301. FIG. 128 illustrates first auxiliary slider 2314*a*, second auxiliary slider 2314*b*, and third auxiliary slider 2314*c* extended along the lengthwise direction of vehicle main body 2301 so as to move away from vehicle main body 2301, in a direction away from the side on which first slider 2311, second slider 2312, and third slider 2313 are provided. More specifically, first auxiliary slider 2314*a* is coupled on the other side of vehicle main body 2301, and can extend from the other side of vehicle main body 2301 along the lengthwise direction of vehicle main body 2301 so as to move away from vehicle main body 2301, and can be inserted into vehicle opening 2301*c* on the other side of vehicle main body 2301. Second auxiliary slider 2314*b* is coupled to first auxiliary slider 2314*a* and can extend from the other side of first auxiliary slider 2314*a* along the lengthwise direction of vehicle main body 2301 so as to move away from vehicle main body 2301, and can be inserted into first opening 2314*a*1 of first auxiliary slider 2314*a*. Third auxiliary slider 2314*c* is coupled to second auxiliary slider 2314*b*, and can extend from the other side of second auxiliary slider 2314*b* along the lengthwise direction of vehicle main body 2301 so as to move away from vehicle main body 2301, and can be inserted into second opening 2314*b*1 of second auxiliary slider 2314*b*.

When package transport device 10*p* arrives at the portion of rail 7 in front of the receiver, it is positioned at five meters or more above the ground surface, including the package. For example, assuming the length of vehicle main body 2301 is 1.5 meters, since there is approximately 2.5 meters from center point O of vehicle main body 2301 to the leading end of first slider 2311, approximately 3.5 meters from center point O of vehicle main body 2301 to the leading end of second slider 2312, and approximately 4.5 meters from center point O of vehicle main body 2301 to the leading end of third slider 2313, the package can be delivered reliably even if the receiver is distanced from rail 7. The present variation illustrates the delivery of a package to a facility such as an office building. Since there is approximately 1.8 meters from center point O of vehicle main body 2301 to the leading end of first auxiliary slider 2314*a*, approximately 2.5 meters from center point O of vehicle main body 2301 to the leading end of second auxiliary slider 2314*b*, and approximately 3.5 meters from center point O of vehicle main body 2301 to the leading end of third auxiliary slider 2314*c*, the attitude of vehicle main body 2301 can be maintained. Stated differently, by extending first slider 2311, second slider 2312, and third slider 2313 with respect to vehicle main body 2301 and extending first auxiliary slider 2314*a*, second auxiliary slider 2314*b*, and third auxiliary slider 2314*c* with respect to vehicle main body 2301, it is possible to position the package attached to package holder 2315 at a predetermined height while maintaining the attitude of vehicle main body 2301.

The facility of the present variation includes a package claim room. The package claim room has an entrance at a position corresponding to the height of rail 7 from the ground surface. More specifically, the entrance is of a size and position that allows package transport device 10*p* connected to rail 7 to insert a package by extending the plurality of sliders. Accordingly, package transport device 10*p* can insert a package through the entrance by extending the plurality of sliders. A belt conveyor is located below the entrance, and package transport device 10*p* can release the package inserted through the entrance onto the belt conveyor, and the belt conveyor can transport, to a predetermined position, the package delivered to a predetermined position.

Although the present variation gives an example in which the package claim room and the entrance are located on the second floor, this is merely one, non-limiting example. The package claim room and the entrance may be provided at an appropriate location according to, for example, the height of rail 7 and the maximum length of the plurality of sliders when extended.

Operation Example

Next, an operation performed when package transport device 10*p* arrives at the portion of rail 7 in front of the receiver will be described with reference to FIG. 129 and FIG. 130. FIG. 129 is a flowchart illustrating an example of an operation of package transport device 10*p* according to Embodiment 12. FIG. 130 illustrates an example of an operation of package transport device 10*p* according to Embodiment 12.

In the operation example, the plurality of sliders of package transport device 10*p* include first slider 2311, second slider 2312, third slider 2313, first auxiliary slider 2314*a*, and second auxiliary slider 2314*b*.

First, as illustrated in FIG. 129, control processor 2318 determines whether it has arrived in front of the receiver or not (S2321). For example, control processor 2318 can determine whether it has arrived at the receiver or not by comparing the current position obtained from the GPS sensor with the position of the receiver obtained from the management server, and determining whether or not they match.

If the current position and destination point do not match (NO in S2321), control processor 2318 returns the process to step S2321.

As illustrated in FIG. 129 and (a) and (b) in FIG. 130, if the current position and destination point match (YES in S2321), control processor 2318 determines that it has arrived in front of the receiver, and actuates a motor to rotate turntable 2319 and rotate vehicle main body 2301 (S2322). Here, control processor 2318 actuates a motor to rotate turntable 2319 and rotate vehicle main body 2301 so as to face the package toward the facility of the receiver. In the present embodiment, turntable 2319 rotates vehicle main body 2301 90°.

Control processor 2318 controls the actuator of, e.g., a motor to move the package in front of vehicle main body 2301 (S2323). Control processor 2318 also controls the actuator of, e.g., a motor to move an auxiliary package behind vehicle main body 2301. This maintains package transport device 10*p* in a predetermined attitude.

As illustrated in FIG. 129 and (c) and (d) in FIG. 130, control processor 2318 controls motor actuator 2317 to extend first slider 2311 from vehicle opening 2301*c* on the one side of vehicle main body 2301 and extend first auxiliary slider 2314*a* from vehicle opening 2301*c* on the other side of vehicle main body 2301 (S2324). In the present embodiment, first slider 2311 and first auxiliary slider 2314*a* are extended simultaneously.

As illustrated in FIG. 129 and (d) in FIG. 130, after first slider 2311 is extended, control processor 2318 determines whether the package is in a deliverable position (i.e., is at the delivery destination point) (S2325).

If control processor 2318 determines the package is in a deliverable position (YES in S2325), control processor 2318 controls the wire control module to reel out the wire and lower the package, and unload the package at the delivery destination point (S2330). Stated differently, package holder 2315 controls control processor 2318 to place the package at the destination point and release the package. This delivers the package to the receiver.

Turntable 2319 of package transport device 10*p* is provided with first hook 2323*a* and second hook 2323*b*, which includes a wheel, of third connector 2323. A portion of first hook 2323*a* of third connector 2323 is provided above rail 7, and the wheel of second hook 2323*b* is provided below rail 7. By rotating the wheel and moving vehicle main body 2301 along rail 7, fine adjustments can be made when unloading the package in step S2330 at the destination position. It is also possible to inhibit displacement of vehicle main body 2301 by third connector 2323 and second hook 2323*b* clamping rail 7 to keep vehicle main body 2301 from moving. It is also possible for control processor 2318 to adjust the attitude of the sliders by controlling the motor that rotates turntable 2319. Furthermore, control processor 2318 controls a motor capable of changing the attitude of propeller support portion 22*a*9 to change the attitude of side propeller 22*a*1 via propeller support portion 22*a*9 so that the plane of rotation of side propeller 22*a*1 is approximately parallel to the horizontal plane. This allows control processor 2318 to provide vertical propulsion force to vehicle main body 2301 so as to maintain the attitude of vehicle main body 2301. With this, since misalignment of the package with respect to the destination point is inhibited, package transport device 10*p* can deliver the package to the destination point while maintaining the attitude of vehicle main body 2301.

There is concern that the attitude of package transport device 10*p* cannot be maintained approximately horizontal because releasing the package reduces the weight on the package holder 2315 side of package transport device 10*p*, and the lengthwise direction of vehicle main body 2301 tilts with respect to approximately the horizontal direction, and. Control processor 2318 therefore controls motor actuator 2317 to gradually store the extended auxiliary sliders into vehicle opening 2301*c* on the other side of vehicle main body 2301 (S2331). With this, the attitude of vehicle main body 2301 is maintained so that the lengthwise direction of vehicle main body 2301 is approximately parallel to approximately the horizontal direction. Package transport device 10*p* then ends the operation illustrated in FIG. 129. Here, "auxiliary sliders" is a comprehensive term that includes first auxiliary slider 2314*a* and second auxiliary slider 2314*b* and the like.

As illustrated in FIG. 129 and (e) in FIG. 130, when control processor 2318 determines the package is not in a position at which the package can be delivered to the delivery destination point (NO in S2325), control processor 2318 controls motor actuator 2317 so as to extend second slider 2312 from first opening 2311*c* on the one side of first slider 2311 and further extend first auxiliary slider 2314*a* from vehicle opening 2301*c* on the other side of vehicle main body 2301 (S2326). In the present embodiment, second slider 2312 and first auxiliary slider 2314*a* are extended simultaneously.

After controlling motor actuator 2317 to extend second slider 2312 and first auxiliary slider 2314*a*, control processor 2318 determines whether the package is in a position at which the package can be delivered to the delivery destination point (S2327).

If control processor 2318 determines that the package is in a position at which the package can be delivered to the delivery destination point (YES in S2327), processing proceeds to step S2330. Package transport device 10*p* then ends the operation illustrated in FIG. 129.

As illustrated in FIG. 129 and (f) in FIG. 130, if control processor 2318 determines that the package is not in a position at which the package can be delivered to the delivery destination point (NO in S2327), control processor 2318 controls motor actuator 2317 to extend third slider 2313 from second opening 2312*c* on the one side of second slider 2312 and extend second auxiliary slider 2314*b* from first opening 2314*a*1 on the other side of first auxiliary slider 2314*a* (S2328). In the present embodiment, third slider 2313 and second auxiliary slider 2314*b* are extended simultaneously.

After controlling motor actuator 2317 to extend third slider 2313 and second auxiliary slider 2314*b*, control processor 2318 determines whether the package is in a position at which the package can be delivered to the delivery destination point (S2329).

If control processor 2318 determines that the package is in a position at which the package can be delivered to the delivery destination point (YES in S2329), processing proceeds to step S2330. Package transport device 10*p* then ends the operation illustrated in FIG. 129.

If control processor 2318 determines that the package is not in a position at which the package can be delivered to the delivery destination point (NO in S2329), control processor 2318 ends the processing. For example, since the package cannot be delivered, control processor 2318 controls motor actuator 2317 to retract the extended sliders. Then, since control processor 2318 has determined that the package cannot be delivered, package transport device 10*p* may return to the sender.

Embodiment 13

Configuration

Hereinafter, since the basic configuration of package transport device 10*p* according to the present embodiment is the same as the basic configuration of the unmanned aerial vehicle of Embodiment 1 and the same as the basic configuration of package transport device 10*p* according to Embodiment 12 and the like, regarding the basic configuration of package transport device 10*p* in the present embodiment, the same reference signs as above will be used and repeated description will be omitted where appropriate. Package transport device 10*p* according to the present embodiment differs from Embodiment 12 in that it includes first vehicle main body 2301*a* and second vehicle main body 2301*b*. The present embodiment may also be used with lifting systems and unmanned aerial vehicles according to embodiments other than Embodiment 1.

FIG. 131 illustrates an example of an operation of package transport device 10*p* according to Embodiment 13.

As illustrated in FIG. 131, package transport device 10*p* includes first vehicle main body 2301*a* and second vehicle main body 2301*b* that can rotate with respect to first vehicle main body 2301*a*.

First vehicle main body 2301*a* is provided on the upper surface of second vehicle main body 2301*b*, between second vehicle main body 2301*b* and rail 7. First vehicle main body 2301*a* and second vehicle main body 2301*b* are separate vehicle main bodies 2301.

First vehicle main body 2301*a* includes first frame 2302*a* that is rectangular in plan view. First frame 2302*a* is, for example, a rectangular frame-shaped body. First vehicle main body 2301*a* is provided with a plurality of connectors, turntable 2319, etc. The plurality of connectors, turntable 2319, etc., are provided on the top of first vehicle main body 2301*a*. More specifically, first connector 2321, second connector 2322, and third connector 2323 are coupled on the upper surface of vehicle main body 2301*a*. First vehicle main body 2301*a* may have the same configuration as vehicle main body 2301 described above. First vehicle main body 2301*a* is one example of the main body. First frame 2302*a* is one example of the frame.

Second vehicle main body 2301*b* includes second frame 2302*b* that is rectangular in plan view. Second frame 2302*b* is, for example, a rectangular frame-shaped body. Second frame 2302*b* is longer than first frame 2302*a*. Second vehicle main body 2301*b* is provided with a plurality of connectors on its upper surface, as well as first vehicle main body 2301*a*, package holder 2315, etc., on its upper surface. More specifically, fourth connector 2324 and fifth connector 2325 are coupled on the upper surface of second vehicle main body 2301*b*. Second vehicle main body 2301*b* may have the same configuration as vehicle main body 2301 described above. Second vehicle main body 2301*b* may be one example of the main body. Second frame 2302*b* is one example of the frame.

Second vehicle main body 2301*b* applies stress for rotating second vehicle main body 2301*b* with respect to first vehicle main body 2301*a* in response to a control instruction from control processor 2318. Accordingly, when first connector 2321, second connector 2322, and third connector 2323 are connected to rail 7, second vehicle main body 2301*b* can be rotated with respect to first vehicle main body 2301*a* around the center point of turntable 2319 by control processor 2318 controlling a motor. In this way, second vehicle main body 2301*b* rotates until the lengthwise direction of first vehicle main body 2301*a* approximately perpendicularly intersects the extending direction of rail 7. Second vehicle main body 2301*b* may have the same configuration as the vehicle main body described above.

Note that propeller support portion 22*a*9 may be provided on the other side of second vehicle main body 2301*b* and, alternatively, may be provided on an auxiliary slider.

Second vehicle main body 2301*b* is provided with slider portion 2310. Stated differently, slider portion 2310 is extendable with respect to second vehicle main body 2301*b*.

Note that slider portion 2310 may be included in first vehicle main body 2301*a*. In such cases, first vehicle main body 2301*a* may be configured to rotate with respect to second vehicle main body 2301*b*.

Package transport device 10*p* includes a motor for rotating first connector 2321, second connector 2322, third connector 2323, fourth connector 2324, and fifth connector 2325. Control processor 2318 controls the motor to rotate the rail holder so as to release the hold of the rail holder by rail 7 so as to avoid contact between the rail support portion that supports rail 7 and the rail holder when package transport device 10*p* is traveling on rail 7.

Operation Example 1

Next, an operation performed when package transport device 10*p* arrives at the portion of rail 7 in front of the receiver will be described. In the operation example, the plurality of sliders of package transport device 10*p* include first slider 2311, second slider 2312, third slider 2313, first auxiliary slider 2314*a*, and second auxiliary slider 2314*b*. Since the operation example is the same as the example in the flowchart of FIG. 129, the same reference signs are used and repeated description will be omitted where appropriate.

First, as illustrated in FIG. 129, control processor 2318 determines whether it has arrived in front of the receiver or not (S2321).

If the current position and destination point do not match (NO in S2321), control processor 2318 returns the process to step S2321.

As illustrated in FIG. 129 and (a) and (b) in FIG. 131, if the current position and destination point match (YES in S2321), control processor 2318 determines that it has arrived in front of the receiver, and actuates a motor to rotate second vehicle main body 2301*b* with respect to first vehicle main body 2301*a* (S2322). Here, control processor 2318 actuates a motor to rotate second vehicle main body 2301*b* with respect to first vehicle main body 2301*a* so as to face the package toward the facility of the receiver. In the present embodiment, second vehicle main body 2301*b* is rotated 90° with respect to first vehicle main body 2301*a*. With this, the lengthwise direction of second vehicle main body 2301*b* is orthogonal to the lengthwise direction of first vehicle main body 2301*a*.

Control processor 2318 controls the actuator of, e.g., a motor to move the package in front of second vehicle main body 2301*b* (S2323). Control processor 2318 also controls the actuator of, e.g., a motor to move an auxiliary package behind vehicle main body 2301. This maintains package transport device 10*p* in a predetermined attitude.

As illustrated in FIG. 129 and (c) in FIG. 131, control processor 2318 controls motor actuator 2317 to extend first slider 2311 from vehicle opening 2301*c* on the one side of second vehicle main body 2301*b* and extend first auxiliary slider 2314*a* from vehicle opening 2301*c* on the other side of second vehicle main body 2301*b* (S2324). In the present embodiment, first slider 2311 and first auxiliary slider 2314*a* are extended simultaneously.

After extending first slider 2311, control processor 2318 determines whether the package is in a position at which the package can be delivered to the delivery destination point (S2325).

If control processor 2318 determines the package is in a position at which the package can be delivered to the delivery destination point (YES in S2325), control processor 2318 controls the wire control module to reel out the wire and lower the package, and unload the package at the delivery destination point (S2330). Stated differently, package holder 2315 controls control processor 2318 to place the package at the destination point and release the package. This delivers the package to the receiver.

To maintain the attitude of second vehicle main body 2301*b*, control processor 2318 controls motor actuator 2317 to gradually store the extended auxiliary sliders into vehicle opening 2301*c* on the other side of second vehicle main body 2301*b* (S2331). With this, the attitude of vehicle main body 2301 is maintained so that the lengthwise direction of second vehicle main body 2301*b* is approximately parallel to approximately the horizontal direction. Package transport device 10*p* then ends the operation illustrated in FIG. 129.

As illustrated in FIG. 129 and (c) and (d) in FIG. 131, when control processor 2318 determines the package is not in a position at which the package can be delivered to the delivery destination point (NO in S2325), control processor 2318 controls motor actuator 2317 so as to extend second slider 2312 from first opening 2311*c* on the one side of first slider 2311 and further extend first auxiliary slider 2314*a* from vehicle opening 2301*c* on the other side of second vehicle main body 2301*b* (S2326).

As illustrated in FIG. 129 and (d) in FIG. 131, after controlling motor actuator 2317 to extend second slider 2312 and first auxiliary slider 2314*a*, control processor 2318 determines whether the package is in a position at which the package can be delivered to the delivery destination point (S2327). After the performing processes of steps S2327 to S2331, package transport device 10*p* then ends the operation illustrated in FIG. 129.

Operation Example 2

Next, an operation performed when package transport device 10*p* is turning right in a case in which first rail 7*a* and second rail 7*b* intersect will be described with reference to, for example, FIG. 132A. FIG. 132A illustrates an example of an operation of package transport device 10*p* according to Embodiment 13 when transferring connection from first rail 7*a* to second rail 7*b*. Here, first rail 7*a* and second rail 7*b* are included in rail 7. This operation example illustrates a case in which first vehicle main body 2301*a* and second vehicle main body 2301*b* and the like rotate clockwise.

Each of first connector 2321, second connector 2322, fourth connector 2324, and fifth connector 2325 used in this operation example is a connector like that illustrated in FIG. 1328. FIG. 1328 illustrates an example of a connector according to Embodiment 13. First connector 2321 and fifth connector 2325 are bilaterally symmetric with second connector 2322 and fourth connector 2324. As illustrated in (a) in FIG. 1338, first connector 2321 and fifth connector 2325 are disposed (coupled) on the right side in a view of package transport device 10*p* from the traveling direction, and as illustrated in (b) in FIG. 1328, second connector 2322 and fourth connector 2324 are disposed (coupled) on the left side in a view of package transport device 10*p* from the traveling direction. The connectors illustrated in FIG. 1328 are provided with hook 2326 connected to rail 7, roller 2327*m* that is provided on the inner peripheral surface side (the side opposing rail 7) of hook 2326 and rotatably contacts rail 7, and motor 2328 that rotates roller 2327*m*. Note that these connectors need not include motor 2328; motor 2328 is not an essential element of these connectors. Hook 2326 can connect to (hook onto) rail 7. Roller 2327*m* is a wheel for rotatably contacting rail 7 and is rotatably provided on hook 2326. More specifically, when hook 2326 is connected to rail 7, roller 2327*m* is axially supported by axle support 2327*s*, which is the rotary shaft of motor 2328 provided to hook 2326, and rotates around axle support 2327*s* as an axis. Motor 2328 is actuated by control processor 2318, and rotates roller 2327*m* by rotating axle support 2327*s*.

Control processor 2318 rotates side propeller 22*a*1 to cause package transport device 10*p* to travel along first rail 7*a*. As illustrated in (a) and (b) in FIG. 132A and in FIG. 1328, when fourth connector 2324 approaches second rail 7*b*, after pivoting hook 2326 of fourth connector 2324 to open fourth connector 2324, once fourth connector 2324 passes vertically under second rail 7*b*, control processor 2318 pivots hook 2326 of fourth connector 2324 to close fourth connector 2324.

When package transport device 10*p* travels a little further and first connector 2321 approaches second rail 7*b*, after pivoting hook 2326 of first connector 2321 to open first connector 2321, once first connector 2321 passes vertically under second rail 7*b*, control processor 2318 pivots hook 2326 of first connector 2321 to close first connector 2321.

When package transport device 10*p* travels a little further and third connector 2323 approaches second rail 7*b*, control processor 2318 stops the traveling of package transport device 10*p* by stopping rotation of side propeller 22*a*1. As illustrated in (c) in FIG. 132A and in FIG. 1328, control processor 2318 pivots hooks 2326 of first connector 2321 and second connector 2322 to open first connector 2321 and second connector 2322. This releases the connection of first connector 2321 and second connector 2322 from first rail 7*a*, whereby first connector 2321 and second connector 2322 are disposed vertically below first rail 7*a* and second rail 7*b* so as not to contact first rail 7*a* and second rail 7*b*.

Control processor 2318 rotates first vehicle main body 2301*a* with respect to second vehicle main body 2301*b*. With this, the lengthwise direction of first vehicle main body 2301*a* intersects the lengthwise direction of second vehicle main body 2301*b*. In the present embodiment, control processor 2318 rotates first vehicle main body 2301*a* 90° clockwise.

When first vehicle main body 2301*a* is arranged vertically below second rail 7*b*, control processor 2318 pivots hook 2326 of first connector 2321 to close first connector 2321 and pivots hook 2326 of second connector 2322 to close second connector 2322. With this, control processor 2318 can connect first connector 2321 and second connector 2322 to second rail 7*b*.

Next, as illustrated in (d) in FIG. 132A and in FIG. 1328, control processor 2318 pivots hooks 2326 of fourth connector 2324 and fifth connector 2325 to open fourth connector 2324 and fifth connector 2325. This releases the connection of fourth connector 2324 and fifth connector 2325 from first rail 7*a*, whereby fourth connector 2324 and fifth connector 2325 are disposed vertically below first rail 7*a* and second rail 7*b* so as not to contact first rail 7*a* and second rail 7*b*.

Control processor 2318 rotates second vehicle main body 2301*b* with respect to first vehicle main body 2301*a*. With this, the lengthwise direction of first vehicle main body 2301*a* is approximately parallel to the lengthwise direction of second vehicle main body 2301*b*. In the present embodiment, control processor 2318 rotates second vehicle main body 2301*b* 90° clockwise.

When second vehicle main body 2301*b* is arranged vertically below second rail 7*b*, control processor 2318 pivots hook 2326 of fourth connector 2324 to close fourth connector 2324 and pivots hook 2326 of fifth connector 2325 to close fifth connector 2325. With this, control processor 2318 can connect fourth connector 2324 and fifth connector 2325 to second rail 7*b*.

FIG. 132C illustrates an example of another operation of package transport device 10*p* according to Embodiment 13 when traveling after transferring connection from first rail 7*a* to second rail 7*b*. As illustrated in FIG. 132C and FIG. 132B, control processor 2318 pivots hook 2326 of third connector 2323 to open third connector 2323. Third connector 2323 is disconnected from first rail 7*a* and is positioned vertically below first rail 7*a* and second rail 7*b* so that third connector 2323 does not come into contact with first rail 7*a* or second rail 7*b*. Control processor 2318 rotates open third connector 2323 around the center point of turntable 2319 by rotating turntable 2319. More specifically, control processor 2318 rotates third connector 2323 around the center point of turntable 2319 so that the planes of the openings of hooks 2326 of third connector 2323 intersect second rail 7*b*. This rotates third connector 2323 clockwise by the rotation of turntable 2319 and moves third connector 2323 vertically below second rail 7*b*. After traveling forward a little further by rotating side propeller 22*a*1, control processor 2318 controls third propeller actuation motor 22*a*3 to stop rotation of side propeller 22*a*1. Control processor 2318 pivots hook 2326 of third connector 2323 to close third connector 2323. Third connector 2323 connects to second rail 7*b* by third connector 2323 closing.

In this way, the planes of the openings of hooks 2326 of first connector 2321, second connector 2322, third connector 2323, fourth connector 2324, and fifth connector 2325 are aligned so as to oppose (approximately parallel to) one another, and all attitudes are restored. In other words, first connector 2321, second connector 2322, third connector 2323, fourth connector 2324, and fifth connector 2325 are connected to second rail 7*b*.

Package transport device 10*p* travels and when second connector 2322 approaches first rail 7*a*, second connector 2322 is opened, and after second connector 2322 has passed the intersection of first rail 7*a* and second rail 7*b*, second connector 2322 is closed so as to connect second connector 2322 to first rail 7*a*. Package transport device 10*p* travels and when fifth connector 2325 approaches first rail 7*a*, fifth connector 2325 is opened, and after fifth connector 2325 has passed the intersection of first rail 7*a* and second rail 7*b*, fifth connector 2325 is closed so as to connect fifth connector 2325 to first rail 7*a*. With this, package transport device 10*p* can transfer connection from first rail 7*a* to second rail 7*b*.

Operation Example 3

Next, an operation performed when package transport device 10*p* is turning left in a case in which first rail 7*a* and second rail 7*b* intersect will be described with reference to, for example, FIG. 133A and FIG. 1338. FIG. 133A illustrates an example of another operation of the package transport device according to Embodiment 13 when transferring connection from the first rail to the second rail. FIG. 1338 illustrates an example of another operation of the package transport device according to Embodiment 13 when traveling after transferring connection from the first rail to the second rail.

This operation example is an example of a case in which first vehicle main body 2301*a* rotates after second vehicle main body 2301*b* rotates counterclockwise, and information that is the same as in Operation Example 2 uses the same reference signs and repeated description will be omitted where appropriate. Note that each of first connector 2321, second connector 2322, fourth connector 2324, and fifth connector 2325 used in this operation example is also a connector like that used in Operation Example 2.

Control processor 2318 rotates side propeller 22*a*1 to cause package transport device 10*p* to travel along first rail 7*a*. As illustrated in (a) and (b) in FIG. 133A, when fourth connector 2324 approaches second rail 7*b*, after pivoting the hook of fourth connector 2324 to open fourth connector 2324, once fourth connector 2324 passes vertically under second rail 7*b*, control processor 2318 pivots the hook of fourth connector 2324 to close fourth connector 2324.

When package transport device 10*p* travels a little further and first connector 2321 approaches second rail 7*b*, after pivoting the hook of first connector 2321 to open first connector 2321, once first connector 2321 passes vertically under second rail 7*b*, control processor 2318 pivots the hook of first connector 2321 to close first connector 2321.

When package transport device 10*p* travels a little further and third connector 2323 approaches second rail 7*b*, control processor 2318 stops the traveling of package transport device 10*p* by stopping rotation of side propeller 22*a*1. As illustrated in (c) in FIG. 133A, control processor 2318 pivots the hooks of fourth connector 2324 and fifth connector 2325 to open fourth connector 2324 and fifth connector 2325. This releases the connection of fourth connector 2324 and fifth connector 2325 from first rail 7*a*, whereby fourth connector 2324 and fifth connector 2325 are disposed vertically below first rail 7*a* and second rail 7*b* so as not to contact first rail 7*a* and second rail 7*b*.

Control processor 2318 rotates second vehicle main body 2301*b* with respect to first vehicle main body 2301*a*. With this, the lengthwise direction of second vehicle main body 2301*b* intersects the lengthwise direction of first vehicle main body 2301*a*. In the present embodiment, control processor 2318 rotates second vehicle main body 2301*b* 90° counterclockwise.

When second vehicle main body 2301*b* is arranged vertically below second rail 7*b*, control processor 2318 pivots the hook of fourth connector 2324 to close fourth connector 2324 and pivots the hook of fifth connector 2325 to close fifth connector 2325. With this, control processor 2318 can connect fourth connector 2324 and fifth connector 2325 to second rail 7*b*.

Next, as illustrated in (d) in FIG. 133A, control processor 2318 pivots the hooks of first connector 2321 and second connector 2322 to open first connector 2321 and second connector 2322. This releases the connection of first connector 2321 and second connector 2322 from first rail 7*a*, whereby first connector 2321 and second connector 2322 are disposed vertically below first rail 7*a* and second rail 7*b* so as not to contact first rail 7*a* and second rail 7*b*.

Control processor 2318 rotates first vehicle main body 2301*a* with respect to second vehicle main body 2301*b*. With this, the lengthwise direction of first vehicle main body 2301*a* is approximately parallel to the lengthwise direction of second vehicle main body 2301*b*. In the present embodiment, control processor 2318 rotates first vehicle main body 2301*a* 90° counterclockwise.

When first vehicle main body 2301*a* is arranged vertically below second rail 7*b*, control processor 2318 pivots the hook of fourth connector 2324 to close fourth connector 2324 and pivots the hook of fifth connector 2325 to close fifth connector 2325. With this, control processor 2318 can connect fourth connector 2324 and fifth connector 2325 to second rail 7*b*.

As illustrated in FIG. 1338, control processor 2318 pivots the hook of third connector 2323 to open third connector 2323. Third connector 2323 is disconnected from first rail 7*a* and is positioned vertically below first rail 7*a* and second rail 7*b* so that third connector 2323 does not come into contact with first rail 7*a* or second rail 7*b*. Control processor 2318 rotates open third connector 2323 around the center point of turntable 2319 by rotating turntable 2319. More specifically, control processor 2318 rotates third connector 2323 around the center point of turntable 2319 so that the openings of the hooks of third connector 2323 intersect second rail 7*b*. This rotates third connector 2323 counterclockwise by the rotation of turntable 2319 and moves third connector 2323 vertically below second rail 7*b*. After traveling forward a little further by rotating side propeller 22*a*1, control processor 2318 controls third propeller actuation motor 22*a*3 to stop rotation of side propeller 22*a*1. Control processor 2318 pivots the hook of third connector 2323 to close third connector 2323. Third connector 2323 connects to second rail 7*b* by third connector 2323 closing.

In this way, the planes of the openings of hooks 1722 of first connector 2321, second connector 2322, third connector 2323, fourth connector 2324, and fifth connector 2325 are aligned so as to oppose (approximately parallel to) one another, and all attitudes are restored. In other words, first connector 2321, second connector 2322, third connector 2323, fourth connector 2324, and fifth connector 2325 are connected to second rail 7*b*.

Package transport device 10*p* travels and when second connector 2322 approaches first rail 7*a*, second connector 2322 is opened, and after second connector 2322 has passed the intersection of first rail 7*a* and second rail 7*b*, second connector 2322 is closed so as to connect second connector 2322 to first rail 7*a*. Package transport device 10*p* travels and when fifth connector 2325 approaches first rail 7*a*, fifth connector 2325 is opened, and after fifth connector 2325 has passed the intersection of first rail 7*a* and second rail 7*b*, fifth connector 2325 is closed so as to connect fifth connector 2325 to first rail 7*a*. With this, package transport device 10*p* can transfer connection from first rail 7*a* to second rail 7*b*.

Operation Example 4

Next, in this operation, an example in which package transport device 10*p* is traveling from rail 7*a*1 toward rail 7*a*2 will be given with reference to, for example, FIG. 134. FIG. 134 illustrates an example of an operation of package transport device 10*p* according to Embodiment 13 when it is ascending on inclined rail 7. In the operation example, content similar to other operation examples are denoted with the same reference signs, and repeated description will be omitted as appropriate.

Rail 7 in this operation includes horizontal rail 7_a_1 that is approximately parallel to the horizontal plane and inclined rail 7_a_2 that is inclined relative to the horizontal plane. More specifically, one end of horizontal rail 7_a_1 is connected to the other end of inclined rail 7_a_2 via coupler 7_e_. Coupler 7_e_ is connected and fixed to the rail support portion, which is provided on a utility pole or similar structure provided in the ground surface or the like.

Note that each of first connector 2321, second connector 2322, fourth connector 2324, and fifth connector 2325 used in this operation example is also a connector like that used in, for example, Operation Example 2. Third connector 2323 includes first hook 2323_a_ and second hook 2323_b_, and first hook 2323_a_ is symmetrical with second hook 2323_b_. At least one of first hook 2323_a_ or second hook 2323_b_ is provided with roller 2327_m_.

As illustrated in (a) in FIG. 134, package transport device 10_p_ travels along rail 7_a_1 by rotating side propeller 22_a_1. When the distance between coupler 7_e_ and first connector 2321 is less than a predetermined distance, control processor 2318 stops the rotation of side propeller 22_a_1 by controlling rear third propeller actuation motor 22_a_3 for rotating side propeller 22_a_1. This causes package transport device 10_p_ to stop traveling.

When the distance between coupler 7_e_ and first connector 2321 is less than a predetermined distance, control processor 2318 pivots fourth connector 2324 and first connector 2321 to open fourth connector 2324 and first connector 2321. By opening fourth connector 2324 and first connector 2321, fourth connector 2324 and first connector 2321 will not come into contact with the rail support portion when first vehicle main body 2301_a_ and second vehicle main body 2301_b_ pass vertically below coupler 7_e_.

Control processor 2318 then rotates side propeller 22_a_1 by controlling the rear third propeller actuation motor 22_a_3. With this, package transport device 10_p_ moves forward and fourth connector 2324 and first connector 2321 pass vertically below coupler 7_e_.

As illustrated in (b) in FIG. 134, control processor 2318 rotates fourth connector 2324 and first connector 2321 little by little until they are half-open (or half-closed), to an extent that fourth connector 2324 and first connector 2321 can connect to rail 7_a_2. Rollers 2327_m_ of fourth connector 2324 and first connector 2321 ride on and in contact with rail 7_a_2.

Control processor 2318 rotates first hook 2323_a_ and second hook 2323_b_ of third connector 2323 little by little until they are half-open (or half-closed), to an extent that third connector 2323 can connect to rail 7_a_2.

Control processor 2318 also pivots fifth connector 2325 and second connector 2322 to open fifth connector 2325 and second connector 2322. Fifth connector 2325 and second connector 2322 are thus open. Thus, since half-open fourth connector 2324 and first connector 2321 are connected to rail 7_a_1 and half-open third connector 2323 is connected to rail 7_a_2, as illustrated in (c) in FIG. 134, package transport device 10_p_ tilts with third connector 2323 and rail 7_a_1 as the fulcrum.

Control processor 2318 then rotates side propeller 22_a_1 by controlling the rear third propeller actuation motor 22_a_3. With this, package transport device 10_p_ moves forward and fifth connector 2325 and second connector 2322 pass vertically below coupler 7_e_ without contacting the rail support portion. Control processor 2318 then closes each of first connector 2321, second connector 2322, third connector 2323, fourth connector 2324, and fifth connector 2325, whereby package transport device 10_p_ can travel after connecting to rail 7_a_2.

Operation Example 5

Next, in this operation, an example in which package transport device 10_p_ turns right will be given with reference to, for example, FIG. 135A and FIG. 135B. FIG. 135A illustrates an example of an operation of package transport device 10_p_ according to Embodiment 13 when it is turning right on rail 7 that changes trajectory to the right. FIG. 135B illustrates an example of an operation of the package transport device according to Embodiment 13 after it has turned right and is traveling on a rail. In the operation example, content similar to other operation examples are denoted with the same reference signs, and repeated description will be omitted as appropriate.

As illustrated in FIG. 135A and FIG. 135B, rail 7 according to this operation includes horizontal rail 7_a_1 that is approximately parallel to the horizontal plane, and rail 7_a_3 whose path is angled to the right relative to the lengthwise direction of rail 7_a_1. Rail 7_a_1 and rail 7_a_3 are approximately parallel to the horizontal plane. More specifically, one end of horizontal rail 7_a_1 is connected to the other end of rail 7_a_3 via coupler 7_e_. Coupler 7_e_ is connected and fixed to rail support portion 7_x_, which is provided on a utility pole or similar structure provided in the ground surface or the like. The coupling portion that couples (i) first hook 2323_a_ and second hook 2323_b_ in third connector 2323 and (ii) turntable 2319 is located on the right of first vehicle main body 2301_a_, i.e., on the opposite side that rail support portion 7_x_ is on. The coupling portions are the blacked-out portions in FIG. 135A and FIG. 135B.

Note that each of first connector 2321, second connector 2322, fourth connector 2324, and fifth connector 2325 used in this operation example is also a connector like that used in, for example, Operation Example 2. Third connector 2323 includes first hook 2323_a_ and second hook 2323_b_, and first hook 2323_a_ is symmetrical with second hook 2323_b_. At least one of first hook 2323_a_ or second hook 2323_b_ is provided with roller 2327_m_.

As illustrated in (a) in FIG. 135A, package transport device 10_p_ travels along rail 7_a_1 by rotating side propeller 22_a_1. When the distance between coupler 7_e_ and first connector 2321 is less than a predetermined distance, control processor 2318 stops the rotation of side propeller 22_a_1 by controlling rear third propeller actuation motor 22_a_3 for rotating side propeller 22_a_1. This causes package transport device 10_p_ to stop traveling.

When the distance between coupler 7_e_ and first connector 2321 is less than a predetermined distance, control processor 2318 pivots fourth connector 2324 and first connector 2321 to open fourth connector 2324 and first connector 2321. By opening fourth connector 2324 and first connector 2321, fourth connector 2324 and first connector 2321 will not come into contact with rail support portion 7_x_ when first vehicle main body 2301_a_ and second vehicle main body 2301_b_ pass vertically below coupler 7_e_. Note that first connector 2321 is held while extended to the rail 7_a_3 side so that it can couple to (grab) rail 7_a_3.

Control processor 2318 then rotates side propeller 22_a_1 by controlling the rear third propeller actuation motor 22_a_3. With this, package transport device 10_p_ moves forward and fourth connector 2324 and first connector 2321 pass vertically below coupler 7_e_.

Note that in (a) in FIG. 135A, since rail support portion 7_x_ extends from the left to coupler 7_e_, i.e., rail support portion 7_x_ extends from the fourth connector 2324 relative to first connector 2321 to coupler 7_e_, by control processor 2318 opening only fourth connector 2324, first connector 2321 can pass coupler 7e without contacting rail support portion 7x.

When the distance between coupler 7e and third connector 2323 is less than a predetermined distance, control processor 2318 pivots only first hook 2323a of third connector 2323 to open only first hook 2323a. Opening only first hook 2323a of third connector 2323 prevents first hook 2323a of third connector 2323 from contacting coupler 7e when first vehicle main body 2301a and second vehicle main body 2301b pass vertically below coupler 7e.

Control processor 2318 then rotates side propeller 22a1 by controlling the rear third propeller actuation motor 22a3. With this, package transport device 10p moves forward and first hook 2323a of third connector 2323 passes vertically below coupler 7e.

As illustrated in (b) in FIG. 135A, control processor 2318 pivots the first hook 2323a of third connector 2323 to close first hook 2323a of third connector 2323. This connects first hook 2323a of third connector 2323 to rail 7a3.

As illustrated in (c) in FIG. 135A, control processor 2318 pivots second connector 2322 to open second connector 2322. Second connector 2322 releases its connection with rail 7a1 and is disposed vertically below rail 7a1 so as not to contact rail 7a1.

Control processor 2318 controls a motor to rotate first vehicle main body 2301a with respect to second vehicle main body 2301b so as to cause the lengthwise direction of first vehicle main body 2301a to be parallel to the lengthwise direction of rail 7a3. With this, the lengthwise direction of first vehicle main body 2301a intersects the lengthwise direction of second vehicle main body 2301b. In the present embodiment, control processor 2318 rotates first vehicle main body 2301a clockwise so as to cause the lengthwise direction of first vehicle main body 2301a to be approximately parallel to the lengthwise direction of rail 7a3. At this time, package transport device 10p is stable since the center of gravity of package transport device 10p does not shift.

As illustrated in (d) and (e) in FIG. 135A, control processor 2318 pivots first connector 2321 to close first connector 2321. This connects first connector 2321 to rail 7a3.

As illustrated in (e) and (f) in FIG. 135A, control processor 2318 pivots fifth connector 2325 to open fifth connector 2325. Fifth connector 2325 releases its connection with rail 7a1 and is disposed vertically below rail 7a1 so as not to contact rail 7a1.

Control processor 2318 controls a motor to rotate second vehicle main body 2301b with respect to first vehicle main body 2301a so as to cause the lengthwise direction of second vehicle main body 2301b to be parallel to the lengthwise direction of rail 7a3. With this, the lengthwise direction of second vehicle main body 2301b is approximately parallel to the lengthwise direction of first vehicle main body 2301a. In the present embodiment, control processor 2318 rotates second vehicle main body 2301b clockwise so as to cause the lengthwise direction of second vehicle main body 2301b to be approximately parallel to the lengthwise direction of rail 7a3.

Notch 2301k for avoiding interference between first connector 2321 and second connector 2322 of first vehicle main body 2301a is formed in second vehicle main body 2301b. Stated differently, a recess is formed in second vehicle main body 2301b that inhibits contact between first connector 2321 and second connector 2322 in an attitude in which the lengthwise direction of first vehicle main body 2301a and the lengthwise direction of second vehicle main body 2301b are approximately parallel. Accordingly, in an attitude in which the lengthwise direction of first vehicle main body 2301a and the lengthwise direction of second vehicle main body 2301b are approximately parallel, part of first connector 2321 and second connector 2322 (the part on the side of the coupling portion with first vehicle main body 2301a) is arranged within notch 2301k (the recess) formed in second vehicle main body 2301b.

Control processor 2318 pivots fourth connector 2324 to close fourth connector 2324. This connects fourth connector 2324 to rail 7a3.

As illustrated in (f) in FIG. 135A and FIG. 135B, control processor 2318 controls rear third propeller actuation motor 22a3 to rotate side propeller 22a1. With this, package transport device 10p moves forward and second hook 2323b of third connector 2323, as well as second connector 2322 and fifth connector 2325 pass vertically below coupler 7e.

After second hook 2323b of third connector 2323, as well as second connector 2322 and fifth connector 2325 pass vertically below coupler 7e, control processor 2318 pivots each of second hook 2323b of third connector 2323, second connector 2322, and fifth connector 2325 to close second connector 2322 and fifth connector 2325. This connects second hook 2323b of third connector 2323, second connector 2322, and fifth connector 2325 to rail 7a3. With this, package transport device 10p travels forward along rail 7a3.

Operation Example 6

Next, in this operation, an example in which package transport device 10p turns right will be given with reference to, for example, FIG. 135C. FIG. 135C illustrates an example of another operation of package transport device 10p according to Embodiment 13 when it is turning right on rail 7 that changes trajectory to the right.

This operation differs from Operation Example 5 in that the coupling portion that couples (i) first hook 2323a and second hook 2323b in third connector 2323 and (ii) turntable 2319 is located on the left of first vehicle main body 2301a, i.e., on the opposite side that rail support portion 7x is on. The coupling portions are the blacked-out portions in FIG. 135C. Since this operation is similar to Operation Example 5, similar content is denoted with the same reference signs, and repeated description will be omitted as appropriate. In third connector 2323 according to this operation example, first hook 2323a and second hook 2323b are capable of independently pivoting with respect to the center point of turntable 2319. Accordingly, the attitudes of first hook 2323a and second hook 2323b can be mutually displaced.

As illustrated in (a) in FIG. 135C, after fourth connector 2324 and first connector 2321 pass vertically below coupler 7e, when the distance between coupler 7e and third connector 2323 becomes less than a predetermined distance, control processor 2318 pivots only first hook 2323a of third connector 2323 to open only first hook 2323a, and causes only first hook 2323a of third connector 2323 to be eccentric clockwise with respect to the center point of turntable 2319.

Control processor 2318 controls the rear third propeller actuation motor 22a3 to rotate side propeller 22a1 and cause package transport device 10p to travel forward, whereby first hook 2323a of third connector 2323 passes vertically below coupler 7e. Note that first connector 2321 is held while extended to the rail 7a3 side so that it can couple to (grab) rail 7a3.

As illustrated in (b) in FIG. 135C, control processor 2318 pivots the first hook 2323a of third connector 2323 to close first hook 2323a of third connector 2323. This connects first hook 2323a of third connector 2323 to rail 7a3.

As illustrated in (c) in FIG. 135C, control processor 2318 pivots second connector 2322 to open second connector 2322. Control processor 2318 controls a motor to rotate first vehicle main body 2301*a* with respect to second vehicle main body 2301*b* so as to cause the lengthwise direction of first vehicle main body 2301*a* to be parallel to the lengthwise direction of rail 7*a*3. With this, the lengthwise direction of first vehicle main body 2301*a* intersects the lengthwise direction of second vehicle main body 2301*b*.

As illustrated in (d) and (e) in FIG. 135C, control processor 2318 pivots first connector 2321 to close first connector 2321. This connects first connector 2321 to rail 7*a*3.

As illustrated in (e) and (f) in FIG. 135C, control processor 2318 pivots fifth connector 2325 to open fifth connector 2325. Fifth connector 2325 releases its connection with rail 7*a*1 and is disposed vertically below rail 7*a*1 so as not to contact rail 7*a*1.

Control processor 2318 controls a motor to rotate second vehicle main body 2301*b* with respect to first vehicle main body 2301*a* so as to cause the lengthwise direction of second vehicle main body 2301*b* to be parallel to the lengthwise direction of rail 7*a*3. With this, the lengthwise direction of second vehicle main body 2301*b* is approximately parallel to the lengthwise direction of first vehicle main body 2301*a*.

Control processor 2318 pivots fourth connector 2324 to close fourth connector 2324. This connects fourth connector 2324 to rail 7*a*3.

Control processor 2318 also pivots second hook 2323*b* of third connector 2323 to open second hook 2323*b* of third connector 2323. With this, the connection of second hook 2323*b* of third connector 2323 to rail 7*a*1 is released, and second hook 2323*b* of third connector 2323 is disposed vertically below rail 7*a*1 so that second hook 2323*b* of third connector 2323 and rail 7*a*1 do not come into contact.

Control processor 2318 then rotates side propeller 22*a*1 by controlling the rear third propeller actuation motor 22*a*3. With this, package transport device 10*p* moves forward and second hook 2323*b* of third connector 2323, as well as second connector 2322 and fifth connector 2325 pass vertically below coupler 7*e*.

As illustrated in (f) of FIG. 135C and in FIG. 135B, after second hook 2323*b* of third connector 2323 as well as second connector 2322 and fifth connector 2325 pass vertically below coupler 7*e*, control processor 2318 pivots each of second hook 2323*b* of third connector 2323, second connector 2322, and fifth connector 2325 to close second connector 2322 and fifth connector 2325. This connects second hook 2323*b* of third connector 2323, second connector 2322, and fifth connector 2325 to rail 7*a*3. With this, package transport device 10*p* travels forward along rail 7*a*3.

As illustrated in FIG. 135D, coupler 7*e* is connected and fixed to rail support portion 7*x* disposed on the right of first vehicle main body 2301*a*. FIG. 135D illustrates an example of an operation of package transport device 10*p* when it is turning right on rail 7 that changes trajectory to the right, in a case in which rail support portion 7*x* is provided in a different location. Here, a case in which the coupling portion that couples (i) first hook 2323*a* and second hook 2323*b* of third connector 2323 and (i) turntable 2319 is on the right of first vehicle main body 2301*a*, i.e., on the side that rail support portion 7*x* is on is the same as this operation example. Moreover, a case in which the coupling portion that couples (i) first hook 2323*a* and second hook 2323*b* of third connector 2323 and (i) turntable 2319 is on the left of first vehicle main body 2301*a*, i.e., on the opposite side that rail support portion 7*x* is on is the same as Operation Example 5.

Operation Example 7

Next, in this operation, an example in which package transport device 10*p* turns right will be given with reference to, for example, FIG. 136. FIG. 136 illustrates an example of an operation of package transport device 10*p* according to Embodiment 13 when it is turning left on rail 7 that changes trajectory to the left.

Rail 7 according to this operation includes horizontal rail 7*a*1 that is approximately parallel to the horizontal plane, and rail 7*a*3 whose path is angled to the left relative to the lengthwise direction of rail 7*a*1. Rail 7*a*1 and rail 7*a*3 are approximately parallel to the horizontal plane. More specifically, one end of horizontal rail 7*a*1 is connected to the other end of rail 7*a*3 via coupler 7*e*. Coupler 7*e* is connected and fixed to the rail support portion, which is provided on a utility pole or similar structure provided in the ground surface or the like. In this operation, an example in which package transport device 10*p* is traveling to the right (turning right), from rail 7*a*1 toward rail 7*a*3, will be given. The coupling portion that couples (i) first hook 2323*a* and second hook 2323*b* in third connector 2323 and (ii) turntable 2319 is located on the right of first vehicle main body 2301*a*, i.e., on the opposite side that the rail support portion is on. The coupling portions are the blacked-out portions in FIG. 136. Since this operation example is similar to Operation Example 5, similar content is denoted with the same reference signs, and repeated description will be omitted as appropriate.

Note that each of first connector 2321, second connector 2322, fourth connector 2324, and fifth connector 2325 used in this operation example is also a connector like that used in, for example, Operation Example 2. Third connector 2323 includes first hook 2323*a* and second hook 2323*b*, and first hook 2323*a* is symmetrical with second hook 2323*b*. At least one of first hook 2323*a* or second hook 2323*b* is provided with roller 2327*m*.

As illustrated in (a) in FIG. 136, after fourth connector 2324 and first connector 2321 pass vertically below coupler 7*e*, when the distance between coupler 7*e* and third connector 2323 becomes less than a predetermined distance, control processor 2318 pivots only first hook 2323*a* of third connector 2323 to open only first hook 2323*a*, and causes only first hook 2323*a* of third connector 2323 to be eccentric clockwise with respect to the center point of turntable 2319.

Control processor 2318 controls the rear third propeller actuation motor 22*a*3 to rotate side propeller 22*a*1 and cause package transport device 10*p* to travel forward, whereby first hook 2323*a* of third connector 2323 passes vertically below coupler 7*e*.

As illustrated in (b) in FIG. 136, control processor 2318 controls the actuation mechanism of turntable 2319 to cause first hook 2323*a* of third connector 2323 to be eccentric with respect to the center point of turntable 2319. This pivots first hook 2323*a* of third connector 2323 counterclockwise with respect to center point of turntable 2319 and moves first hook 2323*a* vertically below rail 7*a*3.

As illustrated in (c) in FIG. 136, control processor 2318 pivots the first hook 2323*a* of third connector 2323 to close first hook 2323*a* of third connector 2323. This connects first hook 2323*a* of third connector 2323 to rail 7*a*3.

As illustrated in (d) in FIG. 136, control processor 2318 pivots fifth connector 2325 to open fifth connector 2325. Fifth connector 2325 releases its connection with rail 7*a*1 and is disposed vertically below rail 7*a*1 so as not to contact rail 7*a*1.

Control processor 2318 controls a motor to rotate second vehicle main body 2301*b* with respect to first vehicle main body 2301*a* so as to cause the lengthwise direction of second vehicle main body 2301*b* to be parallel to the lengthwise direction of rail 7*a*3. With this, the lengthwise direction of second vehicle main body 2301*b* intersects the lengthwise direction of first vehicle main body 2301*a*. In the present embodiment, control processor 2318 rotates second vehicle main body 2301*b* counterclockwise so as to cause the lengthwise direction of second vehicle main body 2301*b* to be approximately parallel to the lengthwise direction of rail 7*a*3.

As illustrated in (e) in FIG. 136, control processor 2318 pivots second connector 2322 to open second connector 2322. Second connector 2322 releases its connection with rail 7*a*1 and is disposed vertically below rail 7*a*1 so as not to contact rail 7*a*1.

As illustrated in (f) in FIG. 136, control processor 2318 controls a motor to rotate first vehicle main body 2301*a* with respect to second vehicle main body 2301*b* so as to cause the lengthwise direction of first vehicle main body 2301*a* to be parallel to the lengthwise direction of rail 7*a*3. With this, the lengthwise direction of first vehicle main body 2301*a* is approximately parallel to the lengthwise direction of second vehicle main body 2301*b*. In the present embodiment, control processor 2318 rotates first vehicle main body 2301*a* counterclockwise so as to cause the lengthwise direction of first vehicle main body 2301*a* to be approximately parallel to the lengthwise direction of rail 7*a*3.

As illustrated in (f) and (g) in FIG. 136, control processor 2318 pivots fourth connector 2324 and first connector 2321 to close fourth connector 2324 and first connector 2321. This connects fourth connector 2324 and first connector 2321 to rail 7*a*3.

Control processor 2318 also pivots second hook 2323*b* of third connector 2323 to open second hook 2323*b* of third connector 2323. The connection of second hook 2323*b* of third connector 2323 to rail 7*a*1 is released, and second hook 2323*b* of third connector 2323 is disposed vertically below rail 7*a*1 so that second hook 2323*b* of third connector 2323 and rail 7*a*1 do not come into contact. Note that second hook 2323*b* of third connector 2323 does not float relative to rail 7.

Control processor 2318 then rotates side propeller 22*a*1 by controlling the rear third propeller actuation motor 22*a*3. With this, package transport device 10*p* moves forward and second hook 2323*b* of third connector 2323 passes vertically below coupler 7*e*.

As illustrated in (g) in FIG. 136, after second hook 2323*b* of third connector 2323 passes vertically below coupler 7*e*, control processor 2318 also pivots second hook 2323*b* of third connector 2323 to close second hook 2323*b* of third connector 2323. This connects second hook 2323*b* of third connector 2323 to rail 7*a*3. After second connector 2322 and fifth connector 2325 pass vertically below coupler 7*e*, control processor 2318 pivots second connector 2322 and fifth connector 2325 to close second connector 2322 and fifth connector 2325. This connects second connector 2322 and fifth connector 2325 to rail 7*a*3. With this, package transport device 10*p* travels forward along rail 7*a*3.

Operation Example 8

Next, in this operation, an example in which package transport device 10*p* turns travels over hump 7*y* will be given with reference to, for example, FIG. 137. FIG. 137 illustrates an example of an operation of package transport device 10*p* traveling over hump 7*y* according to Embodiment 13. In the operation example, content similar to other operation examples are denoted with the same reference signs, and repeated description will be omitted as appropriate.

In rail 7 according to this operation, at coupler 7*e* that couples rail support portion 7*x* and rail 7, a protruding hump 7*y* is formed to facilitate smooth traveling by roller 2327*m*. Rail 7 according to this operation is connected and fixed to rail support portion 7*x*, which is provided on a utility pole or similar structure provided in the ground surface or the like. In such cases, coupler 7*e* that couples rail support portion 7*x* and rail 7 may create an uneven travel surface (the upper surface of rail 7). Accordingly, when each of first connector 2321, second connector 2322, third connector 2323, and fifth connector 2325 includes roller 2327*m*, this uneven travel surface may make it difficult for package transport device 10*p* to travel. In view of this, in rail 7 according to this operation, hump 7*y* that enables smooth traveling by roller 2327*m* is formed at coupler 7*e* that couples rail support portion 7*x* and rail 7. Hump 7*y* includes an inclined curved surface that smoothens the surface of rail 7 that contacts roller 2327*m*. Package transport device 10*p* according to this operation example has the same configuration as package transport device 10*p* illustrated in, for example, FIG. 135A. Accordingly, the coupling portion that couples (i) first hook 2323*a* and second hook 2323*b* in third connector 2323 and (ii) turntable 2319 is located on the opposite side that rail support portion 7*x* is on.

As illustrated in (a) in FIG. 137, package transport device 10*p* travels along rail 7*a*1 by rotating side propeller 22*a*1. When the distance between coupler 7*e* and first connector 2321 is less than a predetermined distance, control processor 2318 stops the rotation of side propeller 22*a*1 by controlling rear third propeller actuation motor 22*a*3 for rotating side propeller 22*a*1. This causes package transport device 10*p* to stop traveling.

As illustrated in (b) in FIG. 137, when the distance between coupler 7*e* and first connector 2321 is less than a predetermined distance, control processor 2318 pivots first connector 2321 to open first connector 2321. By opening first connector 2321, first connector 2321 will not come into contact with rail support portion 7*x* when first vehicle main body 2301*a* and second vehicle main body 2301*b* pass vertically below coupler 7*e*. Moreover, since fourth connector 2324 is located on the opposite side that rail support portion 7*x* is on, fourth connector 2324 does not contact rail support portion 7*x* and can thus ride over hump 7*y*.

Note that control processor 2318 may open and close a connector while package transport device 10*p* is traveling along rail 7. Accordingly, package transport device 10*p* need not come to a stop when opening or closing a connector.

As illustrated in (c) in FIG. 137, control processor 2318 controls rear third propeller actuation motor 22*a*3 to rotate side propeller 22*a*1. With this, package transport device 10*p* moves forward and first connector 2321 passes vertically below coupler 7*e*.

As illustrated in (d) in FIG. 137, when connecting first connector 2321 to rail 7, control processor 2318 stops rotation of side propeller 22*a*1 by controlling the rear third propeller actuation motor 22*a*3. This causes package transport device 10*p* to stop traveling. After pivoting first connector 2321 and connecting first connector 2321 to rail 7, control processor 2318 controls third propeller actuation motor 22*a*3 to rotate side propeller 22*a*1 and cause package transport device 10*p* to travel.

As illustrated in (e) in FIG. 137, since first hook 2323*a* and second hook 2323*b* in third connector 2323 do not contact rail support portion 7*x* either, they can ride over hump 7*y*.

When the distance between coupler 7*e* and fifth connector 2325 is less than a predetermined distance, control processor 2318 stops the rotation of side propeller 22*a*1 by controlling rear third propeller actuation motor 22*a*3 for rotating side propeller 22*a*1. This causes package transport device 10*p* to stop traveling.

When the distance between coupler 7*e* and fifth connector 2325 is less than a predetermined distance, control processor 2318 pivots fifth connector 2325 to open fifth connector 2325. By opening fifth connector 2325, fifth connector 2325 will not come into contact with rail support portion 7*x* when first vehicle main body 2301*a* and second vehicle main body 2301*b* pass vertically below coupler 7*e*. Moreover, since second connector 2322 is located on the opposite side that rail support portion 7*x* is on, second connector 2322 does not contact rail support portion 7*x* and can thus ride over hump 7*y*.

As illustrated in (f) in FIG. 137, control processor 2318 controls rear third propeller actuation motor 22*a*3 to rotate side propeller 22*a*1. With this, package transport device 10*p* moves forward and fifth connector 2325 passes vertically below coupler 7*e*.

As illustrated in (g) in FIG. 137, when connecting fifth connector 2325 to rail 7, control processor 2318 stops rotation of side propeller 22*a*1 by controlling the rear third propeller actuation motor 22*a*3. This causes package transport device 10*p* to stop traveling. After pivoting fifth connector 2325 and connecting fifth connector 2325 to rail 7, control processor 2318 controls third propeller actuation motor 22*a*3 to rotate side propeller 22*a*1 and cause package transport device 10*p* to travel.

This is how package transport device 10*p* can pass rail support portion 7*x*.

Advantageous Effects

Next, advantageous effects achieved by package transport device 10*p* according to the present embodiment will be described.

Package transport device 10*p* according to the present embodiment includes: a main body (vehicle main body 2301, first vehicle main body 2301*a*, second vehicle main body 2301*b*); a rail holder (connector) held by rail 7 located above the main body; turntable 2319 that is provided between the main body and the rail holder and rotates the main body; slider portion 2310 that extends with respect to the main body; package holder 2315 that holds a package attached to slider portion 2310; and a propulsion blade (side propeller 22*a*1) that is attached to the main body and applies a propulsion force to the main body in a direction parallel to rail 7.

With this, slider portion 2310 can carry the package holder 2315 holding the package to a position spaced away from rail 7. Accordingly, a package can be delivered to the receiver without having to install separate rails 7 at the receiver.

Moreover, since the slider portion can carry a package, package transport device 10*p* can be kept away from people. People are therefore less likely to feel stress from the sound or presence of package transport device 10*p*. Accordingly, package transport device 10*p* is less likely to cause anxiety when carrying a package.

A control method according to the present embodiment is a method of controlling package transport device 10*p* including a main body, a rail holder held by rail 7 located above the main body, turntable 2319 that is provided between the main body and the rail holder and rotates the main body, slider portion 2310 that extends with respect to the main body, package holder 2315 that holds a package attached to slider portion 2310, and a propulsion blade that applies a propulsion force to the main body in a direction parallel to rail 7. The method includes: rotating the main body by turntable 2319; and extending slider portion 2310 with respect to the main body after turntable 2319 rotates the main body.

This control method achieves the same advantageous effects as described above.

In package transport device 10*p* according to the present embodiment, slider portion 2310 extends with respect to the main body after turntable 2319 rotates the main body.

With this, after rotating slider portion 2310 so as to face the receiver, slider portion 2310 can be extended with respect to the main body. This makes it possible to more precisely deliver the package to the receiver.

In package transport device 10*p* according to the present embodiment, the main body includes frame 2302 that is rectangular in plan view, and turntable 2319 rotates the main body until the lengthwise direction of frame 2302 approximately perpendicularly intersects the extending direction of rail 7.

This makes it possible to change the attitude of frame 2302 with respect to turntable 2319 by rotating turntable 2319. It is therefore possible to adjust the direction of extension of slider portion 2310 with respect to the main body. This makes it possible to more precisely deliver the package to the receiver.

In the control method according to the present embodiment, the main body includes frame 2302 that is rectangular in plan view, and in the rotating, the main body is rotated until the lengthwise direction of frame 2302 approximately perpendicularly intersects the extending direction of rail 7.

This control method achieves the same advantageous effects as described above.

In package transport device 10*p* according to the present embodiment, slider portion 2310 includes package holder 2315 at one end of slider portion 2310, and counterweight 2316 of a predetermined weight at the other end of slider portion 2310, and extends so as to maintain balance between the weight of the package and the weight of counterweight 2316.

With this, when slider portion 2310 is carrying a package, the attitude of package transport device 10*p* can be adjusted via counterweight 2316 and the package. Accordingly, the position of counterweight 2316 relative to the main body can be adjusted so as to maintain the horizontal attitude of the main body, for example. This makes it possible to more precisely deliver the package to the receiver.

In the control method according to the present embodiment, slider portion 2310 includes package holder 2315 at one end of slider portion 2310, and counterweight 2316 of a predetermined weight at the other end of slider portion 2310, and in the extending, slider portion 2310 is extended from both ends of elongated frame 2302 in the lengthwise direction of elongated frame 2302 so as to maintain balance between the weight of the package and the weight of counterweight 2316.

This control method achieves the same advantageous effects as described above.

By adjusting the position of counterweight 2316 with respect to the main body, it is possible to tilt the attitude of package transport device 10*p* and extend slider portion 2310 toward the receiver located higher or lower than rail 7. For example, when package transport device 10*p* is at a height corresponding to the second floor of a building, it is possible to tilt vehicle main body 2301 and extend slider portion 2310 to deliver the package to the first or third floor. The package can thus be delivered even to a receiver at a different height than rail 7.

In package transport device 10*p* according to the present embodiment, counterweight 2316 is a battery.

This makes it possible to adjust the attitude of package transport device 10*p* using a device required by package transport device 10*p*. This eliminates the need for a separate counterweight 2316.

In package transport device 10*p* according to the present embodiment, the rail holder includes a first holder (fourth connector 2324, first hook 2323*a* of third connector 2323, second connector 2322) held by rail 7 from above rail 7, and a second holder (first connector 2321, second hook 2323*b* of third connector 2323, fifth connector 2325) held by rail 7 so as to push up on rail 7 from below.

With this, the rail holder can be connected to rail 7 so as to clamp rail 7 from above and below. This inhibits package transport device 10*p* from disengaging from rail 7, thus inhibiting package transport device 10*p* from falling, which ensures the safety of package transport device 10*p*.

In package transport device 10*p* according to the present embodiment, the rail holder includes: a first rail holder (first connector 2321) located on one side of frame 2302 in the lengthwise direction of frame 2302; a second rail holder (second connector 2322) located on the other side of frame 2302 in the lengthwise direction of frame 2302; and a third rail holder (third connector 2323) located in the central region of frame 2302 between the one side and the other side in the lengthwise direction of frame 2302.

This inhibits package transport device 10*p* from disengaging from rail 7 since package transport device 10*p* is supported by rail 7 by three rail holders. With this, package transport device 10*p* can be inhibited from falling, which ensures the safety of package transport device 10*p*.

Package transport device 10*p* according to the present embodiment includes a motor that rotates the rail holder so as to release a hold of the rail holder by rail 7 so as to avoid contact between a rail support portion that supports rail 7 and the rail holder when package transport device 10*p* is traveling on rail 7.

With this, when package transport device 10*p* is traveling on rail 7, it can avoid the rail support portion so as to not contact the rail holder. This allows package transport device 10*p* to travel along rail 7 toward the receiver.

Variation 1 of Embodiment 13

FIG. 138 illustrates an example of a package transport device according to Variation 1 of Embodiment 13.

Hereinafter, as illustrated in FIG. 138, since the basic configuration of package transport device 10*p* according to the present variation is the same as the basic configuration of the unmanned aerial vehicle of Embodiment 1 and the same as the basic configuration of package transport device 10*p* according to Embodiment 13 and the like, regarding the basic configuration of package transport device 10*p* in the present variation, the same reference signs as above will be used and repeated description will be omitted where appropriate. Package transport device 10*p* according to the present variation differs from Embodiment 13, etc., in that the position of each roller 2327*m* of first connector 2321, second connector 2322, third connector 2323, fourth connector 2324, and fifth connector 2325 can be displaced. The present variation may also be used with lifting systems and unmanned aerial vehicles according to embodiments other than Embodiment 1.

In the present variation, as illustrated in (a) in FIG. 138, first connector 2321, second connector 2322, third connector 2323, fourth connector 2324, and fifth connector 2325 are disposed to have bilateral symmetry with respect to the lengthwise direction of rail 7. Each of first connector 2321, second connector 2322, third connector 2323, fourth connector 2324, and fifth connector 2325 may have the same configuration. First connector 2321 and fourth connector 2324 are disposed on the right side (on the right in a view from the traveling direction) of package transport device 10*p*, and second connector 2322 and fifth connector 2325 are disposed on the left side (on the left in a view from the traveling direction) of package transport device 10*p*.

The connectors illustrated in (b) through (g) in FIG. 138 are provided with hook 2326 connected to rail 7, roller 2327*m* that is provided on the inner peripheral surface side (the side opposing rail 7) of hook 2326 and rotatably contacts rail 7, and a motor that rotates roller 2327*m*. Note that these connectors need not include the motor; the motor is not an essential element of these connectors. Hook 2326 can connect to (hook onto) rail 7. Roller 2327*m* is a wheel for rotatably contacting rail 7, and includes a recess shaped to follow the direction of rotation (the circumferential direction) of the axle support so as to guide rail 7. When hook 2326 is contacting rail 7, roller 2327*m* is supported by the axle support of the motor included in hook 2326, and rotates around the axle support as an axis. The motor is actuated by control processor 2318, and rotates roller 2327*m* by rotating the axle support.

In the present variation, roller 2327*m* of each of first connector 2321, second connector 2322, fourth connector 2324, and fifth connector 2325 can move along the lengthwise direction of its connector. The same may apply for third connector 2323. In other words, when package transport device 10*p* is connected to rail 7 that is approximately parallel to the horizontal plane, these connectors extend vertically, so each roller 2327*m* can be displaced vertically along with the axle support and the motor. For example, by arranging roller 2327*m* of first connector 2321 above rail 7 and arranging roller 2327*m* of fourth connector 2324 below rail 7, or vice versa, first connector 2321 and fourth connector 2324 can clamp rail 7 from above and below. For example, by arranging roller 2327*m* of second connector 2322 above rail 7 and arranging roller 2327*m* of fifth connector 2325 below rail 7, or vice versa, second connector 2322 and fifth connector 2325 can clamp rail 7 from above and below.

The relationship, in such a configuration, between roller 2327*m* and hump 7*y* formed at coupler 7*e* that couples the rail support portion and rail 7 will be described with reference to FIG. 139. FIG. 139 illustrates an example of package transport device 10*p* according to Variation 1 of Embodiment 13 traveling over hump 7*y*.

In FIG. 139, hump 7*y* above rail 7 and hump 7*y* below rail 7 are formed at coupler 7*e* that couples the rail support portion and rail 7. In FIG. 139, hump 7*y* below rail 7 is larger than hump 7*y* above rail 7. In each pair of adjacent connectors, one is held by rail 7 from above rail 7, and the other is held by rail 7 so as to push up on rail 7 from below. In other words, the plurality of connectors include one connector and another connector. The pairs of adjacent connectors are, for example: first connector 2321 and fourth connector 2324;

first hook 2323_a_ and second hook 2323_b_ of third connector 2323; and second connector 2322 and fifth connector 2325.

As illustrated in (a) in FIG. 139, distance α1 between the horizontal plane touching the peak of hump 7_y_ below rail 7 and the horizontal plane touching the lowest surface of recess 2327_m_1 of roller 2327_m_ in the other connector displaces as package transport device 10_p_ travels along rail 7 and rides over hump 7_y_ above rail 7 and hump 7_y_ below rail 7.

As illustrated in (b) in FIG. 139, when roller 2327_m_ of the one connector rides over hump 7_y_ above rail 7, roller 2327_m_ of the one connector is pushed vertically upward relative to the one connector. When roller 2327_m_ of the other connector rides over hump 7_y_ below rail 7, roller 2327_m_ of the other connector is pushed vertically downward relative to the other connector. With this, distance α2 between the horizontal plane touching the peak of hump 7_y_ below rail 7 and the horizontal plane touching the lowest surface of recess 2327_m_1 of roller 2327_m_ in the other connector is shorter than distance α1.

In the present variation, first connector 2321 and fifth connector 2325 are preferably less than or equal to a certain distance apart, first hook 2323_a_ and second hook 2323_b_ of third connector 2323 are preferably less than or equal to a certain distance apart, and second connector 2322 and fourth connector 2324 are preferably less than or equal to a certain distance apart. When rail 7 is connected via first connector 2321 and fifth connector 2325 as well as via second connector 2322 and fourth connector 2324, if the distance between first connector 2321 and fifth connector 2325, the distance between first hook 2323_a_ and second hook 2323_b_ of third connector 2323, and the distance between second connector 2322 and fourth connector 2324 are greater than or equal to a predetermined distance, there is concern that rail 7 may detach from between first connector 2321 and fifth connector 2325, between first hook 2323_a_ and second hook 2323_b_ of third connector 2323, and between second connector 2322 and fourth connector 2324. Accordingly, when package transport device 10_p_ is traveling at speeds between 3 km/h and 60 km/h, the maximum gap between first connector 2321 and fifth connector 2325, between first hook 2323_a_ and second hook 2323_b_ of third connector 2323, and between second connector 2322 and fourth connector 2324 is preferably in a range from 5 cm to 10 cm. Note that third connector 2323 may be open while package transport device 10_p_ is traveling.

Operation Example

Next, an operation of package transport device 10_p_ when hump 7_y_ is formed above rail 7 will be described with reference to FIG. 140. FIG. 140 illustrates an example of what happens to the connectors when package transport device 10_p_ according to Variation 1 of Embodiment 13 travels over hump 7_y_. In the operation example, content similar to other operation examples are denoted with the same reference signs, and repeated description will be omitted as appropriate.

In this operation example, among pairs of adjacent connectors, fourth connector 2324 and second connector 2322 are held by rail 7 from above rail 7, and first connector 2321 and fifth connector 2325 are held by rail 7 so as to push up on rail 7 from below. In third connector 2323, first hook 2323_a_ is held by rail 7 from above rail 7, and second hook 2323_b_ is held by rail 7 so as to push up on rail 7 from below.

As illustrated in (a) in FIG. 140, package transport device 10_p_ travels along rail 7_a_1 by rotating side propeller 22_a_1. When the distance between coupler 7_e_ and first connector 2321 is less than a predetermined distance, control processor 2318 stops the rotation of side propeller 22_a_1 by controlling rear third propeller actuation motor 22_a_3 for rotating side propeller 22_a_1. This causes package transport device 10_p_ to stop traveling.

When the distance between coupler 7_e_ and first connector 2321 is less than a predetermined distance, control processor 2318 pivots first connector 2321 to open first connector 2321. By opening first connector 2321, first connector 2321 will not come into contact with the rail support portion when first vehicle main body 2301_a_ and second vehicle main body 2301_b_ pass vertically below coupler 7_e_. Moreover, since fourth connector 2324 is located on the opposite side that the rail support portion is on, fourth connector 2324 does not contact the rail support portion and can thus ride over hump 7_y_.

Note that control processor 2318 may open and close a connector while package transport device 10_p_ is traveling along rail 7.

As illustrated in (b) in FIG. 140, control processor 2318 controls rear third propeller actuation motor 22_a_3 to rotate side propeller 22_a_1. With this, fourth connector 2324 rides up on hump 7_y_, and package transport device 10_p_ travels forward so that first connector 2321 passes vertically below coupler 7_e_. Here, roller 2327_m_ of fourth connector 2324 is pushed upward by hump 7_y_, causing it to slide vertically upward along fourth connector 2324.

As illustrated in (c) in FIG. 140, fourth connector 2324 rides over and past hump 7_y_, and first connector 2321 passes vertically below coupler 7_e_. Once fourth connector 2324 rides over and past hump 7_y_, roller 2327_m_ of fourth connector 2324 returns to the position it was at on fourth connector 2324 before riding onto hump 7_y_.

As illustrated in (d) in FIG. 140, when connecting first connector 2321 to rail 7, control processor 2318 stops rotation of side propeller 22_a_1 by controlling the rear third propeller actuation motor 22_a_3. This causes package transport device 10_p_ to stop traveling. After pivoting first connector 2321 and connecting first connector 2321 to rail 7, control processor 2318 controls third propeller actuation motor 22_a_3 to rotate side propeller 22_a_1 and cause package transport device 10_p_ to travel.

When the distance between coupler 7_e_ and third connector 2323 is less than a predetermined distance, control processor 2318 stops the rotation of side propeller 22_a_1 by controlling rear third propeller actuation motor 22_a_3 for rotating side propeller 22_a_1. This causes package transport device 10_p_ to stop traveling.

When the distance between coupler 7_e_ and second hook 2323_b_ of third connector 2323 is less than a predetermined distance, control processor 2318 pivots second hook 2323_b_ of third connector 2323 to open second hook 2323_b_ of third connector 2323. Opening second hook 2323_b_ of third connector 2323 prevents second hook 2323_b_ of third connector 2323 from contacting the rail support portion when first vehicle main body 2301_a_ and second vehicle main body 2301_b_ pass vertically below coupler 7_e_. Moreover, since first hook 2323_a_ of third connector 2323 is located on the opposite side that the rail support portion is on, first hook 2323_a_ of third connector 2323 and can ride over hump 7_y_ without contacting the rail support portion. Second hook 2323_b_ of third connector 2323 can pass vertically below coupler 7_e_.

Thereafter, second hook 2323_b_ of third connector 2323 connects to rail 7, and after opening fifth connector 2325 as well, second connector 2322 rides over hump 7_y_, fifth connector 2325 passes vertically below coupler 7*e*, and fifth connector 2325 is connected to rail 7. This is how package transport device 10*p* can pass the rail support portion.

Note that control processor 2318 may open and close a connector while package transport device 10*p* is traveling along rail 7.

Variation 2 of Embodiment 13

FIG. 141 illustrates an example of a package transport device according to Variation 2 of Embodiment 13.

Hereinafter, as illustrated in FIG. 141, since the basic configuration of package transport device 10*p* according to the present variation is the same as the basic configuration of the unmanned aerial vehicle of Embodiment 1 and the same as the basic configuration of package transport device 10*p* according to Embodiment 13 and the like, regarding the basic configuration of package transport device 10*p* in the present variation, the same reference signs as above will be used and repeated description will be omitted where appropriate. Package transport device 10*p* according to the present variation differs from Embodiment 13, etc., in that the position of each of first connector 2321, second connector 2322, third connector 2323, fourth connector 2324, and fifth connector 2325 can be displaced along with roller 2327*m*. The present variation may also be used with lifting systems and unmanned aerial vehicles according to embodiments other than Embodiment 1.

In the present variation, first connector 2321, second connector 2322, third connector 2323, fourth connector 2324, and fifth connector 2325 are disposed to have bilateral symmetry with respect to the lengthwise direction of rail 7. Each of first connector 2321, second connector 2322, third connector 2323, fourth connector 2324, and fifth connector 2325 may have the same configuration. First connector 2321, second hook 2323*b* of third connector 2323, and fifth connector 2325 are connectors disposed on the right side (on the right in a view from the traveling direction) of package transport device 10*p*, and first hook 2323*a* of third connector 2323 and fourth connector 2324 are connectors disposed on the left side (on the left in a view from the traveling direction) of package transport device 10*p*.

In the present variation, first connector 2321, second connector 2322, and third connector 2323 can vertically slide with respect to first vehicle main body 2301*a*. Fourth connector 2324 and fifth connector 2325 can vertically slide with respect to second vehicle main body 2301*b*.

As illustrated in (a) and (b) in FIG. 141, when first connector 2321, second hook 2323*b* of third connector 2323, and second connector 2322 pass hump 7*y* below rail 7, they are slid vertically downward as a result of riding onto hump 7*y*. In other words, when the axle support of each roller 2327*m* of first connector 2321, second hook 2323*b* of third connector 2323, and second connector 2322 rides onto hump 7*y* below rail 7, first connector 2321, second hook 2323*b* of third connector 2323, and second connector 2322 are pushed so as to slide vertically downward with respect to first vehicle main body 2301*a* via the axle support, to a position lower than when they are on a portion of rail 7 other than hump 7*y*.

When fourth connector 2324, second hook 2323*b* of third connector 2323, and fifth connector 2325 pass hump 7*y* above rail 7, they are slid vertically upward as a result of riding onto hump 7*y*. In other words, when the axle support of each roller 2327*m* of fourth connector 2324, second hook 2323*b* of third connector 2323, and fifth connector 2325 rides onto hump 7*y* above rail 7, fourth connector 2324, second hook 2323*b* of third connector 2323, and fifth connector 2325 are pushed so as to slide vertically upward with respect to first vehicle main body 2301*a* via the axle support, to a position higher than when they on a portion of rail 7 other than hump 7*y*.

In FIG. 141, (a) illustrates a side view of first connector 2321, second connector 2322, third connector 2323, fourth connector 2324, and fifth connector 2325 traveling along rail 7. In FIG. 141, (b) illustrates a front view of first connector 2321, second connector 2322, third connector 2323, fourth connector 2324, and fifth connector 2325 traveling along rail 7.

As illustrated in (A) in (a) and (b) in FIG. 141, second connector 2322 and fifth connector 2325 clamp rail 7 via rollers 2327*m* of second connector 2322 and fifth connector 2325. In other words, since recess 2327*m*1 of roller 2327*m* of second connector 2322 and recess 2327*m*1 of roller 2327*m* of fifth connector 2325 clamp rail 7, rollers 2327*m* of second connector 2322 and fifth connector 2325 are inhibited from disengaging from rail 7.

As illustrated in (B) in (a) and (b) in FIG. 141, since roller 2327*m* of first hook 2323*a* of third connector 2323 rides up on hump 7*y* above rail 7, and roller 2327*m* of second hook 2323*b* of third connector 2323 rides up on hump 7*y* below rail 7, first hook 2323*a* and second hook 2323*b* of third connector 2323 maintain a state in which rollers 2327*m* of first hook 2323*a* and second hook 2323*b* are clamping hump 7*y* above rail 7 and hump 7*y* below rail 7. In other words, since recess 2327*m*1 of roller 2327*m* of first hook 2323*a* of third connector 2323 and recess 2327*m*1 of roller 2327*m* of second hook 2323*b* of third connector 2323 clamp rail 7, rollers 2327*m* of first hook 2323*a* and second hook 2323*b* of third connector 2323 are inhibited from disengaging from rail 7.

As illustrated in (C) in (a) and (b) in FIG. 141, since roller 2327*m* of fourth connector 2324 rides up on hump 7*y* above rail 7, and roller 2327*m* of first connector 2321 rides up on hump 7*y* below rail 7, fourth connector 2324 and first connector 2321 maintain a state in which rollers 2327*m* of fourth connector 2324 and first connector 2321 are clamping hump 7*y* above rail 7 and hump 7*y* below rail 7. In other words, since recess 2327*m*1 of roller 2327*m* of fourth connector 2324 and recess 2327*m*1 of roller 2327*m* of first connector 2321 clamp rail 7, rollers 2327*m* of fourth connector 2324 and first connector 2321 are inhibited from disengaging from rail 7.

Package transport device 10*p* configured in this way may travel several tens of km/h over hump 7*y* of rail 7. This could conceivably cause fourth connector 2324 and first connector 2321 to derail when riding over hump 7*y* below rail 7 and hump 7*y* above rail 7. However, since second connector 2322 and fifth connector 2325 clamp rail 7 and first hook 2323*a* and second hook 2323*b* of third connector 2323 clamp rail 7, the connection of the connectors to rail 7 is reinforced. This inhibits package transport device 10*p* from falling due to derailment when it rides over humps 7*y*.

Next, specific configurations of the connectors will be described in more detail with reference to FIG. 142. FIG. 142 illustrates an example of the positions of the connectors of another package transport device according to Variation 2 of Embodiment 13 being displaced. Here, first connector 2321, second connector 2322, third connector 2323, fourth connector 2324, and fifth connector 2325 will be collectively referred to as “connectors”.

As described above, the connectors include a hook connected to rail 7 and roller 2327*m* that rotatably contacts rail 7. In the present variation, the connectors do not need to include a motor for rotating roller 2327*m*. The connectors further include first spring 2351, second spring 2352, and slide motor 2353.

The hook includes roller support portion 2361 that is connected to rail 7 and vertically slides with respect to first vehicle main body 2301*a*, and slide main body portion 2362 that slidably supports roller support portion 2361.

Roller support portion 2361 has an elongated hook shape. Roller 2327*m* and an axle support that rotatably supports roller 2327*m* are provided at the leading end (vertical top end) of roller support portion 2361. In other words, roller support portion 2361 includes an axle support. Roller support portion 2361 slides along the vertical direction, which corresponds do the lengthwise direction of slide main body portion 2362. First spring 2351 is fixed between first spring support piece 2361*a* of roller support portion 2361 and second spring support piece 2361*b* of slide main body portion 2362, and second spring 2352 is fixed between first spring support piece 2361*a* of roller support portion 2361 and third spring support piece 2361*c* of slide main body portion 2362.

First spring support piece 2361*a* is located between second spring support piece 2361*b* and third spring support piece 2361*c*, is provided on roller support portion 2361, and can be vertically displaced as roller support portion 2361 slides. Second spring support piece 2361*b* is located vertically above slide main body portion 2362, and can be vertically displaced. Third spring support piece 2361*c* is a fixed end located vertically below slide main body portion 2362.

Slide main body portion 2362 is elongated in a predetermined direction with respect to first vehicle main body 2301*a* and second vehicle main body 2301*b*, and is connected to first vehicle main body 2301*a* and second vehicle main body 2301*b*. More specifically slide main body portion 2362 can vertically slide with respect to first vehicle main body 2301*a* and second vehicle main body 2301*b*, by slide motor 2353 provided in first vehicle main body 2301*a* and second vehicle main body 2301*b*.

Slide main body portion 2362 guides roller support portion 2361 so that it can slide along its own lengthwise direction.

Slide main body portion 2362 can rotate about an axis parallel to the lengthwise direction of rail 7. Slide main body portion 2362 rotates about the axis by motor 2355 provided in first vehicle main body 2301*a* and second vehicle main body 2301*b* being controlled by control processor 2318.

Slide motor 2353 is provided in first vehicle main body 2301*a* and second vehicle main body 2301*b*, and is controlled by control processor 2318 to vertically slide main body portion 2362 with respect to first vehicle main body 2301*a* and second vehicle main body 2301*b*.

First spring 2351 is a spring with a higher spring constant (Young's modulus) than second spring 2352. First spring 2351 is arranged along the lengthwise direction of roller support portion 2361 by having one end fixed to first spring support piece 2361*a* of roller support portion 2361 and the other end fixed to second spring support piece 2361*b* of slide main body portion 2362. When a package is held by package holder 2315 of package transport device 10*p*, first spring 2351 can support that package.

Second spring 2352 is disposed vertically below first spring 2351. Second spring 2352 is arranged along the lengthwise direction of roller support portion 2361 by having one end fixed to first spring support piece 2361*a* of roller support portion 2361 and the other end fixed to third spring support piece 2361*c* of slide main body portion 2362.

Operation Example 1

Next, an example of an operation performed by package transport device 10*p* when hump 7*y* is formed above rail 7 and hump 7*y* is also formed below rail 7 will be given with reference to, for example, FIG. 143. FIG. 143 illustrates an example of what happens to the connectors when a different package transport device according to Variation 2 of Embodiment 13 travels over a hump. This operation example is the same as the operation example according to Variation 1 of Embodiment 13 except that hump 7*y* is also formed below rail 7. In the operation example, content similar to other operation examples are denoted with the same reference signs, and repeated description will be omitted as appropriate.

As illustrated in (a) in FIG. 143, package transport device 10*p* travels along rail 7*a*1 by rotating side propeller 22*a*1. When the distance between coupler 7*e* and first connector 2321 is less than a predetermined distance, control processor 2318 slows the rotation of side propeller 22*a*1 by controlling rear third propeller actuation motor 22*a*3 for rotating side propeller 22*a*1. This slows down package transport device 10*p*. For example, the speed of package transport device 10*p* is reduced to around 20 km/h.

As illustrated in (a) and (b) in FIG. 143, fourth connector 2324 rides onto hump 7*y* above rail 7, and first connector 2321 rides onto hump 7*y* below rail 7. Here, roller 2327*m* of fourth connector 2324 is pushed upward by hump 7*y* above rail 7, causing it to gradually move vertically upward along fourth connector 2324. Roller 2327*m* of first connector 2321 is pushed upward by hump 7*y* below rail 7, causing it to gradually move vertically downward along first connector 2321.

As illustrated in (c) and (d) in FIG. 143, once roller 2327*m* of fourth connector 2324 passes the peak of hump 7*y* above rail 7, it gradually moves vertically downward along fourth connector 2324. Once roller 2327*m* of first connector 2321 passes the peak of hump 7*y* below rail 7, it gradually moves vertically upward along first connector 2321.

Once fourth connector 2324 rides over and past hump 7*y* above rail 7, roller 2327*m* of fourth connector 2324 returns to the position it was at on fourth connector 2324 before riding onto hump 7*y* above rail 7. Once first connector 2321 rides over and past hump 7*y* below rail 7, roller 2327*m* of first connector 2321 returns to the position it was at on first connector 2321 before riding onto hump 7*y* below rail 7.

Fourth connector 2324 and first connector 2321 can thus ride over hump 7*y* above rail 7 and hump 7*y* below rail 7. The combination of first hook 2323*a* and second hook 2323*b* of third connector 2323 can ride over hump 7*y* above rail 7 and hump 7*y* below rail 7 as well, just as with the combination of fifth connector 2325 and second connector 2322. Accordingly, package transport device 10*p* can pass a rail support portion without having to stop package transport device 10*p* or without having to rotate a connector.

Operation Example 2

Next, movement of the connectors with respect to rail 7, hump 7*y* above rail 7, and hump 7*y* below rail 7 will be described with reference to, for example, FIG. 142. In the operation example, content similar to other operation examples are denoted with the same reference signs, and repeated description will be omitted as appropriate.

As illustrated in FIG. 142, this operation example pertains to an operation of moving roller 2327*m* from vertically above rail 7 to vertically below rail 7. This example assumes that the connectors according to this operation example are connected to the left sides of first vehicle main body 2301*a* and second vehicle main body 2301*b* in a case in which rail support portions are provided on the right side of rail 7 in a view of rail 7 in the traveling direction. The connectors in this operation example are fourth connector 2324, first hook 2323*a* of third connector 2323, and second connector 2322, or first connector 2321, second hook 2323*b* of third connector 2323, and fifth connector 2325.

As illustrated in (a) in FIG. 142, when package transport device 10*p* is traveling along rail 7 in a typical fashion, the height from the top end of slide motor 2353 to the leading end of roller support portion 2361 is approximately 25.0 cm, the height from the top end of slide motor 2353 to the center of rail 7 is approximately 20.0 cm, the height from the axis of the axle support to the leading end of roller support portion 2361 is approximately 5.0 cm, and the height of first spring 2351 is approximately 5.0 cm. The load placed on first spring 2351 by the package carried by package transport device 10*p* is 5 to 30 kg. In such cases, the amount of unevenness that can be absorbed by hump 7*y* during travel is approximately 5 cm, and the load capacity is approximately 10 kg.

In FIG. 142, (b) illustrates a case in which the connector is separated from rail 7. In this case, control processor 2318 controls slide motor 2353 to move slide main body portion 2362 vertically upward to thereby also move roller support portion 2361 vertically upward. This separates roller 2327*m* of roller support portion 2361 from rail 7 in a vertically upward direction. Here, the height from the top end of slide motor 2353 to the leading end of roller support portion 2361 is approximately 30.0 cm.

In FIG. 142, (c) illustrates a case in which the connector is rotated counterclockwise. In this case, control processor 2318 controls motor 2355 to rotate slide main body portion 2362 counterclockwise and thereby also rotate roller support portion 2361 counterclockwise. Roller 2327*m* of roller support portion 2361 is detached from vertically above rail 7 so as not to be present vertically above rail 7. Motor 2355 rotates slide main body portion 2362 approximately 10° counterclockwise.

In FIG. 142, (d) illustrates a case in which slide main body portion 2362 of the connector is moved vertically below slide main body portion 2362. In this case, control processor 2318 controls slide motor 2353 to move slide main body portion 2362 vertically downward to thereby also move roller support portion 2361 vertically downward. This moves roller 2327*m* of roller support portion 2361 vertically lower than rail 7. Here, the height from the top end of slide motor 2353 to the leading end of roller support portion 2361 is approximately 15.0 cm.

In FIG. 142, (d) and (e) illustrate a case in which the connector is rotated clockwise and roller 2327*m* pushes up on rail 7 from below. In this case, control processor 2318 controls motor 2355 to rotate slide main body portion 2362 clockwise and thereby also rotate roller support portion 2361 clockwise. This moves roller 2327*m* of roller support portion 2361 to a position vertically below rail 7. Motor 2355 rotates slide main body portion 2362 approximately 10° clockwise.

In (e) and (f) in FIG. 142, control processor 2318 controls slide motor 2353 to move slide main body portion 2362 vertically upward to thereby also move roller support portion 2361 vertically upward. This pushes roller 2327*m* of roller support portion 2361 vertically upward from below rail 7. Roller 2327*m* is pushed against rail 7 by the elastic force of second spring 2352 between first spring support piece 2361*a* of roller support portion 2361 and third spring support piece 2361*c* of slide main body portion 2362. Here, the force of roller 2327*m* of roller support portion 2361 pushing up on rail 7 from below is approximately 1 kg to 10 kg, the length of second spring 2352 is approximately 25.0 cm, and the height from the top end of slide motor 2353 to the center of rail 7 is approximately 20.0 cm.

In FIG. 142, (g) illustrates a case in which roller 2327*m* travels over hump 7*y* below rail 7. In this case, since roller 2327*m* is pushed vertically downward by hump 7*y*, roller support portion 2361 moves vertically downward along with roller 2327*m*. Here, a significant amount of force is exerted vertically upward onto rail 7 by second spring 2352. For example, when roller 2327*m* moves approximately 10.0 cm vertically downward when traveling over hump 7*y* below rail 7, the distance from the top end of slide motor 2353 to the center of rail 7 is approximately 10.0 cm, and the length of second spring 2352 is approximately 15.0 cm.

In this way, when riding up onto hump 7*y* after traveling in a typical fashion along rail 7, second spring 2352 contracts and extends to exert a pressing force on hump 7*y*, which makes it possible to inhibit roller 2327*m* from derailing from hump 7*y*.

Operation Example 3

Next, movement of the connectors with respect to rail 7, hump 7*y* above rail 7, and hump 7*y* below rail 7 will be described with reference to, for example, FIG. 144. FIG. 144 illustrates another example of the positions of the connectors of package transport device 10*p* according to Variation 2 of Embodiment 13 being displaced. In the operation example, content similar to Operation Example 2 is denoted with the same reference signs, and repeated description will be omitted as appropriate.

This operation example pertains to an operation of moving roller 2327*m* from vertically above rail 7 to vertically below rail 7. This example assumes that the connectors according to this operation example are connected to the right sides of first vehicle main body 2301*a* and second vehicle main body 2301*b* in a case in which rail support portions are provided on the left side of rail 7 in a view of rail 7 in the traveling direction. The connectors in this operation example are first connector 2321, second hook 2323*b* of third connector 2323, and fifth connector 2325, or fourth connector 2324, first hook 2323*a* of third connector 2323, and second connector 2322.

As illustrated in (a) in FIG. 144, when package transport device 10*p* is traveling along rail 7 in a typical fashion, the height from the top end of slide motor 2353 to the leading end of roller support portion is 2361 approximately 25.0 cm, the height from the top end of slide motor 2353 to the center of rail 7 is approximately 20.0 cm, the height from the axis of the axle support to the leading end of roller support portion 2361 is approximately 5.0 cm, and the height of first spring 2351 is approximately 5.0 cm. The load placed on first spring 2351 by the package carried by package transport device 10*p* is 5 to 30 kg. In such cases, the amount of unevenness that can be absorbed by hump 7*y* during travel is approximately 5 cm, and the load capacity is approximately 10 kg.

In FIG. 144, (b) illustrates a case in which the connector is separated from rail 7. In this case, control processor 2318 controls slide motor 2353 to move slide main body portion 2362 vertically upward to thereby also move roller support portion 2361 vertically upward. This separates roller 2327*m* of roller support portion 2361 from rail 7 in a vertically upward direction. Here, the height from the top end of slide motor 2353 to the leading end of roller support portion 2361 is approximately 30.0 cm.

In FIG. 144, (c) illustrates a case in which the connector is rotated clockwise. In this case, control processor 2318 controls motor 2355 to rotate slide main body portion 2362 clockwise and thereby also rotate roller support portion 2361 clockwise. Roller 2327*m* of roller support portion 2361 is detached from vertically above rail 7 so as not to be present vertically above rail 7. Motor 2355 rotates slide main body portion 2362 approximately 10° clockwise.

In FIG. 144, (d) illustrates a case in which slide main body portion 2362 of the connector is moved vertically below slide main body portion 2362. In this case, control processor 2318 controls slide motor 2353 to move slide main body portion 2362 vertically downward to thereby also move roller support portion 2361 vertically downward. This moves roller 2327*m* of roller support portion 2361 vertically lower than rail 7. Here, the height from the top end of slide motor 2353 to the leading end of roller support portion 2361 is approximately 15.0 cm.

In FIG. 144, (d) and (e) illustrate a case in which the connector is rotated counterclockwise and roller 2327*m* pushes up on rail 7 from below. In this case, control processor 2318 controls motor 2355 to rotate slide main body portion 2362 counterclockwise and thereby also rotate roller support portion 2361 counterclockwise. This moves roller 2327*m* of roller support portion 2361 to a position vertically below rail 7. Motor 2355 rotates slide main body portion 2362 approximately 10° counterclockwise.

In (e) and (f) in FIG. 144, control processor 2318 controls slide motor 2353 to move slide main body portion 2362 vertically upward to thereby also move roller support portion 2361 vertically upward. This pushes roller 2327*m* of roller support portion 2361 vertically upward from below rail 7. Roller 2327*m* is pushed against rail 7 by the elastic force of second spring 2352 between first spring support piece 2361*a* of roller support portion 2361 and third spring support piece 2361*c* of slide main body portion 2362. Here, the force of roller 2327*m* of roller support portion 2361 pushing up on rail 7 from below is approximately 1 kg to 10 kg, the length of second spring 2352 is approximately 25.0 cm, and the height from the top end of slide motor 2353 to the center of rail 7 is approximately 20.0 cm.

In FIG. 144, (g) illustrates a case in which roller 2327*m* travels over hump 7*y* below rail 7. In this case, since roller 2327*m* is pushed vertically downward by hump 7*y*, roller support portion 2361 moves vertically downward along with roller 2327*m*. Here, a significant amount of force is exerted vertically upward onto rail 7 by second spring 2352. For example, when roller 2327*m* moves approximately 10.0 cm vertically downward when traveling over hump 7*y* below rail 7, the distance from the top end of slide motor 2353 to the center of rail 7 is approximately 10.0 cm, and the length of second spring 2352 is approximately 15.0 cm.

In this way, when riding up onto hump 7*y* after traveling in a typical fashion along rail 7, second spring 2352 contracts and extends to exert a pressing force on hump 7*y*, which makes it possible to inhibit roller 2327*m* from derailing from hump 7*y*.

In this case, roller 2327*m* and the connector when package transport device 10*p* travels over hump 7*y* will be described with reference to FIG. 145. FIG. 145 illustrates a detailed example of what happens to the connectors when package transport device 10*p* according to Variation 2 of Embodiment 13 travels over hump 7*y*. Although FIG. 145 uses fourth connector 2324 and first connector 2321 as examples, the same applies to second connector 2322, third connector 2323, and fifth connector 2325, so repeated description will be omitted.

As illustrated in (A) and (B) in FIG. 145, fourth connector 2324 and first connector 2321 clamp rail 7 via rollers 2327*m* of fourth connector 2324 and first connector 2321. Here, by fourth connector 2324 hanging from the top of rail 7 and first connector 2321 pushing up on rail 7 from below, the recess of roller 2327*m* of fourth connector 2324 and the recess of roller 2327*m* of first connector 2321 clamp rail 7. In other words, since the recess of roller 2327*m* of fourth connector 2324 and the recess of roller 2327*m* of first connector 2321 clamp rail 7, rollers 2327*m* of fourth connector 2324 and first connector 2321 are inhibited from disengaging from rail 7.

As illustrated in (C) and (D) in FIG. 145, since roller 2327*m* of fourth connector 2324 rides up on hump 7*y* above rail 7, and roller 2327*m* of first connector 2321 rides up on hump 7*y* below rail 7, fourth connector 2324 and first connector 2321 maintain a state in which rollers 2327*m* of fourth connector 2324 and first connector 2321 are clamping hump 7*y* above rail 7 and hump 7*y* below rail 7. In other words, since the recess of roller 2327*m* of fourth connector 2324 and the recess of roller 2327*m* of first connector 2321 clamp rail 7, rollers 2327*m* of fourth connector 2324 and first connector 2321 are inhibited from disengaging from rail 7.

Variation 3 of Embodiment 13

FIG. 146 illustrates an example of the turntable of the package transport device according to Variation 3 of Embodiment 13.

Hereinafter, as illustrated in FIG. 146, since the basic configuration of package transport device 10*p* according to the present variation is the same as the basic configuration of the unmanned aerial vehicle of Embodiment 1 and the same as the basic configuration of package transport device 10*p* according to Embodiment 13 and the like, regarding the basic configuration of package transport device 10*p* in the present variation, the same reference signs as above will be used and repeated description will be omitted where appropriate. Package transport device 10*p* according to the present variation differs from, for example, Embodiment 13 in that first hook 2323*a* and second hook 2323*b* of third connector 2323 can be pivoted independent of one another with respect to center point O of turntable 2319. The present variation may also be used with lifting systems and unmanned aerial vehicles according to embodiments other than Embodiment 1.

Turntable 2319 according to the present variation is a double turntable. Stated differently, turntable 2319 includes first table 2319*a* and second table 2319*b* smaller in diameter than first table 2319*a*. Second table 2319*b* is provided on the upper surface of first vehicle main body 2301*a* and is arranged on the lower surface of first table 2319*a*. Stated differently, second table 2319*b* is arranged so as to be sandwiched between first table 2319*a* and first vehicle main body 2301*a*. The central axes of first table 2319*a* and second table 2319*b*, which are each other's center points of rotation O, are coincident. Thus, first table 2319*a* and second table 2319*b* can rotate independently. First hook 2323*a* is coupled to the outer circumferential edge of first table 2319*a*, and second hook 2323*b* is coupled to the outer circumferential edge of second table 2319*b*.

Control processor 2318 can separately control the rotation of first table 2319*a* and the rotation of second table 2319*b* by controlling a drive mechanism. For example, control processor 2318 can displace the position of first hook 2323*a* by controlling the drive mechanism to rotate only first table 2319*a* clockwise or counterclockwise, thereby eccentering only first hook 2323*a* clockwise or counterclockwise with respect to the center point O of first table 2319*a*. FIG. 146 illustrates an example of how only first table 2319*a* is rotated 90° counterclockwise. Control processor 2318 can cause only second hook 2323*b* to be eccentric clockwise or counterclockwise with respect to center point O of second table 2319*b* by controlling the drive mechanism to rotate only second table 2319*b* clockwise or counterclockwise. Control processor 2318 can also cause first hook 2323*a* and second hook 2323*b* to be eccentric clockwise or counterclockwise with respect to center point O of turntable 2319 by simultaneously rotating first table 2319*a* and second table 2319*b* clockwise or counterclockwise by controlling the drive mechanism.

Operation Example 1

Next, an example will be given with reference to FIG. 147 of package transport device 10*p* making a left turn when first rail 7*a* and second rail 7*b* are connected and fixed to support pillar 19. FIG. 147 illustrates an example of an operation carried out when the package transport device according to Variation 3 of Embodiment 13 turns left.

In this operation example, first rail 7*a* and second rail 7*b* are directly fixed to support pillar 19. In FIG. 147, package transport device 10*p* bypasses support pillar 19. This operation example also includes third rail 7*c*1 that connects first rail 7*a* and second rail 7*b*, as illustrated in (a) and (b) in FIG. 147. In the operation example, content similar to other operation examples are denoted with the same reference signs, and repeated description will be omitted as appropriate.

First rail 7*a* extends in the traveling direction of package transport device 10*p* to support pillar 19, and second rail 7*b* extends from support pillar 19 to the left in the figure, approximately orthogonal to the lengthwise direction of first rail 7*a*. Third rail 7*c*1 is connected to and supported by first rail 7*a* and second rail 7*b* so as to intersect first rail 7*a* and second rail 7*b*.

In the operation example, package transport device 10*p* can turn left by switching (switching connections) from first rail 7*a* to third rail 7*c*1 and then further switching to second rail 7*b* to the left of support pillar 19 (left side of the figure).

This operation example illustrates a case in which the coupling portions that couple turntable 2319 to first hook 2323*a* and second hook 2323*b* of third connector 2323 are arranged alternately so as to have point symmetry with respect to the center point of turntable 2319.

As illustrated in (c) in FIG. 147, control processor 2318 causes the open fourth connector 2324, the open first connector 2321, and the open first and second hooks 2323*a* and 2323*b* of third connector 2323 to pass vertically below coupler 7*e*, and controls a motor to close and connect fourth connector 2324 to first rail 7*a*. Control processor 2318 controls the drive mechanism to rotate first table 2319*a* and place only the open first hook 2323*a* of third connector 2323 vertically below third rail 7*c*1. Control processor 2318 controls the motor to close first hook 2323*a* and second hook 2323*b* of third connector 2323. This connects first hook 2323*a* of third connector 2323 to third rail 7*c*1 and second hook 2323*b* of third connector 2323 to first rail 7*a*.

As illustrated in (d) in FIG. 147, control processor 2318 pivots second connector 2322 to open second connector 2322. Second connector 2322 is disconnected from first rail 7*a* and is disposed vertically below first rail 7*a* so that second connector 2322 does not contact first rail 7*a*.

As illustrated in (e) in FIG. 147, control processor 2318 controls a motor to rotate first vehicle main body 2301*a* with respect to second vehicle main body 2301*b* so as to cause the lengthwise direction of first vehicle main body 2301*a* to be parallel to the lengthwise direction of third rail 7*c*1. With this, the lengthwise direction of first vehicle main body 2301*a* intersects the lengthwise direction of second vehicle main body 2301*b*. In the present embodiment, control processor 2318 rotates first vehicle main body 2301*a* counterclockwise so as to cause the lengthwise direction of first vehicle main body 2301*a* to be approximately parallel to the lengthwise direction of third rail 7*c*1.

As illustrated in (f) in FIG. 147, control processor 2318 pivots first connector 2321 to close first connector 2321. This connects first connector 2321 to third rail 7*c*1.

As illustrated in (f) and (g) in FIG. 147, control processor 2318 controls a motor to rotate second vehicle main body 2301*b* with respect to first vehicle main body 2301*a* so as to cause the lengthwise direction of second vehicle main body 2301*b* to be parallel to the lengthwise direction of third rail 7*c*1. With this, the lengthwise direction of second vehicle main body 2301*b* is approximately parallel to the lengthwise direction of first vehicle main body 2301*a*. In the present embodiment, control processor 2318 rotates second vehicle main body 2301*b* counterclockwise so as to cause the lengthwise direction of second vehicle main body 2301*b* to be approximately parallel to the lengthwise direction of third rail 7*c*1.

Control processor 2318 pivots fourth connector 2324 to close fourth connector 2324. This connects fourth connector 2324 to third rail 7*c*1.

As illustrated in (h) in FIG. 147, control processor 2318 also pivots second hook 2323*b* of third connector 2323 to open second hook 2323*b* of third connector 2323. The connection of second hook 2323*b* of third connector 2323 to first rail 7*a* is released, and second hook 2323*b* of third connector 2323 is disposed vertically below first rail 7*a* so that second hook 2323*b* of third connector 2323 and first rail 7*a* do not come into contact. Control processor 2318 controls the drive mechanism to rotate second table 2319*b* such that the opening of second hook 2323*b* of third connector 2323 is approximately parallel to the plane of the opening of first hook 2323*a*.

Control processor 2318 then rotates side propeller 22*a*1 by controlling the rear third propeller actuation motor 22*a*3. With this, package transport device 10*p* moves forward and second hook 2323*b* of third connector 2323 passes vertically below coupler 7*e*.

As illustrated in (i) in FIG. 147, after second hook 2323*b* of third connector 2323 passes vertically below coupler 7*e*, control processor 2318 also pivots second hook 2323*b* of third connector 2323 to close second hook 2323*b* of third connector 2323. This connects second hook 2323*b* of third connector 2323 to third rail 7*c*1. After second connector 2322 and fifth connector 2325 pass vertically below coupler 7*e*, control processor 2318 pivots second connector 2322 and fifth connector 2325 to close second connector 2322 and fifth connector 2325. This connects second connector 2322 and fifth connector 2325 to third rail 7*c*1. With this, package transport device 10*p* travels forward along third rail 7*c*1.

Operation Example 2

Next, an example will be given with reference to FIG. 148 of package transport device 10*p* making a left turn when first rail 7*a* and second rail 7*b* are connected and fixed to support pillar 19. FIG. 148 illustrates another example of an operation carried out when the package transport device according to Variation 3 of Embodiment 13 turns left. In the operation example, content similar to other operation examples are denoted with the same reference signs, and repeated description will be omitted as appropriate.

This operation example differs from Operation Example 1 in that the coupling portions that couple turntable 2319 to first hook 2323*a* and second hook 2323*b* of third connector 2323 are adjacent and arranged on the same directional side with respect to the center point of turntable 2319. Since other points in this operation example are the same as in Operation Example 1, repeated description thereof will be omitted where necessary.

As illustrated in (a) through (d) in FIG. 148, control processor 2318 causes the open fourth connector 2324, the open first connector 2321, and the open first and second hooks 2323*a* and 2323*b* of third connector 2323 to pass vertically below coupler 7*e*, and controls a motor to close and connect fourth connector 2324 to first rail 7*a*. Control processor 2318 controls the motor to close first hook 2323*a* of third connector 2323. This connects first hook 2323*a* of third connector 2323 to third rail 7*c*1. Control processor 2318 controls the drive mechanism to rotate first table 2319*a* and close the open second hook 2323*b* of third connector 2323. This connects second hook 2323*b* of third connector 2323 to first rail 7*a*.

In FIG. 148, (e) through (j) are the same as (d) through (i) in FIG. 147. Package transport device 10*p* travels forward along third rail 7*c*1 by transferring from first rail 7*a* to third rail 7*c*1.

Operation Example 3

Next, an example will be given with reference to FIG. 149 of package transport device 10*p* making a right turn when first rail 7*a* and second rail 7*b* are connected and fixed to support pillar 19. FIG. 149 illustrates an example of an operation carried out when package transport device 10*p* according to Variation 3 of Embodiment 13 turns right.

This operation example also includes third rail 7*c*2 that connects first rail 7*a* and second rail 7*b*.

First rail 7*a* extends in the traveling direction of package transport device 10*p* to support pillar 19, and second rail 7*b* extends from support pillar 19 to the right in the figure, approximately orthogonal to the lengthwise direction of first rail 7*a*. Third rail 7*c*1 is connected to and supported by first rail 7*a* and second rail 7*b* so as to intersect first rail 7*a* and second rail 7*b*.

In the operation example, package transport device 10*p* can turn right by switching (switching connections) from first rail 7*a* to third rail 7*c*2 and then further switching to second rail 7*b* to the right of support pillar 19 (right side of the figure).

In this operation example, the coupling portions that couple turntable 2319 to first hook 2323*a* and second hook 2323*b* of third connector 2323 are adjacent and arranged on the same directional side with respect to the center point of turntable 2319.

Since this operation example is similar to Operation Example 1, repeated description of the same content will be omitted as appropriate. In the operation example, content similar to other operation examples are denoted with the same reference signs, and repeated description will be omitted as appropriate. The coupling portions are the white-painted portions.

As illustrated in (a) in FIG. 149, control processor 2318 causes the open fourth connector 2324, the open first connector 2321, and the open first and second hooks 2323*a* and 2323*b* of third connector 2323 to pass vertically below coupler 7*e*, and controls a motor to close and connect fourth connector 2324 to first rail 7*a*. Control processor 2318 controls the drive mechanism to rotate first table 2319*a* and place only the open first hook 2323*a* of third connector 2323 vertically below third rail 7*c*2. Control processor 2318 controls the motor to close first hook 2323*a* and second hook 2323*b* of third connector 2323. This connects first hook 2323*a* of third connector 2323 to third rail 7*c*2 and second hook 2323*b* of third connector 2323 to first rail 7*a*.

As illustrated in (b) in FIG. 149, control processor 2318 pivots fourth connector 2324 and fifth connector 2325 to open fourth connector 2324 and fifth connector 2325. This releases the connection of fourth connector 2324 and fifth connector 2325 from first rail 7*a*, whereby fourth connector 2324 and fifth connector 2325 are disposed vertically below first rail 7*a* so as not to contact first rail 7*a*.

As illustrated in (b) and (c) in FIG. 149, control processor 2318 controls a motor to rotate second vehicle main body 2301*b* with respect to first vehicle main body 2301*a* so as to cause the lengthwise direction of second vehicle main body 2301*b* to be parallel to the lengthwise direction of third rail 7*c*2. With this, the lengthwise direction of second vehicle main body 2301*b* intersects the lengthwise direction of first vehicle main body 2301*a*. In the present embodiment, control processor 2318 rotates second vehicle main body 2301*b* clockwise so as to cause the lengthwise direction of second vehicle main body 2301*b* to be approximately parallel to the lengthwise direction of third rail 7*c*2. Note that package transport device 10*p* is stable because first vehicle main body 2301*a* and second vehicle main body 2301*b* do not tilt easily when turning right. The same also applies when turning left.

As illustrated in (c) in FIG. 149, control processor 2318 pivots fourth connector 2324 to close fourth connector 2324. This connects fourth connector 2324 to third rail 7*c*2.

As illustrated in (d) and (e) in FIG. 149, control processor 2318 controls a motor to rotate first vehicle main body 2301*a* with respect to second vehicle main body 2301*b* so as to cause the lengthwise direction of first vehicle main body 2301*a* to be parallel to the lengthwise direction of third rail 7*c*2. With this, the lengthwise direction of first vehicle main body 2301*a* is approximately parallel to the lengthwise direction of second vehicle main body 2301*b*. In the present embodiment, control processor 2318 rotates first vehicle main body 2301*a* clockwise so as to cause the lengthwise direction of first vehicle main body 2301*a* to be approximately parallel to the lengthwise direction of third rail 7*c*2.

Control processor 2318 pivots first connector 2321 to close first connector 2321. This connects first connector 2321 to third rail 7*c*2.

As illustrated in (f) and (g) in FIG. 149, control processor 2318 also pivots second hook 2323*b* of third connector 2323 to open second hook 2323*b* of third connector 2323. The connection of second hook 2323*b* of third connector 2323 to first rail 7*a* is released, and second hook 2323*b* of third connector 2323 is disposed vertically below first rail 7*a* so that second hook 2323*b* of third connector 2323 and first rail 7*a* do not come into contact. Control processor 2318 controls the drive mechanism to rotate second table 2319*b* such that the opening of second hook 2323*b* of third connector 2323 is approximately parallel to the plane of the opening of first hook 2323*a*.

Control processor 2318 then rotates side propeller 22*a*1 by controlling the rear third propeller actuation motor 22*a*3. With this, package transport device 10*p* moves forward and second hook 2323*b* of third connector 2323 passes vertically below coupler 7*e*.

As illustrated in (g) in FIG. 149, after second hook 2323*b* of third connector 2323 passes vertically below coupler 7*e*, control processor 2318 also pivots second hook 2323*b* of third connector 2323 to close second hook 2323*b* of third connector 2323. This connects second hook 2323*b* of third connector 2323 to third rail 7*c*2. After second connector 2322 and fifth connector 2325 pass vertically below coupler 7*e*, control processor 2318 pivots second connector 2322 and fifth connector 2325 to close second connector 2322 and fifth connector 2325. This connects second connector 2322 and fifth connector 2325 to third rail 7*c*2. With this, package transport device 10*p* travels forward along third rail 7*c*2.

Operation Example 4

Next, an example will be given with reference to FIG. 150 of package transport device 10*p* making a right turn when first rail 7*a* and second rail 7*b* are connected and fixed to support pillar 19. This operation example differs from Operation Example 3 in that the coupling portions that couple turntable 2319 to first hook 2323*a* and second hook 2323*b* of third connector 2323 are arranged alternately so as to have point symmetry with respect to the center point of turntable 2319. In the operation example, content similar to Operation Example 3 is denoted with the same reference signs, and repeated description will be omitted as appropriate.

As illustrated in (a) in FIG. 150, control processor 2318 causes the open fourth connector 2324, the open first connector 2321, and the open first hook 2323*a* of third connector 2323 to pass vertically below coupler 7*e*, and controls a motor to close and connect fourth connector 2324, first connector 2321, and first hook 2323*a* of third connector 2323 to first rail 7*a*.

As illustrated in (b) and (c) in FIG. 150, control processor 2318 pivots fourth connector 2324 and fifth connector 2325 to open fourth connector 2324, fifth connector 2325, and first hook 2323*a* and second hook 2323*b* of third connector 2323. The connections of fourth connector 2324, fifth connector 2325, and first hook 2323*a* and second hook 2323*b* of third connector 2323 to first rail 7*a* are released, and fourth connector 2324, fifth connector 2325, and first hook 2323*a* and second hook 2323*b* of third connector 2323 are disposed vertically below first rail 7*a* so that fourth connector 2324, fifth connector 2325, and first hook 2323*a* and second hook 2323*b* of third connector 2323 do not come into contact with first rail 7*a*.

As illustrated in (c) and (c1) in FIG. 150, control processor 2318 controls a motor to rotate second vehicle main body 2301*b* with respect to first vehicle main body 2301*a* so as to cause the lengthwise direction of second vehicle main body 2301*b* to be parallel to the lengthwise direction of third rail 7*c*2. With this, the lengthwise direction of second vehicle main body 2301*b* intersects the lengthwise direction of first vehicle main body 2301*a*. In the present embodiment, control processor 2318 rotates second vehicle main body 2301*b* clockwise so as to cause the lengthwise direction of second vehicle main body 2301*b* to be approximately parallel to the lengthwise direction of third rail 7*c*2.

Control processor 2318 pivots fourth connector 2324 to close fourth connector 2324. This connects fourth connector 2324 to third rail 7*c*2.

As illustrated in (c), (c1), (d), and (d1) in FIG. 150, control processor 2318 controls rear third propeller actuation motor 22*a*3 to slightly rotate side propeller 22*a*1. With this, package transport device 10*p* moves forward slightly along third rail 7*c*2 and second hook 2323*b* of third connector 2323 passes vertically below coupler 7*e*. Control processor 2318 controls the drive mechanism to rotate second table 2319*b* and place only the open second hook 2323*b* of third connector 2323 vertically below third rail 7*c*2.

As illustrated in (e), (e1), (f), and (f1) in FIG. 150, control processor 2318 also pivots second hook 2323*b* of third connector 2323 to close second hook 2323*b* of third connector 2323. This connects second hook 2323*b* of third connector 2323 to third rail 7*c*2. Accordingly, by second hook 2323*b* of third connector 2323 hooking onto third rail 7*c*2, package transport device 10*p* is pulled to the third rail 7*c*2. Control processor 2318 also pivots first hook 2323*a* of third connector 2323 to open first hook 2323*a* of third connector 2323. The connection of first hook 2323*a* of third connector 2323 to first rail 7*a* is released, and first hook 2323*a* of third connector 2323 is disposed vertically below first rail 7*a* so that first hook 2323*a* of third connector 2323 and first rail 7*a* do not come into contact.

As illustrated in (g) in FIG. 150, control processor 2318 pivots first connector 2321 and second connector 2322 to open first connector 2321 and second connector 2322. This releases the connection of first connector 2321 and second connector 2322 from first rail 7*a*, whereby first connector 2321 and second connector 2322 are disposed vertically below first rail 7*a* so as not to contact first rail 7*a*.

As illustrated in (g) and (h) in FIG. 150, control processor 2318 controls a motor to rotate first vehicle main body 2301*a* with respect to second vehicle main body 2301*b* so as to cause the lengthwise direction of first vehicle main body 2301*a* to be approximately parallel to the lengthwise direction of third rail 7*c*2. With this, the lengthwise direction of first vehicle main body 2301*a* is approximately parallel to the lengthwise direction of second vehicle main body 2301*b*. In the present embodiment, control processor 2318 rotates first vehicle main body 2301*a* clockwise so as to cause the lengthwise direction of first vehicle main body 2301*a* to be approximately parallel to the lengthwise direction of third rail 7*c*2. Control processor 2318 controls the drive mechanism to rotate first table 2319*a* such that the opening of first hook 2323*a* of third connector 2323 is approximately parallel to the plane of the opening of second hook 2323*b*, so as to place only the open first hook 2323*a* of third connector 2323 vertically below third rail 7*c*2. Control processor 2318 controls the motor to close first hook 2323*a* of third connector 2323. This connects first hook 2323*a* of third connector 2323 to third rail 7*c*2.

As illustrated in (i) in FIG. 150, after second connector 2322 and fifth connector 2325 pass vertically below coupler 7*e*, control processor 2318 pivots second connector 2322 and fifth connector 2325 to close second connector 2322 and fifth connector 2325. This connects second connector 2322 and fifth connector 2325 to third rail 7*c*2. With this, package transport device 10*p* travels forward along third rail 7*c*2.

Operation Example 5

Next, an example will be given with reference to FIG. 151 of package transport device 10*p* making a right turn when first rail 7*a* and second rail 7*b* are connected and fixed to support pillar 19. FIG. 151 illustrates an example of another operation carried out when package transport device 10*p* according to Variation 3 of Embodiment 13 turns right.

Just as in Operation Example 3, in this operation example as well, the coupling portions that couple turntable 2319 to first hook 2323*a* and second hook 2323*b* of third connector 2323 are adjacent and arranged on the same directional side with respect to the center point of turntable 2319. Since this operation example is similar to Operation Example 3, repeated description of the same content will be omitted as appropriate.

As illustrated in (a) in FIG. 151, control processor 2318 causes the open fourth connector 2324, the open first connector 2321, and the open first hook 2323*a* of third connector 2323 to pass vertically below coupler 7*e*, and controls a motor to close and connect fourth connector 2324 and first connector 2321 to first rail 7*a*. Control processor 2318 controls the drive mechanism to rotate first table 2319*a* and place only the open first hook 2323*a* of third connector 2323 vertically below third rail 7*c*2. Control processor 2318 controls the motor to close first hook 2323*a* and second hook 2323*b* of third connector 2323. This connects first hook 2323*a* of third connector 2323 to third rail 7*c*2 and second hook 2323*b* of third connector 2323 to first rail 7*a*.

In FIG. 151, (b), (c), (d), (e), (f), and (g) are the same as (b), (c), (d), (e), (f), and (g) in FIG. 149. Package transport device 10*p* travels forward along third rail 7*c*2 by transferring from first rail 7*a* to third rail 7*c*2.

Embodiment 14

FIG. 152A illustrates an example of package transport device 10*q* and delivery box 2408 according to Embodiment 14. FIG. 152B is a block diagram illustrating an example of delivery box 2408 according to Embodiment 14.

Hereinafter, as illustrated in FIG. 152A and FIG. 152B, the basic configuration of package transport device 10*q* according to the present embodiment is the same as the basic configuration of the package transport device according to Embodiment 12, etc. Delivery box 2408 according to the present embodiment differs from, for example, Embodiment 13 in that it can move a plurality of packages in the vertical direction, but the basic configuration of delivery box 2408 is the same as the basic configuration of the delivery box according to Embodiment 1, etc. Accordingly, regarding the basic configurations of package transport device 10*q* and delivery box 2408 according to the present embodiment, the same reference signs as above are used, and repeated description will be omitted where appropriate. The present embodiment may also be used with lifting systems, unmanned aerial vehicles, and delivery boxes according to embodiments other than Embodiment 1, instead of package transport device 10*q* and delivery box 2408.

Delivery box 2408 includes container 2411, retrieval lid 2412, a plurality of base plates 2413, a plurality of placement pieces 2414, pivot axle 2415, first guide portion 2421, second guide portion 2422, third guide portion 2423, sensor 2431, actuator 2432, actuation controller 2433, and communicator 2434.

Container 2411 has a rectangular or cylindrical shape. Container 2411 defines a space for storing a package. The space is divided by each of the plurality of base plates 2413 arranged inside container 2411. More specifically, the space is divided by the plurality of base plates 2413 such that a package can be placed between two adjacent base plates 2413. Accordingly, a plurality of levels (chambers) are formed in container 2411 by the plurality of base plates 2413.

Container 2411 is an enclosure for storing a package. Container 2411 is exemplified as rectangular in shape, but may be of any shape as long as it can store a package. Top opening 2411*a* through which packages pass is formed in the top portion on the vertical top of container 2411. Side opening 2412*a* that is coverable by closing retrieval lid 2412 is formed in the side portion of container 2411. Side opening 2412*a* according to the present embodiment is formed on the lowest of the levels formed in container 2411. Top opening 2411*a* and side opening 2412*a* are in communication with the space of container 2411.

Retrieval lid 2412 is provided on the side portion of container 2411 and can open and close side opening 2412*a* for retrieving a package in the space through side opening 2412*a*. When closed, retrieval lid 2412 covers side opening 2412*a*, and when open, retrieval lid 2412 exposes side opening 2412*a*. Retrieval lid 2412 is held by container 2411 so as to be pivotable around a predetermined axis.

The plurality of base plates 2413 are housed inside container 2411, and are arranged in a vertical line in the space in container 2411. Since the plurality of base plates 2413 divide the inside of container 2411 into a plurality of spaces, a plurality of packages can be housed separately in delivery box 2408. In the present embodiment, delivery box 2408 is exemplified as including three base plates 2413. However, delivery box 2408 may include two or fewer or four or more base plates 2413.

Since each base plate 2413 is arranged on a plurality of placement pieces 2414 formed inside container 2411, each base plate 2413 is arranged approximately parallel to the horizontal direction. Since arranging each base plate 2413 on a plurality of placement pieces 2414 makes it possible to divide the space, packages can be stored separately.

Each base plate 2413 can be rotated to displace into an orientation that is approximately parallel to the vertical direction or approximately parallel to the horizontal direction.

Note that each base plate 2413 may be configured of a single plate or a plurality of plates and hinges so as to be foldable.

For example, when a package is placed on the first-level base plate 2413, which is the most vertically upward positioned base plate 2413 among the plurality of base plates 2413, the lowest-level base plate 2413, which is the most vertically downward positioned base plate 2413 among the plurality of base plates 2413, slides upward on first guide portion 2421 so as to be the most vertically upward positioned base plate 2413, and all base plates 2413 except that lowest-level base plate 2413 move vertically downward. More specifically, when a package is placed on the first-level base plate 2413, the lowest-level base plate 2413 pivots around the axis of pivot axle 2415 into an orientation that is approximately parallel to the vertical direction. Then, the lowest-level base plate 2413 slides vertically upward, and all base plates 2413 except the lowest-level base plate 2413 are vertically lowered in an orientation that is approximately parallel to the horizontal direction. In other words, when a package is placed on the first-level base plate 2413, the second- and subsequent-level base plates 2413 excluding the lowest-level base plate 2413 move down one level each. With this, the lowest-level base plate 2413 moves so as to be the most vertically upward positioned base plate 2413 among the plurality of base plates 2413.

Pivot axle 2415 is formed in the lengthwise central region of base plate 2413. Note that pivot axle 2415 may be formed at one or both lengthwise ends of base plate 2413. Pivot axle 2415 is rotated by actuation controller 2433 to displace base plate 2413 into an orientation that is approximately parallel to the vertical direction or approximately parallel to the horizontal direction.

The plurality of placement pieces 2414 are provided inside container 2411, and are protrusions that can hold base plate 2413 in an orientation that is approximately parallel to the horizontal direction. Four placement pieces 2414 are provided per level. Stated differently, four placement pieces 2414 can hold one base plate 2413 in an orientation that is approximately parallel to the horizontal direction. In other words, by placing one base plate 2413 on four placement pieces 2414, the space can be divided into a plurality of subspaces so that a plurality of packages can be stored.

Moreover, the plurality of placement pieces 2414 can move in the vertical direction like a lift in one level, or every four placement pieces 2414. Note that three or less or five or more placement pieces 2414 may be provided per level.

First guide portion 2421 is an elongated guide formed along the vertical direction inside container 2411. First guide portion 2421 vertically guides base plate 2413 that has been displaced into an orientation that is approximately parallel to the vertical direction.

Second guide portion 2422 is an elongated guide formed along the horizontal direction inside the container 2411. Second guide portion 2422 can guide base plate 2413 that has been displaced into an orientation that is approximately parallel to the vertical direction so as to move horizontally. Second guide portion 2422 is formed at a position corresponding to side opening 2412*a* of container 2411. More specifically, second guide portion 2422 is disposed inside container 2411 so that it is level with the vertical lower edge of side opening 2412*a*. Note that a plurality of second guide portions 2422 may be formed in accordance with the number of packages that can be placed, i.e., the number of base plates 2413.

Third guide portion 2423 is an elongated guide formed along the horizontal direction inside the container 2411. Third guide portion 2423 is a guide for inserting the lowest-level base plate 2413 when the lowest-level base plate 2413 is moved vertically upward. In other words, third guide portion 2423 is an insertion level that inserts base plate 2413 where the lowest level was.

Third guide portion 2423 is arranged vertically above second guide portion 2422 in container 2411. Stated differently, the insertion level is the highest level, and is located vertically higher than the first level.

Sensor 2431 can detect that a package has been placed on the first-level base plate 2413. Sensor 2431 is, for example, a gravity sensor or an image sensor. When a package is placed on the first-level base plate 2413, sensor 2431 transmits, to actuation controller 2433, placement information, which is information indicating that a package has been placed.

Actuation controller 2433 controls actuator 2432 to change the orientation of base plates 2413 or move base plates 2413. More specifically, actuation controller 2433 controls actuator 2432 to pivot base plates 2413 around their respective pivot axles 2415. When base plate 2413 is oriented approximately parallel to the vertical direction, actuation controller 2433 controls actuator 2432 to slide base plate 2413 along second guide portion 2422 and first guide portion 2421. This moves base plate 2413 that was on the lowest level to the highest level.

Actuator 2432 is an actuator including a hoist, pulley, belt, etc. Actuator 2432 can move the plurality of placement pieces 2414 by moving and pivoting the plurality of base plates 2413.

Note that when a package is on the lowest-level base plate 2413, actuation controller 2433 may be configured to not pivot the lowest-level base plate 2413 even when a package is placed on the first-level base plate 2413.

Communicator 2434 is a wireless module capable of wirelessly communicating with, for example, package transport device 10*q* and a management server. Communicator 2434 receives, for example, position information and information indicating that package transport device 10*q* has arrived from package transport device 10*q*, and other information indicating the contents, number of pieces, time, etc., of the packages to arrive, from the management server. Communicator 2434 also transmits information indicating that a package has been stored to package transport device 10*q*, management server, etc.

In this way, each time a package is placed on the first-level base plate 2413, each of the plurality of base plates 2413 excluding the first-level base plate 2413 is moved down one level, and the lowest-level base plate 2413 is pivoted and moved to the first level. Accordingly, delivery box 2408 can lower and raise base plates 2413 like a lift.

Note that delivery box 2408 may include a top lid. The top lid may be provided on the top portion of container 2411 and may be capable of closing and opening top opening 2411*a* for inserting a package into delivery box 2408. The top lid covers top opening 2411*a* when closed and opens top opening 2411*a* when opened. The top lid may be held so as to be pivotable around a predetermined axis relative to container 2411.

Note that retrieval lid 2412 and the top lid open outward relative to container 2411, but may open inward into delivery box 2408. Retrieval lid 2412 and the top lid are not limited to a single-swing opening mechanism, and may employ a dual-swing opening mechanism.

With this, a package can be placed into the space of delivery box 2408 from above delivery box 2408, and a package stored in the space can be removed from the side of delivery box 2408. Accordingly, a package can be easily removed.

Operation Example 1

FIG. 152C illustrates an example of how delivery box 2408 according to Operation Example 1 of Embodiment 14 moves when viewed from the side. FIG. 152D illustrates an example of how delivery box 2408 according to Operation Example 1 of Embodiment 14 moves when viewed from the front.

This operation example pertains to an operation in a case in which delivery box 2408 includes three base plates 2413, namely first base plate 2413*a*, second base plate 2413*b*, and third base plate 2413*c*. In (a) in FIG. 152C and (a) in FIG. 152D in this operation example, first package K1 is on first base plate 2413*a*. The operation example also includes a first level, a second level after the first level, and a third level after the second level, from up to down in the vertical direction. In delivery box 2408 according to the present operation example, second guide portion 2422 is formed at a position corresponding to the third level.

First, package transport device 10*q* stops at a location vertically above delivery box 2408 so as to arrange first package K1 vertically above top opening 2411*a* of delivery box 2408. Next, package transport device 10*q* starts reeling out wire 51, and lowers first thruster device 110 of package transport device 10*q* and first package K1. Here, package transport device 10*q* corrects the position of first thruster device 110 while lowering it so that it is positioned at top opening 2411*a* of delivery box 2408.

Once first package K1 has been placed on the first-level first base plate 2413*a* of delivery box 2408, first thruster device 110 stores first package K1 in delivery box 2408. Sensor 2431 then detects first package K1 placed on the first-level first base plate 2413*a* and thus transmits placement information to actuation controller 2433.

Upon obtaining placement information, actuation controller 2433 controls actuator 2432 so as to move base plate 2413. More specifically, actuation controller 2433 controls actuator 2432 to pivot the third-level third base plate 2413*c* and displace third base plate 2413*c* into an orientation that is approximately parallel to the vertical direction. Next, actuation controller 2433 controls actuator 2432 to move the displaced third base plate 2413*c* to first guide portion 2421 by sliding it along second guide portion 2422 located on the third level. Next, actuation controller 2433 controls actuator 2432 to vertically upwardly slide, along first guide portion 2421, third base plate 2413*c* that was moved to first guide portion 2421. Next, actuation controller 2433 controls actuator 2432 to slide third base plate 2413*c* to a position that corresponds to the insertion level, and then holds third base plate 2413*c* for a predetermined period. Next, actuation controller 2433 controls actuator 2432 to lower first base plate 2413*a* and second base plate 2413*b*. Once the predetermined period, which is the amount of time required for first base plate 2413*a* and second base plate 2413*b* to be lowered, elapses, actuation controller 2433 ends the holding of third base plate 2413*c*, and controls actuator 2432 to slide third base plate 2413*c* along third guide portion 2423, which is the insertion level. Here, actuation controller 2433 controls actuator 2432 to slide third base plate 2413*c* on third guide portion 2423 up to the horizontal central portion of the side portion of container 2411, i.e., the central portion in the widthwise direction of the side portion. Actuation controller 2433 then controls actuator 2432 to pivot the third-level third base plate 2413*c* and displace third base plate 2413*c* into an orientation that is approximately parallel to the horizontal direction. With this, delivery box 2408 is in the state illustrated in (a) in FIG. 152C and (a) in FIG. 152D.

In this way, by actuation controller 2433 controlling actuator 2432, each time a package is placed on the first-level base plate 2413, the third-level base plate 2413 is moved to the first level.

As illustrated in (a) in FIG. 152C and (a) in FIG. 152D, package transport device 10*q* stops at a location vertically above delivery box 2408 so as to arrange second package K2 vertically above top opening 2411*a* of delivery box 2408.

Next, package transport device 10*q* starts reeling out wire 51, and lowers first thruster device 110 of package transport device 10*q* and second package K2. Once second package K2 has been placed on the first-level third base plate 2413*c* of delivery box 2408, first thruster device 110 disconnects second package K2.

Next, as illustrated in (b) in FIG. 152C and (b) in FIG. 152D, second package K2 is placed on the first-level third base plate 2413*c* of delivery box 2408. Stated differently, second package K2 is stored in delivery box 2408. Sensor 2431 then detects second package K2 placed on the first-level third base plate 2413*c* and thus transmits placement information to actuation controller 2433.

Actuation controller 2433 obtains placement information from sensor 2431, and controls actuator 2432 to pivot the third-level second base plate 2413*b* and displace second base plate 2413*b* into an orientation that is approximately parallel to the vertical direction. The third level is an extraction level at which base plate 2413 can be extracted.

Next, as illustrated in (c) in FIG. 152C, actuation controller 2433 controls actuator 2432 to move the displaced second base plate 2413*b* to first guide portion 2421 by sliding it along second guide portion 2422 located on the third level.

Next, as illustrated in (d) in FIG. 152C, actuation controller 2433 controls actuator 2432 to vertically upwardly slide, along first guide portion 2421, second base plate 2413*b* that was moved to first guide portion 2421. The user retrieves first package K1 on first base plate 2413*a* by opening retrieval lid 2412 to uncover side opening 2412*a* of delivery box 2408.

Next, as illustrated in (e) in FIG. 152C and (c) in FIG. 152D, actuation controller 2433 controls actuator 2432 to slide second base plate 2413*b* to a position corresponding to the insertion level, and then holds second base plate 2413*b* for a predetermined period. Actuation controller 2433 then controls actuator 2432 to lower third base plate 2413*c* and first base plate 2413*a*.

Next, as illustrated in (f) in FIG. 152C and (d) in FIG. 152D, actuation controller 2433 controls actuator 2432 to lower third base plate 2413*c* from the first level to the second level and lower first base plate 2413*a* from the second level to the third level.

Once the predetermined period, which is the amount of time required for third base plate 2413*c* and first base plate 2413*a* to be lowered, elapses, actuation controller 2433 controls actuator 2432 to slide third base plate 2413*c* along third guide portion 2423, which is the insertion level, as illustrated in (g) in FIG. 152C. Here, actuation controller 2433 controls actuator 2432 to slide second base plate 2413*b* on third guide portion 2423 up to the horizontal central portion of the side portion of container 2411, i.e., the central portion in the widthwise direction of the side portion.

Next, as illustrated in (h) in FIG. 152C, actuation controller 2433 then controls actuator 2432 to pivot the third-level second base plate 2413*b* and displace second base plate 2413*b* into an orientation that is approximately parallel to the horizontal direction. With this, delivery box 2408 is in the state illustrated in (i) in FIG. 152C.

Next, second base plate 2413*b* lowers with placement pieces 2414 to a position below third guide portion 2423, so as to be arranged at the fourth level, to achieve the state illustrated in (j) in FIG. 152C.

Next, as illustrated in (j) in FIG. 152C and (e) in FIG. 152D, package transport device 10*q* stops at a location vertically above delivery box 2408 so as to arrange third package K3 vertically above top opening 2411*a* of delivery box 2408.

Next, package transport device 10*q* starts reeling out wire 51, and lowers first thruster device 110 of package transport device 10*q* and third package K3. Once third package K3 has been placed on the first-level second base plate 2413*b* of delivery box 2408, first thruster device 110 disconnects third package K3.

With this, as illustrated in (k) in FIG. 152C and (f) in FIG. 152D, third package K3 is placed on the first-level second base plate 2413*b* of delivery box 2408. Stated differently, third package K3 is stored in delivery box 2408. The operation thereafter is similar to that described above in (b) in FIG. 152C.

Operation Example 2

FIG. 152E illustrates an example of how delivery box 2408 according to Operation Example 2 of Embodiment 14 moves when viewed from the side. FIG. 152F illustrates an example of how delivery box 2408 according to Operation Example 2 of Embodiment 14 moves when viewed from the front.

This operation example pertains to an operation performed when a given package among a plurality of packages is an unnecessary package, and the unnecessary package is placed on the lowest level. FIG. 152E and FIG. 152F illustrate first package K1, which is the unnecessary package in this example, being moved to the lowest level. This operation example also includes an insertion level, a first level after the insertion level, a second level after the first level, a third level after the second level, and a fourth level after the third level, from up to down in the vertical direction. In delivery box 2408 according to the present operation example, second guide portion 2422 is formed at a position corresponding to the third level, and a fourth level for placing an unnecessary package is further provided.

In the operation example, operations similar to Operation Example 1 are denoted with the same reference signs, and repeated description will be omitted as appropriate.

As illustrated in (a) in FIG. 152E and (a) in FIG. 152F, package transport device 10*q* stops at a location vertically above delivery box 2408 so as to arrange second package K2 vertically above top opening 2411*a* of delivery box 2408.

Next, package transport device 10*q* starts reeling out wire 51, and lowers first thruster device 110 of package transport device 10*q* and second package K2. Once second package K2 has been placed on the first-level third base plate 2413*c* of delivery box 2408, first thruster device 110 disconnects second package K2.

Next, as illustrated in (b) in FIG. 152E and (b) in FIG. 152F, second package K2 is placed on the first-level third base plate 2413*c* of delivery box 2408. This causes sensor 2431 to transmit placement information to actuation controller 2433.

Actuation controller 2433 obtains placement information from sensor 2431, and controls actuator 2432 to pivot the third-level second base plate 2413*b* and displace second base plate 2413*b* into an orientation that is approximately parallel to the vertical direction.

Next, as illustrated in (c) in FIG. 152E, actuation controller 2433 controls actuator 2432 to move the displaced second base plate 2413*b* to first guide portion 2421 by sliding it along second guide portion 2422 located on the third level.

Next, as illustrated in (d) in FIG. 152E, actuation controller 2433 controls actuator 2432 to vertically upwardly slide, along first guide portion 2421, second base plate 2413*b* that was moved to first guide portion 2421.

Next, as illustrated in (e) in FIG. 152E, actuation controller 2433 controls actuator 2432 to slide second base plate 2413*b* to a position corresponding to the insertion level, and then holds second base plate 2413*b* for a predetermined period.

Delivery box 2408 may obtain, from a server or package transport device 10*q* or the like, unnecessary package information indicating that the package is unnecessary. If obtained, as illustrated in (c) in FIG. 152F, delivery box 2408 places the unnecessary package in the space located at the fourth level of delivery box 2408 so that the package corresponding to the obtained unnecessary package information is not collected. Unwanted packages are packages that were delivered in error, packages whose delivery was cancelled, etc. Once delivery box 2408 obtains unnecessary package information, actuation controller 2433 then controls actuator 2432 to lower third base plate 2413*c* and first base plate 2413*a*.

As illustrated in (f) in FIG. 152E and (d) in FIG. 152F, actuation controller 2433 controls actuator 2432 to lower third base plate 2413*c* from the first level to the second level and lower first base plate 2413*a* from the second level to the fourth level. The fourth level is the bottom of delivery box 2408. Since first package K1 placed on first base plate 2413*a* is an unnecessary package, actuation controller 2433 lowers first base plate 2413*a* to the fourth level, which is the above the bottom of delivery box 2408.

Once the predetermined period, which is the amount of time required for third base plate 2413*c* and first base plate 2413*a* to be lowered, elapses, actuation controller 2433 controls actuator 2432 to slide third base plate 2413*c* along third guide portion 2423, which is the insertion level, as illustrated in (g) in FIG. 152E and (d) in FIG. 152F. Here, actuation controller 2433 controls actuator 2432 to slide second base plate 2413*b* on third guide portion 2423 up to the horizontal central portion of the side portion of container 2411, i.e., the central portion in the widthwise direction of the side portion.

Next, as illustrated in (h) in FIG. 152E, actuation controller 2433 then controls actuator 2432 to pivot the third-level second base plate 2413*b* and displace second base plate 2413*b* into an orientation that is approximately parallel to the horizontal direction. With this, delivery box 2408 is in the state illustrated in (i) in FIG. 152E.

Next, second base plate 2413*b* lowers with placement pieces 2414 to a position below third guide portion 2423, so as to be arranged at the first level, to achieve the state illustrated in (j) in FIG. 152E.

Next, as illustrated in (j) in FIG. 152E and (e) in FIG. 152F, package transport device 10*q* stops at a location vertically above delivery box 2408 so as to arrange third package K3 vertically above top opening 2411*a* of delivery box 2408.

Next, package transport device 10*q* starts reeling out wire 51, and lowers first thruster device 110 of package transport device 10*q* and third package K3. Once third package K3 has been placed on the first-level second base plate 2413*b* of delivery box 2408, first thruster device 110 disconnects third package K3.

Next, as illustrated in (k) in FIG. 152E and (f) in FIG. 152F, third package K3 is placed on the first-level second base plate 2413*b* of delivery box 2408. Stated differently, third package K3 is stored in delivery box 2408.

With this, as illustrated in (l) in FIG. 152E and (f) in FIG. 152F, actuation controller 2433 obtains placement information from sensor 2431, and controls actuator 2432 to pivot the third-level third base plate 2413*c* and displace third base plate 2413*c* into an orientation that is approximately parallel to the vertical direction. The operation thereafter is similar to that described above in (c) in FIG. 152E.

Operation Example 3

FIG. 152G illustrates an example of how delivery box 2408 according to Operation Example 3 of Embodiment 14 moves when viewed from the side.

This operation example pertains to an operation performed when pivot axles 2415 of delivery box 2408 are formed at the edges of first base plate 2413*a*, second base plate 2413*b*, and third base plate 2413*c*. This operation example also includes an insertion level, a first level after the insertion level, a second level after the first level, a third level after the second level, and a fourth level after the third level, from up to down in the vertical direction. Base plates 2413 are pivoted at the fourth level.

In the operation example, operations similar to Operation Example 1 are denoted with the same reference signs, and repeated description will be omitted as appropriate.

As illustrated in (a) in FIG. 152G, package transport device 10*q* stops at a location vertically above delivery box 2408 so as to arrange second package K2 vertically above top opening 2411*a* of delivery box 2408.

Next, package transport device 10*q* starts reeling out wire 51, and lowers first thruster device 110 of package transport device 10*q* and second package K2. Once second package K2 has been placed on the first-level third base plate 2413*c* of delivery box 2408, first thruster device 110 disconnects second package K2.

Next, as illustrated in (b) in FIG. 152G, second package K2 is placed on the first-level third base plate 2413*c* of delivery box 2408. This causes sensor 2431 to transmit placement information to actuation controller 2433.

Actuation controller 2433 obtains placement information from sensor 2431, and controls actuator 2432 to pivot second base plate 2413*b* that has been moved to the fourth level and displace second base plate 2413*b* into an orientation that is approximately parallel to the vertical direction.

Next, as illustrated in (c) in FIG. 152G, actuation controller 2433 controls actuator 2432 to move the displaced second base plate 2413*b* to first guide portion 2421 by sliding it along second guide portion 2422 located on the third level.

Next, as illustrated in (d) in FIG. 152G, actuation controller 2433 controls actuator 2432 to vertically upwardly slide, along first guide portion 2421, second base plate 2413*b* that was moved to first guide portion 2421.

Next, as illustrated in (e) in FIG. 152G, actuation controller 2433 controls actuator 2432 to slide second base plate 2413*b* to a position corresponding to the insertion level, and then holds second base plate 2413*b* for a predetermined period.

Next, as illustrated in (f) in FIG. 152G, actuation controller 2433 controls actuator 2432 to lower third base plate 2413*c* from the first level to the second level and lower first base plate 2413*a* from the second level to the third level.

Once the predetermined period, which is the amount of time required for third base plate 2413*c* and first base plate 2413*a* to be lowered, elapses, actuation controller 2433 controls actuator 2432 to slide third base plate 2413*c* along third guide portion 2423, which is the insertion level, as illustrated in (g) in FIG. 152G. Here, actuation controller 2433 controls actuator 2432 to slide second base plate 2413*b* on third guide portion 2423. First base plate 2413*a* is lowered from the third level to the fourth level.

Next, as illustrated in (h) in FIG. 152G, actuation controller 2433 then controls actuator 2432 to pivot the third-level second base plate 2413*b* and displace second base plate 2413*b* into an orientation that is approximately parallel to the horizontal direction. With this, delivery box 2408 is in the state illustrated in (i) in FIG. 152G.

Next, second base plate 2413*b* lowers with placement pieces 2414 to a position below third guide portion 2423, so as to be arranged at the first level, to achieve the state illustrated in (j) in FIG. 152G.

Next, as illustrated in (j) in FIG. 152G, package transport device 10*q* stops at a location vertically above delivery box 2408 so as to arrange third package K3 vertically above top opening 2411*a* of delivery box 2408.

Next, package transport device 10*q* starts reeling out wire 51, and lowers first thruster device 110 of package transport device 10*q* and third package K3. Once third package K3 has been placed on the first-level second base plate 2413*b* of delivery box 2408, first thruster device 110 disconnects third package K3.

Next, as illustrated in (k) in FIG. 152G, third package K3 is placed on the first-level second base plate 2413*b* of delivery box 2408. Stated differently, third package K3 is stored in delivery box 2408. The operation thereafter is similar to that described above in (b) in FIG. 152G.

Operation Example 4

FIG. 152H illustrates an example of how delivery box 2408 according to Operation Example 4 of Embodiment 14 moves when viewed from the side.

This operation example pertains to an operation performed when foldable base plates 2413 are used in delivery box 2408. The operation example also includes a first level, a second level after the first level, and a third level after the second level, from up to down in the vertical direction. Base plates 2413 are pivoted at the third level.

In the operation example, operations similar to Operation Example 1 are denoted with the same reference signs, and repeated description will be omitted as appropriate.

As illustrated in (a) in FIG. 152H, package transport device 10*q* stops at a location vertically above delivery box 2408 so as to arrange second package K2 vertically above top opening 2411*a* of delivery box 2408.

Next, package transport device 10*q* starts reeling out wire 51, and lowers first thruster device 110 of package transport device 10*q* and second package K2. Once second package K2 has been placed on the first-level third base plate 2413*c* of delivery box 2408, first thruster device 110 disconnects second package K2.

Next, as illustrated in (b) in FIG. 152H, second package K2 is placed on the first-level third base plate 2413*c* of delivery box 2408. This causes sensor 2431 to transmit placement information to actuation controller 2433.

Actuation controller 2433 obtains placement information from sensor 2431, and controls actuator 2432 to pivot second base plate 2413*b* that has been moved to the fourth level and displace second base plate 2413*b* into an orientation that is approximately parallel to the vertical direction. More specifically, actuation controller 2433 controls actuator 2432 to pivot second base plate 2413*b* around its axis of rotation, whereby second base plate 2413*b* is bent at the hinge in the center portion thereof and folded as illustrated in (c) in FIG. 152H.

Next, as illustrated in (c) in FIG. 152H, actuation controller 2433 controls actuator 2432 to move the displaced second base plate 2413*b* to first guide portion 2421 by sliding it along second guide portion 2422*a* located on the third level.

Next, as illustrated in (d) in FIG. 152H, actuation controller 2433 controls actuator 2432 to vertically upwardly slide, along first guide portion 2421, second base plate 2413*b* that was moved to first guide portion 2421.

Next, as illustrated in (e) in FIG. 152H, actuation controller 2433 controls actuator 2432 to slide second base plate 2413*b* to a position corresponding to the first level, and then holds second base plate 2413*b* for a predetermined period.

Next, as illustrated in (f) in FIG. 152H, actuation controller 2433 controls actuator 2432 to lower third base plate 2413*c* from the first level to the second level and lower first base plate 2413*a* from the second level to the third level.

Next, it waits for a predetermined period of time, which is an amount of time required for third base plate 2413*c* and first base plate 2413*a* to be lowered.

Next, as illustrated in (g) in FIG. 152H, actuation controller 2433 controls actuator 2432 to expand the folded second base plate 2413*b*. Simply by having actuator 2432 rotate second base plate 2413*b* around pivot axle 2415, second base plate 2413*b* is expanded at the first level by third guide section 2423*a* and displaced into an orientation that is approximately parallel to the horizontal direction. This places second base plate 2413*b* in the state illustrated in (h) in FIG. 152H.

Next, as illustrated in (i) in FIG. 152H, actuation controller 2433 controls actuator 2432 to lock second base plate 2413*b* to prevent second base plate 2413*b* from being displaced.

Next, as illustrated in (j) in FIG. 152H, package transport device 10*q* stops at a location vertically above delivery box 2408 so as to arrange third package K3 vertically above top opening 2411*a* of delivery box 2408.

Next, package transport device 10*q* starts reeling out wire 51, and lowers first thruster device 110 of package transport device 10*q* and third package K3. Once third package K3 has been placed on the first-level second base plate 2413*b* of delivery box 2408, first thruster device 110 disconnects third package K3.

Next, as illustrated in (k) in FIG. 152H, third package K3 is placed on the first-level second base plate 2413*b* of delivery box 2408. Stated differently, third package K3 is stored in delivery box 2408. The operation thereafter is similar to that described above in (b) in FIG. 152H.

Variation of Embodiment 14

FIG. 152I illustrates an example of how delivery box 2408*a* according to a variation of Embodiment 14 moves when viewed from the side.

Hereinafter, as illustrated in FIG. 152I, the basic configuration of the package transport device according to the present variation is the same as the basic configuration of the package transport device according to Embodiment 14, etc. Although the delivery box according to the present variation differs from Embodiment 14, etc., in that it stores a package inside box 2453 after moving a plurality of packages vertically, the basic configuration of delivery box 2408*a* according to the present variation is the same as the basic configuration of the delivery box according to, for example, Embodiment 1. Accordingly, regarding the basic configurations of package transport device 10*q* and delivery box 2408*a* according to the present variation, the same reference signs as above are used, and repeated description will be omitted where appropriate. The present variation may also be used with lifting systems and unmanned aerial vehicles according to embodiments other than Embodiment 1.

Delivery box 2408*a* according to the present variation is an elevator, and is capable of vertically moving carriage 2451 inside elevator path 2452. Delivery box 2408*a* includes carriage 2451 that stores a package, elevator path 2452 along which carriage 2451 is moved up and down, and box 2453 that stores a package.

Carriage 2451 is a bottomed container with an open top, and is capable of storing a package through top opening 2411*a*.

Carriage 2451 is moved up and down by actuation controller 2433 controlling actuator 2432. Actuator 2432 includes ropes, balancing weights, winders, pulleys, etc. When moving up or down, carriage 2451 moves vertically by being guided along a guide rail provided in elevator path 2452.

Carriage 2451 also includes unloading opening 2451*a* for carrying packages into the interior of box 2453. Carriage 2451 includes unloading door 2451*b* that can open and close unloading opening 2451*a*. Unloading door 2451*b* can open and close unloading opening 2451*a* for carrying out packages. Unloading door 2451*b* can be opened and closed by door actuator 2451*c* provided in carriage 2451 being controlled by actuation controller 2433.

Carriage 2451 includes pin 2456. Pin 2456 is arranged on the bottom of carriage 2451. Pin 2456 is protruded and retracted by pin actuator 2455*d* provided in box 2453. When protruded, pin 2456 can press down on loading door 2454*b* that covers loading opening 2453*a* of elevator path 2452 to slide loading door 2454*b* and open loading opening 2453*a*. In other words, pin 2456 is provided on the bottom of carriage 2451, on the side of elevator path 2452 where loading door 2454*b* is located. When retracted, pin 2456 does not press loading door 2454*b*, which covers loading opening 2453*a* of elevator path 2452.

Carriage 2451 includes unloading device 2455 that can push a package stored therein out through unloading opening 2451*a*. When unloading opening 2451*a* and loading opening 2453*a* of box 2453 are in communication, unloading device 2455 can push the stored package into box 2453. More specifically, unloading device 2455 includes an extendable arm 2455*a*, pushing plate 2455*b*, and pushing actuator 2455*c*. In unloading device 2455, actuation controller 2433 controls pushing actuator 2455*c* to cause arm 2455*a* to extend and pushing plate 2455*b* to push the package. After pushing the package, actuation controller 2433 controls pushing actuator 2455*c* to retract arm 2455*a*, which pulls pushing plate 2455*b* back near the side wall inside carriage 2451.

Elevator path 2452 is an enclosure that extends vertically, and can house carriage 2451 therein. Elevator path 2452 allows carriage 2451 to be moved vertically by means of a guide rail.

Top opening 2411*a* through which packages pass is formed in the top portion on the vertical top of elevator path 2452. Elevator path 2452 includes top lid 2452*a*. Top lid 2452*a* is provided on the top portion of elevator path 2452, and is capable of opening and closing top opening 2411*a* for bringing packages into the space through top opening 2411*a*. Top lid 2452*a* covers top opening 2411*a* when closed and opens top opening 2411*a* when opened.

Top lid 2452*a* is pivoted by the force of carriage 2451 moving vertically upward, which presses it vertically upward and opens top opening 2411*a*. When top lid 2452*a* is no longer pressed as a result of carriage 2451 moving vertically downward, it is pivoted by spring hinges so as to close top opening 2411*a*. Stated differently, the spring hinges are biased such that top lid 2452*a* closes top opening 2411*a*.

Note that top lid 2452*a* opens outward relative to elevator path 2452, but may open inward into the space inside elevator path 2452. Top lid 2452*a* is not limited to a single-swing opening mechanism, and may employ a dual-swing opening mechanism.

Loading opening 2453*a* through which a package can be carried in is formed on the side portion of elevator path 2452. Elevator path 2452 includes loading door 2454*b* that can open and close loading opening 2453*a*. In the present embodiment, a plurality of incoming openings 2453*a* are formed on elevator path 2452 along the vertical direction. Accordingly, elevator path 2452 according to the present embodiment includes a plurality of loading doors 2454*b*.

Loading doors 2454*b* are provided on the side portion of elevator path 2452, and are capable of opening and closing loading openings 2453*a* by moving in the vertical direction to bring in, through loading opening 2453*a*, packages from carriage 2451 that moves inside elevator path 2452. Each loading door 2454*b* opens loading opening 2453*a* by being pushed down by pin 2456 of carriage 2451 and sliding vertically downward. Once loading door 2454*b* is no longer pressed down by pin 2456 of carriage 2451, the force of the spring slides loading door 2454*b* vertically upward so as to close loading opening 2453*a*. Stated differently, the spring biases loading door 2454*b* so as to close loading opening 2453*a*.

The plurality of loading openings 2453*a* are coupled to the plurality of boxes 2453 in one-to-one correspondence. More specifically, the plurality of boxes 2453 are coupled to elevator path 2452. The plurality of boxes 2453 are arranged vertically so as to correspond one-to-one with the plurality of loading openings 2453*a* in elevator path 2452.

Retrieval opening 2453*d* through which packages can be retrieved is formed in each of the plurality of boxes 2453. Each of the plurality of boxes 2453 includes retrieval door 2453*e* that can open and close retrieval opening 2453*d*.

Retrieval door 2453*e* is provided on the side portion of box 2453 and can open and close retrieval opening 2453*d* for retrieving packages placed in the interior space through retrieval opening 2453*d*. Retrieval door 2453*e* covers retrieval opening 2453*d* when closed and exposes retrieval opening 2453*d* when opened.

Operation Example

As illustrated in FIG. 152I, with delivery box 2408*a* according to this operation example, four side openings 2412*a* are formed in elevator path 2452. Delivery box 2408*a* includes four loading doors 2454*b* that cover the four side openings 2412*a*, and four boxes 2453. In this operation example, a package is stored in box 2453 on the first level from the vertical top, and exemplifies a case in which a package is put into box 2453 on the second level from the vertical top.

First, as illustrated in (a) in FIG. 152I, right before package transport device 10*q* arrives at a location vertically above elevator path 2452, actuation controller 2433 of delivery box 2408*a* controls actuator 2432 to move carriage 2451 vertically upward. This moves carriage 2451 vertically upward and causes carriage 2451 to contact top lid 2452*a* of elevator path 2452. For example, actuation controller 2433 receives the position information of package transport device 10*q* from package transport device 10*q*, and/or obtains arrival alert signal alerting of the arrival of package transport device 10*q* from package transport device 10*q*, and controls actuator 2432 so as to move carriage 2451 vertically upward when package transport device 10*q* arrives.

Next, as illustrated in (b) in FIG. 152I, actuation controller 2433 controls actuator 2432 to move carriage 2451 further vertically upward. This causes carriage 2451 to push top lid 2452*a* vertically upward and thus pivot top lid 2452*a* and open top opening 2411*a*.

Next, as illustrated in (c) in FIG. 152I, actuation controller 2433 controls actuator 2432 to move carriage 2451 to the top end of elevator path 2452. This causes carriage 2451 to push top lid 2452*a* vertically upward by the force of the vertically upward movement, and thus pivot top lid 2452*a* and completely open top opening 2411*a*. Package transport device 10*q* then arrives or has arrived at a location vertically above top opening 2411*a*. Package transport device 10*q* therefore extends the wire to lower the package, which is then stored in carriage 2451.

Next, as illustrated in (d) in FIG. 152I, when the package is stored in carriage 2451, actuation controller 2433 controls actuator 2432 to move carriage 2451 vertically downward. This causes carriage 2451 to move vertically downward which stops carriage 2451 from pressing top lid 2452*a*, causing top lid 2452*a* to pivot via spring hinges and close top opening 2411*a* as illustrated in (e) in FIG. 152I.

As illustrated in (e) in FIG. 152I, actuation controller 2433 controls pin actuator 2455*d* to cause pin 2456 to protrude. More specifically, actuation controller 2433 causes pin 2456 to protrude so that pin 2456 is positioned between loading door 2454*b* of the first-level box 2453 and loading door 2454*b* of the second-level box 2453.

Next, as illustrated in (f) in FIG. 152I, in order to place a package in box 2453 on the second level from the vertical top, actuation controller 2433 controls actuator 2432 to move carriage 2451 to a position at which loading opening 2453*a* of the second-level box 2453 and unloading opening 2451*a* of carriage 2451 oppose each other, and stops carriage 2451. Here, by pin 2456 pushing on loading door 2454*b* of the second-level box 2453, carriage 2451 moves vertically downward and loading door 2454*b* slides vertically downward. Here, the second-level loading door 2454*b* is housed within the third-level loading door 2454*b*. Stated differently, the top end of loading door 2454*b* is open and a cavity is formed inside. Loading door 2454*b* may be a flat plate, in which case it may overlap with the third-level loading door 2454*b*.

This opens loading opening 2453*a*. Stated differently unloading opening 2451*a* and loading opening 2453*a* oppose and are in communication with each other.

Next, as illustrated in (g) in FIG. 152I, since unloading opening 2451*a* and loading opening 2453*a* of box 2453 are in communication, unloading device 2455 pushes the package on carriage 2451 into box 2453. More specifically, actuation controller 2433 controls pushing actuator 2455*c* to extend arm 2455*a* and push the package via pushing plate 2455*b*. This moves package from carriage 2451 into box 2453 through unloading opening 2451*a* and loading opening 2453*a*.

Next, as illustrated in (h) in FIG. 152I, once the package is pushed and disposed in box 2453, actuation controller 2433 controls pushing actuator 2455*c* to retract arm 2455*a* and bring pushing plate 2455*b* back near the side wall inside carriage 2451. Actuation controller 2433 controls pin actuator 2455*d* to pull pin 2456 back in. Loading door 2454*b* slides vertically upward to close loading opening 2453*a* by spring force. This closes loading opening 2453*a* with loading door 2454*b*. Actuation controller 2433 controls door actuator 2451*c* to close unloading opening 2451*a* with unloading door 2451*b*. This closes unloading opening 2451*a* with unloading door 2451*b*.

Thus, in the present variation, carriage 2451 of delivery box 2408*a* can be raised and lowered vertically like an elevator to bring packages into the chambers.

Delivery box 2408*a* according to the present variation determines which box 2453 will house the package received by carriage 2451. Actuation controller 2433 of delivery box 2408*a* may check the availability of box 2453 and give priority to box 2453 on an upper level or box 2453 on a lower level to store packages.

Some of the plurality of boxes 2453 in delivery box 2408*a* according to the present variation may have refrigeration and/or freezing capabilities. In such cases, delivery box

2408*a* may obtain, from package transport device 10*q* or the management system that manages the delivery, etc., carried out by package transport device 10*q*, storage temperature information indicating whether a package it receives from package transport device 10*q* needs to be stored at room temperature, needs to be refrigerated, or needs to be kept frozen. By obtaining the storage temperature information of the package, delivery box 2408*a* stores the package in one of a room-temperature box, a refrigerated box, or a freezer box that corresponds to the temperature indicated in the storage temperature information of the package.

Embodiment 15

FIG. 153A is a block diagram illustrating self-driving box 2408*b* and operations management system 2400 according to Embodiment 15. FIG. 153B is a front view illustrating an example of self-driving box 2408*b* according to Embodiment 15 when viewed from the front. FIG. 153C is a side view illustrating an example of self-driving box 2408*b* according to Embodiment 15 when viewed from the side.

Hereinafter, as illustrated in FIG. 153B and FIG. 153C, the basic configuration of package transport device 10*q* according to the present embodiment is the same as the basic configuration of the unmanned aerial vehicle according to Embodiment 1, etc., and the same as the basic configuration of package transport device 10*q* according to Embodiment 12, etc. Although self-driving box 2408*b* according to the present embodiment differs from Embodiment 14, etc., in that it can travel, the basic configuration of self-driving box 2408*b* is the same as the basic configuration of the delivery box according to Embodiment 1, etc. Accordingly, regarding the basic configurations of package transport device 10*q* and self-driving box 2408*b* according to the present embodiment, the same reference signs as above are used, and repeated description will be omitted where appropriate. The present embodiment may also be used with lifting systems and unmanned aerial vehicles according to embodiments other than Embodiment 1.

Self-driving box 2408*b* is an Unmanned Ground Vehicle (UGV) that is capable of self-driving. Self-driving box 2408*b* houses a plurality of packages. In other words, self-driving box 2408*b* can house a plurality of packages to be delivered to different receivers. Thus, self-driving box 2408*b* can deliver packages to each of the different receivers. Self-driving box 2408*b* is one example of the delivery box.

Self-driving box 2408*b* is housed in housing 2460 at the receiver. The vertical top of housing 2460 is open, and housing 2460 can receive packages transported by package transport device 10*q*. Housing 2460 includes opening 2461 through which self-driving box 2408*b* can enter and exit, and bottom portion 2462. Opening 2461 is provided with front door 2463. Front door 2463 is movable along the vertical direction. When self-driving box 2408*b* is loaded with a package and self-driving box 2408*b* delivers the package to its destination, front door 2463 of housing 2460 moves vertically upward to open opening 2461 of housing 2460. When self-driving box 2408*b* is done delivering the package to its destination, front door 2463 of housing 2460 moves vertically upward to open opening 2461 of housing 2460. When self-driving box 2408*b* departs or returns from housing 2460, front door 2463 of housing 2460 moves vertically downward, closing opening 2461 of housing 2460. Housing 2460 includes bottom portion 2462 on which self-driving box 2408*b* can be placed. Bottom portion 2462 is a floor plate that is approximately several centimeters thick. Accordingly, bottom portion 2462 includes slope 2462*a* that guides to opening 2461. Housing 2460 is one example of the delivery box.

Self-driving box 2408*b* waits inside housing 2460 and causes top lid 2471, which covers top opening 2460*k*, to open when package transport device 10*q* brings a package. This stores the package in self-driving box 2408*b*. Self-driving box 2408*b* opens or closes top opening 2460*k* according to instructions (opening instruction or closing instruction) of operations management system 2400 and/or package transport device 10*q*.

Operations management system 2400 manages the operation of package transport device 10*q*. More specifically, operations management system 2400 manages the travel route, travel speed, delivery order of packages, etc., based on the position information of the receiver, estimated time of arrival at the receiver, position information of the sender, and delivery time disclosed by the sender. Operations management system 2400 may be provided in package transport device 10*q* or provided in a management server that manages self-driving box 2408*b* and package transport device 10*q*, etc.

If there is no vacancy inside self-driving box 2408*b*, since self-driving box 2408*b* will not be able to store a package even if one is delivered, self-driving box 2408*b* transmits the internal vacancy status to operations management system 2400.

Next, the size of housing 2460 and the size of self-driving box 2408*b* will be described.

Housing 2460 has a height of 2100 mm and a width of 1200 mm. Opening 2461 has a height of 850 mm and a width of 1000 mm. Regarding self-driving box 2408*b*, container 2470 has an inner dimension of 50 cm, an outer dimension of 55 cm, and self-driving box 2408*b* has a width of 60 cm. The length of top lid 2471 is 25 cm. The length of slope 2462*a* is 10 cm. Note that the disclosed sizes of housing 2460 and self-driving box 2408*b* are non-limiting examples.

As illustrated in FIG. 153A through FIG. 153C, self-driving box 2408*b* includes container 2470, top lid 2471, obtainer 2475, actuator 2477, actuation controller 2478, and movement mechanism 2479.

Container 2470 defines a space for storing a package. Container 2470 is an enclosure for storing a package. Container 2470 is exemplified as rectangular in shape, but may be of any shape as long as it can store a package. Top opening 2460*k* coverable by the closing of top lid 2471 is formed in the top portion of container 2470, which is located in the vertically upward part of container 2470.

Top lid 2471 is provided on the top of container 2470, and is capable of opening and closing top opening 2460*k* for inserting a package into the space through top opening 2460*k*. Top lid 2471 covers top opening 2460*k* when closed and opens top opening 2460*k* when opened. Top lid 2471 is held so as to be pivotable around a predetermined axis relative to container 2470.

Obtainer 2475 can obtain an opening instruction and can obtain a closing instruction, which are instructions to open or close top lid 2471, from operations management system 2400 and/or package transport device 10*q*. Obtainer 2475 may be a camera sensor capable of detecting package transport device 10*q* or a package located vertically above self-driving box 2408*b*. In such cases, obtainer 2475 may output its detection results to actuation controller 2478.

In the present embodiment, top opening 2460*k* of self-driving box 2408*b* is square, so top lid 2471 is provided on each of the four sides. However, three or fewer or five or more top lids 2471 may be provided on self-driving box 2408*b*.

When obtainer 2475 obtains an opening instruction, or when obtainer 2475 detects package transport device 10*q* or a package, actuation controller 2478 can control actuator 2477 to open top lid 2471.

Actuator 2477 is an actuator including gears, belts, etc. Actuator 2477 is capable of pivoting a plurality of top lids 2471.

Movement mechanism 2479 includes wheels, wheel actuators, an ECU, etc. The wheels are provided on container 2470. The ECU can rotate the wheels by controlling the wheel actuators. The ECU can drive self-driving box 2408*b* based on map information mapped by the receiver.

Operation Example

FIG. 154 is a flowchart illustrating an example of an operation of self-driving box 2408*b* according to Embodiment 15.

First, package transport device 10*q* flies to a location vertically above self-driving box 2408*b*, which is the receiver, and arrives at a location vertically above self-driving box 2408*b* (S2401).

Next, operations management system 2400 checks with self-driving box 2408*b* at the receiver where package transport device 10*q* is to deliver the package to see if self-driving box 2408*b* is ready to receive the package (S2402).

Stated differently, operations management system 2400 determines whether self-driving box 2408*b* is prepared to receive the package (S2403). More specifically, operations management system 2400 obtains information from self-driving box 2408*b* at the receiver indicating the internal vacancy status, i.e., whether a package can be stored or not. From the information indicating vacancy status, operations management system 2400 determines whether or not there is room inside self-driving box 2408*b* at the receiver to store the package.

If operations management system 2400 determines that self-driving box 2408*b* is not prepared to receive the package (NO in S2403), operations management system 2400 causes package transport device 10*q* to wait for a predetermined period (S2409), and then returns to step S2402.

However, if operations management system 2400 determines that self-driving box 2408*b* is prepared to receive the package (YES in S2403), operations management system 2400 transmits an opening instruction to self-driving box 2408*b* at the receiver.

Next, upon receiving the opening instruction from operations management system 2400, self-driving box 2408*b* opens top opening 2460*k* by opening top lid 2471 (S2404). Here, as illustrated in FIG. 153B and FIG. 153C, top lid 2471 is open in four directions around top opening 2460*k*. Accordingly, top lid 2471 can close the gap between container 2470 of self-driving box 2408*b* and housing 2460 in an upward sloping position from top opening 2460*k* to housing 2460. Stated differently, when package transport device 10*q* lowers a package to self-driving box 2408*b*, top lid 2471 can guide the package into top opening 2460*k*.

For example, even if the package is not aligned with top opening 2460*k* of self-driving box 2408*b*, as illustrated by the dashed lines in FIG. 153C, the package will still be guided to top lid 2471 by the contact of the package with top lid 2471. Even if the package gets caught on top lid 2471, the package can be more securely stored in self-driving box 2408*b* because package transport device 10*q* can smoothly guide the package to top lid 2471 by reeling up and/or reeling down the wire about a centimeter to move the package.

Next, operations management system 2400 sends a package lowering instruction to package transport device 10*q* that has arrived at the receiver. This causes package transport device 10*q* to lower the package and store the package in self-driving box 2408*b* (S2405).

Next, after storing the package in self-driving box 2408*b*, package transport device 10*q* transmits a storage complete notification to operations management system 2400 (S2406).

Next, upon receipt of the storage complete notification from package transport device 10*q*, operations management system 2400 transmits a closing instruction to self-driving box 2408*b* at the receiver. As a result, upon receipt of the closing instruction from operations management system 2400, self-driving box 2408*b* closes top opening 2460*k* by closing top lid 2471 (S2407).

Next, operations management system 2400 transmits an opening instruction for opening front door 2463 to housing 2460, and transmits a delivery instruction to self-driving box 2408*b*. Housing 2460 opens front door 2463 according to the instruction from operations management system 2400 (S2408). This opens opening 2461 of front door 2463. Upon receipt of the delivery instruction from operations management system 2400, self-driving box 2408*b* starts moving to the receiver.

Although instructions are obtained from operations management system 2400 in this operation example, instructions may be obtained from package transport device 10*q* and executed.

Embodiment 16

FIG. 155 illustrates an example of the relationship between package transport device 10*q* and a power line according to Embodiment 16.

Hereinafter, as illustrated in FIG. 155, since the basic configuration of package transport device 10*q* according to the present embodiment is the same as the basic configuration of the unmanned aerial vehicle of Embodiment 1 and the same as the basic configuration of the package transport device according to Embodiment 12 and the like, regarding the basic configuration of package transport device 10*q* in the present embodiment, the same reference signs as above will be used and repeated description will be omitted where appropriate. Package transport device 10*q* according to the present embodiment differs from Embodiment 1, etc., in that it can inspect the state of the power line. The present embodiment may also be used with lifting systems and unmanned aerial vehicles according to embodiments other than Embodiment 1.

Package transport device 10*q* includes camera sensor 45 and a processor in addition to the vehicle main body, the communicator, the battery, the storage, etc.

Camera sensor 45 is an imaging device that is provided in package transport device 10*q* and can capture images of power lines arranged along rail 7. Camera sensor 45 captures an image of the power line and outputs image information, which is the captured image, to the processor. For example, the image information includes information indicating the relative position (distance) and the like between the power line and camera sensor 45. Camera sensor 45 may be, for example, a time-of-flight (TOF) camera or a range finding sensor or the like.

The processor determines the presence or absence of degradation in the power line based on the image information obtained from camera sensor 45. Degradation includes, for example, cracks, breaks, etc., in the power line. Based on the image information, the processor associates the information indicating the degraded position of the power line if it is degraded and the image information corresponding to the degraded position and stores the associated information in the storage. The processor may transmit the information indicating the degraded position and the image information corresponding to the degraded position to the operations management system via the communicator.

The processor also calculates the amount of deflection of rail 7 when package transport device 10*q* carrying a package is traveling on rail 7.

More specifically, as illustrated in FIG. 155, two adjacent utility poles are strung with rail 7 and a power line. Here, power line length is L1, power line height is h3, rail 7 height is h1, and rail 7 horizontal tension is T (N). The weight of the package is W1, and the weight of package transport device 10*q* is W2.

Here, the amount of deflection x is expressed as $$x=(W1+W2)\times L1^2/8T \quad \text{[Expression 1].}$$

The processor can accurately calculate the distance from camera sensor 45 to the power line by calculating the amount of deflection using the above Expression 1. Therefore, the processor corrects the focus of camera sensor 45 according to the distance from camera sensor 45 to the power line and causes camera sensor to capture an image of the power line. Since weights W1 and W2 are displaced by the weight of the package or the type of package transport device 10*q*, each time package transport device 10*q* travels along rail 7, the processor calculates the amount of deflection of rail 7, corrects the focus of camera sensor 45, and causes camera sensor to capture an image of the power line. This allows for clear imaging of the power lines, which means the supervisors of the power lines can accurately assess the condition of the power lines.

It may not be possible to accurately obtain at least one of the following: power line length L1, power line height h3, rail 7 height h1, or horizontal tension T of rail 7.

In such cases, package transport device 10*q* may include an altitude sensor and a distance sensor. The altitude sensor can measure the distance from package transport device 10*q* to the ground surface. The distance sensor can measure the distance from the distance sensor to a utility pole. Package transport device 10*q* can obtain bottom surface height h4, which is the height from the ground surface to the package, from the altitude sensor. Package transport device 10*q* can also obtain distance L2, which is the distance from a utility pole to the distance sensor, from the distance sensor.

The processor may estimate the amount of deflection based on distance L2 and bottom height h4. The processor may also estimate power line length L1 based on the traveling speed of package transport device 10*q* and distance L2. The processor may calculate horizontal tension T from the estimated power line length L1, deflection x, and weights W1 and W2 using the above Expression 1.

Each time package transport device 10*q* travels along rail 7, the processor may search for the optimum focal distance by imaging the power line at varying focal distances. Once the optimum focal length is found, the processor may calculate power line height h3.

Embodiment 17

FIG. 156A is a front view of shipment box 2408*c* according to Embodiment 17. FIG. 1568 is a side view of shipment box 2408*c* according to Embodiment 17. FIG. 156C is a top view of shipment box 2408*c* according to Embodiment 17.

Hereinafter, as illustrated in FIG. 156A, FIG. 1568, and FIG. 156C, since the basic configuration of package transport device 10*q* according to the present embodiment is the same as the basic configuration of the unmanned aerial vehicle of Embodiment 1 and the same as the basic configuration of the package transport device according to Embodiment 12 and the like, regarding the basic configuration of package transport device 10*q* in the present embodiment, the same reference signs as above will be used and repeated description will be omitted where appropriate. Shipment box 2408*c* according to the present embodiment differs from Embodiment 1, etc., in that the packages are segmented. The present embodiment may also be used with lifting systems and unmanned aerial vehicles according to embodiments other than Embodiment 1.

Shipment box 2408*c* can house a plurality of packages. Shipment box 2408*c* is divided into several interior spaces by a plurality of partition plates. Stated differently, shipment box 2408*c* is provided with a plurality of shelves 2481 (chambers). Shipment box 2408*c* is one example of the delivery box.

A user may use one shelf 2481 per receiver. Stated differently, a user cannot place packages for different receivers on one shelf 2481.

Shipment box 2408*c* illustrated in FIG. 156A includes three levels of shelves 2481 along the vertical direction. Each level is set up to have different delivery times. For example, the delivery time for the first-level shelves 2481, which is the uppermost level, is set to from 10:00 to 12:00. The delivery time for the next, second-level shelves 2481 is set to from 12:00 to 14:00. The delivery time for the next, third-level shelves 2481 is set to from 14:00 to 16:00.

Each of the first, second, and third levels has six shelves 2481 arranged along the left-and-right direction. Each of the first, second, and third levels has shelves that can accommodate room temperature packages, packages that need to be refrigerated, and packages that need to be kept frozen.

The delivery time, the number of shelves 2481 in shipment box 2408*c*, and the number of shelves 2481 in the left-and-right direction exemplified in the present embodiment are non-limiting examples.

Each shelf 2481 has a door, which is not illustrated in the figure. The door is marked with a QR code (registered trademark) that can identify shelf 2481. Shelf information, which is the information indicated by the QR code marked on shelf 2481, includes the identifier of shelf 2481, the location of shelf 2481 in shipment box 2408*c*, and the controlled temperature (room temperature, refrigerated, or frozen) of shelf 2481. Shelves 2481 whose controlled temperature is refrigerated are shown with shaded hatching, and shelves 2481 whose controlled temperature is frozen are shown with fine shaded hatching.

Packages are also marked with a QR code. Package information, which is the information indicated by the QR code marked on the package, includes the contents of the package, the address of the receiver, and the delivery time.

When a user sends a package, the package information indicated by the QR code marked on the package to be sent is linked to the shelf information of the QR code marked on shelf 2481 that holds the package to be sent.

Thus, the terminal device of the user houses the package on shelf 2481 of shipment box 2408*c* and requests the operations management system to deliver the package. Here, the terminal device transmits, for example, the delivery time, the package information, and the shelf information.

The operations management system sends package transport device 10*q* to shipment box 2408*c* corresponding to the delivery request for pickup. This causes package transport device 10*q* to arrive at a position vertically above shipment box 2408*c*. Package transport device 10*q* lowers the thruster device of package transport device 10*q* through opening 2482 in the top of shipment box 2408*c* and removes the requested package for delivery from shipment box 2408*c*. More specifically, when a user sends a package, since the package information indicated by the QR code marked on the package to be sent and the shelf information indicated by the QR code marked on shelf 2481 are linked, by obtaining this information from the operations management system, package transport device 10*q* can stop at a position vertically above opening 2482 through which the package associated with the delivery request can be retrieved.

Operation Example

FIG. 157 is a flowchart illustrating an example of an operation of shipment box 2408*c* according to Embodiment 17.

First, if sending a package, the user links the QR code marked on the package with the QR code marked on shelf 2481 of shipment box 2408*c* where the package is to be stored (S2411). Here, the user may link the QR codes by reading the QR codes using their terminal device. The user may link the QR codes by reading the QR code marked on the package using shipment box 2408*c*. In this way, when a package is stored in shipment box 2408*c*, the package information of the package to be delivered is linked to the shelf information of shelf 2481 where the package to be sent is stored. Note that the package's QR code is marked on the package by the user when the user sends the package.

Next, the operations management system refers to the linked package information and shelf information in shipment box 2408*c* for all packages to be delivered that are stored in shipment box 2408*c*. The operations management system calculates the order in which the packages are to be delivered to ensure that each package is delivered by the delivery time indicated in the package information (S2412).

Next, the operations management system determines whether the user has requested a change in the delivery time of the package (S2413).

If the operations management system determines the user has requested a change in the delivery time of the package (YES in S2413), the operations management system recalculates the order in which the packages are to be delivered to ensure that each package is delivered by the delivery time indicated in the package information. The operations management system transmits instructions to package transport device 10*q* to deliver the packages in the recalculated order instead of the originally scheduled delivery order. Package transport device 10*q* then delivers the packages in the recalculated order (S2414).

If the operations management system determines the user has not requested a change in the delivery time of the package (NO in S2413), the operations management system transmits instructions to package transport device 10*q* to deliver the packages in the originally scheduled delivery order. Package transport device 10*q* then delivers the packages in the originally scheduled delivery order (S2415).

Thus, even if a user requests a change in the delivery time for a package, the operations management system can recalculate the order in which packages are delivered for all packages stored in shipment box 2408*c* because the package information is linked to the shelf information. This optimizes the order in which packages are delivered. For example, in a store, an employee can simply place packages in shipment box 2408*c*, and package transport device 10*q* will automatically retrieve the packages and deliver them to their receivers in an order optimized by package transport device 10*q*.

Embodiment 18

Hereinafter, since the basic configuration of package transport device 10*q* according to the present embodiment is the same as the basic configuration of the unmanned aerial vehicle of Embodiment 1 and the same as the basic configuration of the package transport device according to Embodiment 12 and the like, regarding the basic configuration of package transport device 10*q* in the present embodiment, the same reference signs as above will be used and repeated description will be omitted where appropriate. The operations management system according to the present embodiment differs from that of Embodiment 1, etc., in that it calculates a deliverability window, for example. The present embodiment may also be used with lifting systems and unmanned aerial vehicles according to embodiments other than Embodiment 1.

Operation Example 1

FIG. 158 illustrates a map according to Embodiment 18 that includes, for example, the user's home and vending machines 2408*d* in the vicinity of the user's home. FIG. 159A is a flowchart illustrating an example of an operation of a delivery service management system according to Embodiment 18.

This operation example pertains to a case in which package transport device 10*q* delivers packages to delivery boxes in the user's vicinity, during the deliverable time frames of the delivery boxes. In this operation example, vending machine 2408*d* is used as one example of the delivery box.

First, the user opens the application operated by the delivery service management system using a terminal device.

Next, the delivery service management system searches delivery reservation statuses associated with each vending machine 2408*d* in the vicinity of the user. For example, as illustrated in FIG. 158, the delivery service management system searches for vending machines 2408*d* in the vicinity of the user's home and searches the statuses delivery reservations made by a plurality of users for each vending machine 2408*d* retrieved. As illustrated in FIG. 158 and FIG. 159A, the delivery service management system derives the deliverable time frames reserved by a plurality of users for all retrieved vending machines 2408*d* (S2421).

Next, the delivery service management system searches past congestion statuses associated with each vending machine 2408*d* in the vicinity of the user. The delivery service management system calculates pickup deadlines based on retrieved past congestion statuses (S2422). The pickup deadline is a predetermined period of time, starting when the product ordered by the user is delivered to vending machine 2408*d*, the user has to pick up the product.

As illustrated in FIG. 158, the pickup deadline is set to 15 minutes if, for example, the average occupancy rate of vending machine 2408*d* per hour is at least 70% in past congestion statuses. If the average occupancy rate of vending machine 2408*d* per hour is greater than or equal to 40% and less than 70%, the pickup deadline is set to 30 minutes.

If the average occupancy rate of vending machine 2408*d* per hour is less than 40%, the pickup deadline is set to 1 hour. Note that the above values are non-limiting examples of average occupancy rates and pickup deadlines for those rates. Accordingly, the occupancy rates and the pickup deadlines for those rates can be set and changed as needed. The average occupancy rate is the percentage of time that the vending machine 2408*d* is full during the operating hours in which delivery service is provided.

Next, as illustrated in FIG. 159A, the delivery service management system displays, on the application operated by the delivery service management system, the deliverability window for each vending machine 2408*d* (S2423). More specifically, as illustrated in FIG. 158, the delivery service management system displays, as the deliverability window, a table including delivery time frames, pickup deadlines, and symbols (circles and Xs) indicating whether or not delivery is possible on the display screen showing the application. The delivery service management system then ends the processing illustrated in the flowchart of FIG. 159A.

Operation Example 2

FIG. 159B is a flowchart illustrating an example of an operation of an operations management system according to Embodiment 18.

This operation example assumes a case in which package transport device 10*q* moves to transport a package to the receiver while checking its current location based on GPS information and a rail route map.

First, the operations management system obtains GPS information for package transport device 10*q* (S2421*a*).

Next, the operations management system checks the GPS information against the latitude and longitude information in the rail route map (S2422*a*). The rail route map includes not only a route map from the sender to the receiver, but map data for all rails. Latitude and longitude information is linked to the rail route map.

Next, the operations management system determines whether the reliability of the match of the current location of package transport device 10*q* with the rail route map location is a certain level or higher (S2423*a*). Stated differently, the operations management system determines whether the GPS information for package transport device 10*q* is consistent with its location on the rail route map.

When the reliability of the match of the current location of package transport device 10*q* with the rail route map location is a certain level or higher (YES in S2423*a*), the operations management system notifies the user's mobile terminal application of the current location of package transport device 10*q* (S2424*a*). Reliable means that the GPS information for package transport device 10*q* is consistent with its location on the rail route map. For example, reliable means that the current position of package transport device 10*q* is within a predetermined range of distance from its position on the rail route map. Within a predetermined range of distance means within tens of centimeters or within a few centimeters.

Next, the operations management system repeats the process of step S2421*a* after a predetermined amount of time has elapsed (S2425*a*). Here, a predetermined amount of time means a few seconds.

However, when the reliability of the match of the current location of package transport device 10*q* with the rail route map location is less than a certain level (NO in S2423*a*), the operations management system obtains an image from a sensor on package transport device 10*q* (S2426*a*).

Next, the operations management system measures the current location by checking an image from the sensor on package transport device 10*q* against a registered 3D dynamic map (S2427*a*).

Next, the operations management system notifies the user's mobile terminal application of the current location of package transport device 10*q* (S2428*a*).

Next, the operations management system repeats the process of step S2421*a* after a predetermined amount of time has elapsed (S2429*a*).

Embodiment 19

FIG. 160A is a block diagram illustrating an example of management system 1C, etc., according to Embodiment 19. FIG. 160B is a schematic diagram illustrating rails 7 from a sender (for example, store system 2404) to a receiver (for example, vending machine 2408*d*).

Hereinafter, since the basic configuration of package transport device 10*q* according to the present embodiment is the same as the basic configuration of the unmanned aerial vehicle of Embodiment 1 and the same as the basic configuration of the package transport device according to Embodiment 12 and the like, regarding the basic configuration of package transport device 10*q* in the present embodiment, the same reference signs as above will be used and repeated description will be omitted where appropriate. Management system 1C according to the present embodiment differs from Embodiment 1, etc., in that it sets package delivery timing according to the user's current location. The present embodiment may also be used with lifting systems and unmanned aerial vehicles according to embodiments other than Embodiment 1.

Management system 1C according to the present embodiment includes operations management system 2400 and delivery service management system 2401. Operations management system 2400 manages the operation statuses of package transport devices 10*q*, including their order, travel route, travel speed, and delivery disclosure time. Delivery service management system 2401 extracts time slots when package transport device 10*q* can deliver the package, and calculates an expected time of arrival.

In management system 1C according to the present embodiment, when a user orders a product using an application on mobile terminal 2402 used by the user, the user can receive the package they ordered at a predetermined location, at a predetermined or user-specified time. Here, the predetermined time is a time specified by management system 1C when the user orders the product.

Here, mobile terminal 2402 includes terminals such as smartphones owned by the user, vending machines 2408*d* with which products can be ordered, and dedicated terminals installed with an application with which products can be ordered. The user-specified time is a time set by the user when the user orders the product. The predetermined location is a location specified by the user or a location specified by management system 1C when the user orders the product, and is the receiver or a place located a predetermined distance from the receiver.

When a user orders a product using product ordering system 2403, the warehouse managed by product ordering system 2403 may not have the item in stock. In such cases, product ordering system 2403 inquires about the availability of the product selected by the user at nearby stores. If the product selected by the user is in stock at the store nearest to the user, the nearest store is displayed in color, and if the product is in stock at surrounding stores other than the nearest store, the surrounding stores are displayed in gray. In this way, the display differs depending on the proximity of the store from the user.

Even if the product is not in stock at the time of order picking, product ordering system 2403 can check with nearby stores to see if they have the product in stock, and if they do, it can receive permission from the user to deliver the product from the nearby store, offer an alternative product, confirm whether the product can be cancelled, etc.

Since there may be cases in which the user may not or cannot receive the package (product) after ordering the product from product ordering system 2403, management system 1C can change the time of receipt or cancel the product.

When package transport device 10*q* arrives at the airspace above vending machine 2408*d* after the user orders a product from product ordering system 2403, if a person within a predetermined distance from vending machine 2408*d* is moving, package transport device 10*q* alerts that person with a sound. When no person is present, package transport device 10*q* lowers the package to vending machine 2408*d* and stores the package in vending machine 2408*d.*

When package transport device 10*q* arrives at the airspace above vending machine 2408*d* after the user orders a product from product ordering system 2403, package transport device 10*q* confirms with mobile terminal 2402 whether to lower the package, and if package transport device 10*q* receives a response consenting the lowering of the package, it lowers the package into vending machine 2408*d* and stores the package in vending machine 2408*d.*

When package transport device 10*q* arrives at the airspace above vending machine 2408*d* after the user orders a product from product ordering system 2403, package transport device 10*q* may hand the package directly to the user by lowering the package right in front of the user, and, alternatively, may hand the package to the user by lowering the package to the ground or a pedestal in front of the user.

If, at the time of delivery after the user orders a product from product ordering system 2403, the weather prevents delivery of the package during the specified time slot, a deliverable time slot is extracted, and user's mobile terminal 2402 is notified of the extracted deliverable time slot. Mobile terminal 2402 displays the notification on the application operated by product ordering system 2403.

If, at the time of delivery after the user orders a product from product ordering system 2403, the weather prevents delivery of the package during the specified time slot, the user's mobile terminal 2402 is notified that the product delivery time will be postponed. Product ordering system 2403 confirms whether the user is willing to postpone the delivery time via notification to mobile terminal 2402. If the user gives consent to postpone the delivery time, product ordering system 2403 can deliver the product at the changed delivery time, and if the user does not give consent to postpone the delivery time, the product can be cancelled.

There may be cases in which, in delivery service management system 2401, the user orders a product using their mobile terminal 2402 and schedules to receive the product at vending machine 2408*d*, and the scheduled vending machine 2408*d* is full. In such cases, delivery service management system 2401 notifies mobile terminal 2402 of the following options: postpone the delivery time, change the delivery to another vending machine 2408*d*, or pick up near the scheduled vending machine. Delivery service management system 2401 can give the user a choice of how to receive the product by presenting the user with options.

Operation Example 1

FIG. 161 is a flowchart illustrating an example of an operation of delivery service management system 2401 according to Operation Example 1 of Embodiment 19.

This operation example assumes a case in which the user orders a product using mobile terminal 2402, and the picking of the ordered product is started when the user approaches a predetermined position in order to pick up the package at the pickup location.

First, delivery service management system 2401 of management system 1C obtains the user's current location via the position information for mobile terminal 2402 (S2431). More specifically, delivery service management system 2401 obtains the position information for mobile terminal 2402 using the GPS function installed in mobile terminal 2402 possessed by the user. The position information for mobile terminal 2402 is position information indicating the user's current location, such as latitude and longitude.

Next, delivery service management system 2401 estimates the user's arrival time based on the user's current location information (position information), the user's registration information, and the user's past travel history (S2432). Delivery service management system 2401 repeats this process until the user arrives at the predetermined position.

Here, the user's registration information is information such as the user's age, the user's gender, etc. The user's past travel history includes the user's travel speed, travel route, and the difference in the user's arrival time relative to the user's specified time. The predetermined position is the location designated by the user to pick up the package, i.e., the location of the receiver.

Next, delivery service management system 2401 determines whether the user has approached the predetermined position at the predetermined or user-specified time (S2433).

If delivery service management system 2401 determines that the user has not approached the predetermined position at the predetermined or user-specified time (NO in S2433), delivery service management system 2401 outputs an instruction to package transport device 10*q* to wait for a certain amount of time. With this, package transport device 10*q* waits for a certain amount of time (S2436). The processing in the flowchart of FIG. 161 then returns to step S2431.

However, if delivery service management system 2401 determines that the user has approached the predetermined position at the predetermined or user-specified time (YES in S2433), delivery service management system 2401 instructs store system 2404 to start picking the product (S2434). With this, store system 2404 starts picking the product. Note that a store employee may start picking the product. Here, picking is the process of collecting items instructed to be shipped from among products stored in, for example, a warehouse. Store system 2404 displays on the display that it has started picking the product in response to an instruction from delivery service management system 2401.

Next, when store system 2404 completes the picking of the product, it obtains picking completion information, which is information indicating that the picking of the product is complete. Once picking is completed, the product is stored as a package in, for example, a shipment box depending on the receiver. Store system 2404 also transmits a delivery start instruction to operations management system

2400 of management system 1C. Since operations management system 2400 obtains the delivery start instruction after the picking of the product is complete (S2435), it outputs the delivery start instruction to package transport device 10$q$ and causes package transport device 10$q$ to start delivery of the package. This causes package transport device 10$q$ to ship the package in the shipment box to the user at a predetermined position, at the predetermined or user-specified time.

With this, in operations management system 2400, package transport device 10$q$ can ship the package to the predetermined location at the predetermined or user-specified time. Accordingly, management system 1C can reduce the time that a user is required to wait to pick up a package at the receiver (delivery destination).

Operation Example 2

FIG. 162 is a flowchart illustrating an example of an operation of management system 1C according to Operation Example 2 of Embodiment 19.

This operation example assumes a case in which after picking of a product ordered by the user using mobile terminal 2402 is complete, package transport device 10$q$ loaded with the package waits at a predetermined position. In this operation example, it is assumed that package transport device 10$q$ starts delivering the package when the user approaches a predetermined position. Operations similar to Operation Example 1 are denoted with the same reference signs, and repeated description will be omitted as appropriate.

First, delivery service management system 2401 of management system 1C obtains the user's current location via the position information for mobile terminal 2402 (S2431).

Next, delivery service management system 2401 estimates the user's arrival time based on the user's current location information, the user's registration information, and the user's past travel history (S2432). Delivery service management system 2401 repeats this process until the user arrives at the predetermined position.

Next, delivery service management system 2401 determines whether the user has approached the predetermined position at the predetermined or user-specified time (S2443).

If delivery service management system 2401 determines that the user has approached the predetermined position at the predetermined or user-specified time (YES in S2443), delivery service management system 2401 outputs a delivery start instruction to operations management system 2400 of management system 1C. With this, operations management system 2400 outputs the delivery start instruction to package transport device 10$q$ (S2444). This causes package transport device 10$q$ to depart (S2445) and ship the package in the shipment box to the user at a predetermined position, at the predetermined or user-specified time. Delivery service management system 2401 then ends the processing illustrated in the flowchart.

If delivery service management system 2401 determines that the user has not approached the predetermined position at the predetermined or user-specified time (NO in S2443), delivery service management system 2401 determines whether the deadline for the scheduled delivery time has been reached (S2446).

If delivery service management system 2401 determines that the deadline for the scheduled delivery time has been reached (YES in S2446), delivery service management system 2401 displays a message on mobile terminal 2402 of the user asking the user to confirm whether to postpone the delivery time of the package (S2447). Stated differently, if the user does not arrive at the predetermined position at the predetermined or user-specified time, the user will not be able to receive the package, and thus delivery service management system 2401 confirms with the user whether the delivery time of the package should be postponed. In such cases, the user can take action such as postponing the delivery time by operating mobile terminal 2402. The processing in the flowchart of FIG. 162 then ends.

However, if delivery service management system 2401 determines that the deadline for the scheduled delivery time has not been reached (NO in S2446), delivery service management system 2401 outputs an instruction to package transport device 10$q$ to wait for a certain amount of time. With this, package transport device 10$q$ waits for a certain amount of time (S2448). The processing in the flowchart of FIG. 162 then returns to step S2431.

With this, in management system 1C, package transport device 10$q$ can ship the package to the predetermined location at the predetermined or user-specified time. Accordingly, management system 1C can reduce the time that a user is required to wait to pick up a package at the receiver (delivery destination).

Operation Example 3

FIG. 163A is a flowchart illustrating an example of an operation of product ordering system 2403 according to Operation Example 3 of Embodiment 19.

The operation example assumes a case in which the user uses mobile terminal 2402 to order a product with product ordering system 2403 displayed on the display screen of mobile terminal 2402.

First, the user opens the application operated by product ordering system 2403, selects a product with product ordering system 2403, and orders the selected product. Stated differently, the user presses the order button for the product they want to order in the application operated by product ordering system 2403 displayed on the display screen of mobile terminal 2402. Here, product ordering system 2403 inquires at a plurality of stores A and B near the user about the availability of the product selected by the user (S2451).

Next, product ordering system 2403 displays, on the product order screen, the products in stock at the nearest store A in color, and the products in stock only at the surrounding stores in gray (S2452). Stated differently, product ordering system 2403 displays products that are in stock at the nearest store A and products that are in stock only at surrounding stores in a different manner.

Next, if the product to be ordered is in stock at the nearest store A, product ordering system 2403 determines whether the product the user wants to order has been selected (S2453).

If the product the user wants to order is in stock at the nearest store A and the product the user wants to order is determined by product ordering system 2403 to have been selected (YES in S2453), the product the user wants to order is placed in the shopping cart in the application operated by product ordering system 2403 (S2454).

Next, the application operated by product ordering system 2403 displays an order confirmation screen (S2455) for the product the user wants to order. This causes the product order screen to display an order confirmation screen for the product selected by the user. When the user finishes confirming the selected product, they press the confirm button.

Next, product ordering system 2403 orders the product selected by the user from store A in response to the confirm button being pressed by the user (S2456). The processing in the flowchart of FIG. 163A then ends.

If product ordering system 2403 determines that the product the user wants to order is not in stock at the nearest store A (NO in S2453), product ordering system 2403 switches the order destination to a store that has the selected product in stock and displays this information on the order screen (S2457).

Next, the product the user wants to order is placed in the shopping cart in the application operated by product ordering system 2403 (S2458).

Next, the application operated by product ordering system 2403 displays an order confirmation screen (S2459) for the product the user wants to order. This causes the product order screen to display an order confirmation screen for the product selected by the user. When the user finishes confirming the selected product, they press the confirm button.

Next, product ordering system 2403 orders the product selected by the user from store B in response to the confirm button being pressed by the user (S2460). The processing in the flowchart of FIG. 163A then ends.

In this way, if a warehouse managed by product ordering system 2403 does not have the product the user wants to order in stock, product ordering system 2403 can inquire at a store near the user about the availability. This allows product ordering system 2403 to deliver products that users want to order from nearby stores.

Operation Example 4

FIG. 163B is a flowchart illustrating an example of an operation of product ordering system 2403 according to Operation Example 4 of Embodiment 19.

This operation example assumes a case in which, after a user orders a product from product ordering system 2403, if the store does not have the product in stock when the store starts picking the product, the store will, for example, check the availability of the product from a nearby store, present an alternative product to the user, or cancel the product order. In this operation example, it is assumed that after a product is ordered, the product is unavailable at the start of picking.

First, when the user orders a product, product ordering system 2403 displays, at a predetermined time, a message indicating store system 2404 to start picking the product (S2451*a*).

Next, product ordering system 2403 determines whether any of the products ordered by the user are not available (S2452*a*).

If product ordering system 2403 determines that not one of the products ordered by the user is not available (NO in S2452*a*), that is, if it determines that all of the products ordered by the user are in stock, it causes the store system of the store to display a message that at a predetermined time, it will start loading the package into the package transport device (S2456*a*). Product ordering system 2403 then ends the processing illustrated in the flowchart.

If product ordering system 2403 determines that any of the products ordered by the user is unavailable (YES in S2452*a*), it checks the availability of the product with stores nearby the store where the product was ordered (S2453*a*). With this, product ordering system 2403 notifies the store systems of the nearby stores with an instruction to check the availability of the product. An instruction to check the availability of the product ordered by the user will be displayed on the display screen of the store systems of the nearby stores.

Next, product ordering system 2403 determines whether any of the products ordered by the user are not available at the nearby stores (S2454*a*).

If product ordering system 2403 determines that the product ordered by the user is in stock at a nearby store and that not one of the products is unavailable (NO in S2454*a*), it calculates the expected time of arrival for delivery to the user's home from the nearby store where the product is in stock (S2457*a*).

Next, product ordering system 2403 notifies the user's mobile terminal 2402 that the product is available at a nearby store instead of the store where the product was ordered, notifies the calculated expected time of arrival, and inquires whether to confirm the order which includes delivery from the nearby store (S2458*a*). This allows the user to choose whether to confirm or cancel the order. Product ordering system 2403 then ends the processing illustrated in the flowchart.

However, if product ordering system 2403 determines that the product ordered by the user is not in stock at any nearby store and that any of the products is unavailable (YES in S2454*a*), it notifies user's mobile terminal 2402 that the ordered product is not in stock and inquires whether to cancel the order or switch to an alternative product. This causes mobile terminal 2402 to display a message indicating that the ordered product is out of stock, as well as options asking whether to cancel the ordered product or switch to an alternative product (S2455*a*). This allows the user to choose whether to cancel the order or switch to an alternative product. Product ordering system 2403 then ends the processing illustrated in the flowchart.

Thus, even if an ordered product is out of stock at the time of picking, it is possible to check with nearby stores to see if they have the product in stock, and if they do, the product can be delivered to the user who ordered the product. Even if the product is not in stock, an alternative product can be offered or the order can be canceled.

Operation Example 5

FIG. 163C is a flowchart illustrating an example of an operation of product ordering system 2403 according to Operation Example 5 of Embodiment 19.

This operation example assumes a case in which management system 1C can change the time of receipt or cancel the product since there are cases in which the user may not or cannot receive the package (product) after ordering the product from product ordering system 2403. This operation example also assumes that management system 1C manages vending machine 2408*d*.

First, management system 1C obtains the user's current location and movement status from user's mobile terminal 2402 (S2451*b*). Stated differently, management system 1C can obtain information indicating the user's current location and movement status by obtaining information indicating position information, information indicating movement speed, etc., from mobile terminal 2402 based on the GPS function installed in mobile terminal 2402.

Next, management system 1C calculates the time that the user must leave by to meet the pickup deadline of vending machine 2408*d*, based on the user's current location and movement speed indicated by the information indicating position information and the information indicating movement speed obtained from mobile terminal 2402 (S2452*b*).

Next, management system 1C determines whether a predetermined amount of time before the time that the user must leave by has been reached (S2453*b*).

If management system 1C determines that a predetermined amount of time before the time that the user must leave by has not been reached (NO in S2453*b*), management system 1C waits for a predetermined period (S2454*b*), and returns to the processing of step S2451*b*.

If management system 1C determines that a predetermined amount of time before the time that the user must leave by has been reached (YES in S2453*b*), management system 1C notifies the user of the following options: extend pickup deadline, pick up within the predetermined time (user must depart within X minutes to receive the package by the pickup deadline), or cancel pickup. (S2455*b*). Stated differently, management system 1C notifies mobile terminal 2402 of these options. Mobile terminal 2402 then presents these options.

Next, management system 1C determines which option the user selected (S2456*b*).

If the user chooses to cancel pickup ("cancel pickup" in S2456*b*), management system 1C cancels the product delivery (S2459*b*).

Next, management system 1C notifies the delivery person to collect the product (S2460*b*). With this, the delivery person collects the cancelled product. Management system 1C then ends the processing illustrated in the flowchart.

If the user chooses to pick up the product within a predetermined time ("pick up within predetermined time" in S2456*b*), management system 1C waits for a predetermined time (S2461*b*). Management system 1C then proceeds to step S2462*b*.

Next, management system 1C determines whether the package has been picked up by the user (S2462*b*).

If management system 1C determines that the package has been picked up by the user (YES in S2462*b*), the flowchart ends because the product has been delivered to the user.

However, if management system 1C determines that the package has not been picked up by the user (NO in S2462*b*), management system 1C notifies the user's mobile terminal 2402, asking the user "The scheduled pickup time has passed, do you want to extend the pickup time by paying an extension fee or do you want to cancel?" (S2463*b*). This causes mobile terminal 2402 to display the notification from management system 1C.

Next, management system 1C determines whether the user has selected to extend the pickup time (S2464*b*).

If management system 1C determines that the user has not selected to extend the pickup time, i.e., has selected to cancel the product (NO in S2464*b*) management system performs the processing of S2459*b*.

However, if management system 1C determines that the user has selected to extend the pickup time (YES in S2464*b*), management system 1C receives an extension fee and extends the maximum waiting time (S2465*b*).

Next, management system 1C waits for an additional predetermined time (S2466*b*). The predetermined time is, for example, 20 minutes. A limit may also be set as the maximum storage period, for example, up to 60 minutes from the start of storage. The predetermined time and maximum storage period given here are non-limiting examples.

Next, management system 1C determines whether the package has been picked up by the user (S2467*b*).

If management system 1C determines that the package has been picked up by the user (YES in S2467*b*), the flowchart ends because the product has been delivered to the user.

However, if management system 1C determines that the package has not been picked up by the user (NO in S2467*b*), management system 1C notifies the user's mobile terminal 2402, informing the user "The scheduled pickup time has passed; further extension is unavailable, pickup will be canceled." (S2468*b*). Mobile terminal 2402 then presents this notification. Management system 1C then ends the processing illustrated in the flowchart.

If the user chooses to extend the pickup deadline ("extend pickup deadline" in S2456*b*), management system 1C receive an extension fee from the user and extends the maximum waiting time (S2457*b*). Stated differently, management system 1C extends the maximum waiting time by informing the user in advance that an extension fee will be incurred and obtaining approval from the user.

Next, management system 1C waits for an additional predetermined time (S2458*b*). Management system 1C then proceeds to step S2462*b*.

Next, after waiting for the additional predetermined time, management system 1C determines whether the package has been picked up by the user (S2462*b*).

If management system 1C determines that the package has been picked up by the user (YES in S2462*b*), the flowchart ends because the product has been delivered to the user.

However, if management system 1C determines that the package has not been picked up by the user (NO in S2462*b*), management system 1C notifies the user's mobile terminal 2402, asking the user "The scheduled pickup time has passed, do you want to extend the pickup time by paying an extension fee or do you want to cancel?" (S2463*b*). This causes mobile terminal 2402 to display the notification from management system 1C again.

Next, management system 1C determines whether the user has selected to extend the pickup time (S2464*b*).

If management system 1C determines that the user has not selected to extend the pickup time, i.e., has selected to cancel the product (NO in S2464*b*) management system performs the processing of S2459*b*.

However, if management system 1C determines that the user has selected to extend the pickup time (YES in S2464*b*), management system 1C receives an extension fee again and further extends the maximum waiting time (S2465*b*).

Next, management system 1C further waits for an additional predetermined time (S2466*b*).

Next, management system 1C determines whether the package has been picked up by the user (S2467*b*).

If management system 1C determines that the package has been picked up by the user (YES in S2467*b*), the flowchart ends because the product has been delivered to the user.

However, if management system 1C determines that the package has not been picked up by the user (NO in S2467*b*), management system 1C notifies the user's mobile terminal 2402, informing the user "The scheduled pickup time has passed; further extension is unavailable, pickup will be canceled." (S2468*b*). Mobile terminal 2402 then presents this notification. Management system 1C then ends the processing illustrated in the flowchart.

Thus, even if a user orders a product, the user may not pick it up or may not be able to pick it up, so notifying user's mobile terminal 2402 of the time that the user must depart allows the user to choose whether or not they are willing to pick up the product. This streamlines the delivery of products in management system 1C, as the package can be delivered if the user is willing to pick up the product, and the product can be canceled if the user is not willing to pick up the product.

Operation Example 6

FIG. 164 is a flowchart illustrating an example of an operation of package transport device 10*q* according to Operation Example 6 of Embodiment 19.

This operation example assumes a case in which, when package transport device 10*q* is to lower the package at the receiver, the presence or absence of people present in the vicinity and the movement of those present determine whether or not the package is lowered toward vending machine 2408*d*. The operation example also assumes that the user orders a product and picks up the package at vending machine 2408*d*.

First, package transport device 10*q* obtains an image of the space vertically below using a sensor (S2461). More specifically, when package transport device 10*q* arrives at the receiver, package transport device 10*q* obtains an image of the space vertically below by a sensor on package transport device 10*q* capturing an image of the space vertically below package transport device 10*q*.

Next, package transport device 10*q* determines from the obtained image whether or not a person is present within a predetermined distance from the point where the package is to be unloaded (S2462).

If package transport device 10*q* determines that a person is present within a predetermined distance from the point where the package is to be unloaded (YES in S2462), package transport device 10*q* determines whether a person vertically below package transport device 10*q* is moving (S2463).

If package transport device 10*q* determines that a person vertically below package transport device 10*q* is moving (YES in S2463), package transport device 10*q* outputs an alert to that person. For example, package transport device 10*q* outputs an audible standby instruction via an acoustic device mounted on package transport device 10*q* to the effect of, for example, "package will now be unloaded, please remain still" (S2464).

Next, package transport device 10*q* waits for a predetermined time after the audio output (S2465). Then, package transport device 10*q* returns to the process in step S2461.

If package transport device 10*q* determines that no person is present within a predetermined distance from the point where the package is to be unloaded (NO in S2462), or if package transport device 10*q* determines that a person vertically below package transport device 10*q* is not moving (NO in S2463), package transport device 10*q* transmits, to vending machine 2408*d*, an opening instruction to open the top lid. When vending machine 2408*d* receives the opening instruction, it opens the top lid so that the delivered package can be stored. This causes package transport device 10*q* to begin lowering the package and continue lowering the package to vending machine 2408*d* (S2466).

Next, when package transport device 10*q* is lowering the package, vending machine 2408*d* suspends the sale of products. Stated differently, upon receipt of the opening instruction, the display screen of vending machine 2408*d* switches to receive mode, and vending machine 2408*d* suspends the sale of products (S2467).

Next, package transport device 10*q* determines whether or not the lowering of the package is complete (S2468). Stated differently, package transport device 10*q* lowers the package and determines if the package has been stored in vending machine 2408*d*.

If package transport device 10*q* determines that the lowering of the package is not complete (NO in S2468), package transport device 10*q* returns to the processing of step S2461.

However, if package transport device 10*q* determines that the lowering of the package is complete (YES in S2468), it notifies user's mobile terminal 2402 with a message such as "Delivery is complete, please pick up the package promptly." (S2469). This allows the user to pick up the package from vending machine 2408*d*, since the contents of the notification are displayed on the application on the display screen of mobile terminal 2402. The content of the notification in step S2469 given here is merely one, non-limiting example. The processing in the flowchart of FIG. 164 then ends.

Thus, when lowering the package, package transport device 10*q* audibly alerts people if people are present or moving around vending machine 2408*d*, since the package may come in contact with them. This will ensure their safety as they will follow the alert.

Operation Example 7

FIG. 165 is a flowchart illustrating an example of an operation of package transport device 10*q* according to Operation Example 7 of Embodiment 19.

This operation example assumes a case in which after the user orders a product using mobile terminal 2402, the package is lowered and housed in vending machine 2408*d* if package transport device 10*q* receives the user's consent from mobile terminal 2402, at the location where the package, which is the product, is to be picked up.

First, package transport device 10*q* starts delivering the package (S2471).

Next, package transport device 10*q* notifies user's mobile terminal 2402 of the estimated time of arrival, a predetermined time before arrival at the receiver (S2472). Here, it is assumed that the user has set the application of product ordering system 2403 ahead of time to "want to be notified X minutes before the estimated time of arrival".

Next, after package transport device 10*q* arrives at the receiver, package transport device 10*q* notifies user's mobile terminal 2402 that it has arrived at the receiver (S2473).

Next, package transport device 10*q* obtains the user's current location (current location of mobile terminal 2402) through the position information for mobile terminal 2402 (S2474). More specifically, package transport device 10*q* obtains the position information for mobile terminal 2402 using the GPS function installed in mobile terminal 2402 possessed by the user. Package transport device 10*q* obtains the position information for mobile terminal 2402 at predetermined intervals. Note that the position information for mobile terminal 2402 possessed by the user may be obtained by management system 1C.

Next, package transport device 10*q* determines whether the user has arrived within a predetermined distance from the receiver based on the obtained position information for mobile terminal 2402 (S2475). Note that management system 1C may make the determination in step S2475.

If package transport device 10*q* determines that the user has not arrived within a predetermined distance from the receiver (NO in S2475), package transport device 10*q* determines whether the user is located a predetermined distance or more from the receiver based on the obtained position information for mobile terminal 2402 (S2481).

If package transport device 10*q* determines that the user is located a predetermined distance or more from the receiver (YES in S2481), package transport device 10*q* waits for a certain amount of time (S2483). Then, package transport device 10*q* returns to the process in step S2474.

However, if package transport device 10*q* determines that the user is not located a predetermined distance or more from the receiver (NO in S2481), package transport device 10*q* temporarily clears the area of the receiver by moving from the receiver to another location (S2482). Stated differently, package transport device 10*q* moves slightly away from the receiver, and package transport device 10*q* waits at a location other than the receiver so that other package transport devices are not obstructed from storing packages in vending machine 2408*d*. Then, package transport device 10*q* returns to the process in step S2474.

If, in step S2475, package transport device 10*q* determines that the user has arrived within a predetermined distance from the receiver (YES in S2475), a notification is made to the application on mobile terminal 2402 asking, for example, "Have you arrived at the receiver? May I lower the package?" (S2476). Mobile terminal 2402 obtains the notification from package transport device 10*q*, and the application of mobile terminal 2402 displays the notification. This allows the user to receive the notification sent by package transport device 10*q* via mobile terminal 2402. The content of the notification in step S2476 given here is merely one, non-limiting example.

Next, package transport device 10*q* determines whether it has obtained a response to the notification of step S2476 from mobile terminal 2402, such as a reply of "You may lower." (S2477). The content of the reply in step S2477 given here is merely one, non-limiting example.

If package transport device 10*q* has not obtained a "you may lower" reply from mobile terminal 2402 (NO in S2477), package transport device 10*q* repeats the process in step S2477.

Here, the reply "You may lower." to the notification asking "Have you arrived at the receiver? May I drop the package?" is made by the user via the application on mobile terminal 2402. Stated differently, the user enters the reply, "You may lower.", into mobile terminal 2402.

If package transport device 10*q* obtains a "you may descend" reply from mobile terminal 2402 (YES in S2477), the display screen of vending machine 2408*d* switches to receive mode and vending machine 2408*d* is not available for placing orders (S2478). Stated differently, vending machine 2408*d* does not accept other orders while in receive mode to ensure that the user receives the package delivered by package transport device 10*q* from vending machine 2408*d*.

Next, package transport device 10*q* lowers the package to vending machine 2408*d* and stores the package in vending machine 2408*d* (S2479).

Next, package transport device 10*q* notifies the user's application with, for example, the message "Your package is ready for pickup. Please pick it up promptly." (S2480). Mobile terminal 2402 obtains the notification from package transport device 10*q*, and the application of mobile terminal 2402 displays the notification. The user then promptly picks up the package from vending machine 2408*d*. When the user completes the picking up of the package, vending machine 2408*d* exits receive mode and returns to the normal mode in which it accepts orders. The content of the notification in step S2479 given here is merely one, non-limiting example.

Operation Example 8

FIG. 166A illustrates an example of an operation of a ground placement type in which a person receives a package from package transport device 10*q* according to Operation Example 8 of Embodiment 19. FIG. 166B illustrates an example of an operation of an aerial pickup type in which a person receives a package directly from package transport device 10*q* according to Operation Example 8 of Embodiment 19.

This operation example describes how the user receives the product that the user ordered. This operation example assumes that the user ordered the product by operating vending machine 2408*d*. This operation example also assumes that the user waits near vending machine 2408*d* until the ordered product arrives. This operation example may be applied when the user orders a product on the application operated by product ordering system 2403 via mobile terminal 2402.

Methods for the user to receive the product include: package transport device 10*q* placing the product ordered by the user in a predetermined position and the user receiving the placed product; and the user receiving the ordered product directly from package transport device 10*q*.

As illustrated in FIG. 166A, in order for the user to receive a product carried by package transport device 10*q*, package transport device 10*q* arrives vertically above a package placement location provided in the vicinity of vending machine 2408*d*, lowers the package, and places the package at the package placement location to complete the delivery.

Here, the package placement location is a region provided in the vicinity of vending machine 2408*d*. To make the package placement location recognizable to the user, a pedestal, plate-like frame, or the above-described delivery box may be provided at the package placement location, or the package placement location may be marked with tape or the like.

This allows the user to receive a package delivered to the package placement location.

As illustrated in FIG. 166B, to hand the ordered product directly over to the user from package transport device 10*q*, package transport device 10*q* arrives vertically above the package placement location provided in the vicinity of vending machine 2408*d*, and lowers the package until it is in front of the user. When the package is positioned in front of the user, package transport device 10*q* stops the lowering of the package. At this time, the package is positioned in front of the user's abdominal area. For example, the package is placed at a height of about 90 cm from the ground.

This allows the user to receive the package placed in front of him or her by removing the package from the wire(s) of package transport device 10*q*.

In this way, in this operation example, a user can receive a package in a variety of ways. Vending machine 2408*d* may allow the user to choose how to receive the package.

Operation Example 9

FIG. 167 is a flowchart illustrating an example of an operation of product ordering system 2403 according to Operation Example 9 of Embodiment 19.

This operation example assumes a case in which product ordering system 2403 obtains weather information to extract deliverable time slots.

First, when the user orders the product, product ordering system 2403 obtains receiver location information, which is information indicating the location (address or latitude and longitude) of the receiver of the product (S2491).

Next, product ordering system 2403 obtains weather information for an area between the location of sender and the location of the receiver indicated in the receiver location information (S2492). The location of the sender is held in advance by product ordering system 2403.

Next, based on the obtained weather information and receiver location information, product ordering system 2403 determines whether there is a time period during which the wind speed exceeds a predetermined speed between the location of the sender and the location of the receiver (S2493).

If product ordering system 2403 determines, based on the obtained weather information, that there is a time period during which the wind speed exceeds a predetermined speed between the location of the sender and the location of the receiver (YES in S2493), product ordering system 2403 determines that delivery is not possible (S2494) in time period(s) during which the wind speed exceeds the predetermined speed. Product ordering system 2403 then proceeds to the pressing in step S2495.

However, if product ordering system 2403 determines, based on the obtained weather information, that there is no time period during which the wind speed exceeds a predetermined speed between the location of the sender and the location of the receiver (NO in S2493), product ordering system 2403 determines that delivery is possible in any time period (S2498). Product ordering system 2403 then proceeds to the pressing in step S2495.

Next, when the user orders the product, product ordering system 2403 sets the availability of delivery for each time period on the order date (S2495). More specifically, if YES in step S2493, product ordering system 2403 sets the available time periods to those in which the product can be delivered excluding the time period(s) during which the wind speed exceeds the predetermined speed. If NO in step S2493, product ordering system 2403 sets the product as deliverable in all time periods.

Next, if YES in step S2493, product ordering system 2403 displays to the user the deliverable time periods excluding the time period(s) during which the wind speed exceeds the predetermined speed (S2496).

However, if NO in step S2493, product ordering system 2403 displays to the user all time periods, during each of which the product is deliverable (S2496).

Next, product ordering system 2403 displays the time periods during which the product is deliverable on the application operated by product ordering system 2403 (S2497). More specifically, product ordering system 2403 displays a table of deliverable time periods, etc., on the display screen displaying the application. This allows the user to select the time period in which they wish to have the product delivered from the deliverable time periods displayed on the display screen. This thus allows the user to choose the time of day when the product can be delivered. This makes it more difficult for the customer to fail to receive the ordered product in the set time period due to weather changes.

Operation Example 10

FIG. 168 is a flowchart illustrating an example of an operation of delivery service management system 2401 according to Operation Example 10 of Embodiment 19.

This operation example assumes a case in which the delivery time is changed when, upon starting the picking of the product, the weather at the time of delivery of the package is expected to change.

First, when the user orders the product, delivery service management system 2401 obtains receiver location information, which is information indicating the location (address or latitude and longitude) of the receiver of the product, and a delivery span (S2501). The delivery span is calculated based on, for example, the location of the sender, the location of the receiver, the time of day the user wishes the product to be delivered, and the expected time of delivery, and is the span of time required for delivery in a predetermined time period.

Next, delivery service management system 2401 obtains weather information for an area between the location of sender and the location of the receiver indicated in the receiver location information (S2502).

Next, delivery service management system 2401 determines whether the wind speed, between the location of the sender and the location of the receiver, is estimated to exceed a predetermined speed during the delivery span based on the obtained weather information, receiver location information, and delivery span (S2503). Stated differently, delivery service management system 2401 determines whether there is a time period during which the wind speed exceeds a predetermined speed in the delivery span.

If delivery service management system 2401 determines that the wind speed, between the location of the sender and the location of the receiver, is not estimated to exceed a predetermined speed during the delivery span based on the obtained weather information, receiver location information, and delivery span (NO in S2503), delivery service management system 2401 instructs store system 2404 to begin the picking of the product (S2508). Delivery service management system 2401 then ends the processing illustrated in the flowchart.

However, if delivery service management system 2401 determines that the wind speed, between the location of the sender and the location of the receiver, is estimated to exceed a predetermined speed during the delivery span based on the obtained weather information, receiver location information, and delivery span (YES in S2503), delivery service management system 2401 notifies the user's mobile terminal 2402 with a message such as "Strong winds expected at this time. Do you want to postpone the delivery time? Do you want to cancel without postponing the delivery time?" (S2504). The content of the notification in step S2504 given here is merely one, non-limiting example.

Next, delivery service management system 2401 determines whether the answer to, for example, "Do you want to postpone the delivery time?" is YES or not (S2505). The content of the answer in step S2505 given here is merely one, non-limiting example.

If the answer to "Do you want to postpone the delivery time?" is NO (NO in S2505), delivery service management system 2401 cancels the order of the product by the user (S2509).

However, if the answer to "Do you want to postpone the delivery time?" is YES (YES in S2505), delivery service management system 2401 postpones the delivery time to a time that is after the scheduled delivery time and is associated with a wind speed less than m/s (S2506). More specifically, delivery service management system 2401 determines a time period that is after the scheduled delivery time and is associated with a wind speed less than 10 m/s based on the weather information. Delivery service management system 2401 may, for example, automatically change the delivery time to the nearest time associated with a wind speed less than 10 m/s, or it may present delivery times associated with a wind speed less than 10 m/s on mobile terminal 2402 for the user to select.

Next, delivery service management system 2401 notifies the application on mobile terminal 2402 of the scheduled postponed delivery time (S2507). For example, delivery service management system 2401 may notify mobile terminal 2402 in the user's possession or vending machine 2408*d*. Delivery service management system 2401 then ends the processing illustrated in the flowchart.

This allows delivery service management system 2401 to change the delivery time for the product ordered by the user to the user, even if weather conditions prevent the delivery of the product to the receiver. Delivery service management system 2401 also allows the user to cancel their order of the product, even if weather conditions prevent the delivery of the product to the receiver.

Operation Example 11

FIG. 169 is a flowchart illustrating an example of an operation of delivery service management system 2401 according to Operation Example 11 of Embodiment 19.

This operation example assumes a case in which the user checks the fullness of vending machine 2408*d* when ordering a product.

Delivery service management system 2401 inquires the receiver of the product ordered by the user regarding the fullness information of vending machine 2408*d* at the receiver (S2511). Vending machine 2408*d* confirms its fullness in response to the inquiry regarding fullness information from delivery service management system 2401, and responds with fullness information resulting from the confirmation. The fullness information is, for example, information indicating whether or not vending machine 2408*d* is full, or information indicating the number of available spaces in vending machine 2408*d*.

Next, upon obtaining the fullness information from vending machine 2408*d*, delivery service management system 2401 determines whether vending machine 2408*d* is currently full (S2512).

If delivery service management system 2401 determines that vending machine 2408*d* is not currently full (NO in S2512), delivery service management system 2401 notifies store system 2404 with an instruction to begin picking the product when the scheduled time comes (S21517). With this, store system 2404 obtains an instruction to start picking the product, and thus starts picking the product. Delivery service management system 2401 then ends the processing illustrated in the flowchart.

If delivery service management system 2401 determines that vending machine 2408*d* is currently full (YES in S2512), delivery service management system 2401 notifies mobile terminal 2402 with the message "Scheduled vending machine 2408*d* is full. Do you want to postpone the delivery time, change delivery to the nearest vending machine 2408*d*, or directly receive package next to vending machine 2408*d*?" (S2513). The content of the notification in step S2513 given here is merely one, non-limiting example.

Next, delivery service management system 2401 determines which of the options the user selected in response to the notification in step S2513 (S2514).

If, in step S2514, delivery service management system 2401 determines that the user has selected to postpone the delivery time, it postpones the start time of the picking or the start time of the delivery by a predetermined amount of time, i.e., resets the delivery time by postponing the delivery time (S2515). If the start time of the picking or the start time of delivery is postponed for a predetermined amount of time, i.e., if the delivery time is postponed, delivery service management system 2401 sets the time so that the picking up of the product at the receiver by the user does not overlap with the time of delivery of another product ordered by a different user.

Next, delivery service management system 2401 notifies the customer who placed an order before the user whose product delivery time was postponed in step S2515 with the message "The next product delivery is coming, please pick up your product within 10 minutes." (S2516). Delivery service management system 2401 then ends the processing illustrated in the flowchart. The content of the notification in step S2516 given here is merely one, non-limiting example.

If, in step S2514, delivery service management system 2401 determines that the user has selected to change the delivery to the second nearest vending machine 2408*d*, delivery service management system 2401 notifies the user of the receiver and the time of delivery completion for the selected second nearest vending machine 2408*d* (S2518).

Next, delivery service management system 2401 notifies store system 2404 with an instruction to begin picking the product (S2519). With this, store system 2404 obtains an instruction to start picking the product, and thus starts picking the product. Delivery service management system 2401 then ends the processing illustrated in the flowchart.

If, in step S2514, delivery service management system 2401 determines that the user has selected to directly receive the package, delivery service management system 2401 notifies mobile terminal 2402 with a message pertaining to direct package receipt of, for example, "Please receive the package within a predetermined amount of time after package transport device 10*q* arrives." (S2520). This allows the user to be mindful to pick up the package, which is the product, as soon as package transport device 10*q* arrives. The content of the notification in step S2520 given here is merely one, non-limiting example.

Next, delivery service management system 2401 notifies store system 2404 with an instruction to begin picking the product (S2521). With this, store system 2404 obtains an instruction to start picking the product, and thus starts picking the product.

Next, package transport device 10*q* that makes the delivery unloads the package in the vicinity of vending machine 2408*d* (S2522). This allows the user to receive the package from package transport device 10*q*. Delivery service management system 2401 then ends the processing illustrated in the flowchart.

Embodiment 20

FIG. 170A is a perspective view illustrating an example of rail 7 according to Embodiment 20. FIG. 170B is a top view illustrating an example of rail 7 according to Embodiment 20. FIG. 170C is a side view illustrating an example of rail 7 according to Embodiment 20. FIG. 170D is a top view and a side view illustrating an example of rail 7 according to Embodiment 20.

Hereinafter, as illustrated in FIG. 170A through FIG. 170D, since the basic configuration of rail 7 according to the present embodiment is the same as the basic configuration of the rail according to Embodiment 1 and the like, regarding the basic configuration of rail 7 in the present embodiment, the same reference signs as above will be used and repeated description will be omitted where appropriate. Additionally, since the basic configuration of the package transport device according to the present embodiment is the same as the basic configuration of the unmanned aerial vehicle of Embodiment 1 and the same as the basic configuration of the package transport device according to Embodiment 12 and the like, regarding the basic configuration of the package transport device in the present embodiment, the same reference signs as above will be used and repeated description will be omitted where appropriate. The present embodiment may also be used with lifting systems, unmanned aerial vehicles, and delivery boxes according to embodiments other than Embodiment 1.

First, an example will be given in which rail 7 extends in two directions about support pillar 19.

Rail 7 includes first rail 7*a*, second rail 7*b*, and third rail 7*c*.

First rail 7*a* is arranged to extend in a predetermined direction to support pillar 19, and second rail 7*b* is arranged to extend from support pillar 19 to the left in the drawing, so as to intersect the lengthwise direction of first rail 7*a*.

Third rail 7*c* is connected to and supported by first rail 7*a* and second rail 7*b* so that it is continuous with first rail 7*a* and second rail 7*b*. More specifically, one end of third rail 7*c* is connected to first rail 7*a* and the other end of third rail 7*c* is connected to second rail 7*b*.

Third rail 7*c* is fixed to support pillar 19 via rail support portion 7*x* and is positioned away from support pillar 19 so as to avoid support pillar 19. Rail support portion 7*x* is fixed to support pillar 19 so as to protrude in a direction perpendicular to the direction in which support pillar 19 extends. Stated differently, one end of rail support portion 7*x* is coupled to support pillar 19, and the other end of rail support portion 7*x* is coupled to third rail 7*c*.

At one end of third rail 7*c*, slope 7*cs* is formed so that the package transport device can ride from first rail 7*a* to third rail 7*c* or vice versa when traveling on rail 7. At the other end of third rail 7*c* as well, slope 7*cs* is formed so that the package transport device can ride from second rail 7*b* to third rail 7*c* and vice versa when traveling on rail 7. In other words, slopes 7*cs* are formed at both ends of third rail 7*c*. The package transport device can thus smoothly transfer between first rail 7*a* and third rail 7*c* and between second rail 7*b* and third rail 7*c*.

In the present embodiment, as illustrated in FIG. 170D, the distance from one end of third rail 7*c* to support pillar 19 and the distance from the other end of third rail 7*c* to support pillar 19 are set to 2 meters. The minimum distance from support pillar 19 to third rail 7*c* is set to 62 centimeters. Third rail 7*c* is arc-shaped with a radius of 2 meters. The radius of support pillar 19 is set to 20 centimeters. The height of third rail 7*c* is set to 5 centimeters.

Next, an example will be given in which rail 7 extends in three directions about support pillar 19 with reference to FIG. 171 through FIG. 172D.

FIG. 171 is a perspective view illustrating an example of rail 7 and package transport device 10*q* according to Embodiment 20. FIG. 172A is a top view illustrating an example of rail 7 according to Embodiment 20. FIG. 1728 is a side view illustrating an example of rail 7 according to Embodiment 20. FIG. 172C is an enlarged partial perspective view illustrating an example of rail 7 according to Embodiment 20. FIG. 172D includes a top view and a side view of rail 7 according to Embodiment 20, and an enlarged top view at the connection portion between third rails 7*c*11 and 7*c*12 and first rail 7*a*.

As illustrated in FIG. 171 through FIG. 172D, rail 7 includes first rail 7*a*, second rail 7*b*, and third rails 7*c*11 and 7*c*12.

In a view of first rail 7*a*, second rail 7*b* and third rails 7*c*11 and 7*c*12 along the horizontal direction, third rails 7*c*11 and 7*c*12 are arranged on the upper surfaces of first rail 7*a* and second rail 7*b*.

First rail 7*a* is fixed to support pillar 19 at one end and extends from support pillar 19 in a predetermined direction. Second rail 7*b* extends in a direction intersecting first rail 7*a*, is fixed to support pillar 19 located at the intersection with first rail 7*a*, and extends in two directions so as to be point symmetrical about support pillar 19. Stated differently, first rail 7*a* and second rail 7*b* form a T-shape in top view.

Slopes 7*cs* are formed at both ends of third rail 7*c*11, as in FIG. 170C.

At the other end of third rail 7*c*12, slope 7*cs* is formed so that package transport device 10*q* can ride from second rail 7*b* to third rail 7*c*12 or vice versa when traveling on rail 7. Slope 7*cs* is formed at the one end of third rail 7*c*12. The one end of third rail 7*c*12 is connected to first rail 7*a*, spaced apart from the one end of third rail 7*c*11. Stated differently, gap 7*s* is formed between the one end of third rail 7*c*12 and third rail 7*c*11.

For example, when package transport device 10*q* travels on first rail 7*a* and turns left, package transport device 10*q* can turn left at a high speed because package transport device 10*q* can travel as-is unobstructed. When package transport device 10*q* travels on first rail 7*a* and turns right, package transport device 10*q* lifts connector 2520, moves roller 2527 away from third rail 7*c*11, and moves package transport device 10*q* forward at a low speed so that package transport device 10*q* can cross gap 7*s* between the one end of third rail 7*c*12 and third rail 7*c*11, from third rail 7*c*11. When package transport device 10*q* crosses gap 7*s*, it lowers connector 2520 and places rollers 2527 on third rail 7*c*12. Package transport device 10*q* can turn right at low speed by doing so for all connectors 2520. Roller 2527 is one example of the rotating roller.

Next, an example of a case in which one first rail 7*a* is supported by support pillar 19 will be given.

FIG. 173 is a perspective view illustrating an example of rail 7 according to Embodiment 20. FIG. 174A is a top view illustrating an example of rail 7 according to Embodiment 20. FIG. 174B is a side view illustrating an example of rail 7 according to Embodiment 20. FIG. 174C is an enlarged partial perspective view illustrating an example of rail 7 according to Embodiment 20.

As illustrated in FIG. 173 through FIG. 174C, rail 7 includes first rail 7*a* and bypass rail 7*c*13.

First rail 7*a* extends in two directions so as to have point symmetry around support pillar 19. Stated differently, one side of first rail 7*a* extends in a predetermined direction and the other side extends in the direction opposite to the predetermined direction.

Bypass rail 7*c*13 is connected to and supported by first rail 7*a* so that it intersects first rail 7*a*. More specifically, one end of bypass rail 7*c*13 is connected to the one side of first rail 7*a* and the other end is connected to the other side of first rail 7*a*. Bypass rail 7*c*13 is fixed to support pillar 19 via rail support portion 7*x* and to first rail 7*a* via rail support portion 7*x*. Bypass rail 7*c*13 is spaced apart from support pillar 19 so as to bypass support pillar 19.

Rail support portion 7*x* is fixed to support pillar 19 so as to protrude in a direction perpendicular to the direction in which support pillar 19 extends. Stated differently, one end of rail support portion 7*x* is coupled to first rail 7*a*, and the other end of rail support portion 7*x* is coupled bypass rail 7*c*13.

At the one end of bypass rail 7*c*13, slope 7*cs* is formed so that package transport device 10*q* can ride from first rail 7*a* to bypass rail 7*c*13 or vice versa when traveling on the one side of rail 7. At the other end of bypass rail 7*c*13, slope 7*cs* is formed so that package transport device 10*q* can ride from first rail 7*a* to bypass rail 7*c*13 or vice versa when traveling on the other side of rail 7. In other words, slopes 7*cs* are formed at both ends of bypass rail 7*c*13. Bypass rail 7*c*13 is one example of the third rail.

Variation of Embodiment 20

FIG. 175 is a perspective view, a side view, and a top view of rail 7 and rail support members 7*x*5 according to a variation of Embodiment 20.

Hereinafter, as illustrated in FIG. 175, since the basic configuration of rail 7 according to the present variation is the same as the basic configuration of the rail according to Embodiment 1 and the like, regarding the basic configuration of rail 7 in the present variation, the same reference signs as above will be used and repeated description will be omitted where appropriate. Rail 7 according to the present variation differs from Embodiment 20 in that it includes a plurality of rail support members 7*x*5.

Rail 7 includes first rail 7*a*, second rail 7*b*, and third rail 7*c*.

First rail 7*a* and second rail 7*b* intersect.

First rail 7*a* and second rail 7*b* are coupled and supported by a plurality of rail support members 7*x*5. Four of the plurality of rail support members 7*x*5 are coupled to first rail 7*a* and second rail 7*b* so as to surround the intersection of first rail 7*a* and second rail 7*b*.

Rail support member 7*x*5*a*, which is one of the four rail support members 7*x*5, includes one end coupled to one side of first rail 7*a* and another end coupled to one side of second rail 7*b*. Here, the term "side" is relative to the intersection of first rail 7*a* and second rail 7*b*. Rail support member 7*x*5*a* is also coupled to third rail 7*c* and support third rail 7*c*.

Rail support member 7*x*5*b*, which is a different one of the four rails 7*x*5, is arranged approximately parallel to the lengthwise direction of rail support member 7*x*5*a*. Rail support member 7*x*5*b* includes one end coupled to the other side of first rail 7*a* and another end coupled to the other side of second rail 7*b*.

Rail support member 7*x*5*c*, which is yet a different one of the four rail support members 7*x*5, includes one end coupled to the coupling point of rail support member 7*x*5*a* and the one side of first rail 7*a*, and another end coupled to the coupling point of rail support member 7*x*5*b* and the other side of second rail 7*b*.

Rail support member 7*x*5*d*, which is the remaining one of the four rail support members 7*x*5, includes one end coupled to the coupling point of rail support member 7*x*5*a* and the one side of second rail 7*b*, and another end coupled to the coupling point of rail support member 7*x*5*b* and the other side of first rail 7*a*.

Other rail support members 7*x*5*e* are arranged approximately parallel to the lengthwise direction of rail support member 7*x*5*c*. Rail support members 7*x*5*e* include one end coupled to the one side of first rail 7*a* and another end coupled to the other side of second rail 7*b*.

Yet other rail support members 7*x*5*f* are arranged approximately parallel to the lengthwise direction of rail support member 7*x*5*d*. Rail support members 7*x*5*f* include one end coupled to the one side of second rail 7*b* and another end coupled to the other side of first rail 7*a*.

FIG. 175 illustrates an example of rail support members 7*x*5, but rail support members 7*x*5 may support rail 7 as in FIG. 176. FIG. 176 is a top view and a side view of another example of rail 7 and rail support members 7*x*5 according to a variation of Embodiment 20.

First rail 7*a* and second rail 7*b* are coupled and supported by a plurality of rail support members 7*x*5.

Rail support member 7*x*5*g*, which is one of rail support members 7*x*5, includes one end coupled to one side of first rail 7*a* and another end coupled to one side of second rail 7*b*. Here, the term "side" is relative to the intersection of first rail 7*a* and second rail 7*b*. Rail support member 7*x*5*g* is also coupled to third rail 7*c* and support third rail 7*c*.

Rail support member 7*x*5*h*, which is one of rail support members 7*x*5, is arranged approximately parallel to the lengthwise direction of rail support member 7*x*5*g*. Rail support member 7*x*5*h* includes one end coupled to the other side of first rail 7*a* and another end coupled to the other side of second rail 7*b*.

Rail support member 7*x*5*i*, which is one of rail support members 7*x*5, includes one end coupled to a coupling point on rail support member 7*x*5*g*, and another end coupled to a coupling point on rail support member 7*x*5*h*.

Thus, since a plurality of rail support members 7*x*5 are coupled at the intersection of first rail 7*a* and second rail 7*b*, when package transport device 10*q* moves from first rail 7*a* to second rail 7*b* via third rail 7*c* or vice versa, rail 7 can be inhibited from bending vertically downward due to the weight of package transport device 10*q*. Thus, when package transport device 10*q* turns right or left at the intersection of first rail 7*a* and second rail 7*b*, package transport device 10*q* can maintain its attitude (inclination) when traveling on rail 7. This makes it more difficult for package transport device 10*q* to fall off rail 7.

Embodiment 21

FIG. 177 is a perspective view illustrating an example of package transport device 10*q*1 according to Embodiment 21. FIG. 178A illustrates the internal structure of first connector 2521 and second connector 2522 of package transport device 10*q*1 according to Embodiment 21. FIG. 178B illustrates the internal structure of third connector 2523 of package transport device 10*q*1 according to Embodiment 21.

Hereinafter, as illustrated in FIG. 177 through FIG. 178B, since the basic configuration of package transport device 10*q*1 according to the present embodiment is the same as the basic configuration of the unmanned aerial vehicle of Embodiment 1 and the same as the basic configuration of the package transport device according to Embodiment 12 and the like, regarding the basic configuration of package transport device 10*q*1 in the present embodiment, the same reference signs as above will be used and repeated description will be omitted where appropriate.

Package transport device 10*q*1 is an unmanned mobile body or the like that travels on rail 7. In other words, package transport device 10*q*1 can move along rail 7 provided above the ground that it is attached to. For example, package transport device 10*q*1 can carry a package from the sender to the receiver while a plurality of connectors 2520 are connected to rail 7.

Package transport device 10*q*1 includes vehicle main body 2501, rail slider portion 2510, control processor 2530, a plurality of connectors 2520, turntable 2540, side propeller 2551, and propeller actuation motor 2552.

Vehicle main body 2501 is a rectangular enclosure elongated in the lengthwise direction of rail 7. The plurality of connectors 2520, turntable 2540, etc., are provided on the top of vehicle main body 2501. Rail slider portion 2510, etc., is provided on the bottom of vehicle main body 2501.

Package transport device 10*q*1 may include a plurality of propellers that can fly vehicle main body 2501 by being rotationally driven by a propeller actuation motor.

Rail slider portion 2510 is extendable with respect to vehicle main body 2501. Rail slider portion 2510 includes slider main body 2510*a*, package holder 2555, and a motor actuator.

Slider main body 2510*a* is coupled to vehicle main body 2501. Slider main body 2510*a* is elongated in the lengthwise direction of vehicle main body 2501. In the present embodiment, slider main body 2510*a* is exemplified as coupled to the lower surface of vehicle main body 2501, but slider main body 2510*a* may be configured to extend in the lengthwise direction of vehicle main body 2501 and retract to the original position.

Slider main body 2510*a* includes first slider 2511 and second slider 2512. Although slider main body 2510*a* is exemplified as including two sliders, slider main body 2510*a* may include one or three or more sliders. Note that first slider 2511 and second slider 2512 and the like may be collectively referred to simply as "sliders". Although not illustrated, a balancer may be provided on the side propeller 2551 side of the sliders to balance the weight with the package.

First slider 2511 and second slider 2512 are arranged on one side of vehicle main body 2501 and are configured to extend from the one side of vehicle main body 2501 further along the lengthwise direction of vehicle main body 2501 and retract to their original positions. First slider 2511, second slider 2512, and slider main body 2510*a* are aligned in listed order when first slider 2511 and second slider 2512 are extended away from vehicle main body 2501.

More specifically, first slider 2511 is arranged vertically below vehicle main body 2501, and can extend from the one side of vehicle main body 2501 along the lengthwise direction of vehicle main body 2501 so as to move away from vehicle main body 2501, and can retract to a position vertically below vehicle main body 2501. Second slider 2512 is coupled to the vertical lower surface of first slider 2511 and can extend from the one side of first slider 2511 along the lengthwise direction of vehicle main body 2501 so as to move away from vehicle main body 2501, and can retract to a position vertically below vehicle main body 2501.

Package holder 2555 is provided at the leading end of rail slider portion 2510. In the present embodiment, package holder 2555 is provided at the leading end of second slider 2512.

Package holder 2555 is arranged at one end of rail slider portion 2510 and can hold attached packages. Note that package holder 2555 is exemplified as provided at the leading end of second slider 2512, but there may be one or three or more sliders. In such cases, package holder 2555 is provided at the leading end of the slider farthest from vehicle main body 2501 when all sliders are extended.

Once package transport device 10*q*1 has arrived at rail 7 located in front of the receiver, control processor 2530 controls a motor capable of rotating turntable 2540 so as to rotate turntable 2540 and thus rotate third connector 2523.

After turntable 2540 rotates vehicle main body 2501, control processor 2530 controls the motor actuator so as to extend each of the sliders with respect to vehicle main body 2501. More specifically, control processor 2530 controls the motor actuator so as to extend first slider 2511 and second slider 2512 from vehicle main body 2501.

Control processor 2530 controls the rear propeller actuation motor 2552 for rotating side propeller 2551 to control the traveling speed of package transport device 10*q*1 (rotation speed of side propeller 2551) or stop the traveling of package transport device 10*q*1.

The motor actuator extends each of the sliders with respect to vehicle main body 2501. More specifically, in response to a control instruction from control processor 2530, the motor actuator extends first slider 2511 and second slider 2512 along the lengthwise direction of vehicle main body 2501 so as to move away from vehicle main body 2501.

Connector 2520 is held by (connected to) rail 7 located above vehicle main body 2501. More specifically, connector 2520 can be connected to rail 7 located at a position spaced apart from the ground surface with vehicle main body 2501 hanging from the connector. In the present embodiment, vehicle main body 2501 includes a plurality of connectors 2520. The plurality of connectors 2520 include first connector 2521, second connector 2522, and third connector 2523. In the present embodiment, three connectors 2520—namely first connector 2521, second connector 2522, and third connector 2523—are provided as the plurality of connectors 2520. However, the plurality of connectors 2520 may include two or four or more.

First connector 2521 is located on one side in the lengthwise direction of vehicle main body 2501. Second connector 2522 is located on the other side in the lengthwise direction of vehicle main body 2501. Third connector 2523 is located in the central region of vehicle main body 2501 between the one side and the other side in the lengthwise direction of vehicle main body 2501. Connectors 2520 are one example of the rail holder. First connector 2521 is one example of the first rail holder. Second connector 2522 is one example of the second rail holder. Third connector 2523 is one example of the third rail holder.

As illustrated in FIG. 178A and FIG. 178B, each of first connector 2521, second connector 2522, and third connector 2523 includes roller support portion 2525*a*, spring 2525*b*, shaft 2525*c*, slide motor 2526, roller 2527, and roller axle support 2525*d*.

Roller support portion 2525*a* can extend and retract along the vertical direction with respect to vehicle main body 2501.

More specifically, roller support portion 2525*a* includes outer enclosure 2525*a*1 and spring guide portion 2525*a*2.

Outer enclosure 2525*a*1 is an elongated, bottomed, cylindrical shape with a vertical upper opening, and houses spring 2525*b* and spring guide portion 2525*a*2 therein. Spring guide portion 2525*a*2 is an elongated, bottomed, cylindrical shape with a vertical downward opening, and houses slide motor 2526 and part of shaft 2525*c* therein. Flange 2525*a*3 for supporting one end of spring 2525*b* is formed at the vertical upper end portion of spring guide portion 2525*a*2. Spring 2525*b* is provided around the outer circumference of spring guide portion 2525*a*2.

Spring guide portion 2525*a*2 can move vertically upward with respect to outer enclosure 2525*a*1 by being driven by slide motor 2526. At this time, spring guide portion 2525*a*2 slides while being guided by outer enclosure 2525*a*1.

Spring 2525*b* is a coil spring and is provided around the outer circumference of spring guide portion 2525*a*2 while inserted into spring guide portion 2525*a*2. One end of spring 2525*b* is supported by flange 2525*a*3 of spring guide portion 2525*a*2, and the other end of spring 2525*b* is supported by the bottom of outer enclosure 2525*a*1.

When the driving by slide motor 2526 stops, the elastic force of spring 2525*b* causes spring 2525*b* to pull spring guide portion 2525*a*2, thereby moving spring guide portion 2525*a*2 vertically downward and housing spring guide portion 2525*a*2 inside outer enclosure 2525*a*1.

Shaft 2525*c* is inserted through outer enclosure 2525*a*1, and includes one end coupled to vehicle main body 2501 and another end provided with roller 2527 and roller axle support 2525*d*. Slide motor 2526 is attached to shaft 2525*c*. Part of shaft 2525*c* can move vertically upward by being driven by slide motor 2526.

More specifically, shaft 2525*c* extends in the vertical direction and includes a cylindrical first shaft and a cylindrical second shaft with a portion of the first shaft inserted inside. One end of the first shaft is a free end that is inserted inside the second shaft and can move vertically, and the other end of the first shaft is coupled to vehicle main body 2501. One end of the second shaft is coupled to the top end of spring guide portion 2525*a*2, and the other end of the second shaft is coupled to slide motor 2526. Therefore, when slide motor 2526 is driven, the second shaft moves vertically while being guided by the first shaft.

For example, slide motor 2526 is a stepping motor, and is housed inside spring guide portion 2525*a*2. Slide motor 2526 is controlled by control processor 2530 to apply a vertical upward force from outer enclosure 2525*a*1 to spring guide portion 2525*a*2 via shaft 2525*c* so that spring guide portion 2525*a*2 extends from outer enclosure 2525*a*1. Stated differently, slide motor 2526 can slide spring guide portion 2525*a*2 vertically upward with respect to outer enclosure 2525*a*1. Slide motor 2526 is one example of the motor.

Roller 2527 can travel on rail 7 by rotatably contacting rail 7. Roller 2527 is rotatably supported by roller axle support 2525*d* at the vertical upper end of roller support portion 2525*a*. A recess that can engage rail 7 is formed in roller 2527. This makes it difficult for this roller 2527 to derail from rail 7.

Roller axle support 2525*d* is fixed to the vertical upper end of roller support portion 2525*a* and extends in a direction orthogonal to the lengthwise direction of roller support portion 2525*a*. Roller axle support 2525*d* rotatably supports roller 2527 with respect to rail 7. Roller axle support 2525*d* may include an electric motor. In such cases, roller 2527 rotates by being coupled to the rotary shaft of the electric motor.

As illustrated in FIG. 178B, third connector 2523 further includes slide block 2529 that slides on slide rail 2541 provided on turntable 2540. Slide block 2529 is coupled to the vertical lower end of third connector 2523.

In the present embodiment, third connector 2523 is exemplified as including two rollers 2527 and two roller axle supports 2525*d*, but third connector 2523 may include three or more of each or one of each. Similarly, first connector 2521 and second connector 2522 are each exemplified as including one roller 2527 and one roller axle support 2525*d*, but first connector 2521 and second connector 2522 each may include two or more of each of these.

Here, roller 2527 of first connector 2521 is one example of the first rotating roller. Roller 2527 of second connector 2522 is one example of the second rotating roller. The two rollers 2527 of third connector 2523 are one example of the third rotating roller and the fourth rotating roller.

Turntable 2540 is provided on the upper surface of vehicle main body 2501, between vehicle main body 2501 and third connector 2523. Third connector 2523 is coupled to turntable 2540. In response to a control instruction from control processor 2530, turntable 2540 applies stress to rotate vehicle main body 2501. Accordingly, when third connector 2523 is connected to rail 7, turntable 2540 can rotate vehicle main body 2501 around center point O. With this, turntable 2540 rotates vehicle main body 2501 until the lengthwise direction of the frame approximately perpendicularly intersects the extending direction of rail 7.

Turntable 2540 includes a straight slide rail 2541 that includes the center of rotation. Slide block 2529 provided on third connector 2523 slides on slide rail 2541. Stoppers are arranged at both ends of slide rail 2541 to prevent slide block 2529 from coming off slide rail 2541.

FIG. 179A illustrates an example of the internal structure of turntable 2540 of the package transport device according to Embodiment 21.

As illustrated in FIG. 179A, turntable 2540 includes rotary shaft 2542 and platform 2540*a* that is rotated by rotary shaft 2542. Rotary shaft 2542 extends in the vertical direction, orthogonal to the upper surface of vehicle main body 2501. Rotary shaft 2542 is driven by motor 2543 provided in vehicle main body 2501 being controlled by control processor 2530, which rotates via motor 2543 and worm 2544. Platform 2540*a* is coupled vertically above rotary shaft 2542. Platform 2540*a* is disc-shaped. Rotary shaft 2542 is coupled to the central region of platform 2540*a*. As illustrated in FIG. 177, slide rail 2541 is arranged on the upper surface of platform 2540*a*.

FIG. 179B is a side view illustrating an example of slide rail 2541 of package transport device 10*q*1 according to Embodiment 21. FIG. 179C is a top view illustrating an example of slide block 2529 of package transport device 10*q*1 according to Embodiment 21. Note that illustration of motor 2545 is omitted in FIG. 179C. FIG. 179D is a front view illustrating an example of the left side components, ball screw 2541*c*, and guide 2541*a* of slide block 2529 of package transport device 10*q*1 according to Embodiment 21. FIG. 179E is a front view illustrating an example of the right side components, ball screw 2541*c*, and guide 2541*a* of a slider of package transport device 1081 according to Embodiment 21.

As illustrated in FIG. 179B through FIG. 179E, slide rail 2541 is, for example, a linear guide. Slide rail 2541 includes, for example, two guides 2541*a*, guide rail 2541*b*, two ball screws 2541*c*, and motor 2545. The two motors 2541*d* rotate the two ball screws 2541*c* in a one-to-one synchronized manner while the two guides 2541*a* maintain the attitude of slide block 2529, allowing slide block 2529 to move along the lengthwise direction of guide rail 2541*b*. Slide block 2529 includes, for example, two clutch blocks 2541*e* and linear block 2541*f*. Slide block 2529 can move along slide rail 2541 by motor 2545 provided in turntable 2540 being controlled by control processor 2530.

As illustrated in FIG. 177, side propeller 2551 is provided on the other side of vehicle main body 2501 (the side opposite the side in the traveling direction). Side propeller 2551 provides propulsion force to vehicle main body 2501 in a direction parallel to rail 7. More specifically, side propeller 2551 is rotated by propeller actuation motor 2552 attached to propeller support portion 22*a*9 to provide propulsion force to vehicle main body 2501.

Propeller actuation motor 2552 controls the rotation rate of side propeller 2551 in response to a control instruction from control processor 2530.

With package transport device 10*q*1 configured in this manner, roller 2527 can be separated from rail 7 by extending connector 2520. Similarly, roller 2527 can be placed on rail 7 by retracting connector 2520. Although all connectors 2520 are arranged on the right side in a view along the traveling direction in the example in FIG. 177, third connector 2523 can be arranged on the left side in a view along the traveling direction by rotating turntable 2540. By rotating turntable 2540 in a state in which only third connector 2523 is coupled to rail 7, vehicle main body 2501 rotates, which makes it possible to reverse the traveling direction of package transport device 10*q*1. Third connector 2523 can be transferred horizontally by moving slide block 2529 provided on slide rail 2541 of turntable 2540. Stated differently, rollers 2527 of third connector 2523 can be moved horizontally away from or closer to rail 7. First slider 2511 and second slider 2512 can also be extended to deliver the package to a location spaced horizontally away from package transport device 10*q*1.

Variation of Embodiment 21

FIG. 180 is a perspective view illustrating an example of package transport device 10*q*2 according to a variation of Embodiment 21.

Hereinafter, as illustrated in FIG. 180, since the basic configuration of package transport device 10*q*2 according to the present variation is the same as the basic configuration of the unmanned aerial vehicle of Embodiment 1 and the same as the basic configuration of the package transport device according to Embodiment 21 and the like, regarding the basic configuration of package transport device 10*q*2 in the present variation, the same reference signs as above will be used and repeated description will be omitted where appropriate. Package transport device 10*q*2 according to the present variation differs from the package transport device according to Embodiment 21 in that first connector 2521, second connector 2522, turntable 2540, and third connector 2523 move with respect to vehicle main body 2501. Package transport device 10*q*2 according to the present variation does not include the slide rail of Embodiment 21, but may include a slide rail. Third connector 2523 of package transport device 10*q*2 does not include a lifting mechanism achieved by spring 2525*b*, slide motor 2526, etc.

Package transport device 10*q*2 according to the present variation includes first sliding mechanisms 2560*a* and 2560*b* that move first connector 2521 and second connector 2522.

First sliding mechanism 2560*a* is arranged between first connector 2521 and vehicle main body 2501 and extends with respect to vehicle main body 2501. First sliding mechanism 2560*b* is also arranged between first connector 2521 and vehicle main body 2501 and extends with respect to vehicle main body 2501. First sliding mechanism 2560*a* is one example of the second slider portion. First sliding mechanism 2560*b* is one example of the third slider portion.

More specifically, first sliding mechanism 2560*a* includes connector support portion 2562*a* that slides in a direction that is horizontal and orthogonal to the lengthwise direction of vehicle main body 2501, and slide main body portion 2561*a* that slidably supports connector support portion 2562*a*. First sliding mechanism 2560*b* includes connector support portion 2562*b* that slides in a direction orthogonal to the lengthwise direction of vehicle main body 2501 and in the horizontal direction, and slide main body portion 2561*b* that slidably supports connector support portion 2562*b*.

Connector support portion 2562*a* is provided on the front (the side in the traveling direction) and on the rear (the side opposite the traveling direction side) of vehicle main body 2501, and connector support portion 2562*b* is provided on the front (the side in the traveling direction) and on the rear (the side opposite the traveling direction side) of vehicle main body 2501. Connector support portions 2562*a* and 2562*b* slide in the lengthwise direction of slide main body portions 2561*a* and 2561*b*, which is a horizontal direction. More specifically, connector support portions 2562*a* and 2562*b* slide in a direction that is orthogonal to the lengthwise direction of vehicle main body 2501 and approximately parallel to the horizontal direction.

Slide main body portions 2561*a* and 2561*b* are elongated in predetermined direction with respect to vehicle main body 2501 and are connected to vehicle main body 2501. More specifically, slide main body portions 2561*a* and 2561*b* are provided horizontally relative to the lengthwise direction of vehicle main body 2501 by slide motor 2563 provided in vehicle main body 2501. Accordingly, slide main body portions 2561*a* and 2561*b* guide connector support portions 2562*a* and 2562*b* in a direction orthogonal to the lengthwise direction of vehicle main body 2501.

Slide motor 2563 is provided on vehicle main body 2501 and controlled by control processor 2530 so as to move slide main body portions 2561*a* and 2561*b* horizontally with respect to vehicle main body 2501.

Package transport device 10*q*2 according to the present variation further includes second sliding mechanism 2564 that moves turntable 2540 and third connector 2523 vertically.

Second sliding mechanism 2564 includes turntable 2540, shaft motor 2567, and shaft 2565 that is inserted through turntable 2540 and coupled to third connector 2523.

Turntable 2540 is disposed between third connector 2523 and vehicle main body 2501. After extending first sliding mechanism 2560*a* and first sliding mechanism 2560*b* and separating first connector 2521 and second connector 2522 from the rail, turntable 2540 rotates vehicle main body 2501 under control by control processor 2530.

Shaft motor 2567 is controlled by control processor 2530 so as to move shaft 2565 vertically with respect to vehicle main body 2501 and turntable 2540.

Shaft 2565 inserts through the center of turntable 2540, and third connector 2523 is coupled to the vertical upper end of shaft 2565. Shaft motor 2567 can be controlled by control processor 2530 to move shaft 2565 vertically.

Embodiment 22

FIG. 181A is a perspective view illustrating an example of rail 7 and rail coupling 2570 according to Embodiment 22. FIG. 181B is another perspective view illustrating an example of rail 7 and rail coupling 2570 according to Embodiment 22. FIG. 182 is a perspective view illustrating first coupling point T1 of first rail 7*a* and second coupling point T2 of second rail 7*b* according to Embodiment 22.

Hereinafter, as illustrated in FIG. 181A, FIG. 181B, and FIG. 182, since the basic configuration of rail 7 according to the present embodiment is the same as the basic configuration of rail 7 according to Embodiment 1 and the like, regarding the basic configuration of rail 7 in the present embodiment, the same reference signs as above will be used and repeated description will be omitted where appropriate.

The present embodiment gives an example in which first rail 7*a* and second rail 7*b* are coupled by rail coupling 2570.

Rail coupling 2570 has an L-shape or inverted L-shape and can couple first rail 7*a* and second rail 7*b* at the point where first rail 7*a* and second rail 7*b* intersect three-dimensionally. FIG. 181A illustrates rail coupling 2570 that is L-shaped in a view along the lengthwise direction of first rail 7*a*, i.e., positioned on the left side in a view along the traveling direction. FIG. 181B illustrates rail coupling 2570 that is inverted L-shaped in a view along the lengthwise direction of first rail 7*a*, i.e., positioned on the right side in a view along the traveling direction.

Rail coupling 2570 can also couple first rail 7*a* to second rail 7*b* so that first rail 7*a* is inverted L-shaped in a view along the lengthwise direction of first rail 7*a*.

Rail coupling 2570 includes first rail coupler 2571*a*, first rail extension 2571*b*, second rail coupler 2572*a*, and second rail extension 2572*b*.

First rail coupler 2571*a* couples to first rail 7*a*. More specifically, first rail 7*a* is inserted into a first insertion hole of first rail coupler 2571*a* to couple first rail coupler 2571*a* to first rail 7*a*. The vertical lower surface of first rail coupler 2571*a* is connected to first rail extension 2571*b*.

One end of first rail extension 2571*b* is connected to first rail coupler 2571*a*, and the other end of first rail extension 2571*b* is connected to the other end of second rail coupler 2572*a*. First rail extension 2571*b* extends from first rail coupler 2571*a* in a direction that is orthogonal to the lengthwise direction of first rail 7*a* and horizontal.

Second rail coupler 2572*a* couples to second rail 7*b*. More specifically, second rail 7*b* is inserted into a second insertion hole of second rail coupler 2572*a* to couple second rail coupler 2572*a* to second rail 7*b*. The vertical lower surface of second rail coupler 2572*a* is connected to second rail extension 2572*b*.

One end of second rail extension 2572*b* is connected to second rail coupler 2572*a*, and the other end of second rail extension 2572*b* is connected to the other end of first rail coupler 2571*a*. Second rail extension 2572*b* extends from second rail coupler 2572*a* in a direction that is orthogonal to the lengthwise direction of second rail 7*b* and vertical.

Thus, as illustrated in FIG. 181A through FIG. 182, rail coupling 2570 is coupled to second rail 7*b* at a position farther from a position on second rail 7*b* vertically above first coupling point T1 where rail coupling 2570 is coupled to first rail 7*a*. Stated differently, second rail coupler 2572*a* and second rail extension 2572*b* are positioned away from first rail 7*a*. In other words, in a view of first rail 7*a* and second rail 7*b* in the vertical direction, first coupling point T1 of rail coupling 2570 and first rail 7*a* and second coupling point T2 of rail coupling 2570 and second rail 7*b* do not overlap, but are spaced apart from each other. Thus, a space is formed between first rail 7*a* and second rail coupler 2572*a* for rollers 2527 of package transport device 10*q*2 to pass through.

Therefore, in FIG. 181A, it is easy for package transport device 10*q*2 to turn right from first rail 7*a* to second rail 7*b*. In FIG. 181B, it is easy for package transport device 10*q*2 to turn left from first rail 7*a* to second rail 7*b*.

Note that package transport device 10*q*2 is capable of turning left in FIG. 181A and capable of turning right in FIG. 181B.

Embodiment 23

Hereinafter, since the basic configuration of package transport device 10*q*1 according to the present embodiment is the same as the basic configuration of the package transport device according to Embodiment 21 and the like, regarding the basic configuration of package transport device 10*q*1 in the present embodiment, the same reference signs as above will be used and repeated description will be omitted where appropriate. Hereinafter, since the basic configuration of package transport device 10*q*1 according to the present embodiment is the same as the basic configuration of the unmanned aerial vehicle of Embodiment 1 and the same as the basic configuration of the package transport device according to Embodiment 12 and the like, regarding the basic configuration of package transport device 10*q*1 in the present embodiment, the same reference signs as above will be used and repeated description will be omitted where appropriate. The present embodiment may also be used with lifting systems, unmanned aerial vehicles, and delivery boxes according to embodiments other than Embodiment 1.

Operation Example 1

FIG. 183 is a top view and a side view illustrating an operation of package transport device 10*q*1 according to Embodiment 23.

This operation example illustrates a case in which package transport device 10*q*1 rotates vehicle main body 180° on rail 7. This example assumes that package transport device 10*q*1 is stopped on rail 7 and first connector 2521, second connector 2522, and third connector 2523 of package transport device 10*q*1 are coupled to rail 7.

First, as illustrated in (a1) and (a2) in FIG. 183, the control processor of package transport device 10*q*1 controls the slide motor of third connector 2523 so as to retract third connector 2523 of package transport device 10*q*1.

As illustrated in (b1) and (b2) in FIG. 183, this lifts the vehicle main body of package transport device 10*q*1, and rollers 2527 of first connector 2521 and second connector 2522 separate from rail 7. At this time, since first connector 2521, second connector 2522, and third connector 2523 are coupled offset from the center of the vehicle main body toward one side of the vehicle main body, the vehicle main body is tilted with respect to the horizontal plane. The control processor may control, for example, the slide rail of turntable 2540 so as to tilt the vehicle main body and shift the position of third connector 2523 with respect to the vehicle main body.

Next, as illustrated in (c1) in FIG. 183, the control processor of package transport device 10*q*1 controls the slide motor of third connector 2523 so as to extend third connector 2523 of package transport device 10*q*1. Thus, rollers 2527 of first connector 2521 and second connector 2522 are positioned vertically below rail 7, without first connector 2521 and second connector 2522 contacting rail 7.

Next, as illustrated in (d1) and (e1) in FIG. 183, the control processor of package transport device 10*q*1 controls turntable 2540 so as to rotate it 180°. This will reverse the orientation of package transport device 10*q*1.

Next, as illustrated in (f1) in FIG. 183, the control processor of package transport device 10*q*1 controls the slide motor of third connector 2523 so as to retract third connector 2523 of package transport device 10*q*1. This lifts the vehicle main body of package transport device 10*q*1 and places rollers 2527 of first connector 2521 and second connector 2522 vertically above rail 7. This also places first connector 2521 and second connector 2522 on the opposite side of rail 7 that third connector 2523 is on. At this time, since third connector 2523 is offset from the center of the vehicle main body toward one side of the vehicle main body, and first connector 2521 and second connector 2522 are offset from the center of the vehicle main body toward the other side of the vehicle main body, the vehicle main body is approximately parallel to the horizontal plane or slightly inclined to the other side of the vehicle main body.

Next, as illustrated in (g1) and (h1) in FIG. 183, the control processor of package transport device 10*q*1 controls the slide motor of third connector 2523 so as to return third connector 2523 of package transport device 10*q*1 to its original position. This places rollers 2527 of first connector 2521 and second connector 2522 on rail 7. Package transport device 10*q*1 then begins traveling.

The control processor of package transport device 10_q_1 may also control the slide motor of third connector 2523 so as to extend third connector 2523 of package transport device 10_q_1 and separate roller 2527 of third connector 2523 from rail 7. The control processor of package transport device 10_q_1 controls the slide motor of third connector 2523 so as to retract third connector 2523 of package transport device 10_q_1 and place roller 2527 of third connector 2523 vertically below rail 7. Next, the control processor of package transport device 10_q_1 controls turntable 2540 so as to rotate it 180°. This places third connector 2523 on the other side of the vehicle main body along with first connector 2521 and second connector 2522. Package transport device 10_q_1 then begins traveling.

Operation Example 2

FIG. 184A is a top view and a side view illustrating an operation in which package transport device 10_q_1 according to Embodiment 23 turns left at the intersection of first rail 7_a_ and second rail 7_b_.

FIG. 184A assumes a left turn is made from first rail 7_a_ to second rail 7_b_. Moreover, it is assumed that first rail 7_a_ and second rail 7_b_ are coupled by the rail coupling of FIG. 181B, i.e., a rail coupling located on the right side when viewed along first rail 7_a_. First connector 2521, second connector 2522, and third connector 2523 of package transport device 10_q_1 are assumed to be located on the opposite side of first rail 7_a_ from the side where the rail coupling is located. This example assumes that package transport device 10_q_1 is stopped on first rail 7_a_ and first connector 2521, second connector 2522, and third connector 2523 of package transport device 10_q_1 are coupled to first rail 7_a_.

First, as illustrated in (a1) in FIG. 184A, the control processor of package transport device 10_q_1 controls the slide motor of third connector 2523 so as to retract third connector 2523 of package transport device 10_q_1. This lifts the vehicle main body of package transport device 10_q_1 and separates rollers 2527 of first connector 2521 and second connector 2522 from first rail 7_a_. Next, the control processor of package transport device 10_q_1 controls the slide motor of third connector 2523 so as to extend third connector 2523 of package transport device 10_q_1. Thus, rollers 2527 of first connector 2521 and second connector 2522 are positioned vertically below first rail 7_a_, without first connector 2521 and second connector 2522 contacting first rail 7_a_ or second rail 7_b_.

Next, as illustrated in (b1) and (c1) in FIG. 184A, the control processor of package transport device 10_q_1 controls turntable 2540 so as to rotate it 90° counterclockwise.

This places package transport device 10_q_1 in an attitude where the lengthwise direction of package transport device 10_q_1 is parallel to the lengthwise direction of the second rail, as illustrated in (a2) in FIG. 184A. In other words, this places rollers 2527 of first connector 2521 and second connector 2522 vertically below second rail 7_b_.

Next, as illustrated in (b2) in FIG. 184A, the control processor of package transport device 10_q_1 controls the slide motor of third connector 2523 so as to retract third connector 2523 of package transport device 10_q_1. This lifts the vehicle main body of package transport device 10_q_1 and places rollers 2527 of first connector 2521 and second connector 2522 vertically above second rail 7_b_.

Next, as illustrated in (c2) in FIG. 184A, the control processor of package transport device 10_q_1 controls the slide motor of third connector 2523 so as to return third connector 2523 of package transport device 10_q_1 to its original position. This places rollers 2527 of first connector 2521 and second connector 2522 on second rail 7_b_.

Next, as illustrated in (d2) in FIG. 184A, the control processor of package transport device 10_q_1 controls the slide motor of third connector 2523 so as to extend third connector 2523 of package transport device 10_q_1 and move roller 2527 of third connector 2523 away from first rail 7_a_. At this time, roller 2527 of third connector 2523 is vertically above first rail 7_a_ and second rail 7_b_.

Next, as illustrated in (e2) in FIG. 184A, the control processor of package transport device 10_q_1 controls turntable 2540 so as to rotate it 90° clockwise. This places roller 2527 of third connector 2523 vertically above second rail 7_b_. The control processor of package transport device 10_q_1 controls the motor of first connector 2521 and the motor of second connector 2522 so as to rotate rollers 2527 to slightly advance second connector 2522 closer to first rail 7_a_.

Next, as illustrated in (f2) in FIG. 184A, the control processor of package transport device 10_q_1 controls the slide motor of third connector 2523 so as to retract third connector 2523 of package transport device 10_q_1. This lifts the vehicle main body of package transport device 10_q_1 and separates rollers 2527 of first connector 2521 and second connector 2522 from second rail 7_b_.

Next, as illustrated in (g2) in FIG. 184A, the control processor of package transport device 10_q_1 controls the slide motor of third connector 2523 so as to extend third connector 2523 of package transport device 10_q_1. Thus, rollers 2527 of first connector 2521 and second connector 2522 are positioned vertically below second rail 7_b_, without first connector 2521 and second connector 2522 contacting first rail 7_a_ or second rail 7_b_.

Next, as illustrated in (h2) in FIG. 184A, the control processor of package transport device 10_q_1 controls the motor of third connector 2523 so as to move second connector 2522 forward until it passes first rail 7_a_.

Next, as illustrated in (i2) in FIG. 184A, the control processor of package transport device 10_q_1 controls the slide motor of third connector 2523 so as to retract third connector 2523 of package transport device 10_q_1 and place rollers 2527 of first connector 2521 and second connector 2522 vertically above second rail 7_b_.

Next, as illustrated in (j2) in FIG. 184A, the control processor of package transport device 10_q_1 controls the slide motor of third connector 2523 so as to return third connector 2523 of package transport device 10_q_1 to its original position. This places rollers 2527 of first connector 2521 and second connector 2522 on second rail 7_b_.

Package transport device 10_q_1 then begins traveling.

While FIG. 184A illustrates a case in which a left turn is made, FIG. 184B illustrates a case in which a right turn is made.

FIG. 184B is a top view and a side view illustrating an operation in which the package transport device according to Embodiment 23 turns right at the intersection of the first rail and the second rail. Since the operation in the case of a right turn is the same as the operation in the case of a left turn as illustrated in FIG. 184A, repeated description will be omitted where appropriate.

FIG. 184B assumes a right turn is made from first rail 7_a_ to second rail 7_b_. Moreover, it is assumed that first rail 7_a_ and second rail 7_b_ are coupled by the rail coupling of FIG. 181A, i.e., a rail coupling located on the left side when viewed along first rail 7_a_. First connector 2521, second connector 2522, and third connector 2523 of package transport device 10_q_1 are assumed to be located on the opposite side of first rail 7_a_ from the side where the rail coupling is located. This example assumes that package transport device 10$q$1 is stopped on first rail 7$a$ and first connector 2521, second connector 2522, and third connector 2523 of package transport device 10$q$1 are coupled to first rail 7$a$.

First, as illustrated in (a1) in FIG. 184B, the control processor of package transport device 10$q$1 controls the slide motor of third connector 2523 so as to retract third connector 2523 of package transport device 10$q$1. This lifts the vehicle main body of package transport device 10$q$1 and separates rollers 2527 of first connector 2521 and second connector 2522 from first rail 7$a$. Next, the control processor of package transport device 10$q$1 controls the slide motor of third connector 2523 so as to extend third connector 2523 of package transport device 10$q$1. Thus, rollers 2527 of first connector 2521 and second connector 2522 are positioned vertically below first rail 7$a$, without first connector 2521 and second connector 2522 contacting first rail 7$a$ or second rail 7$b$.

Next, as illustrated in (b1) and (c1) in FIG. 184B, the control processor of package transport device 10$q$1 controls turntable 2540 so as to rotate it 90° clockwise.

This places package transport device 10$q$1 in an attitude where the lengthwise direction of package transport device 10$q$1 is parallel to the lengthwise direction of the second rail, as illustrated in (a2) in FIG. 184B. In other words, this places rollers 2527 of first connector 2521 and second connector 2522 vertically below second rail 7$b$.

Next, as illustrated in (b2) in FIG. 184B, the control processor of package transport device 10$q$1 controls the slide motor of third connector 2523 so as to retract third connector 2523 of package transport device 10$q$1. This lifts the vehicle main body of package transport device 10$q$1 and places rollers 2527 of first connector 2521 and second connector 2522 vertically above second rail 7$b$.

Next, as illustrated in (c2) in FIG. 184B, the control processor of package transport device 10$q$1 controls the slide motor of third connector 2523 so as to return third connector 2523 of package transport device 10$q$1 to its original position. This places rollers 2527 of first connector 2521 and second connector 2522 on second rail 7$b$.

Next, as illustrated in (d2) in FIG. 184B, the control processor of package transport device 10$q$1 controls the slide motor of third connector 2523 so as to extend third connector 2523 of package transport device 10$q$1 and move roller 2527 of third connector 2523 away from first rail 7$a$. At this time, roller 2527 of third connector 2523 is vertically above first rail 7$a$ and second rail 7$b$.

Next, as illustrated in (e2) in FIG. 184B, the control processor of package transport device 10$q$1 controls turntable 2540 so as to rotate it 90° counterclockwise. This places roller 2527 of third connector 2523 vertically above second rail 7$b$. The control processor of package transport device 10$q$1 controls the motor of first connector 2521 and the motor of second connector 2522 so as to rotate rollers 2527 to slightly advance first connector 2521 closer to first rail 7$a$.

Next, as illustrated in (f2) in FIG. 184B, the control processor of package transport device 10$q$1 controls the slide motor of third connector 2523 so as to retract third connector 2523 of package transport device 10$q$1. This lifts the vehicle main body of package transport device 10$q$1 and separates rollers 2527 of first connector 2521 and second connector 2522 from second rail 7$b$.

Next, as illustrated in (g2) in FIG. 184B, the control processor of package transport device 10$q$1 controls the slide motor of third connector 2523 so as to extend third connector 2523 of package transport device 10$q$1. Thus, rollers 2527 of first connector 2521 and second connector 2522 are positioned vertically below second rail 7$b$, without first connector 2521 and second connector 2522 contacting first rail 7$a$ or second rail 7$b$.

Next, as illustrated in (h2) in FIG. 184B, the control processor of package transport device 10$q$1 controls the motor of third connector 2523 so as to move first connector 2521 forward until it passes first rail 7$a$.

Next, as illustrated in (i2) in FIG. 184B, the control processor of package transport device 10$q$1 controls the slide motor of third connector 2523 so as to retract third connector 2523 of package transport device 10$q$1 and place rollers 2527 of first connector 2521 and second connector 2522 vertically above second rail 7$b$.

Next, as illustrated in (j2) in FIG. 184B, the control processor of package transport device 10$q$1 controls the slide motor of third connector 2523 so as to return third connector 2523 of package transport device 10$q$1 to its original position. This places rollers 2527 of first connector 2521 and second connector 2522 on second rail 7$b$.

Package transport device 10$q$1 then begins traveling.

Note that even in the case of the rail coupling of FIG. 181A, package transport device 10$q$1 can still turn left, and even in the case of the rail coupling of FIG. 181B, package transport device 10$q$1 can still turn right.

Operation Example 3

First, a case in which package transport device 10$q$1 passes over a partially raised rail 7 will be discussed.

FIG. 185 is a side view illustrating an operation in which package transport device 10$q$1 according to Embodiment 23 passes support pillar 19 that supports rail 7.

This operation example assumes a case in which that first and second connectors 2521 and 2522 and third connector 2523 of package transport device 10$q$1 sandwich rail 7 when package transport device 10$q$1 passes support pillar 19.

When traveling normally, as illustrated in FIG. 185, the control processor of package transport device 10$q$1 controls the slide motor of third connector 2523 so as to extend and then retract third connector 2523 of package transport device 10$q$1 to place only roller 2527 of third connector 2523 vertically below rail 7 and cause roller 2527 of third connector 2523 to push up on rail 7 from below.

This allows rail 7 to be sandwiched between first and second connectors 2521 and 2522 and third connector 2523 of package transport device 10$q$1. Stated differently, third connector 2523 holds rail 7 while pushing rail 7 up from below, while first and second connectors 2521 and 2522 are held by rail 7 above rail 7.

When package transport device 10$q$1 passes support pillar 19, even if rail 7 around support pillar 19 is raised, first and second connectors 2521 and 2522 and third connector 2523 sandwich rail 7, giving package transport device 10$q$1 a tracking force along the slope of rail 7, and making it difficult for package transport device 10$q$1 to detach from rail 7.

Next, a case in which package transport device 10$q$1 passes over a curved rail 7 will be discussed.

FIG. 186 is a top view and a side view illustrating an operation of package transport device 10$q$1 passing a curved rail 7 according to Embodiment 23.

This operation example assumes a case in which that first and second connectors 2521 and 2522 and third connector 2523 of package transport device 10$q$1 sandwich a cured rail 7 when package transport device 10$q$1 passes support pillar 19.

In this case as well, when package transport device **10*q*1 passes a curved rail 7, first and second connectors 2521 and 2522 and third connector 2523 sandwich rail 7, giving package transport device 10*q*1 a tracking force along the slope of rail 7, and making it difficult for package transport device 10*q*1 to detach from rail 7**.

Other Variations

Although the present disclosure has been described above based on various embodiments, the present disclosure is not limited to these embodiments.

The lifting system described above may be applied to an autonomous aerial vehicle instead of an unmanned aerial vehicle, for example. In this case, the term "unmanned aerial vehicle" or "drone" used in the foregoing descriptions is replaced with "autonomous aerial vehicle" as appropriate. Alternatively, the techniques described above may be applied to any aerial vehicle regardless of whether the aerial vehicle is manned or unmanned or regardless of whether the aerial vehicle is autonomously driven or manually driven.

Each element included in the lifting system according to the above embodiments may be implemented by dedicated hardware or through execution of a software program suitable for the element. Each element may be implemented by a program executing unit, such as a CPU or a processor, reading and executing a software program recorded on a recording medium, such as a hard disk or a semiconductor memory.

The processors functioning as the elements in the lifting system are typically implemented as an LSI circuit, which is an integrated circuit. These processors may be realized as individual chips, or a portion or all of the processors may be realized collectively as a single chip.

Moreover, circuit integration is not limited to LSI; the processors may be realized as dedicated circuits or generic processors. A field programmable gate array (FPGA) that is programmable after the LSI circuit is manufactured, or a reconfigurable processor whose connections and settings regarding circuit cells in the LSI circuit are reconfigurable, may be used.

Each element may be implemented by dedicated hardware or through execution of a software program suitable for the element. Each element may be implemented by a program executing unit, such as a CPU or a processor, reading and executing a software program recorded on a recording medium, such as a hard disk or a semiconductor memory.

All of the values used above are mere examples used for illustrative purposes; the embodiments of the present disclosure are not limited to the exemplary values.

The block diagrams illustrate one example of the division of functional blocks; a plurality of functional blocks may be realized as a single functional block, a single functional block may be broken up into a plurality of functional blocks, and part of one function may be transferred to another functional block. The functions of a plurality of functional blocks having similar functions may be processed by a single piece of hardware or software in parallel or by time-division.

The order in which the steps in the flowcharts are executed are mere examples in order to specifically describe the present disclosure, and may include orders other than those exemplified. Moreover, some of the steps may be executed at the same time as (in parallel with) other steps.

Additional Comments

An unmanned aerial vehicle is an unmanned aerial vehicle that delivers a package, and the unmanned aerial vehicle includes a plurality of rotary wings, a plurality of first motors that respectively rotate the plurality of rotary wings, a main body that supports the plurality of first motors, a connector that is to be connected to a rail provided at a position spaced apart from a ground surface with the main body hanging from the connector, a movable block that sets an inclination of an virtual plane containing the plurality of rotary wings relative to a support direction in which the connector is supported on the rail, and a control circuit that controls the plurality of first motors and the movable block. The connector includes a first end connected to the main body and a second end to be slidably connected to the rail. The support direction extends from the first end toward the second end of the connector. When the second end of the connector is connected to the rail, the control circuit (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends and (ii) causes the movable block to increase an angle formed by a normal direction of the virtual plane relative to the support direction of the connector.

According to this configuration, the unmanned aerial vehicle can move along the rail while the connector is connected to the rail. In the case of (i), the control circuit controls the rotation rate of the plurality of first motors so as to achieve the rotation rate that is lower than the minimum rotation rate necessary for causing the unmanned aerial vehicle to hover and that is higher than the minimum rotation rate necessary for propelling the unmanned aerial vehicle. Thus, the unmanned aerial vehicle can move along the rail at an appropriate speed. In the case of (ii), the control circuit controls the actuator so as to change the inclination of the virtual plane containing the plurality of rotary wings relative to the support direction of the connector. This makes it possible to regulate the speed of the unmanned aerial vehicle.

A delivery system may include an unmanned aerial vehicle, a plurality of support pillars, and a rail spanning between two adjacent support pillars among the plurality of support pillars.

The movable block may be located between the main body and the connector.

This configuration allows the movable block to change the angle of the connector relative to the main body with ease.

For example, in a case where the connector is disposed at or around the center of gravity of the main body, the movable block is also disposed at or around the center of gravity of the main body. This configuration makes it possible to balance the center of gravity of the unmanned aerial vehicle.

The unmanned aerial vehicle further includes a pair of wings.

According to this configuration, for example, the unmanned aerial vehicle can be rotated in the horizontal direction if the pair of wings are yaw wings, or the unmanned aerial vehicle can be rotated in the vertical direction if the pair of wings are pitch wings. Therefore, the traveling direction of the unmanned aerial vehicle can be steered freely, and the unmanned aerial vehicle can be moved stably.

After the control circuit has increased the angle with the movable block, the control circuit may disengage the connector from the rail if the propelling speed of the unmanned aerial vehicle has exceeded a predetermined value.

This configuration can keep the connector from making contact with the rail, and thus the safety of the unmanned aerial vehicle can be increased.

If the connector is being disengaged from the rail, the control circuit may cause the movable block to reduce the angle and control the rotation rate of the plurality of first motors so as to achieve a rotation rate higher than the minimum rotation rate necessary for causing the unmanned aerial vehicle to hover.

According to this configuration, when the connector is disengaged from the rail, reducing the angle allows the unmanned aerial vehicle to hover to a predetermined height from the ground surface. This can keep the unmanned aerial vehicle from making contact with an object, and thus the safety of the unmanned aerial vehicle can be increased.

The control circuit may control the rotation rate of the plurality of first motors so as to increase the angle to greater than 15 degrees in (ii).

With these, the speed of the unmanned aerial vehicle can be appropriate.

The control circuit may control the rotation rate of the plurality of first motors so as to increase the angle to greater than 45 degrees in (ii).

The control circuit may control the rotation rate of the plurality of first motors so as to increase the angle to greater than 65 degrees in (ii).

The control circuit may control the rotation rate of the plurality of first motors so as to increase the angle to greater than 80 degrees in (ii).

The connector may include a support portion swingably connected to the main body and a first arm connected to one end of the support portion.

This configuration allows the first arm to swing along with a swinging movement of the support portion. Therefore, the first arm can connect itself to the rail more easily.

The first arm may be a hanger for hanging the unmanned aerial vehicle from the rail.

According to this configuration, the first arm can be hung on the rail when the unmanned aerial vehicle has stopped. Therefore, a package can be placed at a receiver with the unmanned aerial vehicle hanging from the rail.

The connector may further include a wheel for rotatable contact with the rail that is connected to the first arm.

According to this configuration, when the unmanned aerial vehicle becomes connected to the rail, the unmanned aerial vehicle can move along the rail with the wheel making contact with the rail. The wheel starts rotating upon friction with the rail. Therefore, the unmanned aerial vehicle can travel on the rail solely with the propelling force produced by the rotation of the rotary wings in the traveling direction. Thus, this configuration renders it unnecessary for the unmanned aerial vehicle to use the rotary force of the rotary wings as a lifting force for lifting itself up. As a result, the energy consumed by the unmanned aerial vehicle can be reduced.

The connector may further include a second arm connected to one end of the support portion.

According to this configuration, not only the first arm but also the second arm can be connected to the rail. Therefore, the possibility that the unmanned aerial vehicle falls off from the rail can be reduced, and the safety in the system that includes the unmanned aerial vehicle can be further increased.

The first arm may be a first hanger for hanging the unmanned aerial vehicle from the rail. The second arm may be a second hanger for hanging the unmanned aerial vehicle from the rail. The connector may further include a first actuator that sets the angle of the first arm relative to the support portion and a second actuator that sets the angle of the second arm relative to the support portion.

This configuration makes it possible to hang the unmanned aerial vehicle from the rail reliably. Therefore, the possibility that the unmanned aerial vehicle falls off from the rail can be reduced, and the safety in the system that includes the unmanned aerial vehicle can be further increased.

The connector may further include a base disposed between the support portion and the first and second arms, and a third actuator that sets the angle of the base relative to the support portion.

According to this configuration, the height of the first arm relative to the main body or the height of the second arm relative to the main body can be changed only by changing the angle of the base. Therefore, the heights of the first arm and the second arm can be changed without tilting the main body, and thus the stability of the unmanned aerial vehicle can be maintained.

The first arm may include a first hook that extends from a first connected end connected to the first actuator to a first open end. The second arm may include a second hook that extends from a second connected end connected to the second actuator to a second open end. The first hook may include a first bent portion that is bent in a first direction and that is located between the first connected end and the first open end. The second hook may include a second bent portion that is bent in a second direction opposite the first direction and that is located between the second connected end and the second open end.

According to this configuration, the horizontal attitude of the main body can be maintained when the first hook is hung on the rail, and the horizontal attitude of the main body can be maintained also when the second hook is hung on the rail. Therefore, the first hook and the second hook can maintain an appropriate attitude of the unmanned aerial vehicle.

The first hook and the second hook make it easier to hook the unmanned aerial vehicle to the rail.

When the unmanned aerial vehicle is slidably hung from a first rail via first the hook, the control circuit may control the second actuator so as to hook the second hook onto a second rail that extends along and adjacent to the first rail and control the first actuator so as to disengage the first hook from the first rail.

According to this configuration, for example, when the first hook of the unmanned aerial vehicle is connected to the first rail and if the first hook is disengaged from the first rail after the second hook has become connected to the second rail, the unmanned aerial vehicle can switch the connection from the first rail to the second rail serving as another rail and move along the second rail. Therefore, the unmanned aerial vehicle can reliably switch from one rail to another rail at the branching point of these rails. Thus, the possibility that the unmanned aerial vehicle falls off can be reduced, and the safety in the system that includes the unmanned aerial vehicle can be further increased.

A delivery system may include an unmanned aerial vehicle, a plurality of support pillars, and the first rail and the second rail spanning between two adjacent support pillars among the plurality of support pillars.

When the unmanned aerial vehicle is slidably hung from a first rail via first the hook and the second hook, the control circuit may control the second actuator so as to disengage the second hook from the first rail and hook the second hook onto a second rail that extends along and adjacent to the first rail and control the first actuator so as to disengage the first hook from the first rail and hook the first hook onto the second rail.

According to this configuration, for example, when the first hook and the second hook of the unmanned aerial vehicle are connected to the first rail and if the first hook is disengaged from the first rail and connected to the second rail after the second hook has disengaged from the first rail and become connected to the second rail, the unmanned aerial vehicle can switch the connection from the first rail to the second rail serving as another rail and move along the second rail. Therefore, the unmanned aerial vehicle can reliably switch from one rail to another rail at the branching point of these rails. Thus, the possibility that the unmanned aerial vehicle falls off can be reduced, and the safety in the system that includes the unmanned aerial vehicle can be further increased.

When the second hook is to be hooked onto the second rail, the control circuit may tilt the main body or the support portion in a second direction so as to position the second connected end higher than the first connected end. When the first hook is to be disengaged from the first rail, the control circuit may tilt the main body or the support portion in a first direction so as to position the first connected end higher than the second connected end.

According to this configuration, by tilting the main body or the support portion, the first hook and the second hook can be hooked onto the rail with ease, or the first hook and the second hook can be disengaged from the rail with ease.

The unmanned aerial vehicle may further include a hanging wire that is connected to the main body and that hangs a package therefrom and a lift motor that can reel in the hanging wire. The control circuit may position the unmanned aerial vehicle at a position vertically above a storage device for storing a package with the connector being connected to the rail. Then, the control circuit may reel out the hanging wire by driving the lift motor and lower the package from the main body so as to store the package into the storage device.

According to this configuration, upon the unmanned aerial vehicle arriving at the destination point, the control circuit controls the lift motor so as to reel out the hanging wire. Thus, the unmanned aerial vehicle can lower the package and store the package into the storage device. Therefore, the unmanned aerial vehicle can deliver the package to the receiver.

While the control circuit is reeling out the hanging wire, the control circuit may adjust at least one of the position and the orientation of the main body in accordance with the position of the package relative to the storage device.

According to this configuration, even if the position of the unmanned aerial vehicle fails to match the position directly above the storage device, the control circuit can position the main body relative to the storage device by adjusting at least one of the position and the orientation of the main body. Therefore, the unmanned aerial vehicle can reliably lower the package and store the package into the storage device, which in turn makes it possible to reliably deliver the package to the receiver.

In particular, even if the unmanned aerial vehicle moves from a position directly above the storage device due to the wind or the like, the unmanned aerial vehicle can position the main body relative to the storage device.

When the position of the package is displaced in a third direction from the position vertically above the storage device, the control circuit may move the unmanned aerial vehicle in a fourth direction opposite the third direction, along the direction in which the rail extends.

According to this configuration, even if the position of the package has changed (moved) in the third direction via the hanging wire due to the wind or the like, the control circuit can change the position of the unmanned aerial vehicle in the fourth direction, which is the opposite direction of the third direction. Therefore, the unmanned aerial vehicle can reliably lower the package and store the package into the storage device, which in turn makes it possible to more reliably deliver the package to the receiver.

When the position of the package is displaced in a fifth direction from the position vertically above the storage device, the control circuit may swing the unmanned aerial vehicle about the rail and move the center of gravity of the unmanned aerial vehicle in a sixth direction, which is the opposite direction of the fifth direction.

According to this configuration, even if the package displaces (moves) in the fifth direction via the hanging wire due to the wind or the like, the control circuit can change the position of the unmanned aerial vehicle in the sixth direction, which is the opposite direction of the fifth direction, by moving the center of gravity of the unmanned aerial vehicle. Therefore, the unmanned aerial vehicle can reliably lower the package and store the package into the storage device, which in turn makes it possible to more reliably deliver the package to the receiver.

The unmanned aerial vehicle may further include a thruster device that is attachable to and detachable from a package, and the thruster device may include a plurality of propellers, a plurality of second motors that respectively rotate the plurality of propellers, and a support member that supports the plurality of second motors.

With this, even if the unmanned aerial vehicle is misaligned relative to a position directly above the storage device, the thruster device can guide the package to the storage device. Therefore, the unmanned aerial vehicle can reliably lower the package and store the package into the storage device, which in turn makes it possible to more reliably deliver the package to the receiver. Even in a situation in which the opening of the storage device is narrow and it is difficult to insert a package, the unmanned aerial vehicle can reliably insert the package into the storage device. This eliminates the need for a large area to land the unmanned aerial vehicle.

In particular, even if the unmanned aerial vehicle moves from a position directly above the storage device due to the wind or the like, the thruster device can store the package in the storage device.

The plurality of propellers may include a first propeller disposed on a first side portion of the support member and a second propeller disposed on a second side portion different than the first side portion of the support member.

With this, the position and orientation of the thruster device relative to the storage device can be adjusted. Therefore, with this unmanned aerial vehicle, the thruster device can more reliably store the package in the storage device.

The control circuit may control the thruster device to actuate at least one of the plurality of second motors during at least part of a period of time during which the hanging wire is being reeled out.

With this, when lowering the package from the unmanned aerial vehicle, the position and orientation of the thruster device relative to the storage device can be adjusted. Therefore, with this unmanned aerial vehicle, the package can be smoothly stored in the storage device.

In the delivery system, the plurality of support pillars may each be a utility pole.

According to this configuration, existing utility poles can be used as support pillars, and no new support pillars need to be installed for the rails. Therefore, this system can prevent a surge in the cost of installation.

The delivery system may further include a lead-in support pillar disposed within a predetermined site and a lead-in wire stretched to the rail. The height from the ground surface to a first connection point at which the lead-in wire and the lead-in support pillar are connected to each other may be lower than the height from the ground surface to a second connection point at which the lead-in wire and the rail are connected to each other.

According to this configuration, the rail is disposed at a position higher than the first connection point, and thus the unmanned aerial vehicle can move along a high position. Since the unmanned aerial vehicle travels along a position where the unmanned aerial vehicle is less likely to be recognized by people, the privacy of the user at the receiver and the privacy of people in a facility, such as a home, that is located so as to face a rail can be protected.

The utility pole may support a power transmission line, and the rail may be provided at a position that is lower than the power transmission line and higher than the leading end of the lead-in support pillar.

According to this configuration, since the rail is disposed under the power transmission line, the rail can be disposed at a position where the unmanned aerial vehicle will not make contact with the power transmission line, and the unmanned aerial vehicle can travel along the rail. Therefore, the safety of the unmanned aerial vehicle delivering packages can be ensured.

The plurality of support pillars may be streetlights.

According to this configuration, existing streetlights can be used as support pillars, and no new support pillars need to be installed for the rails. Therefore, this system can prevent a surge in the cost of installation.

The delivery system may further include a protective net stretched along a position vertically below the approaching region of the first rail and the second rail. The approaching region is a region where the distance between the first rail and the second rail is smaller than or equal to the width of the unmanned aerial vehicle.

According to this configuration, since the distance between the first rail and the second rail is smaller than the width (the size) of the main body, the unmanned aerial vehicle can make a switch from the first rail to the second rail with ease and then move along the second rail.

As the protective net is provided along a position vertically below the approaching region of the first rail and the second rail, even if the unmanned aerial vehicle becomes disengaged from the first rail and the second rail, the possibility that the unmanned aerial vehicle falls to the ground can be reduced. Therefore, the safety in the system that includes the unmanned aerial vehicle can be further increased.

The height of at least a portion of the second rail may be higher than the height of an adjacent first rail.

According to this configuration, when two unmanned aerial vehicles are traveling along the first rail in opposite directions, one unmanned aerial vehicle of the two unmanned aerial vehicles can take refuge on the second rail. In other words, the second rail can be used as a refuge track. This configuration can keep the unmanned aerial vehicles from colliding with each other or inhibit the congestion of unmanned aerial vehicles.

The angle may be at least −30 degrees and at most +30 degrees.

Since this inhibits an increase in the amount of thrust the device produces for hovering, for example, it is possible to inhibit the wire from becoming slack due the device suddenly rising.

The device may further include a protective member surrounding the plurality of propellers.

With this, since the protective member can protect the rotating propellers, the propellers can be prevented from coming into contact with other objects.

The device may further include a reel to which the other end of the wire is connected, and a lift motor that rotates the reel to reel out the wire. When the reel is positioned vertically above a storage device for storing the package, the controller starts actuating the plurality of motors after the length of the portion of the wire that has been reeled out exceeds a predetermined length.

With this, since the device starts adjusting its position relative to the predetermined position when the device approaches the storage device, it easier for the device to align itself relative to the predetermined position.

The predetermined length may be equivalent to half the distance from the storage device to the reel.

With this, since the device starts adjusting its position relative to the predetermined position when the device is positioned near the storage device, it even easier for the device to align itself relative to the predetermined position.

Each of the plurality of propellers may include a plurality of blades. A plurality of protrusions may be provided on the surface of each of the plurality of blades. The plurality of protrusions may form a striped pattern extending in the direction of rotation of the plurality of blades.

This makes it possible to reduce the influence of wind during flight of the device. This makes it even easier to align the device relative to the predetermined position, because the attitude of the device can be stabilized even in windy conditions.

A storage device may include: a container that defines a space for storing a package; a top lid that is provided on a top portion of the container and can open and close a top opening for inserting the package into the space through the top opening; and a side lid that is provided on a side portion of the container and can open and close a side opening for removing the package in the space through the side opening.

With this, a package can be placed into the space of the storage device from above the storage device, and a package stored in the space can be removed from the side of the storage device. Accordingly, a package can be easily removed.

A system may include a storage device and a lifting device that is attachable to and detachable from a package and can be lowered from vertically above the storage device. The lifting device may include a protrusion. The storage device may include a hole that is provided in the top portion and accommodates the insertion of the protrusion, and a mechanism for opening the top lid when the protrusion is inserted into the hole.

With this, when the lifting device stores the package in the storage device, the lifting device can be aligned with the top opening of the storage device by inserting the protrusion into the hole. As a result, the package can be stored with certainty in the space in the storage device.

An unmanned aerial vehicle may include: a plurality of rotary wings; a plurality of motors that respectively rotate the plurality of rotary wings; a main body that supports the plurality of motors; and a connector for connecting to a rail positioned separated from the ground surface while the main body is hanging. The connector may include: a fixed portion; a first arm including one end connected to the fixed portion and another end that opens and closes with respect to the fixed portion; a second arm including one end connected to the fixed portion and another end that opens and closes with respect to the fixed portion; a first actuator that opens and closes the first arm; a second actuator that opens and closes the second arm; and a controller that controls the first actuator and the second actuator. A first region enclosed by the first arm in the closed state and the fixed portion may be separated from a second region enclosed by the second arm in the closed state and the fixed portion.

With this, when the first arm of the unmanned aerial vehicle is connected to a first rail, which is one example of the rail, the first arm can be disconnected from the first rail after the second arm is connected to a second rail. This allows the unmanned aerial vehicle to switch connections from the first rail to the second rail, which is one example of another rail, and continue moving.

The fixed portion may extend upwardly from the main body and include a partition portion separating the first region and the second region.

With this, a single connector can be used to connect to two rails. Accordingly, the attitude of the connector can be maintained more stably than when two connectors are used.

The controller may control the first actuator and the second actuator so that at least one of the first arm and the second arm is in a closed state.

With this, if a rail is present in at least one of the closed first region and the closed second region, the unmanned aerial vehicle can securely hang from the rail.

When the controller receives an instruction to change the first arm from the closed state to the open state, the controller may determine whether the second arm is in the closed state or not. When the second arm is in the closed state, the controller may change the first arm to the open state. When the second arm is in the open state, the controller may maintain the first arm in the closed state.

With this, when a second rail is connected to the second arm in the closed state, a first rail can be connected to the first arm. When the second arm is in the open state, if a first rail is connected to the first arm in the closed state, the first arm can be maintained in the closed state without placing the first arm in the open state. In this way, the unmanned aerial vehicle can reliably hang from a rail, thereby inhibiting the unmanned aerial vehicle from falling.

When the controller receives an instruction to change the second arm from the closed state to the open state, the controller may determine whether the first arm is in the closed state or not. When the first arm is in the closed state, the controller may change the second arm to the open state. When the first arm is in the open state, the controller may maintain the second arm in the closed state.

With this, when a first rail is connected to the first arm in the closed state, a second rail can be connected to the second arm. When the first arm is in the open state, if a second rail is connected to the second arm in the closed state, the second arm can be maintained in the closed state without placing the second arm in the open state. In this way, the unmanned aerial vehicle can reliably hang from a rail, thereby inhibiting the unmanned aerial vehicle from falling.

The controller may further control the rotational speed of the plurality of motors, and when the first arm is in the open state, the second arm is in the closed state, and the second arm is hanging from the rail passing through the second region, the controller may increase a first rotational speed of a first motor, which is the motor closest to the first arm among the plurality of motors, to a rotational speed greater than a second rotational speed of a second motor, which is the motor closest to the second arm among the plurality of motors. Alternatively, when the second arm is in the open state, the first arm is in the closed state, and the first arm is hanging from the rail passing through the first region, the controller may increase the second rotational speed of the second motor, which is the motor closest to the second arm among the plurality of motors, to a rotational speed greater than the first rotational speed of the first motor, which is the motor closest to the first arm among the plurality of motors.

With this, if the second arm is in the closed state and the first arm is in the open state, the weight of the first arm moves the center of gravity to the first arm side. Therefore, by making the first rotational speed of the first motor on the first arm side greater than the second rotational speed of the second motor on the second arm side, an amount of buoyancy equivalent to the weight of the center of gravity displaced to the first arm side can be imparted to the unmanned aerial vehicle.

If the first arm is in the closed state and the second arm is in the open state, the weight of the second arm moves the center of gravity to the second arm side. Therefore, by making the second rotational speed of the second motor on the second arm side greater than the first rotational speed of the first motor on the first arm side, an amount of buoyancy equivalent to the weight of the center of gravity displaced to the second arm side can be imparted to the unmanned aerial vehicle.

As a result, the unmanned aerial vehicle can maintain the attitude of the main body of the unmanned aerial vehicle approximately parallel to the horizontal direction, even if the center of gravity is displaced from the center of the main body of the unmanned aerial vehicle.

The connector may further include a third actuator that changes the angle of the fixed portion relative to the main body. The controller may further control the third actuator. When the first arm is in the open state, the second arm is in the closed state, and the second arm is hanging from the rail passing through the second region, the controller may change the angle via the third actuator to position the second region directly above the center of the main body. When the second arm is in the open state, the first arm is in the closed state, and the first arm is hanging from the rail passing through the first region, the controller may change the angle via the third actuator to position the first region directly above the center of the main body.

With this, if the first arm is in the open state and the second arm hanging on the second rail is in the closed state, the first rail present in the first region may be let outside of the first region by simply changing the attitude (angle) of the fixed portion relative to the main body of the unmanned aerial vehicle.

If the second arm is in the open state and the first arm hanging on the first rail is in the closed state, the second rail present in the second region can be let outside of the second region by simply changing the attitude (angle) of the fixed portion relative to the main body of the unmanned aerial vehicle.

Thus, the first rail can be easily disconnected from the connector and the second rail can be easily disconnected from the connector by simply inclining the fixed portion relative to the main body. This also makes it easy to switch the connector connected to the first rail to the second rail or to switch the connector connected to the second rail to the first rail.

A system including the unmanned aerial vehicle and the rail, wherein the rail may be provided with a marker including predetermined information.

This allows the unmanned aerial vehicle to read the predetermined information indicated by the marker added to the rail. For example, the package can be more accurately delivered to the predetermined position by the predetermined information including an address or position information or the like.

A system including the unmanned aerial vehicle and the rail, wherein the rail may be provided with an uneven portion including predetermined information.

This allows the unmanned aerial vehicle to obtain predetermined information from the uneven portion added to the rail as it moves along the rail. For example, the package can be more accurately delivered to the predetermined position by the predetermined information including an address or position information or the like.

An unmanned aerial vehicle may include: a plurality of rotary wings; a plurality of motors that respectively rotate the plurality of rotary wings; a main body that supports the plurality of motors; a connector for connecting to a rail positioned separated from the ground surface while the main body is hanging; an actuator that changes the angle of the normal direction of a virtual plane including the plurality of rotary wings relative to a support direction in which the connector is supported by the rail; and a controller that controls the plurality of motors and the actuator. The connector may include a first end connected to the main body and a second end for slidably connecting to the rail. The support direction may be a direction from the first end of the connector toward the second end of the connector. In a first mode, the controller may align the normal direction of the virtual plane with the support direction via the actuator, and in a second mode, the controller may make the normal direction of the virtual plane orthogonal to the support direction via the actuator.

With this, the controller can change the attitude of the main body of the unmanned aerial vehicle relative to the support direction when traveling on the rail. For example, when the unmanned aerial vehicle is to travel on the rail, the second mode can be implemented, and when the unmanned aerial vehicle is to leave the rail, the first mode can be implemented. Accordingly, the unmanned aerial vehicle can change its flight mode as appropriate depending on the situation.

In a third mode, the controller may make the angle at least 10 degrees and at most 30 degrees via the actuator.

This allows the unmanned aerial vehicle to move along the rail without contact between the rail and the support member.

The unmanned aerial vehicle may further include a sensor that detects the inclination of the rail. The controller may change the angle according to the inclination of the rail.

With this, even when the rail is inclined relative to the horizontal direction, the unmanned aerial vehicle can move along the inclined rail.

The controller may align the normal direction of the virtual plane with the inclination of the rail via the actuator.

This allows the connector to move along the rail, thereby inhibiting the rail from coming into contact with the support member.

When the controller receives a first instruction to propel the unmanned aerial vehicle in a first direction along the rail, the controller may incline the normal direction of the virtual plane from the support direction toward a second direction, rotate the rotary wings of a first motor among the plurality of motors that is positioned in the first direction from the center of the main body in a first direction of rotation, and rotate the rotary wings of a second motor among the plurality of motors that is positioned in the second direction from the center of the main body in a second direction of rotation. The second direction may be the opposite of the first direction, and the second direction of rotation may be the opposite of the first direction of rotation.

This allows the unmanned aerial vehicle to move forward while maintaining the attitude of the unmanned aerial vehicle with respect to the main body relative to the support direction in a desired state.

When the controller obtains a second instruction to propel the unmanned aerial vehicle in the second direction along the rail, the controller may rotate the rotary wings of the first motor in the second direction of rotation and rotate the rotary wings of the second motor in the first direction of rotation.

With this, by reversing the directions of rotation of the first motor and the second motor, the unmanned aerial vehicle can move in reverse. For example, after the package is delivered, the unmanned aerial vehicle can return along the same rail along which it arrived.

When the controller obtains the second instruction, the controller may further incline the normal direction of the virtual plane from the support direction toward the first direction via the actuator, rotate the rotary wings of the first motor in the first direction of rotation, and rotate the rotary wings of the second motor in the second direction of rotation.

This allows the unmanned aerial vehicle to reverse the inclination of the main body of the unmanned aerial vehicle relative to the support direction. The inclination of the normal direction of the virtual plane changes from inclining toward the second direction to inclining toward the first direction relative to the support direction. This allows the unmanned aerial vehicle to move in reverse. For example, in this case as well, after the package is delivered, the unmanned aerial vehicle can return along the same rail along which it arrived.

The connector may include a fixed portion connected to a main body, an arm connected to the rail, and a second actuator that is disposed between the fixed portion and the arm and is rotatable about an axis of rotation parallel to the support direction. When the controller receives a second instruction to propel the unmanned aerial vehicle in the second direction along the rail, the controller may reverse the orientation of the main body by rotating the main body via the second actuator about the axis of rotation that is parallel to the support direction.

This makes it possible to invert the inclination of the main body of the unmanned aerial vehicle symmetrically with respect to the support direction by the fixed portion rotating relative to the arm about the axis of rotation that is parallel to the support direction.

This allows the unmanned aerial vehicle to move in reverse. For example, in this case as well, after the package is delivered, the unmanned aerial vehicle can return along the same rail along which it arrived.

The connector may include an arm that is connected to the rail and can be opened and closed, and a third actuator that opens and closes the arm. When the controller receives a second instruction to propel the unmanned aerial vehicle in the second direction along the rail, the controller may change the arm from a closed state to an open state via the third actuator, control the plurality of motors to reverse the orientation of the main body about the support direction, and change the arm from the open state to the closed state via the third actuator.

With this, the unmanned aerial vehicle is temporarily disconnected from the rail, the orientation of the unmanned aerial vehicle is reversed, and then the connector of the unmanned aerial vehicle is reconnected to the rail. For example, in this case as well, after the package is delivered, the unmanned aerial vehicle can return along the same rail along which it arrived.

The connector may include an arm connected to the rail, and a roller that is provided on the inner peripheral surface of the arm and rotatably contacts the rail.

Accordingly, when the connector of the unmanned aerial vehicle is connected to the rail, the roller contacts the rail, allowing the unmanned aerial vehicle to move along the rail. The unmanned aerial vehicle is able to move along the rail using only its own propulsion in the traveling direction. Since the unmanned aerial vehicle does not have to expend energy on lift force to lift itself, the unmanned aerial vehicle can save energy.

The connector may include a pair of brake pads and a braking mechanism that changes the distance between the pair of brake pads so as to sandwich the rail between the pair of brake pads.

Accordingly, when the connector of the unmanned aerial vehicle is connected to the rail, the rail can be sandwiched between the pair of brake pads. This makes it easy to decelerate or stop the unmanned aerial vehicle that is moving.

When the controller obtains a stop instruction to stop the unmanned aerial vehicle, the controller may rotate the rotary wings of the first motor in the second direction of rotation and rotate the rotary wings of the second motor in the first direction of rotation.

This makes it possible to reverse the directions of rotation of the rotary wings of the first motor and the rotary wings of the second motor, in accordance with the stop instruction, relative to the directions of rotation of the rotary wings of the first motor and the rotary wings of the second motor when traveling forward. This makes it possible to stop movement of the unmanned aerial vehicle.

A storage device capable of storing a package delivered by an unmanned aerial vehicle may include: a container including a bottom portion and a side portion; a top lid provided above the container; and a load support member capable of supporting the load of the unmanned aerial vehicle carrying a package. The unmanned aerial vehicle may include a plurality of legs that can land on the load support member. The load support member may include a plurality of recesses that can support the plurality of legs. Each of the plurality of recesses may be a bowl-shaped or cone-shaped recess that opens upwardly.

With this, the plurality of recesses can engage with the plurality of legs to guide the plurality of legs when the unmanned aerial vehicle descends. As a result, the load support member can hold the unmanned aerial vehicle at a predetermined attitude. When the unmanned aerial vehicle delivers a package, the unmanned aerial vehicle can thus position itself vertically above the container. As a result, a package can be stored with certainty in the storage device.

A storage device capable of storing package delivered by an unmanned aerial vehicle may include: a container including a bottom portion and a side portion; a lid rotatably coupled to the container; a load support member capable of supporting the load of the unmanned aerial vehicle carrying a package; and one or more link rods coupled between the load support member and the lid. When the unmanned aerial vehicle applies a load to the load support member, the one or more link rods may transfer the load to the lid and open the lid.

With this, the lid of the container can be automatically opened simply by the unmanned aerial vehicle hanging from the load support member. Accordingly, the package delivered by the unmanned aerial vehicle can be stored in the container.

A method for storing a package delivered by an unmanned aerial vehicle into a storage device may include: supporting the unmanned aerial vehicle using a load support member of the storage device; storing the package in a container after a lid of the storage device opens and the package is lowered from the unmanned aerial vehicle via a wire; disconnecting the connection between the package and the wire; reeling in the wire; and separating the unmanned aerial vehicle from the load support member.

The lid may close to cover the top portion of the container when the load applied to the load support member is removed.

With this, the lid of the container can be automatically closed by the unmanned aerial vehicle flying away from the load support member.

The load support member may be disposed above the container.

With this, since the lid of the container is opened so long as the unmanned aerial vehicle is hanging from the load support member, the package delivered by the unmanned aerial vehicle can be easily stored in the container.

The load support member may be a suspension rod from which the unmanned aerial vehicle can hang.

With this, the load of the unmanned aerial vehicle hanging from the load support member can be reliably supported.

The suspension rod may include a V-shaped or U-shaped bend directly above the container.

This makes it easier to position the unmanned aerial vehicle because the unmanned aerial vehicle can easily be caught by the bend. Accordingly, since the lid of the container is opened so long as the unmanned aerial vehicle is hanging from the load support member, the package delivered by the unmanned aerial vehicle can be stored in the container even more easily.

The one or more link rods may include a first link rod, a second link rod, and a third link rod. A first end of the first link rod may be rotatably coupled to the suspension rod, a second end of the first link rod may be rotatably coupled to a third end of the second link rod, a fourth end of the second link rod may be rotatably coupled to a fifth end of the third link rod, and a sixth end of the third link rod may be rotatably coupled to the lid.

With this, when the unmanned aerial vehicle is hanging from the suspension rod, the suspension rod flexes vertically downward due to the load of the unmanned aerial vehicle. As a result, the load thereof is transferred, via the suspension rod, to the lid of the container via the first link rod, the second link rod, and the third link rod. Accordingly, the lid of the container can be reliably opened simply by the unmanned aerial vehicle hanging from the suspension rod. Accordingly, with this storage device, the package delivered by the unmanned aerial vehicle can be stored in the container more easily.

The storage device may further include a first axle that supports rotation of the load support member at a position between the two ends of the suspension rod, and a second axle that supports rotation of the third link rod at a position between the fifth end and the sixth end of the third link rod.

With this, the load of the unmanned aerial vehicle can be reliably transferred to the first link rod via the first axle. The load of the unmanned aerial vehicle transferred to the third link rod can be reliably transferred to the lid of the container via the second axle. This makes it possible to open the lid of the container.

The storage device may further include a support member that fixes the positions of the first axle and the second axle.

With this, the weight of the unmanned aerial vehicle hanging from the suspension rod can be reliably transferred to the lid of the container via the first link rod, the second link rod, and the third link rod, so that the lid of the container can be reliably opened.

The storage device may further include a door provided on the side portion of the container, and a first interlocking portion that locks the door when the lid is opened.

This inhibits a package from going through the door upon storing the package in the container. Locking the door makes it possible to inhibit forgetting to lock the door manually, which is excellent for convenience because it can inhibit theft of a package stored in the storage device.

The storage device may further include a second interlocking portion that locks the lid when the lid is closed.

With this, the lid can be automatically locked when the lid is closed. This reduces the frequency of having to lock the lid by hand. Locking the lid makes it possible to inhibit forgetting to lock the lid manually, which is excellent for convenience because it can inhibit theft of a package stored in the storage device.

A system may include the storage device and the unmanned aerial vehicle.

The unmanned aerial vehicle may include a first arm for hanging from the load support member.

With this, since the unmanned aerial vehicle can securely hang from the load support member, the unmanned aerial vehicle can maintain its attitude even if the actuation of a motor, for example, is stopped.

In the system, the unmanned aerial vehicle may include: a wire; a second arm that is connected to one end of the wire and holds a package; a reel that is connected to the other end of the wire and is capable of reeling in the wire; and a controller. The controller may reel out the wire to place the package into the container after the lid is opened, and after the package is placed on the bottom portion of the container, may cause the second arm to let go of the package and cause the reel to reel in the wire.

Accordingly, when the unmanned aerial vehicle is hanging from the load support member, the second arm and the package can be lowered toward the container by reeling out the wire. Once the package is placed on the bottom portion of the container, the second arm can be moved away from the package. Thus, the system can ensure that the package is stored inside the container.

In the system, the unmanned aerial vehicle may further include a camera capable of capturing images of the inside of the container.

This enables the unmanned aerial vehicle to confirm whether or not the package has been stored in the container. This can also prevent the second arm from separating from the package if the package is not correctly stored inside the container. After pulling up the package, the package can be stored in the container once again.

In the system, the controller may obtain an image of the inside of the storage device via the camera, and based on the image, execute an authenticated process that confirms that the unmanned aerial vehicle has stored the package.

This ensures the certainty that the package was stored in the container since the storing of the package into the storage device can be verified.

Although the lifting system has been described based on embodiments, the present disclosure is not limited to these embodiments. Various modifications of the exemplary embodiments as well as embodiments resulting from arbitrary combinations of elements of different exemplary embodiments that may be conceived by those skilled in the art are intended to be included within the scope of one or more aspects of the present disclosure as long as they do not depart from the essence of the present disclosure.

INDUSTRIAL APPLICABILITY

The present disclosure is applicable to, for example, a package delivery system implemented via unmanned aerial vehicles in an urban environment.

The invention claimed is:

1. A package transport device, comprising:
a main body;
a rail holder held by a rail located above the main body;
a turntable that is provided between the main body and the rail holder and configured to rotate the main body;
a first slider portion that extends with respect to the main body; and
a package holder configured to hold a package attached to the first slider portion, wherein
the main body includes a frame having a first length in a first direction that is longer than a second length in a second direction, the second direction being orthogonal to the first direction,
the main body is disposed, by the turntable, at a position in which a lengthwise direction of the frame is approximately perpendicular to an extending direction of the rail, and
the first slider portion:
includes the package holder at a first end of the first slider portion, and a rotary wing at a second end of the first slider portion, the first end being opposite the second end; and
is configured to extend to balance a weight of the package and a buoyancy of the rotary wing.

2. The package transport device according to claim 1, wherein
the first slider portion is configured to extend with respect to the main body in response to rotation of the main body by the turntable.

3. The package transport device according to claim 1, wherein
the rail holder includes:
a first holder held by the rail from above the rail; and
a second holder held by the rail so as to push up on the rail from below.

4. The package transport device according to claim 1, wherein
the rail holder includes:
a first rail holder located on a first side of the frame in the lengthwise direction of the frame;
a second rail holder located on a second side of the frame in the lengthwise direction of the frame; and
a third rail holder located in a central region of the frame between the first side and the second side in the lengthwise direction of the frame.

5. The package transport device according to claim 4, wherein the first rail holder includes a first rotating roller that contacts the rail and is configured to be actuated by a first electric motor, the second rail holder includes a second rotating roller that contacts the rail and is configured to be actuated by a second electric motor, and the third rail holder includes a third rotating roller and a fourth rotating roller that contact the rail and are configured to be actuated by a third electric motor.

6. The package transport device according to claim 5, wherein the third rail holder holds the rail so as to push up on the rail from below, and the first rail holder and the second rail holder are held by the rail, above the rail.

7. The package transport device according to claim 4, further comprising:

a second slider portion that is provided on the main body and configured to extend with respect to the main body; and a third slider portion that is provided on the main body and configured to extend with respect to the main body, wherein the turntable is disposed between the third rail holder and the main body, and the turntable is configured to rotate the main body.

8. The package transport device according to claim 1, further comprising:

a motor that is configured to rotate the rail holder so as to release a hold of the rail holder by the rail so as to avoid contact between a rail support portion that supports the rail and the rail holder when the package transport device is traveling on the rail.

9. A control method of controlling a package transport device, the package transport device including:

a main body;

a rail holder held by a rail located above the main body;

a turntable that is provided between the main body and the rail holder and configured to rotate the main body;

a first slider portion that extends with respect to the main body; and a package holder that holds configured to hold a package attached to the first slider portion, the control method comprising:

rotating the main body by the turntable; and extending the first slider portion with respect to the main body after the turntable rotates the main body, wherein the main body includes a frame having a first length in a first direction that is longer than a second length in a second direction, the second direction being orthogonal to the first direction, the first slider portion includes the package holder at a first end of the first slider portion, and a counterweight of a predetermined weight at a second end of the first slider portion, the first end being opposite the second end, in the rotating, the main body is rotated until a lengthwise direction of the frame is approximately perpendicular to an extending direction of the rail, in the extending, the first slider portion is extended from both ends of the frame in the lengthwise direction of the frame so as to maintain balance between a weight of the package and a weight of the counterweight, the rail holder includes:

a first rail holder located on a first side of the frame in the lengthwise direction of the frame;

a second rail holder located on a second side of the frame in the lengthwise direction of the frame; and a third rail holder located in a central region of the frame between the first side and the second side in the lengthwise direction of the frame, the package transport device further includes:

a second slider portion that is disposed between the first rail holder and the main body and extends with respect to the main body; and a third slider portion that is disposed between the second rail holder and the main body and extends with respect to the main body, the turntable is disposed between the third rail holder and the main body, and in the rotating, the turntable is rotated after the second slider portion and the third slider portion are extended to separate the first rail holder and the second rail holder from the rail.

10. A package transport device, comprising:

a main body;

a rail holder held by a rail located above the main body;

a turntable that is provided between the main body and the rail holder and configured to rotate the main body;

a first slider portion that extends with respect to the main body; and a package holder configured to hold a package attached to the first slider portion, wherein the main body includes a frame having a first length in a first direction that is longer than a second length in a second direction, the second direction being orthogonal to the first direction, the main body is disposed, by the turntable, at a position in which a lengthwise direction of the frame is approximately perpendicular to an extending direction of the rail, and the rail holder includes:

a first holder held by the rail from above the rail; and a second holder held by the rail so as to push up on the rail from below.

11. The package transport device according to claim 10, wherein the first slider portion:

includes the package holder at a first end of the first slider portion, and a counterweight of a predetermined weight at a second end of the first slider portion, the first end being opposite the second end; and extends so as to maintain balance between a weight of the package and a weight of the counterweight.

12. The package transport device according to claim 11, wherein the counterweight is a battery.

13. A package transport device, comprising:

a main body;

a rail holder held by a rail located above the main body;

a turntable that is provided between the main body and the rail holder and configured to rotate the main body;

a first slider portion that extends with respect to the main body; and a package holder configured to hold a package attached to the first slider portion, wherein the main body includes a frame having a first length in a first direction that is longer than a second length in a second direction, the second direction being orthogonal to the first direction, the main body is disposed, by the turntable, at a position in which a lengthwise direction of the frame is approximately perpendicular to an extending direction of the rail, and the rail holder includes:

a first rail holder located on a first side of the frame in the lengthwise direction of the frame;

a second rail holder located on a second side of the frame in the lengthwise direction of the frame; and a third rail holder located in a central region of the frame between the first side and the second side in the lengthwise direction of the frame.

* * * * *